US007788377B2

(12) United States Patent
Itoh et al.

(10) Patent No.: US 7,788,377 B2
(45) Date of Patent: Aug. 31, 2010

(54) METHOD AND APPARATUS FOR PROVIDING A SERVICE FOR SHARING A PRINTING ENVIRONMENT

(75) Inventors: Masanori Itoh, Kanagawa (JP); Hiroshi Hiraki, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 1540 days.

(21) Appl. No.: 10/869,974

(22) Filed: Jun. 18, 2004

(65) Prior Publication Data

US 2004/0263870 A1  Dec. 30, 2004

(30) Foreign Application Priority Data

| Jun. 20, 2003 | (JP) | ............................. 2003-176873 |
|---|---|---|
| Aug. 22, 2003 | (JP) | ............................. 2003-299155 |
| Aug. 22, 2003 | (JP) | ............................. 2003-299156 |
| Jun. 11, 2004 | (JP) | ............................. 2004-174085 |
| Jun. 11, 2004 | (JP) | ............................. 2004-174086 |
| Jun. 11, 2004 | (JP) | ............................. 2004-174087 |

(51) Int. Cl.
*G06F 13/00* (2006.01)

(52) U.S. Cl. .................... 709/226; 709/229; 718/104

(58) Field of Classification Search ................ 709/223, 709/225, 226, 227, 228, 229, 238, 250
See application file for complete search history.

(56) References Cited

U.S. PATENT DOCUMENTS

| 5,220,674 | A | * | 6/1993 | Morgan et al. .............. 709/223 |
|---|---|---|---|---|
| 5,742,801 | A | | 4/1998 | Fukushima et al. |
| 6,452,692 | B1 | * | 9/2002 | Yacoub ...................... 358/1.15 |
| 6,904,452 | B2 | * | 6/2005 | Sedky et al. ................ 709/203 |
| 7,146,413 | B2 | * | 12/2006 | Spitzer et al. .............. 709/220 |
| 7,170,623 | B2 | * | 1/2007 | Matoba et al. ............. 358/1.15 |
| 7,304,760 | B2 | * | 12/2007 | Ferlitsch .................... 358/1.15 |
| 7,458,657 | B2 | | 12/2008 | Grose et al. |
| 7,461,377 | B2 | * | 12/2008 | Someshwar et al. ......... 718/102 |
| 2003/0118162 | A1 | | 6/2003 | Itoh |
| 2003/0123647 | A1 | | 7/2003 | Itoh |
| 2003/0128384 | A1 | * | 7/2003 | Nelson et al. .............. 358/1.15 |
| 2004/0024649 | A1 | * | 2/2004 | Howard ...................... 705/26 |

FOREIGN PATENT DOCUMENTS

| EP | 1 184 779 A1 | 3/2002 |
|---|---|---|
| JP | 2002-132476 | 5/2002 |

(Continued)

OTHER PUBLICATIONS

U.S. Appl. No. 10/742,971, filed Dec. 23, 2003.

(Continued)

*Primary Examiner*—Viet Vu
(74) *Attorney, Agent, or Firm*—Oblon, Spivak, McClelland, Maier & Neustadt, L.L.P..

(57) ABSTRACT

A method of providing a service for sharing a printing environment using multiple service providing apparatuses connected via a network is disclosed. The method includes the steps of: (a) a first service providing apparatus managing service data including data on the hierarchical relationship between the first service providing apparatus and second and third service providing apparatuses connected thereto; and (b) the first service providing apparatus transferring information and/or data on printing reservation to the second service providing apparatus in response to a request from the third service providing apparatus.

103 Claims, 129 Drawing Sheets

| | FOREIGN PATENT DOCUMENTS | | JP | 2003-141021 | 5/2003 |
|----|----|----|----|----|----|
| JP | 2002-171379 | 6/2002 | | | |
| JP | 2002-251548 | 9/2002 | | | |
| JP | 2003-011463 | 1/2003 | | | |
| JP | 2003-15848 | 1/2003 | | | |
| JP | 2003-091373 | 3/2003 | | | |

OTHER PUBLICATIONS

U.S. Appl. No. 10/319,528, filed Dec. 16, 2002, Itoh.
U.S. Appl. No. 10/309,891, filed Dec. 5, 2002, Itoh.

* cited by examiner

FIG.10A  PRINTING LOCATION SELECTION

- B-1
- ○ B-1-1
- ○ B-1-2
- ⦿ SEARCH BY PRINTING CONDITIONS

[NEXT] [PREVIOUS] [OK]

180a

FIG.10B  PRINTING LOCATION SEARCH

- PAPER SIZE: A4
- PAPER ORIENTATION: LANDSCAPE
- COLOR/B&W: COLOR
- DUPLEX: NO

[SEARCH] [PREVIOUS]

181a

FIG.10C  PRINTING LOCATION SEARCH RESULT

THE FOLLOWING LOCATION HAS BEEN FOUND AS A RESULT OF SEARCHING VICINITY OF B-1

CONDITIONS: A4, COLOR, LANDSCAPE

⦿ PRINTER P-2-2 OF B-1-2

[RESERVE PRINTING] [PREVIOUS]

182a

FIG.10D  PRINTING RESERVATION CONFIRMATION

RESERVATION NAME: RESERVATION 1
(RESERVATION NO.: 1234567)
RESERVATION DATE AND TIME: 2002.4.1.10:10
RESERVATION EXPIRY DATE AND TIME: 2002.4.3.23:59
PRINTING LOCATION: A-1-1
PRINTING LOCATION: B-1-2
PRINTER: P-2-2
PRINTING CONDITIONS: A4, LANDSCAPE, COLOR

[RESERVE] [PREVIOUS]

FIG.18

| 72 | | |
|---|---|---|
| DOCUMENT PRINT SERVICE IDENTIFICATION INFORMATION | PRINTER IDENTIFIER | PRINTER NAME |
| PS-2, | P12884C:P78961d | P-2-1:P-2-2 |
| ⋮ | | |

FIG.19A

PRINTER SELECTION

○ P-2-1
● P-2-2

| PREVIOUS | OK |

PRINTER SELECTION CONFIRMATION

IS P-2-2 OK AS PRINTER?

| RESERVE PRINTING 201a | SET PRINTING CONDITIONS 201b |
| CHANGE PRINTER | DISPLAY SELECTION RESULTS |

FIG.19C

PRINTING RESERVATION CONFIRMATION

RESERVATION NAME: RESERVATION 1
(RESERVATION NO.:1234567)
RESERVATION DATE AND TIME: 2002.4.1.10:10
RESERVATION EXPIRY DATE AND TIME: 2002.4.3.23:59
RESERVATION LOCATION: A-1-1
PRINTING LOCATION: B-1-2
PRINTER: P-2-2
PRINTING CONDITIONS: UNSPECIFIED

| RESERVE | PREVIOUS |

PRINTING CONDITION SETTING

PAPER SIZE: A4 ▶

PAPER ORIENTATION: LANDSCAPE ▶

COLOR/B&W: COLOR ▶

DUPLEX: NO ▶

...

PREVIOUS | RESERVE PRINTING ~210a

FIG.21B

PRINTING RESERVATION CONFIRMATION

RESERVATION NAME: RESERVATION 1
(RESERVATION NO.: 1234567)
RESERVATION DATE AND TIME: 2002.4.1.10:10
RESERVATION EXPIRY DATE AND TIME: 2002.4.3.23:59
RESERVATION LOCATION: A-1-1
PRINTING LOCATION: B-1-2
PRINTER: P-2-2
PRINTING CONDITION: A4, LANDSCAPE, COLOR

RESERVE | PREVIOUS ~211a

FIG.23A

PRINTING RESERVATION
SELECTION SCREEN

☑ RESERVATION 1
☐ RESERVATION 2
☐ RESERVATION 3
☐ RESERVATION 4

[RESERVATION CONTENTS] [PRINT] [PREVIOUS]

PRINTING RESERVATION CONTENTS DISPLAY

RESERVATION NAME : RESERVATION 1
(RESERVATION NO. : 1234567)
RESERVATION DATE AND TIME : 2002.4.1.10:10
RESERVATION EXPIRY DATE AND TIME : 2002.4.3.23:59
RESERVATION LOCATION : A-1-1
PRINTING LOCATION : B-1-2
PRINTER : P-2-2
PRINTING CONDITION : A4, LANDSCAPE, COLOR

[PRINT] [PREVIOUS]

221a

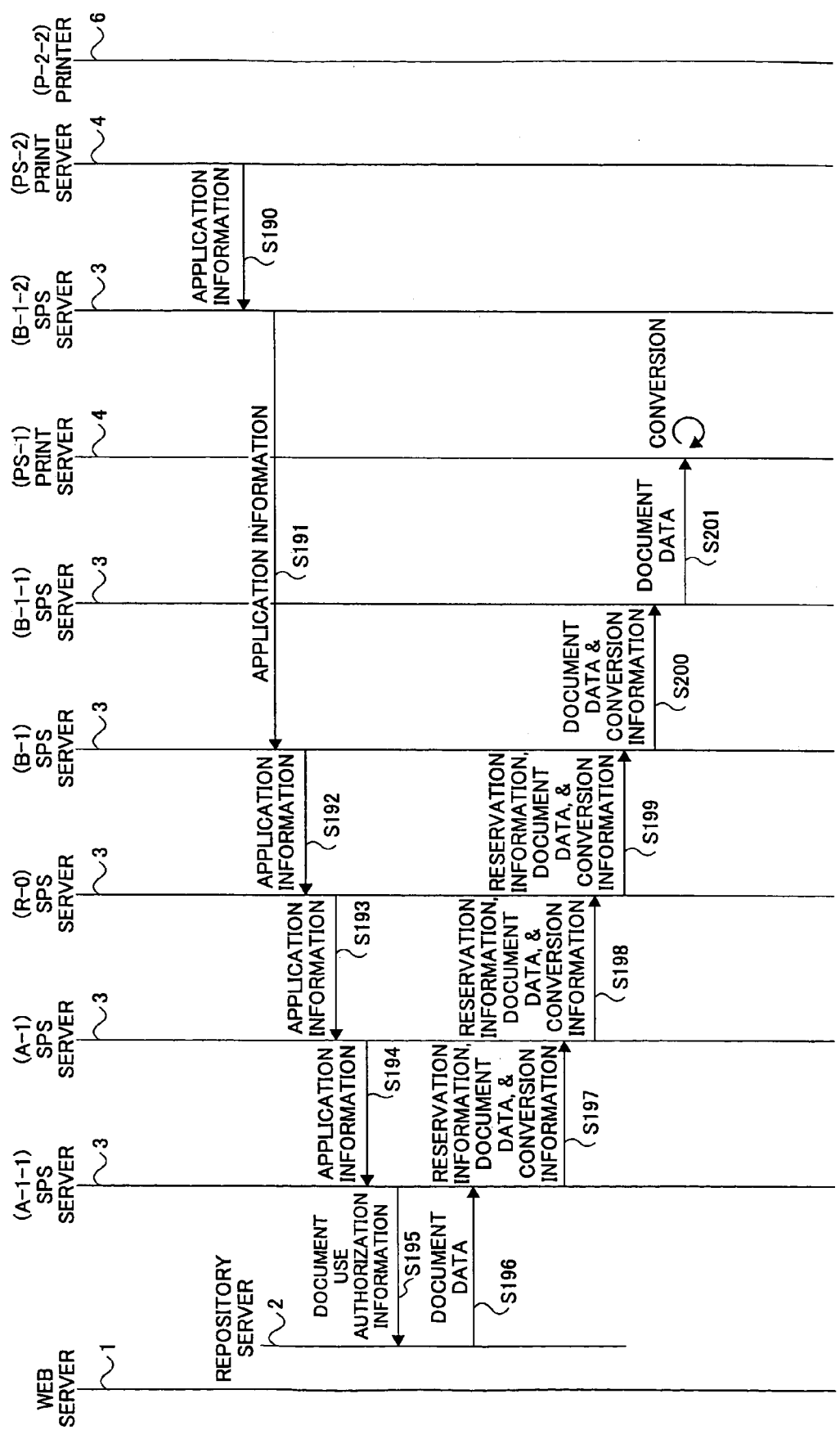

FIG.29A

PRINTING LOCATION SELECTION

[ B-1 ]
○ B-1-1
○ B-1-2
● ASCENDING ORDER OF CHARGES

[NEXT] [OK]
[PREVIOUS] [SEARCH]

PRINTING LOCATION SEARCH RESULT

● P-2-2   ¥5/PAGE (A4)
   (B-1-2)
○ P-2-1   ¥10/PAGE (A4)
   (B-1-2)
○ P-1    ¥20/PAGE (A4)
   (B-1-1)

[OK]  [PREVIOUS]

PRINTING LOCATION & PRINTER SELECTION CONFIRMATION

IS B-1-2 OK AS PRINTING LOCATION?
IS P-2-2 OK AS PRINTER?

[SET PRINTING CONDITIONS]   [CHANGE PRINTER]
[RESERVE PRINTING]  [CHANGE PRINTING LOCATION]  [DISPLAY SELECTION RESULTS]

FIG.38A

REPOSITORY SERVICE SELECTION

SECTION A

● REPOSITORY SERVICE 1
○ REPOSITORY SERVICE 2
○ REPOSITORY SERVICE 3

[NEXT]

FIG.38B

DOCUMENT SELECTION

| NAME | SECTION # | SIZE | REGISTERED | UPDATED |
|---|---|---|---|---|
| ☐ DOCUMENT 1 | ○○ | 34KB | ? | ? |
| ☑ DOCUMENT 2 | ×× | 71KB | ? | ? |
| ... | ... | ... | ... | ... |

[RETURN] [NEXT] [SELECT]

FIG.38C

DOCUMENT SELECTION CONFIRMATION

DOCUMENT 2 OK?

[RESERVE PRINTING]  [SELECT PRINTING LOCATION]

[RETURN]

FIG.38D

PRINTING RESERVATION CONFIRMATION

RESERVATION NAME: RESERVATION 1
(RESERVATION NUMBER: 1234567)
PRINTING DOCUMENT: DOCUMENT 2
RESERVATION DATE: 2002.4.1.10:10
RESERVATION EXPIRY: 2002.4.3.23:59
RESERVATION LOCATION: A
PRINTER LOCATION: UNSPECIFIED
PRINTER: UNSPECIFIED
PRINTING CONDITION: UNSPECIFIED

[RESERVE]  [RETURN]

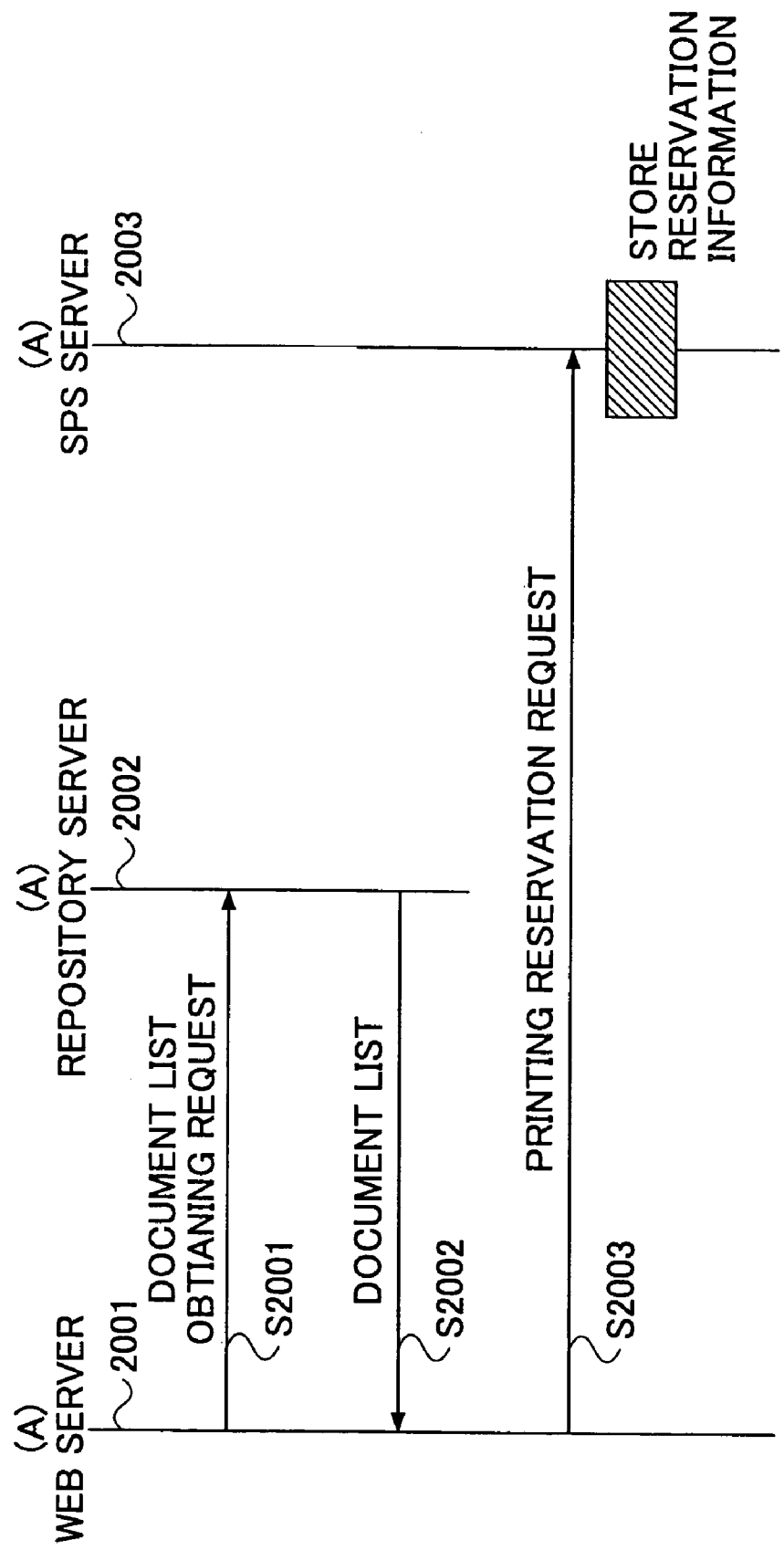

FIG.41A

PRINTING LOCATION SELECTION

A
○ B
⦿ C

RETURN  SELECT

FIG.41B

PRINTING LOCATION SELECTION CONFIRMATION

PRINTING LOCATION C OK?

RESERVE PRINTING   SELECT PRINTER

CHANGE PRINTER LOCATION   SHOW SELECTION RESULT

FIG.41C

PRINTING RESERVATION CONFIRMATION

RESERVATION NAME: RESERVATION 1
(RESERVATION NUMBER: 1234567)
PRINTING DOCUMENT: DOCUMENT 2
RESERVATION DATE: 2002.4.1.10:10
RESERVATION EXPIRY: 2002.4.3.23:59
RESERVATION LOCATION: A
PRINTER LOCATION: C
PRINTER: UNSPECIFIED
PRINTING CONDITION: UNSPECIFIED

RESERVE   RETURN

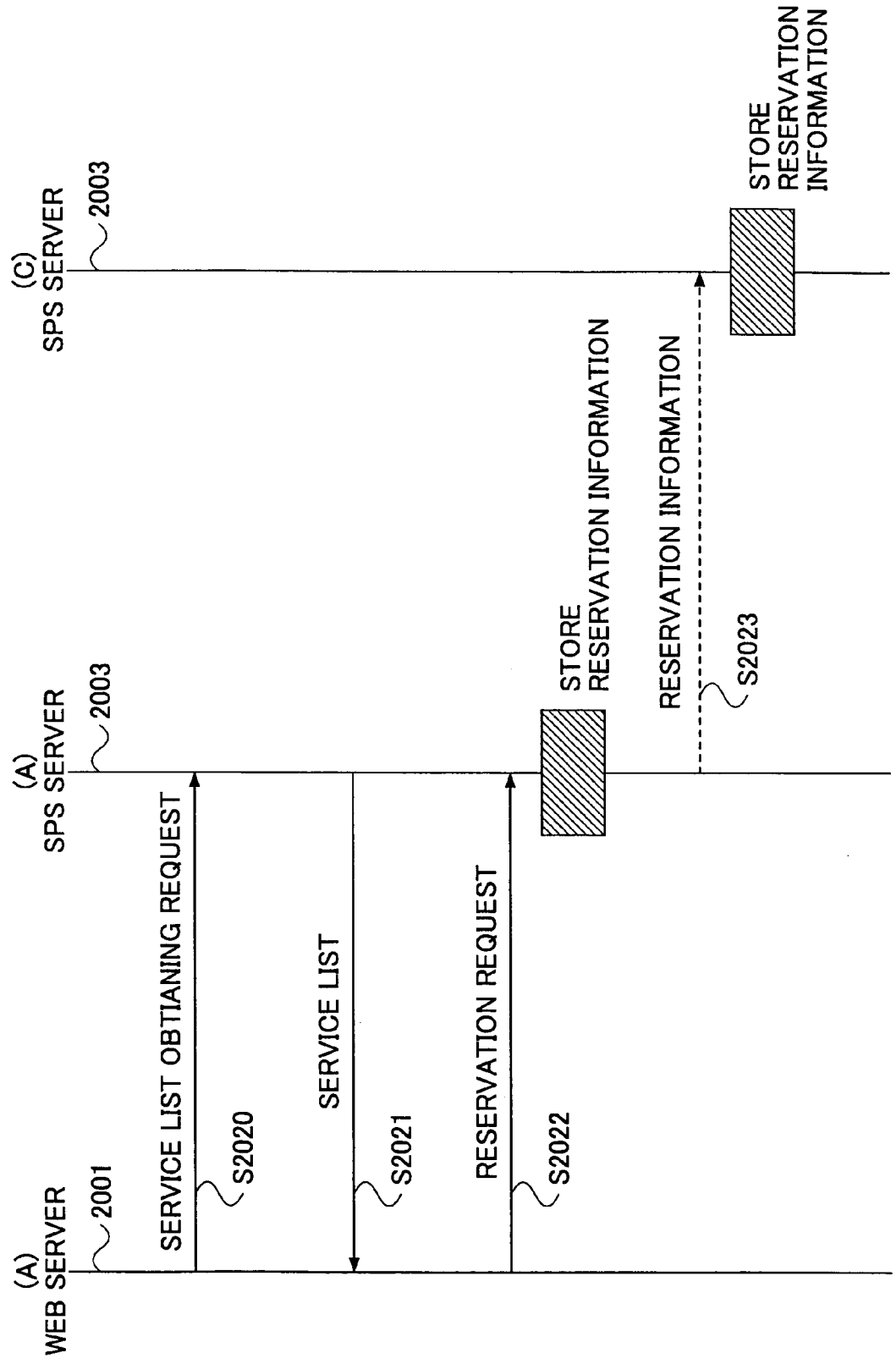

FIG.44A

PRINTER SELECTION

○ P-C1
 P-C2

[RETURN] [SELECT]

FIG.44B

PRINTER SELECTION CONFIRMATION

PRINTER P-C2 OK?

[RESERVE PRINTING] [SET PRINTING CONDITION]

[CHANGE PRINTER] [SHOW SELECTION RESULT]

FIG.44C

PRINTING RESERVATION CONFIRMATION

RESERVATION NAME:RESERVATION 1
(RESERVATION NUMBER:1234567)
PRINTING DOCUMENT:DOCUMENT 2
RESERVATION DATE:2002.4.1.10:10
RESERVATION EXPIRY:2002.4.3.23:59
RESERVATION LOCATION:A
PRINTER LOCATION:C
PRINTER:UNSPECIFIED
PRINTING CONDITION:UNSPECIFIED

[RESERVE] [RETURN]

FIG.47A

PRINTING CONDITION SETTING

PAPER SIZE: A4 ▶

DIRECTION: SIDEWAYS ▶

COLOR/MONO: COLOR ▶

DUPLEX: NO ▶

RETURN    RESERVE PRINTING

FIG.47B

PRINTING RESERVATION CONFIRMATION

RESERVATION NAME:RESERVATION 1
(RESERVATION NUMBER:1234567)
PRINTING DOCUMENT:DOCUMENT 2
RESERVATION DATE:2002.4.1.10:10
RESERVATION EXPIRY:2002.4.3.23:59
RESERVATION LOCATION:A
PRINTER LOCATION:C
PRINTER:P-C2
PRINTING CONDITION:A4,SIDEWAYS,COLOR

RESERVE    RETURN

FIG.50A

PRINTING RESERVATION SELECTION SCREEN

☑ RESERVATION 1
☐ RESERVATION 2
☐ RESERVATION 3
☐ RESERVATION 4

| CONFIRM RESERVATION | RETURN |

FIG.50B

PRINTING RESERVATION CONFIRMATION

RESERVATION NAME: RESERVATION 1
(RESERVATION NUMBER: 1234567)
PRINTING DOCUMENT: DOCUMENT 2
RESERVATION DATE: 2002.4.1.10:10
RESERVATION EXPIRY: 2002.4.3.23:59
RESERVATION LOCATION: A
PRINTER LOCATION: UNSPECIFIED
PRINTER: UNSPECIFIED
PRINTING CONDITION: UNSPECIFIED

| SELECT PRINTING CONDITION | RETURN |

FIG.50C

PRINTING LOCATION SELECTION

A
○ B
◉ C

| RETURN | SELECT |

FIG.50D

PRINTING LOCATION SELECTION CONFIRMATION

PRINTING LOCATION C OK?

| | SELECT PRINTER |
| CHANGE PRINTING LOCATION | SHOW SELECTION RESULT |

FIG.50E

PRINTER SELECTION

○ P-C1
◉ P-C2

| RETURN | SELECT |

FIG.50F

PRINTER SELECTION CONFIRMATION

PRINTER P-C2 OK?

| | SET PRINTING CONDITION |
| CHANGE PRINTER | SHOW SELECTION RESULT |

FIG.50G

PRINTING CONDITION SETTING

PAPER SIZE
[ A4 ▼ ]

DIRECTION
[ SIDEWAYS ▼ ]

COLOR/MONO
[ COLOR ▼ ]

DUPLEX
[ NO ▼ ]

| RETURN | CONFIRM RESERVATION |

FIG.50H

PRINTING CONFIRMATION

RESERVATION NAME: RESERVATION 1
(RESERVATION NUMBER: 1234567)
PRINTING DOCUMENT: DOCUMENT 2
RESERVATION DATE: 2002.4.1.10:10
RESERVATION EXPIRY: 2002.4.3.23:59
RESERVATION LOCATION: A
PRINTER LOCATION: C
PRINTER: P-C2
PRINTING CONDITION: A4, SIDEWAYS, COLOR

| PRINT | RETURN |

FIG.53A

```
PRINTING RESERVATION
SELECTION SCREEN

☑ RESERVATION 1
☐ RESERVATION 2
☐ RESERVATION 3
☐ RESERVATION 4

[CONFIRM RESERVATION]  [RETURN]
```

FIG.53B

```
PRINTING RESERVATION
CONFIRMATION

RESERVATION NAME: RESERVATION 1
(RESERVATION NUMBER: 1234567)
PRINTING DOCUMENT: DOCUMENT 2
RESERVATION DATE: 2002.4.1.10:10
RESERVATION EXPIRY: 2002.4.3.23:59
RESERVATION LOCATION: A
PRINTER LOCATION: C
PRINTER: UNSPECIFIED
PRINTING CONDITION: UNSPECIFIED

[SELECT PRINTER]  [RETURN]
```

FIG.53C

```
PRINTER
SELECTION

○ P-C1
● P-C2

[RETURN] [SELECT]
```

FIG.53D

```
PRINTER SELECTION
CONFIRMATION

PRINTER P-C2 OK?

[SET PRINTING CONDITION]
[CHANGE PRINTER] [SHOW SELECTION RESULT]
```

FIG.53E

```
PRINTING CONDITION SETTING

PAPER SIZE
[ A4       ▼]

DIRECTION
[ SIDEWAYS ▼]

COLOR/MONO
[ COLOR    ▼]

DUPLEX
[ NO       ▼]

[RETURN] [CONFIRM RESERVATION]
```

FIG.53F

```
PRINTING CONFIRMATION

RESERVATION NAME: RESERVATION 1
(RESERVATION NUMBER: 1234567)
PRINTING DOCUMENT: DOCUMENT 2
RESERVATION DATE: 2002.4.1.10:10
RESERVATION EXPIRY: 2002.4.3.23:59
RESERVATION LOCATION: A
PRINTER LOCATION: C
PRINTER: P-C2
PRINTING CONDITION: A4, SIDEWAYS, COLOR

[PRINT]  [RETURN]
```

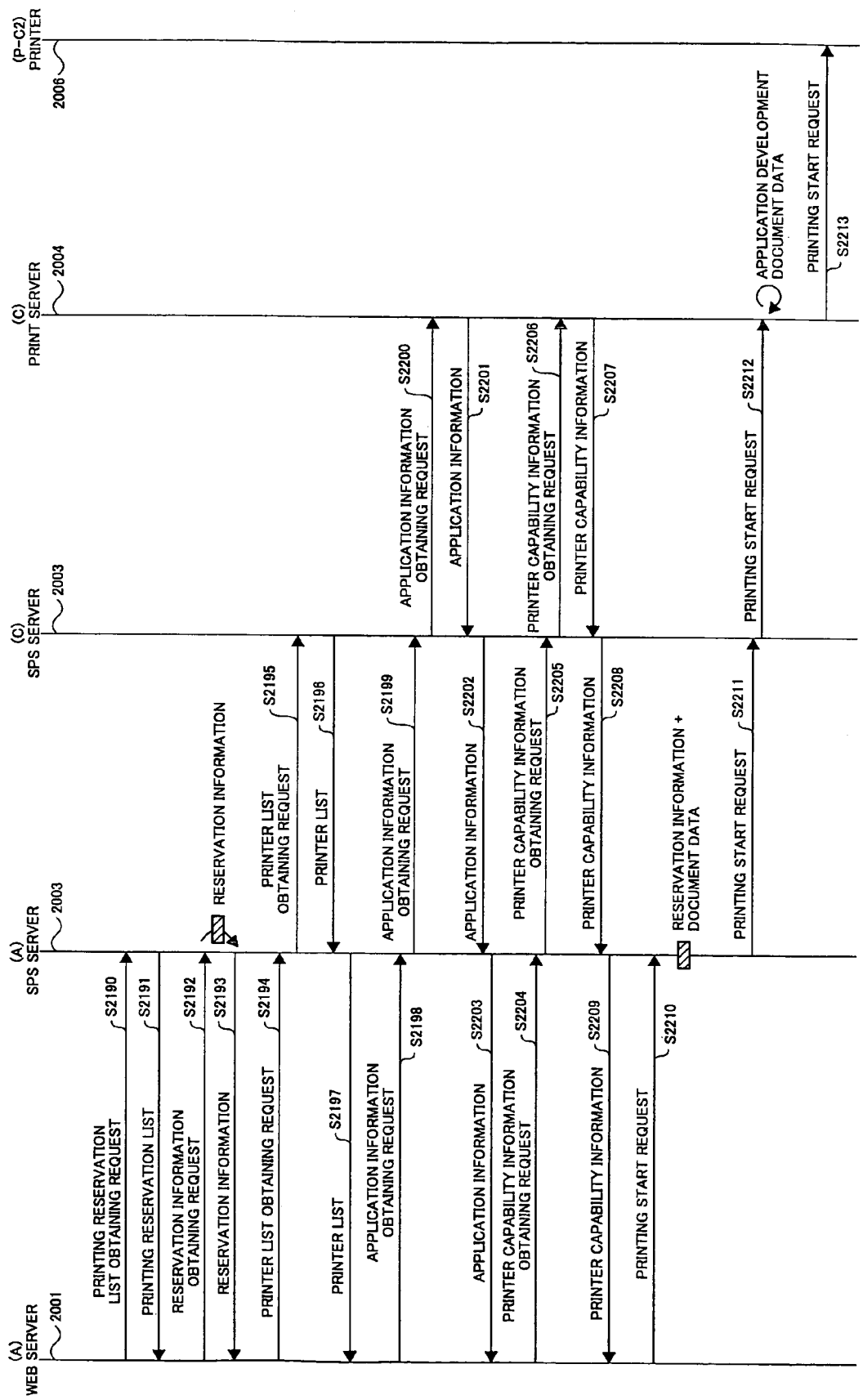

FIG.56A

PRINTING RESERVATION SELECTION SCREEN

- ☑ RESERVATION 1
- ☐ RESERVATION 2
- ☐ RESERVATION 3
- ☐ RESERVATION 4

[CONFIRM RESERVATION] [RETURN]

FIG.56B

PRINTING RESERVATION CONFIRMATION

RESERVATION NAME: RESERVATION 1
(RESERVATION NUMBER: 1234567)
PRINTING DOCUMENT: DOCUMENT 2
RESERVATION DATE: 2002.4.1.10:10
RESERVATION EXPIRY: 2002.4.3.23:59
RESERVATION LOCATION: A
PRINTER LOCATION: C
PRINTER: P-C2
PRINTING CONDITION: UNSPECIFIED

[SET PRINTING CONDITION] [RETURN]

FIG.56C

PRINTING CONDITION SETTING

PAPER SIZE
[A4 ▼]

DIRECTION
[SIDEWAYS ▼]

COLOR/MONO
[COLOR ▼]

DUPLEX
[NO ▼]

[RETURN] [CONFIRM RESERVATION]

FIG.56D

PRINTING CONFIRMATION

RESERVATION NAME: RESERVATION 1
(RESERVATION NUMBER: 1234567)
PRINTING DOCUMENT: DOCUMENT 2
RESERVATION DATE: 2002.4.1.10:10
RESERVATION EXPIRY: 2002.4.3.23:59
RESERVATION LOCATION: A
PRINTER LOCATION: C
PRINTER: P-C2
PRINTING CONDITION: A4, SIDEWAYS, COLOR

[PRINT] [RETURN]

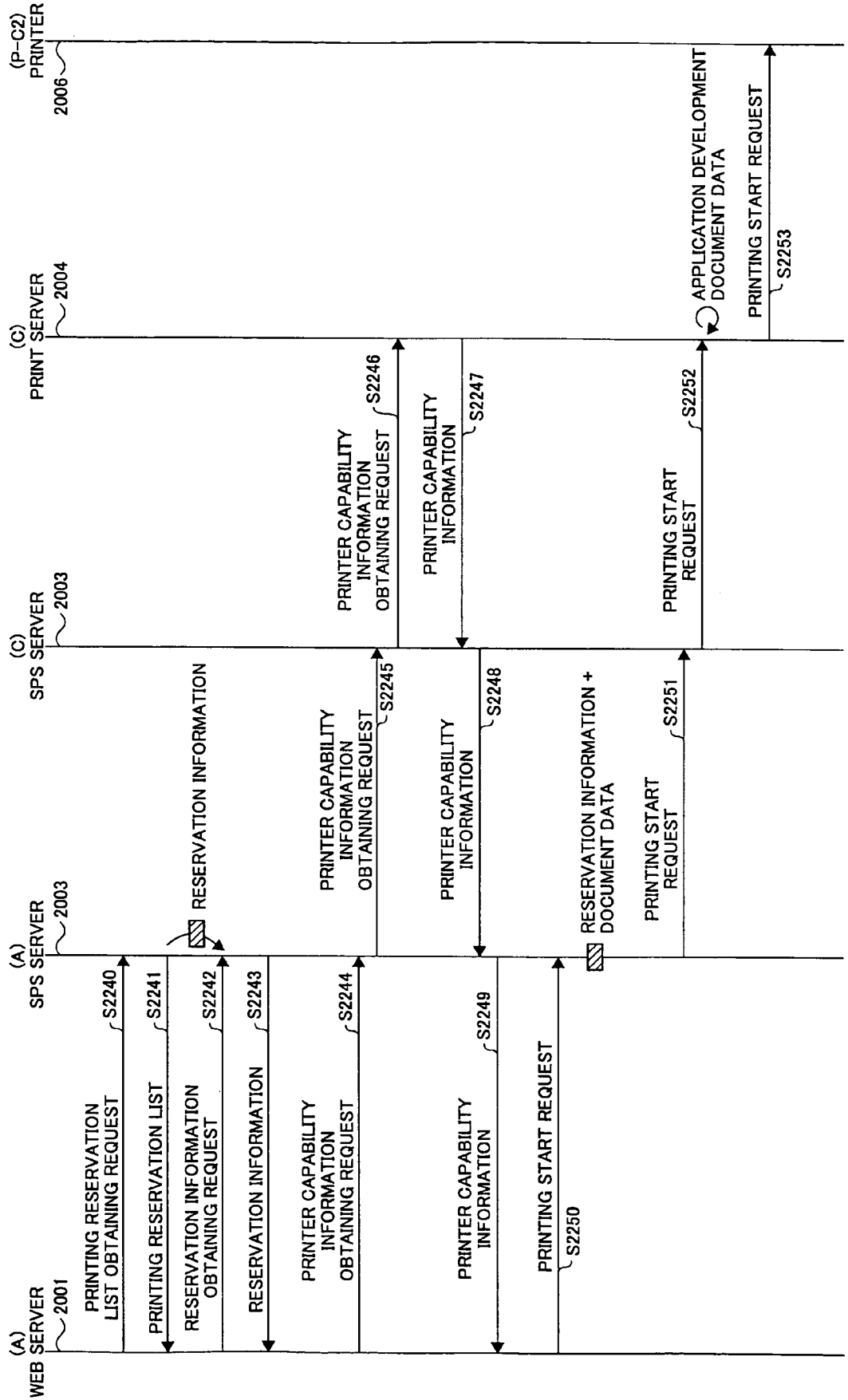

FIG.59A

PRINTING RESERVATION SELECTION SCREEN

☑ RESERVATION 1
☐ RESERVATION 2
☐ RESERVATION 3
☐ RESERVATION 4

[CONFIRM RESERVATION] [RETURN]

FIG.59B

PRINTING CONFIRMATION

RESERVATION NAME: RESERVATION 1
(RESERVATION NUMBER: 1234567)
PRINTING DOCUMENT: DOCUMENT 2
RESERVATION DATE: 2002.4.1.10:10
RESERVATION EXPIRY: 2002.4.3.23:59
RESERVATION LOCATION: C
PRINTER LOCATION: A
PRINTER: P-C2
PRINTING CONDITION: A4, SIDEWAYS, COLOR

[PRINT] [RETURN]

| | |
|---|---|
| SUPERORDINATE | A-1 |
| COORDINATE | NONE |
| SUBORDINATE | A-1-1-1<br>A-1-1-2 |

| DOCUMENT PRINT SERVICE IDENTIFICATION INFORMATION | PRINTER IDENTIFIER | PRINTER NAME |
|---|---|---|
| PS-2, | P12884C:P78961d | P-2-1:P-2-2 |
| ⋮ | | |

FIG.83A

PRINTER SELECTION

○ P-2-1
◉ P-2-2

PREVIOUS  OK ～4200a

FIG.83B

PRINTER SELECTION CONFIRMATION

IS P-2-2 OK AS PRINTER?

～4201a  ～4201b
| RESERVE PRINTING | SET PRINTING CONDITIONS |
| CHANGE PRINTER | DISPLAY SELECTION RESULTS |

FIG.83C

PRINTING RESERVATION CONFIRMATION

RESERVATION NAME: RESERVATION 1
(RESERVATION NO.: 1234567)
RESERVATION DATE AND TIME: 2002.4.1.10:10
RESERVATION EXPIRY DATE AND TIME: 2002.4.3.23:59
RESERVATION LOCATION: A-1-1
PRINTING LOCATION: B-1-2
PRINTER: P-2-2
PRINTING CONDITIONS: UNSPECIFIED

RESERVE    PREVIOUS
～4202a

FIG.85A

PRINTING CONDITION SETTING

PAPER SIZE
[ A4 ▶ ]

PAPER ORIENTATION
[ LANDSCAPE ▶ ]

COLOR/B&W
[ COLOR ▶ ]

DUPLEX
[ NO ▶ ]

NUMBER OF COPIES
[ 5 ]

[ PREVIOUS ]　[ RESERVE PRINTING ] ～4210a

FIG.85B

PRINTING RESERVATION CONFIRMATION

RESERVATION NAME: RESERVATION 1
(RESERVATION NO.: 1234567)
RESERVATION DATE AND TIME: 2002.4.1.10:10
RESERVATION EXPIRY DATE AND TIME: 2002.4.3.23:59
RESERVATION LOCATION: A-1-1
PRINTING LOCATION: B-1-2
PRINTER: P-2-2
PRINTING CONDITION: A4, LANDSCAPE, COLOR, 5

[ RESERVE ]　[ PREVIOUS ] ～4211a

FIG.87A

PRINTING RESERVATION
SELECTION SCREEN

☑ RESERVATION 1
☐ RESERVATION 2
☐ RESERVATION 3
☐ RESERVATION 4

[RESERVATION CONTENTS] — 4220a
[CHANGE RESERVATION]
[PRINT] [PREVIOUS]

FIG.87B

PRINTING RESERVATION CONTENTS DISPLAY

RESERVATION NAME: RESERVATION 1
(RESERVATION NO.: 1234567)
RESERVATION DATE AND TIME: 2002.4.1.10:10
RESERVATION EXPIRY DATE AND TIME: 2002.4.3.23:59
RESERVATION LOCATION: A-1-1
PRINTING LOCATION: B-1-2
PRINTER: P-2-2
PRINTING CONDITION: A4, LANDSCAPE, COLOR, 5

[PRINT] — 4221a
[CHANGE RESERVATION] — 4221b
[PREVIOUS]

FIG.88A

RESERVATION CHANGE

● CHANGE PRINTING LOCATION
○ CHANGE PRINTER
○ CHANGE PRINTING CONDITIONS

[NEXT] [PREVIOUS]
4230a

FIG.88B

PRINTING LOCATION CHANGE

[B-1-2]

● B-1
○ B-1-2-1

4231a
[NEXT] [OK]
[PREVIOUS]

FIG.88C

PRINTING LOCATION CHANGE

[B-1]

● B-1-1
○ B-1-2
○ R-0

4232a
[NEXT] [OK]
[PREVIOUS]

FIG.88D

PRINTING LOCATION CHANGE CONFIRMATION

IS B-1-1 OK AS PRINTING LOCATION? 4233a

| RESERVE PRINTING | SELECT PRINTER |
| CHANGE PRINTING LOCATION | DISPLAY SELECTION RESULTS |

FIG.88E

PRINTER SELECTION

● P-1

4234a
[PREVIOUS] [OK]

FIG.88F

PRINTER SELECTION CONFIRMATION

IS P-1 OK AS PRINTER? 4235a

| RESERVE PRINTING | SET PRINTING CONDITIONS |
| CHANGE PRINTER | DISPLAY SELECTION RESULTS |

FIG.88G

PRINTING CONDITION SETTING

PAPER SIZE
[A4 ▼]

PAPER ORIENTATION
[LANDSCAPE ▼]

COLOR/B&W
[COLOR ▼]

DUPLEX
[NO ▼]

NUMBER OF COPIES
[5]    4236a

[PREVIOUS] [CONFIRM PRINTING RESERVATION]

FIG.88H

PRINTING RESERVATION CONFIRMATION

RESERVATION NAME: RESERVATION 1
(RESERVATION NO.: 2234567)
PRINTING DOCUMENT: DOCUMENT 2
RESERVATION DATE AND TIME: 2002.4.2.10:10
RESERVATION EXPIRY DATE AND TIME: 2002.4.4.23:59
RESERVATION LOCATION: A-1-1
PRINTING LOCATION: B-1-1
PRINTER: P-1
PRINTING CONDITIONS: A4, LANDSCAPE, COLOR, 5

[RESERVE PRINTING] [PREVIOUS]
4237a

FIG.91A

PRINTING RESERVATION SELECTION SCREEN

☑ RESERVATION 1
☐ RESERVATION 2
☐ RESERVATION 3
☐ RESERVATION 4

[RESERVATION CONTENTS] [PRINT] [PREVIOUS]
[CHANGE RESERVATION]

4240a

FIG.91B

PRINTING RESERVATION CONTENTS DISPLAY

RESERVATION NAME: RESERVATION 1
(RESERVATION NO.: 1234567)
RESERVATION DATE AND TIME: 2002.4.1.10:10
RESERVATION EXPIRY DATE AND TIME: 2002.4.3.23:59
RESERVATION LOCATION: A-1-1
PRINTING LOCATION: B-1-1
PRINTER: P-1
PRINTING CONDITION: A4, LANDSCAPE, COLOR, 5

[PRINT] [PREVIOUS]
[CHANGE RESERVATION]

4241a

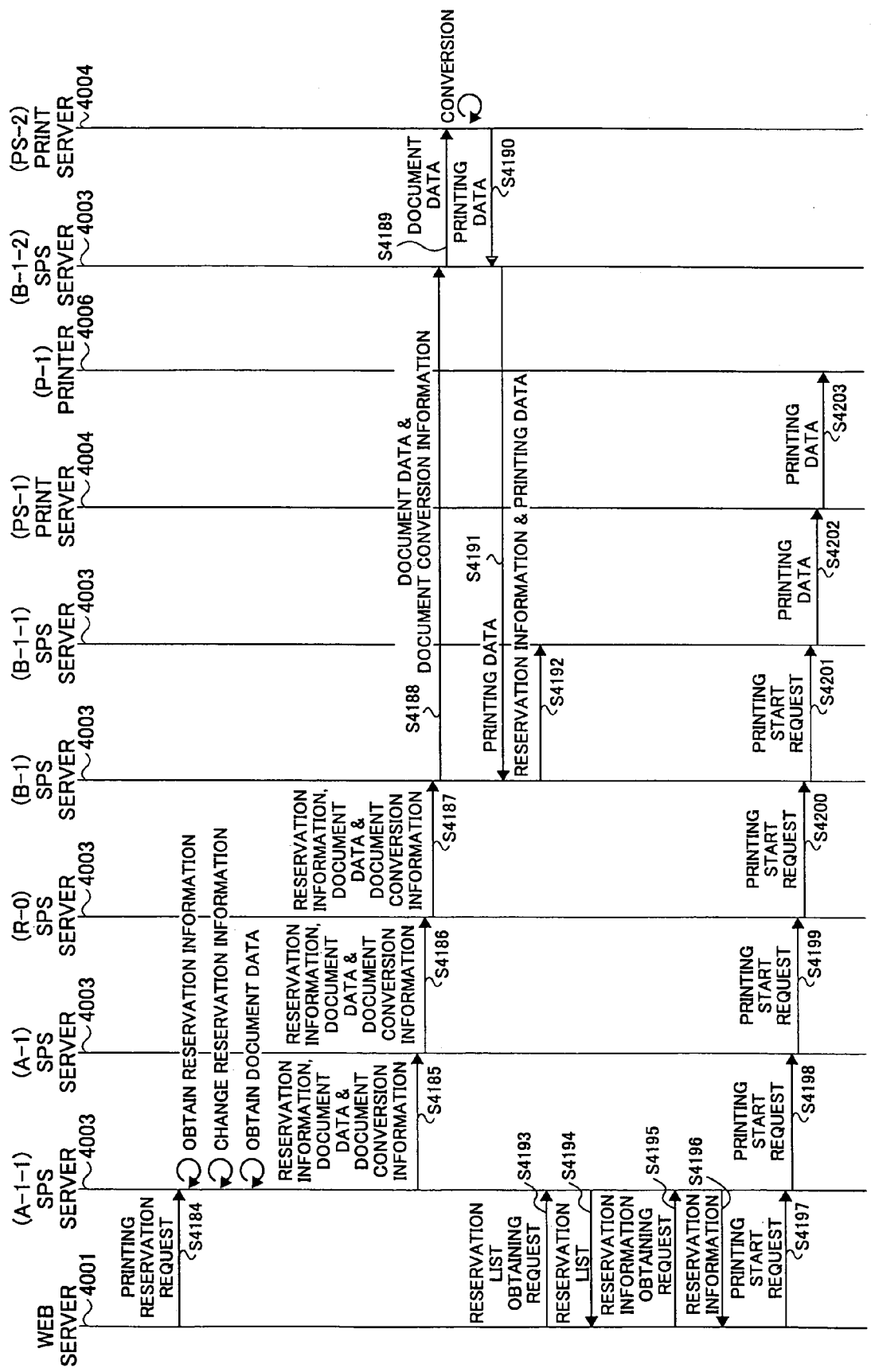

FIG.93A

RESERVATION CHANGE

○ CHANGE PRINTING
　LOCATION

◉ CHANGE PRINTER

○ CHANGE PRINTING
　CONDITIONS

[NEXT] [PREVIOUS]
　⌇
　4250a

FIG.93B

PRINTER CHANGE

[B-1-2]

CURRENTLY
SELECTED PRINTER
P-2-2

◉ P-2-1
○ P-2-2

[OK] [PREVIOUS]

FIG.95A

RESERVATION CHANGE

○ CHANGE PRINTING LOCATION

○ CHANGE PRINTER

⦿ CHANGE PRINTING CONDITIONS

[NEXT] [PREVIOUS]
⌣
4260a

FIG.95B

PRINTING CONDITION CHANGE

PAPER SIZE
[ A4 ▼ ]

PAPER ORIENTATION
[ LANDSCAPE ▼ ]

COLOR/B&W
[ B&W ▼ ]

DUPLEX
[ YES ▼ ]

NUMBER OF COPIES
[ 8 ]

[PREVIOUS] [RESERVE PRINTING]

```
PRINTING RESERVATION
SELECTION SCREEN

B-1-1

● NO RESERVATION

4280a
┌──────────┐ ┌──────────┐
│RESERVATION│ │          │
│INFORMATION│ │ PREVIOUS │
│  SEARCH   │ │          │
└──────────┘ └──────────┘
```

FIG.101B

```
PRINTING RESERVATION
SELECTION SCREEN

☑ RESERVATION 1
☐ RESERVATION 2
☐ RESERVATION 3
☐ RESERVATION 4
         4281a
┌──────────┐ ┌─────┐ ┌────────┐
│RESERVATION│ │PRINT│ │PREVIOUS│
│ CONTENTS │ │     │ │        │
└──────────┘ └─────┘ └────────┘
┌──────────┐
│  CHANGE  │
│RESERVATION│
└──────────┘
```

FIG.101C

```
PRINTING RESERVATION
CONTENTS DISPLAY

RESERVATION NAME: RESERVATION 1
(RESERVATION NO.: 1234567)
RESERVATION DATE AND TIME: 2002.4.1.10:10
RESERVATION EXPIRY DATE AND TIME: 2002.4.3.23:59
RESERVATION LOCATION: A-1-1
PRINTING LOCATION: B-1-2
PRINTER: P-2-2
PRINTING CONDITIONS: A4, LANDSCAPE, COLOR, 5

┌─────┐ ┌────────┐
        │PRINT│ │PREVIOUS│
        └─────┘ └────────┘
4282a  ┌──────────┐
       │  CHANGE  │
       │RESERVATION│
       └──────────┘
```

FIG.101D

```
RESERVATION CHANGE

● CHANGE PRINTING
  LOCATION

○ CHANGE PRINTER

○ CHANGE PRINTING
  CONDITIONS

4283a
      ┌────┐ ┌────────┐
      │NEXT│ │PREVIOUS│
      └────┘ └────────┘
```

FIG.101E

```
PRINTING LOCATION CHANGE

B-1-2

● B-1
○ B-1-2-1

4284a
    ┌────┐ ┌──┐
    │NEXT│ │OK│
    └────┘ └──┘
    ┌────────┐
    │PREVIOUS│
    └────────┘
```

FIG.101F

```
PRINTING LOCATION CHANGE

B-1

○ R-0
● B-1-1
○ B-1-2

4285a
    ┌────┐ ┌──┐
    │NEXT│ │OK│
    └────┘ └──┘
    ┌────────┐
    │PREVIOUS│
    └────────┘
```

FIG.101G

```
PRINTING LOCATION
CHANGE CONFIRMATION

IS B-1-1 OK AS
PRINTING LOCATION?

4286a    4286b
┌────────┐ ┌────────┐
│ CHANGE │ │ SELECT │
│PRINTING│ │PRINTER │
│LOCATION│ │        │
└────────┘ └────────┘
┌────────┐
│DISPLAY │
│SELECTION│
│RESULTS │
└────────┘
```

FIG.101H

```
PRINTER SELECTION

● P-1

┌──┐ ┌────────┐
    │OK│ │PREVIOUS│
    └──┘ └────────┘
```

FIG.104A

PRINTING RESERVATION SELECTION SCREEN

☑ RESERVATION 1
☐ RESERVATION 2
☐ RESERVATION 3
☐ RESERVATION 4

4290a

| RESERVATION CONTENTS | PRINT | PREVIOUS |

| CHANGE RESERVATION |

FIG.104B

PRINTING RESERVATION CONTENTS DISPLAY

RESERVATION NAME: RESERVATION 1
(RESERVATION NO.: 1234567)
RESERVATION DATE AND TIME: 2002.4.1.10:10
RESERVATION EXPIRY DATE AND TIME: 2002.4.3.23:59
RESERVATION LOCATION: A-1-1
PRINTING LOCATION: B-1-2
PRINTER: P-2-2
PRINTING CONDITIONS: A4, LANDSCAPE, COLOR, 5

| PRINT | PREVIOUS |

4291a — | CHANGE RESERVATION |

FIG.104C

RESERVATION CHANGE

● CHANGE PRINTING LOCATION
○ CHANGE PRINTER
○ CHANGE PRINTING CONDITIONS

4292a

| NEXT | PREVIOUS |

FIG.104D

PRINTING LOCATION CHANGE

| B-1-2 |

● B-1
○ B-1-2-1

4293a

| NEXT | OK |
| PREVIOUS |

FIG.104E

PRINTING LOCATION CHANGE

| B-1 |

○ R-0
● B-1-1
○ B-1-2

4294a

| NEXT | OK |
| PREVIOUS |

FIG.104F

PRINTING LOCATION CHANGE CONFIRMATION

IS B-1-1 OK AS PRINTING LOCATION?

4295a  4295b

| CHANGE PRINTING LOCATION | SELECT PRINTER |

| DISPLAY SELECTION RESULTS |

FIG.104G

PRINTER SELECTION

● P-1

| OK | PREVIOUS |

FIG.108A

PRINTING RESERVATION
SELECTION SCREEN

B-1-1

● NO RESERVATION

4310a

| RESERVATION INFORMATION SEARCH | PREVIOUS |

FIG.108B

PRINTING RESERVATION
SELECTION SCREEN

☑ RESERVATION 1
☐ RESERVATION 2
☐ RESERVATION 3
☐ RESERVATION 4

4311a

| RESERVATION CONTENTS | PRINT | PREVIOUS |

| CHANGE RESERVATION |

FIG.108C

PRINTING RESERVATION CONTENTS DISPLAY

RESERVATION NAME: RESERVATION 1
(RESERVATION NO.: 1234567)
RESERVATION DATE AND TIME: 2002.4.1.10:10
RESERVATION EXPIRY DATE AND TIME: 2002.4.3.23:59
RESERVATION LOCATION: A-1-1
PRINTING LOCATION: B-1-2
PRINTER: P-2-2
PRINTING CONDITIONS: A4, LANDSCAPE, COLOR, 5

4312a

| PRINT | PREVIOUS |
| CHANGE RESERVATION | |

FIG.108D

RESERVATION CHANGE

○ CHANGE PRINTING LOCATION
● CHANGE PRINTER
○ CHANGE PRINTING CONDITIONS

4313a

| NEXT | PREVIOUS |

FIG.108E

PRINTER CHANGE

B-1-2

CURRENTLY SELECTED PRINTER
P-2-2

● P-2-1
○ P-2-2

4314a

| OK | PREVIOUS |

FIG.108F

PRINTER CHANGE CONFIRMATION

IS P-2-1 OK AS PRINTER?

4315a

| CHANGE PRINTER | SET PRINTING CONDITIONS |

FIG.112A

PRINTING RESERVATION SELECTION SCREEN

- ☑ RESERVATION 1
- ☐ RESERVATION 2
- ☐ RESERVATION 3
- ☐ RESERVATION 4

4320a

| RESERVATION CONTENTS | PRINT | PREVIOUS |

| CHANGE RESERVATION |

FIG.112B

PRINTING RESERVATION CONTENTS DISPLAY

RESERVATION NAME: RESERVATION 1
(RESERVATION NO.: 1234567)
RESERVATION DATE AND TIME: 2002.4.1.10:10
RESERVATION EXPIRY DATE AND TIME: 2002.4.3.23:59
RESERVATION LOCATION: A-1-1
PRINTING LOCATION: B-1-2
PRINTER: P-2-2
PRINTING CONDITIONS: A4, LANDSCAPE, COLOR, 5

| PRINT | PREVIOUS |

4321a — | CHANGE RESERVATION |

FIG.112D

PRINTER CHANGE

| B-1-2 |

CURRENTLY SELECTED PRINTER
P-2-2

- ● P-2-1
- ○ P-2-2

4323a

| OK | PREVIOUS |

FIG.112C

RESERVATION CHANGE

- ○ CHANGE PRINTING LOCATION
- ● CHANGE PRINTER
- ○ CHANGE PRINTING CONDITIONS

4322a

| NEXT | PREVIOUS |

FIG.112E

PRINTER CHANGE CONFIRMATION

IS P-2-1 OK AS PRINTER?

4324a

| CHANGE PRINTER | SET PRINTING CONDITIONS |

FIG.114A

PRINTING RESERVATION SELECTION SCREEN

- ☑ RESERVATION 1
- ☐ RESERVATION 2
- ☐ RESERVATION 3
- ☐ RESERVATION 4

~4330a

| RESERVATION CONTENTS | PRINT | PREVIOUS |

| CHANGE RESERVATION |

FIG.114B

PRINTING RESERVATION CONTENTS DISPLAY

RESERVATION NAME: RESERVATION 1
(RESERVATION NO.: 1234567)
RESERVATION DATE AND TIME: 2002.4.1.10:10
RESERVATION EXPIRY DATE AND TIME: 2002.4.3.23:59
RESERVATION LOCATION: A-1-1
PRINTING LOCATION: B-1-2
PRINTER: P-2-2
PRINTING CONDITIONS: A4, LANDSCAPE, COLOR, 5

| PRINT | PREVIOUS |

4331a~ | CHANGE RESERVATION |

FIG.114C

RESERVATION CHANGE

- ○ CHANGE PRINTING LOCATION
- ○ CHANGE PRINTER
- ● CHANGE PRINTING CONDITIONS

4332a

| NEXT | PREVIOUS |

FIG.114D

PRINTING CONDITION CHANGE

PAPER SIZE
[ A4 ▼ ]

PAPER ORIENTATION
[ LANDSCAPE ▼ ]

COLOR/B&W
[ COLOR ▼ ]

DUPLEX
[ NO ▼ ]

NUMBER OF COPIES
[ 5 ]

| PREVIOUS | CHANGE PRINTING CONDITIONS |

PRINTING RESERVATION SELECTION SCREEN

B-1-1

● NO RESERVATION

4340a

| RESERVATION INFORMATION SEARCH | PREVIOUS |

FIG.116B

PRINTING RESERVATION SELECTION SCREEN

☑ RESERVATION 1
☐ RESERVATION 2
☐ RESERVATION 3
☐ RESERVATION 4

4341a

| RESERVATION CONTENTS | PRINT | PREVIOUS |

| CHANGE RESERVATION |

FIG.116C

PRINTING RESERVATION CONTENTS DISPLAY

RESERVATION NAME: RESERVATION 1
(RESERVATION NO.: 1234567)
RESERVATION DATE AND TIME: 2002.4.1.10:10
RESERVATION EXPIRY DATE AND TIME: 2002.4.3.23:59
RESERVATION LOCATION: A-1-1
PRINTING LOCATION: B-1-2
PRINTER: P-2-2
PRINTING CONDITIONS: A4, LANDSCAPE, COLOR, 5

| PRINT | PREVIOUS |

| CHANGE RESERVATION |

RESERVATION CHANGE

○ CHANGE PRINTING LOCATION
○ CHANGE PRINTER
● CHANGE PRINTING CONDITIONS

4343a

| NEXT | PREVIOUS |

FIG.116E

PRINTING CONDITION CHANGE

PAPER SIZE: A4 ▶
PAPER ORIENTATION: LANDSCAPE ▶
COLOR/B&W: COLOR ▶
DUPLEX: NO ▶
NUMBER OF COPIES: 5

| PREVIOUS | CHANGE PRINTING CONDITIONS |

PRINTING RESERVATION SELECTION SCREEN

- ☑ RESERVATION 1
- ☐ RESERVATION 2
- ☐ RESERVATION 3
- ☐ RESERVATION 4

/4350a

| RESERVATION CONTENTS | PRINT | PREVIOUS |

| CHANGE RESERVATION |

FIG.120B

PRINTING RESERVATION CONTENTS DISPLAY

RESERVATION NAME: RESERVATION 1
(RESERVATION NO.: 1234567)
RESERVATION DATE AND TIME: 2002.4.1.10:10
RESERVATION EXPIRY DATE AND TIME: 2002.4.3.23:59
RESERVATION LOCATION: A-1-1
PRINTING LOCATION: B-1-2
PRINTER: P-2-2
PRINTING CONDITIONS: A4, LANDSCAPE, COLOR, 5

| PRINT | PREVIOUS |

4351a ~ | CHANGE RESERVATION |

FIG.120D

PRINTING CONDITION CHANGE

PAPER SIZE
[ A4 ▼ ]
PAPER ORIENTATION
[ LANDSCAPE ▼ ]
COLOR/B&W
[ COLOR ▼ ]
DUPLEX
[ NO ▼ ]
NUMBER OF COPIES
[ 5 ]

| PREVIOUS | CHANGE PRINTING CONDITIONS | /4353a

FIG.120C

RESERVATION CHANGE

○ CHANGE PRINTING LOCATION

○ CHANGE PRINTER

● CHANGE PRINTING CONDITIONS

4352a

| NEXT | PREVIOUS |

METHOD AND APPARATUS FOR PROVIDING A SERVICE FOR SHARING A PRINTING ENVIRONMENT

BACKGROUND OF THE INVENTION

1. Field of the Invention

The present invention relates to an apparatus and method for providing a service for sharing a printing environment.

2. Description of the Related Art

In recent years, with an increase in the processing speed of CPUs (central processing units), apparatuses such as notebook personal computers (hereinafter referred to as PCs) including a CPU as a main component have been used more widely. As the PCs have been used more widely, printers for printing documents created by the PCs have also become popular.

In general, in the office, a PC and a printer are connected via a LAN (local area network), and a printer driver for the printer, which is necessary to use the printer, is installed in the PC.

For instance, if the user of the PC participates in a meeting held in an environment different from the user's office, such as another section or another office, the user carries her/his PC to a meeting room, and prints out a document from a printer located near the meeting room.

In another case, the user may store a document that the user has created using her/his own PC in a recording medium such as an FD (Floppy® disk), and carry the FD to the meeting room. Then, the user may print the document using another user's PC located near the meeting room.

Further, a print server may be employed to use a printer of another section. FIG. 1 is a schematic diagram for illustrating a conventional system configuration. Referring to FIG. 1, each of Sections A, B, and C includes a WWW (World Wide Web) server (hereinafter also referred to simply as a Web server) 1, a document storage and management server (hereinafter also referred to as a repository server) 2, a print server 4, and printers 6, which are connected via a LAN. The apparatuses of different sections are connected via the Internet with firewalls (FWs) interposed therebetween.

In FIG. 1, each repository server 2 includes a repository service (RS) 12 that provides a document storage and/or management-related service. Each print server 4 includes a document print service 14 that provides a printing-related service.

According to the system configuration of FIG. 1, a person in Section A, for instance, may use the printers 6 of Section B (P-B1 and P-B2) and the printers 6 of Section C (P-C1 and P-C2) using the print server 4 (PS-A).

Further, a system regarding a printing service using a network is disclosed in, for instance, Japanese Laid-Open Patent Application No. 2003-015848 (JP2003-015848).

According to JP2003-015848, a server receives user information and information on a desired printing location from a terminal, and retrieves printers close to the desired printing location. Then, the server returns the candidate printers to the terminal, so that a user selects one of the candidate printers using the terminal. The user transmits printing data to the server, and the server transmits the transmitted printing data to the selected printer.

However, in the above-described case where a user carries her/his PC to a meeting location, there is the trouble of carrying a heavy PC, and there is a concern about battery duration.

Further, there is a problem in that the user has to make various settings in order to connect the carried PC to a printer near the meeting location and/or to a LAN to which the printer is connected.

There is another problem in that the user has to have a printer driver for the printer installed in her/his PC in order to use the printer.

The user has to go through these troublesome work processes before the user can construct a printing environment usable then and there. Therefore, it is not easy to make printing performable.

Further, in the above-described case of carrying a recording medium, there is a problem in that the user may not be able to print a document if the user creates the document with her/his own PC using a special application. This is because the application may not be installed in another user's PC that the user uses to print the document.

In the system configuration of FIG. 1, there is a problem in that in order for a person in Section A to use the printers 6 of Section B (P-B1 and P-B2) and the printers 6 of Section C (P-C1 and P-C2) using the print server 4 (PS-A), information specifying the printers 6 of Section B (P-B1 and P-B2) and the printers 6 of Section C (P-C1 and P-C2), such as their IP addresses and printer names, should be set in the print server 4 (PS-A).

In addition, the printer drivers of the printers 6 of Sections B and C should be installed and information on the printer drivers should be set in the print server 4 so that a person in Section A can use the printers 6 of Sections B and C.

Therefore, according to the conventional system as shown in FIG. 1, if a new printer is added to another section (for instance, Section B), information specifying the newly added printer and information on the printer driver of the newly added printer should be set in the print server 4 of Section A so that a person in Section A can use the newly added printer. Further, if information specifying a printer, such as an IP address, is changed because of a layout change in another section (for instance, Section B), the settings in Section A should also be changed. Thus, information on changes should be exchanged among sections. For this and other reasons, as the system expands, information to be managed increases, so that there is a problem in that actual system implementation is difficult.

Further, according to the conventional system as shown in FIG. 1, the multiple printers 6 of the other sections (Section B and C) are connected to the single print server 4 (PS-A) of Section A, for instance. Therefore, as many communication channels as the number of available printers 6 of the other sections exist between the print server 4 (PS-A) and the available printers 6 of the other sections. On the other hand, the security of the communication channels should be protected communication channel by communication channel. Accordingly, there is also a problem in terms of security.

Further, according to the above-described system of JP2003-015848, as the system expands, the number of managed printers also increases to adversely affect retrieval speed. Further, changes in printer locations or installation of a new printer due to a layout change or shop relocation requires modification of or addition to data (for instance, information on printer addresses, printer names, and printer drivers) in a server. Thus, there is a problem in that actual system implementation is difficult.

Further, according to the above-described system of JP2003-015848, there is a problem in that even when a printer has failed or is occupied by another person printing out hundreds of sheets of paper, it is not easy to change the printer and perform printing using another printer.

SUMMARY OF THE INVENTION

Accordingly, it is a general object of the present invention to provide an apparatus and method for providing a service for sharing a printing environment in which the above-described disadvantages are eliminated.

A more specific object of the present invention is to provide an apparatus and method for providing a service for sharing a printing environment that allows a specified document to be printed out immediately at a specified printing location.

The above objects of the present invention are achieved by a method of providing a service for sharing a printing environment using a plurality of service providing apparatuses connected via a network, the method including the steps of: (a) a first service providing apparatus managing service data including data on a hierarchical relationship between the first service providing apparatus and second and third service providing apparatuses connected thereto; and (b) the first service providing apparatus transferring at least one of information on printing reservation and data to the second service providing apparatus in response to a request from the third service providing apparatus.

The above objects of the present invention are also achieved by a method of providing a service for sharing a printing environment using a plurality of service providing apparatuses connected via a network, the method including the steps of: (a) a first service providing apparatus obtaining information on an application for a document in response to a first request from a second service providing apparatus; and (b) the first service providing apparatus transferring at least one of information on printing reservation and data to a third service providing apparatus in response to a second request from the second service providing apparatus.

The above objects of the present invention are also achieved by a method of providing a service for sharing a printing environment using a plurality of service providing apparatuses connected via a network, the method including the steps of: (a) a first service providing apparatus obtaining printing capability information of a printing apparatus in response to a first request from a second service providing apparatus; and (b) the first service providing apparatus transferring at least one of information on printing reservation and data to a third service providing apparatus in response to a second request from the second service providing apparatus.

The above objects of the present invention are also achieved by a computer-readable recording medium storing a program for causing a computer to execute a method of providing a service for sharing a printing environment using a plurality of service providing apparatuses connected via a network, the method including the steps of: (a) a first service providing apparatus obtaining information on an application for a document in response to a first request from a second service providing apparatus; and (b) the first service providing apparatus transferring at least one of information on printing reservation and data to a third service providing apparatus in response to a second request from the second service providing apparatus.

The above objects of the present invention are also achieved by a computer-readable recording medium storing a program for causing a computer to execute a method of providing a service for sharing a printing environment using a plurality of service providing apparatuses connected via a network, the method including the steps of: (a) a first service providing apparatus obtaining printing capability information of a printing apparatus in response to a request from a second service providing apparatus; and (b) the first service providing apparatus transferring at least one of information on printing reservation and data to a third service providing apparatus in response to a second request from the second service providing apparatus.

The above objects of the present invention are also achieved by an apparatus for providing a service for sharing a printing environment, including: a service providing part configured to provide the service, the service providing part including: an application information obtaining part configured to obtain information on an application for a document in response to a first request from a service providing part of a first one of other apparatuses for providing the service for sharing the printing environment; and a transfer part configured to transfer at least one of information on printing reservation and data to a service providing part of a second one of the other apparatuses in response to a second request from the service providing part of the first one of the other apparatuses.

The above objects of the present invention are also achieved by an apparatus for providing a service for sharing a printing environment, including: a service providing part configured to provide the service, the service providing part including: an information obtaining part configured to obtain printing capability information of a printing apparatus in response to a first request from a service providing part of a first one of other apparatuses for providing the service for sharing the printing environment; and a transfer part configured to transfer at least one of information on printing reservation and data to a service providing part of a second one of the other apparatuses in response to a second request from the service providing part of the first one of the other apparatuses.

The above objects of the present invention are also achieved by a method of providing a service for sharing a printing environment using a plurality of service providing apparatuses connected via a network, the method including the steps of: (a) a first service providing apparatus transferring at least one of reservation information pertaining to a printing reservation and document data to a second service providing apparatus in response to a request; and (b) the first service providing apparatus storing the at least one of reservation information and document data based on storage location information included in the reservation information.

The above objects of the present invention are also achieved by a computer-readable recording medium storing a program for causing a computer to execute a method of providing a service for sharing a printing environment using a plurality of service providing apparatuses connected via a network, the method including the steps of: (a) a first service providing apparatus transferring at least one of reservation information pertaining to a printing reservation and document data to a second service providing apparatus in response to a request; and (b) the first service providing apparatus storing the at least one of reservation information and document data based on storage location information included in the reservation information.

The above objects of the present invention are also achieved by an apparatus for providing a service for sharing a printing environment, including: a service providing part configured to provide the service, the service providing part including: a transfer part configured to transfer at least one of reservation information pertaining to a printing reservation and document data to a counterpart service providing part of a counterpart service providing apparatus in response to a request; and a storage part configured to store the at least one of reservation information and document data based on storage location information included in the reservation information.

The above objects of the present invention are also achieved by a method of providing a service for sharing a printing environment using a plurality of service providing apparatuses connected via a network, the method including the steps of: (a) a first service providing apparatus transferring at least one of reservation information concerning printing reservation and document data to a second service providing apparatus in response to a request from a third service providing apparatus; (b) the first service providing apparatus obtaining the reservation information; and (c) the first service providing apparatus changing contents of the reservation information.

The above objects of the present invention are also achieved by a computer-readable recording medium storing a program for causing a computer to execute a method of providing a service for sharing a printing environment using a plurality of service providing apparatuses connected via a network, the method including the steps of: (a) a first service providing apparatus transferring at least one of reservation information concerning printing reservation and document data to a second service providing apparatus in response to a request from a third service providing apparatus; (b) the first service providing apparatus obtaining the reservation information; and (c) the first service providing apparatus changing contents of the reservation information.

The above objects of the present invention are also achieved by an apparatus for providing a service for sharing a printing environment, including: a service providing part configured to provide the service, the service providing part including: a transfer part configured to transfer at least one of reservation information concerning printing reservation and document data to a service providing part of a first one of other apparatuses for providing the service for sharing the printing environment in response to a request from a service providing part of a second one of the other apparatuses; a reservation information obtaining part configured to obtain the reservation information; and a changing part configured to change contents of the reservation information.

BRIEF DESCRIPTION OF THE DRAWINGS

Other objects, features and advantages of the present invention will become more apparent from the following detailed description when read in conjunction with the accompanying drawings, in which:

FIGS. 10A through 10D are diagrams for illustrating a first printing location search operation according to the first embodiment of the present invention;

FIG. 18 is a diagram for illustrating a configuration of a printer list according to the first embodiment of the present invention;

FIGS. 19A through 19C are diagrams for illustrating a printer selecting operation according to the first embodiment of the present invention;

FIGS. 21A and 21B are diagrams for illustrating a printing condition setting operation according to the first embodiment of the present invention;

FIGS. 23A and 23B are diagrams for illustrating the start of printing according to the first embodiment of the present invention;

FIGS. 24A through 24C are sequence diagrams for illustrating a second operation of requesting a printing reservation and a printing start according to the first embodiment of the present invention;

FIGS. 29A through 29C are diagrams for illustrating a sixth printing location search operation according to the first embodiment of the present invention;

FIGS. 38A through 38D are diagrams illustrating a document selection process according to the third embodiment;

FIG. 39 is a sequence diagram illustrating a first exemplary process of selecting a document in making a printing reservation according to the third embodiment;

FIGS. 41A through 41C are diagrams illustrating a printing location selection process according to the third embodiment;

FIG. 42 is a sequence diagram illustrating a first exemplary process of selecting a document and a printing location in making a printing reservation according to the third embodiment;

FIGS. 44A through 44C are diagrams illustrating a printer selection process according to the third embodiment;

FIGS. 47A and 47B are diagrams illustrating a printing condition setting process according to the third embodiment;

FIGS. 50A through 50H are diagrams illustrating first exemplary stages of a printing start operation from printing reservation confirmation to printing execution according to the third embodiment;

FIGS. 53A through 53F are diagrams illustrating second exemplary stages of a printing start operation from printing reservation confirmation to printing execution according to the third embodiment;

FIG. 55 is a sequence diagram illustrating a second exemplary printing start operation in a case where a document and a printing location are selected in a printing reservation according to the third embodiment;

FIGS. 56A through 56D are diagrams illustrating third exemplary stages of a printing start operation from printing reservation confirmation to printing execution according to the third embodiment;

FIG. 58 is a sequence diagram illustrating a second exemplary printing start operation in a case where a document, a printing location, and a printer are selected in a printing reservation according to the third embodiment;

FIGS. 59A and 59B are diagrams illustrating fourth exemplary stages of a printing start operation from printing reservation confirmation to printing execution according to the third embodiment;

FIG. 63 is a diagram showing an example of a service list according to the third embodiment;

FIGS. 64A through 64D are diagrams illustrating a printing location designation process according to the third embodiment;

FIG. 82 is a diagram for illustrating a configuration of a printer list according to the fifth embodiment of the present invention;

FIGS. 83A through 83C are diagrams for illustrating a printer selecting operation according to the fifth embodiment of the present invention;

FIGS. 85A and 85B are diagrams for illustrating a printing condition setting operation according to the fifth embodiment of the present invention;

FIGS. 87A and 87B are diagrams for illustrating the start of printing according to the fifth embodiment of the present invention;

FIGS. 88A through 88H are diagrams for illustrating the changing of a printing location according to the fifth embodiment of the present invention;

FIGS. 91A and 91B are diagrams for illustrating the start of printing according to the fifth embodiment of the present invention;

FIGS. 92A through 92C are sequence diagrams for illustrating another operation at the time of changing a printing reservation according to the fifth embodiment of the present invention;

FIGS. 93A and 93B are diagrams for illustrating a first printer changing operation according to the fifth embodiment of the present invention;

FIGS. 95A and 95B are diagrams for illustrating a first printing condition changing operation according to the fifth embodiment of the present invention;

FIGS. 99A through 99G are diagrams for illustrating a second printing location changing operation according to the sixth embodiment of the present invention;

FIGS. 101A through 101H are diagrams for illustrating third and fourth printing location changing operations according to the sixth embodiment of the present invention;

FIGS. 104A through 104G are diagrams for illustrating a fifth printing location changing operation according to the sixth embodiment of the present invention;

FIGS. 108A through 108F are diagrams for illustrating third through fifth printer changing operations according to the sixth embodiment of the present invention;

FIGS. 112A through 112E are diagrams for illustrating a sixth printer changing operation according to the sixth embodiment of the present invention;

FIGS. 114A through 114D are diagrams for illustrating a second printing condition changing operation according to the sixth embodiment of the present invention;

FIGS. 116A through 116E are diagrams for illustrating third through fifth printing condition changing operations according to the sixth embodiment of the present invention;

FIG. 119 is a sequence diagram for illustrating the fifth printing condition changing operation according to the sixth embodiment of the present invention;

FIGS. 120A through 120D are diagrams for illustrating a sixth printing condition changing operation according to the sixth embodiment of the present invention;

FIG. 121 is a sequence diagram for illustrating the sixth printing condition changing operation according to the sixth embodiment of the present invention;

FIG. 122 is a block diagram showing a functional configuration of a multi-function apparatus according to a seventh embodiment of the present invention; and FIG. 123 is a block diagram showing a hardware configuration of the multi-function apparatus according to the seventh embodiment of the present invention.

DETAILED DESCRIPTION OF THE PREFERRED EMBODIMENTS

Figure 1:
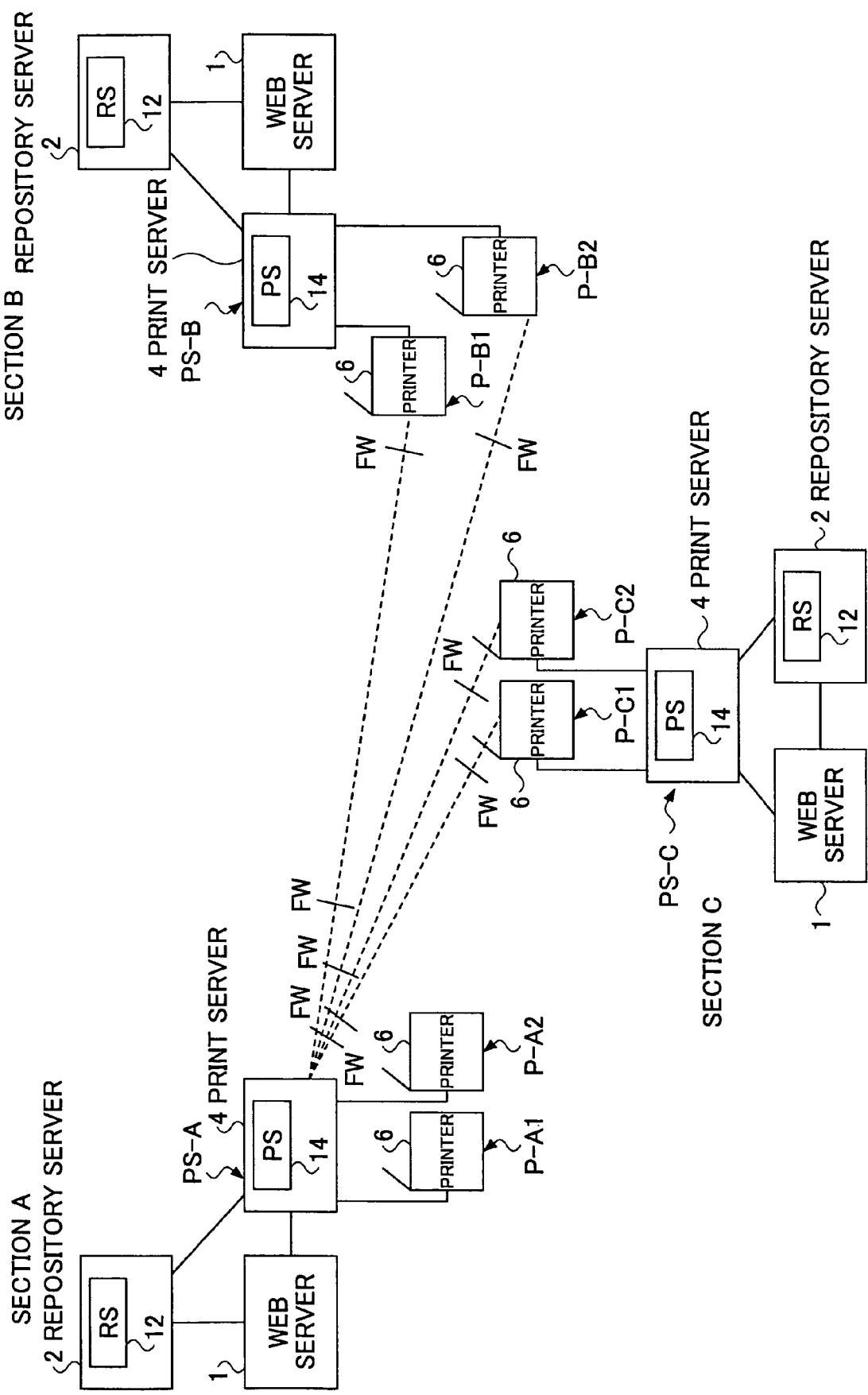
FIG. 1 is a schematic diagram for illustrating a conventional system configuration.

A description is given below, with reference to the accompanying drawings, of embodiments of the present invention. In the following description, the same elements as those of FIG. 1 are referred to by the same numerals.

First Embodiment

Figure 2:
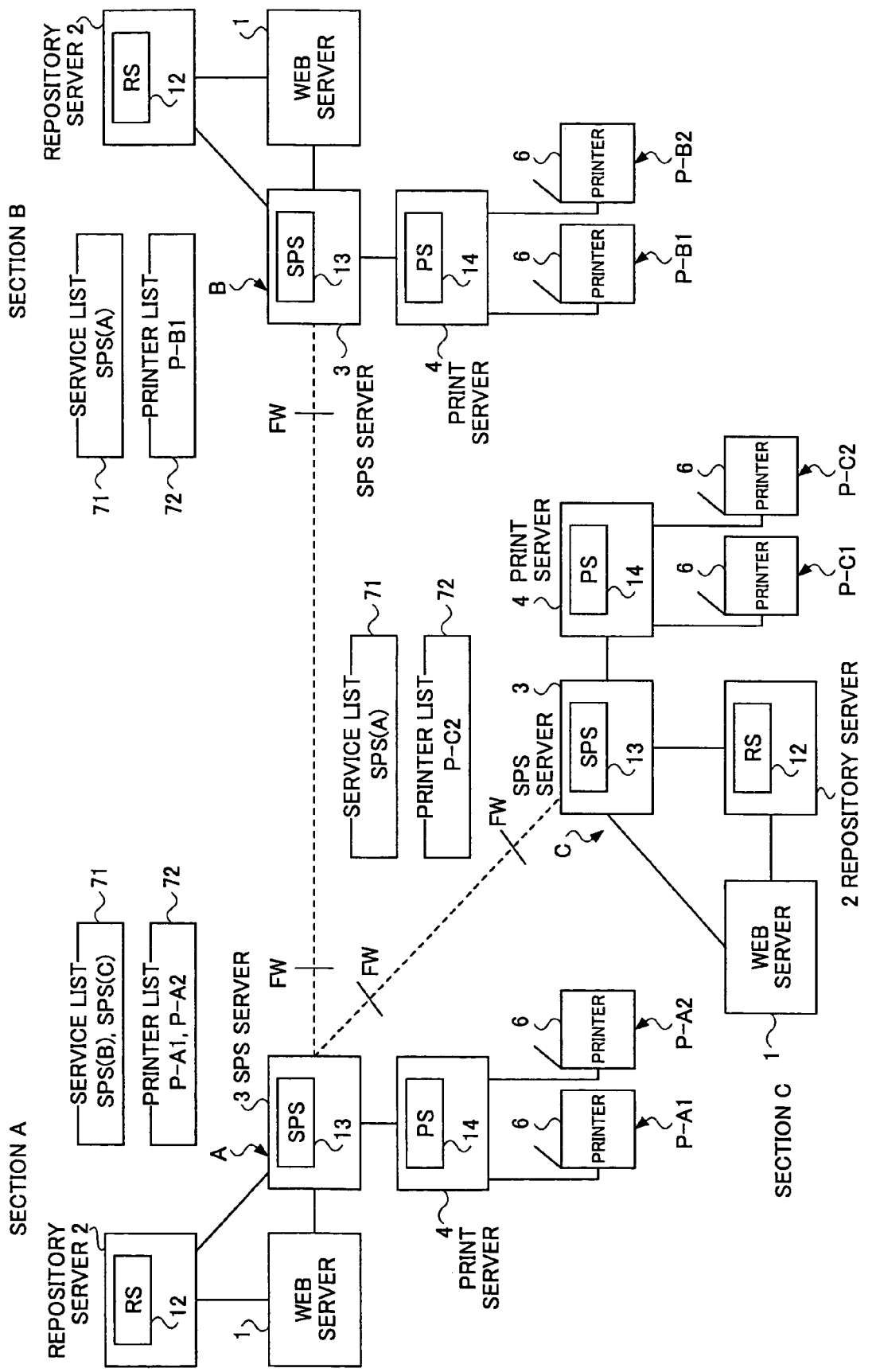
FIG. 2 is a block diagram showing a system configuration according to a first embodiment of the present invention.

FIG. 2 is a block diagram showing a system configuration according to a first embodiment of the present invention. According to the system configuration of FIG. 2, each of Sections A, B, and C includes the Web server 1, the repository server 2, a share print service (SPS) server 3, the print server 4, and the printers 6. In each section, the servers 1 through 4 and the printers 6 are managed and used in order as a printing environment.

Referring to FIG. 2, each repository server 2 includes the repository service 12, each SPS server 3 includes a printing environment sharing service (referred to as an SPS in the drawings) 13, and each print server 4 includes the document print service 14.

The services 12 through 14 can use one another's functions by exchanging messages based on the SOAP (Simple Object Access Protocol) protocol with one another. The same applies in the following.

In contrast to the system configuration of FIG. 1, the system configuration of FIG. 2, by newly introducing the SPS servers 3, can, for instance, set identification information specifying the printing environment sharing service 13 of one section with which communications are performable, such as the service identification information of the printing environment sharing service 13, in a service list 71 of the SPS server 3 of another section. As a result, the SPS servers 3 and/or the printing environment sharing services 13 of the two sections can share the printing environments (the print servers 4 and the printers 6) thereof, so that the two sections can use each other's printing environments.

Further, as shown in FIG. 2, in each section, its printers 6 usable by the SPS server 3 and/or the printing environment sharing service 13 of another section may be set in a printer list 72 in the SPS server 3 and managed. As a result, the printing environments can be managed in a distributed manner in each section without being affected by changes in another section, such as changes in the printers 6 or printer drivers.

Further, in contrast to the system configuration of FIG. 1, in the system configuration of FIG. 2, the SPS servers 3 and/or the printing environment sharing services 13 that can perform communications are connected. This reduces the number of communication channels between sections, so that a reduced number of communication channels are exposed to attacks. Accordingly, security can be ensured.

Figure 3:
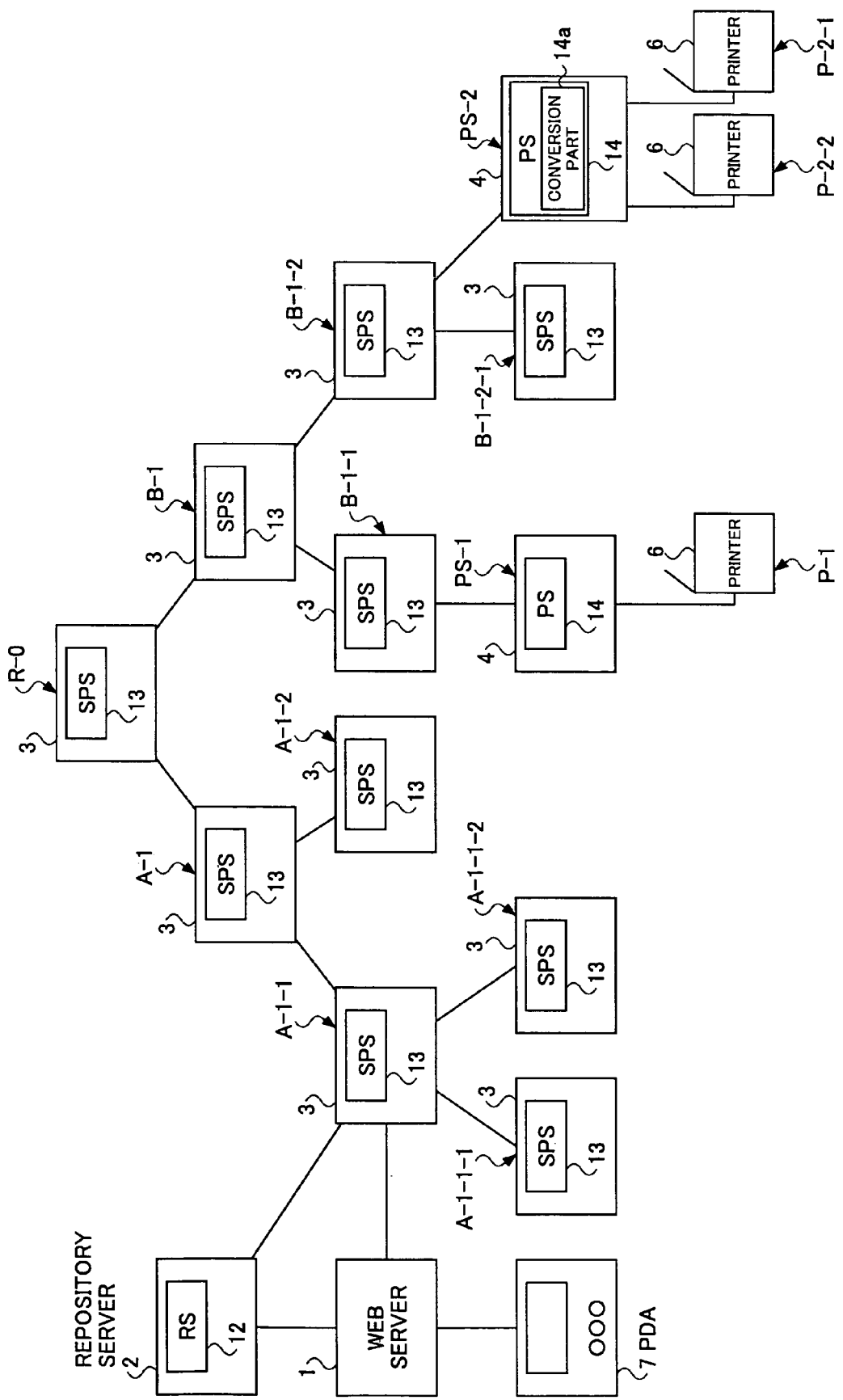
FIG. 3 is a block diagram showing another system configuration according to the first embodiment of the present invention.

FIG. 3 is a block diagram showing another system configuration according to the first embodiment of the present invention. The system configuration of FIG. 3 includes the Web server 1, the repository server 2, the SPS servers 3, the print servers 4, the printers 6, and a PDA (Personal Digital Assistant) 7.

Referring to FIG. 3, the repository server 2 includes the repository service 12, each SPS server 3 includes the printing environment sharing service 13, and each print server 4 includes the document print service 14.

Referring to FIG. 3, the Web server 1, the repository server 2, the SPS servers 3, the print servers 4, the printers 6, and the PDA 7 are connected via a LAN and/or the Internet.

A user enters a username and a password using the PDA 7 to log on to the Web server 1. Then, using services provided by the printing environment sharing services 13, the user specifies a printing location (for instance, the printing environment sharing service 13 [B-1-2]), a printer to be used for printing (for instance, the printer 6 [P-2-2]), printing conditions (for instance, A4 size and color) and a document for which a reservation for printing is to be made, and makes a request for printing reservation (a printing reservation request). In the case of selecting a printing location, the user may select, for instance, a prefecture name, a city name, an office name, or a section name correlated with the SPS server 3 or the printing environment sharing service 13, which are easy for the user to understand, instead of directly selecting the SPS server 3 or the printing environment sharing service 13. The same applies in the following.

As described below, when the user specifies a printing location, the printing environment sharing service 13 obtains information on the communication channel up to the printing location specified by the user (in this case, the printing environment sharing service 13 [B-1-2]). Hereinafter, this information may be referred to as channel information.

For instance, the printing environment sharing service 13 (A-1-1), in response to a search request from the Web server 1, obtains the channel information to the printing environment sharing service 13 (B-1-2), which is the printing location specified by the user, as (A-1-1)→(A-1)→(R-0)→(B-1)→(B-1-2), and provides the obtained channel information to the Web server 1.

Figure 9:
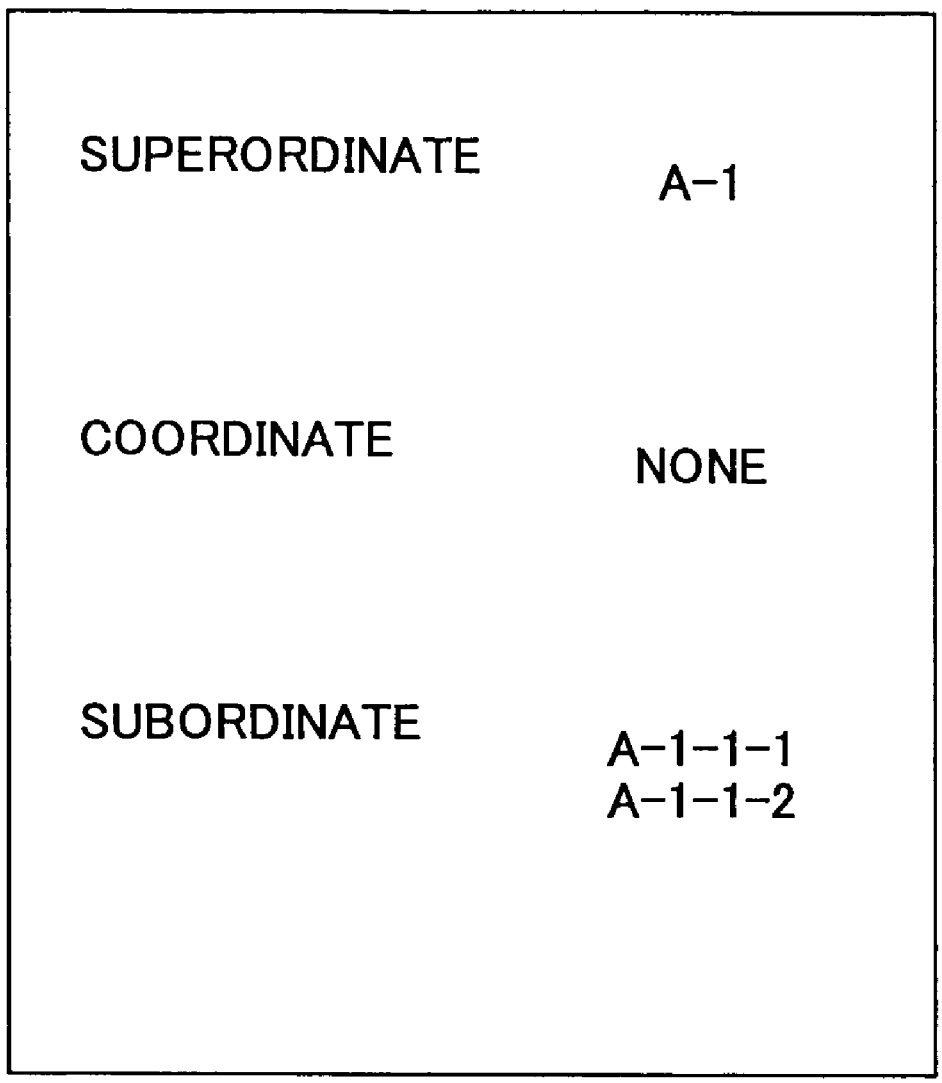
FIG. 9 is a diagram showing a configuration of a service list according to the first embodiment of the present invention.

The channel information can be obtained using the service lists 71. For instance, when the user selects "A-1" on a printing location selection screen as shown below in FIG. 7A using the PDA 7, the Web server 1 recognizes from the obtained service list 71 of the printing environment sharing service 13 (A-1-1) as shown in FIG. 9 that the printing environment sharing service 13 (A-1) is superordinate to the printing environment sharing service 13 (A-1-1). Then, the Web server 1 obtains information on the channel from the printing environment sharing service 13 (A-1-1) to the printing environment sharing service 13 (A-1), such as the name, latitude, longitude, altitude, address, and URI (uniform resource identifier) of the location of the printing environment sharing service 13 (A-1). Using the obtained information as channel information, the Web server 1 adds the channel information from the printing environment sharing service 13 (A-1-1) to the printing environment sharing service 13 (A-1) to the channel information from the Web server 1 to the printing environment sharing service 13 (A-1-1), and includes the obtained channel information in a request to obtain the service list 71 of the printing environment sharing service 13 (A-1). Thereafter, the Web server 1 and/or the printing environment sharing services 13 obtain service lists 71 in the same manner as described above so that the channel information to, for instance, a printing location selected by the user can be obtained.

When the printing environment sharing service 13 (A-1-1) receives the request for printing reservation from the user via the Web server 1, the printing environment sharing service 13 (A-1-1), using a document identifier (for instance, a document ID or a document name) and document usage authorization information included in the request, transmits to the repository service 12 of the repository server 2 a request to obtain the document specified by the document identifier, and obtains the document data stored in the repository server 2 via the repository service 12.

Based on the channel information included in the request for printing reservation, the printing environment sharing service 13 (A-1-1) transfers the obtained document data to the printing environment sharing service 13 (A-1) together with reservation information including the channel information, identification information identifying the printing location (for instance, the service identification information of the printing environment sharing service 13 [B-1-2]), identification information identifying the printer 6 to be used for printing (for instance, a printer name and/or a printer ID), and the printing conditions.

Receiving the reservation information and the document data from the printing environment sharing service 13 (A-1-1), the printing environment sharing service 13 (A-1) transfers the reservation information and the document data to the printing environment sharing service 13 (R-0) based on the channel information included in the reservation information.

Receiving the reservation information and the document data from the printing environment sharing service 13 (A-1), the printing environment sharing service 13 (R-0) transfers the reservation information and the document data to the printing environment sharing service 13 (B-1) based on the channel information included in the reservation information.

Likewise, receiving the reservation information and the document data from the printing environment sharing service 13 (R-0), the printing environment sharing service 13 (B-1) transfers the reservation information and the document data to the printing environment sharing service 13 (B-1-2) based on the channel information included in the reservation information.

Receiving the transferred reservation information and document data, the printing environment sharing service 13 (B-1-2) stores the reservation information and the document data in a below-described hard disk drive (HDD) 39 (FIG. 5) in the SPS server 3 (B-1-2).

On the other hand, for instance, the user visits the printing location, and requests the printing environment sharing service 13 (A-1-1) to start to print the document for which the printing reservation has been made. Receiving the request to start printing (printing start request), the printing environment sharing service 13 (A-1-1) transmits the printing start request to the printing environment sharing service 13 (A-1) based on the channel information to the printing environment sharing service 13 (B-1-2) of the printing location included in the printing start request.

Receiving the printing start request from the printing environment sharing service 13 (A-1-1), the printing environment sharing service 13 (A-1) transmits the printing start request to the printing environment sharing service 13 (R-0) based on the channel information included in the printing start request.

Receiving the printing start request from the printing environment sharing service 13 (A-1), the printing environment sharing service 13 (R-0) transmits the printing start request to the printing environment sharing service 13 (B-1) based on the channel information included in the printing start request.

Likewise, receiving the printing start request from the printing environment sharing service 13 (R-0), the printing environment sharing service 13 (B-1) transmits the printing start request to the printing environment sharing service 13 (B-1-2) based on the channel information included in the printing start request.

Receiving the printing start request, the printing environment sharing service 13 (B-1-2) transmits the stored reservation information and document data to the document print service 14 of the print server 4 (PS-2), and makes a request to print the document data based on the printing conditions included in the reservation information.

When the document print service 14 (PS-2) receives the request to print the document data, a conversion part 14*a* (FIG. 3) of the document print service 14 (PS-2) converts the document data into printing data printable on the printer 6 (P-2-2) included in the reservation information, and requests the printer 6 (P-2-2) to print the printing data based on the printing conditions. For simplification, in the following description, the document print service 14, instead of its conversion part 14*a*, is described as converting document data into printing data.

Receiving the request to print the printing data from the document print service 14 (PS-2), the printer 6 (P-2-2) performs printing based on the request.

As described above, by making a reservation for printing, transferring reservation information and document data between the printing environment sharing services 13, and printing a document based on a request for printing, a user can use, for instance, an orderly printing environment of another section or office that is allowed to be shared. Accordingly, the user can print a document immediately in a different printing environment without making an effort to construct a new printing environment.

Using the service lists 71, the printing environment sharing services 13 can construct a system having a tree structure as shown in FIG. 3, for instance.

Each SPS server 3 with the printing environment sharing service 13 may store the service list 71. Alternatively, the service lists 71 corresponding to the SPS servers 3 may be stored collectively in another apparatus or separately in other apparatuses.

In the following description, it is assumed that the service list 71 is stored in each SPS server 3 with the printing environment sharing service 13 for simplification.

A user terminal used by a user is not limited to the PDA 7, and may be other portable terminals such as a cellular phone.

Figure 4:
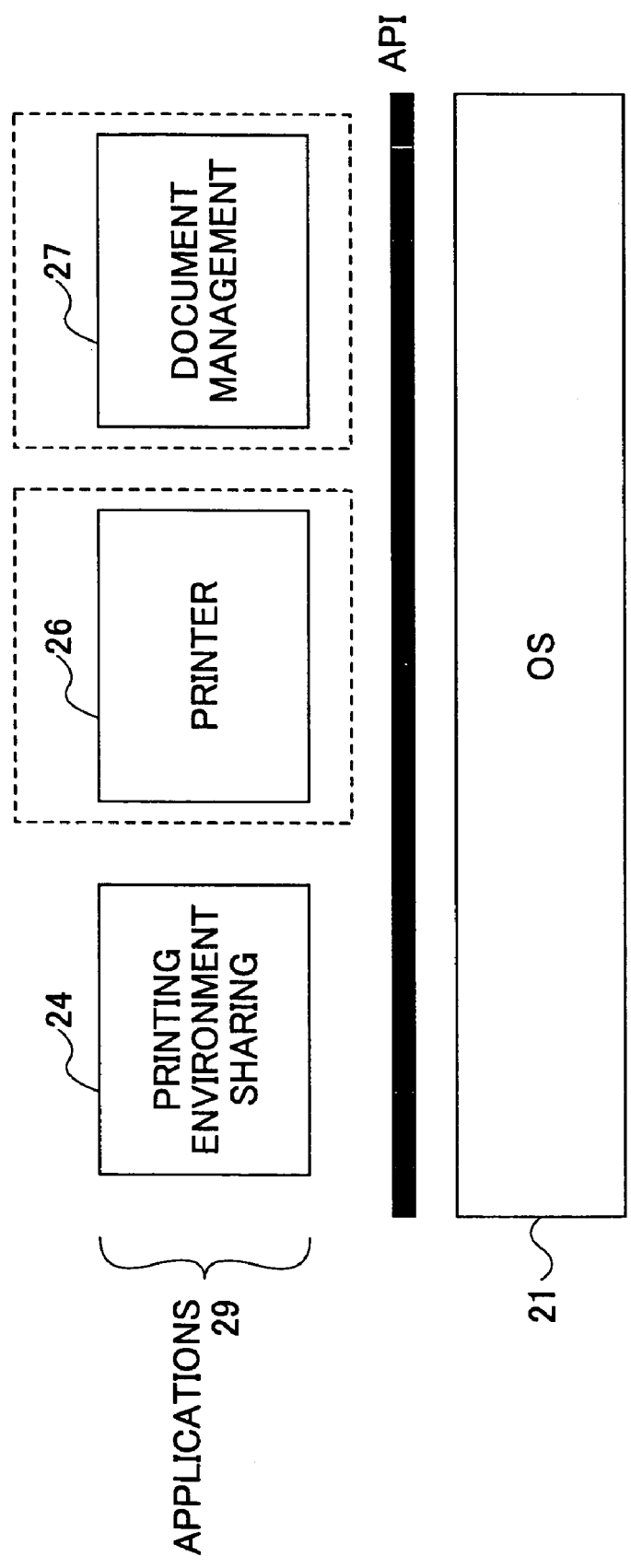
FIG. 4 is a block diagram showing a software configuration of an SPS server according to the first embodiment of the present invention.

FIG. 4 is a block diagram showing a software configuration of the SPS server 3.

Referring to FIG. 4, the SPS server 3 includes an operating system (OS) 21 and applications 29.

The OS 21, which is an operating system such as UNIX® or Windows®, executes, for instance, the software programs of the applications 29 in parallel as processes.

The applications 29 include a printing environment sharing application 24, which is an application for printing reservation and/or printing. Each printing environment sharing service 13 shown in FIG. 3 is included in the printing environment sharing application 24 of the corresponding SPS server 3.

In the above description with reference to FIGS. 2 and 3, each SPS server 3 is described as having only the printing environment sharing service 13 included in the printing environment sharing application 24. However, in each SPS server 3, the applications 29 may be configured to include a printer application 26, which is an application for a printer, and a document management application 27, which is an application for document management, as shown in FIG. 4.

Each document print service 14 shown in FIGS. 2 and 3 is included in the corresponding printer application 26. Each repository service 12 shown in FIGS. 2 and 3 is included in the corresponding document management application 27.

However, in the first embodiment, a description is given based on the assumption that the document print servers 14 are included in the corresponding print servers 4, and the repository services 12 are included in the corresponding repository servers 2 as shown in FIGS. 2 and 3 for simplification. This, however, does not limit the implementation of the present invention.

A description is given below, with reference to FIG. 5, of the hardware configuration of the SPS server 3.

Figure 5:
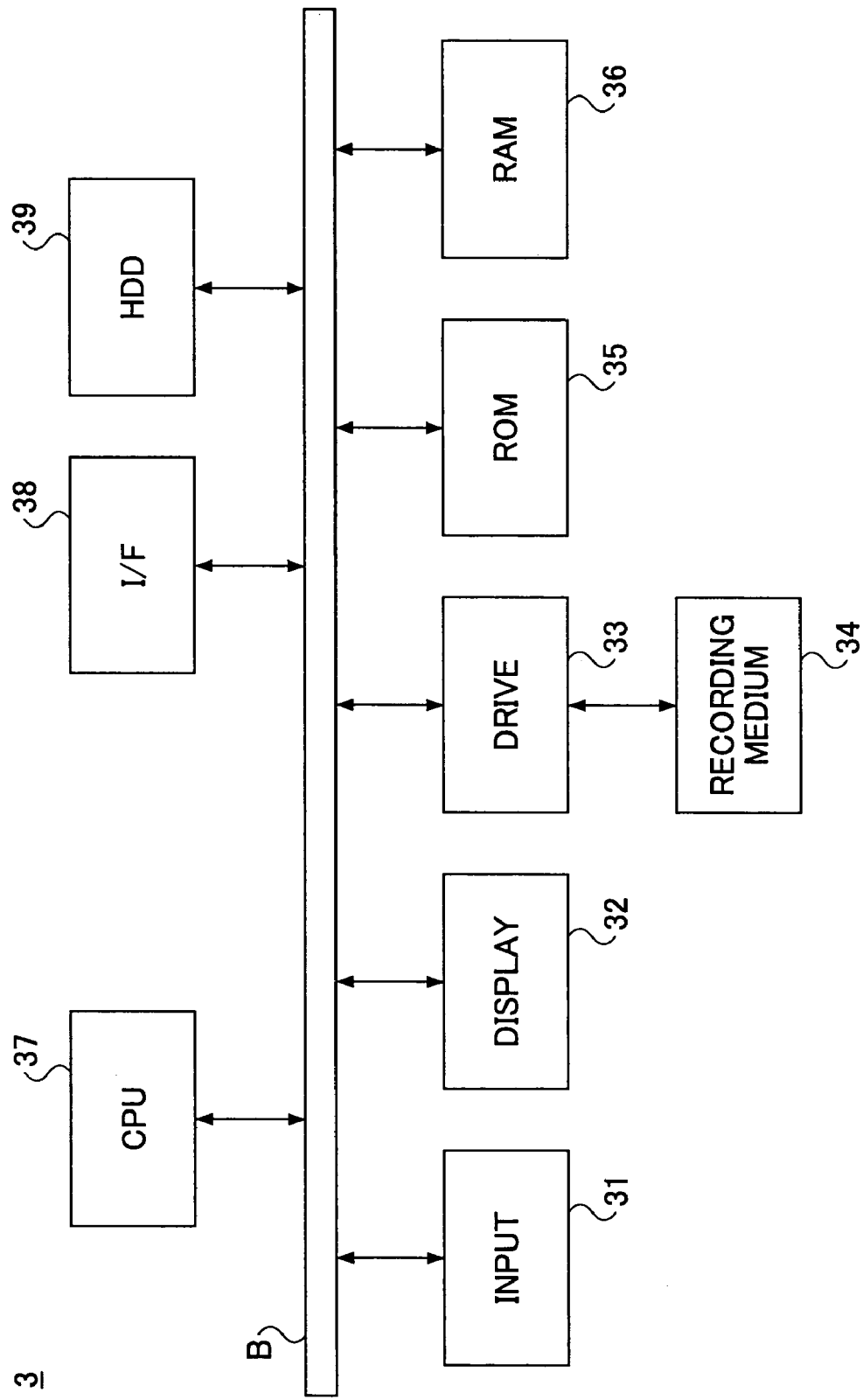
FIG. 5 is a block diagram showing a hardware configuration of the SPS server according to the first embodiment of the present invention.

FIG. 5 is a block diagram showing a hardware configuration of the SPS server 3.

According to the hardware configuration of the SPS server 3 of FIG. 5, the SPS server 3 includes an input unit 31, a display unit 32, a drive unit 33, a read-only memory (ROM) 35, a random access memory (RAM) 36, a central processing unit (CPU) 37, an interface unit (I/F) 38, and the HDD 39, which are connected with one another via a bus B.

The input unit 31 includes a keyboard and a mouse operated by a user of the SPS server 3, and is used to input a variety of operation signals to the SPS server 3.

The display unit 32 includes a display used by a user of the SPS server 3, and displays a variety of information.

The interface unit 38 is an interface connecting the SPS server 3 to a network.

Programs such as the application program corresponding to the printing environment sharing application 24 included in the applications 29 of FIG. 4 and a main program controlling the operation of the entire SPS server 3 are provided to the SPS server 3 through a recording medium 34 such as a CD-ROM or downloaded thereto through the network. The recording medium 34 is set in the drive unit 33 so that programs such as the application program and the main program are installed in the HDD 39 from the recording medium 34 through the drive unit 33.

The ROM 35 stores data. The RAM 36 reads out the programs such as the application program and the main program from the HDD 39 and stores the programs when the SPS server 3 is activated. The CPU 37 performs processing in accordance with the programs such as the application program and the main program read into and stored in the RAM 36.

The HDD 39 stores the service list 71 and the printer list 72 besides the programs such as the application program and the main program.

A description is given below, with reference to FIG. 6, of the functional configuration of the SPS server 3.

Figure 6:
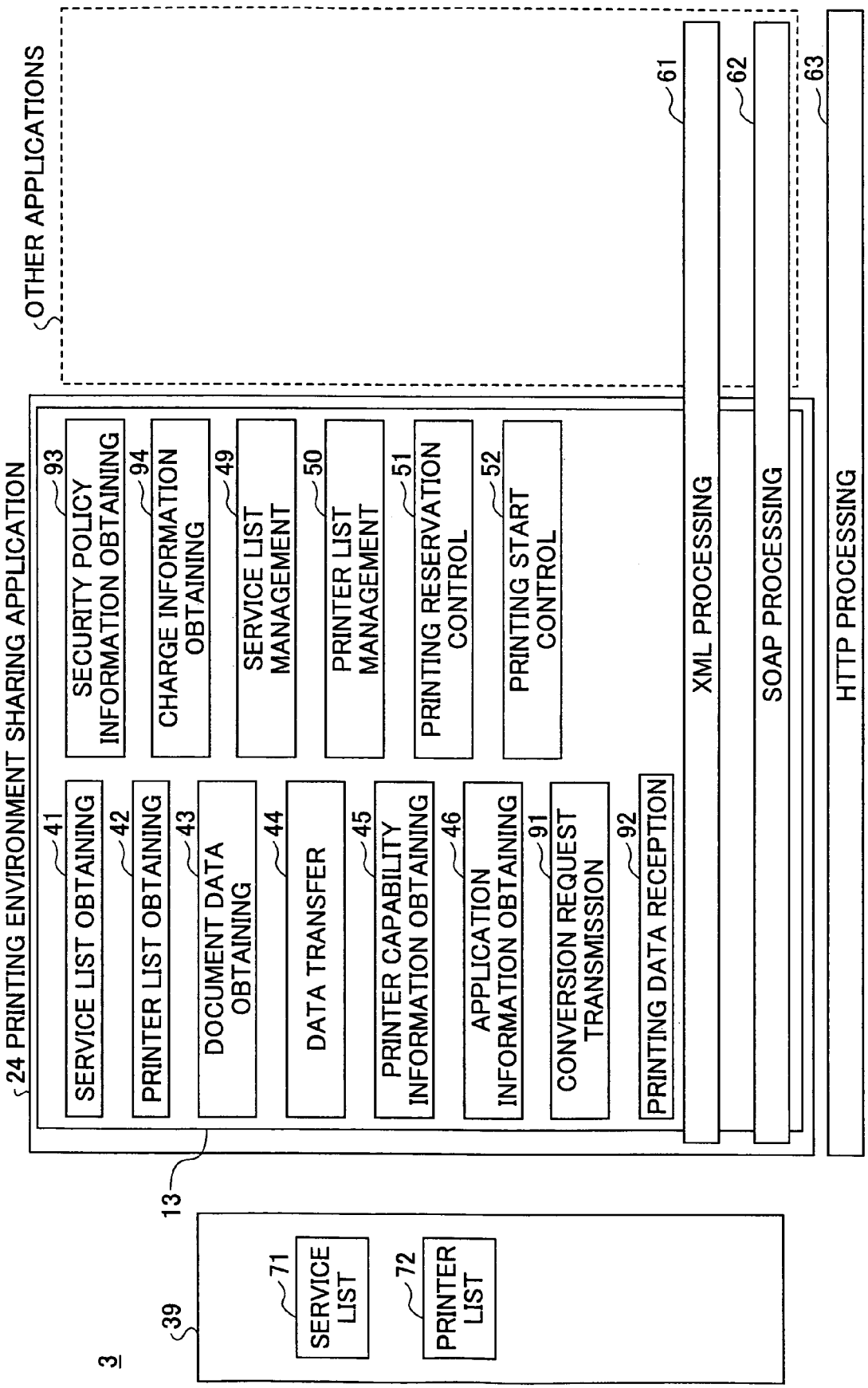
FIG. 6 is a block diagram showing a functional configuration of the SPS server according to the first embodiment of the present invention.

FIG. 6 is a block diagram showing a functional configuration of the SPS server 3.

Referring to FIG. 6, the SPS server 3 includes an HTTP (HyperText Transfer Protocol) processing part 63 controlling communications in compliance with the HTTP protocol, the HDD 39 storing the service list 71 and the printer list 72, and the printing environment sharing application 24.

An XML (extensible Markup Language) processing part 61 processing a message written in XML and a SOAP processing part 62 exchanging messages in compliance with the SOAP protocol are shared by the printing environment sharing application 24 and the applications other than the printing environment sharing application 24.

The printing environment sharing service 13 included in the printing environment sharing application 24 includes a service list obtaining part 41, a printer list obtaining part 42, a document data obtaining part 43, a data transfer part 44, a printer capability information obtaining part 45, an application information obtaining part 46, a conversion request transmission part 91, a printing data reception part 92, a security policy information obtaining part 93, a charge information obtaining part 94, a service list management part 49, a printer list management part 50, a printing reservation control part 51, and a printing start control part 52.

The service list obtaining part 41 obtains the service list 71 stored in another SPS server 3 via the printing environment sharing service 13 thereof. The service list obtaining part 41 also obtains the service list 71 stored in the SPS server 3 including the printing environment sharing service 13 in which the service list obtaining part 41 is included.

The printer list obtaining part 42 obtains the printer list 72 stored in another SPS server 3 or a print server 4 via the printing environment sharing service 13 included in the other SPS server 3 or the document print service 14 included in the print server 4. The printer list obtaining part 42 also obtains the printer list 72 stored in the SPS server 3 including the printing environment sharing service 13 in which the printer list obtaining part 42 is included.

The document data obtaining part 43 obtains the document data of a specified document from the repository server 2 via the repository service 12 based on a request from the Web server 1 shown in FIG. 3.

The data transfer part 44 transfers to another SPS server 3 via the printing environment sharing service 13 thereof reservation information including channel information to the printing environment sharing service 13 of a printing location, identification information identifying the printing location, identification information identifying the printer 6 to be used for printing, and printing conditions, and/or the document data obtained in the document data obtaining part 43 or printing data that is printable data into which the document data is converted as described below.

The printer capability information obtaining part 45 obtains the capability information of the printer 6, such as the capability of color printing and duplex printing, through the printing environment sharing service 13 of another SPS server 3 and/or the document print service 14 of a print server 4.

The application information obtaining part 46 obtains application information required at the time of converting the document data obtained in the document data obtaining part 43 into printing data, such as information as to whether an application such as Microsoft Word® is stored.

Figure 25:
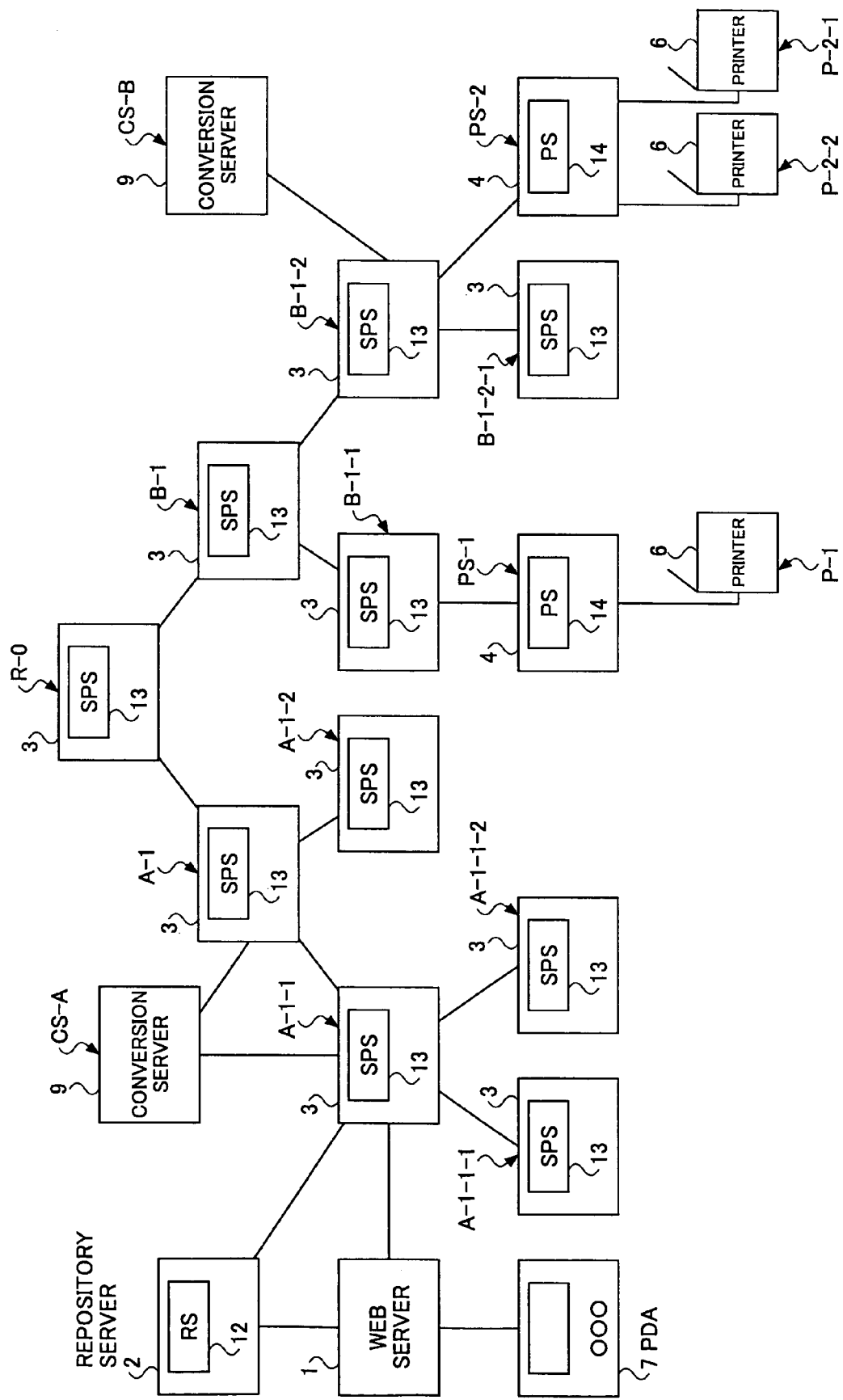
FIG. 25 is a block diagram showing another system configuration according to the first embodiment of the present invention.

The conversion request transmission part 91 transmits a request for conversion from document data to printing data including the document data obtained in the document data obtaining part 43 to the document print service 14 or a below-described conversion server 9 (FIG. 25).

The printing data reception part 92 receives the printing data corresponding to the conversion request transmitted from the conversion request transmission part 91 from the document print service 14 or the conversion server 9.

The security policy information obtaining part 93 obtains from a below-described security policy server 8 (FIG. 26) information on the security policy of the document data obtained by the document data obtaining part 43, apparatuses, communication lines, and/or users.

The charge information obtaining part 94 obtains information on charges related to document printing.

The service list management part 49 manages the service list 71. For instance, based on a request for connection from another printing environment sharing service 13, the service list management part 49 adds data on the other printing environment sharing service 13 to the service list 71 stored in the HDD 39 of the SPS server 3. Further, based on a request for disconnection from another printing environment sharing service 13, the service list management part 49 deletes data on the other printing environment sharing service 13 from the service list 71 stored in the HDD 39 of the SPS server 3.

The printer list management part 50 manages the printer list 72. For instance, the printer list management part 50 adds data to or deletes data from the printer list 72 stored in the HDD 39 of the SPS server 3 based on a request.

The printing reservation control part 51 performs control with respect to the printing reservation request. For instance, the printing reservation control part 51 receives a printing reservation request from the Web server 1 connected to the SPS server 3 via the Internet or a network, and requests the document data obtaining part 43 to obtain document data. Further, the printing reservation control part 51 requests the data transfer part 44 to transmit the document data obtained by the document data obtaining part 43 or reservation information included in the printing reservation request to another printing environment sharing service 13. The printing reservation control part 51 also stores the reservation information and/or the document data in the HDD 39.

The printing start control part 52 performs control with respect to the printing start request. For instance, the printing start control part 52 receives a printing start request from the Web server 1 and/or another printing environment sharing service 13 connected to the SPS server 3 via the Internet or a network, and transmits the printing start request to another printing environment sharing service 13 or a document print service 14 based on channel information included in the printing start request.

It may not be necessary that the printing environment sharing service 13 includes all the elements shown in FIG. 6. For instance, in a system configuration without the security policy server 8 as shown in FIGS. 2 and 3, the security policy information obtaining part 93 may not be included in the configuration of the printing environment sharing server 13. Further, the charge information obtaining part 94 may not be necessarily included in the configuration of the printing environment sharing server 13.

Next, a description is given, with reference to FIGS. 7A through 7G and 8, of a printing location selecting operation.

Figure 7:
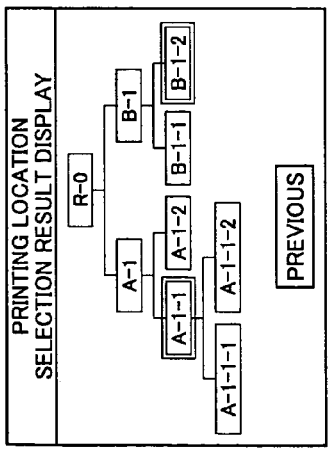
FIGS. 7A through 7G are diagrams for illustrating a printing location selecting operation according to the first embodiment of the present invention.
Figure 8:
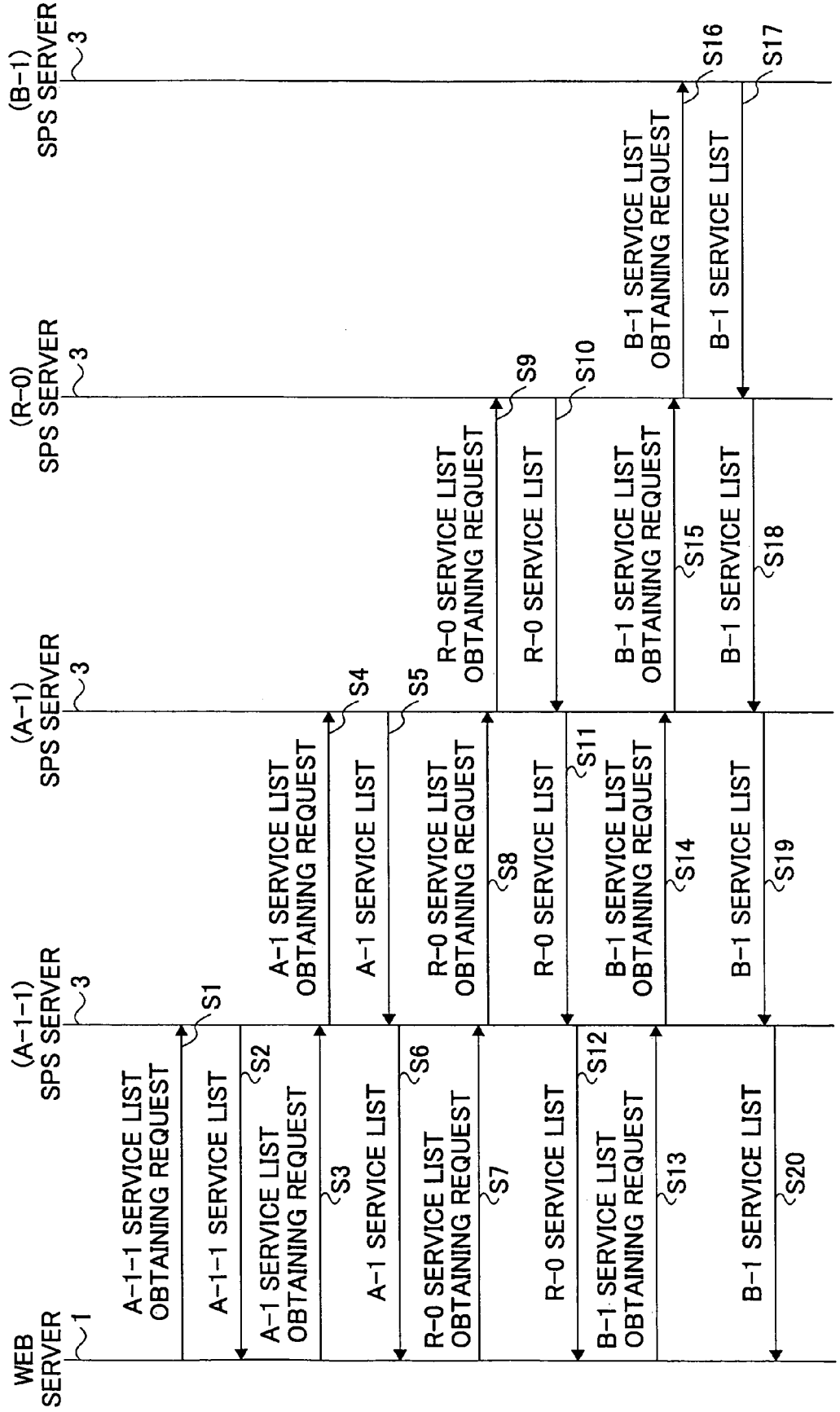
FIG. 8 is a sequence diagram for illustrating the printing location selecting operation according to the first embodiment of the present invention.

FIGS. 7A through 7G are diagrams and FIG. 8 is a sequence diagram for illustrating the printing location selecting operation.

For instance, in the case of the system configuration of FIG. 3, in step S1 of FIG. 8, the Web server 1, based on a user's request, transmits a request to obtain the service list 71 of the printing environment sharing service 13 (A-1-1) to the printing environment sharing service 13 (A-1-1), the service list 71 including information on the locations of other printing environment sharing services 13 that can be referred to by the printing environment sharing service 13 (A-1-1). At this point, the request to obtain the service list 71 includes channel information to the printing environment sharing service 13 (A-1-1).

Next, when the printing environment sharing service 13 (A-1-1) receives the request to obtain the service list 71 of the printing environment sharing service 13 (A-1-1) from the Web server 1, in step S2, the service list obtaining part 41 of the printing environment sharing service 13 (A-1-1) obtains the service list 71 stored in the HDD 39 of the SPS server 3 (A-1-1), and transmits the service list 71 to the Web server 1. At this point, the channel information to the printing environment sharing service 13 (A-1-1) is also transmitted to the Web server 1 together with the service list 71.

The Web server 1 creates a printing location selection screen as shown in FIG. 7A based on the received service list 71 of the printing environment sharing service 13 (A-1-1), and presents the printing location selection screen to the user.

On the printing location selection screen of FIG. 7A, the printing environment sharing services 13 that can be referred to by the printing environment sharing service 13 (A-1-1) are displayed.

For simplification of description, in FIGS. 7A through 7G, the printing environment sharing services 13 that can be referred to are shown simply as A-1-1-1, A-1-1-2, A-1, etc., which may be information identifying a printing location, such as a section name, an office name, or a place name. The same applies to the subsequent drawings.

For instance, when the user selects "A-1" and taps on a NEXT button 170a on the printing location selection screen of FIG. 7A, in step S3 of FIG. 8, the Web server 1 transmits a request to obtain the service list 71 of the printing environment sharing service 13 (A-1) to the printing environment sharing service 13 (A-1-1). When the user selects "A-1," the Web server 1 recognizes from the obtained service list 71 of the printing environment sharing service 13 (A-1-1) that the printing environment sharing service 13 (A-1) is superordinate to the printing environment sharing service 13 (A-1-1). Then, the Web server 1 obtains channel information from the printing environment sharing service 13 (A-1-1) to the printing environment sharing service 13 (A-1). Using the obtained information as channel information, the Web server 1 adds the channel information from the printing environment sharing service 13 (A-1-1) to the printing environment sharing service 13 (A-1) to the channel information from the Web server 1 to the printing environment sharing service 13 (A-1-1), and includes the obtained channel information in the request to obtain the service list 71 of the printing environment sharing service 13 (A-1). Thereafter, the Web server 1 and/or the printing environment sharing services 13 obtain service lists 71 in the same manner as described above so that the channel information to, for instance, a printing location selected by the user can be obtained.

The user selects a printing location and taps on a button on a screen displayed on the PDA 7. The same applies in the following.

When the printing environment sharing service 13 (A-1-1) receives the request, then in step S4, the service list obtaining part 41 of the printing environment sharing service 13 (A-1-1) transmits the request to printing environment sharing service 13 (A-1) based on the channel information.

When the printing environment sharing service 13 (A-1) receives the request from the printing environment sharing service 13 (A-1-1), in step S5, the service list obtaining part 41 of the printing environment sharing service 13 (A-1) obtains the service list 71 stored in the HDD 39 of the SPS server 3 (A-1), and transmits the service list 71 and the channel information to the printing environment sharing service 13 (A-1-1) based on the channel information.

Then, in step S6, the service list obtaining part 41 of the printing environment sharing service 13 (A-1-1) transmits the received service list 71 of the printing environment sharing service 13 (A-1) and channel information to the Web server 1.

Thus, every time the user selects a printing location, channel information is added, and the channel information is included in a request to obtain the service list 71 to be transmitted to the printing environment sharing service 13. As a result, the printing environment sharing service 13 can transmits the request to another printing environment sharing service 13 based on the channel information. Further, the printing environment sharing service 13 can transfer the obtained service list 71 to another printing environment sharing service 13 that has requested the service list 71 based on the channel information. In the following, although not described for simplification of description, a request to obtain the service list 71 and a response to the request include channel information, and the service list 71 is obtained based on the channel information.

The Web server 1 creates a printing location selection screen as shown in FIG. 7B based on the received service list 71 of the printing environment sharing service 13 (A-1), and presents the printing location selection screen to the user.

On the printing location selection screen of FIG. 7B, the printing environment sharing services 13 that can be referred to by the printing environment sharing service 13 (A-1) are displayed.

For instance, when the user selects "R-0" and taps on a NEXT button 171a on the printing location selection screen of FIG. 7B, in step S7 of FIG. 8, the Web server 1 transmits a request to obtain the service list 71 of the printing environment sharing service 13 (R-0) to the printing environment sharing service 13 (A-1-1).

When the printing environment sharing service 13 (A-1-1) receives the request, in step S8, the service list obtaining part 41 of the printing environment sharing service 13 (A-1-1) transmits the request to the printing environment sharing service 13 (A-1).

When the printing environment sharing service 13 (A-1) receives the request, in step S9, the service list obtaining part 41 of the printing environment sharing service 13 (A-1) transmits the request to the printing environment sharing service 13 (R-0).

When the printing environment sharing service 13 (R-0) receives the request, in step S10, the service list obtaining part 41 of the printing environment sharing service 13 (R-0) obtains the service list 71 stored in the SPS server 3 (R-0), and transmits the service list 71 to the printing environment sharing service 13 (A-1).

In step S11, the service list obtaining part 41 of the printing environment sharing service 13 (A-1) transmits the received service list 71 of the printing environment sharing service 13 (R-0) to the printing environment sharing service 13 (A-1-1).

In step S12, the service list obtaining part 41 of the printing environment sharing service 13 (A-1-1) transmits the received service list 71 of the printing environment sharing service 13 (R-0) to the Web server 1.

The Web server 1 creates a printing location selection screen as shown in FIG. 7C based on the received service list 71 of the printing environment sharing service 13 (R-0), and presents the printing location selection screen to the user.

For instance, when the user selects "B-1" and taps on a NEXT button 172a on the printing location selection screen of FIG. 7C, in step S13 of FIG. 8, the Web server 1 transmits a request to obtain the service list 71 of the printing environment sharing service 13 (B-1) to the printing environment sharing service 13 (A-1-1).

When the printing environment sharing service 13 (A-1-1) receives the request, in step S14, the service list obtaining part 41 of the printing environment sharing service 13 (A-1-1) transmits the request to the printing environment sharing service 13 (A-1).

When the printing environment sharing service 13 (A-1) receives the request, in step S15, the service list obtaining part 41 of the printing environment sharing service 13 (A-1) transmits the request to the printing environment sharing service 13 (R-0).

When the printing environment sharing service 13 (R-0) receives the request, in step S16, the service list obtaining part 41 of the printing environment sharing service 13 (R-0) transmits the request to the printing environment sharing service 13 (B-1).

When the printing environment sharing service 13 (B-1) receives the request, in step S17, the service list obtaining part 41 of the printing environment sharing service 13 (B-1) obtains the service list 71 stored in the SPS server 3 (B-1), and transmits the service list 71 to the printing environment sharing service 13 (R-0).

In step S18, the service list obtaining part 41 of the printing environment sharing service 13 (R-0) transmits the received service list 71 of the printing environment sharing service 13 (B-1) to the printing environment sharing service 13 (A-1).

In step S19, the service list obtaining part 41 of the printing environment sharing service 13 (A-1) transmits the received service list 71 of the printing environment sharing service 13 (B-1) to the printing environment sharing service 13 (A-1-1).

In step S20, the service list obtaining part 41 of the printing environment sharing service 13 (A-1-1) transmits the received service list 71 of the printing environment sharing service 13 (B-1) to the Web server 1.

The Web server 1 creates a printing location selection screen as shown in FIG. 7D based on the received service list 71 of the printing environment sharing service 13 (B-1), and presents the printing location selection screen to the user.

For instance, when the user selects "B-1-2" and taps on an OK button 173a on the printing location selection screen of FIG. 7D, the Web server 1 creates a printing location selection confirmation screen as shown in FIG. 7E, and presents the printing location selection confirmation screen to the user.

For instance, when the user taps on a DISPLAY SELECTION RESULT button 174a on the printing location selection confirmation screen of FIG. 7E, the Web server 1 creates a printing location selection result display screen as shown in FIG. 7F, and presents the printing location selection result display screen to the user.

By performing the operations shown in FIGS. 7A through 7F and/or FIG. 8, the Web server 1 and/or the printing environment sharing service 13 (A-1-1) can obtain the channel information from the printing environment sharing service 13 (A-1-1) to the printing environment sharing service 13 (B-1-2), which is the printing location selected by the user, as (A-1-1)→(A-1)→(R-0)→(B-1)→(B-1-2).

For instance, when the user taps on a RESERVE PRINTING button 174b on the printing location selection confirmation screen of FIG. 7E, the Web server 1 creates a printing reservation confirmation screen as shown in FIG. 7G, and presents the printing reservation confirmation screen to the user.

The user can make a printing reservation by setting, for instance, only a printing location without setting a printer and/or printing conditions and tapping on a RESERVE button 175a on the printing reservation confirmation screen of FIG. 7G. In this case, for instance, the user goes to the actual printing location, and checks the state of use and the performance of nearby printers. Then, the user sets a printer and printing conditions as described below, and performs printing.

Further, in this case, a below-described printing reservation request shown in FIG. 22 and/or FIGS. 24A through 24C includes the document identifier of the document selected by the user for which document the printing reservation is to be made, document use authorization information to authorize the use of the document, identification information identifying the printing location, such as an IP address or service identification information, and channel information to the printing location.

Although not graphically represented, the user may make a printing reservation by specifying only a document to be printed without specifying a printing location. In this case, for instance, the user sets a printing location, a printer 6, and printing conditions after the venue for a meeting is determined, and performs printing.

Figure 22:
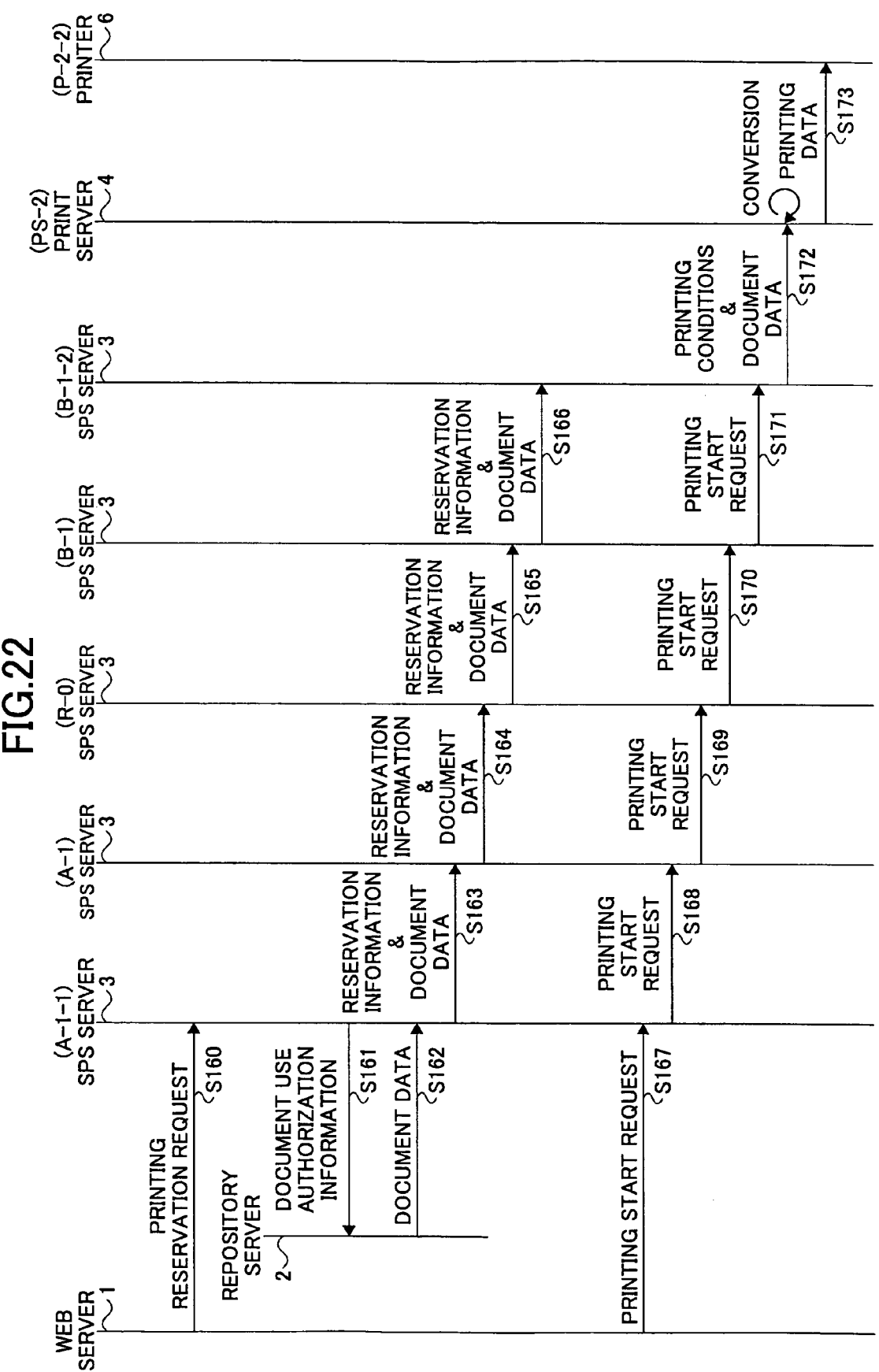
FIG. 22 is a sequence diagram for illustrating a first operation of requesting a printing reservation and a printing start according to the first embodiment of the present invention.
Figure 24A:
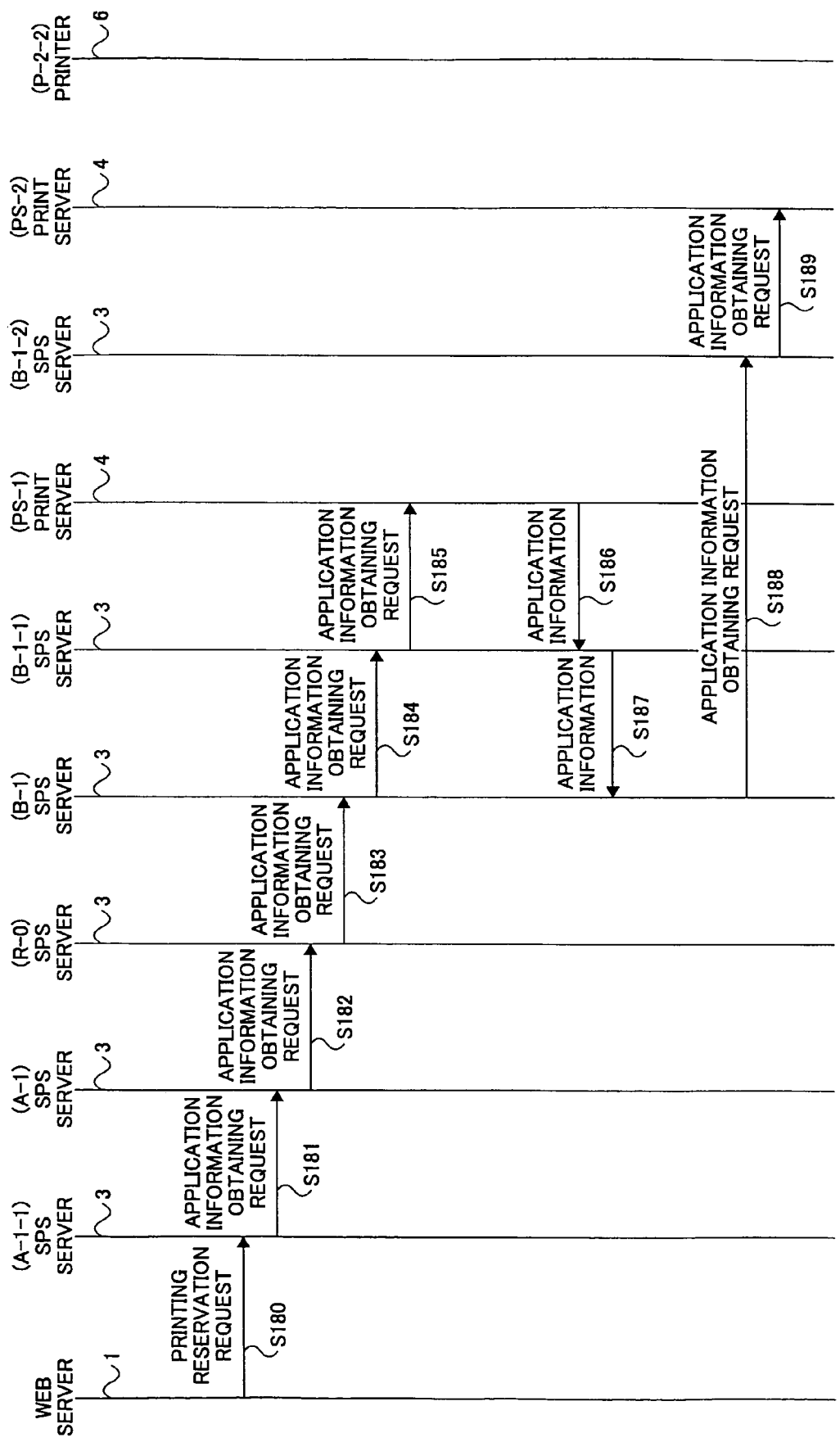
Figure 24C:
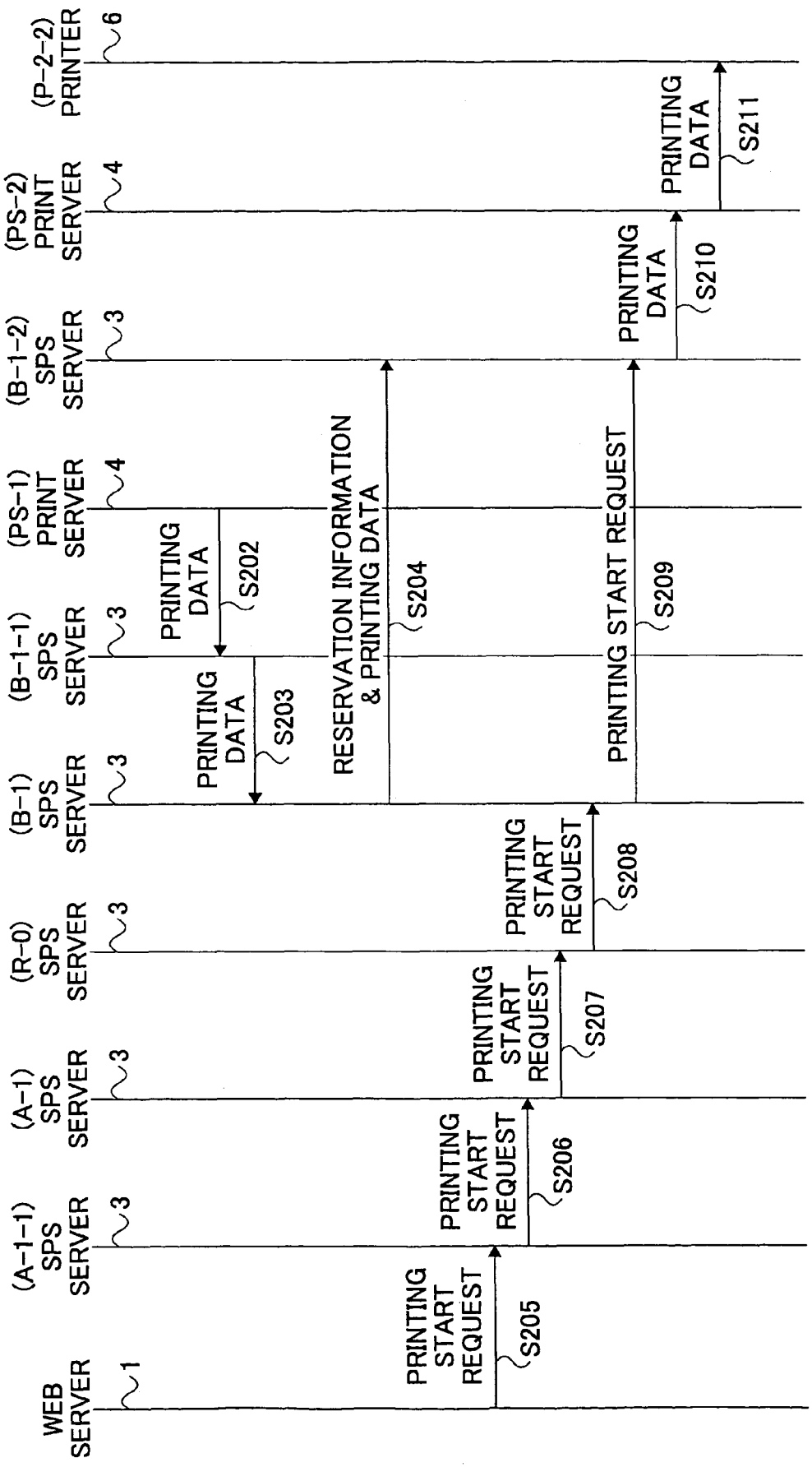

Further, in this case, the printing reservation request shown in FIG. 22 and/or FIGS. 24A through 24C includes the document identifier of the document selected by the user for which document the printing reservation is to be made and document use authorization information to authorize the use of the document.

Next, a description is given, with reference to FIG. 9, of the service list 71.

FIG. 9 is a diagram showing a configuration of the service list 71 stored in the SPS server 3 (A-1-1) in the system configuration of FIG. 3.

Each service list 71 includes identification information identifying another printing environment sharing service 13 that can be referred to by the corresponding printing environment sharing service 13.

For instance, the service list 71 of FIG. 9 includes identification information identifying the superordinate printing environment sharing service 13 (A-1) and the subordinate printing environment sharing services 13 (A-1-1-1 and A-1-1-2) that can be referred to by the printing environment sharing service 13 (A-1-1) included in the SPS server 3 (A-1-1) in which the service list 71 of FIG. 9 is stored.

For simplification of description, in FIG. 9, the identification information identifying the printing environment sharing services 13, which may be, for instance, section names or office names, are shown as A-1, A-1-1-1, etc.

If the corresponding printing environment sharing service 13 has no superordinate, coordinate, or subordinate printing environment sharing service 13, NONE is written to the service list 71 correspondingly. In the case of FIG. 9, no coordinate printing environment sharing service 13 exists.

Further, although not graphically represented in FIG. 9, in addition to the identification information identifying other printing environment sharing services 13 that can be referred to by the printing environment sharing service 13 included in the SPS server 3 in which the service list 71 is stored, the service list 71 includes the name, latitude, longitude, altitude, and address of the location of each of the other printing environment sharing services 13.

A description is given below, with reference to FIGS. 10A through 10D and 11, of a first printing location search operation.

Figure 11:
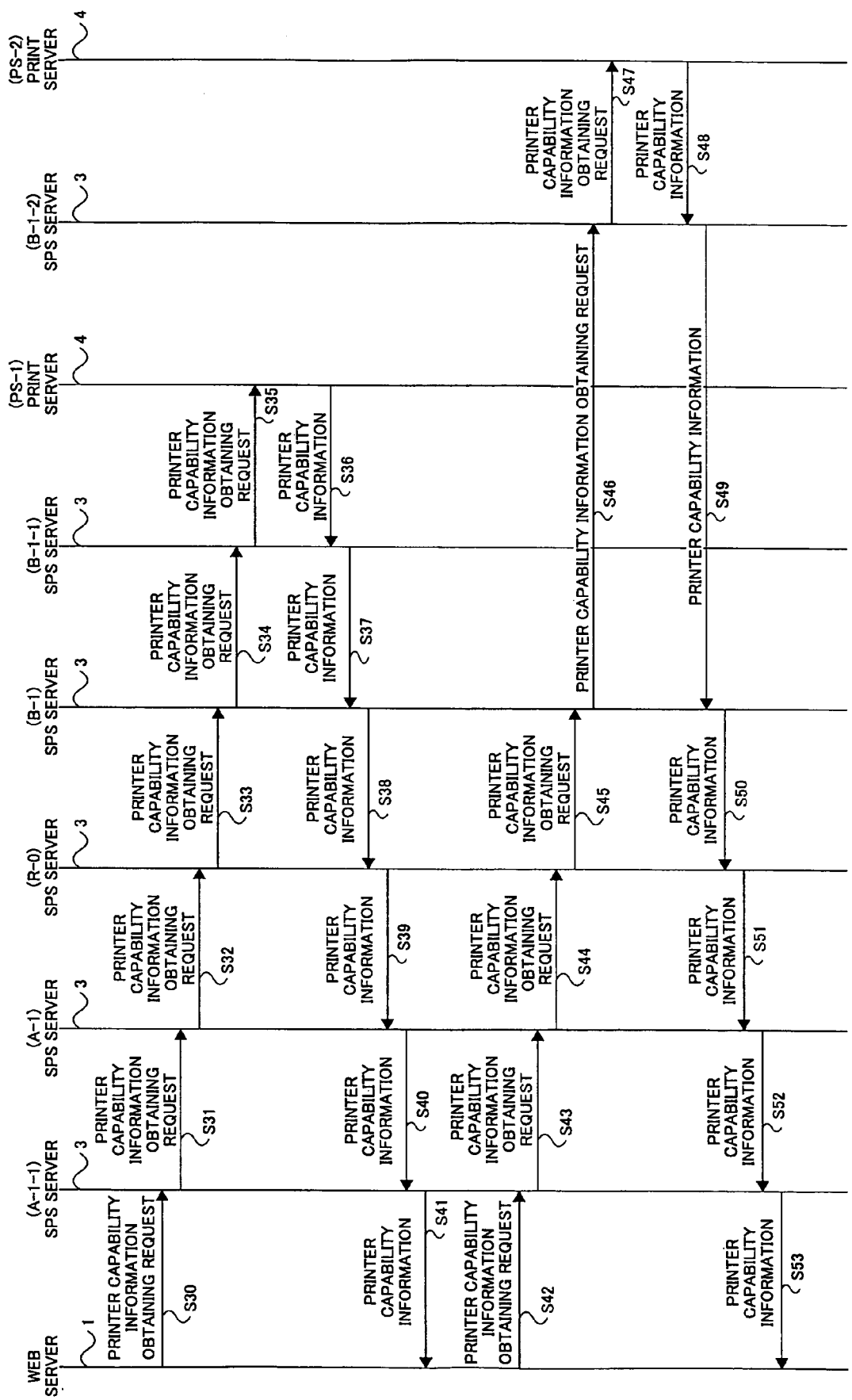
FIG. 11 is a sequence diagram for illustrating the first printing location search operation according to the first embodiment of the present invention.

FIGS. 10A through 10D are diagrams and FIG. 11 is a sequence diagram for illustrating the first printing location search operation.

The Web server 1 creates, for instance, a printing location selection screen as shown in FIG. 10A based on the service lists 71 of the printing environment sharing services 13, and presents the printing location selection screen to the user.

FIG. 10A shows a printing location selection screen in the case where the user has made selections up to the printing location (B-1) as described with reference to FIGS. 7A through 7D.

In contrast to the printing location selection screen of FIG. 7D, the printing location selection screen of FIG. 10A additionally includes the option of SEARCH BY PRINTING CONDITIONS.

For instance, when the user selects SEARCH BY PRINTING CONDITIONS and taps on a NEXT button 180a on the printing location selection screen of FIG. 10A, the Web server 1 creates a printing location search screen shown in FIG. 10B, and presents the printing location search screen to the user.

For instance, when the user sets printing conditions including paper size and paper orientation, and taps on a SEARCH button 181a on the printing location search screen shown of FIG. 10B, in step S30 of FIG. 11, the Web server 1 transmits a request to obtain the printer capability information of printers 6 with which the printing environment sharing service 13 (B-1-1) can communicate to the printing environment sharing service 13 (A-1-1) based on the service list of the printing environment sharing service 13 (B-1).

The printer capability information, which is retained by each document print service 14, refers to information on the performance and/or throughput of each printer 6 managed by the document print service 14, such as information as to whether the printer 6 supports color printing and information as to whether the printer 6 can perform duplex printing.

When the printing environment sharing service 13 (A-1-1) receives the printer capability information obtaining request, in step S31, the printer capability information obtaining part 45 of the printing environment sharing service 13 (A-1-1) transmits the request to the printing environment sharing service 13 (A-1) based on the channel information obtained by the printing environment sharing service 13 (A-1-1) when the user has selected the printing location (B-1) as described with reference to FIGS. 7A through 7D and/or FIG. 8.

When the printing environment sharing service 13 (A-1) receives the request, in step S32, the printer capability information obtaining part 45 of the printing environment sharing service 13 (A-1) transmits the request to the printing environment sharing service 13 (R-0) based on the channel information.

When the printing environment sharing service 13 (R-0) receives the request, in step S33, the printer capability information obtaining part 45 of the printing environment sharing service 13 (R-0) transmits the request to the printing environment sharing service 13 (B-1) based on the channel information.

When the printing environment sharing service 13 (B-1) receives the request, in step S34, the printer capability information obtaining part 45 of the printing environment sharing service 13 (B-1) transmits the request to the printing environment sharing service 13 (B-1-1) based on the channel information.

When the printing environment sharing service 13 (B-1-1) receives the request, in step S35, the printer capability information obtaining part 45 of the printing environment sharing service 13 (B-1-1) transmits the request to the document print service 14 (PS-1).

Receiving the request, in step S36, the document print service 14 (PS-1) obtains the capability information of the printer 6 (P-1) stored in, for instance, the print server 4 (PS-1), and transmits the obtained capability information to the printing environment sharing service 13 (B-1-1).

The capability information of each printer 6 may be stored in the corresponding print server 4. Alternatively, the capability information of the printers 6 may be collectively stored in another server. In the following description, it is assumed for simplification that the capability information of each printer 6 is stored in the corresponding print server 4.

In step S37, the printer capability information obtaining part 45 of the printing environment sharing service 13 (B-1-1) transmits the received capability information of the printer 6 (P-1) to the printing environment sharing service 13 (B-1) based on the channel information.

In step S38, the printer capability information obtaining part 45 of the printing environment sharing service 13 (B-1) transmits the received capability information of the printer 6 (P-1) to the printing environment sharing service 13 (R-0) based on the channel information.

In step S39, the printer capability information obtaining part 45 of the printing environment sharing service 13 (R-0) transmits the received capability information of the printer 6 (P-1) to the printing environment sharing service 13 (A-1) based on the channel information.

In step S40, the printer capability information obtaining part 45 of the printing environment sharing service 13 (A-1) transmits the received capability information of the printer 6 (P-1) to the printing environment sharing service 13 (A-1-1) based on the channel information.

In step S41, the printer capability information obtaining part 45 of the printing environment sharing service 13 (A-1-1) transmits the received capability information of the printer 6 (P-1) to the Web server 1.

Then, in step S42, the Web server 1 transmits a request to obtain the printer capability information of printers 6 with which the printing environment sharing service 13 (B-1-2) can communicate to the printing environment sharing server 13 (A-1-1).

When the printing environment sharing service 13 (A-1-1) receives the printer capability information obtaining request, in step S43, the printer capability information obtaining part 45 of the printing environment sharing service 13 (A-1-1) transmits the request to the printing environment sharing service 13 (A-1) based on the channel information.

When the printing environment sharing service 13 (A-1) receives the request, in step S44, the printer capability information obtaining part 45 of the printing environment sharing service 13 (A-1) transmits the request to the printing environment sharing service 13 (R-0) based on the channel information.

When the printing environment sharing service 13 (R-0) receives the request, in step S45, the printer capability information obtaining part 45 of the printing environment sharing service 13 (R-0) transmits the request to the printing environment sharing service 13 (B-1) based on the channel information.

When the printing environment sharing service 13 (B-1) receives the request, in step S46, the printer capability information obtaining part 45 of the printing environment sharing service 13 (B-1) transmits the request to the printing environment sharing service 13 (B-1-2) based on the channel information.

When the printing environment sharing service 13 (B-1-2) receives the request, in step S47, the printer capability information obtaining part 45 of the printing environment sharing service 13 (B-1-2) transmits the request to the document print service 14 (PS-2).

Receiving the request, in step S48, the document print service 14 (PS-2) obtains the capability information of the printers 6 (P-2-1 and P-2-2) stored in, for instance, the print server 4 (PS-2), and transmits the obtained capability information to the printing environment sharing service 13 (B-1-2).

In step S49, the printer capability information obtaining part 45 of the printing environment sharing service 13 (B-1-2) transmits the received capability information of the printers 6 (P-2-1 and P-2-2) to the printing environment sharing service 13 (B-1) based on the channel information.

In step S50, the printer capability information obtaining part 45 of the printing environment sharing service 13 (B-1) transmits the received capability information of the printers 6 (P-2-1 and P-2-2) to the printing environment sharing service 13 (R-0) based on the channel information.

In step S51, the printer capability information obtaining part 45 of the printing environment sharing service 13 (R-0) transmits the received capability information of the printers 6 (P-2-1 and P-2-2) to the printing environment sharing service 13 (A-1) based on the channel information.

In step S52, the printer capability information obtaining part 45 of the printing environment sharing service 13 (A-1) transmits the received capability information of the printers 6 (P-2-1 and P-2-2) to the printing environment sharing service 13 (A-1-1) based on the channel information.

In step S53, the printer capability information obtaining part 45 of the printing environment sharing service 13 (A-1-1) transmits the received capability information of the printers 6 (P-2-1 and P-2-2) to the Web server 1.

Then, the Web server 1 compares the capability information of the printers 6 obtained in steps S41 and S53 and the printing conditions that the user has entered using the printing location search screen of FIG. 10B, and creates a printing location search result screen as shown in FIG. 10C. Then, the Web server 1 presents the printing location search result screen to the user.

The operations of steps S41 and S42 of FIG. 11 may be omitted. In this case, in step S30, the printer capability information obtaining part 45 of the printing environment sharing service 13 (A-1-1) may receive a request to obtain the printer capability information of printers 6 with which the printing environment sharing services 13 (B-1-1 and B-1-2) can communicate from the Web server 1, and may obtain the printer capability information. Then, in step S53, the printer capability information obtaining part 45 of the printing environment sharing service 13 (A-1-1) may collectively transmit the printer capability information to the Web server 1.

Alternatively, in step S30, the printer capability information obtaining part 45 of the printing environment sharing service 13 (A-1-1) may obtain the printing conditions entered by the user on the printing location search screen of FIG. 10B together with the request to obtain the printer capability information. In this case, when the printing environment sharing service 13 (A-1-1) obtains the printer capability information, in step S53, the printer capability information obtaining part 45 of the printing environment sharing service 13 (A-1-1) may transmit only the capability information of a printer 6 that matches the printing conditions to the Web server 1.

By performing the above-described operation, the Web server 1 and/or the printing environment sharing service 13 (A-1-1) can search out a printing location and a printer 6 that satisfy the printing conditions.

For instance, when the user selects one of the search results and taps on a RESERVE PRINTING button 182*a* on the printing location search result screen of FIG. 10C (in this case, only one search result is shown in FIG. 10C for simplification), the Web server 1 creates a printing reservation confirmation screen as shown in FIG. 10D, and presents the printing reservation confirmation screen to the user.

In the case of searching for a printing location with printing conditions being set as shown in FIGS. 10A through 10D and 11, the printing location, the printer 6, and the printing conditions are determined. Therefore, in contrast to the printing reservation confirmation screen of FIG. 7G, the printing reservation confirmation screen of FIG. 10D includes the printer 6 and the printing conditions in a printing reservation. In this case, the printing reservation request shown in FIG. 22 and/or FIGS. 24A through 24C includes the document identifier of a document selected by the user for which document the printing reservation is to be made, document use authorization information to authorize the use of the document, identification information identifying a printing location, channel information to the printing location, identification information identifying a printer 6, and printing conditions.

A description is given below, with reference to FIG. 12, of the sequence of another printing location search operation.

Figure 12:
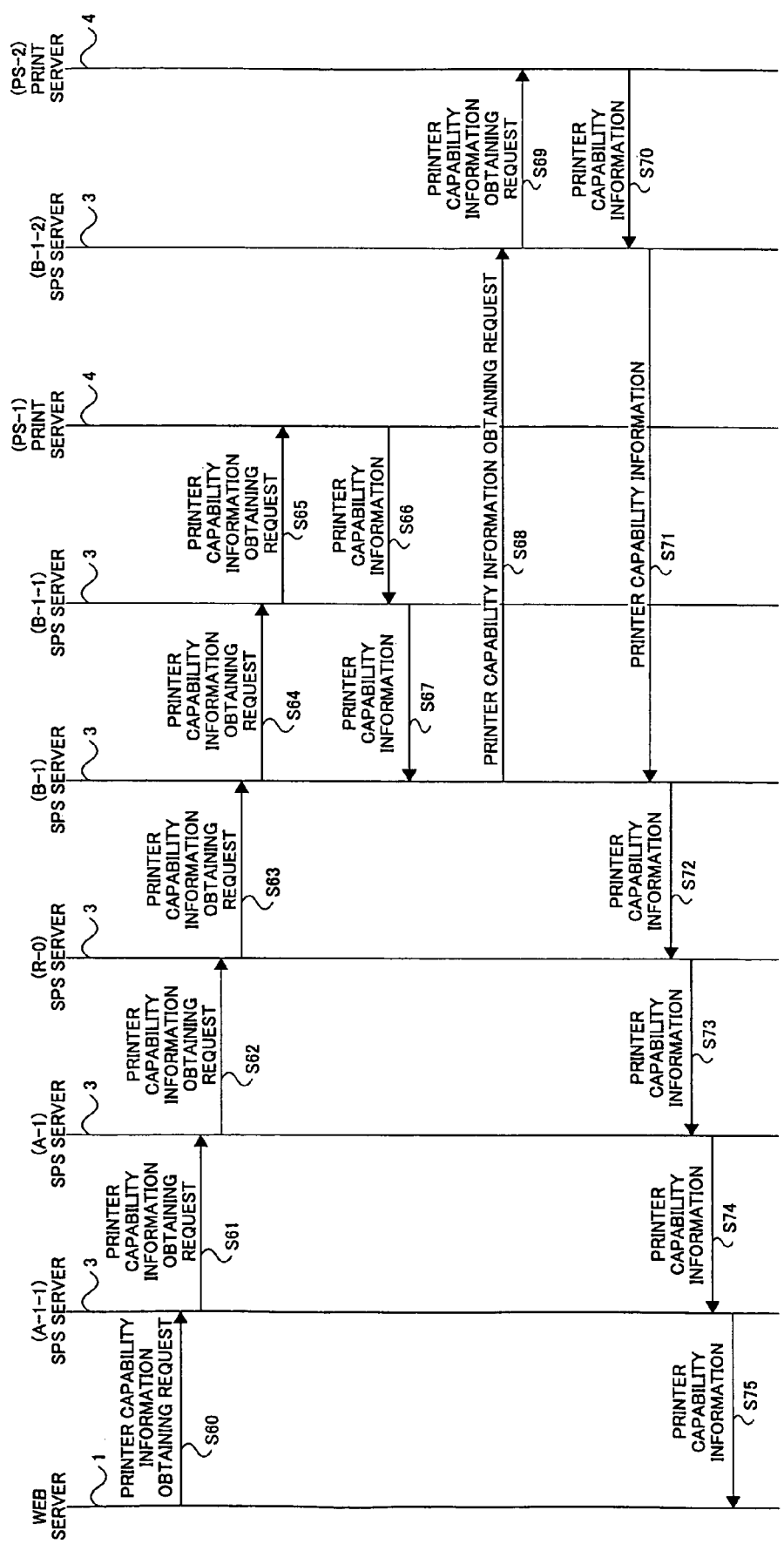
FIG. 12 is a sequence diagram for illustrating a second printing location search operation according to the first embodiment of the present invention.
Figure 13:
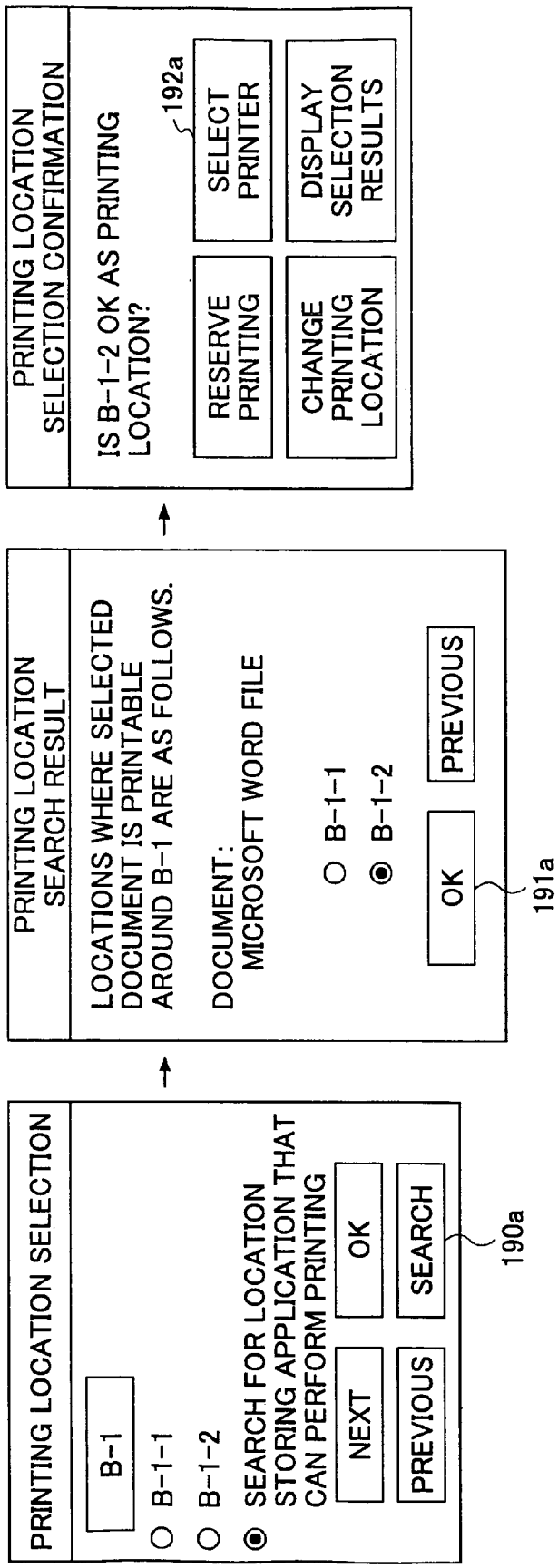
FIGS. 13A through 13C are diagrams for illustrating a third printing location search operation according to the first embodiment of the present invention.

FIG. 12 is a sequence diagram for illustrating a second printing location search operation.

For instance, when the user sets printing conditions including paper size and paper orientation, and taps on the SEARCH button 181a on the printing location search screen shown of FIG. 10B, in step S60 of FIG. 12, the Web server 1 transmits a request to obtain the printer capability information of printers 6 with which the printing environment sharing services 13 (B-1-1 and B-1-2) can communicate to the printing environment sharing service 13 (A-1-1) based on the service list of the printing environment sharing service 13 (B-1).

When the printing environment sharing service 13 (A-1-1) receives the printer capability information obtaining request, in step S61, the printer capability information obtaining part 45 of the printing environment sharing service 13 (A-1-1) transmits the request to the printing environment sharing service 13 (A-1) based on the channel information obtained by the printing environment sharing service 13 (A-1-1) when the user has selected the printing location (B-1) as described with reference to FIGS. 7A through 7D and/or FIG. 8.

When the printing environment sharing service 13 (A-1) receives the request, in step S62, the printer capability information obtaining part 45 of the printing environment sharing service 13 (A-1) transmits the request to the printing environment sharing service 13 (R-0) based on the channel information.

When the printing environment sharing service 13 (R-0) receives the request, in step S63, the printer capability information obtaining part 45 of the printing environment sharing service 13 (R-0) transmits the request to the printing environment sharing service 13 (B-1) based on the channel information.

When the printing environment sharing service 13 (B-1) receives the request, in step S64, the printer capability information obtaining part 45 of the printing environment sharing service 13 (B-1) transmits a request to obtain the printer capability information of printers 6 with which the printing environment sharing service 13 (B-1-1) can communicate to the printing environment sharing service 13 (B-1-1) based on the channel information.

When the printing environment sharing service 13 (B-1-1) receives the request, in step S65, the printer capability information obtaining part 45 of the printing environment sharing service 13 (B-1-1) transmits the request to the document print service 14 (PS-1).

Receiving the request, in step S66, the document print service 14 (PS-1) obtains the capability information of the printer 6 (P-1) stored in, for instance, the print server 4 (PS-1), and transmits the obtained capability information to the printing environment sharing service 13 (B-1-1).

In step S67, the printer capability information obtaining part 45 of the printing environment sharing service 13 (B-1-1) transmits the received capability information of the printer 6 (P-1) to the printing environment sharing service 13 (B-1) based on the channel information.

Then, in step S68, the printer capability information obtaining part 45 of the printing environment sharing service 13 (B-1) transmits a request to obtain the printer capability information of printers 6 with which the printing environment sharing service 13 (B-1-2) can communicate to the printing environment sharing service 13 (B-1-2) based on the channel information.

When the printing environment sharing service 13 (B-1-2) receives the request, in step S69, the printer capability information obtaining part 45 of the printing environment sharing service 13 (B-1-2) transmits the request to the document print service 14 (PS-2).

Receiving the request, in step S70, the document print service 14 (PS-2) obtains the capability information of the printers 6 (P-2-1 and P-2-2) stored in, for instance, the print server 4 (PS-2), and transmits the obtained capability information to the printing environment sharing service 13 (B-1-2).

In step S71, the printer capability information obtaining part 45 of the printing environment sharing service 13 (B-1-2) transmits the received capability information of the printers 6 (P-2-1 and P-2-2) to the printing environment sharing service 13 (B-1) based on the channel information.

In step S72, the printer capability information obtaining part 45 of the printing environment sharing service 13 (B-1) transmits the capability information of the printer 6 (P-1) received in step S67 and the capability information of the printers 6 (P-2-1 and P-2-2) received in step S71 to the printing environment sharing service 13 (R-0) based on the channel information.

In step S73, the printer capability information obtaining part 45 of the printing environment sharing service 13 (R-0) transmits the received capability information of the printers 6 (P-1, P-2-1, and P-2-2) to the printing environment sharing service 13 (A-1) based on the channel information.

In step S74, the printer capability information obtaining part 45 of the printing environment sharing service 13 (A-1) transmits the received capability information of the printers 6 (P-1, P-2-1, and P-2-2) to the printing environment sharing service 13 (A-1-1) based on the channel information.

In step S75, the printer capability information obtaining part 45 of the printing environment sharing service 13 (A-1-1) transmits the received capability information of the printers 6 (P-1, P-2-1, and P-2-2) to the Web server 1.

Then, the Web server 1 compares the capability information of the printers 6 obtained in steps S75 and the printing conditions that the user has entered using the printing location search screen of FIG. 10B, and creates a printing location search result screen as shown in FIG. 10C. Then, the Web server 1 presents the printing location search result screen to the user.

Alternatively, in step S60, the printer capability information obtaining part 45 of the printing environment sharing service 13 (A-1-1) may obtain the printing conditions entered by the user on the printing location search screen of FIG. 10B together with the request to obtain the printer capability information. In this case, the printer capability information obtaining part 45 of the printing environment sharing service 13 (A-1-1) may compare the capability information of the printers 6 (P-1, P-2-1, and P-2-2) obtained in step S74 and the printing conditions, and in step S75, may transmit only the capability information of a printer 6 that matches the printing conditions to the Web server 1.

The Web server 1 and/or the printing environment sharing service 13 (A-1-1) can also search out a printing location and a printer 6 that satisfy the printing conditions by the operation shown in FIG. 12.

In FIGS. 10A through 10D, 11, and 12, the user has first made selections up to the printing location (B-1). Alternatively, the Web server 1 may add the option of SEARCH BY PRINTING CONDITIONS to the first printing location selection screen as shown in FIG. 7A and present the screen to the user so that a printing location that matches the printing conditions of the user may be searched for from the beginning. The same applies to the following search methods.

Next, a description is given below, with reference to FIGS. 13A through 13C and 14, of a third printing location search operation.

Figure 14:
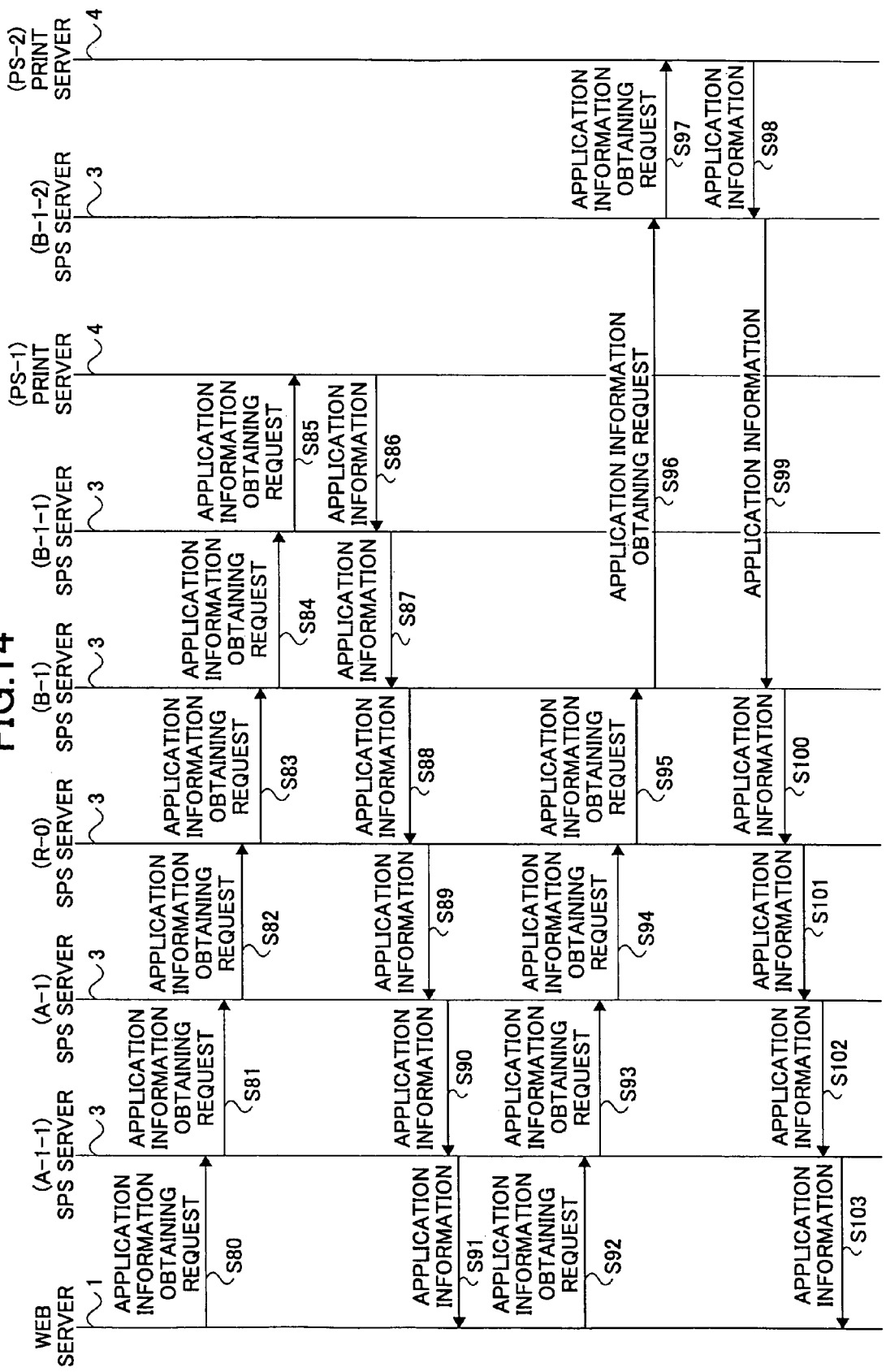
FIG. 14 is a sequence diagram for illustrating the third printing location search operation according to the first embodiment of the present invention.

FIGS. 13A through 13C are diagrams and FIG. 14 is a sequence diagram for illustrating the third printing location search operation.

The Web server 1 creates, for instance, a printing location selection screen as shown in FIG. 13A based on the service lists 71 of the printing environment sharing services 13, and presents the printing location selection screen to the user.

FIG. 13A shows a printing location selection screen in the case where the user has made selections up to the printing location (B-1) as described with reference to FIGS. 7A through 7D.

In contrast to the printing location selection screen of FIG. 7D, the printing location selection screen of FIG. 13A additionally includes the option of SEARCH FOR PRINTING LOCATION WHERE APPLICATION THAT CAN PERFORM PRINTING IS STORED.

For instance, when the user selects SEARCH FOR PRINTING LOCATION WHERE APPLICATION THAT CAN PERFORM PRINTING IS STORED and taps on a SEARCH button 190a on the printing location selection screen of FIG. 13A, in step S80 of FIG. 14, the Web server 1 transmits a request to obtain application information stored in a print server 4 that can communicate with the printing environment sharing service 13 (B-1-1) to the printing environment sharing service 13 (A-1-1) based on the service list of the printing environment sharing service 13 (B-1).

When the printing environment sharing service 13 (A-1-1) receives the application information obtaining request, in step S81, the application information obtaining part 46 of the printing environment sharing service 13 (A-1-1) transmits the request to the printing environment sharing service 13 (A-1) based on the channel information obtained by the printing environment sharing service 13 (A-1-1) when the user has selected the printing location (B-1) as described with reference to FIGS. 7A through 7D and/or FIG. 8.

When the printing environment sharing service 13 (A-1) receives the request, in step S82, the application information obtaining part 46 of the printing environment sharing service 13 (A-1) transmits the request to the printing environment sharing service 13 (R-0) based on the channel information.

When the printing environment sharing service 13 (R-0) receives the request, in step S83, the application information obtaining part 46 of the printing environment sharing service 13 (R-0) transmits the request to the printing environment sharing service 13 (B-1) based on the channel information.

When the printing environment sharing service 13 (B-1) receives the request, in step S84, the application information obtaining part 46 of the printing environment sharing service 13 (B-1) transmits the request to the printing environment sharing service 13 (B-1-1) based on the channel information.

When the printing environment sharing service 13 (B-1-1) receives the request, in step S85, the application information obtaining part 46 of the printing environment sharing service 13 (B-1-1) transmits the request to the document print service 14 (PS-1).

Receiving the request, in step S86, the document print service 14 (PS-1) obtains application information stored in, for instance, the print server 4 (PS-1), and transmits the obtained application information to the printing environment sharing service 13 (B-1-1). Here, the application information is described as being stored in the print server 4 (PS-1). Alternatively, the application information may be stored in the SPS server 3 (B-1-1). In this case, the operations of steps S85 and S86 are omitted. In the following description, however, it is assumed for simplification that the application information is stored in each print server 4.

In step S87, the application information obtaining part 46 of the printing environment sharing service 13 (B-1-1) transmits the received application information to the printing environment sharing service 13 (B-1) based on the channel information.

In step S88, the application information obtaining part 46 of the printing environment sharing service 13 (B-1) transmits the received application information to the printing environment sharing service 13 (R-0) based on the channel information.

In step S89, the application information obtaining part 46 of the printing environment sharing service 13 (R-0) transmits the received application information to the printing environment sharing service 13 (A-1) based on the channel information.

In step S90, the application information obtaining part 46 of the printing environment sharing service 13 (A-1) transmits the received application information to the printing environment sharing service 13 (A-1-1) based on the channel information.

In step S91, the application information obtaining part 46 of the printing environment sharing service 13 (A-1-1) transmits the received application information to the Web server 1.

Then, in step S92, the Web server 1 transmits a request to obtain application information stored in a print server 4 that can communicate with the printing environment sharing service 13 (B-1-2) to the printing environment sharing service 13 (A-1-1).

When the printing environment sharing service 13 (A-1-1) receives the application information obtaining request, in step S93, the application information obtaining part 46 of the printing environment sharing service 13 (A-1-1) transmits the request to the printing environment sharing service 13 (A-1) based on the channel information.

When the printing environment sharing service 13 (A-1) receives the request, in step S94, the application information obtaining part 46 of the printing environment sharing service 13 (A-1) transmits the request to the printing environment sharing service 13 (R-0) based on the channel information.

When the printing environment sharing service 13 (R-0) receives the request, in step S95, the application information obtaining part 46 of the printing environment sharing service 13 (R-0) transmits the request to the printing environment sharing service 13 (B-1) based on the channel information.

When the printing environment sharing service 13 (B-1) receives the request, in step S96, the application information obtaining part 46 of the printing environment sharing service 13 (B-1) transmits the request to the printing environment sharing service 13 (B-1-2) based on the channel information.

When the printing environment sharing service 13 (B-1-2) receives the request, in step S97, the application information obtaining part 46 of the printing environment sharing service 13 (B-1-2) transmits the request to the document print service 14 (PS-2).

Receiving the request, in step S98, the document print service 14 (PS-2) obtains application information stored in, for instance, the print server 4 (PS-2), and transmits the obtained application information to the printing environment sharing service 13 (B-1-2).

In step S99, the application information obtaining part 46 of the printing environment sharing service 13 (B-1-2) transmits the received application information to the printing environment sharing service 13 (B-1) based on the channel information.

In step S100, the application information obtaining part 46 of the printing environment sharing service 13 (B-1) transmits the received application information to the printing environment sharing service 13 (R-0) based on the channel information.

In step S101, the application information obtaining part 46 of the printing environment sharing service 13 (R-0) transmits the received application information to the printing environment sharing service 13 (A-1) based on the channel information.

In step S102, the application information obtaining part 46 of the printing environment sharing service 13 (A-1) transmits the received application information to the printing environment sharing service 13 (A-1-1) based on the channel information.

In step S103, the application information obtaining part 46 of the printing environment sharing service 13 (A-1-1) transmits the received application information to the Web server 1.

Then, the Web server 1 compares the application information obtained in steps S91 and S103 and the file information of the document selected by the user, and creates a printing location search result screen as shown in FIG. 13B. Then, the Web server 1 presents the printing location search result screen to the user.

The operations of steps S91 and S92 of FIG. 14 may be omitted. In this case, in step S80, the application information obtaining part 46 of the printing environment sharing service 13 (A-1-1) may receive a request to obtain application information stored in a print server 4 that can communicate with the printing environment sharing service 13 (B-1-1 or B-1-2) from the Web server 1, and may obtain the application information. Then, in step S103, the application information obtaining part 46 of the printing environment sharing service 13 (A-1-1) may collectively transmit the application information to the Web server 1.

Alternatively, in step S80, the application information obtaining part 46 of the printing environment sharing service 13 (A-1-1) may obtain information on the file format of the document selected by the user together with the request to obtain application information. In this case, when the printing environment sharing service 13 (A-1-1) obtains the application information, in step S103, the application information obtaining part 46 of the printing environment sharing service 13 (A-1-1) may transmit to the Web server 1 only the information on an application that supports the file format of the document so that the document is printable.

For instance, when the user specifies a document created by Microsoft Word® at the time of making a printing reservation, the Web server 1 and/or the printing environment sharing service 13 (A-1-1) displays an SPS server 3 that can communicate with a print server 4 storing a Microsoft Word® application as a printing location where the document specified by the user is printable.

By performing the operations shown in FIGS. 13A through 13C and 14, the Web server 1 and/or the printing environment sharing service 13 (A-1-1) can search out a printing location where the document specified by the user is printable.

In FIG. 14, the printing environment sharing services 13 obtain the application information. Alternatively, an inquiry as to whether there is an application that supports the file format of the document specified by the user so that the document is printable may be transmitted, and the result of the inquiry may be received.

For instance, when the user selects one of the search results and taps on an OK button 191a on the printing location search result screen of FIG. 13B, the Web server 1 creates a printing location selection confirmation screen as shown in FIG. 13C, and presents the printing location selection confirmation screen to the user.

Figure 15:
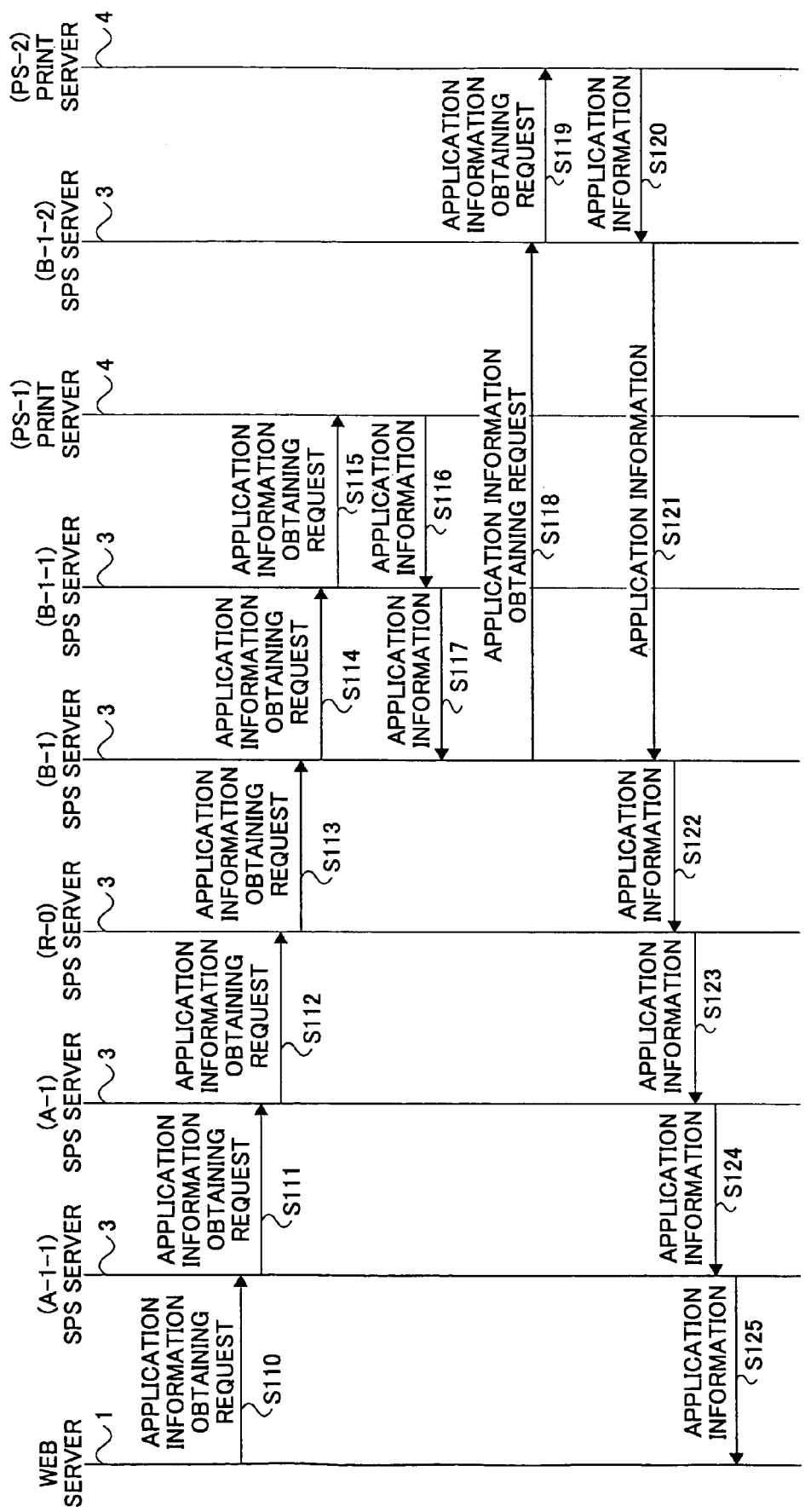
FIG. 15 is a sequence diagram for illustrating a fourth printing location search operation according to the first embodiment of the present invention.

Next, a description is given, with reference to FIG. 15, of the sequence of a fourth printing location search operation.

FIG. 15 is a sequence diagram for illustrating the fourth printing location search operation.

For instance, when the user selects SEARCH FOR PRINTING LOCATION WHERE APPLICATION THAT CAN PERFORM PRINTING IS STORED and taps on the SEARCH button 190a on the printing location selection screen of FIG. 13A, in step S110 of FIG. 15, the Web server 1 transmits a request to obtain application information stored in a print server 4 that can communicate with the printing environment sharing service 13 (B-1-1) or the printing environment sharing service 13 (B-1-2) to the printing environment sharing service 13 (A-1-1) based on the service list of the printing environment sharing service 13 (B-1).

When the printing environment sharing service 13 (A-1-1) receives the application information obtaining request, in step S111, the application information obtaining part 46 of the printing environment sharing service 13 (A-1-1) transmits the request to the printing environment sharing service 13 (A-1) based on the channel information obtained by the printing environment sharing service 13 (A-1-1) when the user has selected the printing location (B-1) as described with reference to FIGS. 7A through 7D and/or FIG. 8.

When the printing environment sharing service 13 (A-1) receives the request, in step S112, the application information obtaining part 46 of the printing environment sharing service 13 (A-1) transmits the request to the printing environment sharing service 13 (R-0) based on the channel information.

When the printing environment sharing service 13 (R-0) receives the request, in step S113, the application information obtaining part 46 of the printing environment sharing service 13 (R-0) transmits the request to the printing environment sharing service 13 (B-1) based on the channel information.

When the printing environment sharing service 13 (B-1) receives the request, in step S114, the application information obtaining part 46 of the printing environment sharing service 13 (B-1) transmits a request to obtain application information stored in a print server 4 that can communicate with the printing environment sharing service 13 (B-1-1) to the printing environment sharing service 13 (B-1-1) based on the channel information.

When the printing environment sharing service 13 (B-1-1) receives the request, in step S115, the application information obtaining part 46 of the printing environment sharing service 13 (B-1-1) transmits the request to the document print service 14 (PS-1).

Receiving the request, in step S116, the document print service 14 (PS-1) obtains application information stored in, for instance, the print server 4 (PS-1), and transmits the obtained application information to the printing environment sharing service 13 (B-1-1).

In step S117, the application information obtaining part 46 of the printing environment sharing service 13 (B-1-1) transmits the received application information to the printing environment sharing service 13 (B-1) based on the channel information.

Then, in step S118, the application information obtaining part 46 of the printing environment sharing service 13 (B-1) transmits a request to obtain application information stored in a print server 4 that can communicate with the printing environment sharing service 13 (B-1-2) to the printing environment sharing service 13 (B-1-2) based on the channel information.

When the printing environment sharing service 13 (B-1-2) receives the request, in step S119, the application information obtaining part 46 of the printing environment sharing service 13 (B-1-2) transmits the request to the document print service 14 (PS-2).

Receiving the request, in step S120, the document print service 14 (PS-2) obtains application information stored in, for instance, the print server 4 (PS-2), and transmits the obtained application information to the printing environment sharing service 13 (B-1-2).

In step S121, the application information obtaining part 46 of the printing environment sharing service 13 (B-1-2) transmits the received application information to the printing environment sharing service 13 (B-1) based on the channel information.

In step S122, the application information obtaining part 46 of the printing environment sharing service 13 (B-1) transmits the application information of the print server 4 (PS-1) received in step S117 and the application information of the print server 4 (PS-2) received in step S121 to the printing environment sharing service 13 (R-0) based on the channel information.

In step S123, the application information obtaining part 46 of the printing environment sharing service 13 (R-0) transmits the received application information of the print servers 4 (PS-1 and PS-2) to the printing environment sharing service 13 (A-1) based on the channel information.

In step S124, the application information obtaining part 46 of the printing environment sharing service 13 (A-1) transmits the received application information of the print servers 4 (PS-1 and PS-2) to the printing environment sharing service 13 (A-1-1) based on the channel information.

In step S125, the application information obtaining part 46 of the printing environment sharing service 13 (A-1-1) transmits the received application information of the print servers 4 (PS-1 and PS-2) to the Web server 1.

Then, the Web server 1 compares the application information obtained in step S125 and the file information of the document selected by the user, and creates a printing location search result screen as shown in FIG. 13B. Then, the Web server 1 presents the printing location search result screen to the user.

Alternatively, in step S110, the application information obtaining part 46 of the printing environment sharing service 13 (A-1-1) may obtain information on the file format of the document selected by the user together with the request to obtain application information. In this case, in step S125, based on the application information of the print servers 4 (PS-1 and PS-2) obtained in step S124, the application information obtaining part 46 of the printing environment sharing service 13 (A-1-1) may transmit to the Web server 1 only the information on an application that supports the file format of the document so that the document is printable.

The Web server 1 and/or the printing environment sharing service 13 (A-1-1) can also search out a printing location where the document specified by the user is printable by the operation shown in FIG. 15.

Next, a description is given, with reference to FIGS. 16 through 19C, of a printer selecting operation. The printer list 72 of each section is introduced to this system to restrict printers available to a person of another section. The printer list 72 may be omitted if all the printers 6 of the section are available to a person of another section. In the following description, it is assumed that the printer lists 72 exist. First, a description is given, with reference to FIG. 16, of the operation of obtaining the printer list 72 when each SPS server 3 stores the printer list 72 (a first printer list obtaining operation).

Figure 16:
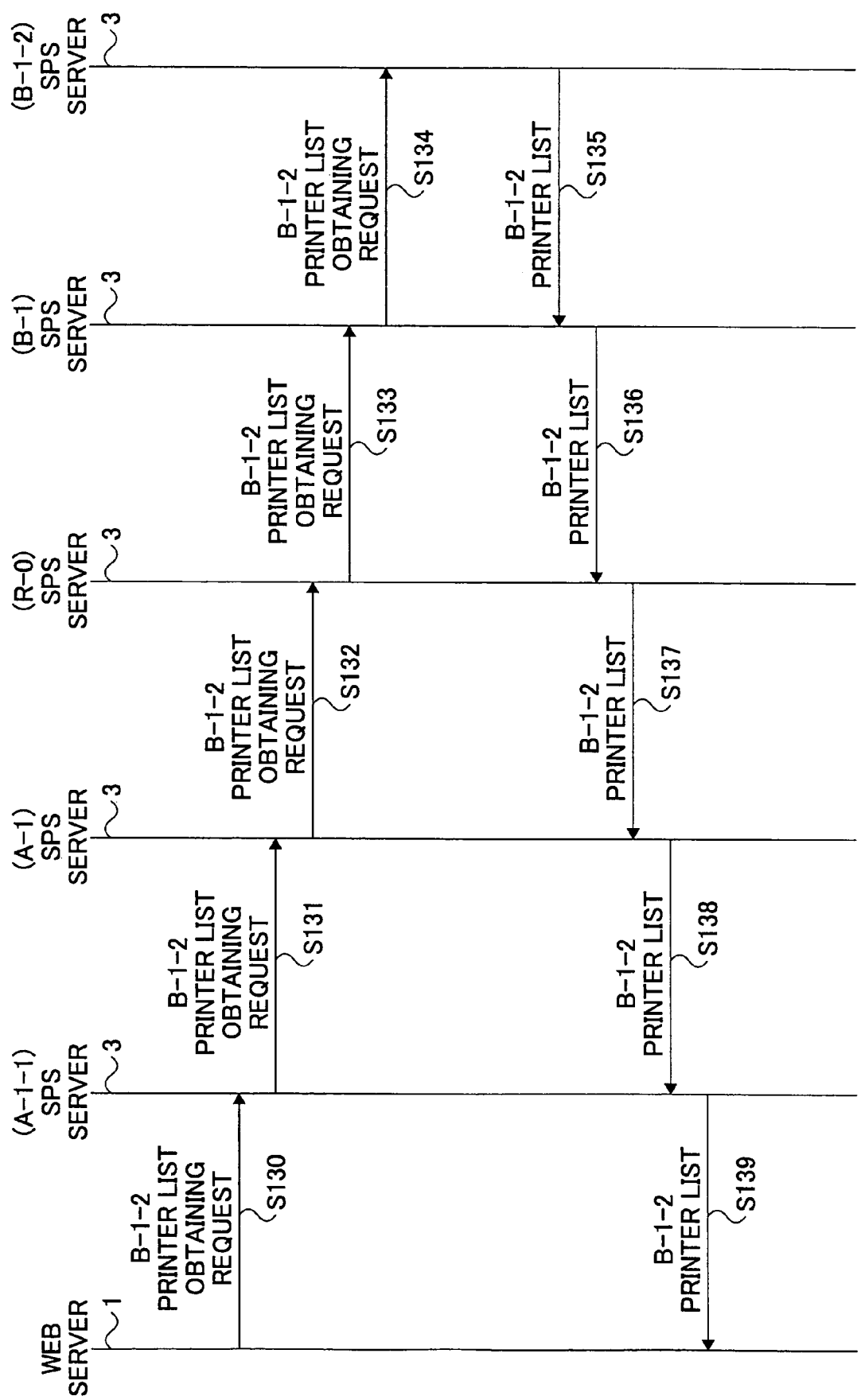
FIG. 16 is a sequence diagram for illustrating a first printer list obtaining operation according to the first embodiment of the present invention.

FIG. 16 is a sequence diagram for illustrating the first printer list obtaining operation.

For instance, when the user taps on a SELECT PRINTER button 174c on the printing location selection confirmation screen of FIG. 7E or a SELECT PRINTER button 192a on the printing location selection confirmation screen of FIG. 13C after the search of the printing location (for instance, the printing environment sharing service 13 [B-1-2]) is completed as described with reference to FIGS. 7A through 7E or FIGS. 13A through 13C, in step S130, the Web server 1 transmits a request to obtain the printer list 72 of the printing environment sharing service 13 (B-1-2) to the printing environment sharing service 13 (A-1-1) in the system configuration of FIG. 3.

The Web server 1 has obtained the channel information to the printing environment sharing service 13 of the printing location (for instance, [A-1-1]→[A-1]→[R-0]→[B-1]→[B-1-2]) in the search of the printing location. Accordingly, the Web server 1 can include the channel information in the request to obtain the printer list 72 at the time of transmitting the request.

When the printing environment sharing service 13 (A-1-1) receives the request to obtain the printer list 72 of the printing environment sharing service 13 (B-1-2), in step S131, the printer list obtaining part 42 of the printing environment sharing service 13 (A-1-1) transmits the request to the printing environment sharing service 13 (A-1) based on the channel information.

When the printing environment sharing service 13 (A-1) receives the request, in step S132, the printer list obtaining part 42 of the printing environment sharing service 13 (A-1) transmits the request to the printing environment sharing service 13 (R-0) based on the channel information.

When the printing environment sharing service 13 (R-0) receives the request, in step S133, the printer list obtaining part 42 of the printing environment sharing service 13 (R-0) transmits the request to the printing environment sharing service 13 (B-1) based on the channel information.

When the printing environment sharing service 13 (B-1) receives the request, in step S134, the printer list obtaining part 42 of the printing environment sharing service 13 (B-1) transmits the request to the printing environment sharing service 13 (B-1-2) based on the channel information.

When the printing environment sharing service 13 (B-1-2) receives the request, in step S135, the printer list obtaining part 42 of the printing environment sharing service 13 (B-1-2) obtains the printer list 72 stored in the SPS server 3 (B-1-2), and transmits the obtained printer list 72 to the printing environment sharing service 13 (B-1) based on the channel information.

In step S136, the printer list obtaining part 42 of the printing environment sharing service 13 (B-1) transmits the received printer list 72 of the printing environment sharing service 13 (B-1-2) to the printing environment sharing service 13 (R-0) based on the channel information.

In step S137, the printer list obtaining part 42 of the printing environment sharing service 13 (R-0) transmits the received printer list 72 of the printing environment sharing service 13 (B-1-2) to the printing environment sharing service 13 (A-1) based on the channel information.

In step S138, the printer list obtaining part 42 of the printing environment sharing service 13 (A-1) transmits the received printer list 72 of the printing environment sharing service 13 (B-1-2) to the printing environment sharing service 13 (A-1-1) based on the channel information.

In step S139, the printer list obtaining part 42 of the printing environment sharing service 13 (A-1-1) transmits the received printer list 72 of the printing environment sharing service 13 (B-1-2) to the Web server 1.

Then, the Web server 1 creates a below-described printer selection screen as shown in FIG. 19A based on the received printer list 72 of the printing environment sharing service 13 (B-1-2), and presents the printer selection screen to the user.

Figure 17:
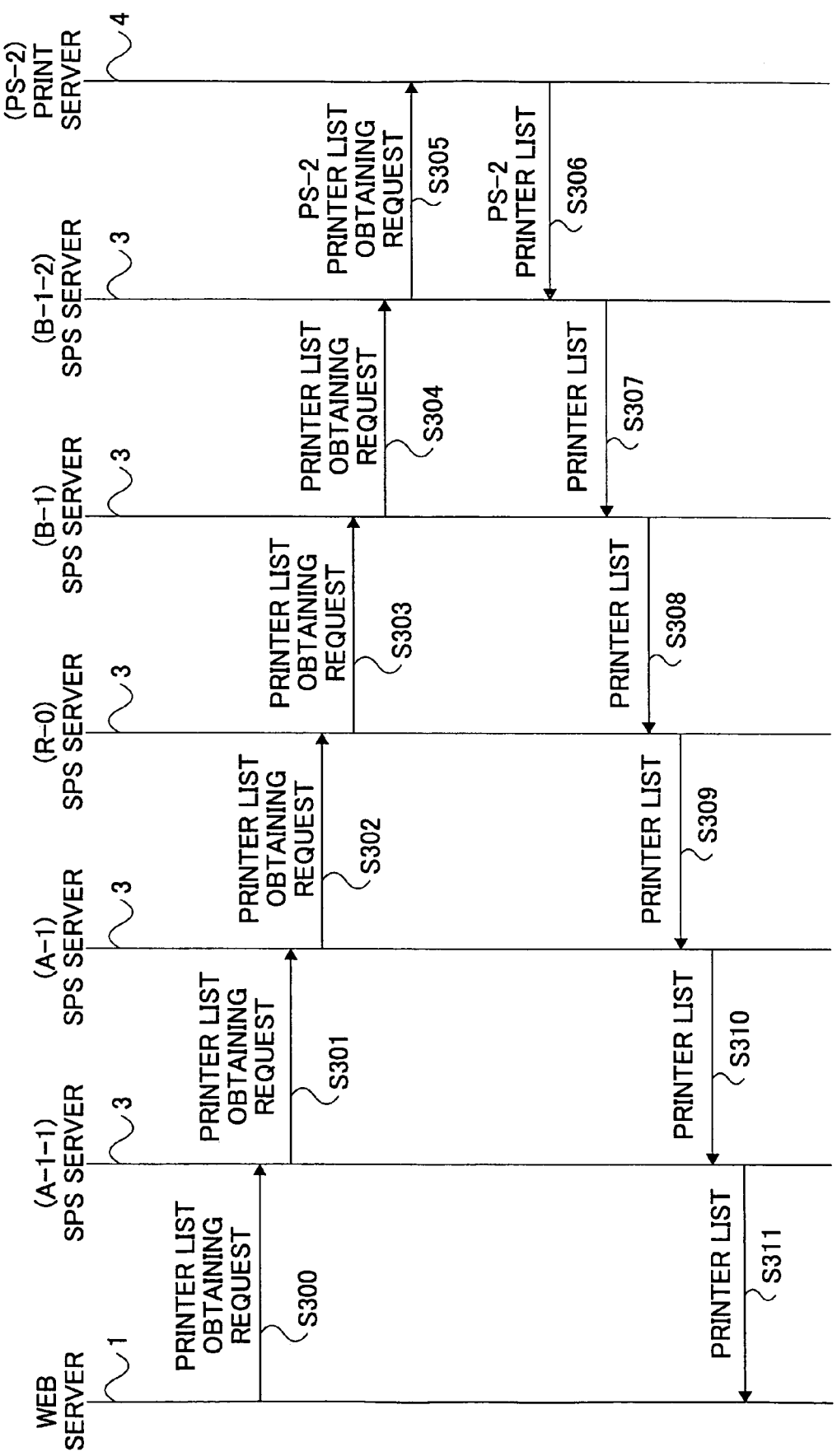
FIG. 17 is a sequence diagram for illustrating a second printer list obtaining operation according to the first embodiment of the present invention.

Next, a description is given, with reference to FIG. 17, of the operation of obtaining the printer list 72 when the each print server 4 stores the printer list 72 (a second printer list obtaining operation).

FIG. 17 is a sequence diagram for illustrating the second printer list obtaining operation.

For instance, when the user taps on the SELECT PRINTER button 174c on the printing location selection confirmation screen of FIG. 7E or the SELECT PRINTER button 192a on the printing location selection confirmation screen of FIG. 13C after the search of the printing location (for instance, the printing environment sharing service 13 [B-1-2]) is completed as described with reference to FIGS. 7A through 7E or FIGS. 13A through 13C, in step S300, the Web server 1 transmits a request to obtain the printer list 72 of a document print service 14 that can be referred to by the printing environment sharing service 13 (B-1-2) to the printing environment sharing service 13 (A-1-1) in the system configuration of FIG. 3.

When the printing environment sharing service 13 (A-1-1) receives the request to obtain the printer list 72 of the document print service 14 that can be referred to by the printing environment sharing service 13 (B-1-2), in step S301, the printer list obtaining part 42 of the printing environment sharing service 13 (A-1-1) transmits the request to the printing environment sharing service 13 (A-1) based on the channel information.

When the printing environment sharing service 13 (A-1) receives the request, in step S302, the printer list obtaining part 42 of the printing environment sharing service 13 (A-1) transmits the request to the printing environment sharing service 13 (R-0) based on the channel information.

When the printing environment sharing service 13 (R-0) receives the request, in step S303, the printer list obtaining part 42 of the printing environment sharing service 13 (R-0) transmits the request to the printing environment sharing service 13 (B-1) based on the channel information.

When the printing environment sharing service 13 (B-1) receives the request, in step S304, the printer list obtaining part 42 of the printing environment sharing service 13 (B-1) transmits the request to the printing environment sharing service 13 (B-1-2) based on the channel information.

When the printing environment sharing service 13 (B-1-2) receives the request to obtain the printer list 72 of the document print service 14 that can be referred to by the printing environment sharing service 13 (B-1-2), in step S305, the printer list obtaining part 42 of the printing environment sharing service 13 (B-1-2) transmits a request to obtain the printer list 72 of the document print service 14 (PS-2) to the document print service 14 (PS-2).

Receiving the request, in step S306, the document print service 14 (PS-2) obtains the printer list 72 stored in, for instance, the print server 4 (PS-2), and transmits the obtained printer list 72 to the printing environment sharing service 13 (B-1-2).

In step S307, the printer list obtaining part 42 of the printing environment sharing service 13 (B-1-2) transmits the received printer list 72 of the document print service 14 (PS-2) to the printing environment sharing service 13 (B-1) based on the channel information.

In step S308, the printer list obtaining part 42 of the printing environment sharing service 13 (B-1) transmits the received printer list 72 of the document print service 14 (PS-2) to the printing environment sharing service 13 (R-0) based on the channel information.

In step S309, the printer list obtaining part 42 of the printing environment sharing service 13 (R-0) transmits the received printer list 72 of the document print service 14 (PS-2) to the printing environment sharing service 13 (A-1) based on the channel information.

In step S310, the printer list obtaining part 42 of the printing environment sharing service 13 (A-1) transmits the received printer list 72 of the document print service 14 (PS-2) to the printing environment sharing service 13 (A-1-1) based on the channel information.

In step S311, the printer list obtaining part 42 of the printing environment sharing service 13 (A-1-1) transmits the received printer list 72 of the document print service 14 (PS-2) to the Web server 1.

Then, the Web server 1 creates a below-described printer selection screen as shown in FIG. 19A based on the received printer list 72 of the document print service 14 (PS-2) that can be referred to by the printing environment sharing service 13 (B-1-2), and presents the printer selection screen to the user.

In the following description, it is assumed for simplification that each SPS server 3 including the printing environment sharing service 13 stores the printer list 72.

FIG. 18 is a diagram for illustrating a configuration of the printer list 72.

The printer list 72 includes the service identification information of a document print service 14 that can be referred to by the corresponding printing environment sharing service 13, the printer identifier (for instance, printer ID) of a printer 6 managed by the document print service 14, and the name of the printer 6 (printer name).

For instance, the printer list 72 shown in FIG. 18 includes the service identification information of the document print service 14 (PS-2) that can be referred to the printing environment sharing service 13 included in the SPS server 3 (B-1-2) storing the printer list 72, the printer ID of the printers 6 (P-2-1 and P-2-2) managed by the document print service 14 (PS-2), and the names of the printers 6 (P-2-1 and P-2-2).

In FIG. 18, however, PS-2, which identifies the document print service 14 (PS-2), is included instead of its service identification information for simplification of description.

FIGS. 19A through 19C are diagrams for illustrating a printer selecting operation.

As described above, when the user taps on the SELECT PRINTER button 174c or 192a on the printing location selection confirmation screen of FIG. 7E or FIG. 13C, the Web server 1 makes a request to obtain the printer list 72 of the printing environment sharing service selected as a printing location, and obtains the printer list 72.

The Web server 1 creates a printer selection screen as shown in FIG. 19A based on the obtained printer list 72, and presents the printer selection screen to the user.

For instance, when the user selects "P-2-2" and taps on an OK button 200a on the printer selection screen of FIG. 19A, the Web server 1 creates a printer selection confirmation screen as shown in FIG. 19B, and presents the printer selection confirmation screen to the user.

For instance, when the user taps on a RESERVE PRINTING button 201a on the printer selection confirmation screen of FIG. 19B, the Web server 1 creates a printing reservation confirmation screen as shown in FIG. 19C, and presents the printing reservation confirmation screen to the user.

In contrast to the printing reservation confirmation screen of FIG. 7G, a printer 6 is set on the printing reservation confirmation screen of FIG. 19C.

For instance, the user may reserve printing by selecting and setting a document to be printed, a printing location, and a printer 6 without setting printing conditions and tapping on a RESERVE button 202a on the printing reservation confirmation screen of FIG. 19C.

In this case, the printing reservation request shown in FIG. 22 or 24 includes the document identifier of the document selected by the user for which document the printing reservation is to be made, document use authorization information to authorize the use of the document, identification information identifying the printing location, channel information to the printing location, and identification information identifying the selected printer 6.

As shown in FIGS. 16 through 19C, for instance, the user can select a printer 6 and make a printing reservation by the Web server 1 and/or the printing environment sharing service 13 (A-1-1) obtaining the printer list 72.

Figure 20:
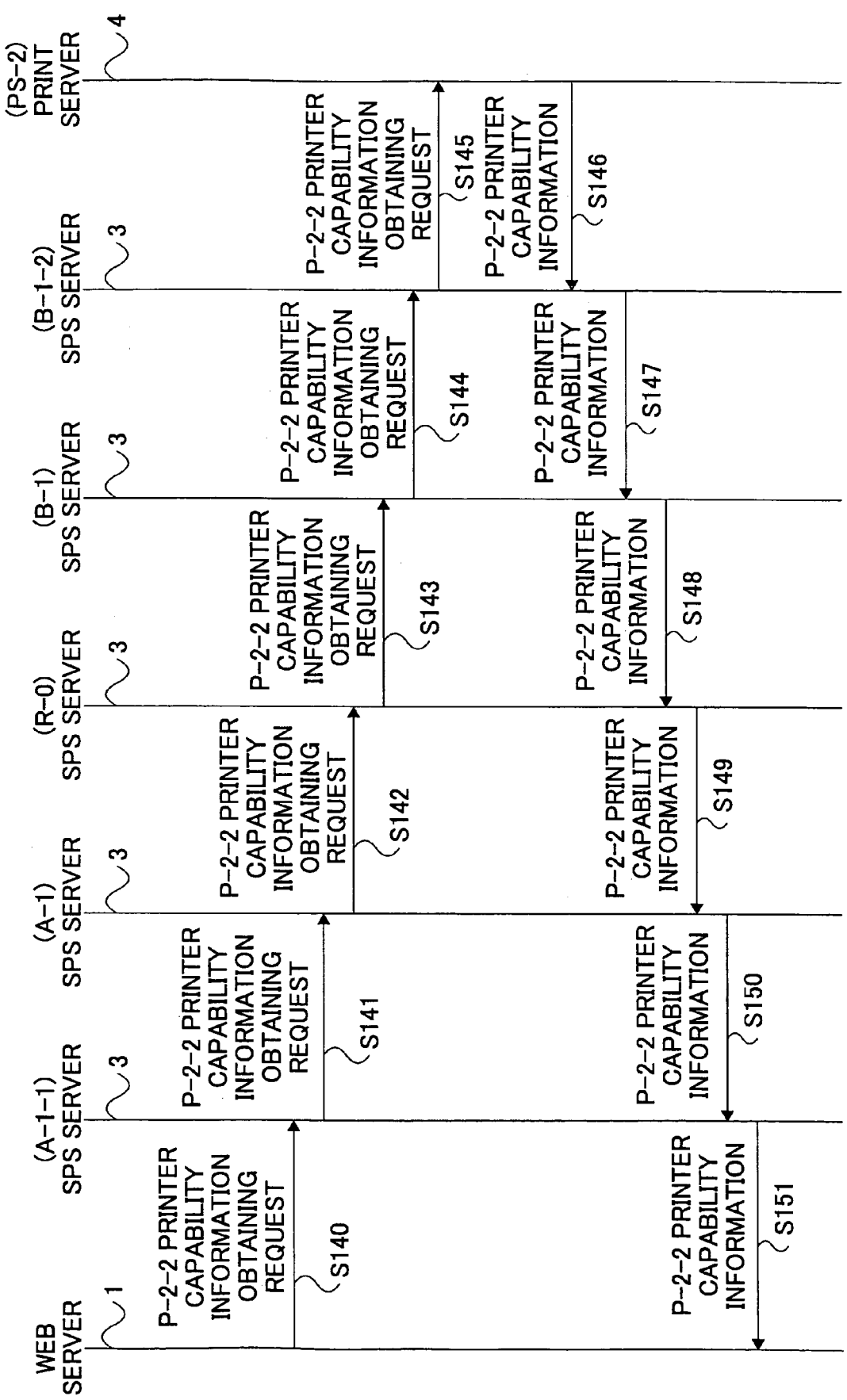
FIG. 20 is a sequence diagram for illustrating a printer capability information obtaining operation according to the first embodiment of the present invention.

Next, a description is given, with reference to FIG. 20, of the operation of obtaining the capability information of a printer 6.

FIG. 20 is a sequence diagram for illustrating the printer capability information obtaining operation.

For instance, as shown in FIGS. 19A and 19B, when the user has selected a printer 6 and taps on a SET PRINTING CONDITIONS button 201b on the printer selection confirmation screen of FIG. 19B, in step S140 of FIG. 20, the Web server 1 transmits a request to obtain the capability information of the printer 6 (P-2-2) to the printing environment sharing service 13 (A-1-1) in the system configuration of FIG. 3.

When the printing environment sharing service 13 (A-1-1) receives the request to obtain the capability information of the printer 6 (P-2-2), in step S141, the printer capability information obtaining part 45 of the printing environment sharing service 13 (A-1-1) transmits the request to the printing environment sharing service 13 (A-1) based on the channel information.

When the printing environment sharing service 13 (A-1) receives the request, in step S142, the printer capability information obtaining part 45 of the printing environment sharing service 13 (A-1) transmits the request to the printing environment sharing service 13 (R-0) based on the channel information.

When the printing environment sharing service 13 (R-0) receives the request, in step S143, the printer capability information obtaining part 45 of the printing environment sharing service 13 (R-0) transmits the request to the printing environment sharing service 13 (B-1) based on the channel information.

When the printing environment sharing service 13 (B-1) receives the request, in step S144, the printer capability information obtaining part 45 of the printing environment sharing service 13 (B-1) transmits the request to the printing environment sharing service 13 (B-1-2) based on the channel information.

When the printing environment sharing service 13 (B-1-2) receives the request, in step S145, the printer capability information obtaining part 45 of the printing environment sharing service 13 (B-1-2) transmits the request to the document print service 14 (PS-2).

Receiving the request, in step S146, the document print service 14 (PS-2) obtains the capability information of the printer 6 (P-2-2) stored in, for instance, the print server 4 (PS-2), and transmits the obtained capability information to the printing environment sharing service 13 (B-1-2).

In step S147, the printer capability information obtaining part 45 of the printing environment sharing service 13 (B-1-2) transmits the received capability information of the printer 6 (P-2-2) to the printing environment sharing service 13 (B-1) based on the channel information.

In step S148, the printer capability information obtaining part 45 of the printing environment sharing service 13 (B-1) transmits the received capability information of the printer 6 (P-2-2) to the printing environment sharing service 13 (R-0) based on the channel information.

In step S149, the printer capability information obtaining part 45 of the printing environment sharing service 13 (R-0) transmits the received capability information of the printer 6 (P-2-2) to the printing environment sharing service 13 (A-1) based on the channel information.

In step S150, the printer capability information obtaining part 45 of the printing environment sharing service 13 (A-1) transmits the received capability information of the printer 6 (P-2-2) to the printing environment sharing service 13 (A-1-1) based on the channel information.

In step S151, the printer capability information obtaining part 45 of the printing environment sharing service 13 (A-1-1) transmits the received capability information of the printer 6 (P-2-2) to the Web server 1.

Then, the Web server 1 creates a below-described printing condition setting screen as shown in FIG. 21A based on the received capability information of the printer 6 (P-2-2), and presents the printing condition setting screen to the user.

FIGS. 21A and 21B are diagrams for illustrating a printing condition setting operation.

As described above, for instance, when the user taps on the SET PRINTING CONDITIONS button 201b on the printer selection confirmation screen of FIG. 19B, the Web server 1 makes a request to obtain the capability information of the selected printer 6, and obtains the capability information of the selected printer 6.

The Web server 1 creates a printing condition setting screen as shown in FIG. 21A based on the obtained capability information of the printer 6, and presents the printing condition setting screen to the user.

When the user sets printing conditions as the user desires and taps on a RESERVE PRINTING button 210a on the printing condition setting screen of FIG. 21A, the Web server 1 creates a printing reservation confirmation screen as shown in FIG. 21B, and presents the printing reservation confirmation screen to the user.

In contrast to the printing reservation confirmation screen of FIG. 19C, printing conditions are set in the printing reservation confirmation screen of FIG. 21B.

The user may make a printing reservation by setting, for instance, a document to be printed, a printing location, a printer, and printing conditions and tapping on a RESERVE button 211*a* on the printing reservation confirmation screen of FIG. 21B.

In this case, the printing reservation request shown in FIG. 22 or 24 includes the document identifier of the document selected by the user for which document the printing reservation is to be made, document use authorization information to authorize the use of the document, identification information identifying the printing location, channel information to the printing location, identification information identifying the selected printer, and the printing conditions.

As described with reference to FIGS. 20, 21A, and 21B, for instance, the user may set printing conditions after a printing location and a printer and reserve printing by the Web server 1 and/or the printing environment sharing service 13 (A-1-1) obtaining printer capability information.

Next, a description is given, with reference to FIGS. 22, 23A, and 23B, of the requesting of a printing reservation and a printing start.

FIG. 22 is a sequence diagram for illustrating a first operation of requesting a printing reservation and a printing start. FIGS. 23A and 23B are diagrams for illustrating the start of printing.

For instance, when the user taps on the RESERVE button 211*a* on the printing reservation confirmation screen of FIG. 21B, in step S160 of FIG. 22, the Web server 1 transmits a printing reservation request to the printing environment sharing service 13 (A-1-1) in the system configuration of FIG. 3.

When the printing environment sharing service 13 (A-1-1) receives the printing reservation request, the printing reservation control part 51 of the printing environment sharing service 13 (A-1-1) provides a document identifier and document use authorization information included in the printing reservation request to the document data obtaining part 43, and makes a request to obtain document data (a document data obtaining request).

In step S161, the document data obtaining part 43 of the printing environment sharing service 13 (A-1-1) transmits the document data obtaining request including the document identifier and the document use authorization information to the repository service 12.

Receiving the document data obtaining request, in step S162, the repository service 12 determines the validity of the document use authorization information included in the document data obtaining request, and when the repository service 12 determines that the document use authorization information is valid, the repository service 12 obtains the document data corresponding to the document identifier from the repository server 2, and transmits the obtained document data to the printing environment sharing service 13 (A-1-1).

When the document data obtaining part 43 of the printing environment sharing service 13 (A-1-1) receives the document data, the printing reservation control part 51 instructs the data transfer part 44 to transfer reservation information (for instance, identification information identifying a printing location, identification information identifying a printer 6, printing conditions, and channel information to the printing location) included in the printing reservation request received from the Web server 1 and the obtained document data.

Then, in step S163, the data transfer part 44 of the printing environment sharing service 13 (A-1-1) transfers the reservation information and the document data to the printing environment sharing service 13 (A-1) based on the channel information to the printing location included in the reservation information.

When the printing environment sharing service 13 (A-1) receives the reservation information and the document data, in step S164, the data transfer part 44 of the printing environment sharing service 13 (A-1) transfers the reservation information and the document data to the printing environment sharing service 13 (R-0) based on the channel information to the printing location included in the reservation information.

When the printing environment sharing service 13 (R-0) receives the reservation information and the document data, in step S165, the data transfer part 44 of the printing environment sharing service 13 (R-0) transfers the reservation information and the document data to the printing environment sharing service 13 (B-1) based on the channel information to the printing location included in the reservation information.

When the printing environment sharing service 13 (B-1) receives the reservation information and the document data, in step S166, the data transfer part 44 of the printing environment sharing service 13 (B-1) transfers the reservation information and the document data to the printing environment sharing service 13 (B-1-2) based on the channel information to the printing location included in the reservation information.

Receiving the reservation information and the document data, the printing reservation control part 51 of the printing environment sharing service 13 (B-1-2) stores the reservation information and the document data in the HDD 39 of the SPS server 3 (B-1-2).

On the other hand, based on a request from the user, the Web server 1 creates a printing reservation selection screen as shown in FIG. 23A, which displays a list of reservations that can be referred to by the user, and presents the printing reservation selection screen to the user.

For instance, when the user selects RESERVATION 1 and taps on a RESERVATION CONTENTS button 220*a* on the printing reservation selection screen of FIG. 23A, the Web server 1 creates a printing reservation contents display screen as shown in FIG. 23B, and presents the printing reservation contents display screen to the user.

For instance, when the user confirms the reservation contents and taps on a PRINT button 221*a* on the printing reservation contents display screen of FIG. 23B, in step S167 of FIG. 22, the Web server 1 transmits a printing start request to the printing environment sharing service 13 (A-1-1) in the system configuration of FIG. 3.

When the printing environment sharing service 13 (A-1-1) receives the printing start request, in step S168, the printing start control part 52 of the printing environment sharing service 13 (A-1-1) transmits the printing start request to the printing environment sharing service 13 (A-1) based on the channel information to the printing location included in the printing start request.

When the printing environment sharing service 13 (A-1) receives the printing start request, in step S169, the printing start control part 52 of the printing environment sharing service 13 (A-1) transmits the printing start request to the printing environment sharing service 13 (R-0) based on the channel information to the printing location included in the printing start request.

When the printing environment sharing service 13 (R-0) receives the printing start request, in step S170, the printing start control part 52 of the printing environment sharing service 13 (R-0) transmits the printing start request to the printing environment sharing service 13 (B-1) based on the channel information to the printing location included in the printing start request.

When the printing environment sharing service 13 (B-1) receives the printing start request, in step S171, the printing start control part 52 of the printing environment sharing service 13 (B-1) transmits the printing start request to the printing environment sharing service 13 (B-1-2) based on the channel information to the printing location included in the printing start request.

When the printing environment sharing service 13 (B-1-2) receives the printing start request, in step S172, the printing start control part 52 of the printing environment sharing service 13 (B-1-2) obtains the reservation information and the document data stored in the HDD 39 of the SPS server 3 (B-1-2), and transmits a printing start request including the reservation information and the document data to the document print service 14 (PS-2).

Receiving the printing start request including the reservation information and the document data, in step S173, the document print service 14 (PS-2) converts the document data into printing data printable on the specified printer 6 (P-2-2), and transmits a printing start request including the printing data to the printer 6 (P-2-2) included in the reservation information.

Receiving the printing start request, the printer 6 (P-2-2) prints the printing data included in the printing start request.

As shown in FIG. 22 and/or FIGS. 23A and 23B, each printing environment sharing service 13 can transfer printing reservation information and document data to the printing environment sharing service 13 of a printing location based on channel information to the printing location obtained using, for instance, the service list, and make a printing reservation.

Further, each printing environment sharing service 13 can transmit a printing start request to the SPS server 3 of a printing location storing printing reservation information and document data based on channel information to the printing location obtained using, for instance, the service list, and request the document print service 14 managing the specified printer 6 to start printing.

Next, a description is given, with reference to FIGS. 24A through 24C, of a second operation of requesting a printing reservation and a printing start.

FIG. 24A through 24C are sequence diagrams for illustrating the other printing reservation requesting operation and the other printing start requesting operation.

For instance, in the case of searching out a printing location by the method described with reference to FIGS. 13A through 15, an application that can print out the document selected by the user always exists at the selected printing location. Accordingly, a printing reservation can be made and printing can be performed by the operation shown in FIG. 22.

However, in the case of selecting a printing location by the method described with reference to FIGS. 7A through 8 or the method described with reference to FIGS. 10A through 12, an application that can print out the document selected by the user may not always exist in a print server 4 that can communicate with the printing environment sharing service 13 selected as the printing location.

A description is given below of the case where conversion from document data into printing data is performed at a location where an application that can print the document selected by the user is stored and the printing data is transferred to a printing location selected by the user.

For instance, when the user taps on the RESERVE button 211a on the printing reservation confirmation screen of FIG. 21B, in step S180 of FIG. 24A, the Web server 1 transmits a printing reservation request to the printing environment sharing service 13 (A-1-1) in the system configuration of FIG. 3.

When the printing environment sharing service 13 (A-1-1) receives the printing reservation request, the printing reservation control part 51 of the printing environment sharing service 13 (A-1-1) provides channel information to the printing location (the printing environment sharing service 13 [B-1-2]) included in the printing reservation request to the application information obtaining part 46, and requests the application information obtaining part 46 to obtain application information stored in a print server 4 that can communicate with the printing environment sharing service 13 (B-1-1) in the vicinity of the printing environment sharing service 13 (B-1-2).

Then, in step S181, the application information obtaining part 46 of the printing environment sharing service 13 (A-1-1) transmits a request to obtain the application information (an application information obtaining request) to the printing environment sharing service 13 (A-1) based on the channel information.

When the printing environment sharing service 13 (A-1) receives the application information obtaining request, in step S182, the application information obtaining part 46 of the printing environment sharing service 13 (A-1) transmits the application information obtaining request to the printing environment sharing service 13 (R-0) based on the channel information.

When the printing environment sharing service 13 (R-0) receives the application information obtaining request, in step S183, the application information obtaining part 46 of the printing environment sharing service 13 (R-0) transmits the application information obtaining request to the printing environment sharing service 13 (B-1) based on the channel information.

When the printing environment sharing service 13 (B-1) receives the application information obtaining request, in step S184, the application information obtaining part 46 of the printing environment sharing service 13 (B-1) transmits a request to obtain application information stored in a print server 4 that can communicate with the printing environment sharing service 13 (B-1-1) to the printing environment sharing service 13 (B-1-1) based on the channel information.

When the printing environment sharing service 13 (B-1-1) receives the application information obtaining request, in step S185, the application information obtaining part 46 of the printing environment sharing service 13 (B-1-1) transmits the application information obtaining request to the document print service 14 (PS-1).

Receiving the application information obtaining request, in step S186, the document print service 14 (PS-1) obtains application information stored in, for instance, the print server 4 (PS-1), and transmits the obtained application information to the printing environment sharing service 13 (B-1-1).

In step S187, the application information obtaining part 46 of the printing environment sharing service 13 (B-1-1) transmits the received application information to the printing environment sharing service 13 (B-1) based on the channel information.

Further, in step S188, the application information obtaining part 46 of the printing environment sharing service 13 (B-1) transmits a request to obtain application information stored in a print server 4 that can communicate with the printing environment sharing service 13 (B-1-2) to the printing environment sharing service 13 (B-1-2) based on the channel information.

When the printing environment sharing service 13 (B-1-2) receives the application information obtaining request, in step S189, the application information obtaining part 46 of the printing environment sharing service 13 (B-1-2) transmits the application information obtaining request to the document print service 14 (PS-2).

Receiving the application information obtaining request, in step S190 of FIG. 24B, the document print service 14 (PS-2) obtains application information stored in, for instance, the print server 4 (PS-2), and transmits the obtained application information to the printing environment sharing service 13 (B-1-2).

In step S191, the application information obtaining part 46 of the printing environment sharing service 13 (B-1-2) transmits the received application information to the printing environment sharing service 13 (B-1) based on the channel information.

Here, either one of the operation of steps S184 through S187 and the operation of steps S188 through S191 may be performed earlier than the other. Further, the application information obtaining part 46 of the printing environment sharing service 13 (B-1) may transmit the application information obtaining request of step S184 and the application information obtaining request of step S188 at the same time.

In step S192, the application information obtaining part 46 of the printing environment sharing service 13 (B-1) transmit the application information of the print server 4 (PS-1) received in step S187 and the application information of the print server 4 (PS-2) received in step S191 to the printing environment sharing service 13 (R-0) based on the channel information.

In step S193, the application information obtaining part 46 of the printing environment sharing service 13 (R-0) transmit the received application information of the print servers 4 (PS-1 and PS-2) to the printing environment sharing service 13 (A-1) based on the channel information.

In step S194, the application information obtaining part 46 of the printing environment sharing service 13 (A-1) transmit the received application information of the print servers 4 (PS-1 and PS-2) to the printing environment sharing service 13 (A-1-1) based on the channel information.

The application information obtaining part 46 of the printing environment sharing service 13 (A-1-1) obtains the application information of the print servers 4 (PS-1 and PS-2) to the effect that, for instance, a Microsoft Word® application is stored in the print server 4 (PS-1) but not in the print server 4 (PS-2).

Meanwhile, when the printing environment sharing service 13 (A-1-1) receives the printing reservation request, the printing reservation control part 51 of the printing environment sharing service 13 (A-1-1) provides a document identifier and document use authorization information included in the printing reservation request to the document data obtaining part 43, and requests the document data obtaining part 43 to obtain document data.

Then, in step S195 of FIG. 24B, the document data obtaining part 43 of the printing environment sharing service 13 (A-1-1) transmits a request to obtain document data (a document data obtaining request) including the document identifier and the document use authorization information to the repository service 12.

Receiving the document data obtaining request, in step S196, the repository service 12 determines the validity of the document use authorization information included in the document data obtaining request, and when the repository service 12 determines that the document use authorization information is valid, the repository service 12 obtains the document data corresponding to the document identifier from the repository server 2, and transmits the obtained document data to the printing environment sharing service 13 (A-1-1).

When the document data obtaining part 43 of the printing environment sharing service 13 (A-1-1) obtains the document data, the printing reservation control part 51 determines the file format of the document data. For instance, if the file format of the obtained document data is Microsoft Word®, the printing reservation control part 51 of the printing environment sharing service 13 (A-1-1) determines, based on the obtained application information, that the print server 4 (PS-1) convert the document data into printing data. Then, the printing reservation control part 51 of the printing environment sharing service 13 (A-1-1) instructs the data transfer part 44 to transfer reservation information (for instance, identification information identifying a printing location, identification information identifying a printer 6, printing conditions, and channel information to the printing location) included in the printing reservation request received from the Web server 1, the obtained document data, and document conversion information related to conversion of the document data based on the obtained application information (for instance, the identification information of a document print service 14 that converts the document data, the identification information of a printing environment sharing service 13 that can communicate with the document print service 14, channel information to the printing environment sharing service 13, and printing condition information).

Then, in step S197, the data transfer part 44 of the printing environment sharing service 13 (A-1-1) transfers the reservation information, the document data, and the document conversion information to the printing environment sharing service 13 (A-1) based on the channel information to the printing location included in the reservation information and the channel information to the printing environment sharing service 13 included in the document conversion information.

When the printing environment sharing service 13 (A-1) receives the reservation information, the document data, and the document conversion information, in step S198, the data transfer part 44 of the printing environment sharing service 13 (A-1) transfers the reservation information, the document data, and the document conversion information to the printing environment sharing service 13 (R-0) based on the channel information to the printing location included in the reservation information and the channel information to the printing environment sharing service 13 included in the document conversion information.

When the printing environment sharing service 13 (R-0) receives the reservation information, the document data, and the document conversion information, in step S199, the data transfer part 44 of the printing environment sharing service 13 (R-0) transfers the reservation information, the document data, and the document conversion information to the printing environment sharing service 13 (B-1) based on the channel information to the printing location included in the reservation information and the channel information to the printing environment sharing service 13 included in the document conversion information.

When the printing environment sharing service 13 (B-1) receives the reservation information, the document data, and the document conversion information, in step S200, the data transfer part 44 of the printing environment sharing service 13 (B-1) transfers the document data and the document conversion information to the printing environment sharing service 13 (B-1-1) based on the channel information to the printing environment sharing service 13 included in the document conversion information.

When the printing environment sharing service 13 (B-1-1) receives the document data and the document conversion information, in step S201, the conversion request transmission part 91 of the printing environment sharing service 13 (B-1-1) transmits a request to convert the document data into printing data including the document data to the document print service 14 (PS-1) based on the identification information of the document print service 14 that converts the document data, the identification information being included in the document conversion information.

Receiving the conversion request, in step S202 of FIG. 24C, the document print service 14 (PS-1) converts the document data into printing data based on the request, and transmits the printing data to the printing environment sharing service 13 (B-1-1).

For instance, the document print service 14 converts the document data into printing data of PDF (Portable Document Format), TIFF (Tagged Image File Format), or PS (Post-Script).

When the printing data reception part 92 of the printing environment sharing service 13 (B-1-1) receives the printing data, in step S203, the printing data reception part 92 provides the printing data to the data transfer part 44, and the data transfer part 44 transfers the printing data to the printing environment sharing service 13 (B-1) based on the channel information.

When the printing environment sharing service 13 (B-1) receives the printing data, in step S204, the data transfer part 44 of the printing environment sharing service 13 (B-1) transfers the reservation information and the printing data to the printing environment sharing service 13 (B-1-2) based on the channel information to the printing location included in the reservation information.

When the printing environment sharing service 13 (B-1-2) receives the reservation information and the printing data, the printing environment sharing service 13 (B-1-2) stores the reservation information and the printing data in the HDD 39 of the SPS server 3 (B-1-2).

As described above, for instance, when the user confirms the reservation contents and taps on the PRINT button 221*a* on the printing reservation contents display screen of FIG. 23B, in step S205 of FIG. 24C, the Web server 1 transmits a printing start request to the printing environment sharing service 13 (A-1-1) in the system configuration of FIG. 3.

When the printing environment sharing service 13 (A-1-1) receives the printing start request, in step S206, the printing start control part 52 of the printing environment sharing service 13 (A-1-1) transmits the printing start request to the printing environment sharing service 13 (A-1) based on the channel information to the printing location included in the printing start request.

When the printing environment sharing service 13 (A-1) receives the printing start request, in step S207, the printing start control part 52 of the printing environment sharing service 13 (A-1) transmits the printing start request to the printing environment sharing service 13 (R-0) based on the channel information to the printing location included in the printing start request.

When the printing environment sharing service 13 (R-0) receives the printing start request, in step S208, the printing start control part 52 of the printing environment sharing service 13 (R-0) transmits the printing start request to the printing environment sharing service 13 (B-1) based on the channel information to the printing location included in the printing start request.

When the printing environment sharing service 13 (B-1) receives the printing start request, in step S209, the printing start control part 52 of the printing environment sharing service 13 (B-1) transmits the printing start request to the printing environment sharing service 13 (B-1-2) based on the channel information to the printing location included in the printing start request.

When the printing environment sharing service 13 (B-1-2) receives the printing start request, in step S210, the printing start control part 52 of the printing environment sharing service 13 (B-1-2) obtains the reservation information and the printing data stored in the HDD 39 of the SPS server 3 (B-1-2), and transmits a printing start request including the printing data to the document print service 14 (PS-2).

Receiving the printing start request including the printing data, in step S211, the document print service 14 (PS-2) transmits a printing start request including the printing data to the printer 6 (P-2-2) included in the reservation information.

Receiving the printing start request, the printer 6 (P-2-2) prints the printing data included in the printing start request.

By performing the operation shown in FIGS. 24A through 24C, the user can print a document selected by the user immediately at a printing location selected by the user even if an application that can print the document selected by the user does not exist at the printing location selected by the user.

Next, a description is given, with reference to FIG. 25, of another system configuration implementing the present invention.

FIG. 25 is a block diagram showing a system configuration according to the first embodiment of the present invention.

In the above-described cases, for instance, as shown in FIGS. 24A through 24C, conversion of document data into printing data is performed in the document print service 14 of a print server 4. Alternatively, as shown in FIG. 25, the conversion servers 9 (CS-A and CS-B) may be added to the system so that conversion of document data into printing data is performed in the conversion server 9 (CS-A or CS-B).

In FIG. 25, each section includes the conversion server 9. However, the conversion server 9 may be installed in any location. Further, the entire system may share one conversion server 9. When the conversion server 9 receives a conversion request from any printing environment sharing service 13, the conversion server 9 converts document data into printing data based on the request, and transmits the printing data to the printing environment sharing service 13. The conversion server 9 converts the document data into printing data of, for instance, PDF, TIFF, or PS. The conversion server 9 retains the pre-conversion document data and the post-conversion printing data so that the document data and the printing data are correlated with each other.

Figure 26:
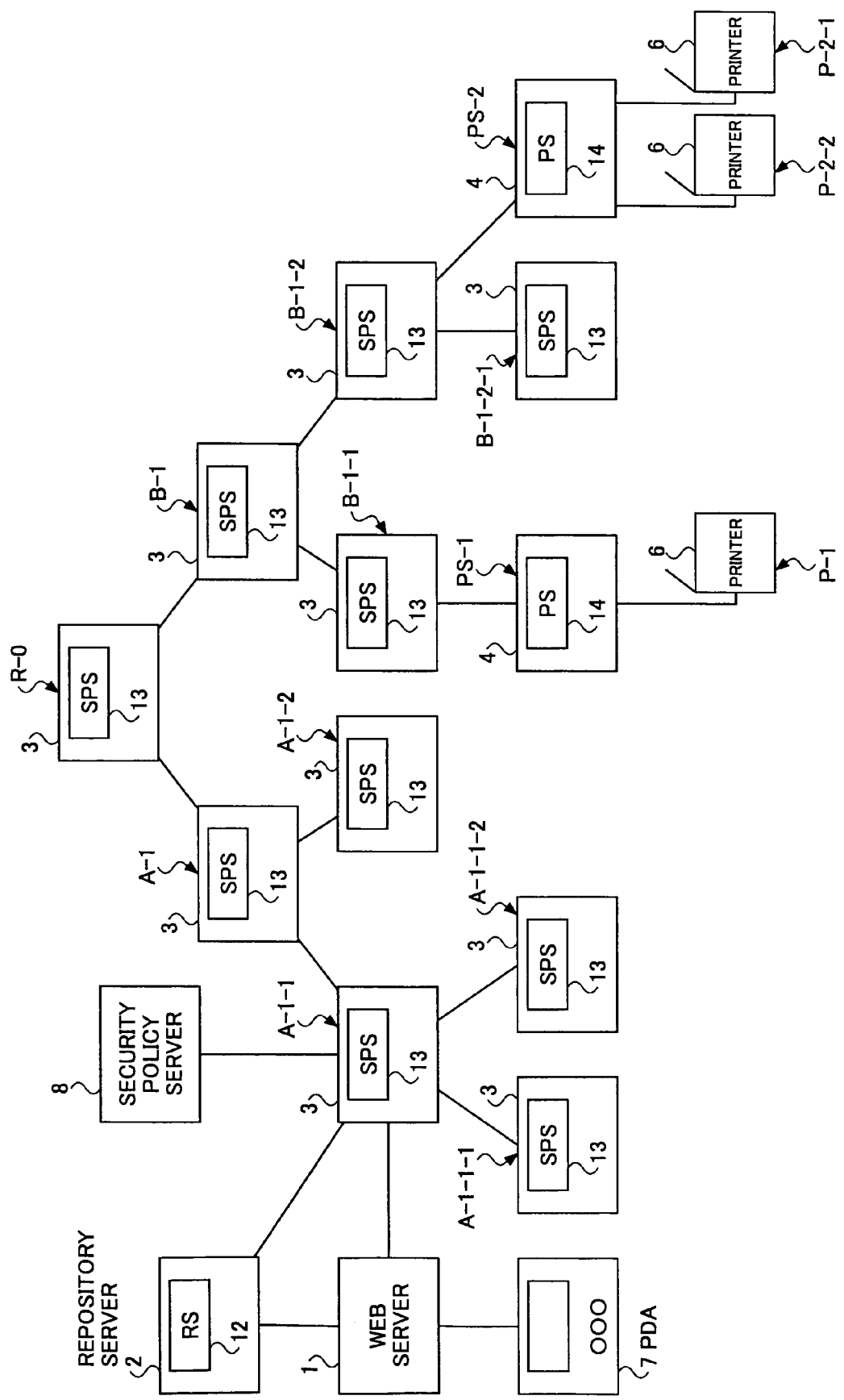
FIG. 26 is a block diagram showing yet another system configuration according to the first embodiment of the present invention.

Next, a description is given, with reference to FIG. 26, of yet another system configuration implementing the present invention.

FIG. 26 is a block diagram showing a system configuration according to the first embodiment of the present invention.

In contrast to the system configuration of FIG. 3, the security policy server 8 managing the security policy of documents is newly added to the system according to the system configuration of FIG. 26.

The security policy server 8 manages security policy information including document identifiers identifying documents, the security level of each document set for each corresponding document identifier, and information on printing locations authorized to print the documents, the printing locations corresponding to the security levels of the documents.

Figure 27:
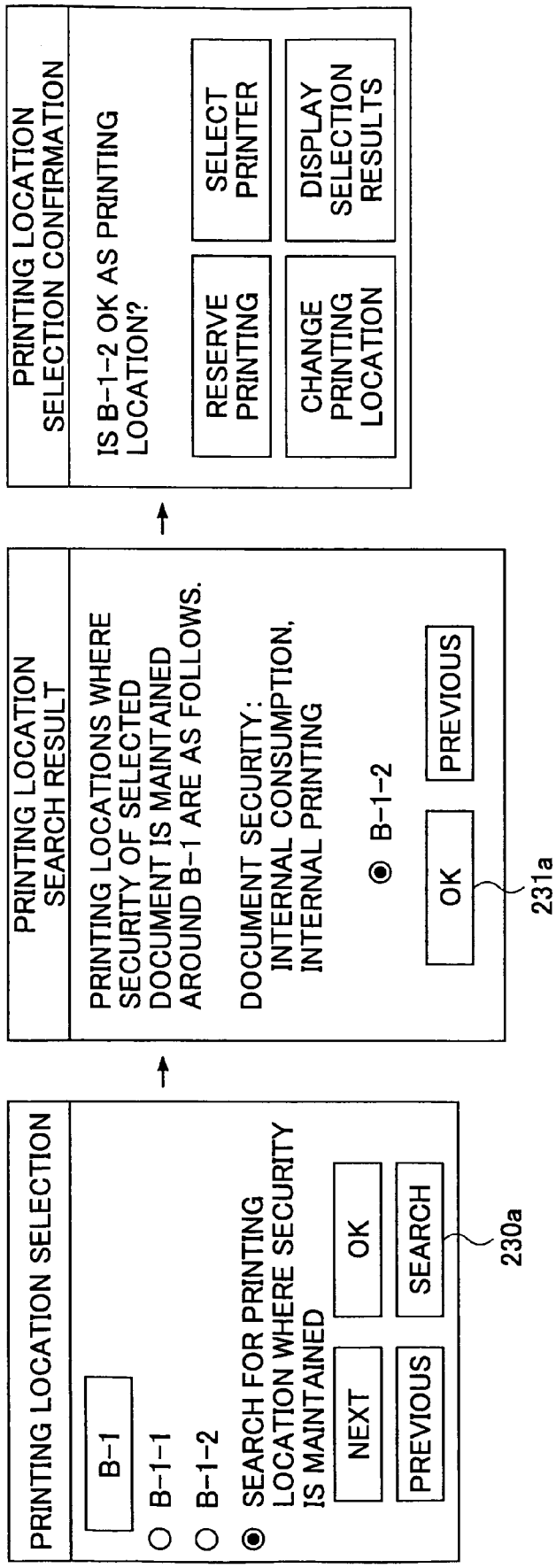
FIGS. 27A through 27C are diagrams for illustrating a fifth printing location search operation according to the first embodiment of the present invention.

A description is given below, with reference to FIGS. 27A through 28, of a fifth printing location search operation in the system configuration of FIG. 26.

Figure 28:
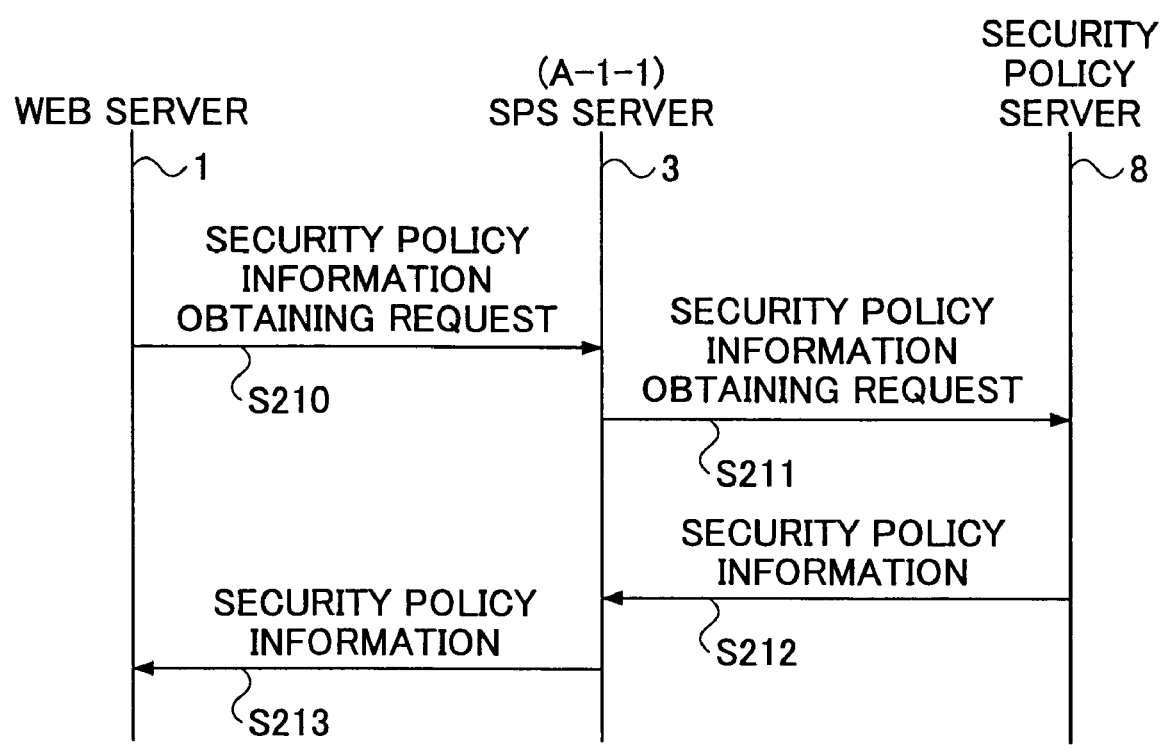
FIG. 28 is a sequence diagram for illustrating the fifth printing location search operation according to the first embodiment of the present invention.

FIGS. 27A through 27C are diagrams and FIG. 28 is a sequence diagram for illustrating the fifth printing location search operation.

The Web server creates, for instance, a printing location selection screen as shown in FIG. 27A based on the service lists 71 of the printing environment sharing services 13, and presents the printing location selection screen to the user.

FIG. 27A shows a printing location selection screen in the case where the user has made selections up to the printing location (B-1) as described with reference to FIGS. 7A through 7D.

In contrast to the printing location selection screen of FIG. 7D, the printing location selection screen of FIG. 27A additionally includes the option of SEARCH FOR PRINTING LOCATION WHERE SECURITY IS MAINTAINED.

For instance, when the user selects SEARCH FOR PRINTING LOCATION WHERE SECURITY IS MAINTAINED and taps on a SEARCH button 230a on the printing location selection screen of FIG. 27A, in step S210 of FIG. 28, the Web server 1 transmits a request to obtain security policy information (a security policy information obtaining request) to the printing environment sharing service 13 (A-1-1), the request including a document identifier that identifies the document that the user has specified at the time of making a printing reservation.

When the printing environment sharing service 13 (A-1-1) receives the security policy information obtaining request, in step S211, the security policy information obtaining part 93 of the printing environment sharing service 13 (A-1-1) transmits the request to the security policy server 8.

When the security policy server 8 receives the request, in step S212, the security policy server 8 obtains the security policy information of the document from the HDD of the security policy server 8 based on the document identifier included in the request, and transmits the obtained security information to the printing environment sharing service 13 (A-1-1).

In step S213, the security policy information obtaining part 93 of the printing environment sharing service 13 (A-1-1) transmits the received security policy information to the Web server 1.

Then, the Web server 1 creates a printing location search result screen as shown in FIG. 27B based on the received security policy information, and presents the printing location search result screen to the user.

For instance, when the user selects one of the search results and taps on an OK button 231a on the printing location search result screen of FIG. 27B (in this case, only one search result is shown in FIG. 27B for simplification), the Web server 1 creates a printing location selection confirmation screen as shown in FIG. 27C, and presents the printing location selection confirmation screen to the user.

The user can search out a printing location where the security of a selected document can be maintained by performing the operation shown in FIGS. 27A through 27C and/or FIG. 28.

Figure 30:
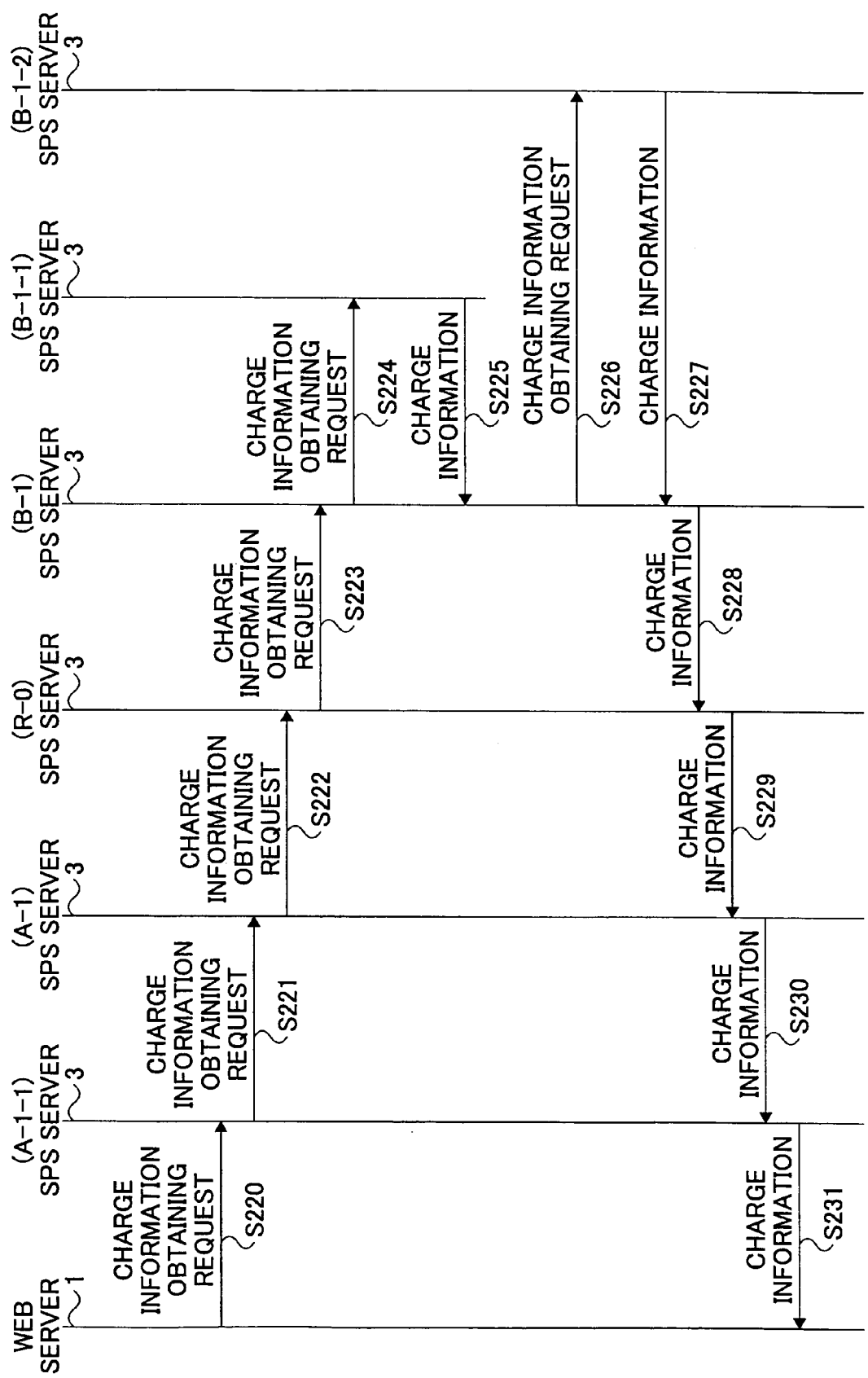
FIG. 30 is a sequence diagram for illustrating the sixth printing location search shown operation according to the first embodiment of the present invention.

Next, a description is given, with reference to FIGS. 29A through 30, of a sixth printing location search operation.

FIGS. 29A through 29C are diagrams and FIG. 30 is a sequence diagram for illustrating the sixth printing location search operation.

In the system configuration of FIG. 3, the Web server 1 creates, for instance, a printing location selection screen as shown in FIG. 29A based on the service lists 71 of the printing environment sharing services 13, and presents the printing location selection screen to the user.

FIG. 29A shows a printing location selection screen in the case where the user has made selections up to the printing location (B-1) as described with reference to FIGS. 7A through 7D.

In contrast to the printing location selection screen of FIG. 7D, the printing location selection screen of FIG. 27A additionally includes the option of ASCENDING ORDER OF CHARGES.

For instance, when the user selects ASCENDING ORDER OF CHARGES and taps on a SEARCH button 240a on the printing location selection screen of FIG. 29A, in step S220 of FIG. 30, the Web server 1 transmits a request to obtain charge information concerning the printing charges of printers 6 available to the printing environment sharing services 13 (B-1-1 and B-1-2) in the vicinity of the printing environment sharing service 13 (B-1) to the printing environment sharing service 13 (A-1-1).

When the printing environment sharing service 13 (A-1-1) receives the charge information obtaining request, in step S221, the charge information obtaining part 94 of the printing environment sharing service 13 (A-1-1) transmits the request to the printing environment sharing service 13 (A-1) based on the channel information obtained by the printing environment sharing service 13 (A-1-1) when the user has selected the printing location (B-1) as described with reference to FIGS. 7A through 7D and/or FIG. 8.

When the printing environment sharing service 13 (A-1) receives the request, in step S222, the charge information obtaining part 94 of the printing environment sharing service 13 (A-1) transmits the request to the printing environment sharing service 13 (R-0) based on the channel information.

When the printing environment sharing service 13 (R-0) receives the request, in step S223, the charge information obtaining part 94 of the printing environment sharing service 13 (R-0) transmits the request to the printing environment sharing service 13 (B-1) based on the channel information.

When the printing environment sharing service 13 (B-1) receives the request, in step S224, the charge information obtaining part 94 of the printing environment sharing service 13 (B-1) transmits the request to the printing environment sharing service 13 (B-1-1) based on the channel information.

When the printing environment sharing service 13 (B-1-1) receives the request, in step S225, the charge information obtaining part 94 of the printing environment sharing service 13 (B-1-1) obtains charge information concerning the printing charge of the printer 6 (P-1) available to the printing environment sharing service 13 (B-1-1) from the HDD 39 of the SPS server 3 (B-1-1), and transmits the obtained charge information to the printing environment sharing service 13 (B-1).

Further, when the printing environment sharing service 13 (B-1) receives the request, in step S226, the charge information obtaining part 94 of the printing environment sharing service 13 (B-1) transmits the request to the printing environment sharing service 13 (B-1-2) based on the channel information.

When the printing environment sharing service 13 (B-1-2) receives the request, in step S227, the charge information obtaining part 94 of the printing environment sharing service 13 (B-1-2) obtains charge information concerning the printing charges of the printers 6 (P-2-1 and P-2-2) available to the printing environment sharing service 13 (B-1-2) from the HDD 39 of the SPS server 3 (B-1-2), and transmits the obtained charge information to the printing environment sharing service 13 (B-1).

In step S228, the charge information obtaining part 94 of the printing environment sharing service 13 (B-1) transmits the charge information concerning the printing charge of the printer 6 (P-1) available to the printing environment sharing service 13 (B-1-1) received in step S225 and the charge information concerning the printing charges of the printers 6 (P-2-1 and P-2-2) available to the printing environment sharing service 13 (B-1-2) received in step S227 to the printing environment sharing service 13 (R-0) based on the channel information.

In step S229, the charge information obtaining part 94 of the printing environment sharing service 13 (R-0) transmits the received charge information to the printing environment sharing service 13 (A-1) based on the channel information.

In step S230, the charge information obtaining part 94 of the printing environment sharing service 13 (A-1) transmits the received charge information to the printing environment sharing service 13 (A-1-1) based on the channel information.

In step S231, the charge information obtaining part 94 of the printing environment sharing service 13 (A-1-1) transmits the received charge information to the Web server 1.

Based on the received charge information, the Web server 1 creates a printing location search result screen as shown in FIG. 29B so that the printers 6 are listed in the ascending order of their charges, and presents the printing location search result screen to the user.

For instance, when the user selects one of the search results and taps on an OK button 241a on the printing location search result screen of FIG. 29B, the Web server 1 creates a printing location and printer selection confirmation screen as shown in FIG. 29C, and presents the printing location and printer selection confirmation screen to the user.

The user can search out a printing location and a printer 6 where a printing charge is low by performing the operation shown in FIGS. 29A through 29C and/or 30.

The Web server 1 may include user identification information identifying the user, such as a user ID or a username, in the charge information obtaining request of step S220, and transmit the request to the printing environment sharing service 13 (A-1-1). By including the user identification information in the charge information obtaining request, the charge information can be obtained user by user when a different printing charge is set for each user.

Further, for instance, when there are multiple sections of users, the printing charges of the printers 6 may be set and retained in the SPS servers 3 section by section. According to this configuration, printing charges can be set section by section.

Second Embodiment

Next, a description is given, with reference to FIGS. 31 and 32, of an image-forming apparatus (hereinafter referred to as a multi-function apparatus) 1200 that forms images as another apparatus in which the printing environment sharing service 13 is provided according to a second embodiment of the present invention.

Figure 31:
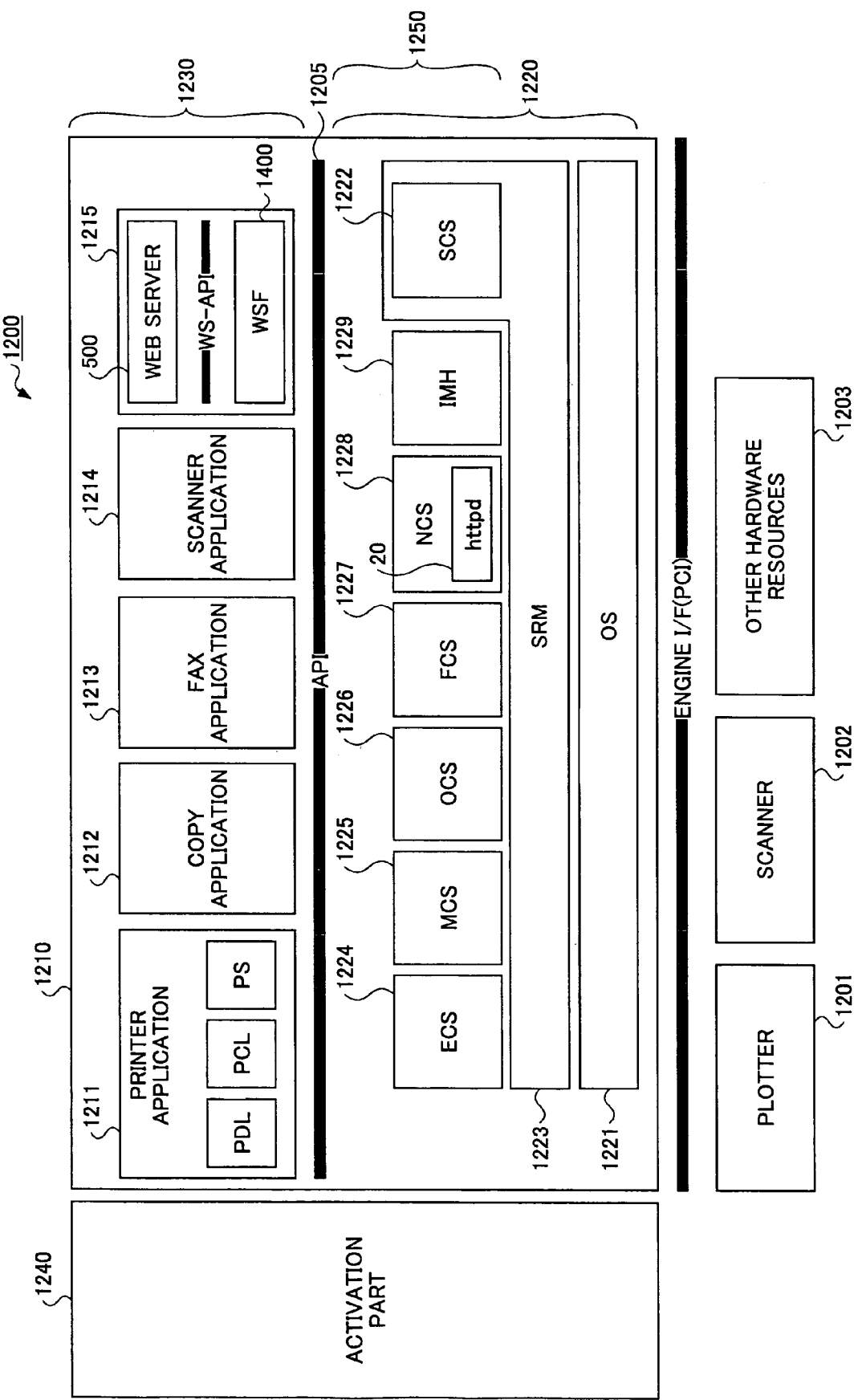
FIG. 31 is a block diagram showing a functional configuration of a multi-function apparatus according to a second embodiment of the present invention.

FIG. 31 is a block diagram showing a functional configuration of the multi-function apparatus 1200.

Referring to FIG. 31, the multi-function apparatus 1200 includes a plotter 1201, a scanner 1202, hardware resources 1203 including a facsimile machine, a software group 1210 including a platform 1220 and applications 1230, and a multi-function apparatus activation part 1240.

When the multi-function apparatus 1200 is turned on, the activation part 1240 is first started to activate the platform 1220 and the applications 1230. The platform 1220 includes a control service 1250, a system resource manager (SRM) 1223, and an OS 1221. The control service 1250 interprets processing requests from the applications 1230 and generates requests to obtain a hardware resource (hardware resource obtaining requests). The SRM 1223 manages one or more hardware resources and arbitrates between the hardware resource obtaining requests from the control service 1250.

The control service 1250 includes multiple service modules, which are a system control service (SCS) 1222, an engine control service (ECS) 1224, a memory control service (MCS) 1225, an operations panel control service (OCS) 1226, a facsimile control service (FCS) 1227, a network control service (NCS) 1228, and an imaging memory handler (IMH) 1229. The platform 1220 includes an application program interface (API) 1205 that makes the processing requests from the applications 1230 receivable using a predefined function.

The OS 1221, which is an operating system such as UNIX®, executes the software programs of the platform 1220 and the applications 1230 in parallel as processes. Use of UNIX®, which is open source software, makes it possible to secure program security, support networking, and obtain a source code easily. Further, no OS and TCP/IP royalties are required, and outsourcing is easy.

The SRM 1223 perform system control and resource management in cooperation with the SCS 1222. The SRM 1223 performs arbitration and execution control according to a request from a higher layer for the use of hardware resources such as an engine part such as the scanner 1202 or the plotter 1202, a memory, an HDD file, and a host I/O (a Centronics I/F, a network I/F, an IEEE 1394 I/F, or an RS-232-C I/F, for instance).

Specifically, the SRM 1223 determines whether the requested hardware resources are available, that is, whether the requested hardware resources are being used by another request. If the requested hardware resources are available, the SRM 1223 notifies the higher layer that the requested hardware resources are available. Further, in response to the request from the higher layer, the SRM 1223 performs scheduling for using the hardware resources, and directly carries out the requested contents such as paper feeding and image formation by a printer engine, memory reservation, and file creation.

The SCS 1222 perform multiple functions such as application management (Function 1), operation part control (Function 2), system screen display (for instance, display of a job list screen and a counter display screen) (Function 3), LED display (Function 4), resource management (Function 5), and interrupting application control (Function 6). Specifically, in the application management (Function 1), the registration of an application is performed, and the other applications are notified of information on the registration. In the operation part control (Function 2), exclusive control is performed on the rights of use of an operation part of the applications. In the system screen display (Function 3), a warning screen corresponding to the state of the engine part is displayed in accordance with the contents of a request from an application having the right of use of the operation part. In the LED display (Function 4), display control of a warning LED and the system LEDs of application keys is performed. In the resource management (Function 5), services for exclusive control of engine resources (for instance, the scanner 1202 and a staple) to be excluded when the application (ECS 1224) executes a job are provided. In the interrupting application control (Function 6), control and services for giving priority to the operation of a specific application are provided.

The ECS 1224 controls the engine part including the plotter 1201, the scanner 1202, and the other hardware resources 1203. For instance, the ECS 1224 reads images, performs printing, makes state notifications, and makes jam recoveries.

The MCS 1225 performs memory control. Specifically, the MCS 1225 obtains and releases image memory, uses an HDD, and compresses and decompresses image data, for instance.

The OCS 1226 controls an operations panel that serves as an information transmission part between an operator and a main body control.

For instance, the OCS 1226 notifies the main body control of the key operation events of the operator, provides a library function for each application to construct a GUI, manages the constructed GUI information application by application, and performs display reflection onto the operations panel.

The FCS 1227 provides the API 1205 for facsimile transmission to and reception from each application layer of a system controller using a PSTN or ISDN network, registration and citation of a variety of facsimile data managed in a backup SRAM (BKM), reading of facsimile communications, printing of received facsimile communications, and multi-function-related transmission and reception.

The NCS 1228 is a module group for providing services that can be used in common to applications requiring network I/O. The NCS 1228 mediates in distributing the data received from the network in accordance with each protocol among the applications and transmitting data from the applications to the network.

For instance, the NCS 1228 may control data communications with network devices connected through the Internet by HTTP (HyperText Transfer Protocol) among multiple protocols using an HTTPd (HyperText Transfer Protocol Daemon) 20. The NCS 1228 may activate a processing part corresponding to a Web service specified by an HTTP request header with a function call, and notify the requesting network device of the results of processing by the Web service by an HTTP response. The Web service is provided in accordance with a message written in, for instance, XML.

The IMH 1229 maps image data in a virtual memory region (a user virtual space) into a physical memory. The IMH 1229 makes a system call in response to the activation of a process. Then, the IMH 1229 maps a virtual memory region for the process, and releases the virtual memory region when the process is completed.

The applications 1230 includes a printer application 1211 for a printer including a page-description language (PDL), a printer control language (PCL), and PS, a copy application 1212 for a copier, a fax application 1213 for a facsimile machine, a scanner application 1214 for a scanner, and a Web service processing application 1215 that is a Web service application. Each of the applications 1211 through 1215 can operate using each process on the platform 1220, and therefore, is composed mainly of a screen display control program that performs screen control, key operation control, and job generation. A new application may be installed via a network connected through the NCS 1228. Application addition and deletion may be performed application by application.

The Web service processing application 1215 includes a Web server 500 and a Web service function (WSF) 1400. The Web server 500 provides a Web service by receiving an HTTP request for the Web service and transmitting an HTTP response. The Web service function (WSF) 1400 performs predetermined processing using the control service 1250 via the API 1205, and provides the processing results as a Web service via a Web service application program interface (WS-API).

According to this embodiment, the printing environment sharing service 13 or the repository service 12 is provided in the Web service function 1400.

Figure 32:
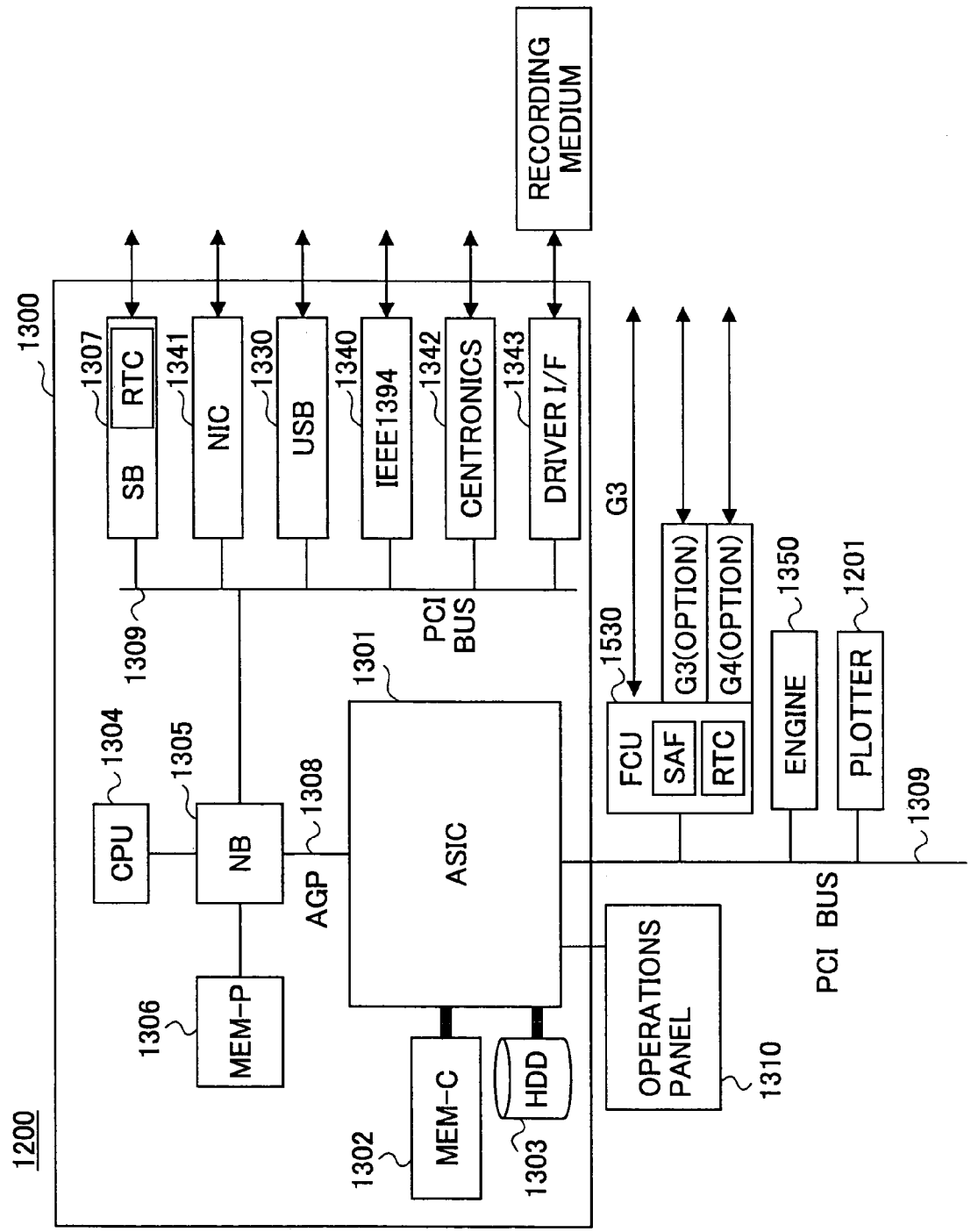
FIG. 32 is a block diagram showing a hardware configuration of the multi-function apparatus according to the second embodiment of the present invention.

The service list 71, the printer list 72, and reservation information and document data transferred from another multi-function apparatus 1200 are stored in a below-described HDD 1303 (FIG. 32).

The multi-function apparatus 1200 processes all the operations required in common among the applications solely on the platform 1220.

FIG. 32 is a block diagram showing a hardware configuration of the multi-function apparatus 1200.

Referring to FIG. 32, the multi-function apparatus 1200 has a configuration where an operations panel 1310, a facsimile control unit (FCU) 1530, an engine part 1350 (to which, for instance, the scanner 1202 is connected), and the plotter 1201 are connected to an application specific integrated circuit (ASIC) 1301 of a controller 1300 via a peripheral component interconnect (PCI) bus 1309 and the like.

In the controller 1300, a local memory (MEM-C) 1302 and the HDD 1303 are connected to the ASIC 1301, and the ASIC 1301 and a CPU 1304 are connected via a Northbridge (NB) 1305 of a CPU chipset. The ASIC 1301 and the CPU 1304 are thus connected via the NB 1305 because the interface of the CPU 1304 is not open to the public.

The ASIC 1301 and the NB 1305 are connected not by a mere PCI but by an accelerated graphics port (AGP) 1308. This is because connecting the ASIC 1301 and the NB 1305 by a low-speed PCI results in lower performance since the multi-function apparatus 1200 executes and controls the multiple processes forming the platform 1220 and the applications 1230 shown in FIG. 31.

The CPU 1304 performs overall control of the multi-function apparatus 1200. Specifically, the CPU 1304 causes the SCS 1222, the SRM 1223, the ECS 1224, the MCS 1225, the OCS 1226, the FCS 1227, the NCS 1228, and the IMH 1229 forming the platform 1220 to be activated and executed as processes on the OS 1221. Further, the CPU 1304 causes the printer application 1211, the copy application 1212, the fax application 1213, the scanner application 1214, and the Web service processing application 1215 to be activated and executed.

The NB 1305 is a bridge for connecting the CPU 1304 to a system memory (MEM-P) 1306, a Southbridge (SB) 1307, a network interface card (NIC) 1341, a universal serial bus (USB) 1330, an IEEE 1394 device 1340, a Centronics device 1342, a driver I/F 1343, and the ASIC 1301.

The system memory (MEM-P) 1306 is used as the memory for image drawing of the multi-function apparatus 1200. The SB 1307 is a bridge for connecting the NB 1305 with a PCI bus, a ROM, and peripheral devices. The local memory (MEM-C) 1302 is used as an image buffer for copying and a code buffer. The ASIC 1301 is an IC for image processing including a hardware element for image processing.

The driver I/F 1343 is an interface used to read a program or an application from an inserted recording medium storing the program or the application and install the read program or application in the multi-function apparatus 1200. The recording medium may be, for instance, an SD memory card, a smart medium, a multimedia card, or a CompactFlash®.

The HDD 1303 stores image data, programs, font data, forms, and documents. The HDD 1303 also stores the service list 71, the printer list 72, and information such as reservation information, document data, and charge information according to the present invention. The operations panel 1310 is an operation part that receives inputs from the operator and displays information to the operator.

Accordingly, the ASIC 1301 includes a RAM interface for connecting the local memory (MEM-C) 1302 and a hard disk interface for connecting the HDD 1303. When image data is input to or output from these memory parts, the target or source of the image data is switched to the RAM interface or the hard disk interface.

The AGP 1308 is a bus interface for a graphics accelerator card, which has been proposed to accelerate graphics processing. The AGP 1308 directly accesses the system memory (MEM-P) 1306 at high throughput so that the graphics accelerator card operates at high speed.

By providing the printing environment sharing service 13 in the multi-function apparatus 1200 as shown in FIGS. 31 and 32, for instance, reservation information and document data can be transferred between the multi-function apparatuses 1200, the reservation information and the document data can be stored in the multi-function apparatus 1200 of a specified printing location, and the multi-function apparatus 1200 of the specified printing location can perform printing when a printing start request is received as described in the first embodiment.

The hardware configurations of the repository servers 2, the print servers 4, and the security policy server 8 described in the first embodiment are equal to the hardware configuration of the SPS server 3 shown in FIG. 5.

Third Embodiment

Figure 33:
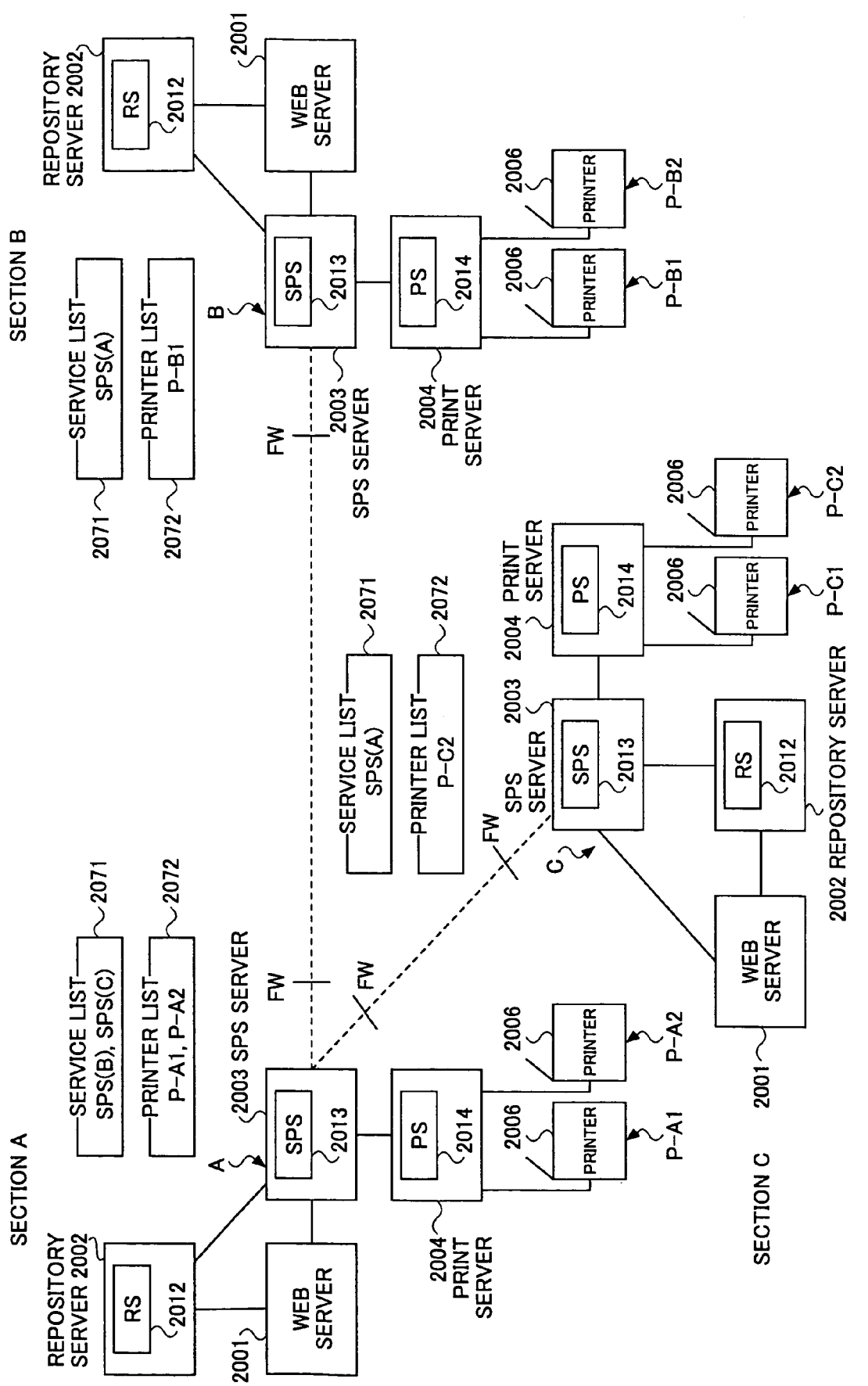
FIG. 33 is a block diagram showing a first exemplary system configuration according to a third embodiment of the present invention.
Figure 34:
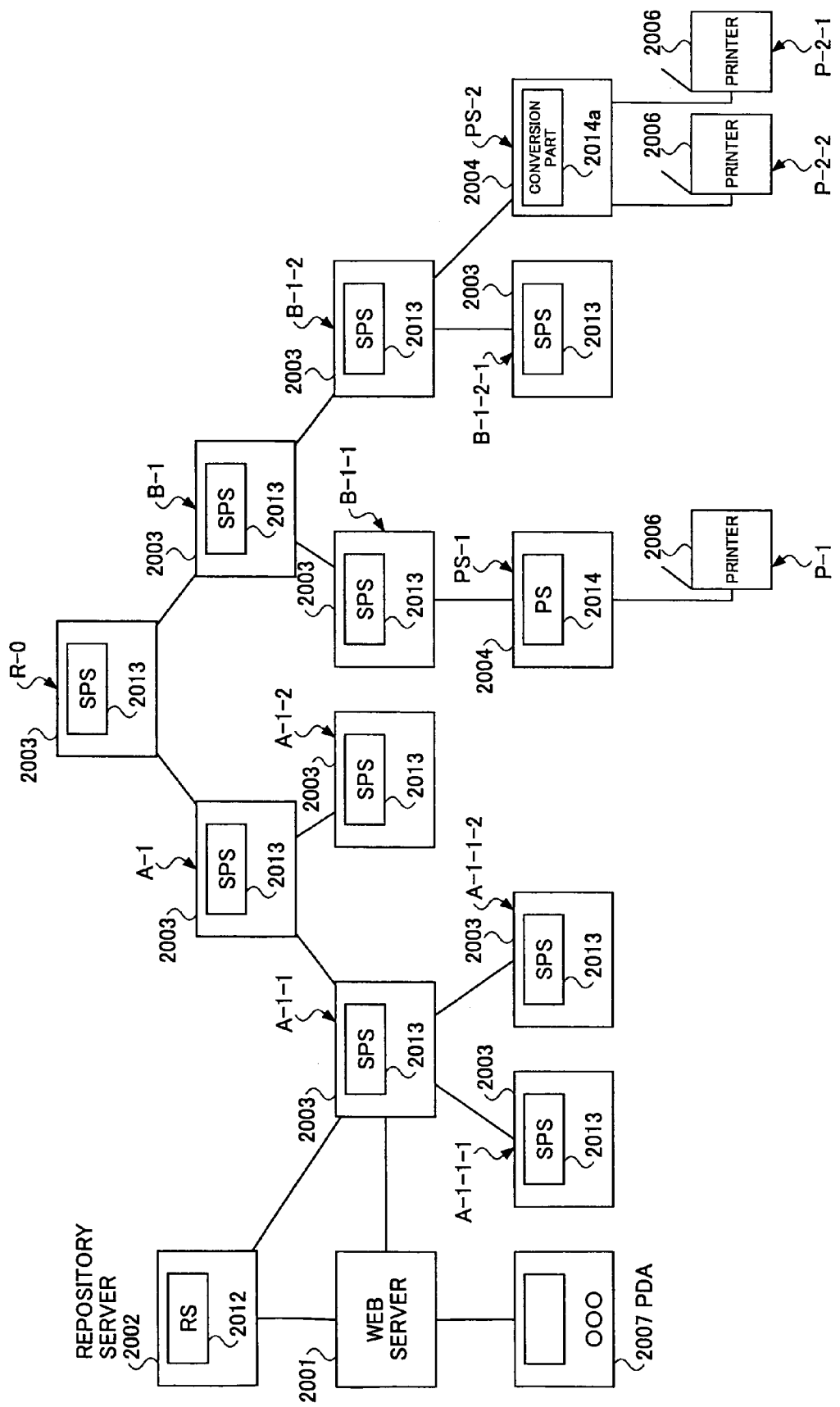
FIG. 34 is a block diagram showing a second exemplary system configuration according to the third embodiment.

FIGS. 33 and 34 are block diagrams respectively showing first and second exemplary system configurations according to a third embodiment of the present invention. According to the first exemplary system configuration of FIG. 33, each of Sections A, B, and C includes a Web server 2001, a repository server 2002, a share print service (SPS) server 2003, a print server 2004, and printers 2006. In each section, the servers 2001 through 2004 and the printers 2006 are managed to be used as an orderly printing environment. According to the second exemplary system configuration of FIG. 34, plural SPS server 2003 establish subordinate, coordinate, and superordinate connections with respect to each other.

Referring to FIGS. 33 and 34, each repository server 2002 includes the repository service 2012, each SPS server 2003 includes a printing environment sharing service (referred to as an SPS in the drawings) 2013, and each print server 2004 includes the document print service 2014. The services 2012 through 2014 can use one another's functions by exchanging messages based on the SOAP (Simple Object Access Protocol) protocol with one another. The same applies in the following.

In contrast to the system configuration of FIG. 1, the system configurations of FIGS. 33 and 34, by newly introducing the SPS servers 2003, can, for instance, set identification information specifying the printing environment sharing service 2013 with which communication can be established, such as the service identifier of the printing environment sharing service 2013, in a service list 2071 of the SPS server 2003 of another section. As a result, the SPS servers 2003 and/or the printing environment sharing services 2013 of the two sections can share the printing environments (the print servers and the printers 2006) thereof, so that the two sections can use each other's printing environments.

Further, as shown in FIG. 33, in each section, its printers 2006 usable by the SPS server 2003 and/or the printing environment sharing service 2013 of another section may be set in a printer list 2072 in the SPS server 2003 and managed. As a result, the printing environments can be managed in a distributed manner in each section without being affected by changes in another section, such as changes in the printers 2006 or printer drivers.

Further, in contrast to the system configuration of FIG. 1, in the system configurations of FIGS. 33 and 34, the SPS servers 2003 and/or the printing environment sharing services 2013 that can access one another are inter-connected. This reduces the number of communication channels between sections, so that a reduced number of communication channels are exposed to attacks. Accordingly, security can be ensured.

Each SPS server 2003 with the printing environment sharing service 2013 may store the service list 2071. Alternatively, the service lists 2071 corresponding to the SPS servers 2003 may be stored collectively in another apparatus or separately in other apparatuses.

Figure 35:
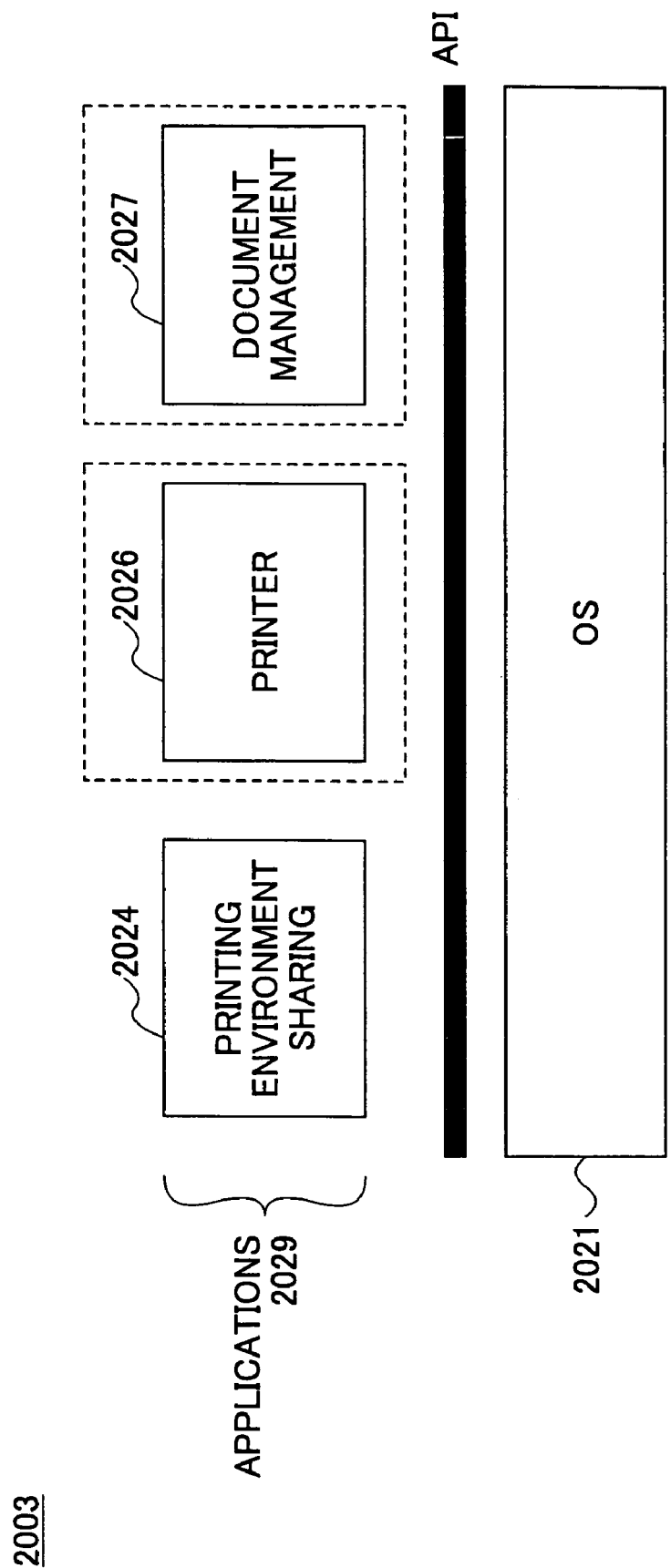
FIG. 35 is a block diagram showing a software configuration of an SPS server according to the third embodiment.

FIG. 35 is a block diagram showing a software configuration of the SPS server 2003.

Referring to FIG. 35, the SPS server 2003 includes an operating system (OS) 2021 and applications 2029.

The OS 2021, which is an operating system such as UNIX® or Windows®, executes, for instance, the software programs of the applications 2029 in parallel as processes.

The applications 2029 include a printing environment sharing application 2024, which is an application for printing reservation and/or printing. Each printing environment sharing service 2013 shown in FIGS. 33 and 34 is included in the printing environment sharing application 2024 of the corresponding SPS server 2003.

In FIGS. 33 and 34, each SPS server 2003 is illustrated as having only the printing environment sharing service 2013 of the printing environment sharing application 2024. However, in each SPS server 2003, the applications 2029 may be configured to include a printer application 2026, which is an application for a printer, and a document management application 2027, which is an application for document management, as shown in FIG. 35.

Each document print service 2014 shown in FIG. 33 is included in the corresponding printer application 2026 of FIG. 35. Each repository service 2012 shown in FIG. 33 is included in the corresponding document management application 2027 of FIG. 35.

However, in the following descriptions of the third embodiment, for the sake of simplification, it is assumed that the document print servers 2014 are included in the corresponding print servers 2004, and the repository services 2012 are included in the corresponding repository servers 2002 as shown in FIG. 33. This, however, does not limit the implementation of the present invention.

A description is given below, with reference to FIG. 36, of the hardware configuration of the SPS server 2003.

Figure 36:
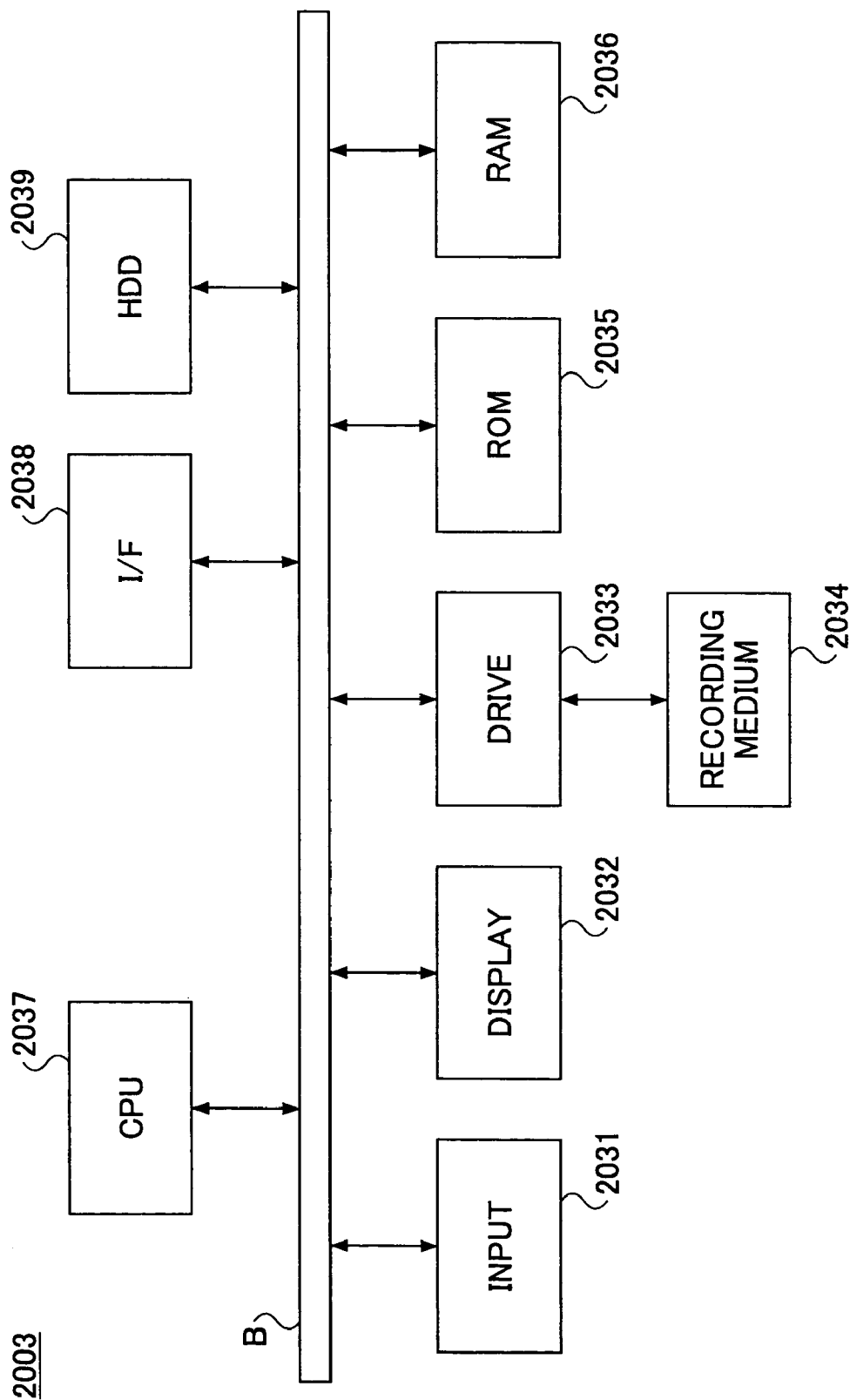
FIG. 36 is a block diagram showing a hardware configuration of the SPS server according to the third embodiment.

FIG. 36 is a block diagram showing a hardware configuration of the SPS server 2003.

According to the hardware configuration of the SPS server 2003 of FIG. 36, the SPS server 2003 includes an input unit 2031, a display unit 2032, a drive unit 2033, a read-only memory (ROM) 2035, a random access memory (RAM) 2036, a central processing unit (CPU) 2037, an interface unit (I/F) 2038, and the HDD 2039, which are connected with one another via a bus B.

The input unit 2031 includes a keyboard and a mouse operated by a user of the SPS server 2003, and is used to input a variety of operation signals to the SPS server 2003.

The display unit 2032 includes a display used by a user of the SPS server 2003, and displays a variety of information.

The interface unit 2038 is an interface connecting the SPS server 2003 to a network.

Programs such as the application program corresponding to the printing environment sharing application 2024 included in the applications 2029 of FIG. 35 and a main program controlling the operation of the entire SPS server 2003 are provided to the SPS server 2003 through a recording medium 2034 such as a CD-ROM or downloaded thereto through the network. The recording medium 2034 is set in the drive unit 2033 so that programs such as the application program and the main program are installed in the HDD 2039 from the recording medium 2034 through the drive unit 2033.

The ROM 2035 stores data. The RAM 2036 reads out the programs such as the application program and the main program from the HDD 2039 and stores the programs when the SPS server 2003 is activated. The CPU 2037 performs processing in accordance with the programs such as the application program and the main program read into and stored in the RAM 2036.

The HDD 2039 stores the service list 2071 and the printer list 2072 besides the programs such as the application program and the main program.

A description is given below, with reference to FIG. 37, of the functional configuration of the SPS server 2003.

Figure 37:
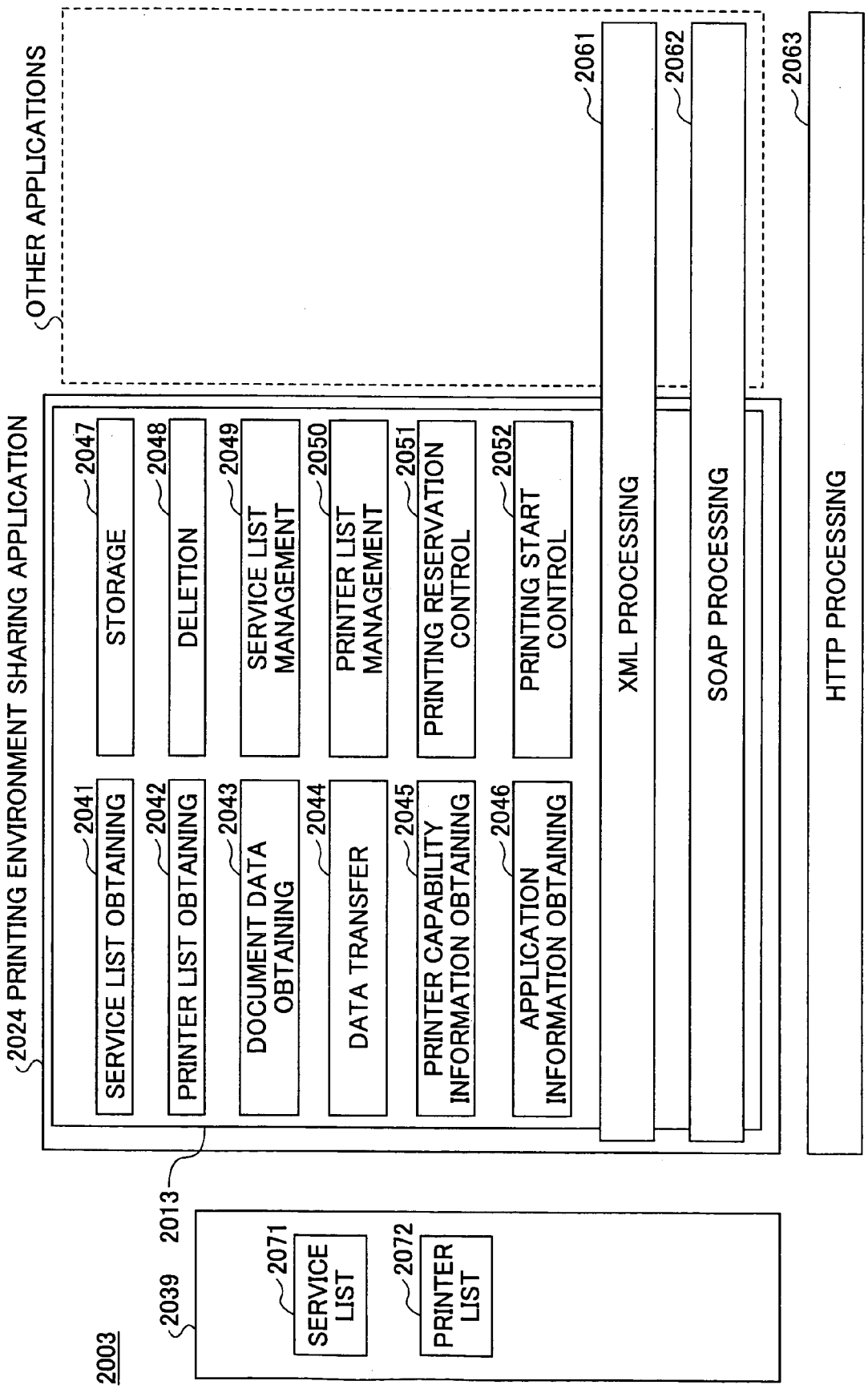
FIG. 37 is a block diagram showing a functional configuration of the SPS server according to the third embodiment.

FIG. 37 is a block diagram showing a functional configuration of the SPS server 2003.

Referring to FIG. 37, the SPS server 2003 includes an HTTP (HyperText Transfer Protocol) processing part 2063 controlling communications in compliance with the HTTP protocol, the HDD 2039 storing the service list 2071 and the printer list 2072, and the printing environment sharing application 2024.

An XML (extensible Markup Language) processing part 2061 processing a message written in XML and a SOAP processing part 2062 exchanging messages in compliance with the SOAP protocol are shared by the printing environment sharing application 2024 and the applications other than the printing environment sharing application 2024.

The printing environment sharing service 2013 included in the printing environment sharing application 2024 includes a service list obtaining part 2041, a printer list obtaining part 2042, a document data obtaining part 2043, a data transfer part 2044, a printer capability information obtaining part 2045, an application information obtaining part 2046, a storage part 2047, a deletion part 2048, a service list management part 2049, a printer list management part 2050, a printing reservation control part 2051, and a printing start control part 2052.

The service list obtaining part 2041 obtains the service list 2071 stored in another SPS server 2003 via the printing environment sharing service 2013 thereof. The service list obtaining part 2041 also obtains the service list 2071 stored in the SPS server including the printing environment sharing service 2013 in which the service list obtaining part 2041 is included.

The printer list obtaining part 2042 obtains the printer list 2072 stored in another SPS server 2003 or a print server 2004 via the printing environment sharing service 2013 included in the other SPS server 2003 or the document print service 2014 included in the print server 2004. The printer list obtaining part 2042 also obtains the printer list 2072 stored in the SPS server 2003 including the printing environment sharing service 2013 in which the printer list obtaining part 2042 is included.

The document data obtaining part 2043 obtains the document data of a specified document from the repository server 2002 via the repository service 2012 based on a request from the Web server 2001 shown in FIG. 33.

The data transfer part 2044 transfers to another SPS server 2003 via the printing environment sharing service 2013 thereof reservation information including channel information up to the printing environment sharing service 2013 of a printing location, identification information identifying the printing location, identification information identifying the printer 2006 to be used for printing, and printing conditions, and/or the document data obtained in the document data obtaining part 2043 or printing data that is printable data into which the document data is converted as described below.

The printer capability information obtaining part 2045 obtains the capability information of the printer 2006, such as the capability of color printing and duplex printing, through the printing environment sharing service 2013 of another SPS server 2003 and/or the document print service 2014 of a print server 2004.

The application information obtaining part 2046 obtains application information required at the time of converting the document data obtained in the document data obtaining part 2043 into printing data, such as information as to whether an application such as Microsoft Word® is stored.

The storage part 2047 stores the reservation information and/or the document data in the HDD 2039.

The deletion part 2048 deletes the reservation information and/or the document data stored in the HDD 2039 based on a request from another printing environment sharing service 2013 or reservation expiry information included in the reservation information. For example, the reservation information may include channel information to the printing environment sharing service 2013 of a specified printing location, identification information for identifying the printing location, identification information for identifying the printer 2006 that performs printing, printing conditions, and reservation expiry information indicating an expiry date and time for the printing reservation.

The service list management part 2049 manages the service list 2071. For instance, based on a request for connection from another printing environment sharing service 2013, the service list management part 2049 adds data on the other printing environment sharing service 2013 to the service list 2071 stored in the HDD 2039 of the SPS server 2003. Further, based on a request for disconnection from another printing environment sharing service 2013, the service list management part 2049 deletes data on the other printing environment sharing service 2013 from the service list 2071 stored in the HDD 2039 of the SPS server 2003.

The printer list management part 2050 manages the printer list 2072. For instance, the printer list management part 2050 adds data to or deletes data from the printer list 2072 stored in the HDD 2039 of the SPS server 2003 based on a request.

The printing reservation control part 2051 performs control with respect to the printing reservation request. For instance, the printing reservation control part 2051 receives a printing reservation request from the Web server 2001 connected to the SPS server 2003 via the Internet or a network, and requests the document data obtaining part 2043 to obtain document data. Further, the printing reservation control part 2051 requests for the data transfer part 2044 to transmit the document data obtained by the document data obtaining part 2043 or reservation information included in the printing reservation request to another printing environment sharing service 2013.

The printing start control part 2052 performs control with respect to the printing start request. For instance, the printing start control part 2052 receives a printing start request from the Web server 2001 and/or another printing environment sharing service 2013 connected to the SPS server 2003 via the Internet or a network, and transmits the printing start request to another printing environment sharing service 2013 or a document print service 2014 based on channel information included in the printing start request.

In the following, the contents of the reservation information at each stage of the printing reservation process, and the storage location of the reservation information and/or the document data are described with reference to FIGS. 38A through 38D through FIG. 49.

First, an exemplary process of selecting a document and making a printing reservation is described with reference to FIGS. 38A through 38D and FIG. 39.

FIGS. 38A through 38D illustrate a document selection process.

FIG. 39 is a sequence diagram illustrating a first exemplary process of selecting a document and making a printing reservation.

In the system configuration shown in FIG. 33, when a user logs into the Web server 2001 (A) of section A (hereinafter, "(A)" indicated after a server or a service, for example, denotes the section A, and the same applies to "(C)" and others) via a user terminal such as a PDA (Personal Digital Assistant), in the system configuration of the Web server 2001 (A), a repository service selection screen for selecting a repository service 2012 (A) as is shown in FIG. 38A is generated based on a request from the user terminal such as the PDA, and this screen is provided to the user terminal.

The user can select a preferred repository service using the repository service selection screen shown in FIG. 38A.

For example, if the user selects a repository service at the repository service selection screen of FIG. 38A and taps the "NEXT" button, the Web server 2001 (A) obtains information pertaining to the repository service 2012 (A) that the user has selected through the user terminal and the information that the user has tapped the "NEXT" button.

The Web server 2001 (A) transmits a request for obtaining a document list including user identification information (S2001 of FIG. 39) to the corresponding repository service 2012 (A) based on the information pertaining to the repository service selected by the user.

Upon receiving the document list obtaining request, the repository service 2012 (A) evaluates the user identification information, and when it determines that the user identification information is valid, it transmits to the Web server 2001 (A) document list information that may be accessed by the user (S2002 of FIG. 39).

Based on the obtained document list information, the Web server 2001 (A), generates a document selection screen as is shown in FIG. 38B, and provides this to the user terminal.

The user can select a document for which the printing reservation is to be made using the document selection screen of FIG. 39B. For example, if the user selects a document and taps the "SELECT" button on the document selection screen of FIG. 38B, the Web server 2001 (A) generates a document selection confirmation screen as is shown in FIG. 38C based on the obtained information, and provides this to the user terminal.

The user can confirm the document selection, and make a printing reservation or select a printing location, if desired, using the document selection confirmation screen of FIG. 38C.

For example, if the user taps the "RESERVE PRINTING" button on the document selection confirmation screen of FIG. 38C, the Web server 2001 (A) generates a printing reservation confirmation screen as is shown in FIG. 38D, and provides this to the user terminal.

The user can make a reservation for printing a document by selecting the document to be printed without setting the printing location, the printer, or the printing conditions using the printing reservation confirmation screen of FIG. 38D.

For example, if the user taps the "RESERVE" button on the printing reservation confirmation screen of FIG. 38D, the Web server 2001 (A) transmits to the printing environment sharing service 2013 (A) reservation information including a document identifier (such as a document ID), and makes a printing reservation request (S2003 of FIG. 39).

Upon receiving the printing reservation request, the printing reservation control part 2051 of the printing environment sharing service 2013 (A) provides the reservation information included in the printing reservation request to the storage part 2047 of the printing environment sharing service 2013 (A), and sends a storage request for the reservation information to be stored.

Upon receiving the storage request, the storage part 2047 of the printing environment sharing service 2013 (A) stores the reservation information including the document ID in the HDD 2039 of the SPS server 2003 (A). It is noted that the reservation information may also include information such as a reservation number for identifying the printing reservation, reservation date information indicating the date on which the printing reservation has been made, and reservation expiry information pertaining to expiry date and time of the reserved printing operation. This applies to the following examples as well.

The process shown in FIG. 39, compared to the process of FIG. 40 described below, stores the reservation information including the document ID and not the document data itself, and thereby, when changes are made to the document after the printing reservation, printing may be conducted using the most recently updated version of the document data with respect to the printing start time, which will be described in more detail later.

In the following, another exemplary process of selecting a document and making a printing reservation is described with reference to FIG. 40.

Figure 40:
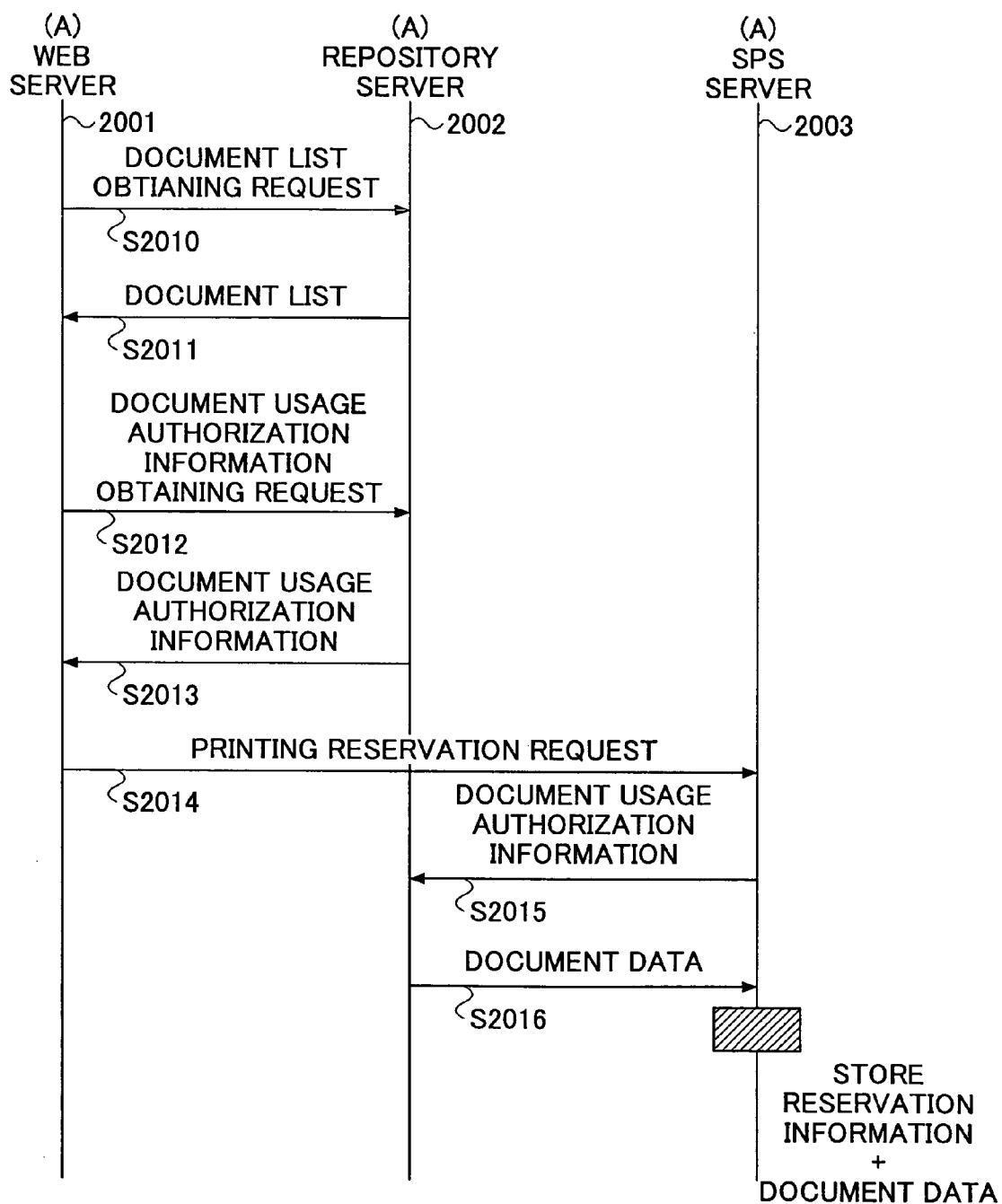
FIG. 40 is a sequence diagram illustrating a second exemplary process of selecting a document in making a printing reservation according to the third embodiment.

FIG. 40 is a sequence diagram illustrating a second exemplary process of selecting a document and making a printing reservation.

It is noted that process steps S2010~S2011 of FIG. 40 are identical to process steps S2001~S2001 of FIG. 39.

As is described above, the Web server 2001 (A) generates the document selection screen as is shown in FIG. 38B based on the obtained document list information, and provides this to the user terminal.

For example, if the user selects a document and taps the "SELECT" button on the document selection screen of FIG. 38B, the Web server 2001 (A) generates the document selection confirmation screen as is shown in FIG. 38C, and provides this to the user terminal.

Alternatively, if the user taps the "RESERVE PRINTING" button on the document selection confirmation screen as is shown in FIG. 38C, the Web server 2001 (A) generates the printing reservation confirmation screen as is shown in FIG. 38D, and provides this to the user terminal.

For example, if the user taps the "RESERVE" button on the printing reservation confirmation screen of FIG. 38D, the Web server 2001 (A) transmits to the repository service 2012 a request for obtaining document usage authorization information that authorizes the usage of a corresponding document including the document ID and user information (S2012 of FIG. 40).

Upon receiving the obtaining request, the repository service 2012, for example, determines whether the user is authorized to use the corresponding document based on the user information included in the obtaining request, and upon determining that the user is authorized to use the document, issues document usage authorization information and transmits this to the Web server 2001 (A) (S2013 of FIG. 40). It is noted that in the system operation, in the case of giving authorization for use of a document stored in the repository server 2002 with respect to a user that has already been verified upon logging into the Web server 2001, the process steps S2012 and S2013 may not be necessary, and the Web server 2001 may not have to obtain the document usage authorization information. However, in the example described below, the process steps S2012 and S2013 are performed and the document is obtained from the repository server 2002 using the document usage authorization information.

Upon obtaining the document usage authorization information, the Web server 2001 (A) transmits to the printing environment sharing service 2013 (A) reservation information including the document ID and the document usage authorization information, and requests for the printing reservation to be made (S2014 of FIG. 40).

Upon receiving the printing reservation request, the printing reservation control part 2051 of the printing environment sharing service 2013 (A) provides information such as the document ID and the document usage authorization information included in the printing reservation request to the document data obtaining part 2043, and sends a request for obtaining the document data.

Upon receiving the obtaining request, the document data obtaining part 2043 of the printing environment sharing service 2013 (A) transmits to the repository service 2012 (A) the document data obtaining request including the document ID and the document usage authorization information (S2015 of FIG. 40)

The repository service 2012 (A) determines the validity of the document usage authorization information included in the received document data obtaining request, and upon determining that the information is valid, obtains from the repository server 2002 the document data of the document designated by the document ID included in the document data obtaining request, and sends this to the printing environment sharing service 2013 (A) (S2016 of FIG. 40).

When the document data obtaining part 2043 of the printing environment sharing service 2013 (A) obtains the document data, the printing reservation control part 2051 of the printing environment sharing service 2013 (A) provides the reservation information and the document data included in the printing reservation request to the storage part 2047 of the printing environment sharing service 2013 (A), and sends a storage request for the reservation information and the document data to be stored.

Upon receiving the storage request, the storage part 2047 of the printing environment sharing service 2013 (A) stores the reservation information including the document ID and the document data in the HDD 2039 of the SPS server 2003 (A).

In the process illustrated by FIG. 40, as opposed to the process of FIG. 39, the document data is stored together with the reservation information including the document ID, and thereby, the document data at the time of the printing reservation may be used in the printing.

It is noted that in the present system, the user may be able to choose between the process of storing only the reservation information as is shown in FIG. 39 and the process of storing the reservation information with the document data is shown in FIG. 39 upon making the printing reservation, or the manager of the system may set either one of the processes to the Web server 2001 and/or the SPS server 2003. The same applies to the following examples as well.

In the following, an exemplary process of selecting the printing location and making the printing reservation is described with reference to FIGS. 41A through 41C and FIG. 42.

FIGS. 41A through 41C illustrate the selection of the printing location.

FIG. 42 is a sequence diagram illustrating a first exemplary process of selecting the printing location and making the printing reservation.

For example, in the system configuration of FIG. 33, when the user taps the "SELECT PRINTING LOCATION" button on the document selection confirmation screen, the Web server 2001 (A) obtains information that the user has tapped the "SELECT PRINTING LOCATION" button via the user terminal.

Upon obtaining the information, the Web server 2001 (A) transmits to the printing environment sharing service 2013 (A) a request for obtaining the service list 2071 of the printing environment sharing service 2013 (A) (S2020 of FIG. 42)

Upon receiving the obtaining request, the service list obtaining part 2041 of the printing environment sharing service 2013 (A) obtains the service list 2071 that is stored in the HDD 2039 of the SPS server 2003 (A), and transmits this to the Web server 2001 (A) (S2021 of FIG. 42).

The Web server 2001 (A) then generates a printing location selection screen as is shown in FIG. 41A based on the received service list 2071 of the printing environment sharing service 2013 (A) as shown in FIG. 33, and provides this to the user terminal.

On the printing location selection screen of FIG. 41A, the printing environment sharing services 2013 that may be accessed by the printing environment sharing service 2013 (A) are indicated.

For the sake of simplifying the descriptions, in FIGS. 41A through 41C, the accessible printing environment sharing services 2013 are simply indicated as "B" and "C". These items may correspond to information for identifying the printing location such as section names, office names, and place names. This also applies to subsequent examples described below.

For example, if the user selects "C" and taps the "SELECT" button on the printing location selection screen of FIG. 41A, the Web server 2001 (A) generates a printing location selection confirmation screen as is shown in FIG. 41B, and provides this to the user terminal.

For example, if the user taps the "RESERVE PRINTING" button on the printing location selection confirmation screen of FIG. 41B, the Web server 2001 (A) generates a printing reservation confirmation screen as is shown in FIG. 41C, and provides this to the user terminal.

The user can make a printing reservation by setting the document to be printed and the printing location without setting either the printer or the printing conditions using the printing reservation confirmation screen of FIG. 41C.

For example, if the user taps the "RESERVE" button on the printing reservation confirmation screen of FIG. 41C, the Web server 2001 (A) transmits to the printing environment sharing service 2013 (A) reservation information including the document ID, identification information for identifying the printing location and channel information to the printing location (e.g., A→C), and requests the printing reservation be made (S2022 of FIG. 42).

Upon receiving the printing reservation request, the printing reservation control part 2051 of the printing environment sharing service 2013 (A) provides the reservation information included in the printing reservation request to the storage part 2047 of the printing environment sharing service 2013 (A), and sends a storage request for the reservation information be stored.

Upon receiving the storage request, the storage part 2047 of the printing environment sharing service 2013 (A) stores the reservation information including the document ID, the identification information for identifying the printing location, and the channel information to the printing location in the HDD 2039 of the SPS server 2003 (A).

Since the identification information for identifying the printing location and channel information to the printing location are included in the reservation information in the process of FIG. 42, the printing reservation control part 2051 of the printing environment sharing service 2013 (A) provides the reservation information included in the printing reservation request to the data transfer part 44, and request for the reservation information to be transferred. Upon receiving the reservation information transfer request, the data transfer part 44 may transfer the reservation information to the printing environment sharing service 2013 (C) based on the channel information to the printing location (S2023 of FIG. 42).

The printing reservation control part 2051 of the printing environment sharing service 2013 (C) provides the transferred reservation information to the storage part 2047 of the printing environment sharing service 2013 (C), and this storage part 2047 stores the reservation information in the HDD 2039 of the SPS server 2003 (C).

It is noted that the reservation information may be stored in the SPS server 2003 (A) corresponding to the reservation location or it may be stored in the SPS server 2003 (C) corresponding to the printing location. The reservation information may also be stored in both the SPS server 2003 (A) corresponding to the reservation location and the SPS server 2003 (C) corresponding to the printing location.

By ensuring that the reservation information be stored at the reservation location, for example, the user may be able to obtain the reservation information by making an enquiry to the reservation location via the Web server 2001 using a user terminal such as the PDA. Also, by storing the reservation information at the printing location, if the user is in the vicinity of the printing location, the user may be able to obtain the reservation information by directly operating the SPS server 2003 corresponding to the printing location without having to make an enquiry to the SPS server 2003 corresponding to the reservation location via the Web server 2001 using the user terminal, for example. This principle also applies to subsequent examples described below.

In the following, another exemplary process of selecting a printing location and making a printing reservation is descried with reference to FIG. 43.

Figure 43:
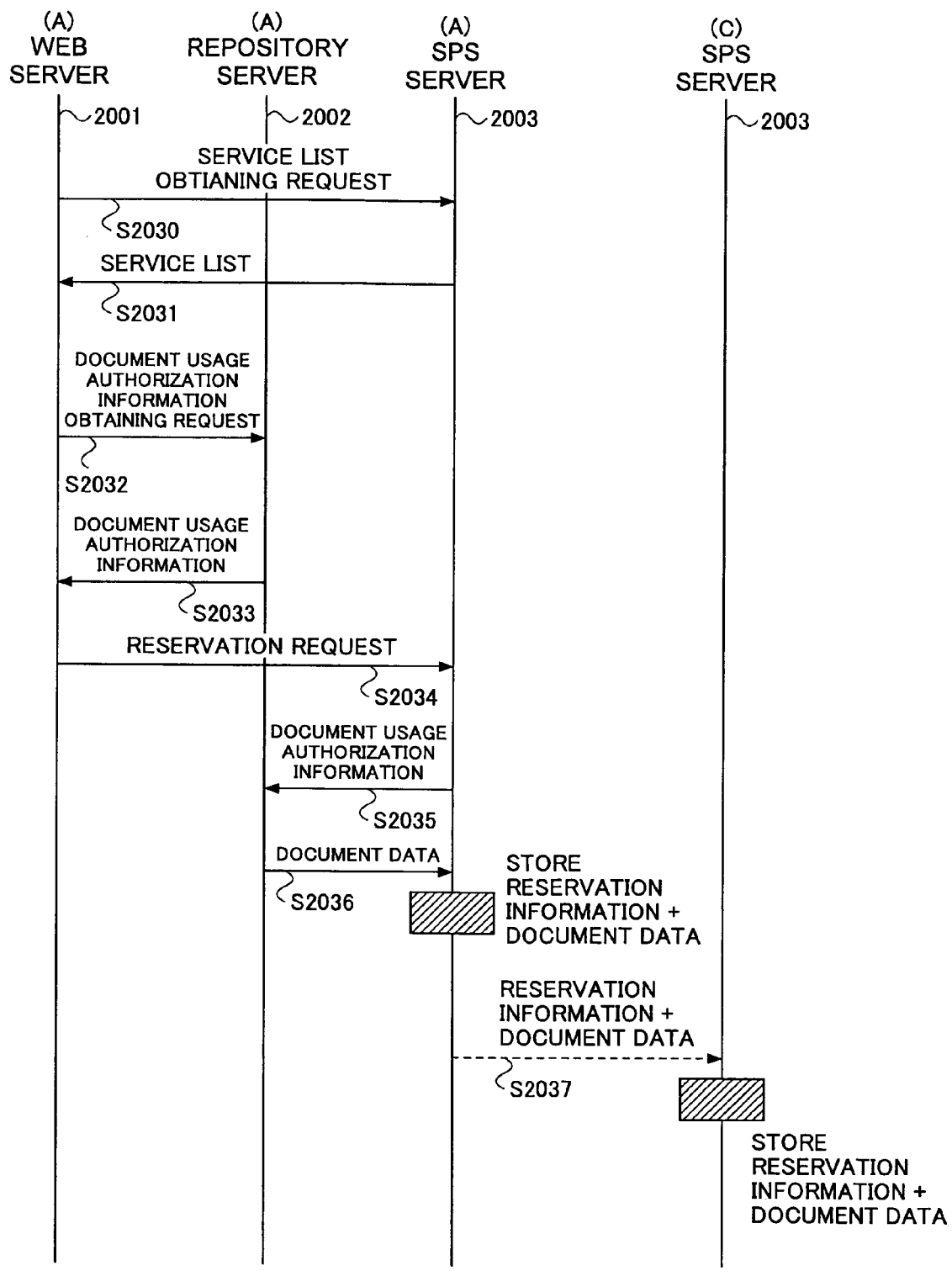
FIG. 43 is a sequence diagram illustrating a second exemplary process of selecting a document and a printing location in making a printing reservation according to the third embodiment.

FIG. 43 is a sequence diagram illustrating a second exemplary process of selecting a printing location and making a printing reservation.

It is noted that process steps S2030~S2031 of FIG. 43 are identical to the process steps S2020 and S2021 of FIG. 42.

As is described above, the Web server 2001 (A) generates the printing location selection screen as is shown in FIG. 41A based on the received service list 2071 of the printing environment sharing service 2013 (A) as shown in FIG. 33, and provides this to the user terminal.

For example, if the user selects "C" as the printing location and taps the "SELECT" button on the printing location selection screen of FIG. 41A, the Web server 2001 (A) generates a printing location selection confirmation screen as is shown in FIG. 41B, and provides this to the user terminal.

For example, if the user taps the "RESERVE PRINTING" button on the printing location selection confirmation screen of FIG. 41B, the Web server 2001 (A) generates the printing reservation confirmation screen as is shown in FIG. 41C, and provides this to the user terminal.

For example, if the user taps the "RESERVE" button on the printing reservation confirmation screen of FIG. 41C, the Web server 2001 (A) transmits to the repository service 2012 a request for obtaining document usage authorization information authorizing the usage of a corresponding document including the document ID and user information (S2032 of FIG. 43).

Upon receiving the obtaining request, the repository service 2012 determines whether the user may be authorized to used the corresponding document based on the user information included in the obtaining request, for example, and upon determining that the user is authorized to use the document, the repository service 2012 issues the document usage authorization information, and transmits this to the Web server 2001 (A) (S2033 of FIG. 43).

Upon obtaining the document usage authorization information, the Web server 2001 (A) transmits to the printing environment sharing service 2013 (A) the reservation information including the document ID, the document usage authorization information, the identification information for identifying the printing location, and the channel information to the printing location (e.g., ARC), and requests for the printing reservation to be made (S2034 of FIG. 43).

Upon receiving the printing reservation request, the printing reservation control part 2051 of the printing environment sharing service 2013 (A) provides information such as the document ID and the document usage authorization information included in the printing reservation request to the document data obtaining part 2043, and sends an obtaining request for obtaining the document data.

Upon receiving the obtaining request, the document data obtaining part 2043 of the printing environment sharing service 2013 (A) transmits to the repository service 2012 (A) the document data obtaining request including the document ID and the document usage authorization information (S2035 of FIG. 43)

The repository service 2012 (A) determines the validity of the document usage authorization information included in the received document data obtaining request, and upon determining that the information is valid, obtains from the repository server 2002 the document data of the document designated by the document ID included in the document data obtaining request, and sends this to the printing environment sharing service 2013 (A) (S2036 of FIG. 43).

When the document data obtaining part 2043 of the printing environment sharing service 2013 (A) obtains the document data, the printing reservation control part 2051 of the printing environment sharing service 2013 (A) provides the reservation information and the document data included in the printing reservation request to the storage part 2047 of the printing environment sharing service 2013 (A), and sends a storage request for the reservation information and the document data to be stored.

Upon receiving the storage request, the storage part 2047 of the printing environment sharing service 2013 (A) stores the reservation information including the identification information for identifying the printing location and the channel information to the printing location, and the document data in the HDD 2039 of the SPS server 2003 (A).

In the process shown in FIG. 43, the identification information for identifying the printing location and the channel information to the printing location are included in the reservation information so that the printing reservation control part 2051 of the printing environment sharing service 2013 (A)

may provide the reservation information and the document data included in the printing reservation request to the data transfer part 2044 and send a transfer request for the reservation information and the document data to be transferred, and the data transfer part 2044 of the printing environment sharing service 2013 (A) receiving the transfer request may transfer the reservation information and the document data to the printing environment sharing service 2013 (C) based on the channel information to the printing location (S2037 of FIG. 43).

The printing reservation control part 2051 of the printing environment sharing service 2013 (C) provides the transferred reservation information and the document data to the storage part 2047 of the printing environment sharing service 2013 (C), and this storage part 2047 stores the reservation information and the document data in the HDD 2039 of the SPS server 2003 (C).

By ensuring that the reservation information and the document data be stored at the reservation location, for example, the user may be able to obtain the reservation information and the document data by making an enquiry to the reservation location via the Web server 2001 using a user terminal such as the PDA. Also, by storing the reservation information and the document data at the printing location, if the user is in the vicinity of the printing location, the user may be able to obtain the reservation information and the document data by directly operating the SPS server 2003 corresponding to the printing location without having to make an enquiry to the SPS server 2003 corresponding to the reservation location via the Web server 2001 using the user terminal, for example. This principle also applies to subsequent examples described below.

As is described in detail below in relation to a fourth embodiment of the present invention, in a case where an imaging apparatus 3200 implements the printing environment sharing service 2013 or similar applications, if the reservation information and the document data are stored in the imaging apparatus 3200, the imaging apparatus 3200 may be directly operated to realize printing and other operations with speed based on the reservation information and the document data stored in the imaging apparatus 3200. This also applies to subsequent examples described below.

In the following, an exemplary process of selecting a printer in making the printing reservation with reference to FIGS. 44A through 44C, and FIG. 45.

FIGS. 44A through 44C illustrate the printer selection.

Figure 45:
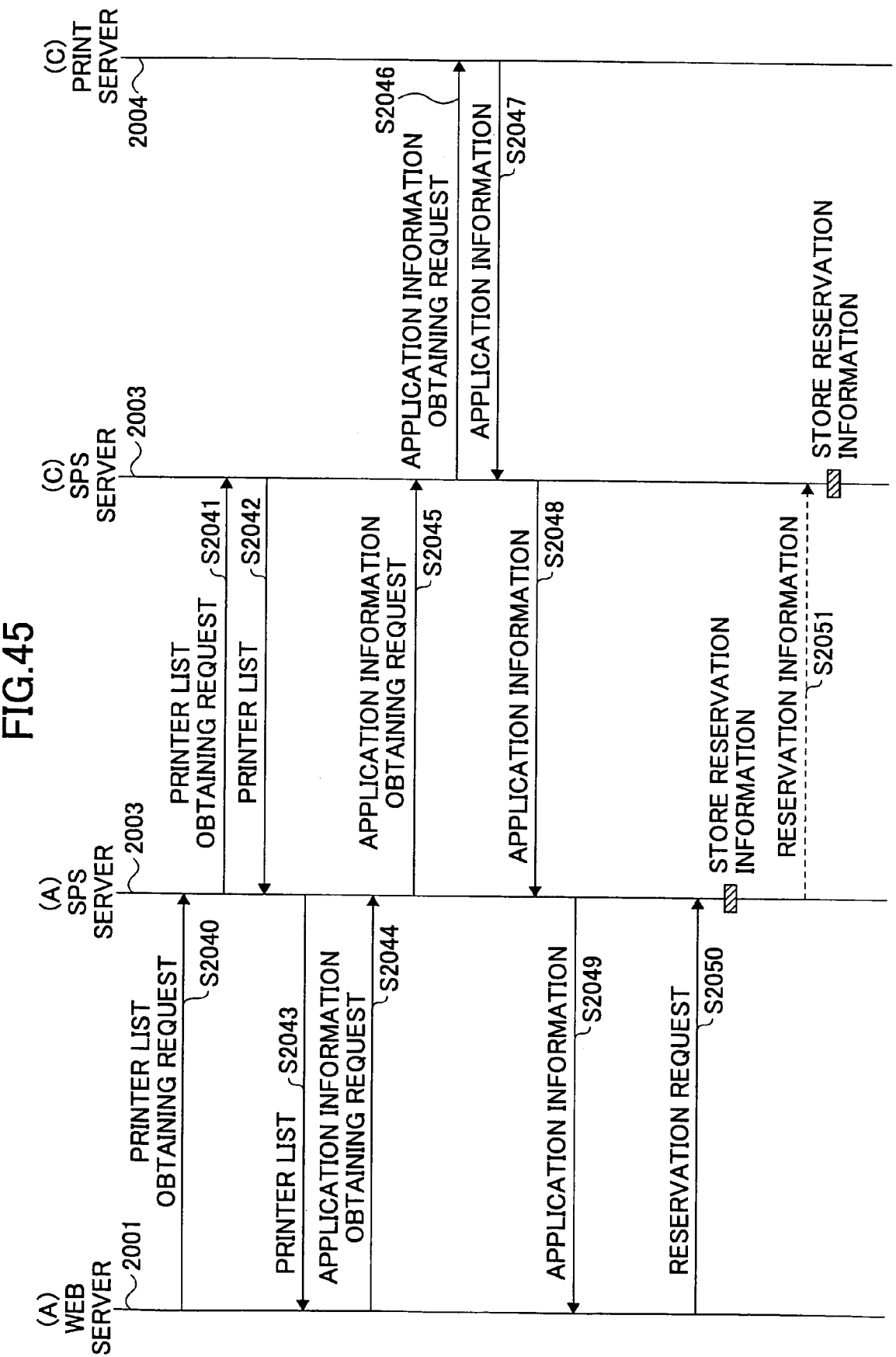
FIG. 45 is a sequence diagram illustrating a first exemplary process of selecting a document, a printing location, and a printer in making a printing reservation according to the third embodiment.

FIG. 45 is a sequence diagram illustrating a first exemplary process of selecting a printer in making a printing reservation.

For example, in the system configuration as shown in FIG. 33, if the user taps the "SELECT PRINTER" button on the printing location selection confirmation screen of FIG. 41B, the Web server 2001 (A) obtains information that the user has selected the "SELECT PRINTER" button via the user terminal.

Since "C" is selected as the printing location in this example, the Web server 2001 (A) receiving the information sends a request to the printing environment sharing service 2013 (A) for obtaining the printer list 2072 of the printing environment sharing service 2013 (C). (S2040 of FIG. 45).

Upon receiving the obtaining request, the printer list obtaining part 2042 of the printing environment sharing service 2013 (A) transmits the obtaining request to the printing environment sharing service 2013 (C) based on the channel information (e.g., A→C) obtained upon selecting the printing location (S2041 of FIG. 45)

Upon receiving the obtaining request, the printer list obtaining part 2042 of the printing environment sharing service 2013 (C) obtains the printer list 2072 stored in the HDD 2039 of the SPS server 2003 (C) and transmits this list 2072 to the printing environment sharing service 2013 (A) based on the channel information (S2042 of FIG. 45).

The printer list obtaining part 2042 of the printing environment sharing service 2013 (A) then transmits the received printer list 2072 of the printing environment sharing service 2013 (A) to the Web server 2001 (A) (S2043 of FIG. 45)

The Web server 2001 (A) then sends an obtaining request to the printing environment sharing service 2013 (A) for obtaining application information held by the print server 2004 (C), which implements the document print services 2014 that are accessible by the printing environment sharing service 2013 (C) (S2044 of FIG. 45)

Upon receiving the obtaining request, the application information obtaining part 46 of the printing environment sharing service 2013 (A) transmits this obtaining request to the printing environment sharing service 2013 (C) based on the channel information obtained when the user selects the printing location (S2045 of FIG. 45)

Upon receiving the obtaining request, the application information obtaining part 46 of the printing environment sharing service 2013 (C) transmits this obtaining request to the document print service 2014 (C) (S2046 of FIG. 45).

Upon receiving the obtaining request, the document print service 2014 (C) obtains the application information stored in the print server 2004 (C), and transmits this information to the printing environment sharing service 2013 (C) (S2047 of FIG. 45). It is noted that in the above example, the application information is describes as being stored in the print server 2004; however, the application information may be stored in other locations such as the SPS server 2003. In this case, the process steps S2046 and S2047 may be omitted from the present exemplary process. However, for the sake of simplifying the description, the application information is presumed to be stored in the print server 2004.

The application information obtaining part 2046 of the printing environment sharing service 2013 (C) transmits the received application information to the printing environment sharing service 2013 (A) based on the channel information (S2048 of FIG. 45).

The application information obtaining part 2046 of the printing environment sharing service 2013 (A) transmits the received application information to the Web server 2001 (A) (S2049 of FIG. 45).

The Web server 2001 (A) determines whether the selected document may be printed at a printer based on the application information obtained in process step S2049, and upon determining that the document can be printed, determines whether information pertaining to the printer is included in the printer list 2072 of the printing environment sharing service 2013 (C) of FIG. 33 that is obtained in step S2043. Upon determining that the information is included, the Web server 2001 (A) generates a printer selection screen as is shown in FIG. 44A for the printer, and provides this to the user terminal.

It is noted that in the process of FIG. 45, the order in which the process of obtaining the printer list and the process of obtaining the application information are performed may be reversed. This principle also applies to subsequent examples described below.

For example, if the user selects "P-C2" and taps the "SELECT" button on the printer selection screen of FIG. 44A, the Web server 2001 (A) generates a printer selection confirmation screen as is shown in FIG. 44B, and provides this to the user terminal.

For example, if the user taps the "RESERVE PRINTING" button on the printer selection confirmation screen of FIG.

44B, the Web server 2001 (A) generates a printing reservation confirmation screen as is shown in FIG. 44C, and provides this to the user terminal.

The user can make a printing reservation by setting the document to be printed, the printing location, and the printer without setting the printing conditions using the printing reservation confirmation screen of FIG. 44C.

For example, if the user taps the "RESERVE" button on the printing reservation confirmation screen of FIG. 44C, the Web server 2001 (A) transmits to the printing environment sharing service 2013 (A) the reservation information including the document ID, the identification information for identifying the printing location, the channel information to the printing location, and the printer identification information for identifying the printer 2006, and sends a request for making the printing reservation (S2050 of FIG. 45)

Upon receiving the printing reservation request, the printing reservation control part 2051 of the printing environment sharing service 2013 (A) provides the reservation information included in the printing reservation request to the storage part 2047 of the printing environment sharing service 2013 (A), and sends a storage request for the reservation information to be stored.

Upon receiving the storage request, the storage part 2047 of the printing environment sharing service 2013 (A) stores the reservation information including the document ID, the identification information for identifying the printing location, the channel information to the printing location, and the printer identification information for identifying the printer 2006 in the HDD 2039 of the SPS server 2003 (A).

In the process of FIG. 45, the identification information for identifying the printing location and the channel information to the printing location are included in the reservation information so that the printing reservation control part 2051 of the printing environment sharing service 2013 (A) may provide the reservation information included in the printing reservation request to the data transfer part 2044 of the printing environment sharing service 2013 (A) and send a transfer request for the reservation information to be transferred, and the data transfer part 2044 of the printing environment sharing service 2013 (A) receiving the transfer request may transfer the reservation information to the printing environment sharing service 2013 (C) based on the channel information to the printing location (S2051 of FIG. 45).

The printing reservation control part 2051 of the printing environment sharing service 2013 (C) provides the transferred reservation information to the storage part 2047 of the printing environment sharing service 2013 (C), and this storage part 2047 stores the reservation information in the HDD 2039 of the SPS server 2003 (C).

In the following, another exemplary process of selecting a printer in making a printing reservation is described with reference to FIG. 46.

Figure 46:
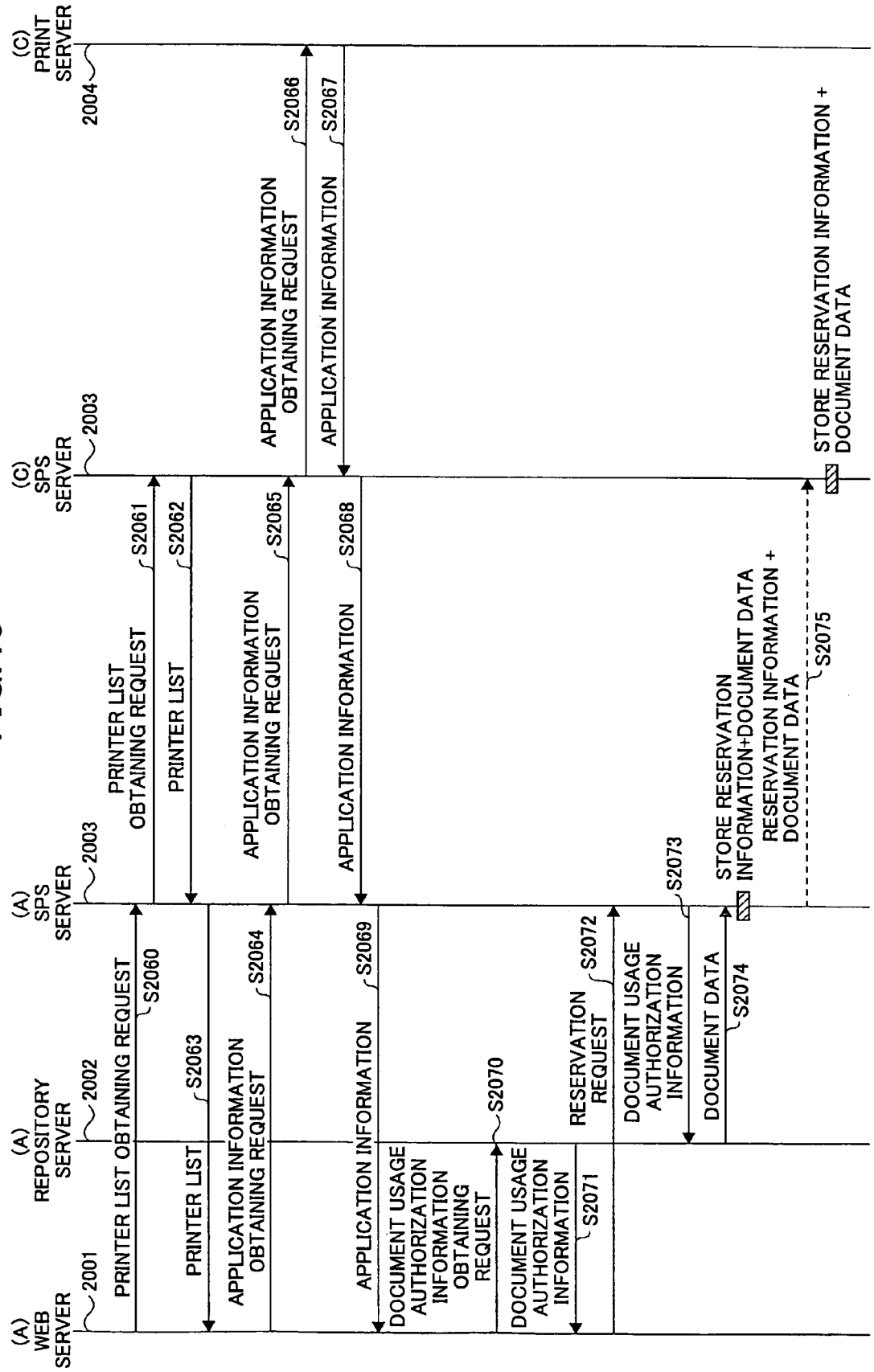
FIG. 46 is a sequence diagram illustrating a second exemplary process of selecting a document, a printing location, and a printer in making a printing reservation according to the third embodiment.

FIG. 46 is a sequence diagram illustrating a second exemplary process of selecting a printer in making printing reservation.

It is noted the process steps S2060 through S2069 are identical to the process steps S2040 through S2049 of FIG. 45.

As is described above, the Web server 2001 (A) determines whether the selected document may be printed at a printer based on the application information obtained in process step S2069, and upon determining that the document can be printed, determines whether information pertaining to the printer is included in the printer list 2072 of the printing environment sharing service 2013 (C) of FIG. 33 that is obtained in step S2063. Upon determining that the information is included, the Web server 2001 (A) generates a printer selection screen as is shown in FIG. 44A for the printer, and provides this to the user terminal.

For example, if the user selects "P-C2" and taps the "SELECT" button on the printer selection screen of FIG. 44A, the Web server 2001 (A) generates a printer selection confirmation screen as is shown in FIG. 44B, and provides this to the user terminal.

For example, if the user taps the "RESERVE PRINTING" button on the printer selection confirmation screen of FIG. 44B, the Web server 2001 (A) generates a printing reservation confirmation screen as is shown in FIG. 44C, and provides this to the user terminal.

For example, if the user taps the "RESERVE" button on the printing reservation confirmation screen of FIG. 41C, the Web server 2001 (A) transmits to the repository service 2012 a request for obtaining document usage authorization information authorizing the usage of a corresponding document including the document ID and user information (S2070 of FIG. 46).

Upon receiving the obtaining request, the repository service 2012 determines whether the user may be authorized to used the corresponding document based on the user information included in the obtaining request, for example, and upon determining that the user is authorized to use the document, the repository service 2012 issues the document usage authorization information, and transmits this to the Web server 2001 (A) (S2071 of FIG. 46).

Upon obtaining the document usage authorization information, the Web server 2001 (A) transmits to the printing environment sharing service 2013 (A) the reservation information including the document ID, the document usage authorization information, the identification information for identifying the printing location, the channel information to the printing location, and the printer identification information for identifying the printer 2006, and sends a printing reservation request for the printing reservation to be made (S2072 of FIG. 46).

Upon receiving the printing reservation request, the printing reservation control part 2051 of the printing environment sharing service 2013 (A) provides information such as the document ID and the document usage authorization information included in the printing reservation request to the document data obtaining part 2043, and sends an obtaining request for obtaining the document data.

Upon receiving the obtaining request, the document data obtaining part 2043 of the printing environment sharing service 2013 (A) transmits to the repository service 2012 (A) the document data obtaining request including information such as the document ID and the document usage authorization information (S2073 of FIG. 46)

The repository service 2012 (A) determines the validity of the document usage authorization information included in the received document data obtaining request, and upon determining that the information is valid, obtains from the repository server 2002 the document data of the document designated by the document ID included in the document data obtaining request, and sends this to the printing environment sharing service 2013 (A) (S2074 of FIG. 46).

When the document data obtaining part 2043 of the printing environment sharing service 2013 (A) obtains the document data, the printing reservation control part 2051 of the printing environment sharing service 2013 (A) provides the reservation information and the document data included in the printing reservation request to the storage part 2047 of the printing environment sharing service 2013 (A), and sends a storage request for the reservation information and the document data to be stored.

Upon receiving the storage request, the storage part 2047 of the printing environment sharing service 2013 (A) stores the reservation information including the identification information for identifying the printing location, the channel information to the printing location, and the printer identification information for identifying the printer 2006, and the document data in the HDD 2039 of the SPS server 2003 (A).

In the process shown in FIG. 46, the identification information for identifying the printing location and the channel information to the printing location are included in the reservation information so that the printing reservation control part 2051 of the printing environment sharing service 2013 (A) may provide the reservation information and the document data included in the printing reservation request to the data transfer part 2044 and send a transfer request for the reservation information and the document data to be transferred, and the data transfer part 2044 of the printing environment sharing service 2013 (A) receiving the transfer request may transfer the reservation information and the document data to the printing environment sharing service 2013 (C) based on the channel information to the printing location (S2075 of FIG. 46).

The printing reservation control part 2051 of the printing environment sharing service 2013 (C) provides the transferred reservation information and the document data to the storage part 2047 of the printing environment sharing service 2013 (C), and this storage part 2047 stores the reservation information and the document data in the HDD 2039 of the SPS server 2003 (C).

In the following, an exemplary process of setting the printing conditions in making a printing reservation is described with reference to FIGS. 47A, 47B, and FIG. 48.

FIGS. 47A and 47B illustrate the setting of the printing conditions.

Figure 48:
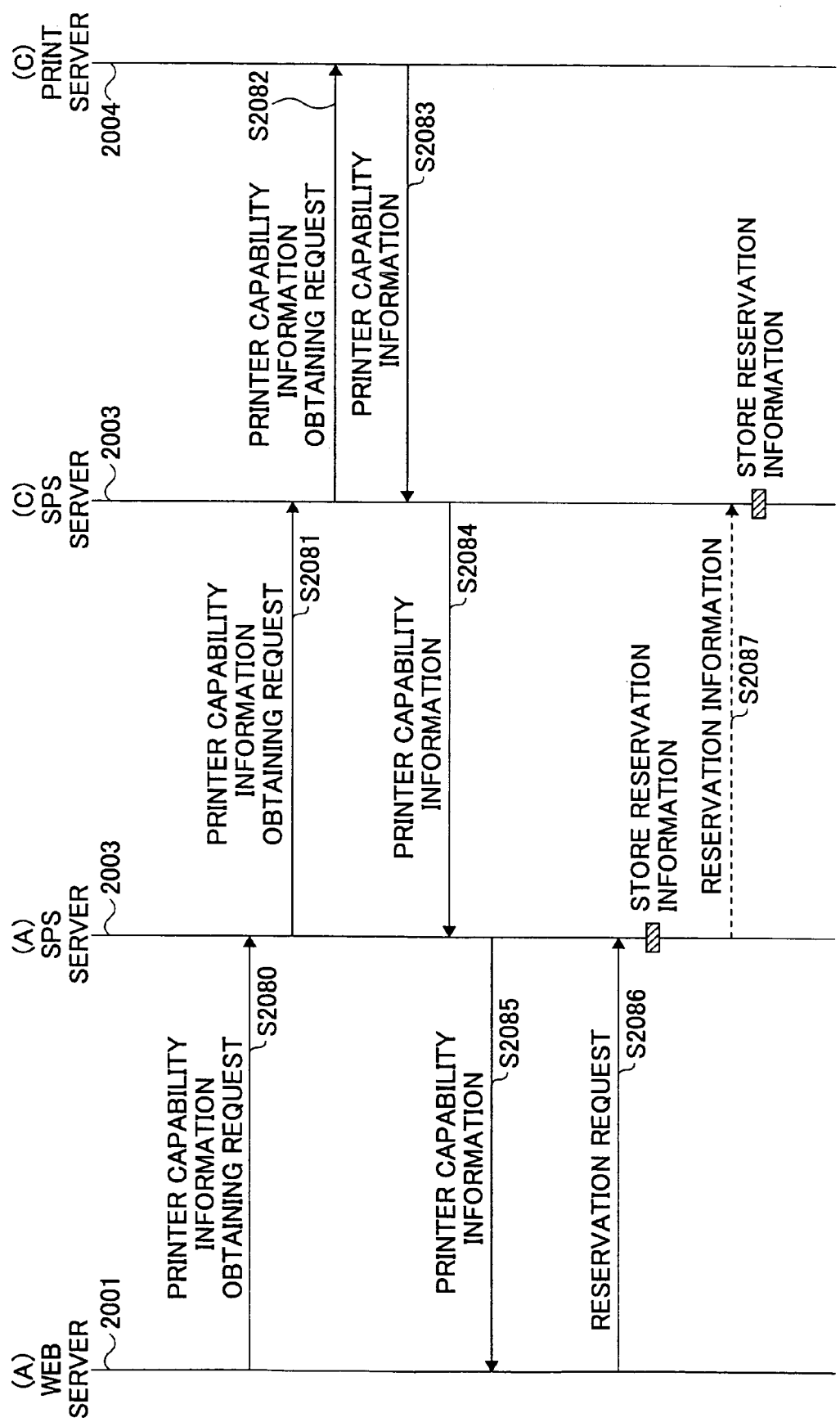
FIG. 48 is a sequence diagram illustrating a first exemplary process of selecting a document, a printing location, a printer, and printing conditions in making a printing reservation according to the third embodiment.

FIG. 48 is a sequence diagram illustrating a first exemplary process of setting the printing conditions in making a printing reservation.

For example, in the system configuration as shown in FIG. 33, if the user taps the "PRINTING CONDITION SETTING" button on the printer selection confirmation screen of FIG. 44B at the user terminal, the Web server 2001 (A) obtains information that the user has tapped the "PRINTING CONDITION SETTING" button at the user terminal.

Upon obtaining this information, the Web server 2001 (A) sends an obtaining request to the printing environment sharing service 2013 (A) for obtaining capability information of the printer 2006 (P-C2) that is held by the print server 2004 (C) (S2080 of FIG. 48).

Upon receiving the obtaining request, the printer capability information obtaining part 2045 of the printing environment sharing service 2013 (A) transmits this obtaining request to the printing environment sharing service 2013 (C) based on the channel information (i.e., A→C) obtained upon selecting the printing location (S2081 of FIG. 48).

Upon receiving the obtaining request, the printer capability information obtaining part 2045 of the printing environment sharing service 2013 (C) transmits this obtaining request to the document print service 2014 (C) (S2082 of FIG. 48).

Upon receiving this obtaining request, the document print service 2014 (C) obtains capability information of the printer 2006 (P-C2) that is stored in the print server 2004 (C), and transmits this to the printing environment sharing service 2013 (C) (S2083 of FIG. 48).

It is noted that the capability information of printers 2006 may be stored in their corresponding print servers 2004, or such information of the respective printers 2006 may be collectively stored in another server, for example. Also, the printer capability information may be individually held by the printers 2006, and the printing environment sharing service 2013 may obtain the capability information of a printer 2006 by making an enquiry to the corresponding printer 2006 either directly or via the print server 2004. In the following, for the sake of simplifying the descriptions, it is assumed that the printer capability information is stored in the print server 2004.

The printer capability information obtaining part 2045 of the printing environment sharing service 2013 (C) transmits the received capability information of printer 2006 (P-C2) to the printing environment sharing service 2013 (A) based on the channel information (S2084 of FIG. 48).

The printer capability information obtaining part 2045 of the printing environment sharing service 2013 (A) transmits the received capability information of the printer 2006 (P-C2) to the Web server 2001 (A) (S2085 of FIG. 48)

The Web server 2001 (A) then generates a printing condition setting screen as is shown in FIG. 47A based on the capability information of the printer 2006 (P-C2) obtained in process step S2085, and provides this to the user terminal.

For example, if the user sets the printing conditions such as paper size and paper direction and taps the "RESERVE PRINTING" button on the printing condition setting screen of FIG. 47A, the Web server 2001 (A) generates a printing reservation confirmation screen as is shown in FIG. 47B, and provides this to the user terminal.

The user can make a printing reservation by setting the document to be printed, the printing location, the printer, and the printing conditions using the printing reservation confirmation screen of FIG. 47B.

For example, if the user taps the "RESERVE" button on the printing reservation confirmation screen of FIG. 47B, the Web server 2001 (A) transmits to the printing environment sharing service 2013 (A) reservation information including the document ID, identification information for identifying the printing location, the channel information to the printing location, the printer identification information for identifying the printer 2006, and the printing conditions, and sends a printing reservation request for the printing reservation to be made (S2086 of FIG. 48).

Upon receiving the printing reservation request, the printing reservation control part 2051 of the printing environment sharing service 2013 (A) provides the reservation information included in the printing reservation request to the storage part 2047 of the printing environment sharing service 2013 (A), and sends a storage request for the reservation information be stored.

Upon receiving the storage request, the storage part 2047 of the printing environment sharing service 2013 (A) stores the reservation information including the document ID, identification information for identifying the printing location, the channel information to the printing location, the printer identification information for identifying the printer 2006, and the printing conditions in the HDD 2039 of the SPS server 2003 (A).

Since the identification information for identifying the printing location and channel information to the printing location are included in the reservation information in the process of FIG. 48, the printing reservation control part 2051 of the printing environment sharing service 2013 (A) provides the reservation information included in the printing reservation request to the data transfer part 44, and sends a transfer request for the reservation information to be transferred. Upon receiving the reservation information transfer request, the data transfer part 44 may transfer the reservation information to the printing environment sharing service 2013 (C) based on the channel information to the printing location (S2087 of FIG. 48).

The printing reservation control part 2051 of the printing environment sharing service 2013 (C) provides the transferred reservation information to the storage part 2047 of the printing environment sharing service 2013 (C), and this storage part 2047 stores the reservation information in the HDD 2039 of the SPS server 2003 (C).

In the following, another exemplary process of setting the printing conditions in making a printing reservation is descried with reference to FIG. 49.

Figure 49:
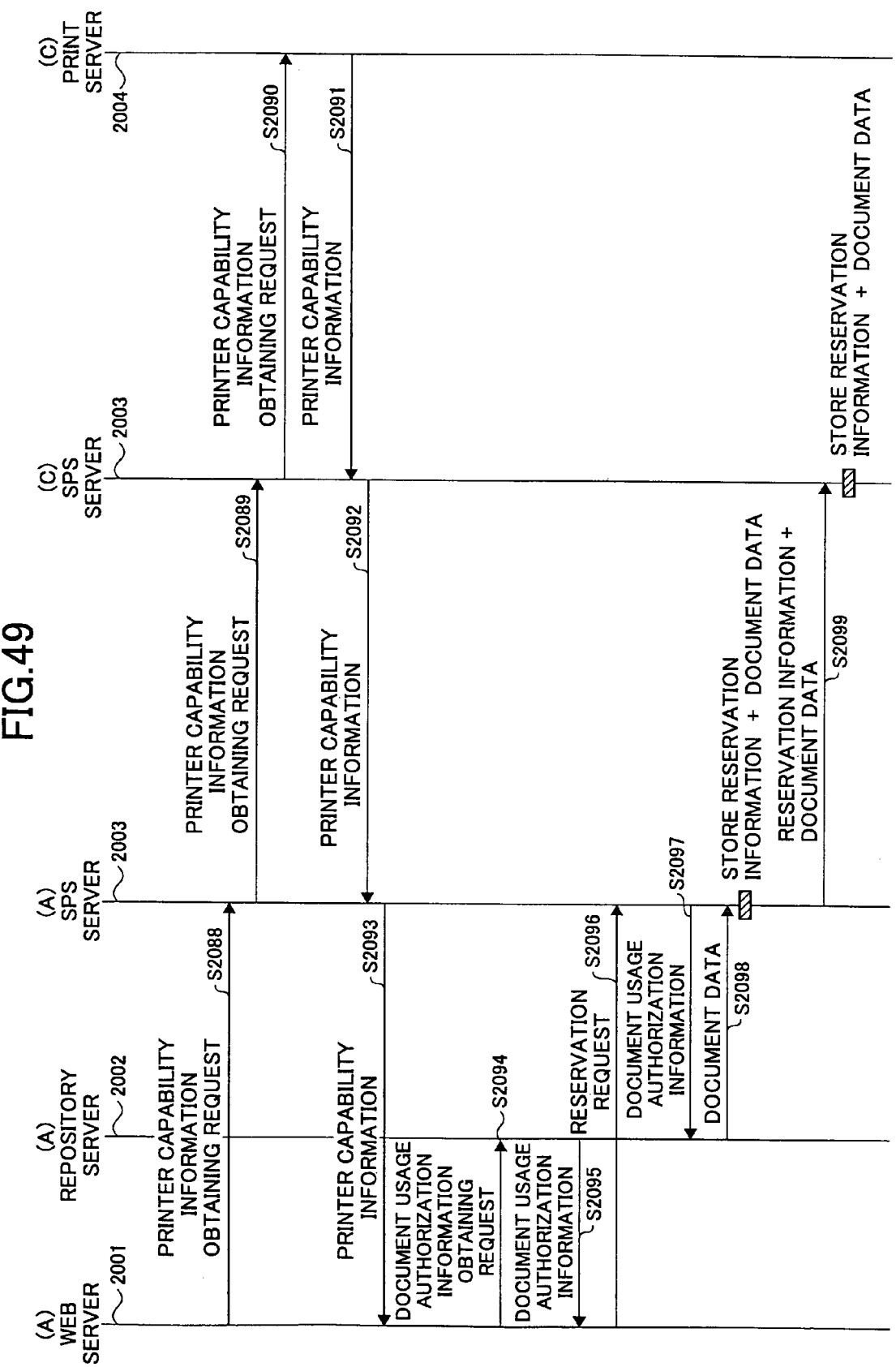
FIG. 49 is a sequence diagram illustrating a second exemplary process of selecting a document, a printing location, a printer, and printing conditions in making a printing reservation according to the third embodiment.

FIG. 49 is a sequence diagram illustrating a second exemplary process of setting the printing conditions in making a printing reservation.

It is noted that process steps S2088~S2093 of FIG. 49 are identical to the process steps S2080 and S2085 of FIG. 48.

As is described above, the Web server 2001 (A) generates the printing condition setting screen as shown in FIG. 47A based on the capability information of the printer 2006 (P-C2), and provides this to the user terminal.

For example, if the user sets the printing conditions such as paper size and paper direction and taps the "RESERVE PRINTING" button on the printing condition setting screen of FIG. 47A, the Web server 2001 (A) generates a printing reservation confirmation screen as is shown in FIG. 47B, and provides this to the user terminal.

For example, if the user taps the "RESERVE" button on the printing reservation confirmation screen of FIG. 47B, the Web server 2001 (A) transmits an obtaining request to the repository service 2012 for obtaining the document usage authorization information for authorizing the usage of the document that includes information such as the document ID and user information (S2094 of FIG. 49).

Upon receiving the obtaining request, the repository service 2012 determines whether the user may be authorized to used the corresponding document based on the user information included in the obtaining request, for example, and upon determining that the user is authorized to use the document, the repository service 2012 issues the document usage authorization information, and transmits this to the Web server 2001 (A) (S2095 of FIG. 49).

Upon obtaining the document usage authorization information, the Web server 2001 (A) transmits to the printing environment sharing service 2013 (A) the reservation information including the document ID, identification information for identifying the printing location, the channel information to the printing location, the printer identification information for identifying the printer 2006, and the printing conditions, and sends a printing reservation request for the printing reservation to be made (S2096 of FIG. 49).

Upon receiving the printing reservation request, the printing reservation control part 2051 of the printing environment sharing service 2013 (A) provides information such as the document ID and the document usage authorization information included in the printing reservation request to the document data obtaining part 2043, and sends an obtaining request for obtaining the document data.

Upon receiving the obtaining request, the document data obtaining part 2043 of the printing environment sharing service 2013 (A) transmits to the repository service 2012 (A) the document data obtaining request including the document ID and the document usage authorization information (S2097 of FIG. 49)

The repository service 2012 (A) determines the validity of the document usage authorization information included in the received document data obtaining request, and upon determining that the information is valid, obtains from the repository server 2002 the document data of the document designated by the document ID included in the document data obtaining request, and sends this to the printing environment sharing service 2013 (A) (S2098 of FIG. 49).

When the document data obtaining part 2043 of the printing environment sharing service 2013 (A) obtains the document data, the printing reservation control part 2051 of the printing environment sharing service 2013 (A) provides the reservation information and the document data included in the printing reservation request to the storage part 2047 of the printing environment sharing service 2013 (A), and sends a storage request for the reservation information and the document data to be stored.

Upon receiving the storage request, the storage part 2047 of the printing environment sharing service 2013 (A) stores the reservation information including the document ID, identification information for identifying the printing location, the channel information to the printing location, the printer identification information for identifying the printer 2006, and the printing conditions, and the document data in the HDD 2039 of the SPS server 2003 (A).

In the process shown in FIG. 49, the identification information for identifying the printing location and the channel information to the printing location are included in the reservation information so that the printing reservation control part 2051 of the printing environment sharing service 2013 (A) may provide the reservation information and the document data included in the printing reservation request to the data transfer part 2044 and send a transfer request for the reservation information and the document data to be transferred.

Upon receiving the transfer request, the data transfer part 2044 of the printing environment sharing service 2013 (A) transfers the reservation information and the document data to the printing environment sharing service 2013 (C) based on the channel information to the printing location (S2099 of FIG. 49).

The printing reservation control part 2051 of the printing environment sharing service 2013 (C) provides the transferred reservation information and the document data to the storage part 2047 of the printing environment sharing service 2013 (C), and this storage part 2047 stores the reservation information and the document data in the HDD 2039 of the SPS server 2003 (C).

In the following, exemplary processes of conducting printing from the respective stages of the printing reservation are described with reference to FIGS. 50A through 50H through FIG. 61. It is noted that in the examples illustrated by FIGS. 50A through 50H through FIG. 61, it is assumed that the reservation information is always stored at the reservation location (i.e., SPS server 2003 (A)) for the sake of simplifying the descriptions.

First, an exemplary printing start operation in the case of selecting the document in making the printing reservation is described with reference to FIGS. 50A through 50H and FIG. 51.

FIGS. 50A through 50H illustrate exemplary stages of the printing start operation from printing reservation confirmation to printing execution.

Figure 51:
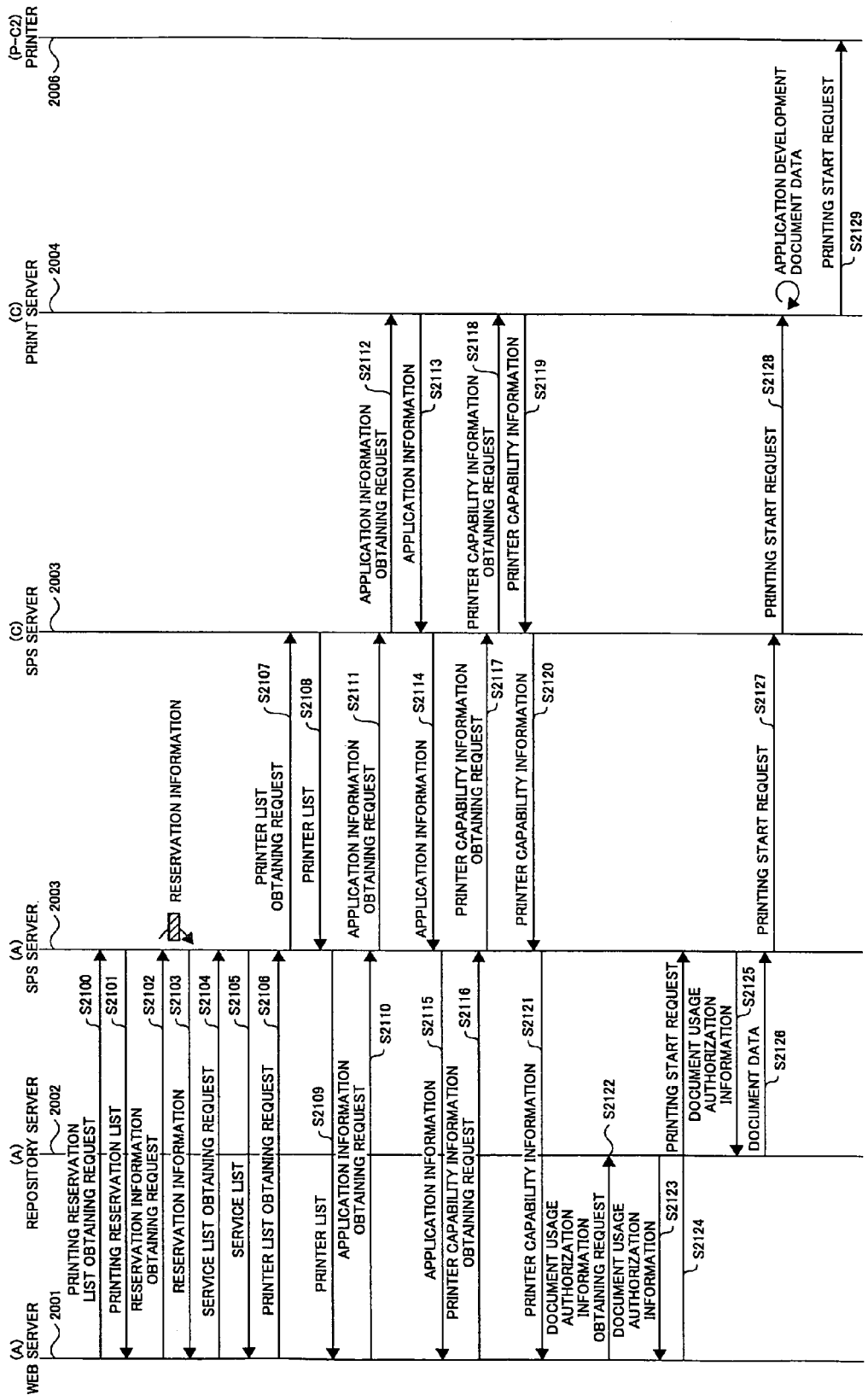
FIG. 51 is a sequence diagram illustrating a first exemplary printing start operation in a case where a document is selected in a printing reservation according to the third embodiment.

FIG. 51 is a sequence diagram illustrating a first example of a printing initiation process in the case of selecting a document and making the printing reservation.

It is noted that the process of FIG. 51 illustrates the printing start process in the case of making a printing reservation according to the process of FIG. 39.

The Web server 2001 (A) sends an obtaining request to the printing environment sharing service 2013 (A) for obtaining a printing reservation list of the printer reservations including the user identification information of the user (e.g., user ID, user name) based on a request from the user (S2100 of FIG. 51). It is noted that in subsequent examples described below, it is assumed that the user identification information corresponds to a user ID.

Upon receiving the obtaining request, the printing environment sharing service 2013 (A) obtains from the HDD 2039 of the SPS server 2003 (A) the reservation information stored by the storage part 2047 that is associated with the user ID included in the obtaining request, and transmits this to the Web server 2001 (A) (S2101 of FIG. 51)

Upon receiving the printing reservation list, the Web server 2001 (A) generates a printing reservation selection screen as is shown in FIG. 50A, and provides this to the user terminal.

For example, if the user selects "RESERVATION 1" and taps the "CONFIRM RESERVATION" button on the printing reservation selection screen of FIG. 50A, the Web server 2001 (A) transmits an obtaining request to the printing environment sharing service 2013 (A) for obtaining reservation information including the reservation information identifier (e.g., reservation number, unique reservation name) of the reservation selected by the user (S2102 of FIG. 51). It is noted that in the following examples, it is assumed that the reservation information identifier corresponds to a reservation number.

Upon receiving the obtaining request, the printing environment sharing service 2013 (A) obtains the reservation information associated with the reservation number that is included in the obtaining request, and sends this to the Web server 2001 (A) (S2103 of FIG. 51).

Upon obtaining the reservation information, the Web sever 2001 (A) generates a printing reservation confirmation screen as is shown in FIG. 50B, and provides this to the user terminal. For example, only the document may be selected at the time of reservation, and the user may tap the "SELECT PRINTING LOCATION" button on the printing reservation confirmation screen of FIG. 50B to select the printing location.

Upon receiving information that the user has tapped the "SELECT PRINTING LOCATION" button, the Web server 2001 (A) sends an obtaining request to the printing environment sharing service 2013 (A) for obtaining the service list 2071 of the printing environment sharing service 2013 (A) (S2104 of FIG. 51).

Upon receiving the obtaining request, the service list obtaining part of the printing environment sharing service 2013 (A) obtains the service list 2071 that is stored in the HDD 2039 of the SPS server 2003 (A), and sends this to the Web server 2001 (A) (S2105 of FIG. 51).

The Web server 2001 (A) then generates a printing location selection screen as is shown in FIG. 50C based on the obtained service list 2071 of the printing environment sharing service 2013 (A), and provides this to the user terminal.

For example, if the user selects "C" and taps the "SELECT" button on the printing location selection screen of FIG. 50C, the Web server 2001 (A) generates a printing location selection confirmation screen as is shown in FIG. 50D, and provides this to the user terminal.

For example, if the user taps the "SELECT PRINTER" button on the printing location selection confirmation screen of FIG. 50D, since "C" is selected as the printing location, the Web server 2001 (A) sends an obtaining request to the printing environment sharing service 2013 (A) for obtaining the printer list 2072 of the printing environment sharing service 2013 (C) (S2106 of FIG. 51).

Upon receiving the obtaining request, the printer list obtaining part 2042 of the printing environment sharing service 2013 (A) transmits the obtaining request to the printing environment sharing service 2013 (C) based on the channel information (e.g., A→C) obtained upon selecting the printing location (S2107 of FIG. 51)

Upon receiving the obtaining request, the printer list obtaining part 2042 of the printing environment sharing service 2013 (C) obtains the printer list 2072 stored in the HDD 2039 of the SPS server 2003 (C) and transmits this list 2072 to the printing environment sharing service 2013 (A) based on the channel information (S2108 of FIG. 51).

The printer list obtaining part 2042 of the printing environment sharing service 2013 (A) then transmits the received printer list 2072 of the printing environment sharing service 2013 (A) to the Web server 2001 (A) (S2109 of FIG. 51)

The Web server 2001 (A) then sends an obtaining request to the printing environment sharing service 2013 (A) for obtaining application information held by the print server 2004 (C), which implements the document print services 2014 that are accessible by the printing environment sharing service 2013 (C) (S2110 of FIG. 51)

Upon receiving the obtaining request, the application information obtaining part 46 of the printing environment sharing service 2013 (A) transmits this obtaining request to the printing environment sharing service 2013 (C) based on the channel information (S2111 of FIG. 51)

Upon receiving the obtaining request, the application information obtaining part 46 of the printing environment sharing service 2013 (C) transmits this obtaining request to the document print service 2014 (C) (S2112 of FIG. 51).

Upon receiving the obtaining request, the document print service 2014 (C) obtains the application information stored in the print server 2004 (C), and transmits this information to the printing environment sharing service 2013 (C) (S2113 of FIG. 51).

The application information obtaining part 2046 of the printing environment sharing service 2013 (C) transmits the received application information to the printing environment sharing service 2013 (A) based on the channel information (S2114 of FIG. 51).

The application information obtaining part 2046 of the printing environment sharing service 2013 (A) transmits the received application information to the Web server 2001 (A) (S2115 of FIG. 51).

The Web server 2001 (A) determines whether the selected document may be printed at a printer based on the application information obtained in process step S2115, and upon determining that the document can be printed, determines whether information pertaining to the printer is included in the printer list 2072 of the printing environment sharing service 2013 (C) obtained in step S2109. Upon determining that the information is included, the Web server 2001 (A) generates a printer selection screen as is shown in FIG. 50E for the printer, and provides this to the user terminal.

For example, if the user selects "P-C2" and taps the "SELECT" button on the printer selection screen of FIG. 50E, the Web server 2001 (A) generates a printer selection confirmation screen as is shown in FIG. 50F, and provides this to the user terminal.

For example, if the user taps the "PRINTING CONDITION SETTING" button on the printer selection confirmation screen of FIG. 50F, the Web server 2001 (A) sends an obtaining request to the printing environment sharing service

2013 (A) for obtaining capability information of the printer 2006 (P-C2) that is held by the print server 2004 (C) (S2116 of FIG. 51).

Upon receiving the obtaining request, the printer capability information obtaining part 2045 of the printing environment sharing service 2013 (A) transmits this obtaining request to the printing environment sharing service 2013 (C) based on the channel information (S2117 of FIG. 51).

Upon receiving the obtaining request, the printer capability information obtaining part 2045 of the printing environment sharing service 2013 (C) transmits this obtaining request to the document print service 2014 (C) (S2118 of FIG. 51).

Upon receiving this obtaining request, the document print service 2014 (C) obtains the capability information of the printer 2006 (P-C2) that is stored in the print server 2004 (C), and transmits this to the printing environment sharing service 2013 (C) (S2119 of FIG. 51).

The printer capability information obtaining part 2045 of the printing environment sharing service 2013 (C) transmits the received capability information of printer 2006 (P-C2) to the printing environment sharing service 2013 (A) based on the channel information (S2120 of FIG. 51).

The printer capability information obtaining part 2045 of the printing environment sharing service 2013 (A) transmits the received capability information of the printer 2006 (P-C2) to the Web server 2001 (A) (S2121 of FIG. 51).

The Web server 2001 (A) then generates a printing condition setting screen as is shown in FIG. 50G based on the capability information of the printer 2006 (P-C2) obtained in process step S2121, and provides this to the user terminal.

For example, if the user sets the printing conditions such as paper size and paper direction and taps the "CONFIRM PRINTING" button on the printing condition setting screen of FIG. 50G, the Web server 2001 (A) generates a printing confirmation screen as is shown in FIG. 50H, and provides this to the user terminal.

For example, if the user taps the "PRINT" button on the printing confirmation screen of FIG. 50H, the Web server 2001 (A) transmits an obtaining request to the repository service 2012 for obtaining the document usage authorization information for authorizing the usage of the document that includes information such as the document ID and the user information (S2122 of FIG. 51)

Upon receiving the obtaining request, the repository service 2012 determines whether the user may be authorized to used the corresponding document based on the user information included in the obtaining request, for example, and upon determining that the user is authorized to use the document, the repository service 2012 issues the document usage authorization information, and transmits this to the Web server 2001 (A) (S2123 of FIG. 51).

Upon obtaining the document usage authorization information, the Web server 2001 (A) transmits to the printing environment sharing service 2013 (A) the reservation information including the document authorization information, identification information for identifying the printing location, the channel information to the printing location, the printer identification information for identifying the printer 2006, and the printing conditions, and sends a printing start request for starting the printing operation (S2124 of FIG. 51).

Upon receiving the printing start request, the printing start control part 2052 of the printing environment sharing service 2013 (A) provides information such as the document ID and the document usage authorization information included in the printing start request to the document data obtaining part 2043, and sends an obtaining request for obtaining the document data.

Upon receiving the obtaining request, the document data obtaining part 2043 of the printing environment sharing service 2013 (A) transmits to the repository service 2012 (A) the document data obtaining request including the document ID and the document usage authorization information (S2125 of FIG. 51)

The repository service 2012 (A) determines the validity of the document usage authorization information included in the received document data obtaining request, and upon determining that the information is valid, obtains from the repository server 2002 the document data of the document designated by the document ID included in the document data obtaining request, and sends this to the printing environment sharing service 2013 (A) (S2126 of FIG. 51).

The printing start control part 2052 of the printing environment sharing service 2013 (A) transmits to the printing environment sharing service 2013 (C) a printing start request including the reservation information included in the printing start request obtained in step S2124 of FIG. 51 (e.g., identification information for identifying the printing location, the channel information to the printing location, the printer identification information for identifying the printer 2006, and the printing conditions), the document data received in step S2126 of FIG. 51, and the reservation information stored by the storage part 2047 upon making the printing reservation (e.g., document ID), the transmission being based on the channel information to the printing location (S2127 of FIG. 51).

Upon receiving the printing start request including the reservation information and the document data, the printing start control part 2052 of the printing environment sharing service 2013 (C) transmits the printing start request to the document print service 2014 (C) based on the identification information for identifying the printer 2006 that is included in the reservation information (S2128 of FIG. 51)

Upon receiving the printing start request including the reservation information and the document data, the document print service 2014 (C) converts the document data into print data that may be printed out by the designated printer 2006 (P-C2), and transmits the printing start request including the print data to the printer 2006 (P-C2) designated in the reservation information (S2129 of FIG. 51).

Upon receiving the printing start request, the printer 2006 (P-C2) prints out the print data included in the printing start request.

As is illustrated by FIGS. 50A through 50H and FIG. 51, when the document is selected at the time of the printing reservation, the printing location, the printer, and printing conditions may be set afterwards upon conducting the printing operation.

Also, the printing environment sharing service 2013 may store the document ID of the document selected by the user as reservation information, but not the actual document data so that when changes are made to the document data after the printing reservation is made, the most recently updated version of the document data corresponding to the document ID may be used when the user starts the printing operation.

In the following, another exemplary printing start operation in the case of selecting the document in making the printing reservation is described with reference to FIG. 52.

Figure 52:
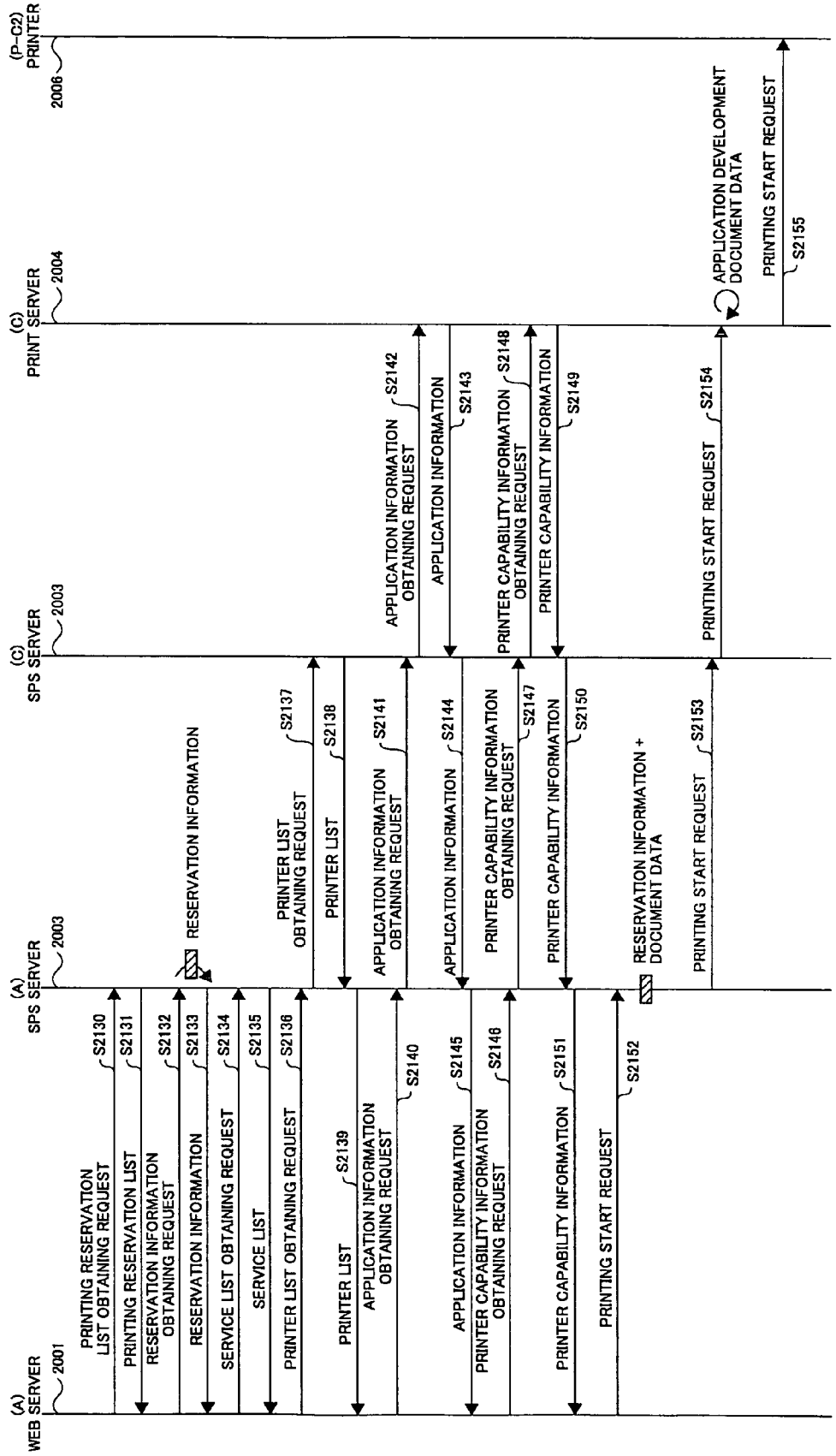
FIG. 52 is a sequence diagram illustrating a second exemplary printing start operation in a case where a document is selected in a printing reservation according to the third embodiment.

FIG. 52 is a sequence diagram illustrating a second exemplary printing start operation in the case of selecting only the document in making the printing reservation.

It is noted that the process of FIG. 52 corresponds to the printing start operation that may be performed in the case where the printing reservation has been made according to the process of FIG. 40.

It is also noted that the process steps S2130 through S2151 of FIG. 52 are identical to the process steps S2100 through S2121 of FIG. 51.

In the process of FIG. 40, as opposed to the process of FIG. 39, the Web server 2001 (A) obtains the document usage authorization information at the time of the printing reservation, and the SPS server 2003 (A) stores the document data along with the reservation information. Thereby, for example, if the user taps the "PRINT" button on the printing confirmation screen of FIG. 50H, the Web server 2001 (A) transmits to the printing environment sharing service 2013 (A) the reservation information including the identification information for identifying the printing location, the channel information to the printing location, the printer identification information for identifying the printer 2006, and the printing conditions, and sends a printing start request for starting the printing operation (S2152 of FIG. 52).

Upon receiving the printing start request, the printing start control part 2052 of the printing environment sharing service 2013 (A) obtains the reservation information and the document data stored by the storage part 2047 that is associated with the reservation number included in the printing start request, and transmits to the printing environment sharing service 2013 (C) a printing start request including the obtained reservation information and the document data, and the reservation information received in step S2152 of FIG. 52 based on the channel information to the printing location (S2153 of FIG. 52)

It is noted that the process steps S2154 through S2155 are identical to the process steps S2128 through S2129 of FIG. 51.

As is illustrated by FIGS. 50A through 50H and/or FIG. 52, when the document is selected at the time of the printing reservation, the printing location, the printer, and the printing conditions may be set afterwards upon conducting the printing operation.

Also, in the present example, since the printing environment sharing service 2013 stores the reservation information and the document data corresponding to the document ID of the document selected by the user, printing may be conducted using the document data in the original state at the time the printing reservation has been made by the user.

In the following, an exemplary printing start operation in the case where the printing location is also selected in the printing reservation is described with reference to FIGS. 53A through 53F and FIG. 54.

FIGS. 53A through 53F illustrate a second example of stages in the operation from printing reservation confirmation to printing execution.

Figure 54:
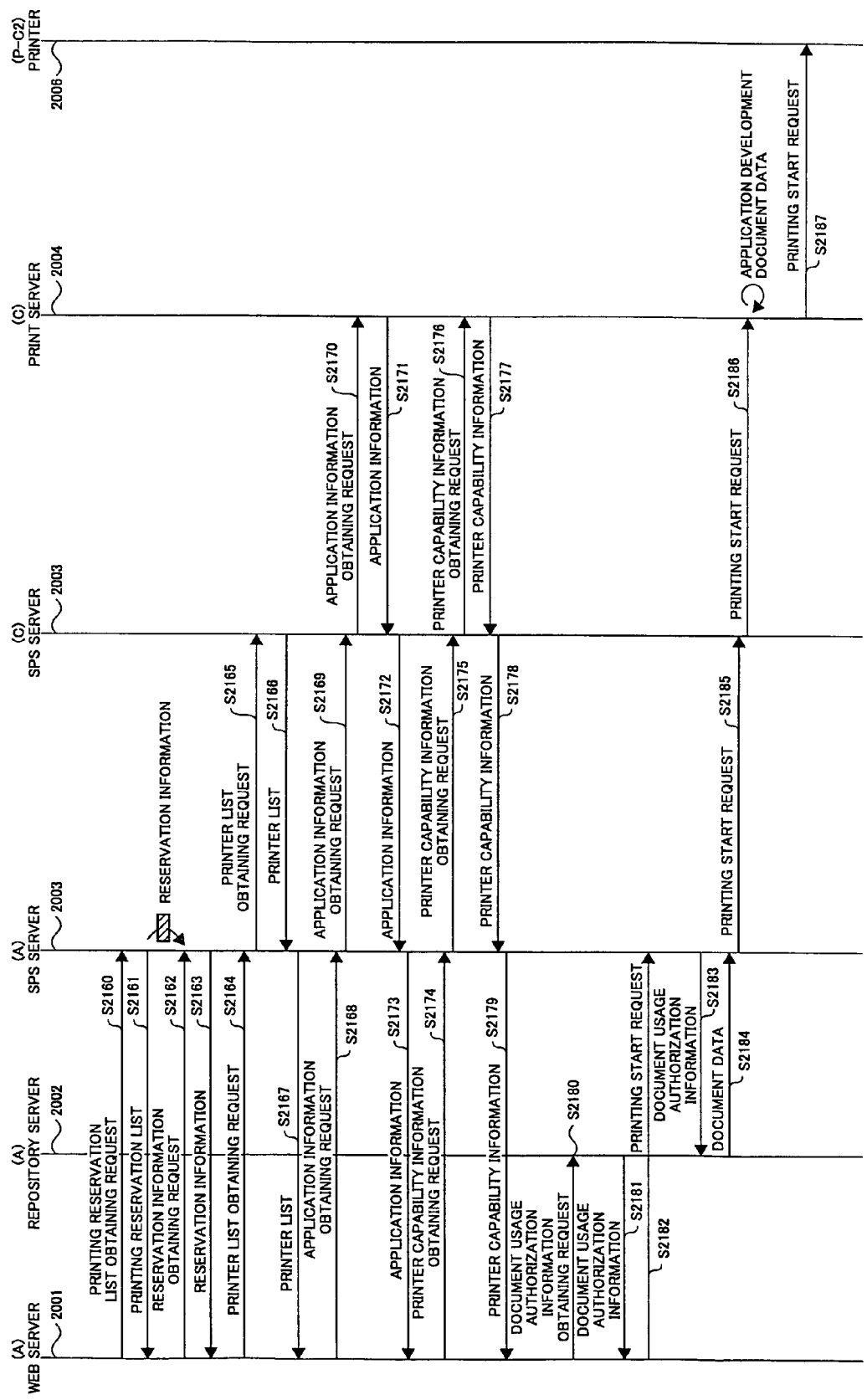
FIG. 54 is a sequence diagram illustrating a first exemplary printing start operation in a case where a document and a printing location are selected in a printing reservation according to the third embodiment.

FIG. 54 is a sequence diagram illustrating a first exemplary printing start operation in the case where the printing location is selected in making the printing reservation.

It is noted that the process of FIG. 54 corresponds to the printing start operation that is performed in the case where the printing reservation is made according to the process of FIG. 42.

The Web server 2001 (A) sends an obtaining request to the printing environment sharing service 2013 (A) for obtaining a printing reservation list of the printing reservations including the user ID of the user (S2160 of FIG. 54).

Upon receiving the obtaining request, the printing environment sharing service 2013 (A) obtains from the HDD 2039 of the SPS server 2003 (A) the reservation information stored by the storage part 2047 that is associated with the user ID included in the obtaining request, and transmits this to the Web server 2001 (A) (S2161 of FIG. 54)

Upon receiving the printing reservation list, the Web server 2001 (A) generates a printing reservation selection screen as is shown in FIG. 53A, and provides this to the user terminal.

For example, if the user selects "RESERVATION 1" and taps the "CONFIRM RESERVATION" button on the printing reservation selection screen of FIG. 53A, the Web server 2001 (A) transmits an obtaining request to the printing environment sharing service 2013 (A) for obtaining the reservation number of the reservation selected by the user (S2162 of FIG. 54).

Upon receiving the obtaining request, the printing environment sharing service 2013 (A) obtains the reservation information associated with the reservation number that is included in the obtaining request, and sends this to the Web server 2001 (A) (S2163 of FIG. 54).

Upon obtaining the reservation information, the Web sever 2001 (A) generates a printing reservation confirmation screen as is shown in FIG. 53B, and provides this to the user terminal. For example, the document and the printing location may be selected at the time of reservation, and the user may tap the "SELECT PRINTER" button on the printing reservation confirmation screen of FIG. 53B to select the printer 2006.

For example, if the user taps the "SELECT PRINTER" button on the printing location selection confirmation screen of FIG. 53B, since "C" is selected in this example as the printing location at the time the printing reservation according to the reservation information, the Web server 2001 (A) may perceive from the reservation information that the printing environment service 2013 (C) is selected as the printing location at the time of the printing reservation, and thereby sends an obtaining request to the printing environment sharing service 2013 (A) for obtaining the printer list 2072 of the printing environment sharing service 2013 (C) (S2164 of FIG. 54).

Upon receiving the obtaining request, the printer list obtaining part 2042 of the printing environment sharing service 2013 (A) transmits the obtaining request to the printing environment sharing service 2013 (C) based on the channel information obtained upon selecting the printing location (S2165 of FIG. 54)

Upon receiving the obtaining request, the printer list obtaining part 2042 of the printing environment sharing service 2013 (C) obtains the printer list 2072 stored in the HDD 2039 of the SPS server 2003 (C) and transmits this list 2072 to the printing environment sharing service 2013 (A) based on the channel information (S2166 of FIG. 54).

The printer list obtaining part 2042 of the printing environment sharing service 2013 (A) then transmits the received printer list 2072 of the printing environment sharing service 2013 (A) to the Web server 2001 (A) (S2167 of FIG. 54)

The Web server 2001 (A) then sends an obtaining request to the printing environment sharing service 2013 (A) for obtaining application information held by the print server 2004 (C), which implements the document print services 2014 that are accessible by the printing environment sharing service 2013 (C) (S2168 of FIG. 54)

Upon receiving the obtaining request, the application information obtaining part 46 of the printing environment sharing service 2013 (A) transmits this obtaining request to the printing environment sharing service 2013 (C) based on the channel information (S2169 of FIG. 54)

Upon receiving the obtaining request, the application information obtaining part 46 of the printing environment sharing service 2013 (C) transmits this obtaining request to the document print service 2014 (C) (S2170 of FIG. 54).

Upon receiving the obtaining request, the document print service 2014 (C) obtains the application information stored in the print server 2004 (C), and transmits this information to the printing environment sharing service 2013 (C) (S2171 of FIG. 54).

The application information obtaining part 2046 of the printing environment sharing service 2013 (C) transmits the received application information to the printing environment sharing service 2013 (A) based on the channel information (S2172 of FIG. 54).

The application information obtaining part 2046 of the printing environment sharing service 2013 (A) transmits the received application information to the Web server 2001 (A) (S2173 of FIG. 54).

The Web server 2001 (A) determines whether the selected document may be printed at a printer based on the application information obtained in process step S2173, and upon determining that the document can be printed, determines whether information pertaining to the printer is included in the printer list 2072 of the printing environment sharing service 2013 (C) obtained in step S2167. Upon determining that the information is included, the Web server 2001 (A) generates a printer selection screen as is shown in FIG. 53C for the printer, and provides this to the user terminal.

For example, if the user selects "P-C2" and taps the "SELECT" button on the printer selection screen of FIG. 53C, the Web server 2001 (A) generates a printer selection confirmation screen as is shown in FIG. 53D, and provides this to the user terminal.

For example, if the user taps the "PRINTING CONDITION SETTING" button on the printer selection confirmation screen of FIG. 53D, the Web server 2001 (A) sends an obtaining request to the printing environment sharing service 2013 (A) for obtaining capability information of the printer 2006 (P-C2) that is held by the print server 2004 (C) (S2174 of FIG. 54).

Upon receiving the obtaining request, the printer capability information obtaining part 2045 of the printing environment sharing service 2013 (A) transmits this obtaining request to the printing environment sharing service 2013 (C) based on the channel information (S2175 of FIG. 54).

Upon receiving the obtaining request, the printer capability information obtaining part 2045 of the printing environment sharing service 2013 (C) transmits this obtaining request to the document print service 2014 (C) (S2176 of FIG. 54).

Upon receiving this obtaining request, the document print service 2014 (C) obtains the capability information of the printer 2006 (P-C2) that is stored in the print server 2004 (C), and transmits this to the printing environment sharing service 2013 (C) (S2177 of FIG. 54).

The printer capability information obtaining part 2045 of the printing environment sharing service 2013 (C) transmits the received capability information of printer 2006 (P-C2) to the printing environment sharing service 2013 (A) based on the channel information (S2178 of FIG. 54).

The printer capability information obtaining part 2045 of the printing environment sharing service 2013 (A) transmits the received capability information of the printer 2006 (P-C2) to the Web server 2001 (A) (S2179 of FIG. 54).

The Web server 2001 (A) then generates a printing condition setting screen as is shown in FIG. 53E based on the capability information of the printer 2006 (P-C2) obtained in process step S2179, and provides this to the user terminal.

For example, if the user sets the printing conditions such as paper size and paper direction and taps the "CONFIRM PRINTING" button on the printing condition setting screen of FIG. 53E, the Web server 2001 (A) generates a printing confirmation screen as is shown in FIG. 53F, and provides this to the user terminal.

For example, if the user taps the "PRINT" button on the printing confirmation screen of FIG. 53F, the Web server 2001 (A) transmits an obtaining request to the repository service 2012 for obtaining the document usage authorization information for authorizing the usage of the document that includes information such as the document ID and the user information (S2180 of FIG. 54)

Upon receiving the obtaining request, the repository service 2012 determines whether the user may be authorized to used the corresponding document based on the user information included in the obtaining request, for example, and upon determining that the user is authorized to use the document, the repository service 2012 issues the document usage authorization information, and transmits this to the Web server 2001 (A) (S2181 of FIG. 54).

Upon obtaining the document usage authorization information in step S2181, the Web server 2001 (A) transmits to the printing environment sharing service 2013 (A) the reservation information including the document authorization information, the printer identification information for identifying the printer 2006, and the printing conditions, and sends a printing start request for starting the printing operation (S2182 of FIG. 54).

Upon receiving the printing start request, the printing start control part 2052 of the printing environment sharing service 2013 (A) provides to the document data obtaining part 2043 information such as the document usage authorization information included in the printing start request, and information such as the document ID included in the reservation information stored by the storage part 2047 at the time of the printing reservation, and sends an obtaining request for obtaining the document data.

Upon receiving the obtaining request, the document data obtaining part 2043 of the printing environment sharing service 2013 (A) transmits to the repository service 2012 (A) the document data obtaining request including the document ID and the document usage authorization information (S2183 of FIG. 54)

The repository service 2012 (A) determines the validity of the document usage authorization information included in the received document data obtaining request, and upon determining that the information is valid, obtains from the repository server 2002 the document data of the document designated by the document ID included in the document data obtaining request, and sends this to the printing environment sharing service 2013 (A) (S2184 of FIG. 54).

The printing start control part 2052 of the printing environment sharing service 2013 (A) transmits to the printing environment sharing service 2013 (C) a printing start request including the reservation information included in the printing start request obtained in step S2182 of FIG. 54 (e.g., the printer identification information for identifying the printer 2006, and the printing conditions), the document data received in step S2184 of FIG. 54, and the reservation information stored by the storage part 2047 upon making the printing reservation (e.g., document ID, identification information for identifying the printing location, and the channel information to the printing location) the transmission being based on the channel information to the printing location (S2185 of FIG. 54).

Upon receiving the printing start request including the reservation information and the document data, the printing start control part 2052 of the printing environment sharing service 2013 (C) transmits the printing start request to the document print service 2014 (C) based on the identification information for identifying the printer 2006 that is included in the reservation information (S2186 of FIG. 54)

Upon receiving the printing start request including the reservation information and the document data, the document print service 2014 (C) converts the document data into print data that may be printed out by the designated printer 2006 (P-C2), and transmits the printing start request including the print data to the printer 2006 (P-C2) designated in the reservation information (S2187 of FIG. 54)

Upon receiving the printing start request, the printer 2006 (P-C2) prints out the print data included in the printing start request.

As is illustrated by FIGS. 53A through 53F and/or FIG. 54, when the document and the printing location are selected at the time of the printing reservation, the printer and the printing conditions may be set afterwards upon conducting the printing operation.

Also, the printing environment sharing service 2013 may store the document ID of the document selected by the user as reservation information, but not the actual document data so that when changes are made to the document data after the printing reservation is made, the most recently updated version of the document data corresponding to the document ID may be used when the user starts the printing operation.

In the following, another exemplary printing start operation in the case of selecting the document and the printing location in making the printing reservation is described with reference to FIG. 55.

FIG. 55 is a sequence diagram illustrating a second exemplary printing start operation in the case of selecting the document and printing location in making the printing reservation.

It is noted that the process of FIG. 55 corresponds to the printing start operation that may be performed in the case where the printing reservation is made according to the process of FIG. 43.

It is also noted that the process steps S2190 through S2209 of FIG. 55 are identical to the process steps S2160 through S2179 of FIG. 54.

In the process of FIG. 43, as opposed to the process of FIG. 42, the Web server 2001 (A) obtains the document usage authorization information at the time of the printing reservation, and the SPS server 2003 (A) stores the document data along with the reservation information. Thereby, for example, if the user taps the "PRINT" button on the printing confirmation screen of FIG. 53F, the Web server 2001 (A) transmits to the printing environment sharing service 2013 (A) the reservation information including the printer identification information for identifying the printer 2006 and the printing conditions, and sends a printing start request for starting the printing operation (S2210 of FIG. 55).

Upon receiving the printing start request, the printing start control part 2052 of the printing environment sharing service 2013 (A) obtains the reservation information and the document data stored by the storage part 2047 that is associated with the reservation number included in the printing start request, and transmits to the printing environment sharing service 2013 (C) a printing start request including the obtained reservation information and the document data, and the reservation information received in step S2210 of FIG. 55 based on the channel information to the printing location (S2211 of FIG. 55)

It is noted that the process steps S2212 through S2213 of FIG. 55 are identical to the process steps S2186 through S2187 of FIG. 54.

As is illustrated by FIGS. 53A through 53F and/or FIG. 55, when the document and the printing location are selected at the time of the printing reservation, the printer and the printing conditions may be set afterwards upon conducting the printing operation.

Also, in the present example, since the printing environment sharing service 2013 stores the reservation information as well as the document data corresponding to the document ID of the document selected by the user, printing may be conducted using the document data in the original state at the time the printing reservation has been made by the user.

In the following, an exemplary printing start operation in the case where the printer is also selected in the printing reservation is described with reference to FIGS. 56A through 56D and FIG. 57.

FIGS. 56A through 56F illustrate a third example of stages in the operation from printing reservation confirmation to printing execution.

Figure 57:
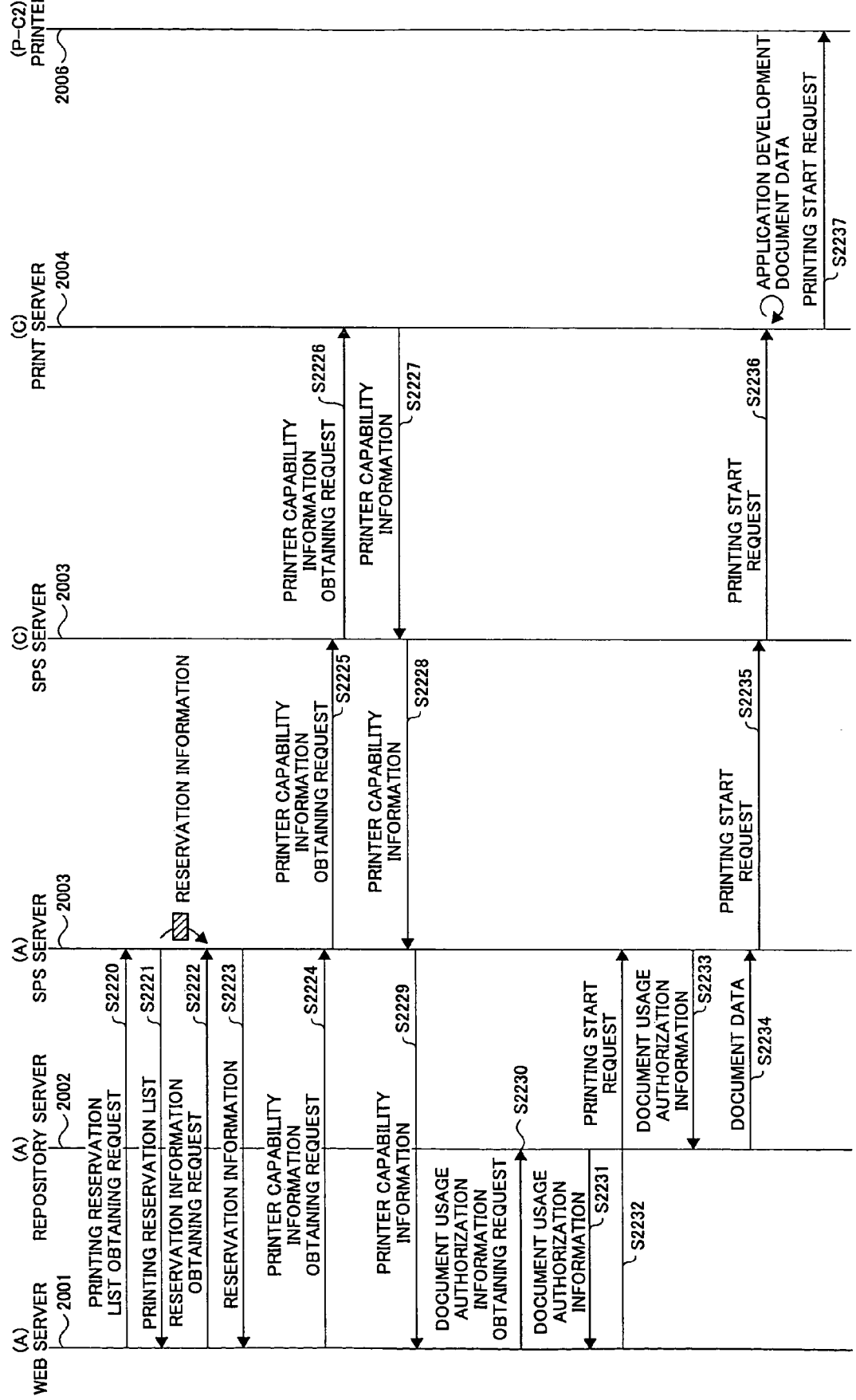
FIG. 57 is a sequence diagram illustrating a first exemplary printing start operation in a case where a document, a printing location, and a printer are selected in a printing reservation according to the third embodiment.

FIG. 57 is a sequence diagram illustrating a first exemplary printing start operation in the case where the printer is selected in making the printing reservation.

It is noted that the process of FIG. 57 corresponds to the printing start operation that is performed in the case where the printing reservation is made according to the process of FIG. 45.

The Web server 2001 (A) sends an obtaining request to the printing environment sharing service 2013 (A) for obtaining a printing reservation list of the printing reservations including the user ID of the user (S2220 of FIG. 57).

Upon receiving the obtaining request, the printing environment sharing service 2013 (A) obtains from the HDD 2039 of the SPS server 2003 (A) the reservation information stored by the storage part 2047 that is associated with the user ID included in the obtaining request, and transmits this to the Web server 2001 (A) (S2221 of FIG. 57)

Upon receiving the printing reservation list, the Web server 2001 (A) generates a printing reservation selection screen as is shown in FIG. 56A, and provides this to the user terminal.

For example, if the user selects "RESERVATION 1" and taps the "CONFIRM RESERVATION" button on the printing reservation selection screen of FIG. 56A, the Web server 2001 (A) transmits an obtaining request to the printing environment sharing service 2013 (A) for obtaining reservation information including the reservation number of the reservation selected by the user (S2222 of FIG. 57).

Upon receiving the obtaining request, the printing environment sharing service 2013 (A) obtains the reservation information associated with the reservation number that is included in the obtaining request, and sends this to the Web server 2001 (A) (S2223 of FIG. 57).

Upon obtaining the reservation information, the Web sever 2001 (A) generates a printing reservation confirmation screen as is shown in FIG. 56B, and provides this to the user terminal. For example, the printer 2006, the document, and the printing location may be selected at the time of reservation, and the user may tap the "SET PRINTING CONDITION" button on the printing reservation confirmation screen of FIG. 56B to set the printing conditions.

For example, if the user taps the "PRINTING CONDITION SETTING" button on the printing reservation confirmation screen of FIG. 56B, the Web server 2001 (A) sends an obtaining request to the printing environment sharing service 2013 (A) for obtaining capability information of the printer 2006 (P-C2) that is held by the print server 2004 (C) (S2224 of FIG. 57).

Upon receiving the obtaining request, the printer capability information obtaining part 2045 of the printing environment sharing service 2013 (A) transmits this obtaining request to the printing environment sharing service 2013 (C) based on the channel information (S2225 of FIG. 57).

Upon receiving the obtaining request, the printer capability information obtaining part 2045 of the printing environment sharing service 2013 (C) transmits this obtaining request to the document print service 2014 (C) (S2226 of FIG. 57).

Upon receiving this obtaining request, the document print service 2014 (C) obtains the capability information of the printer 2006 (P-C2) that is stored in the print server 2004 (C), and transmits this to the printing environment sharing service 2013 (C) (S2227 of FIG. 57).

The printer capability information obtaining part 2045 of the printing environment sharing service 2013 (C) transmits the received capability information of printer 2006 (P-C2) to the printing environment sharing service 2013 (A) based on the channel information (S2228 of FIG. 57).

The printer capability information obtaining part 2045 of the printing environment sharing service 2013 (A) transmits the received capability information of the printer 2006 (P-C2) to the Web server 2001 (A) (S2229 of FIG. 57).

The Web server 2001 (A) then generates a printing condition setting screen as is shown in FIG. 56C based on the capability information of the printer 2006 (P-C2) obtained in process step S2229, and provides this to the user terminal.

For example, if the user sets the printing conditions such as paper size and paper direction and taps the "CONFIRM PRINTING" button on the printing condition setting screen of FIG. 56C, the Web server 2001 (A) generates a printing confirmation screen as is shown in FIG. 56D, and provides this to the user terminal.

For example, if the user taps the "PRINT" button on the printing confirmation screen of FIG. 56D, the Web server 2001 (A) transmits an obtaining request to the repository service 2012 for obtaining the document usage authorization information for authorizing the usage of the document that includes information such as the document ID and the user information (S2230 of FIG. 57)

Upon receiving the obtaining request, the repository service 2012 determines whether the user may be authorized to used the corresponding document based on the user information included in the obtaining request, for example, and upon determining that the user is authorized to use the document, the repository service 2012 issues the document usage authorization information, and transmits this to the Web server 2001 (A) (S2231 of FIG. 57).

Upon obtaining the document usage authorization information in step S2231, the Web server 2001 (A) transmits to the printing environment sharing service 2013 (A) reservation information including the document authorization information and the printing conditions, and sends a printing start request for starting the printing operation (S2232 of FIG. 57).

Upon receiving the printing start request, the printing start control part 2052 of the printing environment sharing service 2013 (A) provides to the document data obtaining part 2043 information such as the document usage authorization information included in the printing start request, and information such as the document ID included in the reservation information stored by the storage part 2047 at the time of the printing reservation, and sends an obtaining request for obtaining the document data.

Upon receiving the obtaining request, the document data obtaining part 2043 of the printing environment sharing service 2013 (A) transmits to the repository service 2012 (A) the document data obtaining request including the document ID and the document usage authorization information (S2233 of FIG. 57)

The repository service 2012 (A) determines the validity of the document usage authorization information included in the received document data obtaining request, and upon determining that the information is valid, obtains from the repository server 2002 the document data of the document designated by the document ID included in the document data obtaining request, and sends this to the printing environment sharing service 2013 (A) (S2234 of FIG. 57).

The printing start control part 2052 of the printing environment sharing service 2013 (A) transmits to the printing environment sharing service 2013 (C) a printing start request including the reservation information included in the printing start request obtained in step S2232 of FIG. 57 (e.g., the printing conditions), the document data received in step S2234 of FIG. 57, and the reservation information stored by the storage part 2047 upon making the printing reservation (e.g., document ID, identification information for identifying the printing location, the channel information to the printing location, and the printer identification information for identifying the printer 2006), the transmission being based on the channel information to the printing location (S2235 of FIG. 57).

Upon receiving the printing start request including the reservation information and the document data, the printing start control part 2052 of the printing environment sharing service 2013 (C) transmits the printing start request to the document print service 2014 (C) based on the identification information for identifying the printer 2006 that is included in the reservation information (S2236 of FIG. 57)

Upon receiving the printing start request including the reservation information and the document data, the document print service 2014 (C) converts the document data into print data that may be printed out by the designated printer 2006 (P-C2), and transmits the printing start request including the print data to the printer 2006 (P-C2) designated in the reservation information (S2237 of FIG. 57)

Upon receiving the printing start request, the printer 2006 (P-C2) prints out the print data included in the printing start request.

As is illustrated by FIGS. 56A through 56F and/or FIG. 57, when the document, the printing location, and the printer are selected at the time of the printing reservation, the printing conditions may be set afterwards upon conducting the printing operation.

Also, the printing environment sharing service 2013 may store the document ID of the document selected by the user as reservation information, but not the actual document data so that when changes are made to the document data after the printing reservation is made, the most recently updated version of the document data corresponding to the document ID may be used when the user starts the printing operation.

In the following, another exemplary printing start operation in the case of selecting the document, the printing location, and the printer in making the printing reservation is described with reference to FIG. 58.

FIG. 58 is a sequence diagram illustrating a second exemplary printing start operation in the case of selecting the document, the printing location, and the printer in making the printing reservation.

It is noted that the process of FIG. 58 corresponds to the printing start operation that may be performed in the case where the printing reservation is made according to the process of FIG. 46.

It is also noted that the process steps S2240 through S2249 of FIG. 58 are identical to the process steps S2220 through S2229 of FIG. 57.

In the process of FIG. 46, as opposed to the process of FIG. 45, the Web server 2001 (A) obtains the document usage authorization information at the time of the printing reservation, and the SPS server 2003 (A) stores the document data along with the reservation information. Thereby, for example, if the user taps the "PRINT" button on the printing confirmation screen of FIG. 56D, the Web server 2001 (A) transmits to the printing environment sharing service 2013 (A) the reservation information including the printing conditions, and sends a printing start request for starting the printing operation (S2250 of FIG. 58).

Upon receiving the printing start request, the printing start control part 2052 of the printing environment sharing service 2013 (A) obtains the reservation information and the document data stored by the storage part 2047 that is associated with the reservation number included in the printing start request, and transmits to the printing environment sharing service 2013 (C) a printing start request including the obtained reservation information and document data, and the reservation information received in step S2250 of FIG. 58 based on the channel information to the printing location (S2251 of FIG. 58)

It is noted that the process steps S2252 through S2253 of FIG. 58 are identical to the process steps S2236 through S2237 of FIG. 57.

As is illustrated by FIGS. 56A through 56D and/or FIG. 58, when the document, the printing location, and the printer are selected at the time of the printing reservation, the printing conditions may be set afterwards upon conducting the printing operation.

Also, in the present example, since the printing environment sharing service 2013 stores the reservation information as well as the document data corresponding to the document ID of the document selected by the user, printing may be conducted using the document data in the original state at the time the printing reservation has been made by the user.

In the following, an exemplary printing start operation in the case where the printing conditions are also set in making the printing reservation is described with reference to FIGS. 59A through 59D and FIG. 60.

FIGS. 59A through 59B illustrate a fourth example of stages in the operation from printing reservation confirmation to printing execution.

Figure 60:
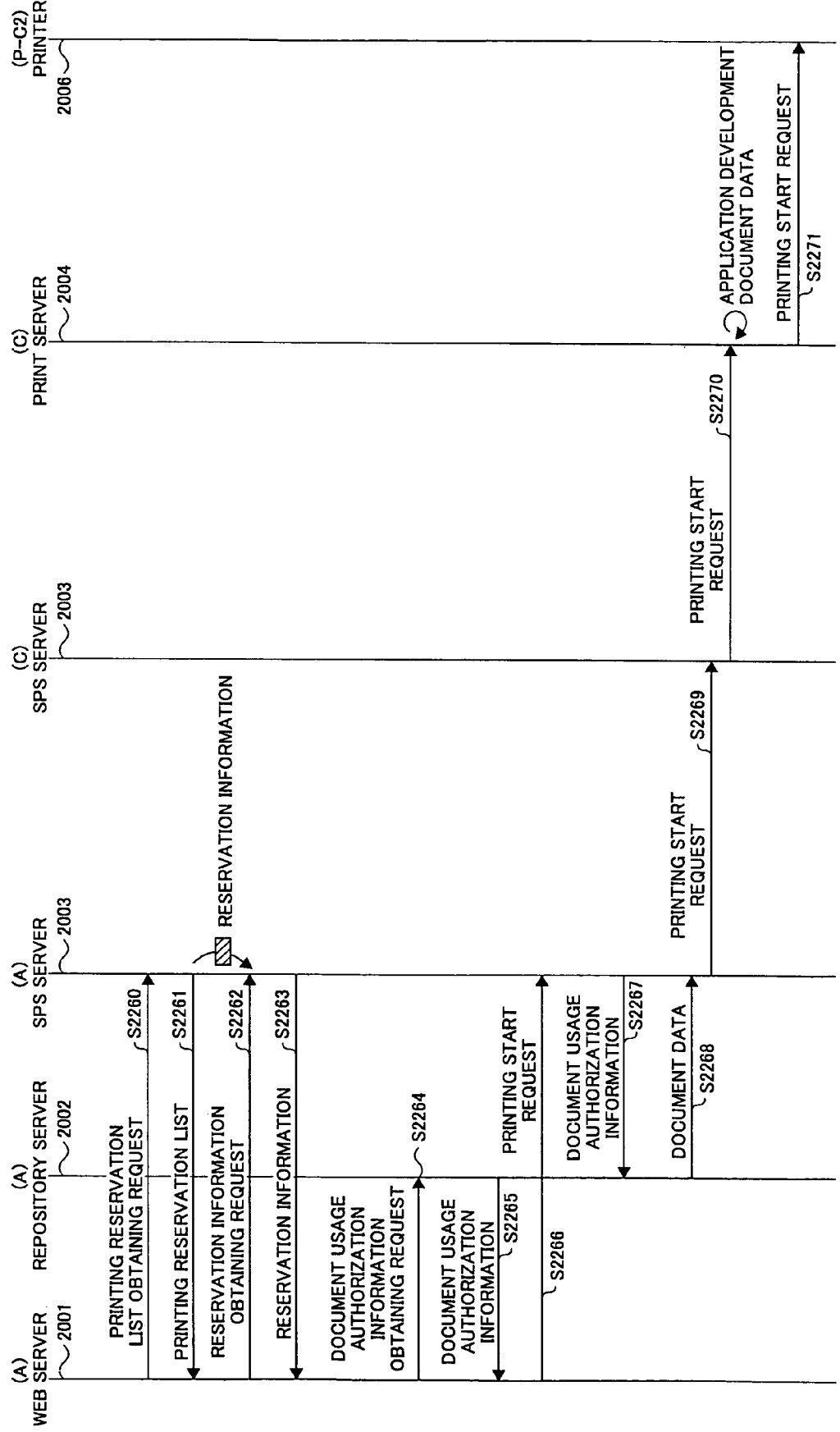
FIG. 60 is a sequence diagram illustrating a first exemplary printing start operation in a case where a document, a printing location, a printer, and printing conditions are selected in a printing reservation according to the third embodiment.

FIG. 60 is a sequence diagram illustrating a first exemplary printing start operation in the case where the printing conditions are set in making the printing reservation.

It is noted that the process of FIG. 60 corresponds to the printing start operation that is performed in the case where the printing reservation is made according to the process of FIG. 48.

The Web server 2001 (A) sends an obtaining request to the printing environment sharing service 2013 (A) for obtaining a printing reservation list of the printing reservations including the user ID of the user (S2260 of FIG. 60).

Upon receiving the obtaining request, the printing environment sharing service 2013 (A) obtains from the HDD 2039 of the SPS server 2003 (A) the reservation information stored by the storage part 2047 that is associated with the user ID included in the obtaining request, and transmits this to the Web server 2001 (A) (S2261 of FIG. 60)

Upon receiving the printing reservation list, the Web server 2001 (A) generates a printing reservation selection screen as is shown in FIG. 59A, and provides this to the user terminal.

For example, if the user selects "RESERVATION 1" and taps the "CONFIRM RESERVATION" button on the printing reservation selection screen of FIG. 59A, the Web server 2001 (A) transmits an obtaining request to the printing environment sharing service 2013 (A) for obtaining reservation information including the reservation number of the reservation selected by the user (S2262 of FIG. 60).

Upon receiving the obtaining request, the printing environment sharing service 2013 (A) obtains the reservation information associated with the reservation number that is included in the obtaining request, and sends this to the Web server 2001 (A) (S2263 of FIG. 60).

Upon obtaining the reservation information, the Web sever 2001 (A) generates a printing reservation confirmation screen as is shown in FIG. 59B, and provides this to the user terminal.

For example, if the user taps the "PRINT" button on the printing reservation confirmation screen of FIG. 59B, the Web server 2001 (A) transmits an obtaining request to the repository service 2012 for obtaining the document usage authorization information for authorizing the usage of the document that includes information such as the document ID and the user information (S2264 of FIG. 60)

Upon receiving the obtaining request, the repository service 2012 determines whether the user may be authorized to used the corresponding document based on the user information included in the obtaining request, for example, and upon determining that the user is authorized to use the document, the repository service 2012 issues the document usage authorization information, and transmits this to the Web server 2001 (A) (S2265 of FIG. 60).

Upon obtaining the document usage authorization information in step S2231, the Web server 2001 (A) transmits to the printing environment sharing service 2013 (A) reservation information including the document authorization information, and sends a printing start request for starting the printing operation (S2266 of FIG. 60).

Upon receiving the printing start request, the printing start control part 2052 of the printing environment sharing service 2013 (A) provides to the document data obtaining part 2043 information such as the document usage authorization information included in the printing start request, and information such as the document ID included in the reservation information stored by the storage part 2047 at the time of the printing reservation, and sends an obtaining request for obtaining the document data.

Upon receiving the obtaining request, the document data obtaining part 2043 of the printing environment sharing service 2013 (A) transmits to the repository service 2012 (A) the document data obtaining request including the document ID and the document usage authorization information (S2267 of FIG. 60)

The repository service 2012 (A) determines the validity of the document usage authorization information included in the received document data obtaining request, and upon determining that the information is valid, obtains from the repository server 2002 the document data of the document designated by the document ID included in the document data obtaining request, and sends this to the printing environment sharing service 2013 (A) (S2268 of FIG. 60).

The printing start control part 2052 of the printing environment sharing service 2013 (A) transmits to the printing environment sharing service 2013 (C) a printing start request including the reservation information included in the printing start request obtained in step S2266 of FIG. 60 (e.g. the document usage authorization information), the document data received in step S2268 of FIG. 60, and the reservation information stored by the storage part 2047 upon making the printing reservation (e.g., document ID, identification information for identifying the printing location, the channel information to the printing location, the printer identification information for identifying the printer 2006, the printing conditions), the transmission being based on the channel information to the printing location (S2269 of FIG. 60).

Upon receiving the printing start request including the reservation information and the document data, the printing start control part 2052 of the printing environment sharing service 2013 (C) transmits the printing start request to the document print service 2014 (C) based on the identification information for identifying the printer 2006 that is included in the reservation information (S2270 of FIG. 60)

Upon receiving the printing start request including the reservation information and the document data, the document print service 2014 (C) converts the document data into print data that may be printed out by the designated printer 2006 (P-C2), and transmits the printing start request including the print data to the printer 2006 (P-C2) designated in the reservation information (S2271 of FIG. 60)

Upon receiving the printing start request, the printer 2006 (P-C2) prints out the print data included in the printing start request.

As is illustrated by FIGS. 59A through 59F and/or FIG. 60, the document, the printing location, and the printer may be selected and the printing conditions may be set at the time of the printing reservation, and the printing operation may be conducted accordingly.

Also, the printing environment sharing service 2013 may store the document ID of the document selected by the user as reservation information, but not the actual document data so that when changes are made to the document data after the printing reservation is made, the most recently updated version of the document data corresponding to the document ID may be used when the user starts the printing operation.

In the following, another exemplary printing start operation in the case of selecting the document, the printing location, and the printer, and setting the printing conditions in making the printing reservation is described with reference to FIG. 61.

Figure 61:
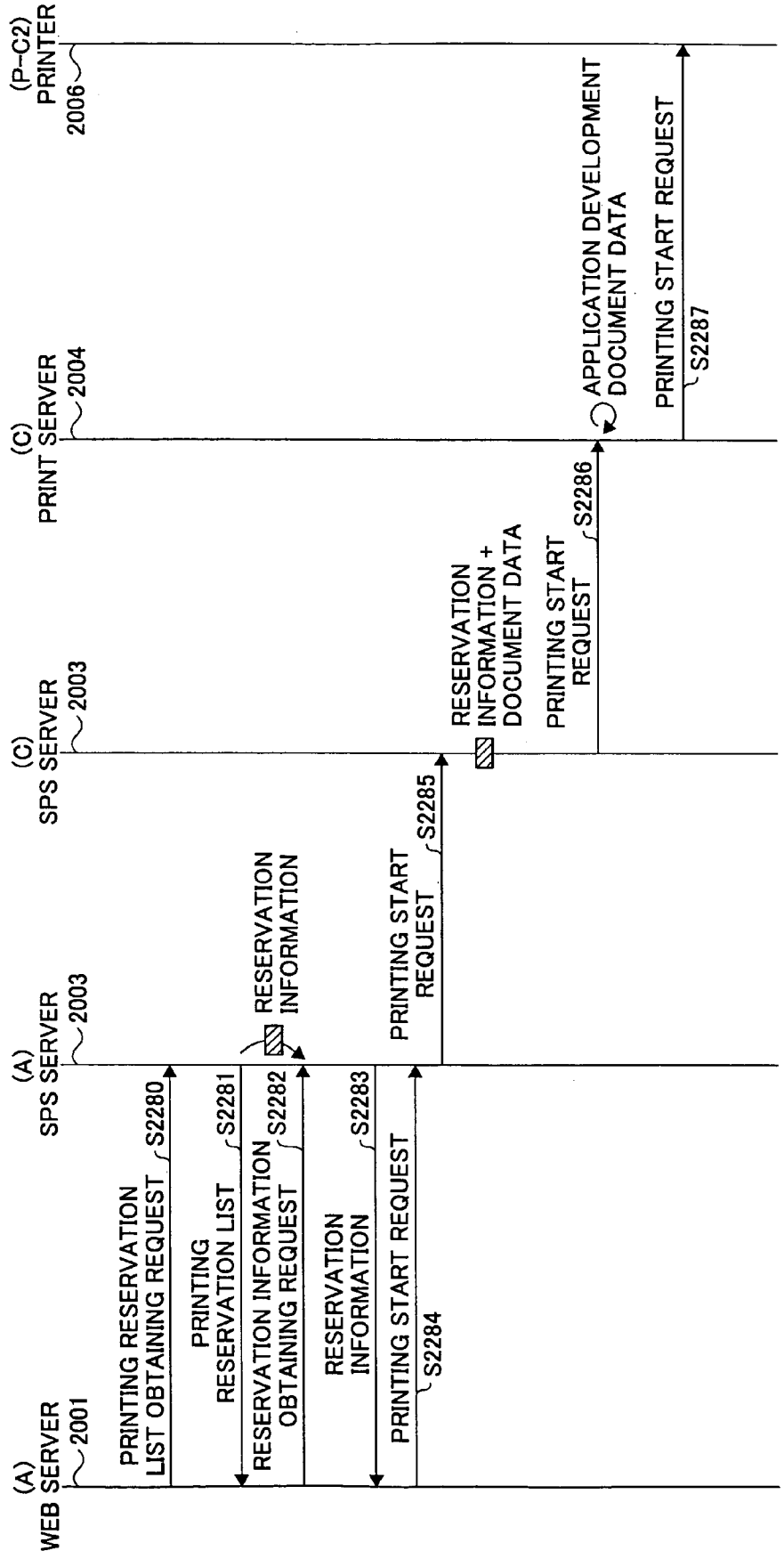
FIG. 61 is a sequence diagram illustrating a second exemplary printing start operation in a case where a document, a printing location, a printer, and printing conditions are selected in a printing reservation according to the third embodiment.

FIG. 61 is a sequence diagram illustrating a second exemplary printing start operation in the case of selecting the document, the printing location, and the printer, and setting the printing conditions in making the printing reservation.

It is noted that the process of FIG. 61 corresponds to the printing start operation that may be performed in the case where the printing reservation is made according to the process of FIG. 49.

It is also noted that the process steps S2280 through S2283 of FIG. 61 are identical to the process steps S2260 through S2263 of FIG. 60.

In the process of FIG. 49, as opposed to the process of FIG. 48, the Web server 2001 (A) obtains the document usage authorization information at the time of the printing reservation, and the SPS server 2003 (A) stores the document data along with the reservation information. Thereby, for example, if the user taps the "PRINT" button on the printing confirmation screen of FIG. 59B, the Web server 2001 (A) transmits a printing start request including the reservation number to the printing environment sharing service 2013 (A) (S2284 of FIG. 61).

Upon receiving the printing start request, the printing start control part 2052 of the printing environment sharing service 2013 (A) obtains the reservation information and the document data stored by the storage part 2047 that is associated with the reservation number included in the printing start request, and transmits to the printing environment sharing service 2013 (C) a printing start request including the obtained reservation information and document data based on the channel information to the printing location (S2285 of FIG. 61)

It is noted that the process steps S2286 through S2287 of FIG. 61 are identical to the process steps S2270 through S2271 of FIG. 60.

As is described above in relation to the example of FIG. 49, if the reservation information and the document data are stored by the storage part 2047 of the printing environment sharing service 2013 (C) corresponding to the printing location, only the printing start request including the reservation number may be sent to the printing environment sharing service 2013 (C), and upon receiving the printing start request, the printing start control part 2052 of the printing environment sharing service 2013 (C) may obtain the reservation information and the document data stored in the storage part 2047, and may send a printing start request including the obtained reservation information and document data to the document print service 2014 (C).

As is illustrated by FIGS. 59A through 59D and/or FIG. 61, the document, the printing location, the printer, and printing conditions may be selected at the time of the printing reservation, and the printing operation may be conducted accordingly.

In the following, examples of storing reservation information and/or document data in a designated SPS server 2003, and examples of deleting stored reservation information and/or document data are described with reference to FIGS. 62 through FIG. 69.

Figure 62:
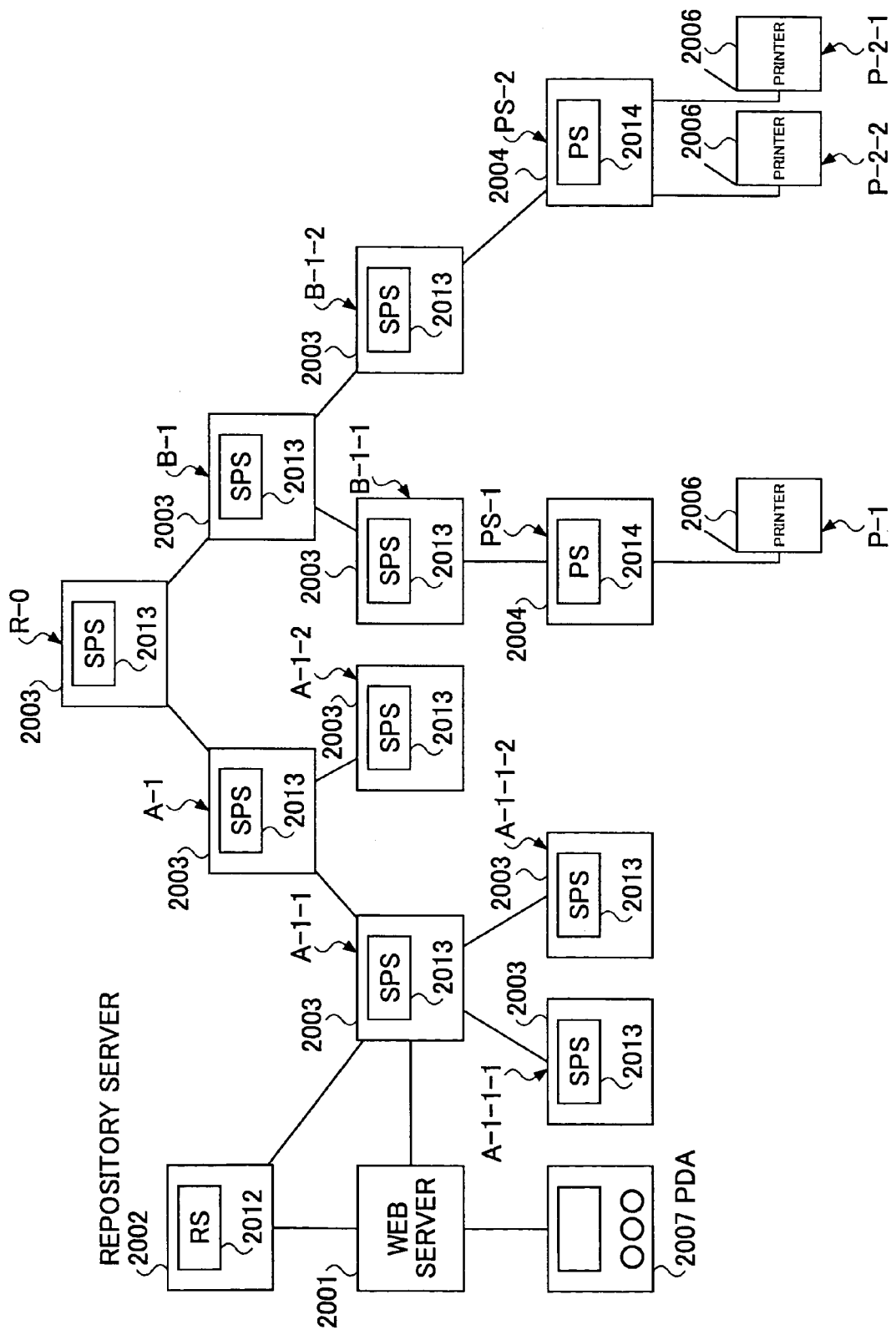
FIG. 62 is a block diagram illustrating the second exemplary system configuration according to the third embodiment of the present invention according to the third embodiment.

FIG. 62 illustrates the second exemplary system configuration. The system of FIG. 62 includes a Web server 2001, a repository server 2002, SPS servers 2003, print servers 2004, printers 2006, and a PDA 2007.

The Web server 2001, the repository server 2002, the SPS servers 2003, the print servers 2004, the printers 2006, and the PDA 2007 shown in FIG. 62 may be interconnected via a LAN and/or the Internet.

The user may input a password and/or a user name, for example, via the PDA 2007 to log into the Web server 2001 and make a printing reservation by specifying, for example, the printing location (e.g., printing environment sharing service 2013 (B-1-2)), the printer to be used (e.g., printer 2006 (P-2-2)), the printing conditions (e.g., A4, color), and the document subject to the printing reservation, using the services provided by the printing environment sharing service 2013. As described above, when the user is to select a printing location, the user may not be have to directly select the SPS server 2003 or the printing environment sharing service 2013, and may instead select identifiers associated with the respective SPS servers 2003 and printing environment sharing services 2013 that are more recognizable to the user such as prefecture names, city names, office names, and/or section names.

When the user selects a printing location (e.g., printing environment sharing service 2013 (B-1-2)), the printing environment sharing service 2013 obtains channel information to the designated printing location.

For example, in response to a search request from the Web server 2001, the printing environment sharing service 2013 (A-1-1) obtains channel information such as (A-1-1)→(A-1) →(R-0)→(B-1)→(B-1-2) indicating the channel path from the printing environment sharing service 2013 (A-1-1) to the printing environment sharing service 2013 (B-1-2) corresponding to the printing location designated by the user, and provides this to the Web server 2001.

It is noted that the channel information may be obtained using the service list 2071. For example, when the user selects "A-1" at the printing location selection screen using the PDA 2007, the Web server 2001 may perceive from the service list 2071 of the printing environment sharing service 2013 (A-1-1) that the printing environment sharing service 2013 (A-1) is in superordinate connection with respect to the printing environment sharing service 2013 (A-1-1), and obtain access information to the printing environment sharing service 2013 (A-1) from the printing environment sharing service 2013 (A-1-1) (e.g., information such as location name, latitude, longitude, altitude, address, and URI (Uniform Resource Identifier) of the printing environment sharing services 2013), such information being used as channel information. Accordingly, the channel information from the printing environment sharing service 2013 (A-1-1) to the printing environment sharing service 2013 (A-1) is added to the channel information from the Web server 2001 to the printing environment sharing service 2013 (A-1-1), and the resulting channel information is included in the obtaining request for the service list 2071. This arrangement in which the Web server 2001 and/or the printing environment sharing service 2013 are able to obtain channel information to the printing location selected by the user, for example, by obtaining the service list 2071 may also be implemented in subsequent examples described below.

Upon receiving the printing reservation request via the Web server 2001, the printing environment sharing service 2013 (A-1-1) uses the information such as the document ID and document usage authorization information included in the printing reservation request to transmit an obtaining request for obtaining the document corresponding to the document ID to the repository service 2012 implemented in the repository server 2002, and obtain the document data accumulated (stored) in the repository server 2002 via the repository service 2012.

Based on the channel information included in the printing reservation information, the printing environment sharing service 2013 (A-1-1) transfers to the printing environment sharing service 2013 (A-1) the reservation information including the channel information, the identification information for identifying the printing location, the printer identification information for identifying the printer 2006, and the printing conditions as well as the obtained document data.

Upon receiving the reservation information and the document data from the printing environment sharing service 2013 (A-1-1), the printing environment sharing service 2013 (A-1) transfers the reservation information and document data to the printing environment sharing service 2013 (R-0) based on the channel information included in the reservation information.

Upon receiving the reservation information and document data from the printing environment sharing service 2013 (A-1), the printing environment sharing service 2013 (R-0) transfers the reservation information and document data to the printing environment sharing service 2013 (B-1) based on the channel information included in the reservation information.

Similarly, the printing environment sharing service 2013 (B-1), upon receiving the reservation information and document data from the printing environment sharing service 2013 (R-0), transfers the reservation information and document data to the printing environment sharing service 2013 (B-1-2) based on the channel information included in the reservation information.

Upon obtaining the transferred reservation information and document data, the printing environment sharing service 2013 (B-1-2) stores the reservation information and document data in the HDD 2039 of the SPS server 2003 (B-1-2).

In another example, the user may go to the printing location, and make a request to the printing environment sharing service 2013 (A-1-1) via the Web server 2001 for starting the printing of the document for which a printing reservation has been made. Upon receiving the printing start request, the printing environment sharing service 2013 (A-1-1) transmits the printing start request to the printing environment sharing service 2013 (A-1) based on the channel information to the printing environment sharing service 2013 of the printing location that is included in the printing start request.

Upon receiving the printing start request from the printing environment sharing service 2013 (A-1-1), the printing environment sharing service 2013 (A-1) transmits the printing start request to the printing environment sharing service 2013 (R-0) based on the channel information included in the printing start request.

Upon receiving the printing start request from the printing environment sharing service 2013 (A-1), the printing environment sharing service 2013 (R-0) transmits the printing start request to the printing environment sharing service 2013 (B-1) based on the channel information included in the printing start request.

Similarly, the printing environment sharing service 2013 (B-1), upon receiving the printing start request from the printing environment sharing service 2013 (R-0), transmits the printing start request to the printing environment sharing service 2013 (B-1-2) based on the channel information included in the printing start request.

Upon receiving the printing start request, the printing environment sharing service 2013 (B-1-2) sends the stored reservation information and document data to the document print service 2014 (PS-2), and sends a request for the document data to be printed according to the printing conditions included in the reservation information.

Upon receiving the request for printing the document data, the document print service 2014 (PS-2) converts the document data into print data printable by the printer 2006 (P-2-2), and sends a printing request to the printer 2006 (P-2-2) designated in the reservation information so that the print data may be printed according to the designated printing conditions.

Upon receiving the printing request for printing the print data, the printer 2006 (P-2-2) conducts printing based on the printing request from the document print service 2014 (PS-2)

According to the present system of making a printing reservation, transferring reservation information and document data between printing environment sharing services 2013, and printing a document based on a printing request, the sharing of services between different sections and different offices may be enabled, and an organized printing environment may be realized without having to conceive a new printing environment, such environment enabling the user to readily print a document in differing printing environments.

In the following, an example of a service list 2071 is described with reference to FIG. 63.

FIG. 63 shows an exemplary service list.

As is described above, the service list 2071 includes identification information for identifying other printing environment sharing services 2013 that are accessible by the relevant printing environment sharing service 2013.

For example, the service list shown in FIG. 63 includes identification information identifying specific printing environment sharing service(s) 2013 that are accessible by the printing environment sharing service 2013 implemented in the SPS server 2003 (A-1-1) in which the service list 2071 is stored. Specifically, the list contains identification information of an accessible printing environment sharing service 2013 that is superordinate to the relevant printing environment sharing service 2013, and identification information of accessible printing environment sharing services 2013 subordinate to the relevant printing environment sharing service 2013.

It is noted that in FIG. 63, the printing environment sharing services 2013 are identified as "A-1", "A-1-1", and "A-1-2" for the sake of simplifying the description; however, section names, office names, and other descriptive names, for example, may instead be used for identifying the printing environment sharing services 2013.

It is also noted that in the service list 2071, when there is no accessible printing environment sharing service 2013 that is superordinate, coordinate, or subordinate to the relevant printing environment sharing service 2013, such an absence of a corresponding printing environment sharing service 2013 may be represented by indicating "NONE" in the corresponding space for listing such item. In the example of FIG. 63, "NONE" is indicated for the list of printing environment sharing services 2013 in coordinate connection with respect to the relevant printing environment sharing service 2013.

Also, although it is not shown in FIG. 63, the service list 2071 may also include information such as names, latitudes, longitudes, altitudes, and addresses of the accessible printing environment sharing services 2013 along with the identification information of the printing environment sharing service 2013 that are accessible by the printing environment sharing service 2013 that is implemented in the SPS server 2003 in which the service list 2071 is stored.

By introducing the concept of superordinate, coordinate, and subordinate in the service list 2071, a system with a tree configuration such as that shown in FIG. 62 may be realized.

It is noted that in the above example, the reservation information and/or the document data are stored in the SPS server 2003 (B-1-2) of the system configuration of FIG. 62 corresponding to the printing location; however, the reservation information and/or the document data may also be stored in the SPS server 2003 (A-1-1) corresponding to the reservation location. By storing the reservation information and/or the document at the reservation location, for example, when starting the printing operation or changing the printing location via the Web server 2001, the reservation information and/or the document may be obtained by making an enquiry to the reservation location.

Also, the reservation information and/or the document may be stored in the SPS server 2003 (R-0) at the top of the system in the system configuration of FIG. 62 rather than the printing location or the reservation location. By storing the reservation information and/or the document at the top of the system, the user may readily obtain the reservation information and/or the document by making an enquiry to the top SPS server 2013 (R-0) regardless of where the user is located.

Also, the reservation information and/or the document may be stored in the top SPS server (A-1) of the reservation location and/or the top SPS server 2003 (B-1) of the printing location. In such case, the user may be able to obtain the reservation information and/or the document by making an enquiry to the top SPS server (A-1) of the reservation location and/or the top SPS server 2003 (B-1) of the printing location.

Also, it is noted that the storage location of the top SPS server (A-1) of the reservation location and/or the top SPS server 2003 (B-1) of the printing location is not limited to one location; that is, the top SPS server (A-1) of the reservation location and/or the top SPS server 2003 (B-1) of the printing location may be stored in, for example, the reservation location and the printing location, the reservation location and the vicinity of the printing location (e.g., B-1-1, B-1-2), or the reservation location and the printing location as well as their respective top servers (A-1 and B-1). In this way, the reservation information and/or the document may be obtained from a storage location close to the printing location to start the printing, and in the case of changing the printing location, the reservation information and/or the document may be obtained at a storage location close to the changed printing location to change the printing location.

Also, the reservation information and/or the document may be stored in all the servers in the channel path from the reservation location to the printing location (e.g., A-1-1, A-1, R-0, B-1, B-1-2) In this case, when the user is to request for the printing to start, the user is able to obtain the reservation information and/or the document at a storage location close to the printing location to start the printing, and even in the case of changing the printing location, the user may readily obtain the reservation information and/or the document at a storage location close to the changed printing location to change the printing location.

In the following, an exemplary process of designating a printing location and storing the reservation information and/or the document is described with reference to FIGS. 64A through 64D and FIG. 65.

FIGS. 64A through 64D illustrate the printing location designation.

Figure 65:
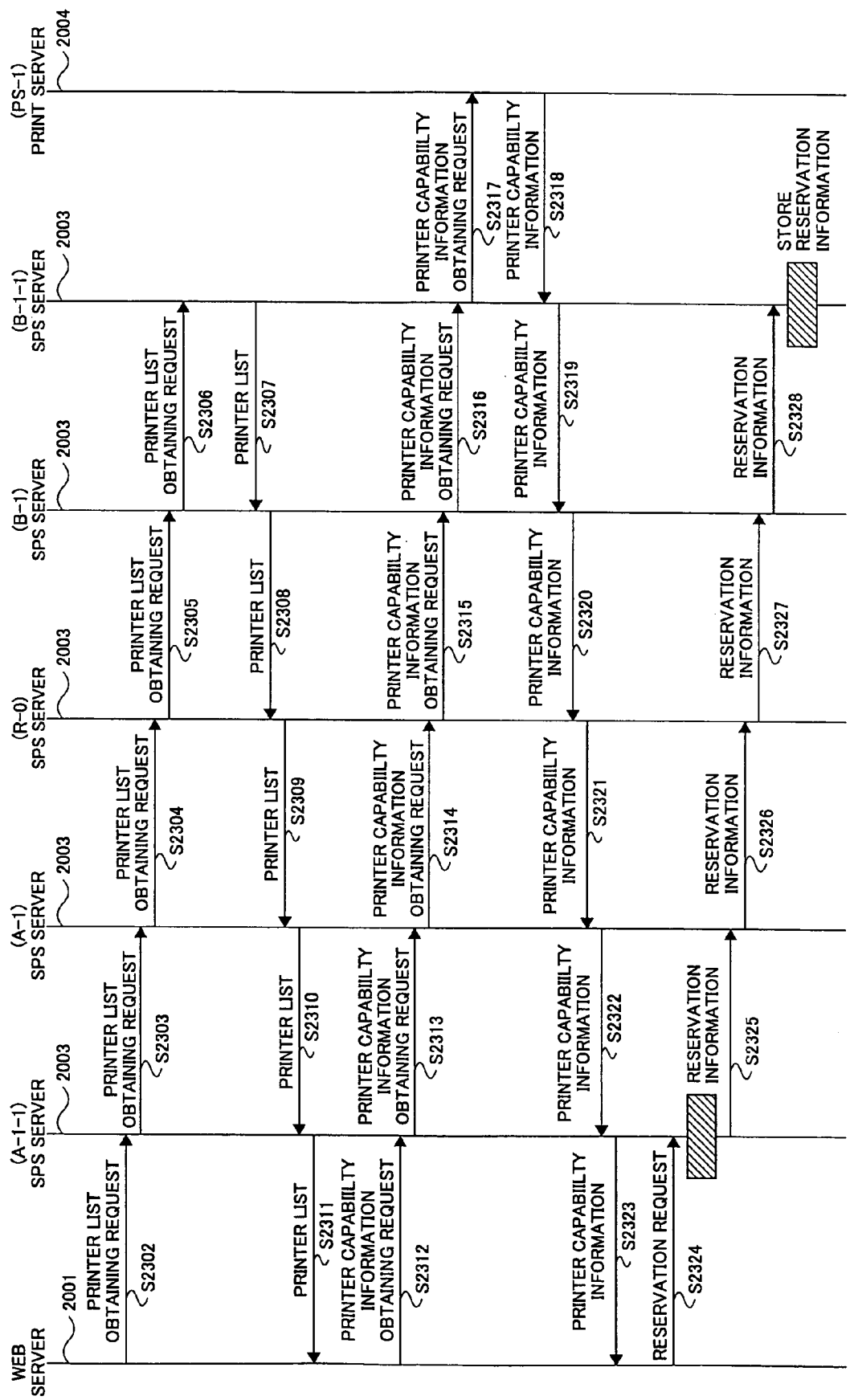
FIG. 65 is a sequence diagram illustrating an exemplary process of designating a printing location according to the third embodiment.

FIG. 65 is a sequence diagram illustrating the exemplary process of designating a printing location.

For example, in the system configuration of FIG. 62, if the user selects the document, the printing location (B-1-2), and the printer 2006 (P-2-2), and sets the printing conditions to make a printing reservation, and taps the "RESERVE" button on the printing reservation confirmation screen, the Web server 2001 generates a reservation completed screen as is shown in FIG. 64A, and provides this to the user terminal.

For example, if the user selects "YES" and taps the "NEXT" button on the reservation completed screen of FIG. 64A, the Web server 2001 generates a storage location selection screen as is shown in FIG. 64B based on the service list 2071 of the printing environment sharing service 2013 (B-1-2) that is obtained upon selecting the printing location, and provides this to the user terminal.

For example, if the user selects the "SHOW VICINITY" button and taps the "NEXT" button on the storage location selection screen of FIG. 64B, the Web server 2001 generates a vicinity indication screen as is shown in FIG. 64C based on the path information obtained upon selecting the printing location (e.g., A-1-1, A-1, R-0, B-1) and the service list 2071 of the printing environment sharing services 2013 residing within the channel path.

For example, if the user selects "B-1-1" and taps the "NEXT" button on the vicinity indication screen of FIG. 64C, the Web server 2001 sends an obtaining request to the printing environment sharing service 2013 (A-1-1) for obtaining the printer list 2072 of the printing environment sharing service 2013 (B-1-1) that has been selected by the user (S2302 of FIG. 65)

Upon receiving the obtaining request, the printer list obtaining part 2042 of the printing environment sharing service 2013 (A-1-1) transmits the obtaining request to the printing environment sharing service 2013 (A-1) based on the channel information (S2303 of FIG. 65).

Upon receiving the obtaining request, the printer list obtaining part 2042 of the printing environment sharing service 2013 (A-1) transmits the obtaining request to the printing environment sharing service 2013 (R-0) based on the channel information (S2304 of FIG. 65).

Upon receiving the obtaining request, the printer list obtaining part 2042 of the printing environment sharing service 2013 (R-0) transmits the obtaining request to the printing environment sharing service 2013 (B-1) based on the channel information (S2305 of FIG. 65).

Upon receiving the obtaining request, the printer list obtaining part 2042 of the printing environment sharing service 2013 (B-1) transmits the obtaining request to the printing environment sharing service 2013 (B-1-1) based on the channel information (S2306 of FIG. 65).

Upon receiving the obtaining request, the printer list obtaining part 2042 of the printing environment sharing service 2013 (B-1-1) obtains the printer list 2072 stored in the HDD 2039 of the SPS server 2003 (B-1-1), and transmits this list to the printing environment sharing service 2013 (B-1) based on the channel information (S2307 of FIG. 65).

The printer list obtaining part 2042 of the printing environment sharing service 2013 (B-1) transmits the received printer list 2072 of the printing environment sharing service 2013 (B-1-1) to the printing environment sharing service 2013 (R-0) based on the channel information (S2308 of FIG. 65).

The printer list obtaining part 2042 of the printing environment sharing service 2013 (R-0) transmits the received printer list 2072 of the printing environment sharing service 2013 (B-1-1) to the printing environment sharing service 2013 (A-1) based on the channel information (S2309 of FIG. 65).

The printer list obtaining part 2042 of the printing environment sharing service 2013 (A-1) transmits the received printer list 2072 of the printing environment sharing service 2013 (B-1-1) to the printing environment sharing service 2013 (A-1-1) based on the channel information (S2310 of FIG. 65).

The printer list obtaining part 2042 of the printing environment sharing service 2013 (A-1-1) transmits the received printer list 2072 of the printing environment sharing service 2013 (B-1-1) to the Web server 2001 (S2311 of FIG. 65).

The Web server 2001 transmits an obtaining request to the printing environment sharing service 2013 (A-1-1) for obtaining the capability information of the printer 2006 that is held by the print server 2004 (PS-1) being managed by the printing environment sharing service 2013 (B-1-1) (S2312 of FIG. 65).

Upon receiving the obtaining request, the printer capability information obtaining part 2045 of the printing environment sharing service 2013 (A-1-1) transmits the obtaining request to the printing environment sharing service 2013 (A-1) based on the channel information (S2313 of FIG. 65).

Upon receiving the obtaining request, the printer capability information obtaining part 2045 of the printing environment sharing service 2013 (A-1) transmits the obtaining request to the printing environment sharing service 2013 (R-0) based on the channel information (S2314 of FIG. 65).

Upon receiving the obtaining request, the printer capability information obtaining part 2045 of the printing environment sharing service 2013 (R-0) transmits the obtaining request to the printing environment sharing service 2013 (B-1) based on the channel information (S2315 of FIG. 65).

Upon receiving the obtaining request, the printer capability information obtaining part 2045 of the printing environment sharing service 2013 (B-1) transmits the obtaining request to the printing environment sharing service 2013 (B-1-1) based on the channel information (S2316 of FIG. 65).

Upon receiving the obtaining request, the printer capability information obtaining part 2045 of the printing environment sharing service 2013 (B-1-1) transmits the obtaining request to the document print service 2014 (PS-1) (S2317 of FIG. 65).

Upon receiving the obtaining request, the document print service 2014 (PS-1) obtains the printer capability information of the printer 2006 (P-1) that is stored in the print server 2004 (PS-1), and transmits this information to the printing environment sharing service 2013 (B-1-1) (S2318 of FIG. 65).

The printer capability information obtaining part 2045 of the printing environment sharing service 2013 (B-1-1) transmits the received capability information of the printer 2006 (P-1) to the printing environment sharing service 2013 (B-1) based on the channel information (S2319 of FIG. 65).

The printer capability information obtaining part 2045 of the printing environment sharing service 2013 (B-1) transmits the received capability information of the printer 2006 (P-1) to the printing environment sharing service 2013 (R-0) based on the channel information (S2320 of FIG. 65).

The printer capability information obtaining part 2045 of the printing environment sharing service 2013 (R-0) transmits the received capability information of the printer 2006 (P-1) to the printing environment sharing service 2013 (A-1) based on the channel information (S2321 of FIG. 65).

The printer capability information obtaining part 2045 of the printing environment sharing service 2013 (A-1) transmits the received capability information of the printer 2006 (P-1) to the printing environment sharing service 2013 (A-1-1) based on the channel information (S2322 of FIG. 65).

The printer capability information obtaining part 2045 of the printing environment sharing service 2013 (A-1-1) transmits the received capability information of the printer 2006 (P-1) to the Web server 2001 (S2323 of FIG. 65).

The Web server 2001 generates a storage location confirmation screen as is shown in FIG. 64D based on the printer list 2072 of the printing environment sharing service 2013 (B-1-1) obtained in step S2311 and the capability information of the printer 2006 (P-1) obtained in step S2323, and provides this to the user terminal.

For example, if the user selects "OK" and taps the "NEXT" button on the storage location confirmation screen of FIG. 64D, the Web server 2001 transmits reservation information including information pertaining to the storage location (B-1-1) selected by the user to the printing environment sharing service 2013 (A-1-1) and sends a printing reservation request (S2324 of FIG. 65).

The printing reservation control part 2051 of the printing environment sharing service 2013 (A-1-1) sends a transfer request to the transfer part 2044 for transferring the reservation information to the storage location based on the storage location information included in the reservation information and the channel information to the storage location.

Upon receiving the transfer request, the data transfer part 2044 of the printing environment sharing service 2013 (A-1-1) transfers the reservation information to the printing environment sharing service 2013 (A-1) based on the storage location information included in the reservation information and the channel information to the storage location (S2325 of FIG. 65)

Upon receiving the transfer request, the data transfer part 2044 of the printing environment sharing service 2013 (A-1) transfers the reservation information to the printing environment sharing service 2013 (R-0) based on the storage location information included in the reservation information and the channel information to the storage location (S2326 of FIG. 65)

Upon receiving the transfer request, the data transfer part 2044 of the printing environment sharing service 2013 (R-0) transfers the reservation information to the printing environment sharing service 2013 (B-1) based on the storage location information included in the reservation information and the channel information to the storage location (S2327 of FIG. 65)

Upon receiving the transfer request, the data transfer part 2044 of the printing environment sharing service 2013 (B-1) transfers the reservation information to the printing environment sharing service 2013 (B-1-1) based on the storage location information included in the reservation information and the channel information to the storage location (S2328 of FIG. 65)

The data transfer part 2044 of the printing environment sharing service 2013 (B-1-1) provides the obtained reservation information to the storage part 2047, and the storage part 2047 stores the reservation information in the HDD 2039 of the SPS server 2003 (B-1-1) based on the storage location information included in the reservation information (S2325 of FIG. 65).

It is noted that in the example of FIG. 65, only the reservation information is stored; however, the document data may be obtained by the repository service 2012, and this document data may be stored along with the reservation information based on the storage location information included in the reservation information.

By arranging the Web server 2001 and/or the printing environment sharing services 2013 to perform the processes of FIGS. 64A through 64D and/or FIG. 65, the user may be able to designate a storage location and store the reservation information and/or document data thereat.

Although it is not shown in FIG. 65, the reservation information and/or document data may be stored in plural storage locations such as the printing location (B-1-2) and the reservation location (A-1-1).

In the following, exemplary processes of deleting the reservation information and/or document data are described with reference to FIGS. 66 through FIG. 69.

Figure 66:
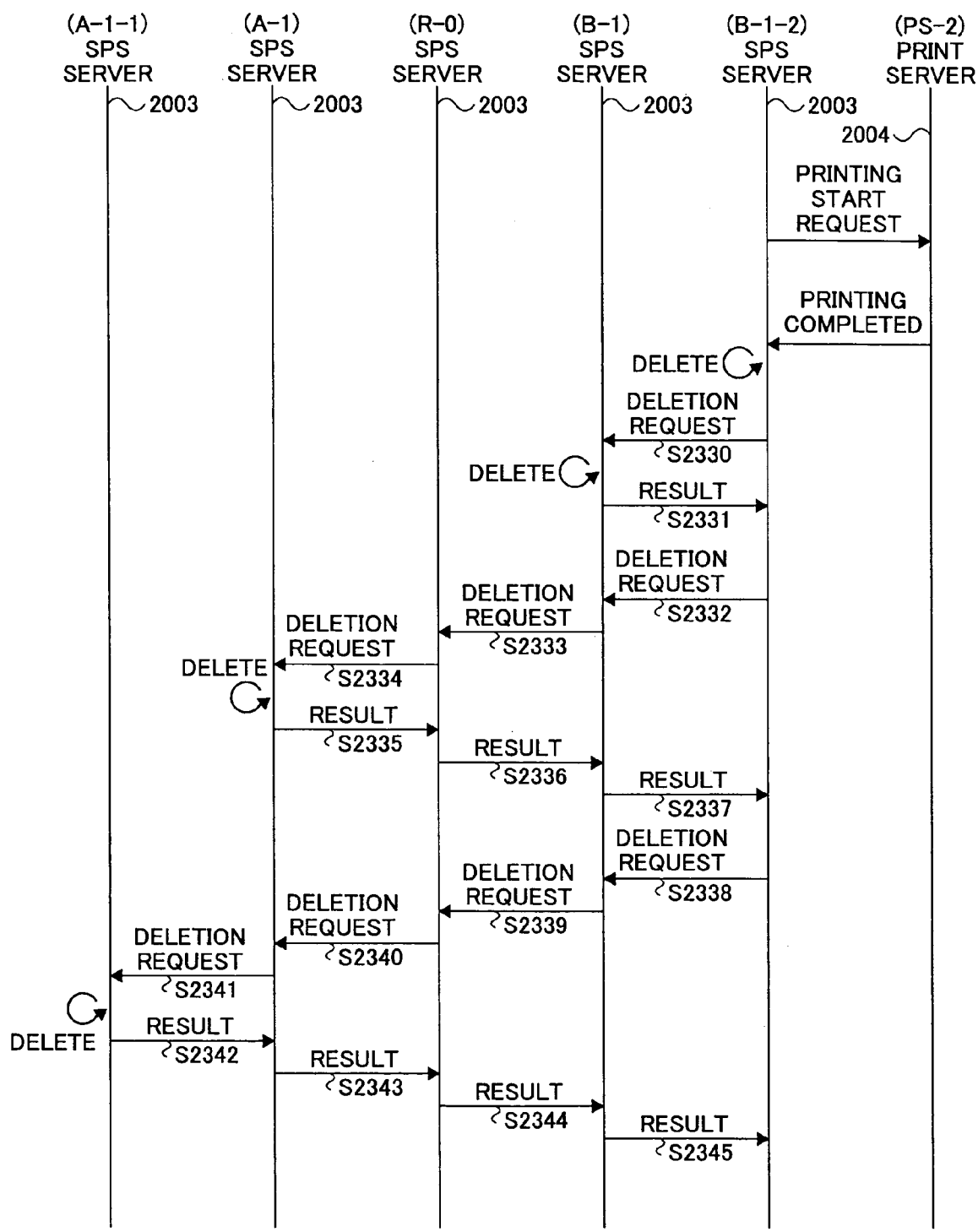
FIG. 66 is a sequence diagram illustrating a first exemplary process of deleting reservation information and/or document data according to the third embodiment.

FIG. 66 is a sequence diagram illustrating a first exemplary process of deleting the reservation information and/or document data.

It is noted that in the process of FIG. 66, it is assumed that the user designates plural storage locations, and the reservation information and/or document data are stored in the SPS servers 2003 of A-1-1, A-1, B-1, and B-1-2 based on the storage location information (A-1-1, A-1, B-1, B-1-2).

For, example, upon obtaining from the document print service 2014 (PS-2) information that the printing of a document corresponding to the printing reservation information of a reservation number has been completed, the deletion part 2048 of the printing environment sharing service 2013 (B-1-2) corresponding to the printing location deletes the reservation information and/or document data corresponding to the reservation number that is stored in the HDD 2039 of the SPS server 2003 (B-1-2), and transmits a deletion request to the printing environment sharing service 2013 (B-1) requesting for the deletion of the reservation information and/or document data corresponding to the reservation number that is stored in the SPS server 2003 (B-1) (S2330 of FIG. 66).

It is noted that the deletion request includes the reservation number and the channel information to the SPS server 2003 to which the request is directed and/or the printing environment sharing service 2013.

Upon receiving the deletion request, the deletion part 2048 of the printing environment sharing service 2013 (B-1) deletes the reservation information and/or document data corresponding to the reservation number that is stored in the SPS server 2003 (B-1) based on this deletion request, and transmits the deletion result to the printing environment sharing service 2013 (B-1-2) based on the channel information (S2331 of FIG. 66).

The deletion part 2048 of the printing environment sharing service 2013 (B-1-2) corresponding to the printing location transmits a deletion request to the printing environment sharing service 2013 (B-1) for requesting the deletion of the reservation information and/or document data corresponding to the reservation number that is stored in the SPS server 2003 (A-1) based on the storage location information (S2332 of FIG. 66).

Upon receiving the deletion request, the deletion part 2048 of the printing environment sharing service 2013 (B-1) transmits the deletion request to the printing environment sharing service 2013 (R-0) based on the channel information included in the deletion request (S2333 of FIG. 66).

Upon receiving the deletion request, the deletion part 2048 of the printing environment sharing service 2013 (R-0) transmits the deletion request to the printing environment sharing service 2013 (A-1) based on the channel information included in the deletion request (S2334 of FIG. 66).

Upon receiving the deletion request, the deletion part 2048 of the printing environment sharing service 2013 (A-1) deletes the reservation information and/or document data corresponding to the reservation number that is stored in the SPS server 2003 (A-1) based on this deletion request, and transmits the deletion result to the printing environment sharing service 2013 (R-0) based on the channel information (S2335 of FIG. 66).

Upon receiving the deletion result, the printing environment sharing service 2013 (R-0) transmits this deletion result to the printing environment sharing service 2013 (B-1) based on the channel information (S2336 of FIG. 66).

Upon receiving the deletion result, the printing environment sharing service 2013 (B-1) transmits this deletion result to the printing environment sharing service 2013 (B-1-2) based on the channel information (S2337 of FIG. 66).

The deletion part 2048 of the printing environment sharing service 2013 (B-1-2) corresponding to the printing location transmits a deletion request to the printing environment sharing service 2013 (B-1) for requesting the deletion of the reservation information and/or document data corresponding to the reservation number that is stored in the SPS server 2003 (A-1-1) based on the storage location information (S2338 of FIG. 66).

Upon receiving the deletion request, the deletion part 2048 of the printing environment sharing service 2013 (B-1) transmits the deletion request to the printing environment sharing service 2013 (R-0) based on the channel information included in the deletion request (S2339 of FIG. 66).

Upon receiving the deletion request, the deletion part 2048 of the printing environment sharing service 2013 (R-0) transmits the deletion request to the printing environment sharing service 2013 (A-1) based on the channel information included in the deletion request (S2340 of FIG. 66).

Upon receiving the deletion request, the deletion part 2048 of the printing environment sharing service 2013 (A-1) transmits the deletion request to the printing environment sharing service 2013 (A-1-1) based on the channel information included in the deletion request (S2341 of FIG. 66).

Upon receiving the deletion request, the deletion part 2048 of the printing environment sharing service 2013 (A-1-1) deletes the reservation information and/or document data corresponding to the reservation number that is stored in the SPS server 2003 (A-1-1) based on this deletion request, and transmits the deletion result to the printing environment sharing service 2013 (A-1) based on the channel information (S2342 of FIG. 66).

Upon receiving the deletion result, the printing environment sharing service 2013 (A-1) transmits this deletion result to the printing environment sharing service 2013 (R-0) based on the channel information (S2343 of FIG. 66).

Upon receiving the deletion result, the printing environment sharing service 2013 (R-0) transmits this deletion result to the printing environment sharing service 2013 (B-1) based on the channel information (S2344 of FIG. 66).

Upon receiving the deletion result, the printing environment sharing service 2013 (B-1) transmits this deletion result to the printing environment sharing service 2013 (B-1-2) based on the channel information (S2345 of FIG. 66).

By conducting the process of FIG. 66, the printing environment sharing service 2013 may be able to delete reservation information and/or document data after printing thereof is completed.

In the example illustrated in FIG. 66, when information that printing has been completed is obtained, the printing environment sharing service 2013 (B-1-2) of the printing location transmits the deletion request; however, the reservation information may also include reservation expiry information, which may be referred to, and the printing environment sharing service 2013 (B-1-2) corresponding to the printing location may transmit the deletion request based on the storage location information when the reservation expiry date and time has been reached.

Also, each printing environment sharing service 2013 may be arranged to refer to the reservation expiry information of the reservation information stored in the HDD 2039 of its corresponding SPS server 2003, and delete the reservation information and/or document data upon discovering that the reservation expiry date and time has passed.

In the following, an exemplary process in which each printing environment sharing service 2013 refers to the reservation expiry information of the reservation information stored in the HDD 2039 of its corresponding SPS server 2003, and deletes the reservation information and/or document data upon discovering that the reservation has expired is described with reference to FIG. 67.

Figure 67:
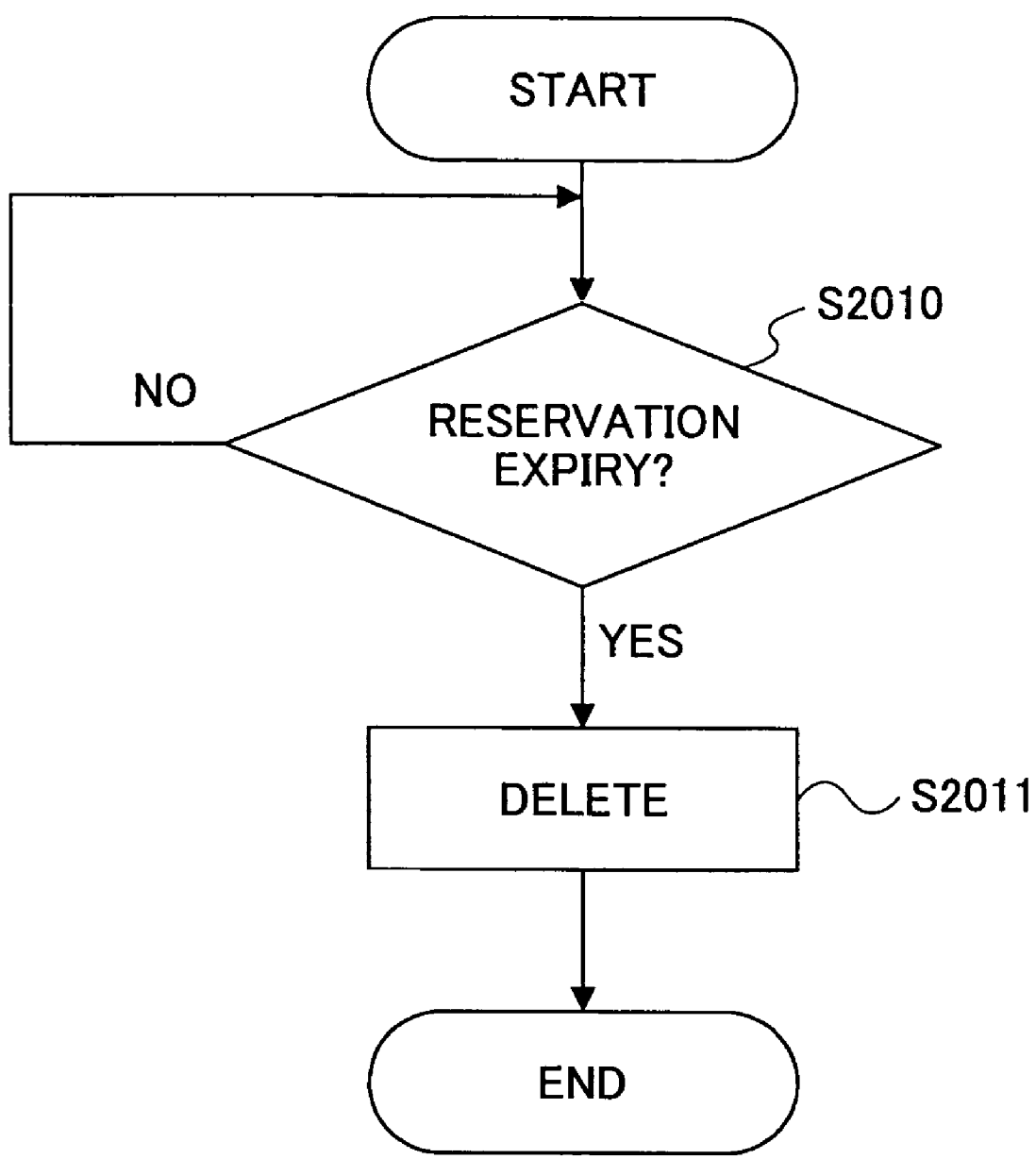
FIG. 67 is a flowchart illustrating a first exemplary process flow for deleting the reservation information and/or document data according to the third embodiment.

FIG. 67 is a flowchart illustrating a first exemplary process of deleting the reservation information and/or document data.

In step S2010 of FIG. 67, the deletion part 2048 of the printing environment sharing service 2013 determines whether the reservation expiry information of the reservation information and/or document data stored in its corresponding SPS server 2003 has already expired.

If it is determined that the reservation has already expired (S2010, YES), the process proceeds to step S2011. If it is determined that the reservation has not yet expired (S2010, NO), process step S2010 is repeated.

For example, the deletion part 2048 refers to the reservation expiry information included in the reservation information, and determines whether the reservation has already expired.

In step S2011, the deletion part 2048 deletes the reservation information and/or document data stored by the storage part 2047 in the HDD 3029 of the SPS server 2003.

By conducting the process of FIG. 67, the printing environment sharing service 2013 may delete the reservation information and/or document data corresponding to the expired reservation.

It is noted that, in the deletion process, information such as the definition file stored in the HDD 2039 may also be referred to along with the reservation expiry information included in the reservation information to determine whether the deletion of the relevant reservation information and/or document data is prohibited.

In the following, an exemplary process of determining whether the deletion of the reservation information and/or document data is prohibited in the deleting the reservation information and/or document data is described with reference to FIG. 68.

Figure 68:
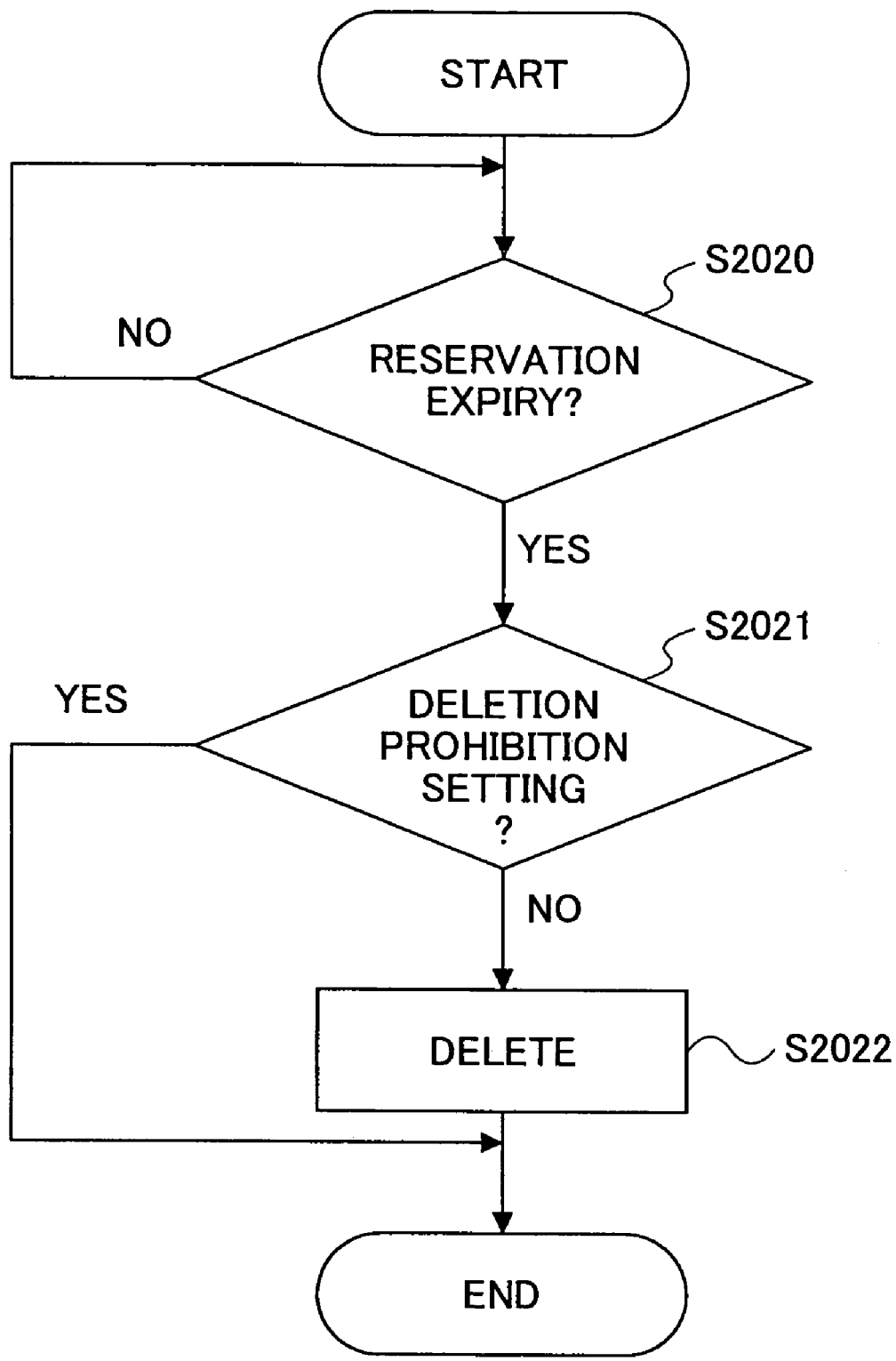
FIG. 68 is a flowchart illustrating a second exemplary process flow for deleting the reservation information and/or document data according to the third embodiment.

FIG. 68 is a flowchart illustrating a second exemplary process of deleting the reservation information and/or document data.

In step S2020 of FIG. 68, the deletion part 2048 of the printing environment sharing service 2013 determines whether the reservation expiry date and time set for the reservation information and/or document data stored in the SPS server 2003 has passed.

If it is determined that the expiry date and time has passed (S2020, YES), the process proceeds to step S2021. If it is determined that the expiry date and time has not yet passed (S2020, NO), step S2020 is repeated.

For example, the deletion part 2048 refers to the reservation expiry information included in the reservation information, and determines whether the reservation expiry date and time has already passed.

In step S2021, the deletion part 2048 refers to information such as the definition file stored in the HDD 2039 to determine whether the deletion of the relevant reservation information and/or document data is prohibited.

If it is determined that the deletion of the relevant reservation information and/or document data is prohibited (S2021, YES), the process is ended. If it is determined that the deletion of the reservation information and/or document data is not prohibited (S2021, NO), the process proceeds to step S2022.

For example, when the deletion part 2048 detects a deletion prohibition flag (e.g., "1") set to the reservation information and/or document data, the deletion part 2048 determines that the deletion of the reservation information and/or document data is prohibited.

In step S2022, the deletion part 2048 deletes the reservation information and/or document data stored by the storage part 2047 in the HDD 2039 of the SPS server 2003.

For example, by setting a deletion prohibition flag for prohibiting all the reservation information and/or document data in the definition file of a SPS server 2003, all the reservation information and/or document data may be preserved, and the corresponding printing environment sharing service 2013 may be used as a log.

The example of setting a deletion prohibition flag to the definition file of an SPS server 2003 for indicating the prohibition of the deletion of the relevant reservation information and/or document data is described above in relation to the process of FIG. 65. However, it is noted that this arrangement may also be used in the process of FIG. 67 in which the printing environment sharing service 2013 deletes the reservation information and/or document data in response to a deletion request from another printing environment sharing service 2013. For example, a printing environment sharing service 2013 receiving a deletion request from another printing environment sharing service 2013 may be arranged to check the flag setting, and upon determining that the deletion prohibition flag is set to the relevant reservation information and/or document data, the printing environment sharing service 2013 may call off the deletion and send the result of not having conducted the deletion to the other printing environment sharing service 2013 corresponding to the sender of the deletion request.

In the description of FIG. 66, an example of sending a deletion request for deleting the relevant reservation information and/or document data based on the storage location information of the reservation information and/or document data. However, the deletion request for deleting the reservation information and/or document data may be sent extensively to delete the reservation information and/or document data.

In the following, an exemplary process of extensively sending the deletion request for deleting the reservation information and/or document data is described with reference to FIG. 69.

Figure 69:
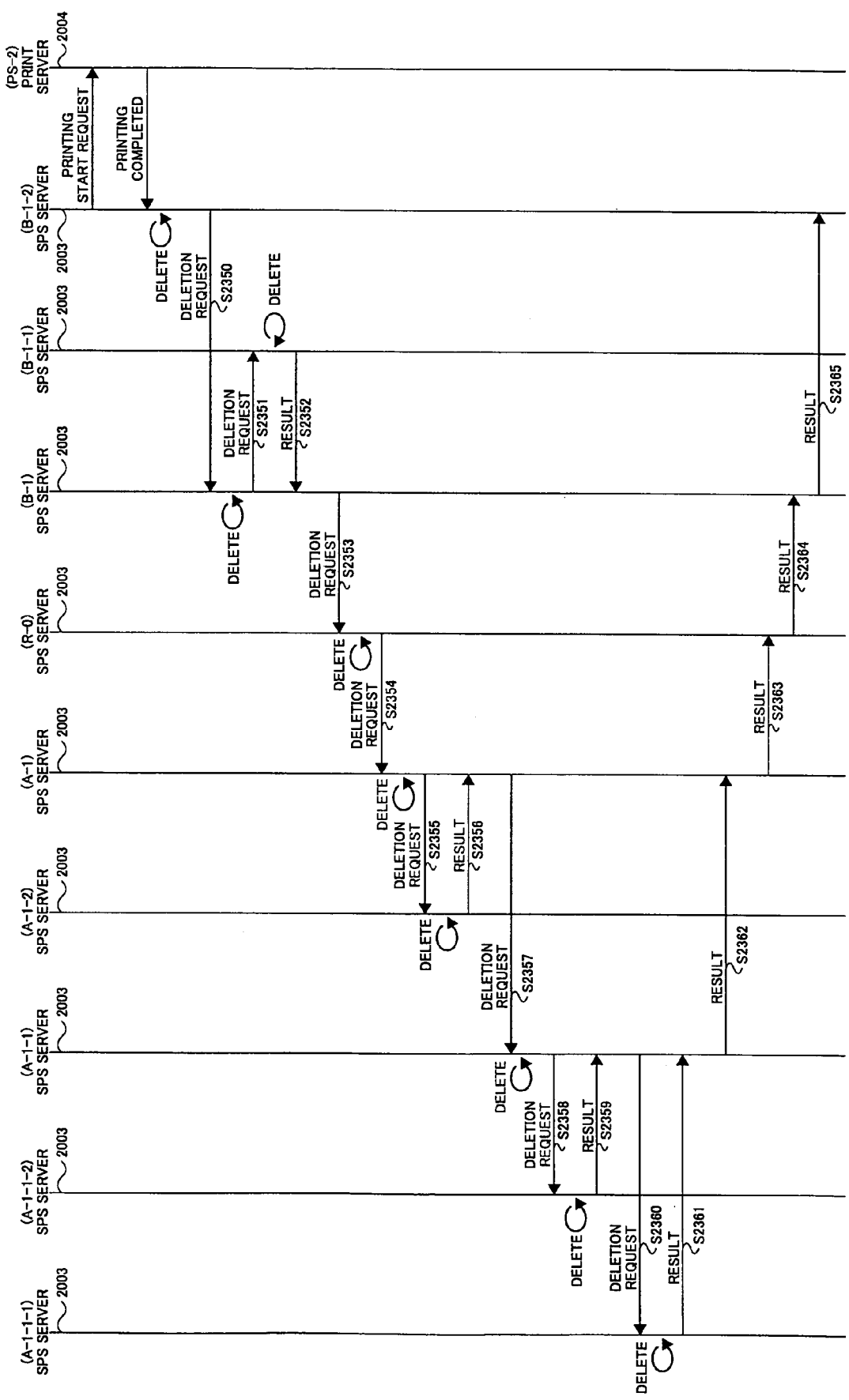
FIG. 69 is a sequence diagram illustrating a second exemplary process of deleting the reservation information and/or document data according to the third embodiment.

FIG. 69 is a sequence diagram illustrating a second exemplary process of deleting the reservation information and/or document data.

It is noted that in the following descriptions, it is assumed that the reservation information and/or document data are stored in each of the SPS server 2003.

For, example, upon obtaining from the document print service 2014 (PS-2) information that the printing of a document corresponding to the printing reservation information of a reservation number has been completed, the deletion part 2048 of the printing environment sharing service 2013 (B-1-2) corresponding to the printing location deletes the reservation information and/or document data corresponding to the reservation number that is stored in the HDD 2039 of the SPS server 2003 (B-1-2), and transmits a deletion request to the printing environment sharing service 2013 (B-1) based on the service list 2071 of the printing environment sharing service 2013 (B-1-2) (S2350 of FIG. 69).

Upon receiving the deletion request, the deletion part 2048 of the printing environment sharing service 2013 (B-1) deletes the reservation information and/or document data corresponding to the reservation number that is stored in the SPS server 2003 (B-1) based on this deletion request, and transmits the deletion request to the printing environment sharing service 2013 (B-1-1) based on the service list 2071 of the printing environment sharing service 2013 (B-1) (S2351 of FIG. 69).

Upon receiving the deletion request, the deletion part 2048 of the printing environment sharing service 2013 (B-1-1) deletes the reservation information and/or document data corresponding to the reservation number that is stored in the SPS server 2003 (B-1-1) based on this deletion request, and transmits the deletion result to the printing environment sharing service 2013 (B-1) (S2352 of FIG. 69).

The deletion part 2048 of the printing environment sharing service 2013 (B-1) also transmits the deletion request to the printing environment sharing service 2013 (R-0) based on the service list 2071 of the printing environment sharing service 2013 (B-1) (S2353 of FIG. 69).

Upon receiving the deletion request, the deletion part 2048 of the printing environment sharing service 2013 (R-0) deletes the reservation information and/or document data corresponding to the reservation number that is stored in the SPS server 2003 (R-0) based on this deletion request, and transmits the deletion request to the printing environment sharing service 2013 (A-1) based on the service list 2071 of the printing environment sharing service 2013 (R-0) (S2354 of FIG. 69).

Upon receiving the deletion request, the deletion part 2048 of the printing environment sharing service 2013 (A-1) deletes the reservation information and/or document data corresponding to the reservation number that is stored in the SPS server 2003 (A-1) based on this deletion request, and transmits the deletion request to the printing environment sharing service 2013 (A-1-2) based on the service list 2071 of the printing environment sharing service 2013 (A-1) (S2355 of FIG. 69).

Upon receiving the deletion request, the deletion part 2048 of the printing environment sharing service 2013 (A-1-2) deletes the reservation information and/or document data corresponding to the reservation number that is stored in the SPS server 2003 (A-1-2) based on this deletion request, and transmits the deletion result to the printing environment sharing service 2013 (A-1) (S2356 of FIG. 69)

The deletion part 2048 of the printing environment sharing service 2013 (A-1) also transmits the deletion request to the printing environment sharing service 2013 (A-1-1) based on the service list 2071 of the printing environment sharing service 2013 (A-1) (S2357 of FIG. 69).

Upon receiving the deletion request, the deletion part 2048 of the printing environment sharing service 2013 (A-1-1) deletes the reservation information and/or document data corresponding to the reservation number that is stored in the SPS server 2003 (A-1-1) based on this deletion request, and transmits the deletion request to the printing environment sharing service 2013 (A-1-1-2) based on the service list 2071 of the printing environment sharing service 2013 (A-1-1) (S2358 of FIG. 69).

Upon receiving the deletion request, the deletion part 2048 of the printing environment sharing service 2013 (A-1-1-2) deletes the reservation information and/or document data corresponding to the reservation number that is stored in the SPS server 2003 (A-1-1-2) based on this deletion request, and transmits the deletion result to the printing environment sharing service 2013 (A-1-1) (S2359 of FIG. 69)

The deletion part 2048 of the printing environment sharing service 2013 (A-1-1) also transmits the deletion request to the printing environment sharing service 2013 (A-1-1-1) based on the service list 2071 of the printing environment sharing service 2013 (A-1-1) (S2360 of FIG. 69).

Upon receiving the deletion request, the deletion part 2048 of the printing environment sharing service 2013 (A-1-1-1) deletes the reservation information and/or document data corresponding to the reservation number that is stored in the SPS server 2003 (A-1-1-1) based on this deletion request, and transmits the deletion result to the printing environment sharing service 2013 (A-1-1) (S2361 of FIG. 69).

The deletion part 2048 of the printing environment sharing service 2013 (A-1-1) combines the deletion result of its own deletion process and the deletion results received in steps S2359 and S2361, and transmits the combined results to the printing environment sharing service 2013 (A-1) (S2362 of FIG. 69).

The deletion part 2048 of the printing environment sharing service 2013 (A-1) combines the deletion result of its own deletion process and the deletion results received in steps S2356 and S2362, and transmits the combined results to the printing environment sharing service 2013 (R-0) (S2363 of FIG. 69).

The deletion part 2048 of the printing environment sharing service 2013 (R-0) combines the deletion result of its own deletion process and the deletion result received in step S2363, and transmits the combined results to the printing environment sharing service 2013 (B-1) (S2364 of FIG. 69).

The deletion part 2048 of the printing environment sharing service 2013 (B-1) combines the deletion result of its own deletion process and the deletion results received in steps S2352 and S2364, and transmits the combined results to the printing environment sharing service 2013 (B-1-2) (S2365 of FIG. 69).

By conducting the process of FIG. 69, the printing environment sharing service 2013 may be able to delete the reservation information and/or document data stored in each of the SPS servers 2003 without using the storage location information.

It is noted that in the process of FIG. 69, the deletion part 2048 of the printing environment sharing service 2013 may check the deletion prohibition flag setting upon receiving a deletion request from another printing environment sharing service 2013, as in the process of FIG. 68, and when it is determined that a deletion prohibition flag is set to the reservation information and/or document data, the deletion may be called off, and the effect of not having conducted the deletion as the deletion result may be sent to the other printing environment sharing service 2013 corresponding to the sender of the deletion request.

Fourth Embodiment

Next, a description is given, with reference to FIGS. 70 and 71, of an image-forming apparatus (hereinafter referred to as a multi-function printer apparatus) 3200 as another example of an apparatus that implements the printing environment sharing service 2013.

Figure 70:
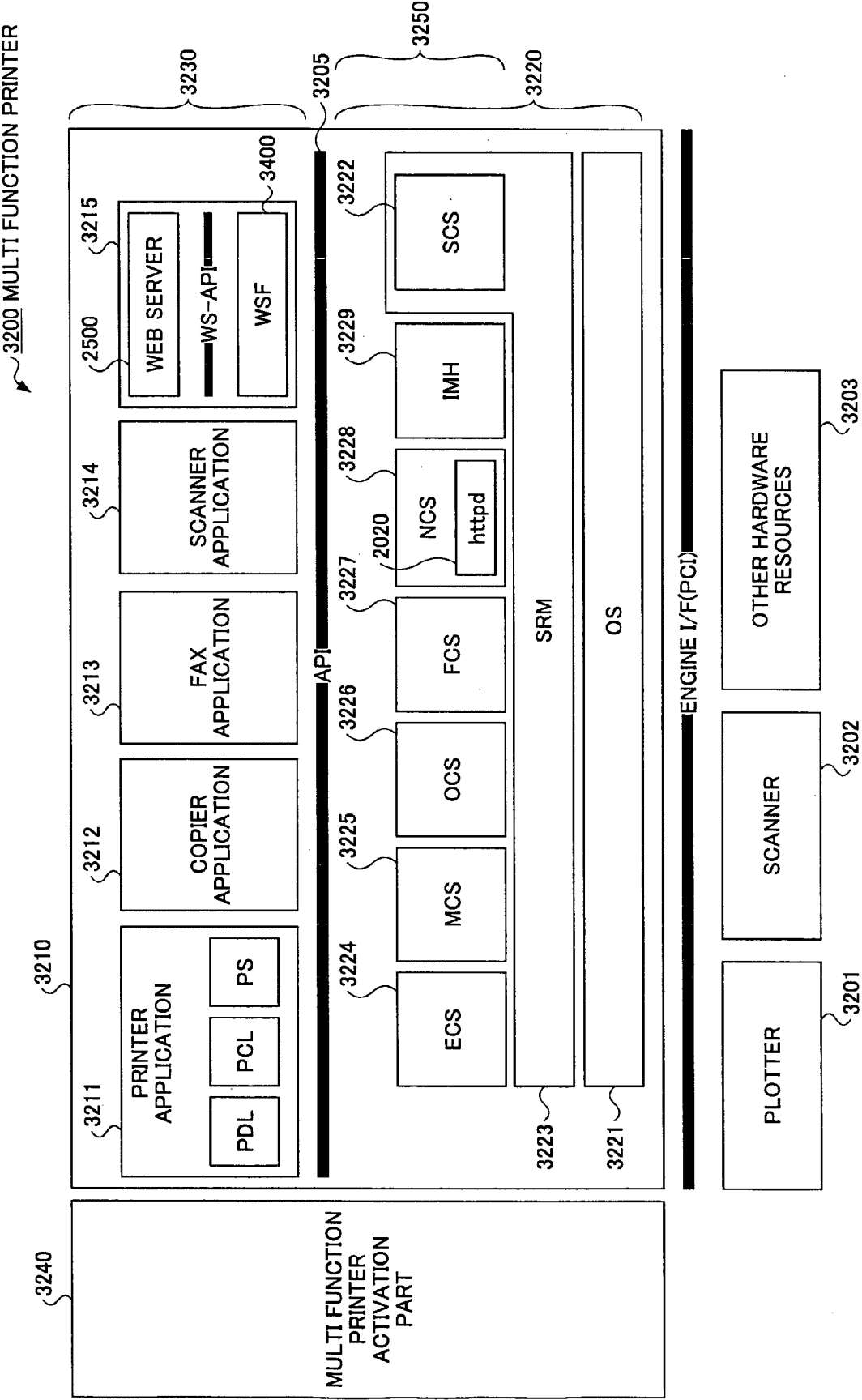
FIG. 70 is a block diagram showing a functional configuration of a multi-function printer according to a fourth embodiment of the present invention.

FIG. 70 is a block diagram showing a functional configuration of the multi-function apparatus 3200.

Referring to FIG. 70, the multi-function apparatus 3200 includes a plotter 3201, a scanner 3202, hardware resources 3203 including a facsimile machine, a software group 3210 including a platform 3220 and applications 3230, and a multi-function printer apparatus activation part 3240.

When the multi-function printer apparatus 3200 is turned on, the activation part 3240 is first started to activate the platform 3220 and the applications 3230. The platform 3220 includes a control service 3250, a system resource manager (SRM) 3223, and an OS 3221. The control service 3250 interprets processing requests from the applications 3230 and generates requests to obtain a hardware resource (hardware resource obtaining requests). The SRM manages one or more hardware resources and arbitrates between the hardware resource obtaining requests from the control service 3250.

The control service 3250 includes multiple service modules, which are a system control service (SCS) 3222, an engine control service (ECS) 3224, a memory control service (MCS) 3225, an operations panel control service (OCS) 3226, a facsimile control service (FCS) 3227, a network control service (NCS) 3228, and an imaging memory handler (IMH) 3229. The platform 3220 includes an application program interface (API) 3205 that makes the processing requests from the applications 3230 receivable using a predefined function.

The OS 3221, which is an operating system such as UNIX®, executes the software programs of the platform 3220 and the applications 3230 in parallel as processes. Use of UNIX®, which is open source software, makes it possible to secure program security, support networking, and obtain a source code easily. Further, no OS and TCP/IP royalties are required, and outsourcing is easy.

The SRM 3223 perform system control and resource management in cooperation with the SCS 3222. The SRM 3223 performs arbitration and execution control according to a request from a higher layer for the use of hardware resources such as an engine part such as the scanner 3202 or the plotter 3202, a memory, an HDD file, and a host I/O (a Centronics I/F, a network I/F, an IEEE 1394 I/F, or an RS-232-C I/F, for instance).

Specifically, the SRM 3223 determines whether the requested hardware resources are available, that is, whether the requested hardware resources are being used by another request. If the requested hardware resources are available, the SRM 3223 notifies the higher layer that the requested hardware resources are available. Further, in response to the request from the higher layer, the SRM 3223 performs scheduling for using the hardware resources, and directly carries out the requested contents such as paper feeding and image formation by a printer engine, memory reservation, and file creation.

The SCS 3222 perform multiple functions such as application management (Function 1), operation part control (Function 2), system screen display (for instance, display of a job list screen and a counter display screen) (Function 3), LED display (Function 4), resource management (Function 5), and interrupting application control (Function 6). Specifically, in the application management (Function 1), the registration of an application is performed, and the other applications are notified of information on the registration. In the operation part control (Function 2), exclusive control is performed on the rights of use of an operation part of the applications. In the system screen display (Function 3), a warning screen corresponding to the state of the engine part is displayed in accordance with the contents of a request from an application having the right of use of the operation part. In the LED display (Function 4), display control of a warning LED and the system LEDs of application keys is performed. In the resource management (Function 5), services for exclusive control of engine resources (for instance, the scanner 3202 and a staple) to be excluded when the application (ECS 3224) executes a job are provided. In the interrupting application control (Function 6), control and services for giving priority to the operation of a specific application are provided.

The ECS 3224 controls the engine part including the plotter 3201, the scanner 3202, and the other hardware resources 3203. For instance, the ECS 3224 reads images, performs printing, makes state notifications, and makes jam recoveries.

The MCS 3225 performs memory control. Specifically, the MCS 3225 obtains and releases image memory, uses an HDD, and compresses and decompresses image data, for instance.

The OCS 3226 controls an operations panel that serves as an information transmission part between an operator and a main body control.

For instance, the OCS 3226 notifies the main body control of the key operation events of the operator, provides a library function for each application to construct a GUI, manages the constructed GUI information application by application, and performs display reflection onto the operations panel.

The FCS 3227 provides the API 3205 for facsimile transmission to and reception from each application layer of a system controller using a PSTN or ISDN network, registration and citation of a variety of facsimile data managed in a backup SRAM (BKM), reading of facsimile communications, printing of received facsimile communications, and multi-function-related transmission and reception.

The NCS 3228 is a module group for providing services that can be used in common to applications requiring network I/O. The NCS 3228 mediates in distributing the data received from the network in accordance with each protocol among the applications and transmitting data from the applications to the network.

For instance, the NCS 3228 may control data communications with network devices connected through the Internet by HTTP (HyperText Transfer Protocol) among multiple protocols using an HTTPd (HyperText Transfer Protocol Daemon) 2020. The NCS 3228 may activate a processing part corresponding to a Web service specified by an HTTP request header with a function call, and notify the requesting network device of the results of processing by the Web service 1 by an HTTP response. The Web service is provided in accordance with a message written in, for instance, XML.

The IMH 3229 maps image data in a virtual memory region (a user virtual space) into a physical memory. The IMH 3229 makes a system call in response to the activation of a process. Then, the IMH 3229 maps a virtual memory region for the process, and releases the virtual memory region when the process is completed.

The applications 3230 includes a printer application 3211 for a printer including a page-description language (PDL), a printer control language (PCL), and PS, a copy application 3212 for a copier, a fax application 1213 for a facsimile machine, a scanner application 1214 for a scanner, and a Web service processing application 3215 that is a Web service application. Each of the applications 3211 through 3215 can operate using each process on the platform 3220, and therefore, is composed mainly of a screen display control program that performs screen control, key operation control, and job generation. A new application may be installed via a network connected through the NCS 3228. Application addition and deletion may be performed application by application.

The Web service processing application 3215 includes a Web server 2500 and a Web service function (WSF) 3400. The Web server 2500 provides a Web service by receiving an HTTP request for the Web service and transmitting an HTTP response. The Web service function (WSF) 3400 performs predetermined processing using the control service 3250 via the API 3205, and provides the processing results as a Web service via a Web service application program interface (WS-API).

According to this embodiment, the printing environment sharing service 2013 or the repository service 2012 is provided in the Web service function 3400.

Figure 71:
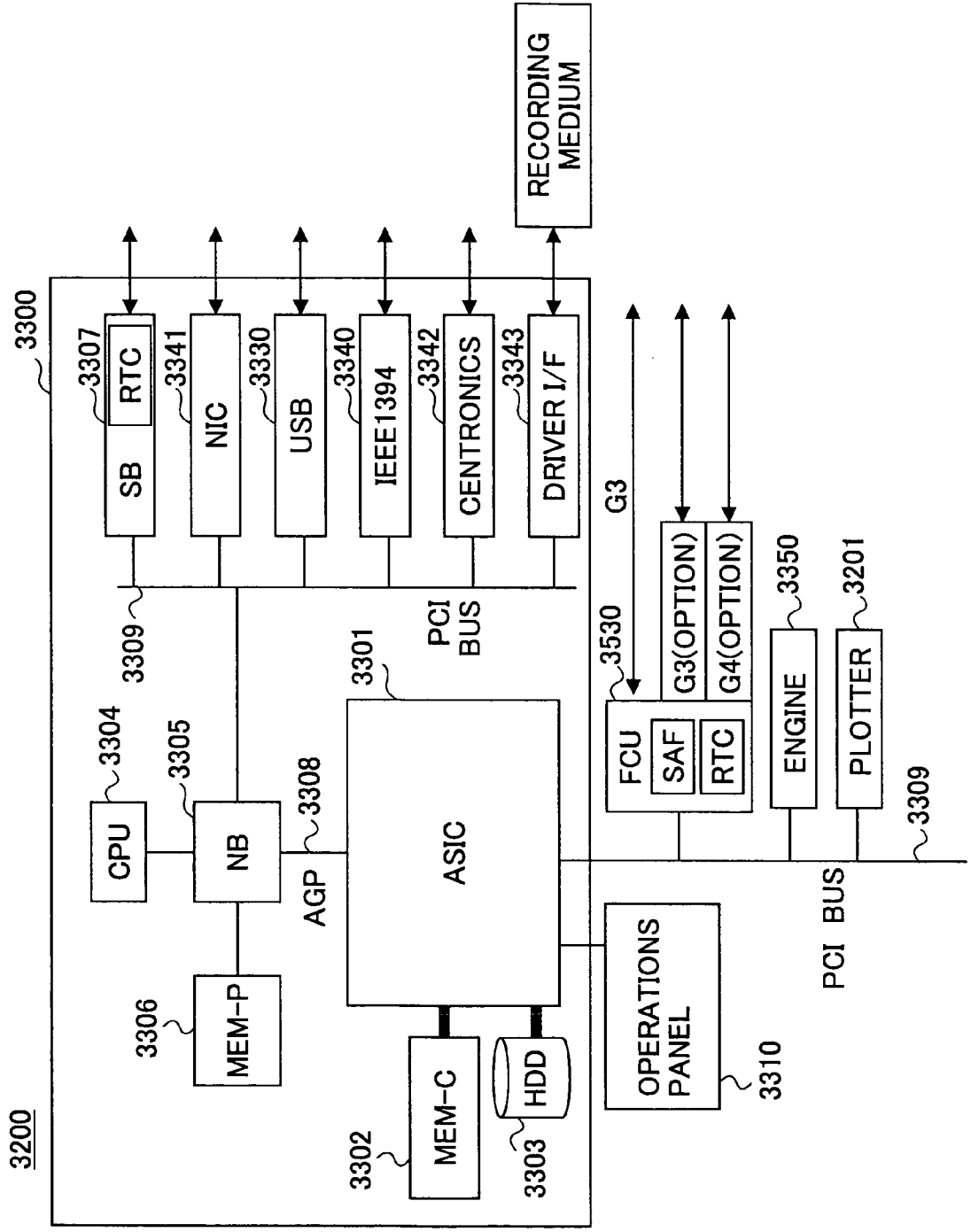
FIG. 71 is a block diagram showing a hardware configuration of the multi-function printer apparatus of the fourth embodiment.

The service list 2071, the printer list 2072, and reservation information and document data transferred from another multi-function apparatus 3200 are stored in a below-described HDD 3303 (FIG. 71).

The multi-function apparatus 3200 processes all the operations required in common among the applications solely on the platform 3220.

FIG. 71 is a block diagram showing a hardware configuration of the multi-function apparatus 3200.

Referring to FIG. 71, the multi-function apparatus 3200 has a configuration where an operations panel 3310, a facsimile control unit (FCU) 3530, an engine part 3350 (to which, for instance, the scanner 3202 is connected), and the plotter 3201 are connected to an application specific integrated circuit (ASIC) 3301 of a controller 3300 via a peripheral component interconnect (PCI) bus 3309 and the like.

In the controller 3300, a local memory (MEM-C) 3302 and the HDD 3303 are connected to the ASIC 3301, and the ASIC 3301 and a CPU 3304 are connected via a Northbridge (NB) 3305 of a CPU chipset. The ASIC 3301 and the CPU 3304 are thus connected via the NB 3305 because the interface of the CPU 3304 is not open to the public.

The ASIC 3301 and the NB 3305 are connected not by a mere PCI but by an accelerated graphics port (AGP) 3308. This is because connecting the ASIC 3301 and the NB 3305 by a low-speed PCI results in lower performance since the multi-function apparatus 3200 executes and controls the multiple processes forming the platform 3220 and the applications 3230 shown in FIG. 70.

The CPU 3304 performs overall control of the multi-function apparatus 3200. Specifically, the CPU 3304 causes the SCS 3222, the SRM 3223, the ECS 3224, the MCS 3225, the OCS 3226, the FCS 3227, the NCS 3228, and the IMH 3229 forming the platform 3220 to be activated and executed as processes on the OS 3221. Further, the CPU 3304 causes the printer application 3211, the copy application 3212, the fax application 3213, the scanner application 3214, and the Web service processing application 3215 to be activated and executed.

The NB 3305 is a bridge for connecting the CPU 3304 to a system memory (MEM-P) 3306, a Southbridge (SB) 3307, a network interface card (NIC) 3341, a universal serial bus (USB) 3330, an IEEE 3394 device 3340, a Centronics device 3342, a driver I/F 3343, and the ASIC 3301.

The system memory (MEM-P) 3306 is used as the memory for image drawing of the multi-function apparatus 3200. The SB 3307 is a bridge for connecting the NB 3305 with a PCI bus, a ROM, and peripheral devices. The local memory (MEM-C) 3302 is used as an image buffer for copying and a code buffer. The ASIC 3301 is an IC for image processing including a hardware element for image processing.

The driver I/F 3343 is an interface used to read a program or an application from an inserted recording medium storing the program or the application and install the read program or application in the multi-function apparatus 3200. The recording medium may be, for instance, an SD memory card, a smart medium, a multimedia card, or a CompactFlash®.

The HDD 3303 stores image data, programs, font data, forms, and documents. The HDD 3303 also stores the service list 2071, the printer list 2072, and information such as reservation information, document data, and charge information according to the present invention. The operations panel 3310 is an operation part that receives inputs from the operator and displays information to the operator.

Accordingly, the ASIC 3301 includes a RAM interface for connecting the local memory (MEM-C) 3302 and a hard disk interface for connecting the HDD 3303. When image data is input to or output from these memory parts, the target or source of the image data is switched to the RAM interface or the hard disk interface.

The AGP 3308 is a bus interface for a graphics accelerator card, which has been proposed to accelerate graphics processing. The AGP 3308 directly accesses the system memory (MEM-P) 3306 at high throughput so that the graphics accelerator card operates at high speed.

By providing the printing environment sharing service 2013 in the multi-function apparatus 3200 as shown in FIGS. 70 and 71, for instance, reservation information and document data can be transferred between the multi-function apparatuses 3200, the reservation information and the document data can be stored in the multi-function apparatus 3200 of a specified printing location, and the multi-function apparatus 3200 of the specified printing location can perform printing when a printing start request is received as described in the third embodiment.

Also, by storing the reservation information and/or document data in the multi-function printer apparatus 3200, the reservation information and/or document data may be easily referred to at the multi-function printer apparatus 3200 using its operations panel 3310 to start printing or make changes to the reservation information.

In the above, preferred embodiments of the present invention area described. However, it is noted that the present invention is not limited to these particular embodiments, and various changes and modifications may be made without departing from the scope of the present invention.

For example, in the embodiments described above, the printing start control part 2052 is arranged to transmit a printing start request including information such as the reservation information and the document data to another printing environment sharing service 2013 based on the channel information to the printing location; however, the printing start control part may alternatively be arranged to transmit a transfer request to the transfer part 2044, and the transfer part 2044 may be arranged to transmit the printing start request including information such as the reservation information and the document data to another printing environment sharing service 2013 based on the channel information to the printing location.

Fifth Embodiment

Figure 72:
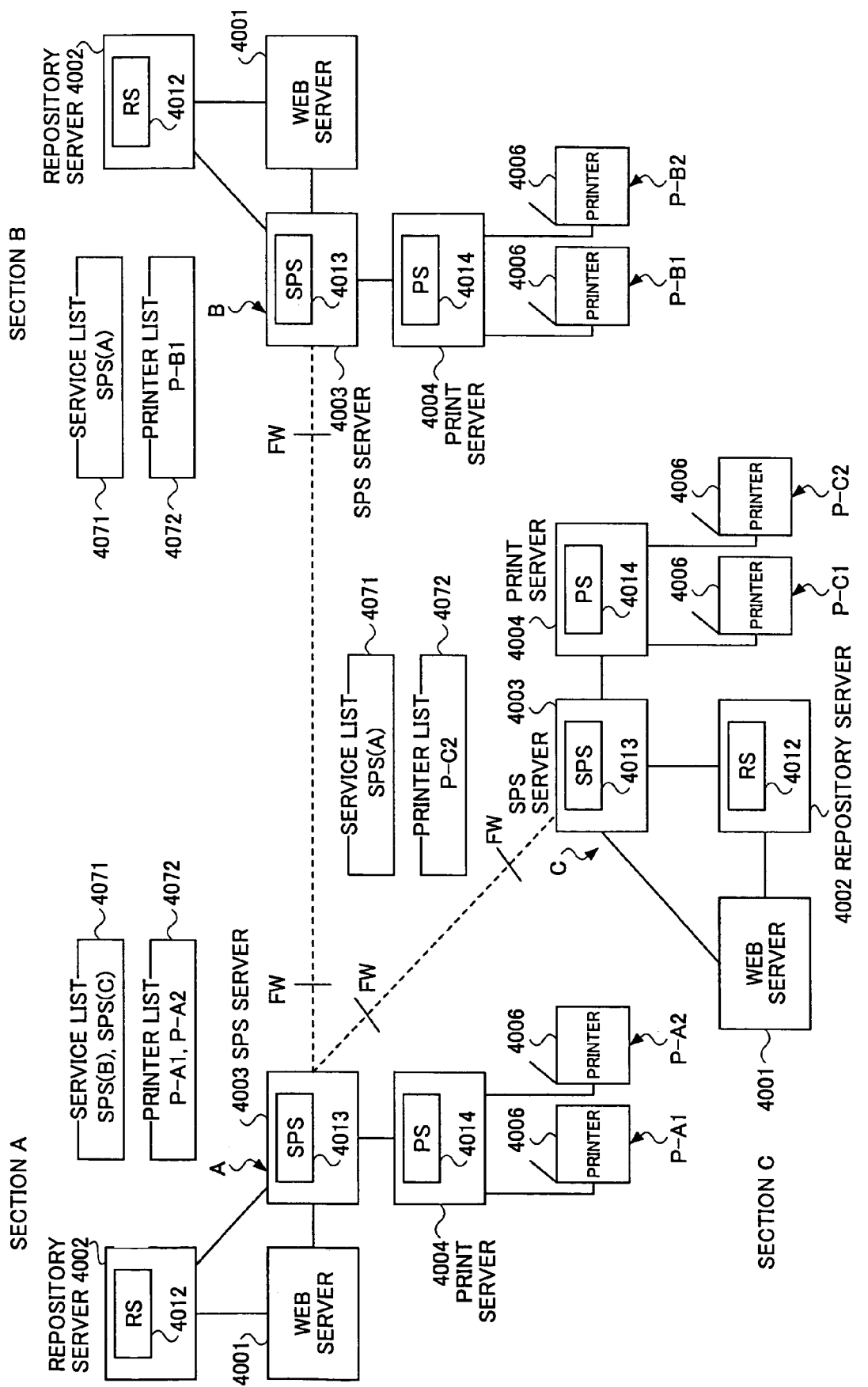
FIG. 72 is a block diagram showing a system configuration according to a fifth embodiment of the present invention.

FIG. 72 is a block diagram showing a system configuration according to a fifth embodiment of the present invention. According to the system configuration of FIG. 72, each of Sections A, B, and C includes the Web server 4001, the repository server 4002, a share print service (SPS) server 4003, the print server 4004, and the printers 4006. In each section, the servers 4001 through 4004 and the printers 4006 are managed and used in order as a printing environment.

Referring to FIG. 72, each repository server 4002 includes the repository service 4012 providing a service for document storage and/or management, each SPS server 4003 includes a printing environment sharing service (referred to as an SPS in the drawings) 4013, and each print server 4004 includes the document print service 4014 providing a service for printing.

The services 4012 through 4014 can use one another's functions by exchanging messages based on the SOAP (Simple Object Access Protocol) protocol with one another. The same applies in the following.

In contrast to the system configuration of FIG. 1, the system configuration of FIG. 72, by newly introducing the SPS servers 4003, can, for instance, set identification information specifying the printing environment sharing service 4013 of one section that can be referred to, such as the service identifier of the printing environment sharing service 4013, in a service list 4071 of the SPS server 4003 of another section. As a result, the SPS servers 4003 and/or the printing environment sharing services 4013 of the two sections can share the printing environments (the print servers 4004 and the printers 4006) thereof, so that the two sections can use each other's printing environments.

Further, as shown in FIG. 72, in each section, its printers 4006 usable by the SPS server 4003 and/or the printing environment sharing service 4013 of another section may be set in a printer list 4072 in the SPS server 4003 and managed. As a result, the printing environments can be managed in a distributed manner in each section without being affected by changes in another section, such as changes in the printers 4006 or printer drivers.

Further, in contrast to the system configuration of FIG. 1, in the system configuration of FIG. 72, the SPS servers 4003 and/or the printing environment sharing services 4013 that can perform communications are connected. This reduces the number of communication channels between sections, so that a reduced number of communication channels are exposed to attacks. Accordingly, security can be ensured.

Each SPS server 4003 with the printing environment sharing service 4013 may store the service list 4071 and the printer list 4072 as shown in FIG. 72. Alternatively, the service lists 4071 and the printer lists 4072 corresponding to the SPS servers 4003 may be stored collectively in another apparatus or separately in other apparatuses.

Figure 73:
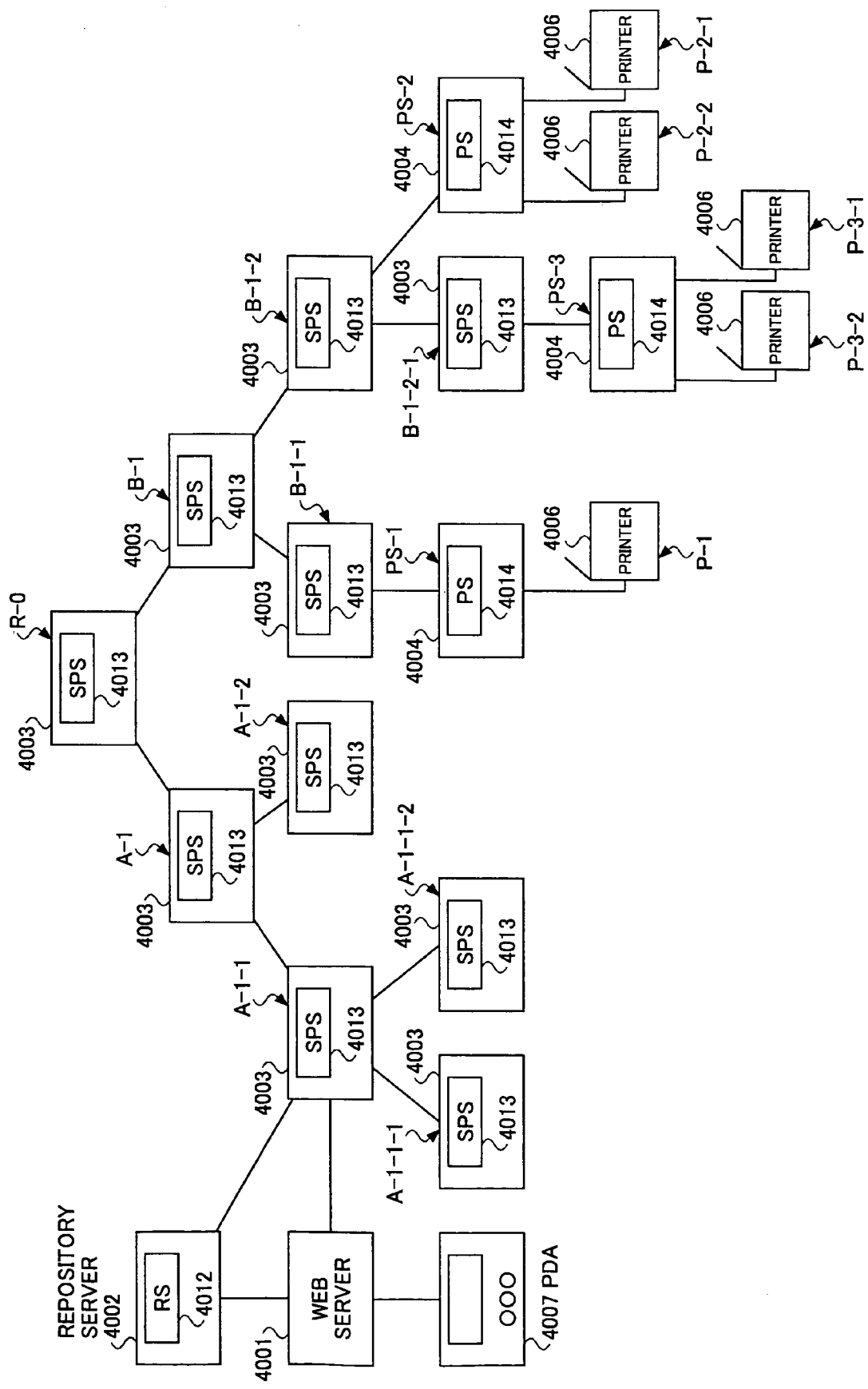
FIG. 73 is a block diagram showing another system configuration according to the fifth embodiment of the present invention.

Next, a description is given, with reference to FIG. 73, of another system configuration for implementing the present invention according to this embodiment.

FIG. 73 is a block diagram showing another system configuration according to this embodiment. The system configuration of FIG. 73 includes the Web server 4001, the repository server 4002, the SPS servers 4003, the print servers 4004, the printers 4006, and a PDA 4007.

Referring to FIG. 73, the Web server 4001, the repository server 4002, the SPS servers 4003, the print servers 4004, the printers 4006, and the PDA 4007 are connected via a LAN and/or the Internet. As in the system configuration of FIG. 72, in the system configuration of FIG. 73, the servers and the printers 4006 are managed and used in order as a printing environment.

A user enters a username and a password using the PDA 4007 to log on to the Web server 4001. Then, using services provided by the printing environment sharing services 4013, the user specifies a printing location (for instance, the printing environment sharing service 4013 [B-1-2]), a printer to be used for printing (for instance, the printer 4006 [P-2-2]), printing conditions (for instance, A4 size and color), and a document for which a reservation for printing is to be made, and makes a request for printing reservation (a printing reservation request). In the case of selecting a printing location, the user may select, for instance, a prefecture name, a city name, an office name, or a section name correlated with the SPS server 4003 or the printing environment sharing service 4013, which are easy for the user to understand, instead of directly selecting the SPS server 4003 or the printing environment sharing service 4013. The same applies in the following.

As described below, when the user specifies a printing location, the printing environment sharing service 4013 obtains information on the communication channel up to the printing location specified by the user (in this case, the printing environment sharing service 4013 [B-1-2]). Hereinafter, this information may be referred to as channel information.

For instance, the printing environment sharing service 4013 (A-1-1), in response to a search request from the Web server 4001, obtains the channel information to the printing environment sharing service 4013 (B-1-2), which is the printing location specified by the user, as (A-1-1)→(A-1)→(R-0) →(B-1)→(B-1-2), and provides the obtained channel information to the Web server 4001.

Figure 77:
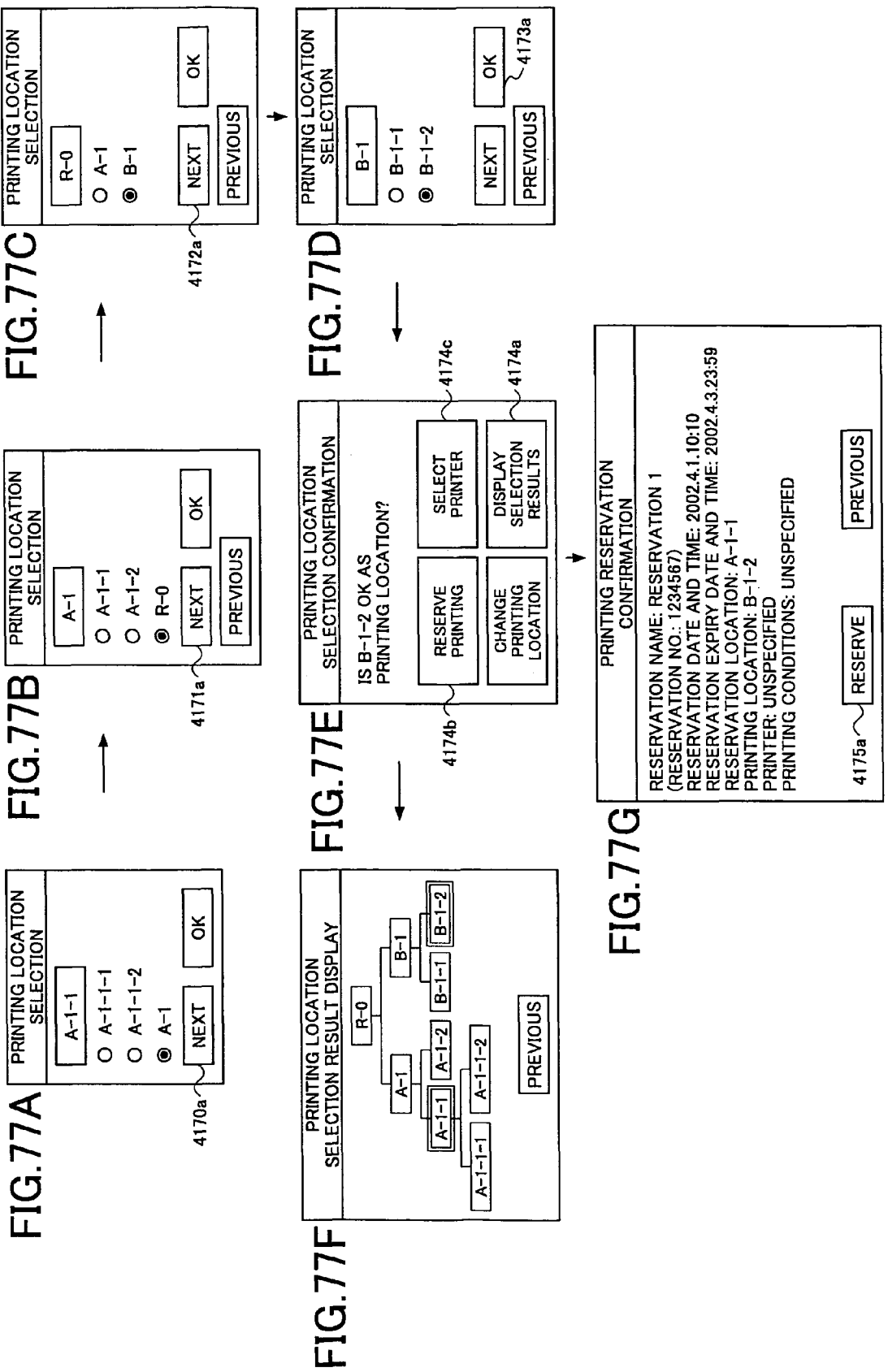
FIGS. 77A through 77G are diagrams for illustrating a printing location selecting operation according to the fifth embodiment of the present invention.

The channel information can be obtained using the service lists 4071. For instance, when the user selects "A-1" on a printing location selection screen as shown below in FIG. 77A using the PDA 4007, the Web server 4001 recognizes from the obtained service list 4071 of the printing environment sharing service 4013 (A-1-1) that the printing environment sharing service 4013 (A-1) is superordinate to the printing environment sharing service 4013 (A-1-1). Then, the Web server 4001 obtains information on the channel from the printing environment sharing service 4013 (A-1-1) to the printing environment sharing service 4013 (A-1), such as the name, latitude, longitude, altitude, address, and URI of the location of the printing environment sharing service 4013 (A-1). Using the obtained information as channel information, the Web server 4001 adds the channel information from the printing environment sharing service 4013 (A-1-1) to the printing environment sharing service 4013 (A-1) to the channel information from the Web server 4001 to the printing environment sharing service 4013 (A-1-1), and includes the obtained channel information in a request to obtain the service list 4071 of the printing environment sharing service 4013 (A-1). Thereafter, the Web server 4001 and/or the printing environment sharing services 4013 obtain service lists 4071 in the same manner as described above so that the channel information to, for instance, a printing location selected by the user can be obtained.

When the printing environment sharing service 4013 (A-1-1) receives the request for printing reservation from the user via the Web server 4001, the printing environment sharing service 4013 (A-1-1), using a document ID and document usage authorization information included in the request, transmits to the repository service 4012 of the repository server 4002 a request to obtain the document specified by the document ID, and obtains the document data stored in the repository server 4002 via the repository service 4012.

Based on the channel information included in the request for printing reservation, the printing environment sharing service 4013 (A-1-1) transfers the obtained document data to the printing environment sharing service 4013 (A-1) together with reservation information including the channel information, identification information identifying the printing location, identification information identifying the printer 4006 to be used for printing, and the printing conditions.

Receiving the reservation information and the document data from the printing environment sharing service 4013 (A-1-1), the printing environment sharing service 4013 (A-1) transfers the reservation information and the document data to the printing environment sharing service 4013 (R-0) based on the channel information included in the reservation information.

Receiving the reservation information and the document data from the printing environment sharing service 4013 (A-1), the printing environment sharing service 4013 (R-0) transfers the reservation information and the document data to the printing environment sharing service 4013 (B-1) based on the channel information included in the reservation information.

Likewise, receiving the reservation information and the document data from the printing environment sharing service 4013 (R-0), the printing environment sharing service 4013 (B-1) transfers the reservation information and the document data to the printing environment sharing service 4013 (B-1-2) based on the channel information included in the reservation information.

Receiving the transferred reservation information and document data, the printing environment sharing service 4013 (B-1-2) stores the reservation information and the document data in the SPS server 4003 (B-1-2).

On the other hand, for instance, the user goes to the printing location, and requests the printing environment sharing service 4013 (A-1-1) to start to print the document for which the printing reservation has been made. Receiving the request to start printing (printing start request), the printing environment sharing service 4013 (A-1-1) transmits the printing start request to the printing environment sharing service 4013 (A-1) based on the channel information to the printing environment sharing service 4013 (B-1-2) of the printing location.

Receiving the printing start request from the printing environment sharing service 4013 (A-1-1) the printing environment sharing service 4013 (A-1) transmits the printing start request to the printing environment sharing service 4013 (R-0) based on the channel information.

Receiving the printing start request from the printing environment sharing service 4013 (A-1), the printing environment sharing service 4013 (R-0) transmits the printing start request to the printing environment sharing service 4013 (B-1) based on the channel information.

Likewise, receiving the printing start request from the printing environment sharing service 4013 (R-0), the printing environment sharing service 4013 (B-1) transmits the printing start request to the printing environment sharing service 4013 (B-1-2) based on the channel information.

Receiving the printing start request, the printing environment sharing service 4013 (B-1-2) transmits the stored reservation information and document data to the document print service 4014 of the print server 4004 (PS-2), and makes a request to print the document data based on the printing conditions included in the reservation information.

Receiving the request to print the document data, the document print service 4014 (PS-2) converts the document data into printing data printable on the printer 4006 (P-2-2) included in the reservation information, and requests the printer 4006 (P-2-2) to print the printing data based on the printing conditions.

Receiving the request to print the printing data from the document print service 4014 (PS-2), the printer 4006 (P-2-2) performs printing based on the request.

As described above, by making a reservation for printing, transferring reservation information and document data between the printing environment sharing services 4013, and printing a document based on a request for printing, a user can use, for instance, an orderly printing environment of another section or office that is allowed to be shared. Accordingly, the user can print a document immediately in a different printing environment without making an effort to construct a new printing environment.

Using the service lists 4071, the printing environment sharing services 4013 can construct a system having a tree structure as shown in FIG. 73, for instance.

A user terminal used by a user is not limited to the PDA 7, and may be other portable terminals such as a cellular phone. The user terminal may also be a PC.

In the above-described case, the reservation information and/or the document data is stored in the SPS server 4003 of the printing location in the system configuration of FIG. 73, which is the SPS server 4003 (B-1-2). Alternatively, the reservation information and/or the document data may be stored in the SPS server 4003 of the reservation location, which is the SPS server 4003 (A-1-1).

Further, the reservation information and/or the document data may also be stored in the top SPS server 4003 in the system configuration of FIG. 73, which is the SPS server (R-0).

The reservation information and/or the document data may also be stored not only in a single location but also in both the printing location and the reservation location, in the reservation location and the SPS server 4003 in the vicinity of the printing location, which is the SPS server 4003 (B-1-1), or in the reservation location, the printing location, and their respective top SPS servers 4003, which are the SPS servers 4003 (A-1 and B-1).

The reservation information and/or the document data may also be stored in the entire channel from the reservation location to the printing location (A-1-1, A-1, R-0, B-1, and B-1-2).

In the following description, it is assumed for simplification of description that the reservation information and/or the document data is stored in both the reservation location and the printing location unless otherwise mentioned.

Figure 74:
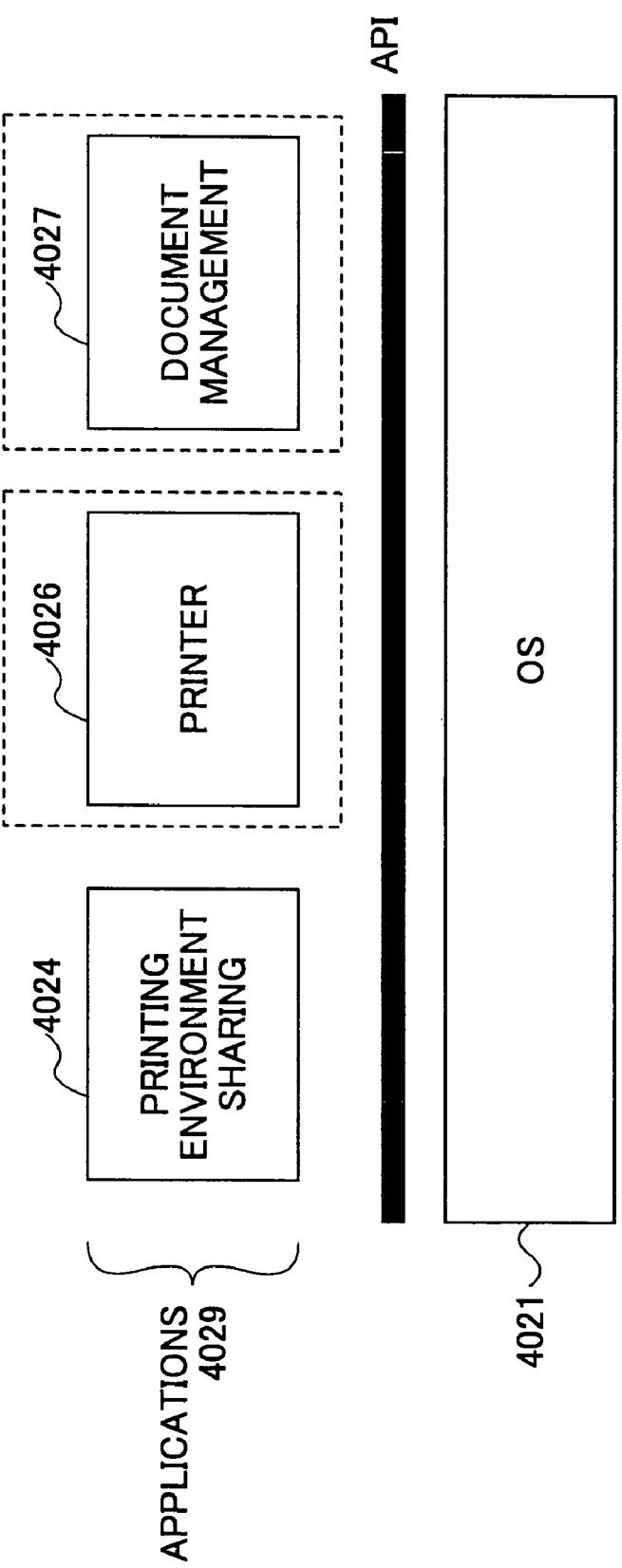
FIG. 74 is a block diagram showing a software configuration of an SPS server according to the fifth embodiment of the present invention.

FIG. 74 is a block diagram showing a software configuration of the SPS server 4003.

Referring to FIG. 74, the SPS server 4003 includes an operating system (OS) 4021 and applications 4029.

The OS 4021, which is an operating system such as UNIX® or Windows®, executes, for instance, the software programs of the applications 4029 in parallel as processes.

The applications 4029 include a printing environment sharing application 4024, which is an application for printing reservation and/or printing. Each printing environment sharing service 4013 shown in FIGS. 72 and 73 is included in the printing environment sharing application 4024 of the corresponding SPS server 4003.

In the above description with reference to FIGS. 72 and 73, each SPS server 4003 is described as having only the printing environment sharing service 4013 included in the printing environment sharing application 4024. However, in each SPS server 4003, the applications 4029 may be configured to include a printer application 4026, which is an application for a printer, and a document management application 4027, which is an application for document management, as shown in FIG. 74.

Each document print service 4014 shown in FIGS. 72 and 73 is included in the corresponding printer application 4026. Each repository service 4012 shown in FIGS. 72 and 73 is included in the corresponding document management application 4027.

However, in the fifth embodiment, a description is given based on the assumption that the document print servers 4014 are included in the corresponding print servers 4004, and the repository services 4012 are included in the corresponding repository servers 4002 as shown in FIGS. 72 and 73 for simplification. This, however, does not limit the implementation of the present invention.

A description is given below, with reference to FIG. 75, of the hardware configuration of the SPS server 4003.

Figure 75:
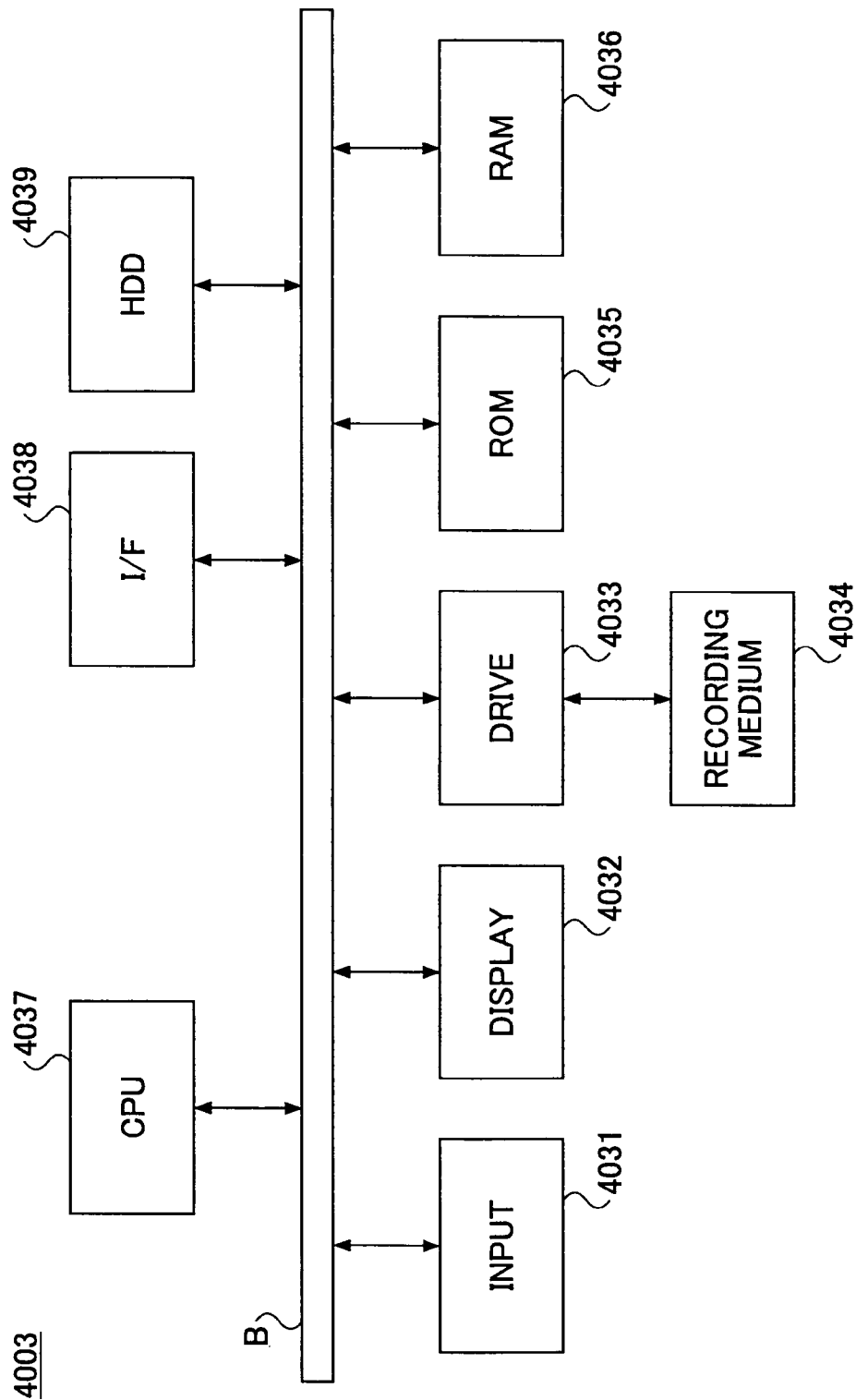
FIG. 75 is a block diagram showing a hardware configuration of the SPS server according to the fifth embodiment of the present invention.

FIG. 75 is a block diagram showing a hardware configuration of the SPS server 4003.

According to the hardware configuration of the SPS server 4003 of FIG. 75, the SPS server 4003 includes an input unit 4031, a display unit 4032, a drive unit 4033, a ROM 4035, a RAM 4036, a CPU 4037, an interface unit (I/F) 4038, and the HDD 4039, which are connected with one another via a bus B.

The input unit 4031 includes a keyboard and a mouse operated by a user of the SPS server 4003, and is used to input a variety of operation signals to the SPS server 4003.

The display unit 4032 includes a display used by a user of the SPS server 4003, and displays a variety of information.

The interface unit 4038 is an interface connecting the SPS server 4003 to a network.

Programs such as the application program corresponding to the printing environment sharing application 4024 included in the applications 4029 of FIG. 74 and a main program controlling the operation of the entire SPS server 4003 are provided to the SPS server 4003 through a recording medium 34 such as a CD-ROM or downloaded thereto through the network. The recording medium 4034 is set in the drive unit 4033 so that programs such as the application program and the main program are installed in the HDD 4039 from the recording medium 4034 through the drive unit 4033.

The ROM 4035 stores data. The RAM 4036 reads out the programs such as the application program and the main program from the HDD 4039 and stores the programs when the SPS server 4003 is activated. The CPU 4037 performs processing in accordance with the programs such as the application program and the main program read into and stored in the RAM 4036.

The HDD 4039 stores the service list 4071 and the printer list 4072 besides the programs such as the application program and the main program.

A description is given below, with reference to FIG. 76, of the functional configuration of the SPS server 4003.

Figure 76:
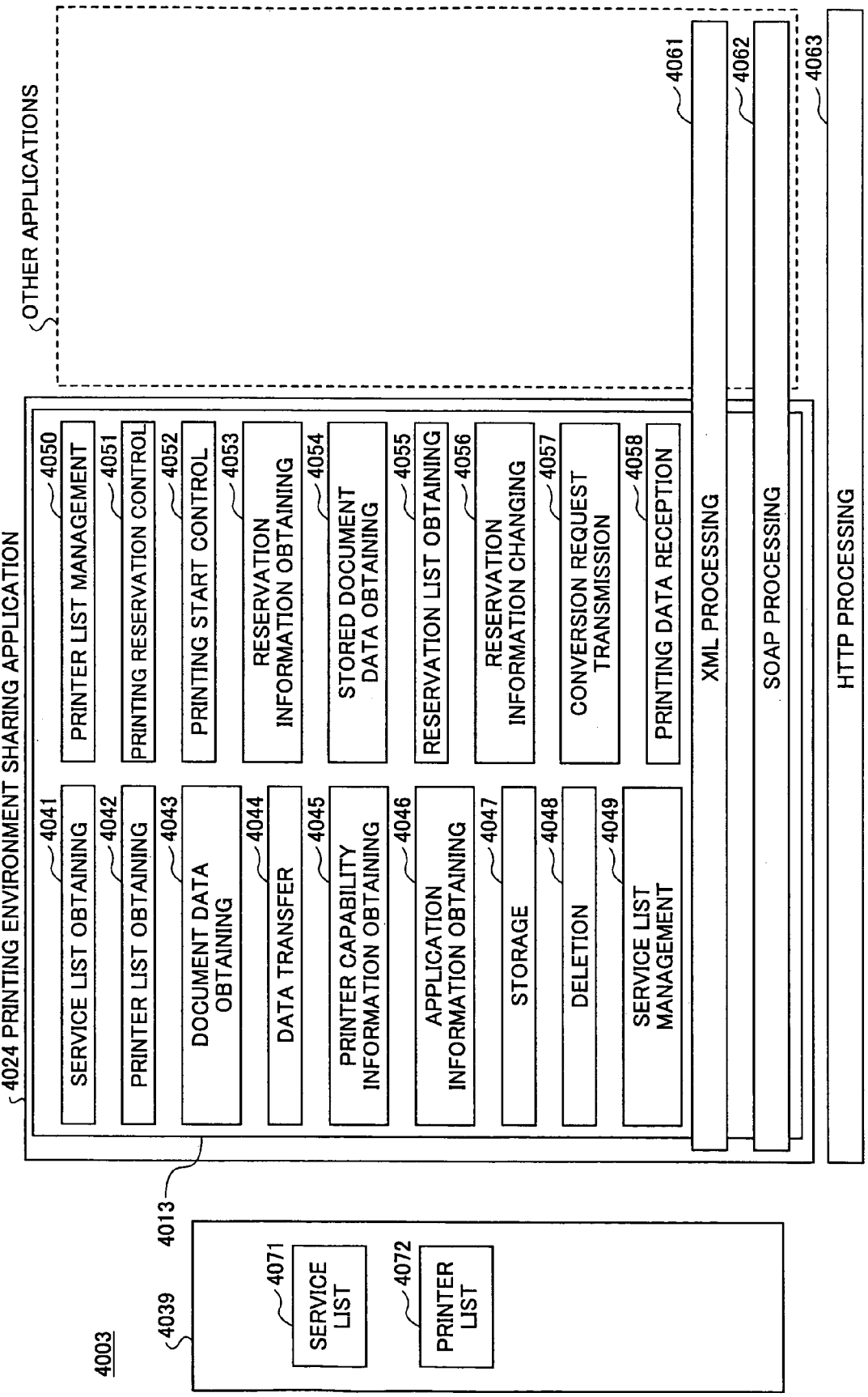
FIG. 76 is a block diagram showing a functional configuration of the SPS server according to the fifth embodiment of the present invention.

FIG. 76 is a block diagram showing a functional configuration of the SPS server 4003.

Referring to FIG. 76, the SPS server 4003 includes an HTTP processing part 4063 controlling communications in compliance with the HTTP protocol, the HDD 4039 storing the service list 4071 and the printer list 4072, and the printing environment sharing application 4024.

An XML (extensible Markup Language) processing part 4061 processing a message written in XML and a SOAP processing part 4062 exchanging messages in compliance with the SOAP protocol are shared by the printing environment sharing application 4024 and the applications other than the printing environment sharing application 4024.

The printing environment sharing service 4013 included in the printing environment sharing application 4024 includes a service list obtaining part 4041, a printer list obtaining part 4042, a document data obtaining part 4043, a data transfer part 4044, a printer capability information obtaining part 4045, an application information obtaining part 4046, a storage part 4047, a deletion part 4048, a service list management part 4049, a printer list management part 4050, a printing reservation control part 4051, and a printing start control part 4052, a reservation information obtaining part 4053, a stored document data obtaining part 4054, a reservation list obtaining part 4055, a reservation information changing part 4056, a conversion request transmission part 4057, and a printing data reception part 4058.

The service list obtaining part 4041 obtains the service list 4071. The service list obtaining part 4041 obtains the service list 4071 stored in another SPS server 4003 via the printing environment sharing service 4013 thereof. The service list obtaining part 4041 also obtains the service list 4071 stored in the SPS server 4003 including the printing environment sharing service 4013 in which the service list obtaining part 4041 is included.

The printer list obtaining part 4042 obtains the printer list 4072. The printer list obtaining part 4042 obtains the printer list 4072 stored in another SPS server 4003 or a print server 4004 via the printing environment sharing service 4013 included in the other SPS server 4003 or the document print service 4014 included in the print server 4004. The printer list obtaining part 4042 also obtains the printer list 4072 stored in the SPS server 4003 including the printing environment sharing service 4013 in which the printer list obtaining part 4042 is included.

The document data obtaining part 4043 obtains the document data of a specified document from the repository server 4002 via the repository service 4012 based on a request from the Web server 4001 shown in FIGS. 72 and 73.

The data transfer part 4044 transfers to another SPS server 4003 via the printing environment sharing service 4013 thereof reservation information including channel information to the printing environment sharing service 4013 of a printing location (for instance, the service identifier of the printing environment sharing service 4013), identification information identifying the printing location, identification information identifying the printer 4006 to be used for printing (for instance, a printer name and/or a printer identifier), and printing conditions, and/or the document data obtained in the document data obtaining part 4043.

The printer capability information obtaining part 4045 obtains the capability information of the printer 4006, such as the capability of color printing and duplex printing, through the printing environment sharing service 4013 of another SPS server 4003 and/or the document print service 4014 of a print server 4004. The printer capability information obtaining part 4045 also obtains the capability information of the printer 4006 from the SPS server 4003 including the printing environment sharing service 4013 in which the printer capability information obtaining part 4045 is included.

The application information obtaining part 4046 obtains application information required at the time of converting the document data obtained in the document data obtaining part 4043 into printing data, such as information as to whether an application such as Microsoft Word® is stored.

The storage part 4047 stores the reservation information and/or the document data in the HDD 39.

The deletion part 4048 deletes the reservation information and/or the document data stored by the storage part 4047 based on a request from another printing environment sharing service 4013 or reservation expiry information included in the reservation information. For instance, the reservation information includes the reservation expiry information indicating a time limit before which the reserved document data can be printed in addition to channel information to the printing environment sharing service 4013 of a printing location, identification information identifying the printing location, identification information identifying the printer 4006 to be used for printing, and printing conditions.

The service list management part 4049 manages the service list 4071. For instance, based on a request for connection from another printing environment sharing service 4013, the service list management part 4049 adds data on the other printing environment sharing service 4013 to the service list 4071 stored in the HDD 4039 of the SPS server 4003. Further, based on a request for disconnection from another printing environment sharing service 4013, the service list management part 4049 deletes data on the other printing environment sharing service 4013 from the service list 4071 stored in the HDD 4039 of the SPS server 4003.

The printer list management part 4050 manages the printer list 4072. For instance, the printer list management part 4050 adds data to or deletes data from the printer list 4072 stored in the HDD 4039 of the SPS server 4003 based on a request.

The printing reservation control part 4051 performs control with respect to the printing reservation request. For instance, the printing reservation control part 4051 receives a printing reservation request from the Web server 4001 connected to the SPS server 4003 via the Internet or a network, and requests the document data obtaining part 4043 to obtain document data. Further, the printing reservation control part 4051 requests the data transfer part 4044 to transmit the document data obtained by the document data obtaining part 4043 or reservation information included in the printing reservation request to another printing environment sharing service 4013. Furthermore, the printing reservation control part 4051 may request the storage part 4047 to store the reservation information and/or the document data.

The printing start control part 4052 performs control with respect to the printing start request. For instance, the printing start control part 4052 receives a printing start request from the Web server 4001 and/or another printing environment sharing service 4013 connected to the SPS server 4003 via the Internet or a network, and transmits the printing start request to another printing environment sharing service 4013 or a document print service 4014 based on channel information to the printing location.

The reservation information obtaining part 4053 obtains the reservation information of a printing reservation stored in the storage part 4047 of the printing environment sharing service 4013 in which the reservation information obtaining part 4053 is included or in the storage part 4047 of another printing environment sharing service 4013.

The stored document data obtaining part 4054 obtains document data stored in the storage part 4047 of the printing environment sharing service 4013 in which the stored document data obtaining part 4054 is included or in the storage part 4047 of another printing environment sharing service 4013.

The reservation list obtaining part 4055 obtains a list of the reservation information of printing reservations stored in the storage part 4047 of the printing environment sharing service 4013 in which the reservation list obtaining part 4055 is included or in the storage part 4047 of another printing environment sharing service 4013.

The reservation information changing part 4056 changes the reservation information stored in the storage part 4047.

The conversion request transmission part 4057 transmits a request to convert document data into printing data to the document print service 4014, the request including the document data.

The printing data reception part 4058 receives the printing data corresponding to the conversion request transmitted from the conversion request transmission part 4057 from the document print service 4014.

Next, a description is given, with reference to FIGS. 77A through FIG. 87B, of a printing reservation-to-printing start operation.

First, a description is given, with reference to FIGS. 77A through 77G and 78, of a printing location selecting operation.

Figure 78:
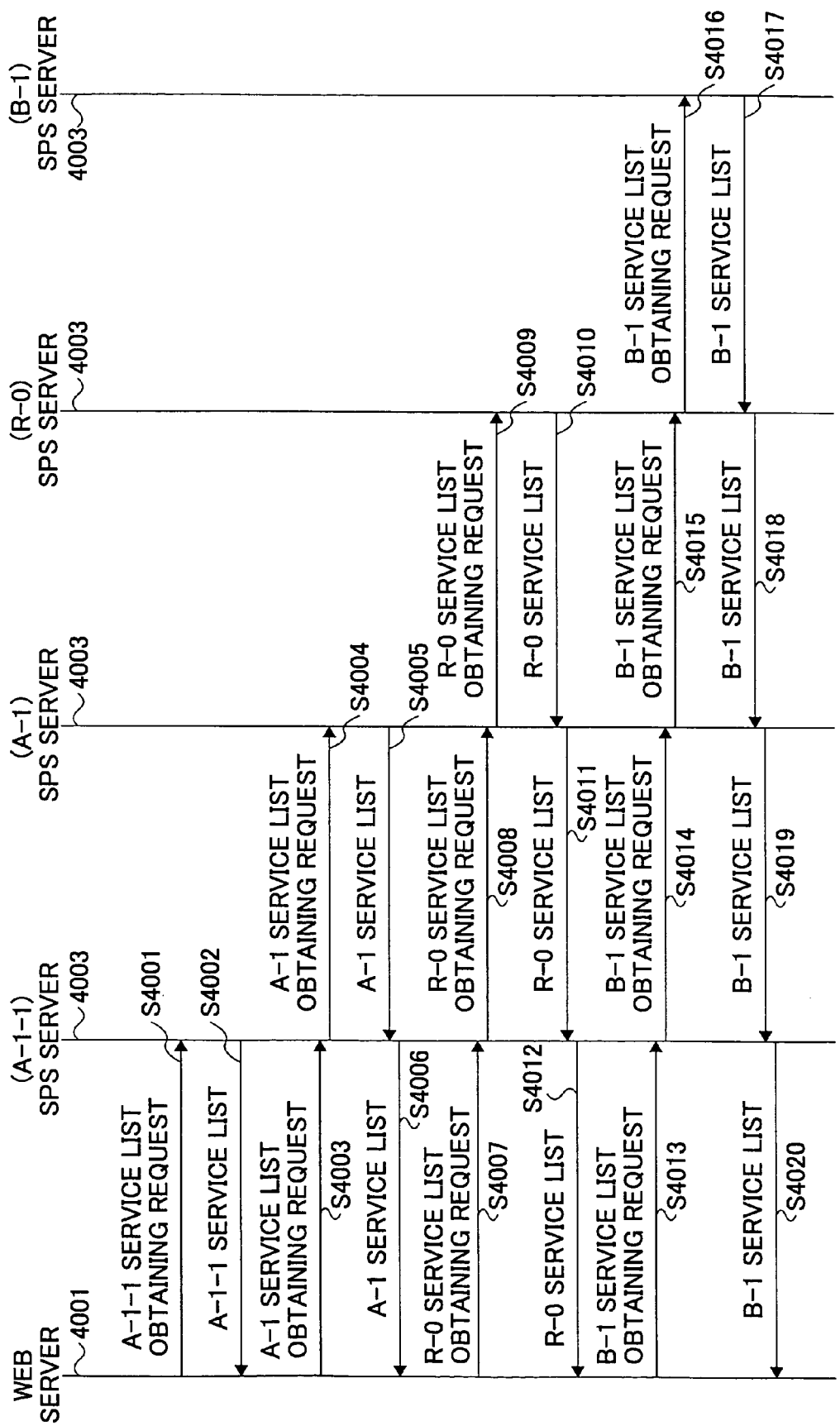
FIG. 78 is a sequence diagram for illustrating the printing location selecting operation according to the fifth embodiment of the present invention.

FIGS. 77A through 77G are diagrams and FIG. 78 is a sequence diagram for illustrating the printing location selecting operation.

For instance, in the case of the system configuration of FIG. 73, in step S4001 of FIG. 78, the Web server 4001, based on a user's request, transmits a request to obtain the service list 4071 of the printing environment sharing service 4013 (A-1-1) to the printing environment sharing service 4013 (A-1-1), the service list 4071 including information on the locations of other printing environment sharing services 4013 that can be referred to by the printing environment sharing service 4013 (A-1-1). At this point, the request to obtain the service list 4071 includes channel information to the printing environment sharing service 4013 (A-1-1).

Next, when the printing environment sharing service 4013 (A-1-1) receives the request to obtain the service list 4071 of the printing environment sharing service 4013 (A-1-1) from the Web server 4001, in step S4002, the service list obtaining part 4041 of the printing environment sharing service 4013 (A-1-1) obtains the service list 4071 stored in the HDD 4039 of the SPS server 4003 (A-1-1), and transmits the service list 4071 to the Web server 4001. At this point, the channel information to the printing environment sharing service 4013 (A-1-1) is also transmitted to the Web server 4001 together with the service list 4071.

The Web server 4001 creates a printing location selection screen as shown in FIG. 77A based on the received service list 4071 (FIG. 9) of the printing environment sharing service 4013 (A-1-1), and presents the printing location selection screen to the user.

On the printing location selection screen of FIG. 77A, other printing environment sharing services 13 that can be referred to by the printing environment sharing service 13 (A-1-1) are displayed.

For simplification of description, in FIGS. 77A through 77G, the printing environment sharing services 13 that can be referred to are shown simply as A-1-1-1, A-1-1-2, A-1, etc., which may be information identifying a printing location, such as a section name, an office name, or a place name. The same applies to the subsequent drawings.

For instance, when the user selects "A-1" and taps on a NEXT button 4170*a* on the printing location selection screen of FIG. 77A, in step S4003 of FIG. 78, the Web server 4001 transmits a request to obtain the service list 4071 of the printing environment sharing service 4013 (A-1) to the printing environment sharing service 4013 (A-1-1). When the user selects "A-1," the Web server 4001 recognizes from the obtained service list 4071 of the printing environment sharing service 4013 (A-1-1) that the printing environment sharing service 4013 (A-1) is superordinate to the printing environment sharing service 4013 (A-1-1). Then, the Web server 4001 obtains channel information from the printing environment sharing service 4013 (A-1-1) to the printing environment sharing service 4013 (A-1). Using the obtained information as channel information, the Web server 4001 adds the channel information from the printing environment sharing service 4013 (A-1-1) to the printing environment sharing service 4013 (A-1) to the channel information from the Web server 4001 to the printing environment sharing service 4013 (A-1-1), and includes the obtained channel information in the request to obtain the service list 4071 of the printing environment sharing service 4013 (A-1). Thereafter, the Web server 4001 and/or the printing environment sharing services 4013 obtain service lists 4071 in the same manner as described above so that the channel information to, for instance, a printing location selected by the user can be obtained.

The user selects a printing location and taps on a button on a screen displayed on the PDA 4007. The same applies in the following.

When the printing environment sharing service 4013 (A-1-1) receives the request, then in step S4004, the service list obtaining part 4041 of the printing environment sharing service 4013 (A-1-1) transmits the request to printing environment sharing service 4013 (A-1) based on the channel information.

When the printing environment sharing service 4013 (A-1) receives the request from the printing environment sharing service 4013 (A-1-1), in step S5, the service list obtaining part 4041 of the printing environment sharing service 4013 (A-1) obtains the service list 4071 stored in the HDD 4039 of the SPS server 4003 (A-1), and transmits the service list 4071 and the channel information to the printing environment sharing service 4013 (A-1-1) based on the channel information.

Then, in step S4006, the service list obtaining part 4041 of the printing environment sharing service 4013 (A-1-1) transmits the received service list 4071 of the printing environment sharing service 4013 (A-1) and channel information to the Web server 4001.

Thus, every time the user selects a printing location, channel information is added, and the channel information is included in a request to obtain the service list 4071 to be transmitted to the printing environment sharing service 4013. As a result, the printing environment sharing service 4013 can transmits the request to another printing environment sharing service 4013 based on the channel information. Further, the printing environment sharing service 4013 can transfer the obtained service list 4071 to another printing environment sharing service 4013 that has requested the service list 4071 based on the channel information. In the following, although not described for simplification of description, a request to obtain the service list 4071 and a response to the request include channel information, and the service list 4071 is obtained based on the channel information.

The Web server 4001 creates a printing location selection screen as shown in FIG. 77B based on the received service list 4071 of the printing environment sharing service 4013 (A-1), and presents the printing location selection screen to the user.

On the printing location selection screen of FIG. 77B, the printing environment sharing services 4013 that can be referred to by the printing environment sharing service 4013 (A-1) are displayed.

For instance, when the user selects "R-0" and taps on a NEXT button 4171*a* on the printing location selection screen of FIG. 77B, in step S4007 of FIG. 78, the Web server 4001 transmits a request to obtain the service list 4071 of the printing environment sharing service 4013 (R-0) to the printing environment sharing service 4013 (A-1-1).

When the printing environment sharing service 4013 (A-1-1) receives the request, in step S4008, the service list obtaining part 4041 of the printing environment sharing service 4013 (A-1-1) transmits the request to the printing environment sharing service 4013 (A-1).

When the printing environment sharing service 4013 (A-1) receives the request, in step S4009, the service list obtaining part 4041 of the printing environment sharing service 4013 (A-1) transmits the request to the printing environment sharing service 4013 (R-0).

When the printing environment sharing service 4013 (R-0) receives the request, in step S4010, the service list obtaining part 4041 of the printing environment sharing service 4013 (R-0) obtains the service list 4071 stored in the SPS server 4003 (R-0), and transmits the service list 4071 to the printing environment sharing service 4013 (A-1).

In step S4011, the service list obtaining part 4041 of the printing environment sharing service 4013 (A-1) transmits the received service list 4071 of the printing environment sharing service 4013 (R-0) to the printing environment sharing service 4013 (A-1-1).

In step S4012, the service list obtaining part 4041 of the printing environment sharing service 4013 (A-1-1) transmits the received service list 4071 of the printing environment sharing service 4013 (R-0) to the Web server 4001.

The Web server 4001 creates a printing location selection screen as shown in FIG. 77C based on the received service list 4071 of the printing environment sharing service 4013 (R-0), and presents the printing location selection screen to the user.

On the printing location selection screen of FIG. 77C, the printing environment sharing services 4013 that can be referred to by the printing environment sharing service 4013 (R-0) are displayed.

For instance, when the user selects "B-1" and taps on a NEXT button 4172*a* on the printing location selection screen of FIG. 77C, in step S4013 of FIG. 78, the Web server 4001 transmits a request to obtain the service list 4071 of the printing environment sharing service 4013 (B-1) to the printing environment sharing service 4013 (A-1-1).

When the printing environment sharing service 4013 (A-1-1) receives the request, in step S4014, the service list obtaining part 4041 of the printing environment sharing service 4013 (A-1-1) transmits the request to the printing environment sharing service 4013 (A-1).

When the printing environment sharing service 4013 (A-1) receives the request, in step S4015, the service list obtaining part 4041 of the printing environment sharing service 4013 (A-1) transmits the request to the printing environment sharing service 4013 (R-0).

When the printing environment sharing service 4013 (R-0) receives the request, in step S4016, the service list obtaining part 4041 of the printing environment sharing service 4013 (R-0) transmits the request to the printing environment sharing service 4013 (B-1).

When the printing environment sharing service 4013 (B-1) receives the request, in step S4017, the service list obtaining part 4041 of the printing environment sharing service 4013

(B-1) obtains the service list 4071 stored in the SPS server 4003 (B-1), and transmits the service list 4071 to the printing environment sharing service 4013 (R-0).

In step S4018, the service list obtaining part 4041 of the printing environment sharing service 4013 (R-0) transmits the received service list 4071 of the printing environment sharing service 4013 (B-1) to the printing environment sharing service 4013 (A-1).

In step S4019, the service list obtaining part 4041 of the printing environment sharing service 4013 (A-1) transmits the received service list 4071 of the printing environment sharing service 4013 (B-1) to the printing environment sharing service 4013 (A-1-1).

In step S4020, the service list obtaining part 4041 of the printing environment sharing service 4013 (A-1-1) transmits the received service list 4071 of the printing environment sharing service 4013 (B-1) to the Web server 4001.

The Web server 4001 creates a printing location selection screen as shown in FIG. 77D based on the received service list 4071 of the printing environment sharing service 4013 (B-1), and presents the printing location selection screen to the user.

On the printing location selection screen of FIG. 77D, the printing environment sharing services 4013 that can be referred to by the printing environment sharing service 4013 (B-1) are displayed.

For instance, when the user selects "B-1-2" and taps on an OK button 4173a on the printing location selection screen of FIG. 77D, the Web server 4001 creates a printing location selection confirmation screen as shown in FIG. 77E, and presents the printing location selection confirmation screen to the user.

For instance, when the user taps on a DISPLAY SELECTION RESULT button 4174a on the printing location selection confirmation screen of FIG. 77E, the Web server 4001 creates a printing location selection result display screen as shown in FIG. 77F based on the channel information added every time the user has selected the printing location and tapped the OK button, and presents the printing location selection result display screen to the user.

By performing the operations shown in FIGS. 77A through 77F and/or FIG. 78, the Web server 4001 and/or the printing environment sharing service 4013 (A-1-1) can obtain the channel information from the printing environment sharing service 4013 (A-1-1) to the printing environment sharing service 4013 (B-1-2) which is the printing location selected by the user, as (A-1-1)→(A-1)→(R-0)→(B-1)→(B-1-2).

For instance, when the user taps on a RESERVE PRINTING button 4174b on the printing location selection confirmation screen of FIG. 77E, the Web server 4001 creates a printing reservation confirmation screen as shown in FIG. 77G, and presents the printing reservation confirmation screen to the user.

The user can make a printing reservation by setting, for instance, only a printing location without setting a printer 4006 and/or printing conditions and tapping on a RESERVE button 4175a on the printing reservation confirmation screen of FIG. 77G. In this case, for instance, after making the printing reservation, the user goes to the actual printing location, and checks the state of use and the performance of nearby printers 4006. Then, the user sets a printer 4006 and printing conditions as described below, and performs printing.

Although not graphically represented, the user may make a printing reservation by specifying only a document to be printed without specifying a printing location. In this case, for instance, the user sets a printing location, a printer 4006, and printing conditions after the venue for a meeting is determined, and performs printing.

Figure 79:
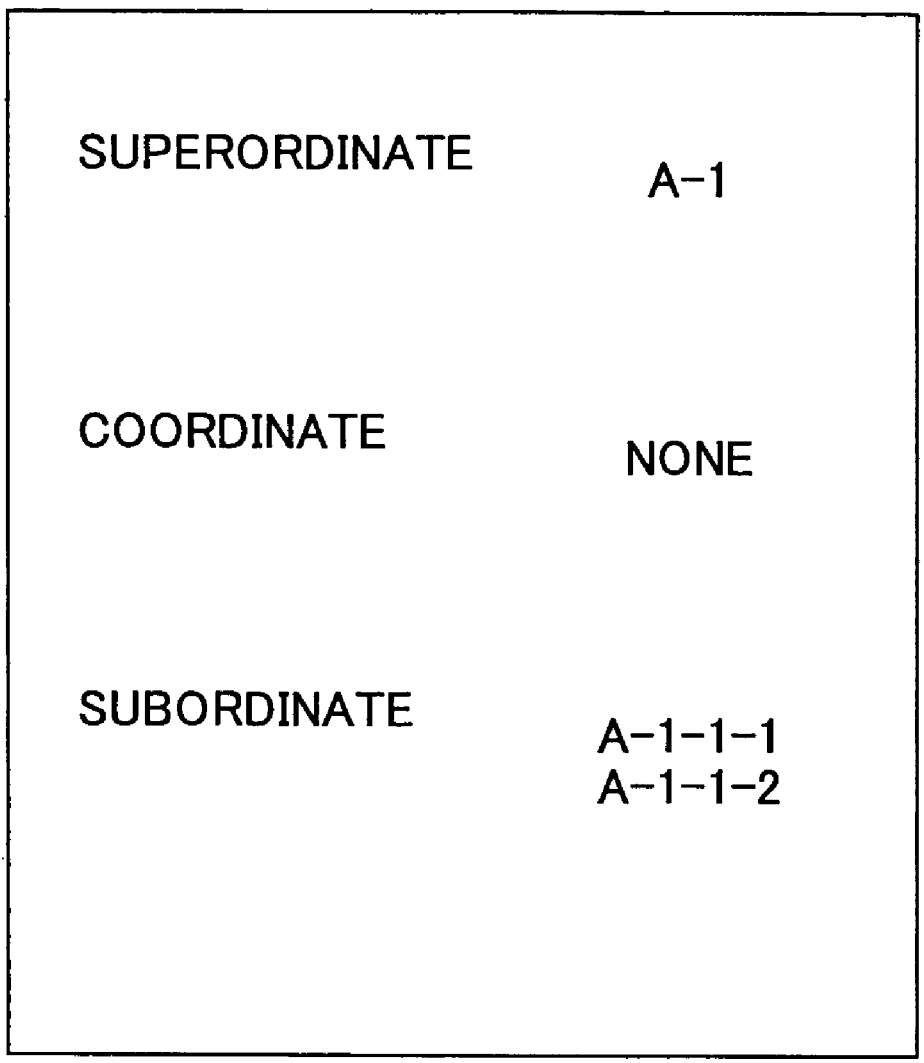
FIG. 79 is a diagram showing a configuration of a service list according to the fifth embodiment of the present invention.

Next, a description is given, with reference to FIG. 79, of the service list 4071.

FIG. 79 is a diagram showing a configuration of the service list 4071.

Each service list 4071 includes identification information identifying another printing environment sharing service 4013 that can be referred to by the corresponding printing environment sharing service 4013.

For instance, the service list 4071 of FIG. 79 includes identification information identifying the superordinate printing environment sharing service 4013 (A-1) and the subordinate printing environment sharing services 4013 (A-1-1 and A-1-1-2) that can be referred to by the printing environment sharing service 4013 (A-1-1) included in the SPS server 4003 (A-1-1) in which the service list 4071 of FIG. 79 is stored.

For simplification of description, in FIG. 79, the identification information identifying the printing environment sharing services 4013, which may be, for instance, section names or office names, are shown as A-1, A-1-1-1, etc.

Although not graphically represented in FIG. 79, in addition to the identification information identifying other printing environment sharing services 4013 that can be referred to by the printing environment sharing service 4013 included in the SPS server 4003 in which the service list 4071 is stored, the service list 4071 includes the name, latitude, longitude, altitude, and address of the location of each of the other printing environment sharing services 4013.

If the corresponding printing environment sharing service 4013 has no superordinate, coordinate, or subordinate printing environment sharing service 4013, NONE is written to the service list 4071 correspondingly. In the case of FIG. 79, no coordinate printing environment sharing service 4013 exists.

Next, a description is given, with reference to FIGS. 80 through 83C, of selection of the printer 4006. The printer list 4072 of each section is introduced to this system to restrict printers available to a person of another section. The printer list 4072 may be omitted if all the printers 6 of the section are available to a person of another section. In the following description, it is assumed that the printer lists 4072 exist.

Figure 80:
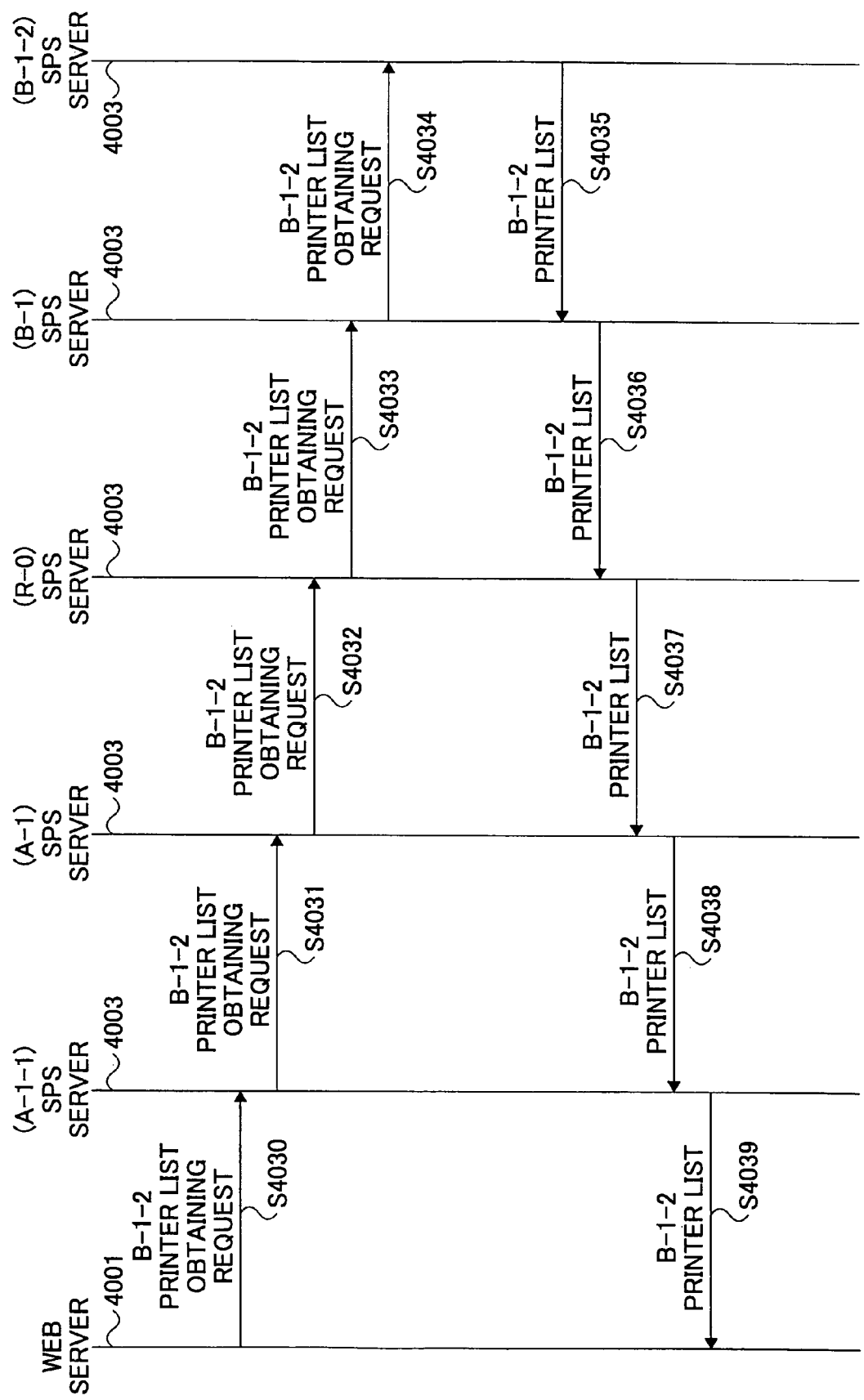
FIG. 80 is a sequence diagram for illustrating a first printer list obtaining operation according to the fifth embodiment of the present invention.

First, a description is given, with reference to FIG. 80, of the operation of obtaining the printer list 4072 when each SPS server 4003 stores the printer list 4072 (a first printer list obtaining operation).

FIG. 80 is a sequence diagram for illustrating the first printer list obtaining operation.

For instance, when the user taps on a SELECT PRINTER button 4174c on the printing location selection confirmation screen of FIG. 77E after the selection of the printing location (for instance, the printing environment sharing service 13 [B-1-2]) is completed as described with reference to FIGS. 77A through 77E, in step S4030, the Web server 4001 transmits a request to obtain the printer list 4072 of the printing environment sharing service 4013 (B-1-2) to the printing environment sharing service 4013 (A-1-1) in the system configuration of FIG. 73.

The Web server 4001 has obtained the channel information to the printing environment sharing service 4013 of the printing location (for instance, [A-1-1]→[A-1]→[R-0]→[B-1]→[B-1-2]) in the search of the printing location. Accordingly, the Web server 4001 can include the channel information in the request to obtain the printer list 4072 at the time of transmitting the request.

When the printing environment sharing service 4013 (A-1-1) receives the request to obtain the printer list 4072 of the printing environment sharing service 4013 (B-1-2), in step S4031, the printer list obtaining part 4042 of the printing environment sharing service 4013 (A-1-1) transmits the request to the printing environment sharing service 4013 (A-1) based on the channel information.

When the printing environment sharing service 4013 (A-1) receives the request, in step S4032, the printer list obtaining part 4042 of the printing environment sharing service 4013 (A-1) transmits the request to the printing environment sharing service 4013 (R-0) based on the channel information.

When the printing environment sharing service 4013 (R-0) receives the request, in step S4033, the printer list obtaining part 4042 of the printing environment sharing service 4013 (R-0) transmits the request to the printing environment sharing service 4013 (B-1) based on the channel information.

When the printing environment sharing service 4013 (B-1) receives the request, in step S4034, the printer list obtaining part 4042 of the printing environment sharing service 4013 (B-1) transmits the request to the printing environment sharing service 4013 (B-1-2) based on the channel information.

When the printing environment sharing service 4013 (B-1-2) receives the request, in step S4035, the printer list obtaining part 4042 of the printing environment sharing service 4013 (B-1-2) obtains the printer list 4072 stored in the SPS server 4003 (B-1-2), and transmits the obtained printer list 4072 to the printing environment sharing service 4013 (B-1) based on the channel information.

In step S4036, the printer list obtaining part 4042 of the printing environment sharing service 4013 (B-1) transmits the received printer list 4072 of the printing environment sharing service 4013 (B-1-2) to the printing environment sharing service 4013 (R-0) based on the channel information.

In step S4037, the printer list obtaining part 4042 of the printing environment sharing service 4013 (R-0) transmits the received printer list 4072 of the printing environment sharing service 4013 (B-1-2) to the printing environment sharing service 4013 (A-1) based on the channel information.

In step S4038, the printer list obtaining part 4042 of the printing environment sharing service 4013 (A-1) transmits the received printer list 4072 of the printing environment sharing service 4013 (B-1-2) to the printing environment sharing service 4013 (A-1-1) based on the channel information.

In step S4039, the printer list obtaining part 4042 of the printing environment sharing service 4013 (A-1-1) transmits the received printer list 4072 of the printing environment sharing service 4013 (B-1-2) to the Web server 4001.

Then, the Web server 4001 creates a below-described printer selection screen as shown in FIG. 83A based on the received printer list 4072 of the printing environment sharing service 4013 (B-1-2), and presents the printer selection screen to the user.

Figure 81:
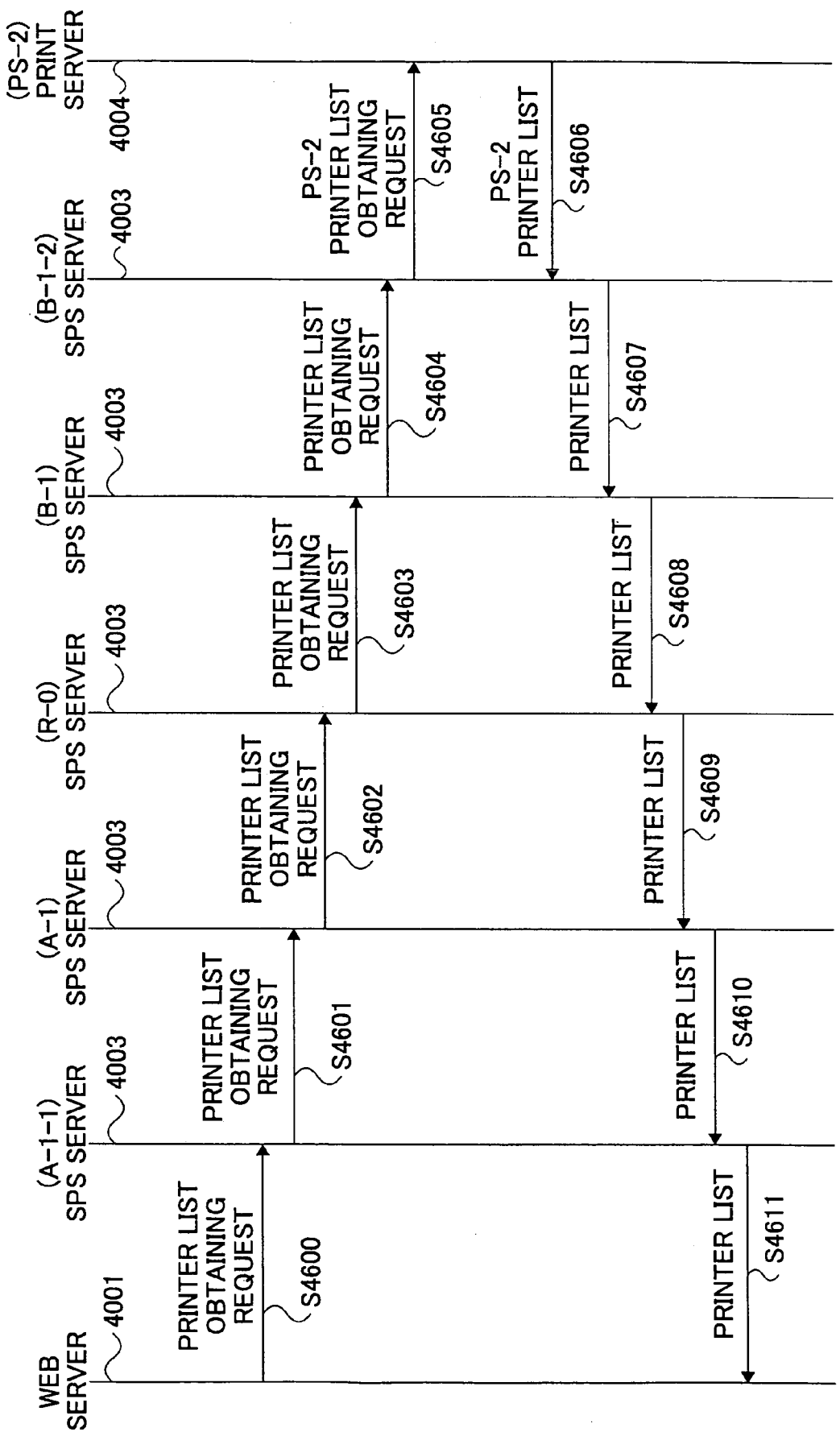
FIG. 81 is a sequence diagram for illustrating a second printer list obtaining operation according to the fifth embodiment of the present invention.

Next, a description is given, with reference to FIG. 81, of the operation of obtaining the printer list 4072 when the each print server 4004 stores the printer list 4072 (a second printer list obtaining operation).

FIG. 81 is a sequence diagram for illustrating the second printer list obtaining operation.

For instance, when the user taps on the SELECT PRINTER button 4174c on the printing location selection confirmation screen of FIG. 77E after the search of the printing location (for instance, the printing environment sharing service 13 [B-1-2]) is completed as described with reference to FIGS. 77A through 77E, in step S4600, the Web server 4001 transmits a request to obtain the printer list 4072 of a document print service 4014 that can be referred to by the printing environment sharing service 4013 (B-1-2) to the printing environment sharing service 4013 (A-1-1) in the system configuration of FIG. 73.

When the printing environment sharing service 4013 (A-1-1) receives the request to obtain the printer list 4072 of the document print service 4014 that can be referred to by the printing environment sharing service 4013 (B-1-2), in step S4601, the printer list obtaining part 4042 of the printing environment sharing service 4013 (A-1-1) transmits the request to the printing environment sharing service 4013 (A-1) based on the channel information.

When the printing environment sharing service 4013 (A-1) receives the request, in step S4602, the printer list obtaining part 4042 of the printing environment sharing service 4013 (A-1) transmits the request to the printing environment sharing service 4013 (R-0) based on the channel information.

When the printing environment sharing service 4013 (R-0) receives the request, in step S4603, the printer list obtaining part 4042 of the printing environment sharing service 4013 (R-0) transmits the request to the printing environment sharing service 4013 (B-1) based on the channel information.

When the printing environment sharing service 4013 (B-1) receives the request, in step S4604, the printer list obtaining part 4042 of the printing environment sharing service 4013 (B-1) transmits the request to the printing environment sharing service 4013 (B-1-2) based on the channel information.

When the printing environment sharing service 4013 (B-1-2) receives the request to obtain the printer list 4072 of the document print service 4014 that can be referred to by the printing environment sharing service 4013 (B-1-2), in step S4605, the printer list obtaining part 4042 of the printing environment sharing service 4013 (B-1-2) transmits a request to obtain the printer list 4072 of the document print service 4014 (PS-2) to the document print service 4014 (PS-2).

Receiving the request, in step S4606, the document print service 4014 (PS-2) obtains the printer list 4072 stored in, for instance, the print server 4004 (PS-2), and transmits the obtained printer list 4072 to the printing environment sharing service 4013 (B-1-2).

In step S4607, the printer list obtaining part 4042 of the printing environment sharing service 4013 (B-1-2) transmits the received printer list 4072 of the document print service 4014 (PS-2) to the printing environment sharing service 4013 (B-1) based on the channel information.

In step S4608, the printer list obtaining part 4042 of the printing environment sharing service 4013 (B-1) transmits the received printer list 4072 of the document print service 4014 (PS-2) to the printing environment sharing service 4013 (R-0) based on the channel information.

In step S4609, the printer list obtaining part 4042 of the printing environment sharing service 4013 (R-0) transmits the received printer list 4072 of the document print service 4014 (PS-2) to the printing environment sharing service 4013 (A-1) based on the channel information.

In step S4610, the printer list obtaining part 4042 of the printing environment sharing service 4013 (A-1) transmits the received printer list 4072 of the document print service 4014 (PS-2) to the printing environment sharing service 4013 (A-1-1) based on the channel information.

In step S4611, the printer list obtaining part 4042 of the printing environment sharing service 4013 (A-1-1) transmits the received printer list 4072 of the document print service 4014 (PS-2) to the Web server 4001.

Then, the Web server 4001 creates a below-described printer selection screen as shown in FIG. 83A based on the received printer list 4072 of the document print service 4014

(PS-2) that can be referred to by the printing environment sharing service 4013 (B-1-2), and presents the printer selection screen to the user.

In the following description, it is assumed for simplification that each SPS server 4003 including the printing environment sharing service 4013 stores the printer list 4072.

FIG. 82 is a diagram for illustrating a configuration of the printer list 4072.

The printer list 4072 includes the service identifier of a document print service 4014 that can be referred to by the corresponding printing environment sharing service 4013, the printer identifier (for instance, printer ID) of a printer 4006 managed by the document print service 4014, and the name of the printer 4006 (printer name).

For instance, the printer list 4072 shown in FIG. 82 includes the service identifier of the document print service 4014 (PS-2) that can be referred to the printing environment sharing service 4013 included in the SPS server 4003 (B-1-2) storing the printer list 4072, the printer identifiers of the printers 4006 (P-2-1 and P-2-2) managed by the document print service 4014 (PS-2), and the names of the printers 4006 (P-2-1 and P-2-2).

In FIG. 82, however, PS-2, which identifies the document print service 4014 (PS-2), is included instead of its service identifier for simplification of description.

FIGS. 83A through 83C are diagrams for illustrating a printer selecting operation.

As described above, when the user taps on the SELECT PRINTER button 4174*c* on the printing location selection confirmation screen of FIG. 77E, the Web server 4001 makes a request to obtain the printer list 4072 of the printing environment sharing service selected as a printing location, and obtains the printer list 4072.

The Web server 4001 creates a printer selection screen as shown in FIG. 83A based on the obtained printer list 4072, and presents the printer selection screen to the user.

For instance, when the user selects "P-2-2" and taps on an OK button 4200*a* on the printer selection screen of FIG. 83A, the Web server 4001 creates a printer selection confirmation screen as shown in FIG. 83B, and presents the printer selection confirmation screen to the user.

For instance, when the user taps on a RESERVE PRINTING button 4201*a* on the printer selection confirmation screen of FIG. 83B, the Web server 4001 creates a printing reservation confirmation screen as shown in FIG. 83C, and presents the printing reservation confirmation screen to the user.

In contrast to the printing reservation confirmation screen of FIG. 77G, a printer 4006 is set on the printing reservation confirmation screen of FIG. 83C.

For instance, the user may reserve printing by selecting and setting a document to be printed, a printing location, and a printer 4006 without setting printing conditions and tapping on a RESERVE button 4202*a* on the printing reservation confirmation screen of FIG. 83C.

As shown in FIGS. 80 through 83C, for instance, the user can select a printer 4006 and make a printing reservation by the Web server 4001 and/or the printing environment sharing service 4013 (A-1-1) obtaining the printer list 4072.

Figure 84:
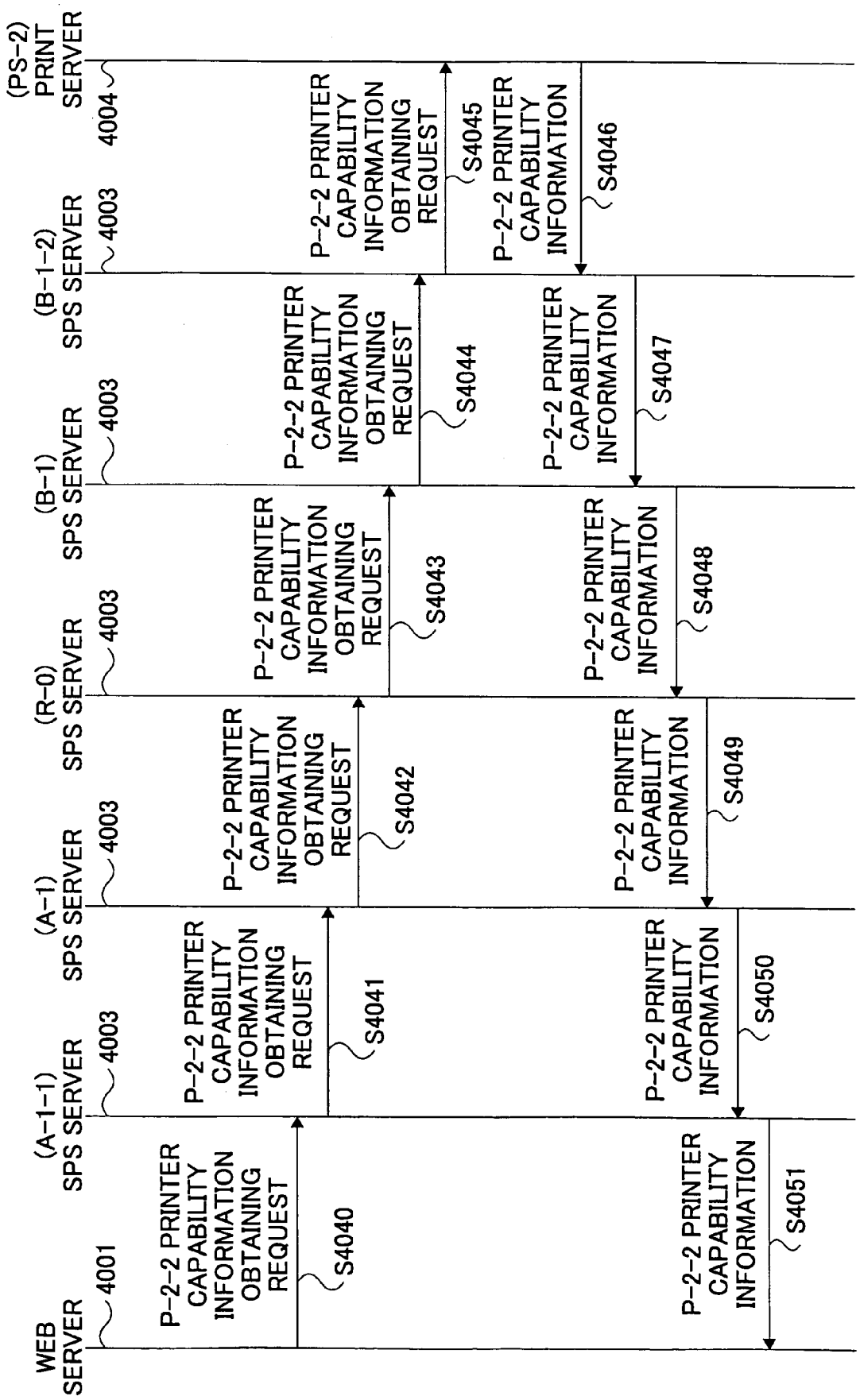
FIG. 84 is a sequence diagram for illustrating a printer capability information obtaining operation according to the fifth embodiment of the present invention.

Next, a description is given, with reference to FIG. 84, of a printer capability information obtaining operation.

FIG. 84 is a sequence diagram for illustrating the printer capability information obtaining operation.

For instance, as shown in FIGS. 83A and 83B, when the user has selected a printer 4006 and taps on a SET PRINTING CONDITIONS button 4201*b* on the printer selection confirmation screen of FIG. 83B, in step S4040 of FIG. 84, the Web server 4001 transmits a request to obtain the capability information of the printer 4006 (P-2-2) to the printing environment sharing service 4013 (A-1-1) in the system configuration of FIG. 73.

When the printing environment sharing service 4013 (A-1-1) receives the request to obtain the capability information of the printer 4006 (P-2-2), in step S4041, the printer capability information obtaining part 4045 of the printing environment sharing service 4013 (A-1-1) transmits the request to the printing environment sharing service 4013 (A-1) based on the channel information.

When the printing environment sharing service 4013 (A-1) receives the request, in step S4042, the printer capability information obtaining part 4045 of the printing environment sharing service 4013 (A-1) transmits the request to the printing environment sharing service 4013 (R-0) based on the channel information.

When the printing environment sharing service 4013 (R-0) receives the request, in step S4043, the printer capability information obtaining part 4045 of the printing environment sharing service 4013 (R-0) transmits the request to the printing environment sharing service 4013 (B-1) based on the channel information.

When the printing environment sharing service 4013 (B-1) receives the request, in step S4044, the printer capability information obtaining part 4045 of the printing environment sharing service 4013 (B-1) transmits the request to the printing environment sharing service 4013 (B-1-2) based on the channel information.

When the printing environment sharing service 4013 (B-1-2) receives the request, in step S4045, the printer capability information obtaining part 4045 of the printing environment sharing service 4013 (B-1-2) transmits the request to the document print service 4014 (PS-2) since it is understood from the printer list 4072 that the printer 4006 (P-2-2) selected by the user is managed by the document print service 4014 (PS-2).

Receiving the request, in step S4046, the document print service 4014 (PS-2) obtains the capability information of the printer 4006 (P-2-2) stored in, for instance, the print server 4004 (PS-2), and transmits the obtained capability information to the printing environment sharing service 4013 (B-1-2).

The capability information of each printer 4006 may be stored in the corresponding print server 4004. Alternatively, the capability information of the printers 4006 may be collectively stored in another server printer by printer. In the following description, it is assumed for simplification of description that the capability information of each printer 4006 is stored in the corresponding print server 4004.

In step S4047, the printer capability information obtaining part 4045 of the printing environment sharing service 4013 (B-1-2) transmits the received capability information of the printer 4006 (P-2-2) to the printing environment sharing service 4013 (B-1) based on the channel information.

In step S4048, the printer capability information obtaining part 4045 of the printing environment sharing service 4013 (B-1) transmits the received capability information of the printer 4006 (P-2-2) to the printing environment sharing service 4013 (R-0) based on the channel information.

In step S4049, the printer capability information obtaining part 4045 of the printing environment sharing service 4013 (R-0) transmits the received capability information of the printer 4006 (P-2-2) to the printing environment sharing service 4013 (A-1) based on the channel information.

In step S4050, the printer capability information obtaining part 4045 of the printing environment sharing service 4013 (A-1) transmits the received capability information of the printer 4006 (P-2-2) to the printing environment sharing service 4013 (A-1-1) based on the channel information.

In step S4051, the printer capability information obtaining part 4045 of the printing environment sharing service 4013 (A-1-1) transmits the received capability information of the printer 4006 (P-2-2) to the Web server 4001.

Then, the Web server 4001 creates a below-described printing condition setting screen as shown in FIG. 85A based on the received capability information of the printer 4006 (P-2-2), and presents the printing condition setting screen to the user.

FIGS. 85A and 85B are diagrams for illustrating a printing condition setting operation.

As described above, for instance, when the user taps on the SET PRINTING CONDITIONS button 4201b on the printer selection confirmation screen of FIG. 83B, the Web server 4001 makes a request to obtain the capability information of the selected printer 4006, and obtains the capability information of the selected printer 4006.

The Web server 4001 creates a printing condition setting screen as shown in FIG. 85A based on the obtained capability information of the printer 4006, and presents the printing condition setting screen to the user.

When the user taps on a RESERVE PRINTING button 4210a on the printing condition setting screen of FIG. 85A, the Web server 4001 creates a printing reservation confirmation screen as shown in FIG. 85B, and presents the printing reservation confirmation screen to the user.

In contrast to the printing reservation confirmation screen of FIG. 83C, printing conditions are set in the printing reservation confirmation screen of FIG. 85B.

The user may make a printing reservation by setting, for instance, a document to be printed, a printing location, a printer, and printing conditions and tapping on a RESERVE button 4211a on the printing reservation confirmation screen of FIG. 85B.

As described with reference to FIGS. 84, 85A, and 85B, for instance, the user may set printing conditions after a printing location and a printer and reserve printing by the Web server 4001 and/or the printing environment sharing service 4013 (A-1-1) obtaining printer capability information.

Figure 86:
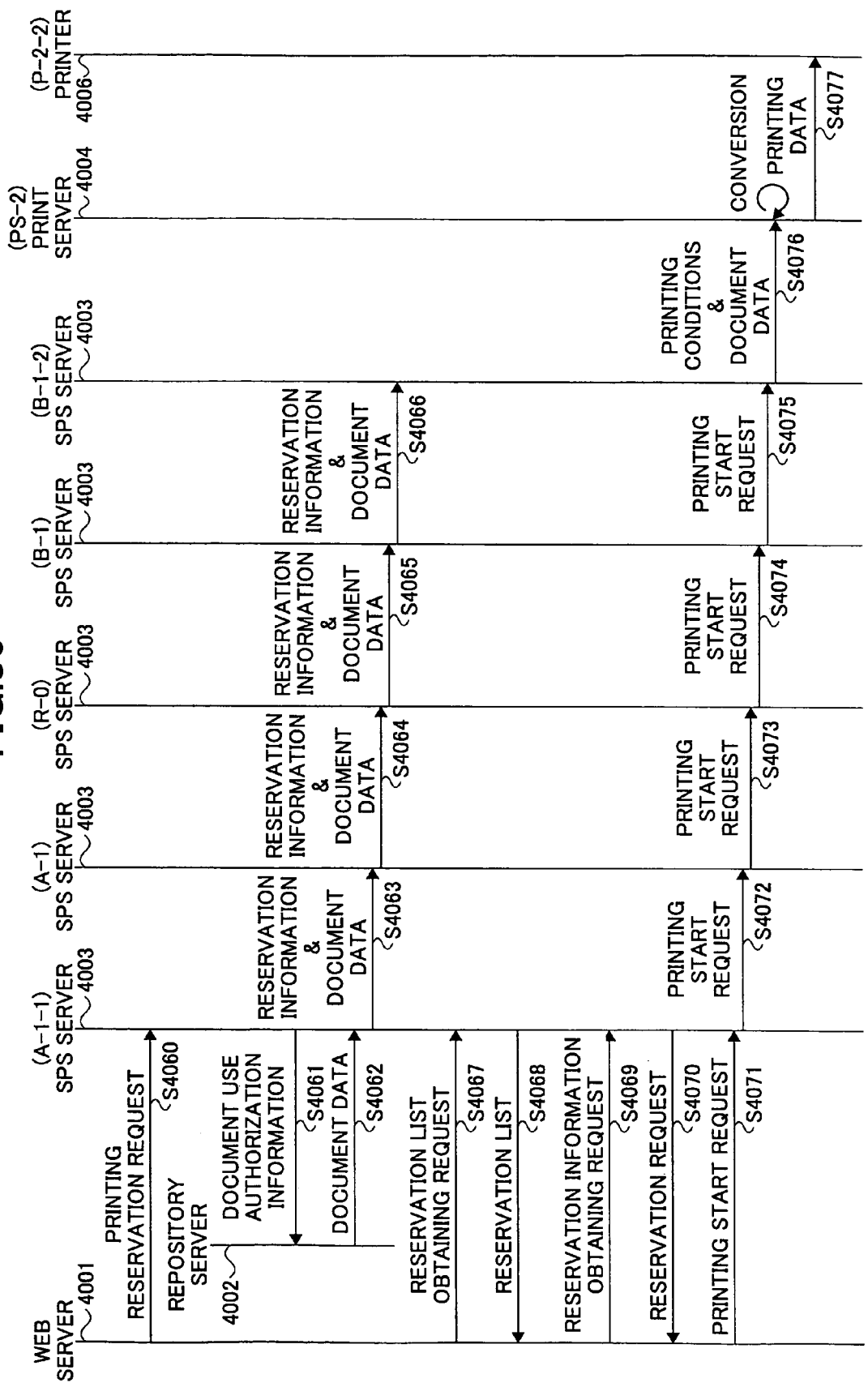
FIG. 86 is a sequence diagram for illustrating the operation of requesting a printing reservation and a printing start according to the fifth embodiment of the present invention.

Next, a description is given, with reference to FIGS. 86, 87A, and 87B, of the operation of requesting a printing reservation and a printing start.

FIG. 86 is a sequence diagram for illustrating the operation of requesting a printing reservation and a printing start. FIGS. 87A and 87B are diagrams for illustrating the start of printing.

For instance, when the user taps on the RESERVE button 4211a on the printing reservation confirmation screen of FIG. 85B, in step S4060 of FIG. 86, the Web server 4001 transmits a printing reservation request to the printing environment sharing service 4013 (A-1-1) in the system configuration of FIG. 73.

When the printing environment sharing service 4013 (A-1-1) receives the printing reservation request, the printing reservation control part 4051 of the printing environment sharing service 4013 (A-1-1) provides a document ID and document use authorization information included in the printing reservation request to the document data obtaining part 4043, and makes a request to obtain document data (a document data obtaining request).

In step S4061, the document data obtaining part 4043 of the printing environment sharing service 4013 (A-1-1) transmits the document data obtaining request including the document identifier and the document use authorization information to the repository service 4012.

Receiving the document data obtaining request, in step S4062, the repository service 4012 determines the validity of the document use authorization information included in the document data obtaining request, and when the repository service 4012 determines that the document use authorization information is valid, the repository service 4012 obtains the document data corresponding to the document ID from the repository server 4002, and transmits the obtained document data to the printing environment sharing service 4013 (A-1-1).

When the document data obtaining part 4043 of the printing environment sharing service 4013 (A-1-1) receives the document data, the printing reservation control part 4051 requests the storage part 4047 to store reservation information (for instance, identification information identifying a printing location, identification information identifying a printer 4006, printing conditions, and channel information to the printing location) included in the printing reservation request received from the Web server 4001 and the obtained document data.

Then, the storage part 4047 of the printing environment sharing service 4013 (A-1-1) stores the reservation information and the document data in the HDD 4039 of the SPS server 4003 (A-1-1).

Further, the printing reservation control part 4051 of the printing environment sharing service 4013 (A-1-1) requests the data transfer part 4044 to transfer the reservation information and the obtained document data.

Then, in step S4063, the data transfer part 4044 of the printing environment sharing service 4013 (A-1-1) transfers the reservation information and the document data to the printing environment sharing service 4013 (A-1) based on the channel information to the printing location included in the reservation information.

When the printing environment sharing service 4013 (A-1) receives the reservation information and the document data, in step S4064, the data transfer part 4044 of the printing environment sharing service 4013 (A-1) transfers the reservation information and the document data to the printing environment sharing service 4013 (R-0) based on the channel information to the printing location included in the reservation information.

When the printing environment sharing service 4013 (R-0) receives the reservation information and the document data, in step S4065, the data transfer part 4044 of the printing environment sharing service 4013 (R-0) transfers the reservation information and the document data to the printing environment sharing service 4013 (B-1) based on the channel information to the printing location included in the reservation information.

When the printing environment sharing service 4013 (B-1) receives the reservation information and the document data, in step S4066, the data transfer part 4044 of the printing environment sharing service 4013 (B-1) transfers the reservation information and the document data to the printing environment sharing service 4013 (B-1-2) based on the channel information to the printing location included in the reservation information.

Receiving the reservation information and the document data, the data transfer part 4044 of the printing environment sharing service 4013 (B-1-2) notifies the printing reservation control part 4051 of the printing environment sharing service 4013 (B-1-2) of the obtaining of the reservation information and the document data. Then, the printing reservation control part 4051 provides the reservation information and the document data obtained by the data transfer part 44 to the storage part 4047 of the printing environment sharing service 4013

(B-1-2), and requests the storage part 4047 to store the reservation information and the document data. Receiving the request, the storage part 4047 stores the reservation information and the document data in the HDD 4039 of the SPS server 4003 (B-1-2).

On the other hand, in step S4067, the Web server 4001 transmits a request to obtain a reservation list that can be referred to by the user to the printing environment sharing service 4013 (A-1-1) based on a request from the user who, for instance, has visited the printing location.

When the printing environment sharing service 4013 (A-1-1) receives the request, in step S4068, the reservation list obtaining part 4055 of the printing environment sharing service 4013 (A-1-1) obtains, for instance, the reservation names and/or reservation numbers of corresponding reservation information among the reservation information stored in the SPS server 4003 (A-1-1) based on an identifier identifying the user, such as a user ID, included in the request, and transmits the reservation identifiers as a reservation list to the Web server 4001.

Receiving the reservation list, the Web server 4001 creates a printing reservation selection screen displaying the reservation list as shown in FIG. 87A, and presents the printing reservation selection screen to the user.

For instance, when the user selects RESERVATION 1 and taps on a RESERVATION CONTENTS button 4220*a* on the printing reservation selection screen of FIG. 87A, in step S4069, the Web server 4001 transmits a request to obtain reservation information corresponding to RESERVATION 1 to the printing environment sharing service 4013 (A-1-1).

When the printing environment sharing service 4013 (A-1-1) receives the request, in step S4070, the reservation information obtaining part 4053 of the printing environment sharing service 4013 (A-1-1) obtains the corresponding reservation information from the reservation information stored in the SPS server 4003 (A-1-1) based on a reservation identifier (for instance, a reservation number) included in the request, and transmits the corresponding reservation information to the Web server 4001. In the following, it is assumed for simplification of description that a reservation number is employed as the reservation identifier.

Receiving the reservation information, the Web server 4001 creates a printing reservation contents display screen displaying the reservation information as shown in FIG. 87B, and presents the printing reservation contents display screen to the user.

For instance, when the user confirms the reservation contents and taps on a PRINT button 4221*a* on the printing reservation contents display screen of FIG. 87B, in step S4071 of FIG. 86, the Web server 4001 transmits a printing start request including the reservation number to the printing environment sharing service 4013 (A-1-1) in the system configuration of FIG. 73.

When the printing environment sharing service 4013 (A-1-1) receives the printing start request, in step S4072, the printing start control part 4052 of the printing environment sharing service 4013 (A-1-1) transmits the printing start request to the printing environment sharing service 4013 (A-1) based on the channel information to the printing location.

The Web server 4001 may include the channel information to the printing location in the printing start request and transmit the printing start request to the printing environment sharing service 4013 (A-1-1). Alternatively, the printing environment sharing service 4013 (A-1-1) receiving the printing start request may obtain the channel information by referring to the corresponding reservation information stored in the SPS server 4003 (A-1-1), and include the channel information in the printing start request.

When the printing environment sharing service 4013 (A-1) receives the printing start request, in step S4073, the printing start control part 4052 of the printing environment sharing service 4013 (A-1) transmits the printing start request to the printing environment sharing service 4013 (R-0) based on the channel information to the printing location.

When the printing environment sharing service 4013 (R-0) receives the printing start request, in step S4074, the printing start control part 4052 of the printing environment sharing service 4013 (R-0) transmits the printing start request to the printing environment sharing service 4013 (B-1) based on the channel information to the printing location.

When the printing environment sharing service 4013 (B-1) receives the printing start request, in step S4075, the printing start control part 4052 of the printing environment sharing service 4013 (B-1) transmits the printing start request to the printing environment sharing service 4013 (B-1-2) based on the channel information to the printing location.

When the printing environment sharing service 4013 (B-1-2) receives the printing start request, in step S4076, the printing start control part 4052 of the printing environment sharing service 4013 (B-1-2) obtains the reservation information and the document data corresponding to the reservation number included in the printing start request from the HDD 4039 of the SPS server 4003 (B-1-2), and transmits a printing start request including the reservation information and the document data to the document print service 4014 (PS-2).

Receiving the printing start request including the reservation information and the document data, in step S4077, the document print service 4014 (PS-2) converts the document data into printing data printable on the specified printer 4006 (P-2-2), and transmits a printing start request including the printing data to the printer 4006 (P-2-2) included in the reservation information.

Receiving the printing start request, the printer 4006 (P-2-2) prints the printing data included in the printing start request.

As shown in FIG. 86 and/or FIGS. 87A and 87B, each printing environment sharing service 4013 can transfer printing reservation information and document data to the printing environment sharing service 4013 of a printing location based on channel information to the printing location obtained using, for instance, the service list, and make a printing reservation.

Further, each printing environment sharing service 4013 can transmit a printing start request to the SPS server 4003 of a printing location storing printing reservation information and document data based on channel information to the printing location obtained using, for instance, the service list, and request the document print service 4014 managing the specified printer 4006 to start printing.

Next, a description is given, with reference to FIGS. 88A through 88E, 89A, and 89B, of an operation of changing the printing location via the Web server 4001 (a first printing location changing operation)

Figure 89A:
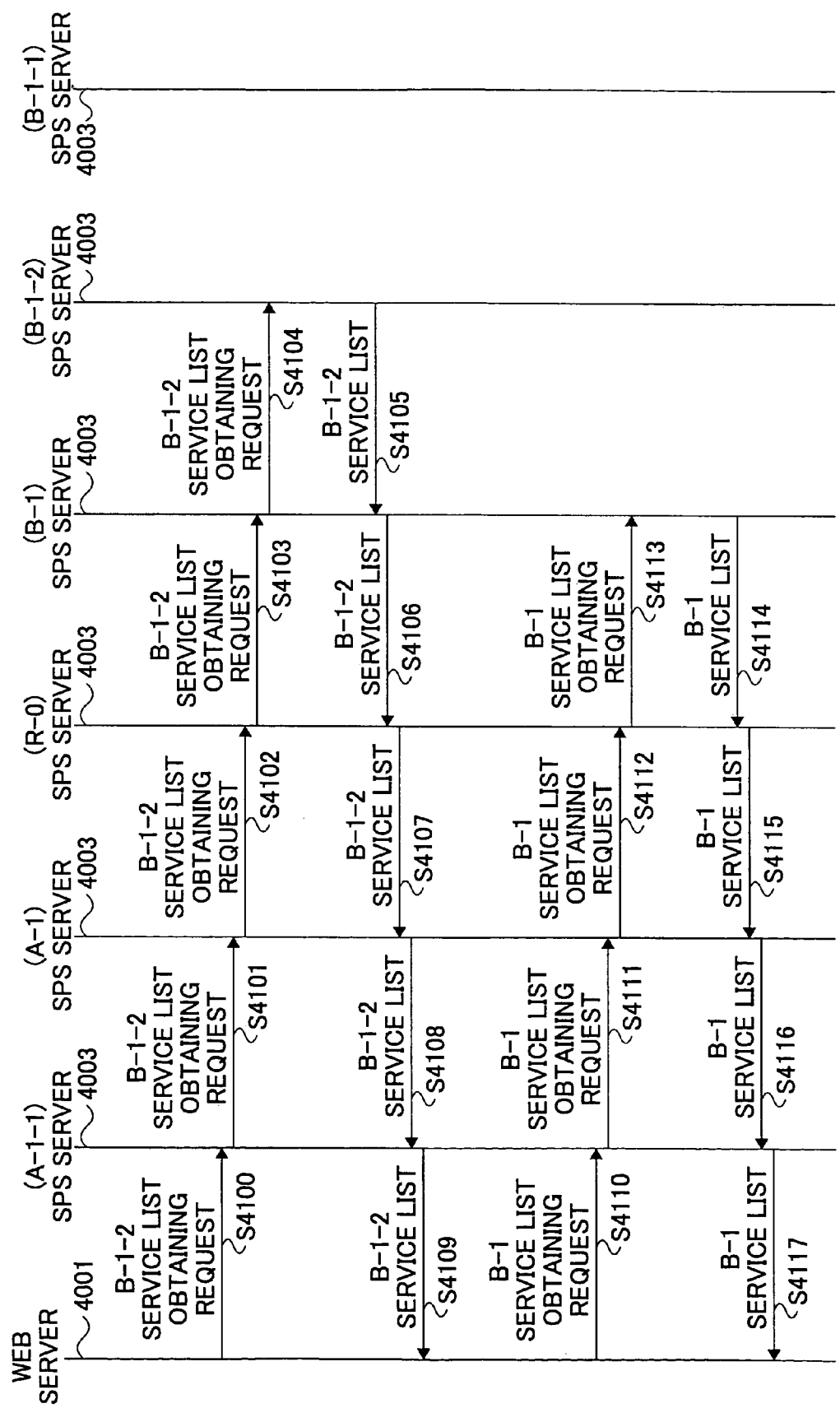
FIGS. 89A and 89B are sequence diagrams for illustrating a first printing location changing operation according to the fifth embodiment of the present invention.
Figure 89B:
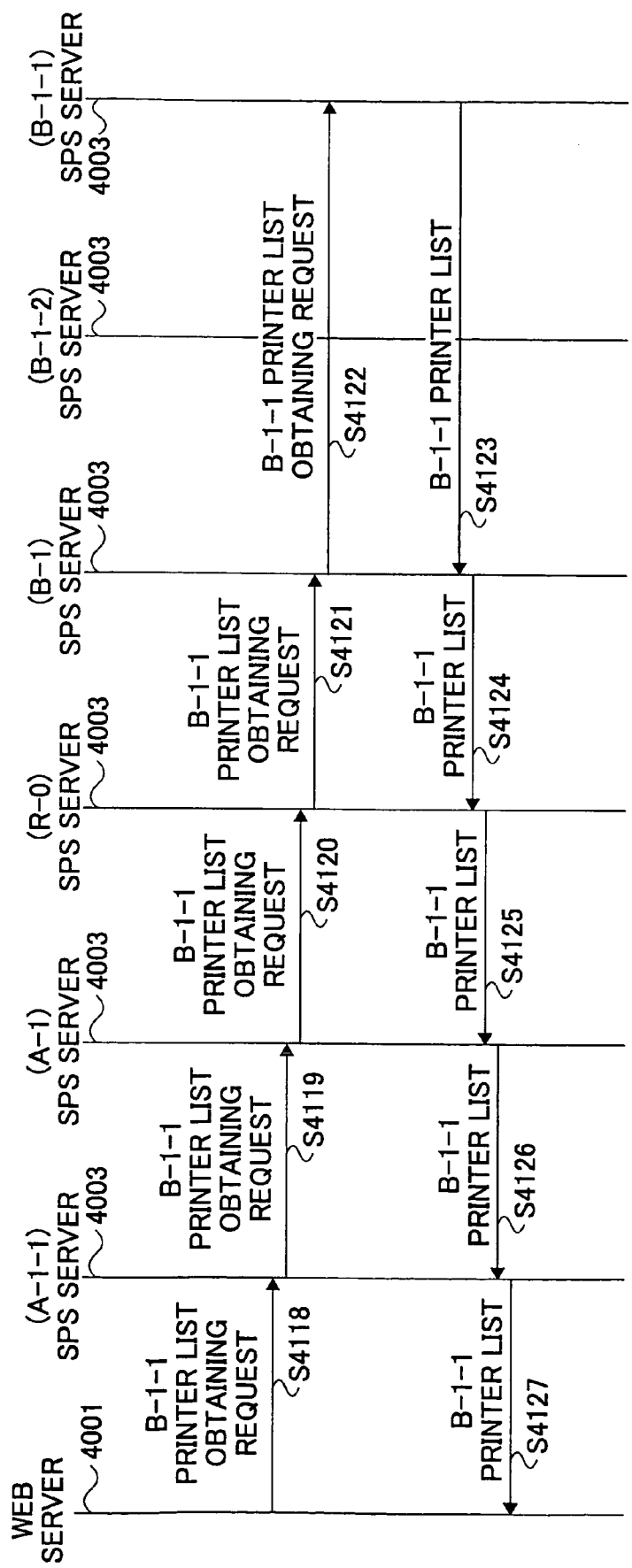

FIGS. 88A through 88E are diagrams for illustrating the changing of the printing location. FIGS. 89A and 89B are sequence diagrams for illustrating the first printing location changing operation.

For instance, when the user taps on a CHANGE RESERVATION button 4221*b* on the printing reservation contents display screen of FIG. 87B, the Web server 4001 creates a reservation change screen as shown in FIG. 88A, and presents the reservation change screen to the user.

For instance, when the user selects "CHANGE PRINTING LOCATION," and taps on a NEXT button 4230a on the reservation change screen of FIG. 88A, in step S4100 of FIG. 89A, the Web server 4001 transmits a request to obtain the service list 4071 of the printing environment sharing service 4013 (B-1-2) including the channel information to the printing location (B-1-2) included in the reservation information to the printing environment sharing service 4013 (A-1-1) in the system configuration of FIG. 73.

When the printing environment sharing service 4013 (A-1-1) receives the request, in step S4101, the service list obtaining part 4041 of the printing environment sharing service 4013 (A-1-1) transmits the request to the printing environment sharing service 4013 (A-1) based on the channel information included in the request.

When the printing environment sharing service 4013 (A-1) receives the request, in step S4102, the service list obtaining part 4041 of the printing environment sharing service 4013 (A-1) transmits the request to the printing environment sharing service 4013 (R-0) based on the channel information included in the request.

When the printing environment sharing service 4013 (R-0) receives the request, in step S4103, the service list obtaining part 4041 of the printing environment sharing service 4013 (R-0) transmits the request to the printing environment sharing service 4013 (B-1) based on the channel information included in the request.

When the printing environment sharing service 4013 (B-1) receives the request, in step S4104, the service list obtaining part 4041 of the printing environment sharing service 4013 (B-1) transmits the request to the printing environment sharing service 4013 (B-1-2) based on the channel information included in the request.

When the printing environment sharing service 4013 (B-1-2) receives the request, in step S4105, the service list obtaining part 4041 of the printing environment sharing service 4013 (B-1-2) obtains the service list 4071 stored in the SPS server 4003 (B-1-2), and transmits the service list 4071 to the printing environment sharing service 4013 (B-1).

In step S4106, the service list obtaining part 4041 of the printing environment sharing service 4013 (B-1) transmits the received service list 4071 of the printing environment sharing service 4013 (B-1-2) to the printing environment sharing service 4013 (R-0) based on the channel information.

In step S4107, the service list obtaining part 4041 of the printing environment sharing service 4013 (R-0) transmits the received service list 4071 of the printing environment sharing service 4013 (B-1-2) to the printing environment sharing service 4013 (A-1) based on the channel information.

In step S4108, the service list obtaining part 4041 of the printing environment sharing service 4013 (A-1) transmits the received service list 4071 of the printing environment sharing service 4013 (B-1-2) to the printing environment sharing service 4013 (A-1-1) based on the channel information.

In step S4109, the service list obtaining part 4041 of the printing environment sharing service 4013 (A-1-1) transmits the received service list 4071 of the printing environment sharing service 4013 (B-1-2) to the Web server 4001.

Receiving the service list 4071 of the printing environment sharing service 4013 (B-1-2), the Web server 4001 creates a printing location change screen as shown in FIG. 88B based on the service list 4071 of the printing environment sharing service 4013 (B-1-2), and presents the printing location change screen to the user.

For instance, when the user selects "B-1" and taps on a NEXT button 4231a on the printing location change screen of FIG. 88B, in step S4110 of FIG. 89A, the Web server 4001 stores the information that "B-1" has been selected, deletes "B-1-2" from the channel information, and transmits a request to obtain the service list 4071 of the printing environment sharing service 4013 (B-1) including the channel information to the printing environment sharing service 4013 (A-1-1).

When the printing environment sharing service 4013 (A-1-1) receives the request, in step S4111, the service list obtaining part 4041 of the printing environment sharing service 4013 (A-1-1) transmits the request to the printing environment sharing service 4013 (A-1) based on the channel information included in the request.

When the printing environment sharing service 4013 (A-1) receives the request, in step S4112, the service list obtaining part 4041 of the printing environment sharing service 4013 (A-1) transmits the request to the printing environment sharing service 4013 (R-0) based on the channel information included in the request.

When the printing environment sharing service 4013 (R-0) receives the request, in step S4113, the service list obtaining part 4041 of the printing environment sharing service 4013 (R-0) transmits the request to the printing environment sharing service 4013 (B-1) based on the channel information included in the request.

When the printing environment sharing service 4013 (B-1) receives the request, in step S4114, the service list obtaining part 4041 of the printing environment sharing service 4013 (B-1) obtains the service list 4071 stored in the SPS server 4003 (B-1), and transmits the service list 4071 to the printing environment sharing service 4013 (R-0).

In step S4115, the service list obtaining part 4041 of the printing environment sharing service 4013 (R-0) transmits the received service list 4071 of the printing environment sharing service 4013 (B-1) to the printing environment sharing service 4013 (A-1) based on the channel information.

In step S4116, the service list obtaining part 4041 of the printing environment sharing service 4013 (A-1) transmits the received service list 4071 of the printing environment sharing service 4013 (B-1) to the printing environment sharing service 4013 (A-1-1) based on the channel information.

In step S4117, the service list obtaining part 4041 of the printing environment sharing service 4013 (A-1-1) transmits the received service list 4071 of the printing environment sharing service 4013 (B-1) to the Web server 4001.

Receiving the service list 4071 of the printing environment sharing service 4013 (B-1), the Web server 4001 creates a printing location change screen as shown in FIG. 88C based on the service list 4071 of the printing environment sharing service 4013 (B-1), and presents the printing location change screen to the user.

For instance, when the user selects "B-1-1" and taps on an OK button 4232a on the printing location change screen of FIG. 88C, the Web server 4001 stores the information that "B-1-1" has been selected, and adds "B-1-1" to the channel information. Then, the Web server 4001 creates a printing location change confirmation screen as shown in FIG. 88D, and presents the printing location change confirmation screen to the user.

By the Web server 4001 and/or the printing environment sharing services 4013 performing the above-described operation, the user can change the printing location. The channel information to the printing location is updated with the change of the printing location.

For instance, when the user taps on a SELECT PRINTER button 4233a on the printing location change confirmation screen of FIG. 88D, in step S4118 of FIG. 89B, the Web server 4001 transmits a request to obtain the printer list 4072 of the printing environment sharing service 4013 (B-1-1) including the channel information to the new printing location (B-1-1) selected by the user to the printing environment sharing service 4013 (A-1-1).

When the printing environment sharing service 4013 (A-1-1) receives the request, in step S4119, the printer list obtaining part 4042 of the printing environment sharing service 4013 (A-1-1) transmits the request to the printing environment sharing service 4013 (A-1) based on the channel information included in the request.

When the printing environment sharing service 4013 (A-1) receives the request, in step S4120, the printer list obtaining part 4042 of the printing environment sharing service 4013 (A-1) transmits the request to the printing environment sharing service 4013 (R-0) based on the channel information included in the request.

When the printing environment sharing service 4013 (R-0) receives the request, in step S4121, the printer list obtaining part 4042 of the printing environment sharing service 4013 (R-0) transmits the request to the printing environment sharing service 4013 (B-1) based on the channel information included in the request.

When the printing environment sharing service 4013 (B-1) receives the request, in step S4122, the printer list obtaining part 4042 of the printing environment sharing service 4013 (B-1) transmits the request to the printing environment sharing service 4013 (B-1-1) based on the channel information included in the request.

When the printing environment sharing service 4013 (B-1-1) receives the request, in step S4123, the printer list obtaining part 4042 of the printing environment sharing service 4013 (B-1-1) obtains the printer list 4072 stored in the SPS server 4003 (B-1-1), and transmits the printer list 4072 to the printing environment sharing service 4013 (B-1).

In step S4124, the printer list obtaining part 4042 of the printing environment sharing service 4013 (B-1) transmits the received printer list 4072 of the printing environment sharing service 4013 (B-1-1) to the printing environment sharing service 4013 (R-0) based on the channel information.

In step S4125, the printer list obtaining part 4042 of the printing environment sharing service 4013 (R-0) transmits the received printer list 4072 of the printing environment sharing service 4013 (B-1-1) to the printing environment sharing service 4013 (A-1) based on the channel information.

In step S4126, the printer list obtaining part 4042 of the printing environment sharing service 4013 (A-1) transmits the received printer list 4072 of the printing environment sharing service 4013 (B-1-1) to the printing environment sharing service 4013 (A-1-1) based on the channel information.

In step S4127, the printer list obtaining part 4042 of the printing environment sharing service 4013 (A-1-1) transmits the received printer list 4072 of the printing environment sharing service 4013 (B-1-1) to the Web server 4001.

Receiving the printer list 4072 of the printing environment sharing service 4013 (B-1-1), creates a printer selection screen as shown in FIG. 88E based on the printer list 4072 of the printing environment sharing service 4013 (B-1-1), and presents the printer selection screen to the user.

By the Web server 4001 and/or the printing environment sharing services 4013 performing the operations of steps S4118 through S4127, the user can select an available printer 4006 at a new printing location.

Next, a description is given, with reference to FIGS. 88E through 88H, 90A, 90B, 91A, 91B, and 92A through 92C, of exemplary cases of reserving and starting printing after changing the printing location and selecting the new printer 4006.

Figure 90A:
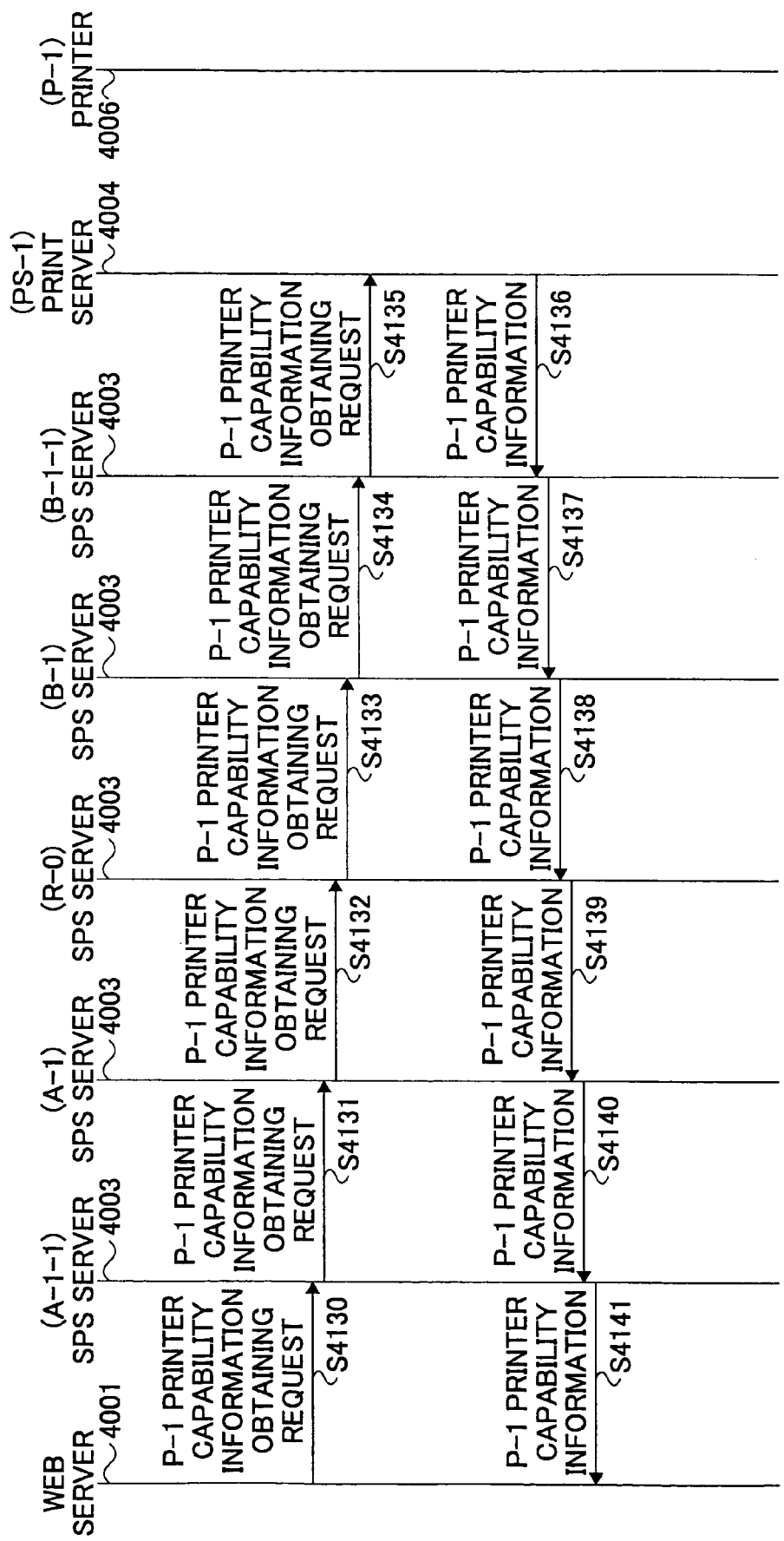
FIGS. 90A and 90B are sequence diagrams for illustrating an operation at the time of changing a printing reservation according to the fifth embodiment of the present invention.
Figure 90B:
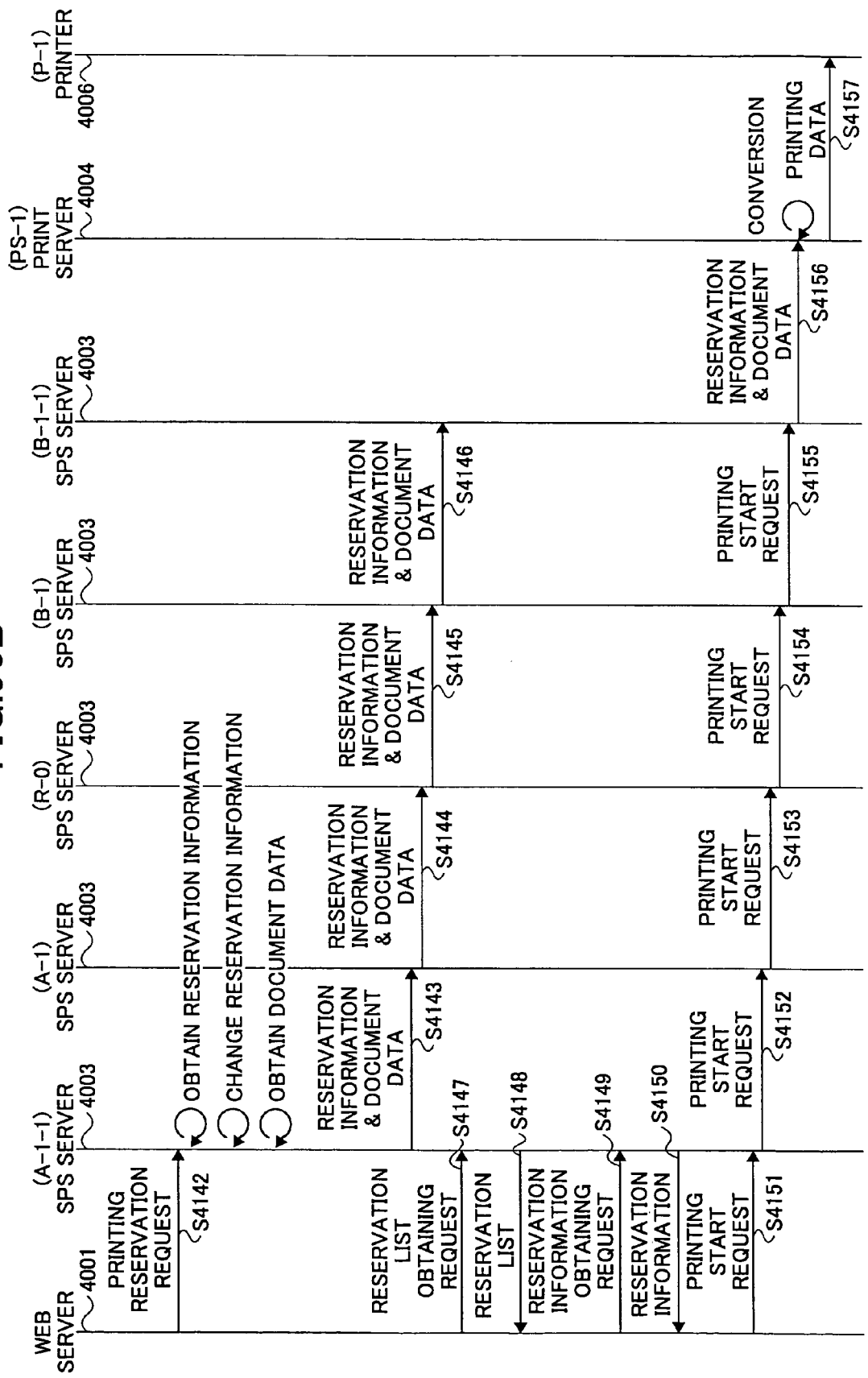

FIGS. 90A and 90B are sequence diagrams for illustrating an operation at the time of changing a printing reservation.

FIGS. 91A and 91B are diagrams for illustrating the start of printing.

For instance, when the user selects "P-1" and taps on an OK button 4234a on the printer selection screen of FIG. 88E, the Web server 4001 creates a printer selection confirmation screen as shown in FIG. 88F, and presents the printer selection confirmation screen to the user.

For instance, when the user taps on a SET PRINTING CONDITIONS button 4235a on the printer selection confirmation screen of FIG. 88F, in step S4130 of FIG. 90A, the Web server 4001 transmits a request to obtain the capability information of the printer 4006 (P-1) including the channel information to the printing location (B-1-1) to the printing environment sharing service 4013 (A-1-1) in the system configuration of FIG. 73.

When the printing environment sharing service 4013 (A-1-1) receives the request, in step S4131, the printer capability information obtaining part 4045 of the printing environment sharing service 4013 (A-1-1) transmits the request to the printing environment sharing service 4013 (A-1) based on the channel information included in the request.

When the printing environment sharing service 4013 (A-1) receives the request, in step S4132, the printer capability information obtaining part 4045 of the printing environment sharing service 4013 (A-1) transmits the request to the printing environment sharing service 4013 (R-0) based on the channel information included in the request.

When the printing environment sharing service 4013 (R-0) receives the request, in step S4133, the printer capability information obtaining part 4045 of the printing environment sharing service 4013 (R-0) transmits the request to the printing environment sharing service 4013 (B-1) based on the channel information included in the request.

When the printing environment sharing service 4013 (B-1) receives the request, in step S4134, the printer capability information obtaining part 4045 of the printing environment sharing service 4013 (B-1) transmits the request to the printing environment sharing service 4013 (B-1-1) based on the channel information included in the request.

When the printing environment sharing service 4013 (B-1-1) receives the request, in step S4135, the printer capability information obtaining part 4045 of the printing environment sharing service 4013 (B-1-1) transmits the request to the document print service 4014 (PS-1) since it is understood from the printer list 4072 that the printer 4006 (P-1) selected by the user is managed by the document print service 4014 (PS-1).

Receiving the request, in step S4136, the document print service 4014 (PS-1) obtains the capability information of the printer 4006 (P-1) stored in, for instance, the print server 4004 (PS-1) and transmits the obtained capability information to the printing environment sharing service 4013 (B-1-1).

In step S4137, the printer capability information obtaining part 4045 of the printing environment sharing service 4013 (B-1-1) transmits the received capability information of the printer 4006 (P-1) to the printing environment sharing service 4013 (B-1) based on the channel information.

In step S4138, the printer capability information obtaining part 4045 of the printing environment sharing service 4013 (B-1) transmits the received capability information of the printer 4006 (P-1) to the printing environment sharing service 4013 (R-0) based on the channel information.

In step S4139, the printer capability information obtaining part 4045 of the printing environment sharing service 4013 (R-0) transmits the received capability information of the printer 4006 (P-1) to the printing environment sharing service 4013 (A-1) based on the channel information.

In step S4140, the printer capability information obtaining part 4045 of the printing environment sharing service 4013 (A-1) transmits the received capability information of the printer 4006 (P-1) to the printing environment sharing service 4013 (A-1-1) based on the channel information.

In step S4141, the printer capability information obtaining part 4045 of the printing environment sharing service 4013 (A-1-1) transmits the received capability information of the printer 4006 (P-1) to the Web server 4001.

Receiving the capability information of the printer 4006 (P-1), the Web server 4001 creates a printing condition setting screen as shown in FIG. 88G based on the received capability information of the printer 4006 (P-1), and presents the printing condition setting screen to the user.

For instance, when the user sets printing conditions and taps on a CONFIRM PRINTING RESERVATION button 4236a on the printing condition setting screen of FIG. 88G, the Web server 4001 creates a printing reservation confirmation screen as shown in FIG. 88H, and presents the printing reservation confirmation screen to the user.

For instance, when the user taps on a RESERVE PRINTING button 4237a on the printing reservation confirmation screen of FIG. 88H, in step S4142 of FIG. 90B, the Web server 4001 transmits a printing reservation request including new reservation information to the printing environment sharing service 4013 (A-1-1).

For instance, the new reservation information includes identification information identifying a new printing location, channel information to the new printing location, identification information identifying a new printer 4006, new printing conditions, a reservation number identifying the reservation information before changing the printing location (previous reservation information), and identification information identifying document data stored with the previous reservation information.

When the printing environment sharing service 4013 (A-1-1) receives the printing reservation request, the printing reservation control part 4051 of the printing environment sharing service 4013 (A-1-1) provides the reservation information obtaining part 4053 with the reservation number identifying the previous reservation information included in the printing reservation request, and requests the reservation information obtaining part 4053 to obtain the corresponding previous reservation information.

Receiving the reservation information obtaining request, the reservation information obtaining part 4053 of the printing environment sharing service 4013 (A-1-1) obtains the corresponding reservation information from the reservation information stored in the SPS server 4003 (A-1-1) that is the reservation location based on the reservation number identifying the previous reservation information.

When the printing reservation control part 4051 of the printing environment sharing service 4013 (A-1-1) is notified by the reservation information obtaining part 4053 that the previous reservation information has been obtained, the printing reservation control part 4051 provides the reservation information changing part 4056 of the printing environment sharing service 4013 (A-1-1) with information included in the new reservation information, such as identification information identifying a new printing location, channel information to the new printing location, identification information identifying a new printer 4006, and new printing conditions, as well as the previous reservation information, and requests the reservation information changing part 4056 to change (update) the reservation information.

Receiving the reservation information change request, the reservation information changing part 4056 replaces the previous reservation information with the new reservation information.

For instance, the reservation information changing part 4056 of the printing environment sharing service 4013 (A-1-1) replaces the identification information identifying the printing location (B-1-2) included in the previous reservation information with the identification information identifying the new printing location (B-1-1), and replaces the identification information identifying the previously selected printer 4006 (P-2-2) included in the previous reservation information with the identification information identifying the new printer 4006 (P-1).

Further, when the printing environment sharing service 4013 (A-1-1) receives the printing reservation request, the printing reservation control part 4051 of the printing environment sharing service 4013 (A-1-1) provides the stored document data obtaining part 4054 of the printing environment sharing service 4013 (A-1-1) with the identification information identifying the document data stored with the previous reservation information included in the printing reservation request, and requests the stored document data obtaining part 4054 to obtain the corresponding document data.

Receiving the document data obtaining request, the stored document data obtaining part 4054 obtains the corresponding document data from the document data stored in the SPS server 4003 (A-1-1) that is the reservation location based on the identification information identifying the document data.

The printing reservation control part 4051 of the printing environment sharing service 4013 (A-1-1) provides the data transfer part 4044 of the printing environment sharing service 4013 (A-1-1) with the reservation information updated by the reservation information changing part 4056 and the document data obtained by the stored document data obtaining part 4054, and requests the data transfer part 4044 to transfer the reservation information and the document data.

Receiving the transfer request, in step S4143, the data transfer part 4044 of the printing environment sharing service 4013 (A-1-1) transfers the reservation information and the document data to the printing environment sharing service 4013 (A-1) based on the channel information to the new printing location included in the reservation information.

When the printing environment sharing service 4013 (A-1) receives the reservation information and the document data, in step S4144, the data transfer part 4044 of the printing environment sharing service 4013 (A-1) transfers the reservation information and the document data to the printing environment sharing service 4013 (R-0) based on the channel information.

When the printing environment sharing service 4013 (R-0) receives the reservation information and the document data, in step S4145, the data transfer part 4044 of the printing environment sharing service 4013 (R-0) transfers the reservation information and the document data to the printing environment sharing service 4013 (B-1) based on the channel information.

When the printing environment sharing service 4013 (B-1) receives the reservation information and the document data, in step S4146, the data transfer part 4044 of the printing environment sharing service 4013 (B-1) transfers the reservation information and the document data to the printing environment sharing service 4013 (B-1-1) based on the channel information.

Then, the data transfer part 4044 of the printing environment sharing service 4013 (B-1-1) notifies the printing reservation control part 4051 of the printing environment sharing service 4013 (B-1-1) of the obtaining of the reservation information and the document data. Then, the printing reservation control part 4051 provides the reservation information and the document data obtained by the data transfer part 44 to the storage part 4047 of the printing environment sharing service 4013 (B-1-1), and requests the storage part 4047 to store the reservation information and the document data. Receiving the request, the storage part 4047 stores the transferred reservation information and document data in the HDD 4039 of the SPS server 4003 (B-1-1).

On the other hand, the printing reservation control part 4051 of the printing environment sharing service 4013 (A-1-1) provides the storage part 4047 of the printing environment sharing service 4013 (A-1-1) with the reservation information updated by the reservation information changing part 4056 and the document data obtained by the stored document data obtaining part 4054 of the printing environment sharing service 4013 (A-1-1), and requests the storage part 4047 to store the reservation information and the document data.

Receiving the request, the storage part 4047 of the printing environment sharing service 4013 (A-1-1) stores the reservation information and the document data in the HDD 4039 of the SPS server 4003 (A-1-1) that is the reservation location.

Meanwhile, in step S4147, the Web server 4001 transmits a request to obtain a reservation list that can be referred to by the user to the printing environment sharing service 4013 (A-1-1) based on a request from the user who, for instance, has visited the printing location.

When the printing environment sharing service 4013 (A-1-1) receives the request, in step S4148, the reservation list obtaining part 4055 of the printing environment sharing service 4013 (A-1-1) obtains the reservation names and reservation numbers of corresponding reservation information among the reservation information stored in the SPS server 4003 (A-1-1) based on an identifier identifying the user, such as a user ID, included in the request, and transmits the reservation names and numbers as a reservation list to the Web server 4001.

Receiving the reservation list, the Web server 4001 creates a printing reservation selection screen displaying the reservation list as shown in FIG. 91A, and presents the printing reservation selection screen to the user.

For instance, when the user selects RESERVATION 1 and taps on a RESERVATION CONTENTS button 4240a on the printing reservation selection screen of FIG. 91A, in step S4149, the Web server 4001 transmits a request to obtain reservation information corresponding to RESERVATION 1 to the printing environment sharing service 4013 (A-1-1).

When the printing environment sharing service 4013 (A-1-1) receives the request, in step S4150, the reservation information obtaining part 4053 of the printing environment sharing service 4013 (A-1-1) obtains the corresponding reservation information from the reservation information stored in the SPS server 4003 (A-1-1) based on the reservation number included in the request, and transmits the corresponding reservation information to the Web server 4001.

Receiving the reservation information, the Web server 4001 creates a printing reservation contents display screen displaying the reservation information as shown in FIG. 91B, and presents the printing reservation contents display screen to the user.

For instance, when the user confirms the reservation contents and taps on a PRINT button 4241a on the printing reservation contents display screen of FIG. 91B, in step S4151 of FIG. 90B, the Web server 4001 transmits a printing start request including the reservation number to the printing environment sharing service 4013 (A-1-1) in the system configuration of FIG. 73.

When the printing environment sharing service 4013 (A-1-1) receives the printing start request, in step S4152, the printing start control part 4052 of the printing environment sharing service 4013 (A-1-1) transmits the printing start request to the printing environment sharing service 4013 (A-1) based on the channel information to the printing location.

When the printing environment sharing service 4013 (A-1) receives the printing start request, in step S4153, the printing start control part 4052 of the printing environment sharing service 4013 (A-1) transmits the printing start request to the printing environment sharing service 4013 (R-0) based on the channel information to the printing location.

When the printing environment sharing service 4013 (R-0) receives the printing start request, in step S4154, the printing start control part 4052 of the printing environment sharing service 4013 (R-0) transmits the printing start request to the printing environment sharing service 4013 (B-1) based on the channel information to the printing location.

When the printing environment sharing service 4013 (B-1) receives the printing start request, in step S4155, the printing start control part 4052 of the printing environment sharing service 4013 (B-1) transmits the printing start request to the printing environment sharing service 4013 (B-1-1) based on the channel information to the printing location.

When the printing environment sharing service 4013 (B-1-1) receives the printing start request, in step S4156, the printing start control part 4052 of the printing environment sharing service 4013 (B-1-1) obtains the reservation information and the document data corresponding to the reservation number included in the printing start request from the HDD 4039 of the SPS server 4003 (B-1-1), and transmits a printing start request including the reservation information and the document data to the document print service 4014 (PS-1).

Receiving the printing start request including the reservation information and the document data, in step S4157, the document print service 4014 (PS-1) converts the document data into printing data printable on the specified printer 4006 (P-1), and transmits a printing start request including the printing data to the printer 4006 (P-1) included in the reservation information.

Receiving the printing start request, the printer 4006 (P-1) prints the printing data included in the printing start request.

By the Web server 4001 and/or the printing environment sharing services 4013 performing the operation of FIGS. 90A and 90B, the user can change (update) printing reservation information, and print a document based on the changed (updated) printing reservation information.

Figure 92A:
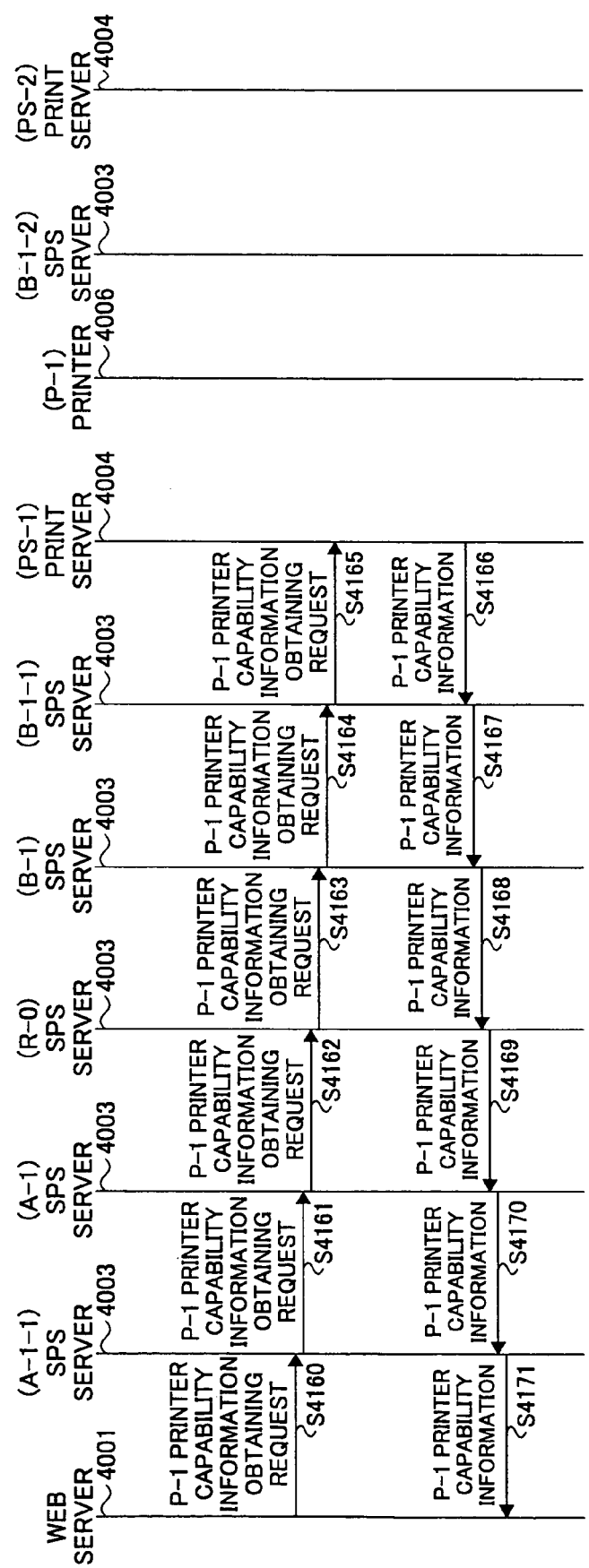
Figure 92B:
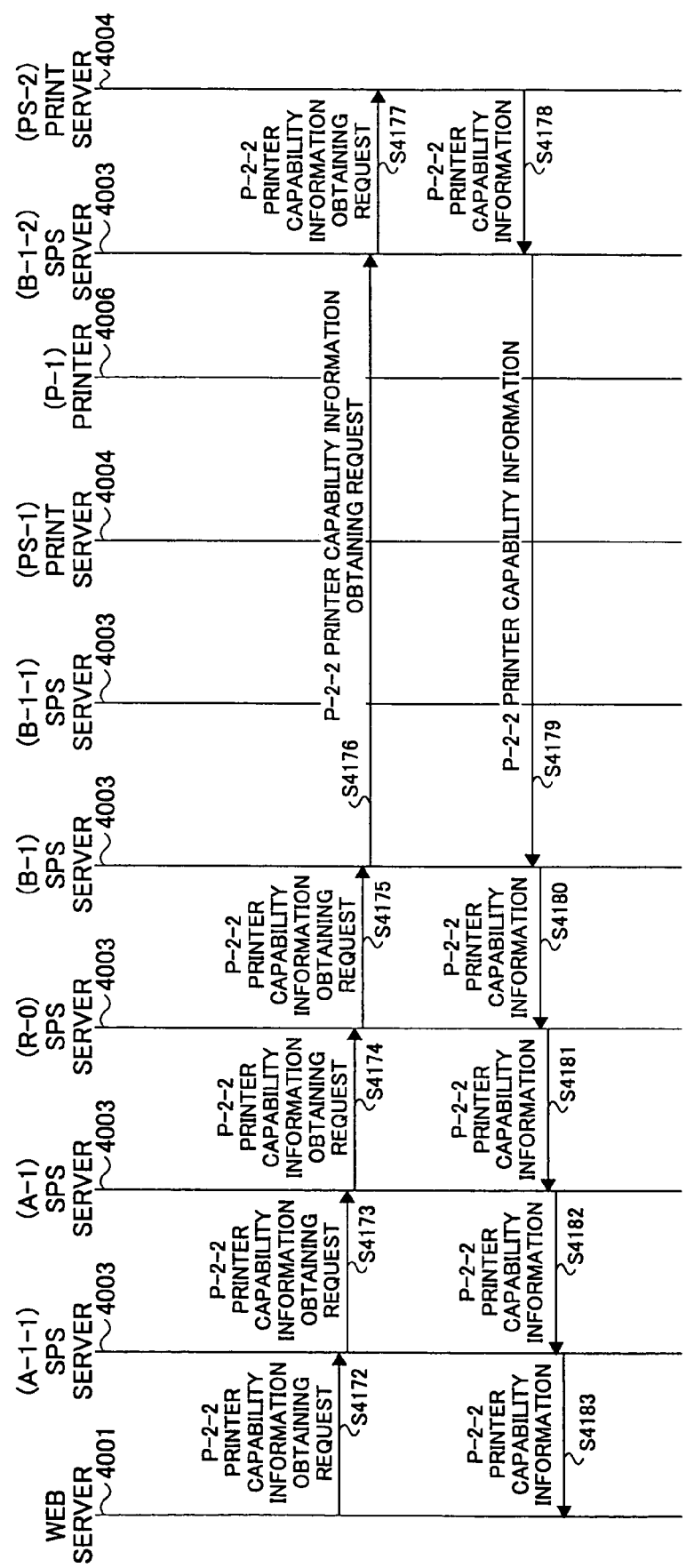

FIGS. 92A through 92C are sequence diagrams for illustrating another operation at the time of changing a printing reservation.

The operation of steps S4160 through steps S4171 of FIG. 92A is equal to the operation of steps S4130 through S4141 of FIG. 90A.

In the system configuration of FIG. 73, when the Web server 4001 obtains the capability information of the newly selected printer 4006 (P-1), in step S4172 of FIG. 92A, the Web server 4001 transmits a request to obtain the capability information of the printer 4006 (P-2-2) including the channel information to the previous printing location (B-1-2) before the printing location change to the printing environment sharing service 4013 (A-1-1).

When the printing environment sharing service 4013 (A-1-1) receives the request, in step S4173, the printer capability information obtaining part 4045 of the printing environment sharing service 4013 (A-1-1) transmits the request to the printing environment sharing service 4013 (A-1) based on the channel information included in the request.

When the printing environment sharing service 4013 (A-1) receives the request, in step S4174, the printer capability information obtaining part 4045 of the printing environment sharing service 4013 (A-1) transmits the request to the printing environment sharing service 4013 (R-0) based on the channel information included in the request.

When the printing environment sharing service 4013 (R-0) receives the request, in step S4175, the printer capability information obtaining part 4045 of the printing environment sharing service 4013 (R-0) transmits the request to the printing environment sharing service 4013 (B-1) based on the channel information included in the request.

When the printing environment sharing service 4013 (B-1) receives the request, in step S4176, the printer capability information obtaining part 4045 of the printing environment sharing service 4013 (B-1) transmits the request to the printing environment sharing service 4013 (B-1-2) based on the channel information.

When the printing environment sharing service 4013 (B-1-2) receives the request, in step S4177, the printer capability information obtaining part 4045 of the printing environment sharing service 4013 (B-1-2) transmits the request to the document print service 4014 (PS-2).

Receiving the request, in step S4178, the document print service 4014 (PS-2) obtains the capability information of the printer 4006 (P-2-2) stored in, for instance, the print server 4004 (PS-2) and transmits the obtained capability information to the printing environment sharing service 4013 (B-1-2).

In step S4179, the printer capability information obtaining part 4045 of the printing environment sharing service 4013 (B-1-2) transmits the received capability information of the printer 6 (P-2-2) to the printing environment sharing service 4013 (B-1) based on the channel information.

In step S4180, the printer capability information obtaining part 4045 of the printing environment sharing service 4013 (B-1) transmits the received capability information of the printer 4006 (P-2-2) to the printing environment sharing service 4013 (R-0) based on the channel information.

In step S4181, the printer capability information obtaining part 4045 of the printing environment sharing service 4013 (R-0) transmits the received capability information of the printer 4006 (P-2-2) to the printing environment sharing service 4013 (A-1) based on the channel information.

In step S4182, the printer capability information obtaining part 4045 of the printing environment sharing service 4013 (A-1) transmits the received capability information of the printer 4006 (P-2-2) to the printing environment sharing service 4013 (A-1-1) based on the channel information.

In step S4183, the printer capability information obtaining part 4045 of the printing environment sharing service 4013 (A-1-1) transmits the received capability information of the printer 4006 (P-2-2) to the Web server 4001.

Obtaining the capability information of the newly selected printer 4006 (P-1) and the capability information of the previous printer 4006 (P-2-2) before the printing location change, the Web server 4001 creates, for instance, a printing condition setting screen as shown in FIG. 88G based on the capability information of the two printers 4006 (P-1 and P-2-2), and presents the printing condition setting screen to the user.

For instance, based on the capability information of the new and previous printers 4006 (P-1 and P-2-2), the Web server 4001 presents only common capabilities to the user.

For instance, when the user sets printing conditions and taps on the CONFIRM PRINTING RESERVATION button 4236a on the printing condition setting screen of FIG. 88G, the Web server 4001 creates a printing reservation confirmation screen as shown in FIG. 88H, and presents the printing reservation confirmation screen to the user.

For instance, when the user taps on the RESERVE PRINTING button 4237a on the printing reservation confirmation screen of FIG. 88H, in step S4184 of FIG. 92C, the Web server 4001 transmits a printing reservation request including new reservation information to the printing environment sharing service 4013 (A-1-1).

For instance, the new reservation information includes identification information identifying a new printing location, channel information to the new printing location, identification information identifying a new printer 4006, new printing conditions, a reservation number identifying the previous reservation information before changing the printing location, and identification information identifying document data stored with the previous reservation information.

When the printing environment sharing service 4013 (A-1-1) receives the printing reservation request, the printing reservation control part 4051 of the printing environment sharing service 4013 (A-1-1) provides the reservation information obtaining part 4053 with the reservation number identifying the previous reservation information included in the printing reservation request, and requests the reservation information obtaining part 4053 to obtain the corresponding previous reservation information.

Receiving the reservation information obtaining request, the reservation information obtaining part 4053 of the printing environment sharing service 4013 (A-1-1) obtains the corresponding reservation information from the reservation information stored in the SPS server 4003 (A-1-1) that is the reservation location based on the reservation number identifying the previous reservation information.

When the printing reservation control part 4051 of the printing environment sharing service 4013 (A-1-1) is notified by the reservation information obtaining part 4053 that the previous reservation information has been obtained, the printing reservation control part 4051 provides the reservation information changing part 4056 of the printing environment sharing service 4013 (A-1-1) with information included in the new reservation information, such as identification information identifying a new printing location, channel information to the new printing location, identification information identifying a new printer 4006, and new printing conditions, as well as the previous reservation information, and requests the reservation information changing part 4056 to change (update) the reservation information.

Receiving the reservation information change request, the reservation information changing part 4056 replaces the previous reservation information with the new reservation information.

For instance, the reservation information changing part 4056 of the printing environment sharing service 4013 (A-1-1) replaces the identification information identifying the printing location (B-1-2) included in the previous reservation information with the identification information identifying the new printing location (B-1-1), and replaces the identification information identifying the previously selected printer 4006 (P-2-2) included in the previous reservation information with the identification information identifying the new printer 4006 (P-1).

Further, when the printing environment sharing service 4013 (A-1-1) receives the printing reservation request, the printing reservation control part 4051 of the printing environment sharing service 4013 (A-1-1) provides the stored document data obtaining part 4054 of the printing environment sharing service 4013 (A-1-1) with the identification information identifying the document data stored with the previous reservation information included in the printing reservation request, and requests the stored document data obtaining part 4054 to obtain the corresponding document data.

Receiving the document data obtaining request, the stored document data obtaining part 4054 obtains the corresponding document data from the document data stored in the SPS server 4003 (A-1-1) that is the reservation location based on the identification information identifying the document data.

The printing reservation control part 4051 of the printing environment sharing service 4013 (A-1-1) provides the data transfer part 4044 of the printing environment sharing service 4013 (A-1-1) with the reservation information updated by the reservation information changing part 4056, the document data obtained by the stored document data obtaining part 4054, and document conversion information, and requests the data transfer part 4044 to transfer the reservation information, the document data, and the document conversion information. The document conversion information includes, for instance, channel information to the SPS server 4003 (B-1-2) that can communicate with the print server 4004 (PS-2) managing the previously selected printer 4006 (P-2-2), identification information identifying the print server 4004 (PS-2) managing the previously selected printer 4006 (P-2-2), identification information identifying the previously selected printer 4006 (P-2-2), and the new printing conditions.

Receiving the transfer request, in step S4185 of FIG. 92C, the data transfer part 4044 of the printing environment sharing service 4013 (A-1-1) transfers the reservation information, the document data, and the document conversion information to the printing environment sharing service 4013 (A-1) based on the channel information to the new printing location included in the reservation information and/or on the document conversion information.

When the printing environment sharing service 4013 (A-1) receives the reservation information, the document data, and the document conversion information, in step S4186, the data transfer part 4044 of the printing environment sharing service 4013 (A-1) transfers the reservation information, the document data, and the document conversion information to the printing environment sharing service 4013 (R-0) based on the channel information to the new printing location and/or on the document conversion information.

When the printing environment sharing service 4013 (R-0) receives the reservation information, the document data, and the document conversion information, in step S4187, the data transfer part 4044 of the printing environment sharing service 4013 (R-0) transfers the reservation information, the document data, and the document conversion information to the printing environment sharing service 4013 (B-1) based on the channel information to the new printing location and/or on the document conversion information.

When the printing environment sharing service 4013 (B-1) receives the reservation information, the document data, and the document conversion information, in step S4188, the data transfer part 4044 of the printing environment sharing service 4013 (B-1) transfers the reservation information, the document data, and the document conversion information, to the printing environment sharing service 4013 (B-1-2) based on the channel information to the new printing location and/or on the document conversion information.

When the printing environment sharing service 4013 (B-1-2) receives the reservation information, the document data, and the document conversion information, in step S4189, the conversion request transmission part 4057 of the printing environment sharing service 4013 (B-1-2) transmits a request to convert the document data into printing data to the document print service 4014 (PS-2) based on the document conversion information, the request including the document data.

Receiving the conversion request, in step S4190, the document print service 4014 (PS-2) converts the document data into printing data based on the request, and transmits the printing data to the printing environment sharing service 4013 (B-1-2).

For instance, the document print service 4014 converts the document data into printing data of PDF, TIFF, or PS.

The printing data reception part 4058 of the printing environment sharing service 4013 (B-1-2) receives the printing data, and requests the data transfer part 4044 to transfer the received printing data.

Receiving the transfer request, in step S4191, the data transfer part 4044 of the printing environment sharing service 4013 (B-1-2) transfers the printing data to the printing environment sharing service 4013 (B-1) based on the document conversion information.

When the printing environment sharing service 4013 (B-1) receives the printing data, in step S4192, the data transfer part 4044 of the printing environment sharing service 4013 (B-1) transfers the reservation information received in step S4187 and the printing data received in step S4191 to the printing environment sharing service 4013 (B-1-1) based on the channel information to the new printing location.

When the printing environment sharing service 4013 (B-1-1) obtains the transferred reservation information and printing data, the data transfer part 4044 of the printing environment sharing service 4013 (B-1-1) notifies the printing reservation control part 4051 of the printing environment sharing service 4013 (B-1-1) of the obtaining of the transferred reservation information and printing data. Then, the printing reservation control part 4051 of the printing environment sharing service 4013 (B-1-1) provides the reservation information and the printing data obtained by the data transfer part 4044 of the printing environment sharing service 4013 (B-1-1) to the storage part 4047 of the printing environment sharing service 4013 (B-1-1), and requests the storage part 4047 to store the reservation information and the printing data. Receiving the request, the storage part 4047 stores the reservation information and the printing data in the HDD 4039 of the SPS server 4003 (B-1-1).

On the other hand, the printing reservation control part 4051 of the printing environment sharing service 4013 (A-1-1) provides the storage part 4047 of the printing environment sharing service 4013 (A-1-1) with the reservation information updated by the reservation information changing part 4056 and the document data obtained by the stored document data obtaining part 4054 of the printing environment sharing service 4013 (A-1-1), and requests the storage part 4047 to store the reservation information and the document data.

Receiving the request, the storage part 4047 of the printing environment sharing service 4013 (A-1-1) stores the reservation information and the document data in the HDD 4039 of the SPS server 4003 (A-1-1) that is the reservation location.

Meanwhile, in step S4193 of FIG. 92C, the Web server 4001 transmits a request to obtain a reservation list that can be referred to by the user to the printing environment sharing service 4013 (A-1-1) based on a request from the user who, for instance, has visited the printing location.

When the printing environment sharing service 4013 (A-1-1) receives the request, in step S4194, the reservation list obtaining part 4055 of the printing environment sharing service 4013 (A-1-1) obtains the reservation names and reservation numbers of corresponding reservation information among the reservation information stored in the SPS server 4003 (A-1-1) based on an identifier identifying the user, such as a user ID, included in the request, and transmits the reservation names and numbers as a reservation list to the Web server 4001.

Receiving the reservation list, the Web server 4001 creates a printing reservation selection screen displaying the reservation list as shown in FIG. 91A, and presents the printing reservation selection screen to the user.

For instance, when the user selects RESERVATION 1 and taps on the RESERVATION CONTENTS button 4240a on the printing reservation selection screen of FIG. 91A, in step S4195, the Web server 4001 transmits a request to obtain reservation information corresponding to RESERVATION 1 to the printing environment sharing service 4013 (A-1-1).

When the printing environment sharing service 4013 (A-1-1) receives the request, in step S4196, the reservation information obtaining part 4053 of the printing environment sharing service 4013 (A-1-1) obtains the corresponding reservation information from the reservation information stored in the SPS server 4003 (A-1-1) based on the reservation number included in the request, and transmits the corresponding reservation information to the Web server 4001.

Receiving the reservation information, the Web server 4001 creates a printing reservation contents display screen displaying the reservation information as shown in FIG. 91B, and presents the printing reservation contents display screen to the user.

For instance, when the user confirms the reservation contents and taps on the PRINT button 4241a on the printing reservation contents display screen of FIG. 91B, in step S4197 of FIG. 92C, the Web server 4001 transmits a printing start request including the reservation number to the printing environment sharing service 4013 (A-1-1) in the system configuration of FIG. 73.

When the printing environment sharing service 4013 (A-1-1) receives the printing start request, in step S4198, the printing start control part 4052 of the printing environment sharing service 4013 (A-1-1) transmits the printing start request to the printing environment sharing service 4013 (A-1) based on the channel information to the printing location.

When the printing environment sharing service 4013 (A-1) receives the printing start request, in step S4199, the printing start control part 4052 of the printing environment sharing service 4013 (A-1) transmits the printing start request to the printing environment sharing service 4013 (R-0) based on the channel information to the printing location.

When the printing environment sharing service 4013 (R-0) receives the printing start request, in step S4200, the printing start control part 4052 of the printing environment sharing service 4013 (R-0) transmits the printing start request to the printing environment sharing service 4013 (B-1) based on the channel information to the printing location.

When the printing environment sharing service 4013 (B-1) receives the printing start request, in step S4201, the printing start control part 4052 of the printing environment sharing service 4013 (B-1) transmits the printing start request to the printing environment sharing service 4013 (B-1-1) based on the channel information to the printing location.

When the printing environment sharing service 4013 (B-1-1) receives the printing start request, in step S4202, the printing start control part 4052 of the printing environment sharing service 4013 (B-1-1) obtains the reservation information and the printing data corresponding to the reservation number included in the printing start request from the HDD 4039 of the SPS server 4003 (B-1-1), and transmits a printing start request including the reservation information and the printing data to the document print service 4014 (PS-1).

Receiving the printing start request including the reservation information and the printing data, in step S4203, the document print service 4014 (PS-1) transmits a printing start request including the printing data to the printer 4006 (P-1) included in the reservation information.

Receiving the printing start request, the printer 4006 (P-1) prints the printing data included in the printing start request.

By the Web server 4001 and/or the printing environment sharing services 4013 performing the operation of FIGS. 92A through 92C, the user can change (update) printing reservation information, and print a document based on the changed (updated) printing reservation information.

Either one of the capability information of the printer 4006 (P-1) and the capability information of the printer 4006 (P-2-2) may be obtained earlier than the other.

Further, the operations of step S4171 and S4172 may be omitted. In this case, the printing environment sharing service 4013 (A-1-1) may receive a request to obtain the capability information of printers 4006. Then, the printer capability information obtaining part 4045 of the printing environment sharing service 4013 (A-1-1) may obtain the capability information of the printer 4006 selected before a reservation change and the capability information of the printer 4006 selected after the reservation change, and transmit capability information common to the printers 4006 to the Web server 4001.

In contrast to the operation shown in FIGS. 90A and 90B, in the operation shown in FIGS. 92A through 92C, the Web server 4001 and/or the printing environment sharing service 4013 obtain the capability information of the printer 4006 selected before a reservation change and the capability information of the printer 4006 selected after the reservation change to create a printing condition setting screen based on the common capability information, and the document print service 4014 that manages the printer 4006 selected before the reservation change converts document data into printing data. As a result, in the operation shown in FIGS. 92A through 92C, even if an application necessary for printing a document selected by the user, such as Microsoft Word®, is available in only the print server 4014 including the document print service 4014 that manages the printer 4006 selected before the reservation change, the document can be printed at the newly selected printing location and printer 4006.

Figure 94:
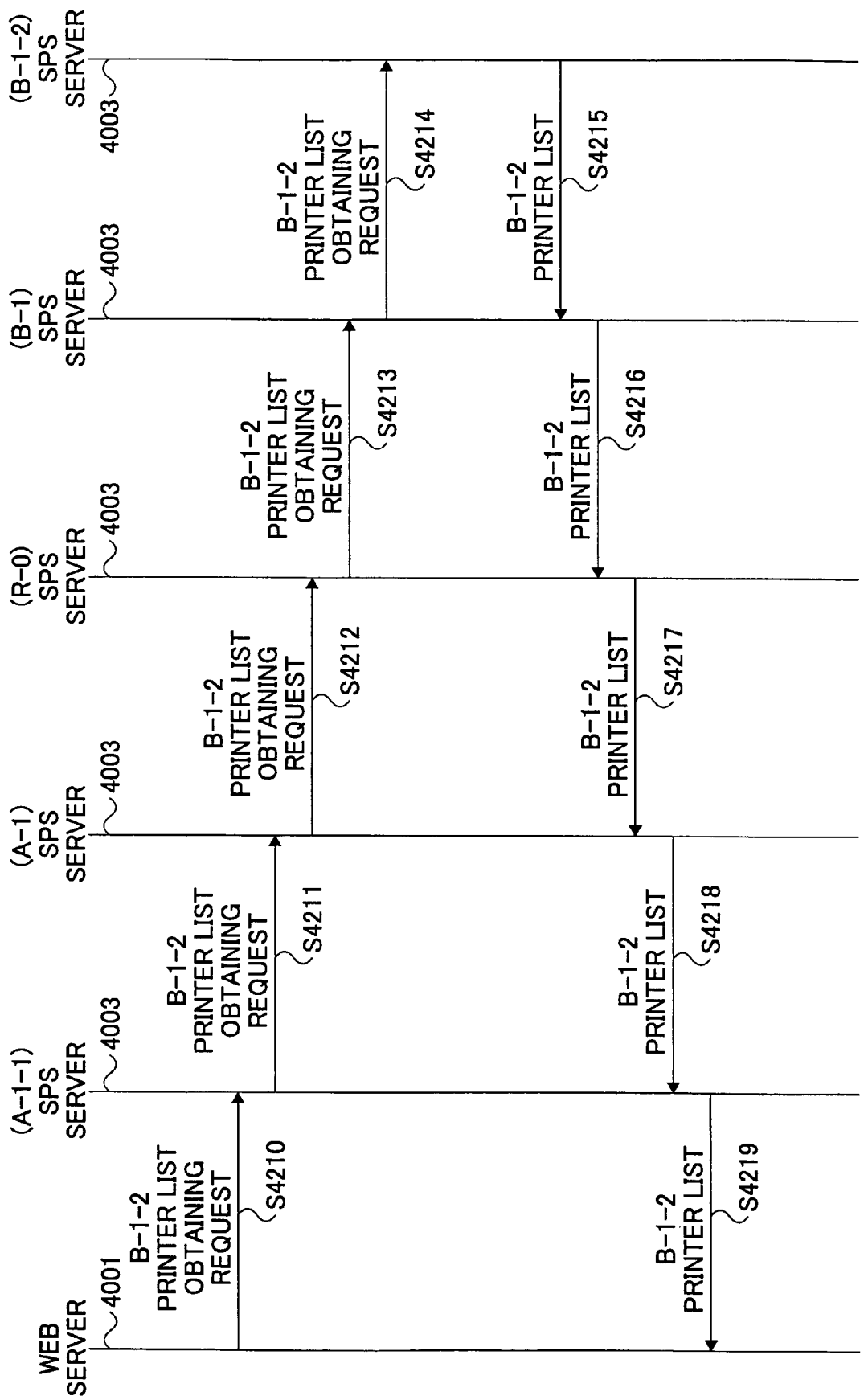
FIG. 94 is a sequence diagrams for illustrating the first printer changing operation according to the fifth embodiment of the present invention.

Next, a description is given, with reference to FIGS. 93A, 93B, and 94, of the operation of changing the printer 4006 (a first printer changing operation).

FIGS. 93A and 93B are diagrams and FIG. 94 is a sequence diagrams for illustrating the first printer changing operation.

For instance, when the user taps on the CHANGE RESERVATION button 4221b on the printing reservation contents display screen of FIG. 87B, the Web server 4001 creates a reservation change screen as shown in FIG. 93A, and presents the reservation change screen to the user.

For instance, when the user selects CHANGE PRINTER and taps on a NEXT button 4250a on the reservation change screen of FIG. 93A, in step S4210 of FIG. 94, in step S4210, the Web server 4001 transmits a request to obtain the printer list 4072 of the printing environment sharing service 4013 (B-1-2) to the printing environment sharing service 4013 (A-1-1) in the system configuration of FIG. 73, the request including the channel information to the printing location (B-1-2) included in the reservation information.

When the printing environment sharing service 4013 (A-1-1) receives the request to obtain the printer list 4072 of the printing environment sharing service 4013 (B-1-2), in step S4211, the printer list obtaining part 42 of the printing environment sharing service 13 (A-1-1) transmits the request to the printing environment sharing service 13 (A-1) based on the channel information.

When the printing environment sharing service 4013 (A-1) receives the request, in step S4212, the printer list obtaining part 4042 of the printing environment sharing service 4013 (A-1) transmits the request to the printing environment sharing service 4013 (R-0) based on the channel information.

When the printing environment sharing service 4013 (R-0) receives the request, in step S4213, the printer list obtaining part 4042 of the printing environment sharing service 4013 (R-0) transmits the request to the printing environment sharing service 4013 (B-1) based on the channel information.

When the printing environment sharing service 4013 (B-1) receives the request, in step S4214, the printer list obtaining part 4042 of the printing environment sharing service 4013 (B-1) transmits the request to the printing environment sharing service 4013 (B-1-2) based on the channel information.

When the printing environment sharing service 4013 (B-1-2) receives the request, in step S4215, the printer list obtaining part 4042 of the printing environment sharing service 4013 (B-1-2) obtains the printer list 4072 stored in the HDD 4039 of the SPS server 4003 (B-1-2), and transmits the obtained printer list 4072 to the printing environment sharing service 4013 (B-1) based on the channel information.

In step S4216, the printer list obtaining part 4042 of the printing environment sharing service 4013 (B-1) transmits the received printer list 4072 of the printing environment sharing service 4013 (B-1-2) to the printing environment sharing service 4013 (R-0) based on the channel information.

In step S4217, the printer list obtaining part 4042 of the printing environment sharing service 4013 (R-0) transmits the received printer list 4072 of the printing environment sharing service 4013 (B-1-2) to the printing environment sharing service 4013 (A-1) based on the channel information.

In step S4218, the printer list obtaining part 4042 of the printing environment sharing service 4013 (A-1) transmits the received printer list 4072 of the printing environment sharing service 4013 (B-1-2) to the printing environment sharing service 4013 (A-1-1) based on the channel information.

In step S4219, the printer list obtaining part 4042 of the printing environment sharing service 4013 (A-1-1) transmits the received printer list 4072 of the printing environment sharing service 4013 (B-1-2) to the Web server 4001.

Then, the Web server 4001 creates a printer change screen as shown in FIG. 93B based on the received printer list 4072 of the printing environment sharing service 4013 (B-1-2), and presents the printer change screen to the user.

On the printer change screen of FIG. 93B, the printer 4006 (P-2-1) that can be referred to and used by the printing environment sharing service 4013 (B-1-2) is displayed together with the currently selected printer 6 (P-2-2).

The user can change printers by using a printer change screen as shown in FIG. 93B.

For instance, when the user makes a printing reservation after changing the printer 4006 (P-2-2) to the printer 4006 (P-2-1) and setting printing conditions successively thereafter, the reservation information changing part 4056 of the printing environment sharing service 4013 (A-1-1) replaces the previous reservation information with the new reservation information.

For instance, the reservation information changing part 4056 of the printing environment sharing service 4013 (A-1-1) replaces the identification information identifying the printer 4006 (P-2-2) included in the previous reservation information with the identification information identifying the new printer (P-2-1), and replaces the printing conditions included in the previous reservation information with the new printing conditions.

Figure 96:
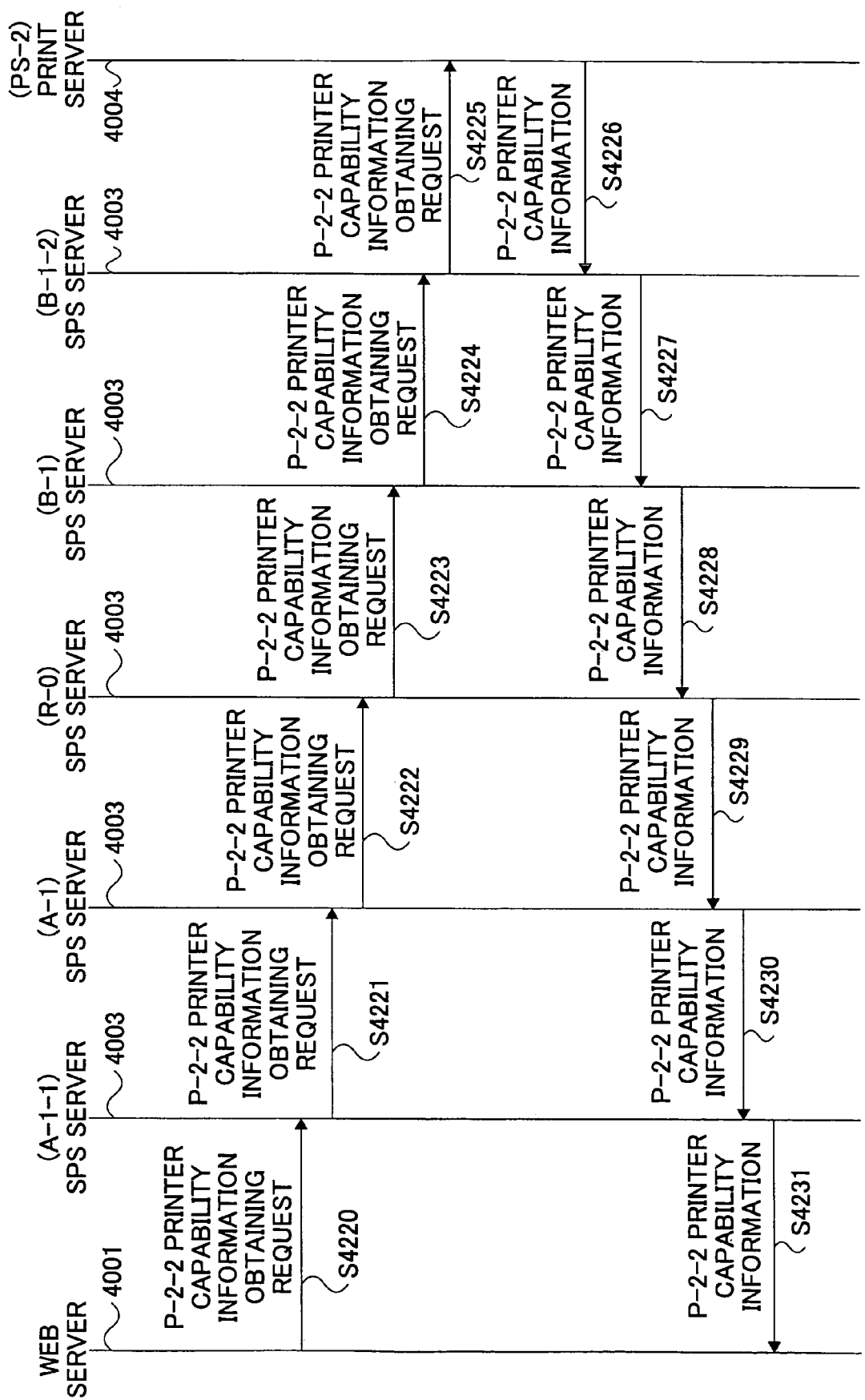
FIG. 96 is a sequence diagram for illustrating the first printing condition changing operation according to the fifth embodiment of the present invention.

Next, a description is given, with reference to FIGS. 95A, 95B, and 96, of a first printing condition changing operation.

FIGS. 95A and 95B are diagrams and FIG. 96 is a sequence diagram for illustrating the first printing condition changing operation.

For instance, when the user taps on the CHANGE RESERVATION button 4221b on the printing reservation contents display screen of FIG. 87B, the Web server 4001 creates a reservation change screen as shown in FIG. 95A, and presents the reservation change screen to the user.

For instance, when the user selects CHANGE PRINTING CONDITIONS, and taps on a NEXT button 4260a on the reservation change screen of FIG. 95A, in step S4220 of FIG. 96, the Web server 4001 transmits a request to obtain the capability information of the printer 4006 (P-2-2) to the printing environment sharing service 4013 (A-1-1) in the system configuration of FIG. 73.

When the printing environment sharing service 4013 (A-1-1) receives the request to obtain the capability information of the printer 4006 (P-2-2), in step S4221, the printer capability information obtaining part 4045 of the printing environment sharing service 4013 (A-1-1) transmits the request to the printing environment sharing service 4013 (A-1) based on the channel information to the printing location.

When the printing environment sharing service 4013 (A-1) receives the request, in step S4222, the printer capability information obtaining part 4045 of the printing environment sharing service 4013 (A-1) transmits the request to the printing environment sharing service 4013 (R-0) based on the channel information.

When the printing environment sharing service 4013 (R-0) receives the request, in step S4223, the printer capability information obtaining part 4045 of the printing environment sharing service 4013 (R-0) transmits the request to the printing environment sharing service 4013 (B-1) based on the channel information.

When the printing environment sharing service 4013 (B-1) receives the request, in step S4224, the printer capability information obtaining part 4045 of the printing environment sharing service 4013 (B-1) transmits the request to the printing environment sharing service 4013 (B-1-2) based on the channel information.

When the printing environment sharing service 4013 (B-1-2) receives the request, in step S4225, the printer capability information obtaining part 4045 of the printing environment sharing service 4013 (B-1-2) transmits the request to the document print service 4014 (PS-2).

Receiving the request, in step S4226, the document print service 4014 (PS-2) obtains the capability information of the printer 4006 (P-2-2) stored in, for instance, the print server 4004 (PS-2), and transmits the obtained capability information to the printing environment sharing service 4013 (B-1-2).

In step S4227, the printer capability information obtaining part 4045 of the printing environment sharing service 4013 (B-1-2) transmits the received capability information of the printer 4006 (P-2-2) to the printing environment sharing service 4013 (B-1) based on the channel information.

In step S4228, the printer capability information obtaining part 4045 of the printing environment sharing service 4013 (B-1) transmits the received capability information of the printer 4006 (P-2-2) to the printing environment sharing service 4013 (R-0) based on the channel information.

In step S4229, the printer capability information obtaining part 4045 of the printing environment sharing service 4013 (R-0) transmits the received capability information of the printer 4006 (P-2-2) to the printing environment sharing service 4013 (A-1) based on the channel information.

In step S4230, the printer capability information obtaining part 4045 of the printing environment sharing service 4013 (A-1) transmits the received capability information of the printer 4006 (P-2-2) to the printing environment sharing service 4013 (A-1-1) based on the channel information.

In step S4231, the printer capability information obtaining part 4045 of the printing environment sharing service 4013 (A-1-1) transmits the received capability information of the printer 4006 (P-2-2) to the Web server 4001.

Then, the Web server 4001 creates a printing condition change screen as shown in FIG. 95B based on the received capability information of the printer 4006 (P-2-2), and presents the printing condition change screen to the user.

The user can change printing conditions using the printing condition change screen of FIG. 95B.

For instance, when the user changes printing conditions and makes a printing reservation, the reservation information changing part 4056 of the printing environment sharing service 4013 (A-1-1) changes previous reservation information to new reservation information.

For instance, the reservation information changing part 4056 of the printing environment sharing service 4013 (A-1-1) replaces printing conditions included in the previous reservation information (A4, landscape, color, no duplex printing, and five copies) to new printing conditions (A4, landscape, black and white, duplex printing, and eight copies).

In the fifth embodiment, printing is reserved and started, and a reservation is changed via the Web server 4001. In the following sixth embodiment, a description is given of a case of changing a reservation using an operation terminal connected to the SPS server 4003.

Sixth Embodiment

Figure 97:
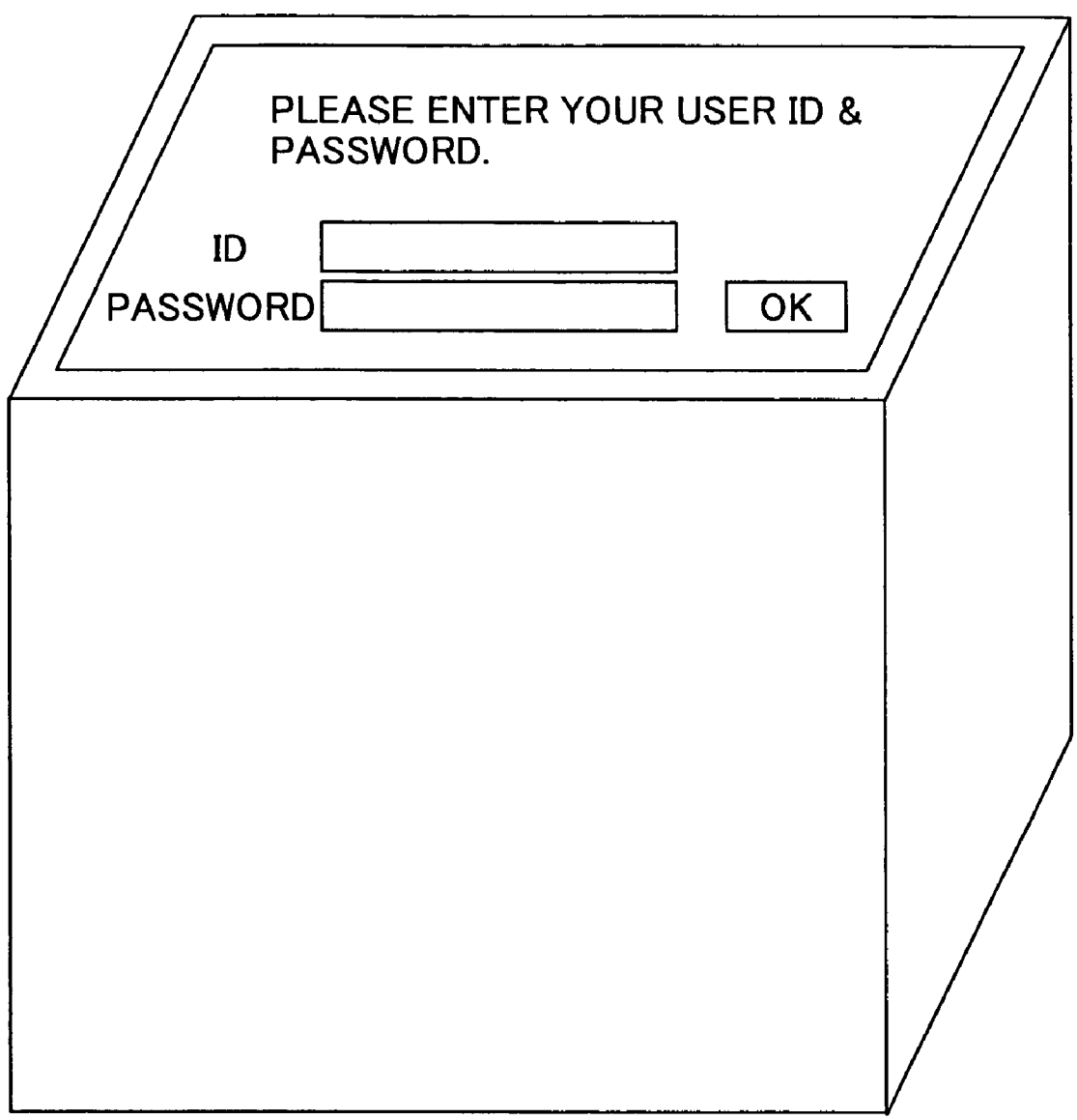
FIG. 97 is a concept diagram for illustrating an operation terminal according to a sixth embodiment of the present invention.

FIG. 97 is a concept diagram for illustrating an operation terminal according to the sixth embodiment of the present invention.

The operation terminal, which is connected to the SPS server 4003, includes a touch panel. The operation terminal displays below-described screens such as a printing reservation selection screen, a reservation change screen, and a printing location change screen on the touch panel, and receives inputs from a user.

The operation terminal also includes a slot. A recording medium such as an SD memory card can be inserted into and extracted from the slot. The operation terminal reads data written to the recording medium inserted into the slot.

As described below, for instance, the user writes channel information to a printing location on the recording medium and inserts the recording medium into the slot of the operation terminal, thereby providing the channel information.

A description is given below, with reference to FIG. 98, of a functional configuration of the SPS server 4003 according to the sixth embodiment.

Figure 98:
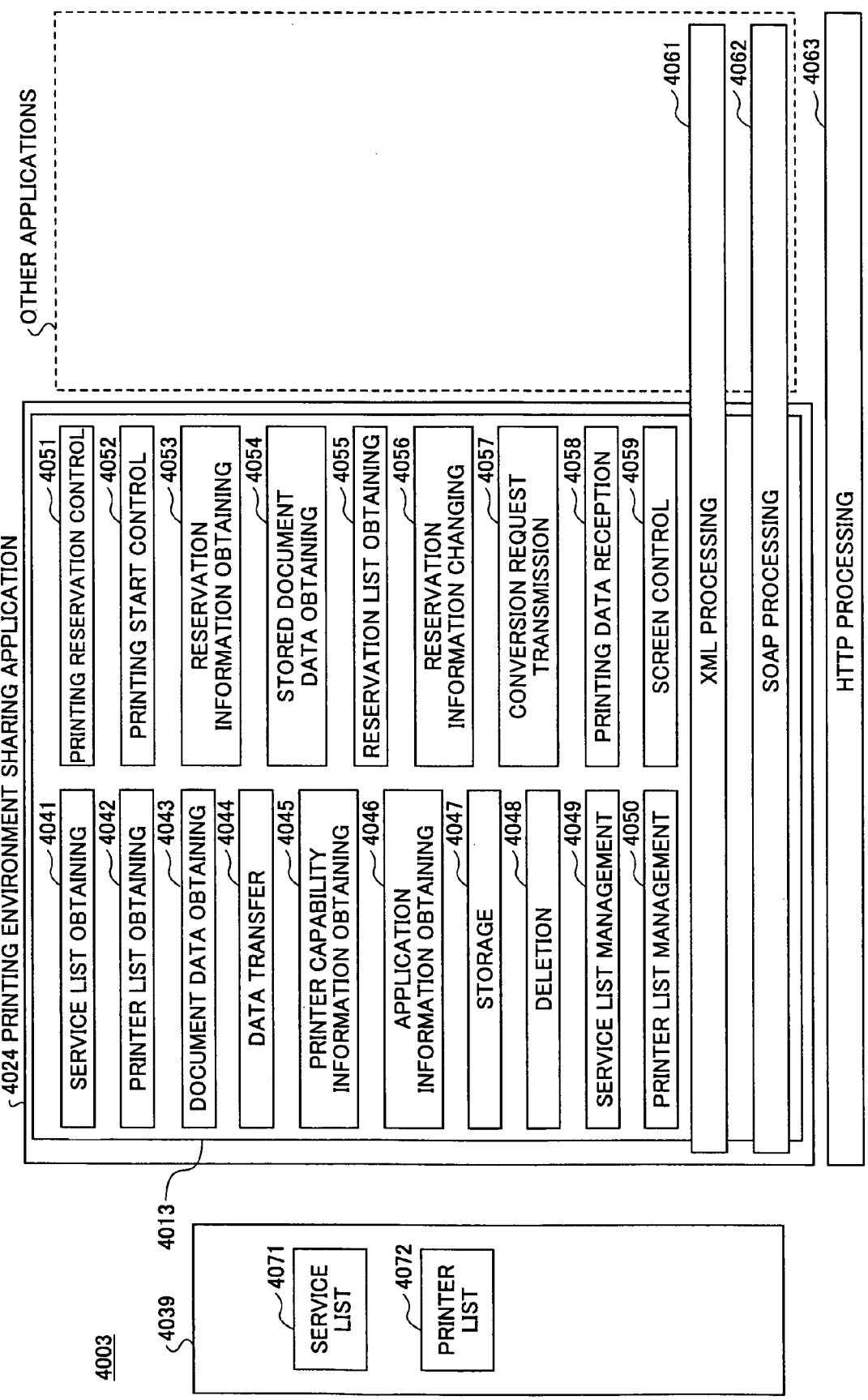
FIG. 98 is a block diagram showing a functional configuration of the SPS server according to the sixth embodiment of the present invention.

The functional configuration of the SPS server 4003 of FIG. 98 is different from that of the SPS server 4003 of FIG. 76 in that a screen control part 4059 is newly added to the printing environment sharing service 4013 in FIG. 98.

The screen control part 4059 creates below described screens such as a printing reservation selection screen, a reservation change screen, and a printing location change screen, and provides the created screens to the operation terminal. Further, the screen control part 4059 performs control based on data entered by the user through the touch panel of the operation terminal.

A description is given below, with reference to FIGS. 99A through 105, of the changing of a printing location.

In the following description, it is assumed for simplification that each SPS server 4003 is integrated with the operation terminal so as to have the touch panel and the slot described with reference to FIG. 97. However, this does not limit the implementation of the present invention.

In the sixth embodiment, the same system configuration as that shown in FIG. 73 of the fifth embodiment is used.

Figures 99A, 99B, 99C, 99D, 99E, 99F, 99G:
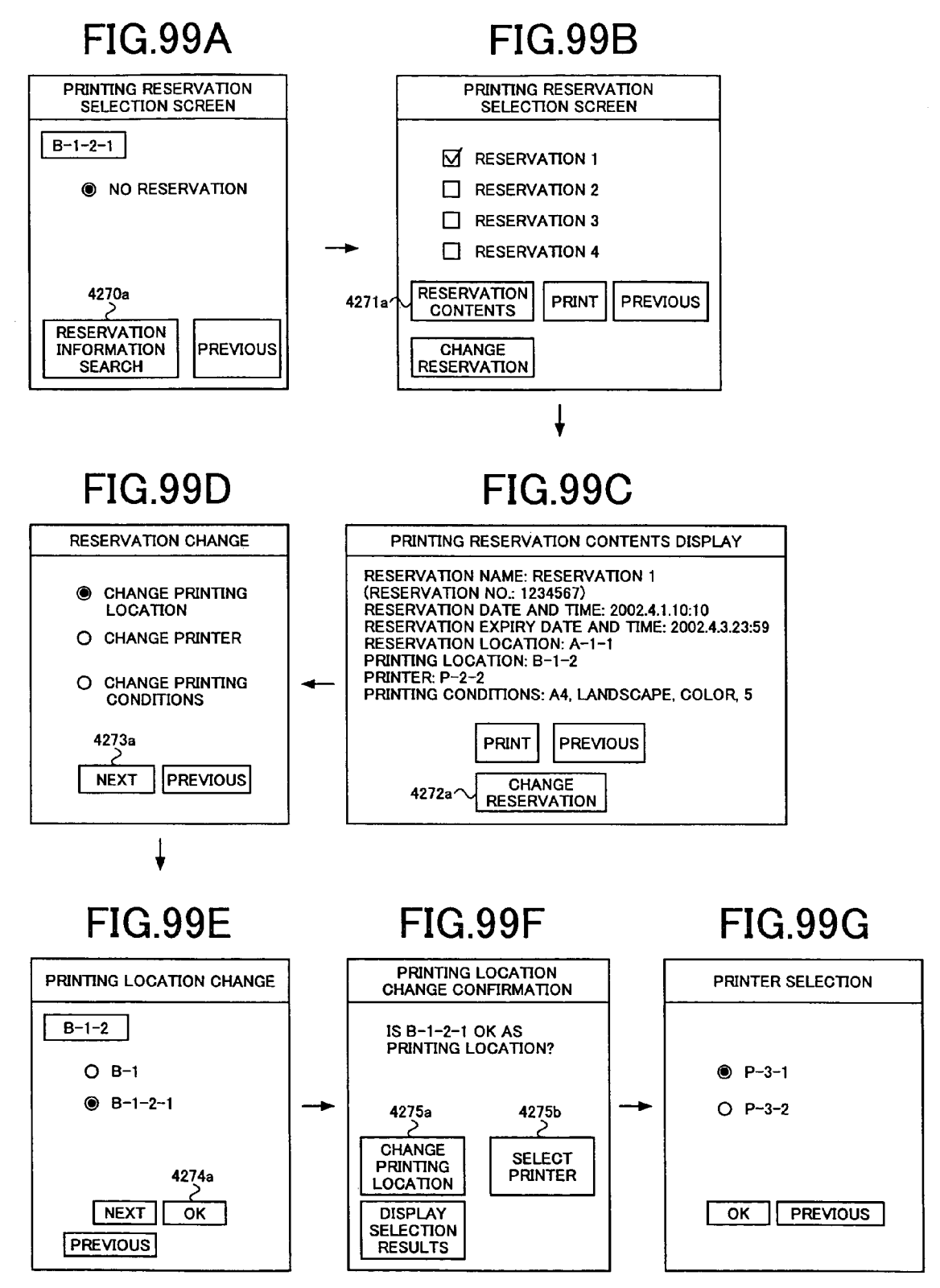
Figure 100:
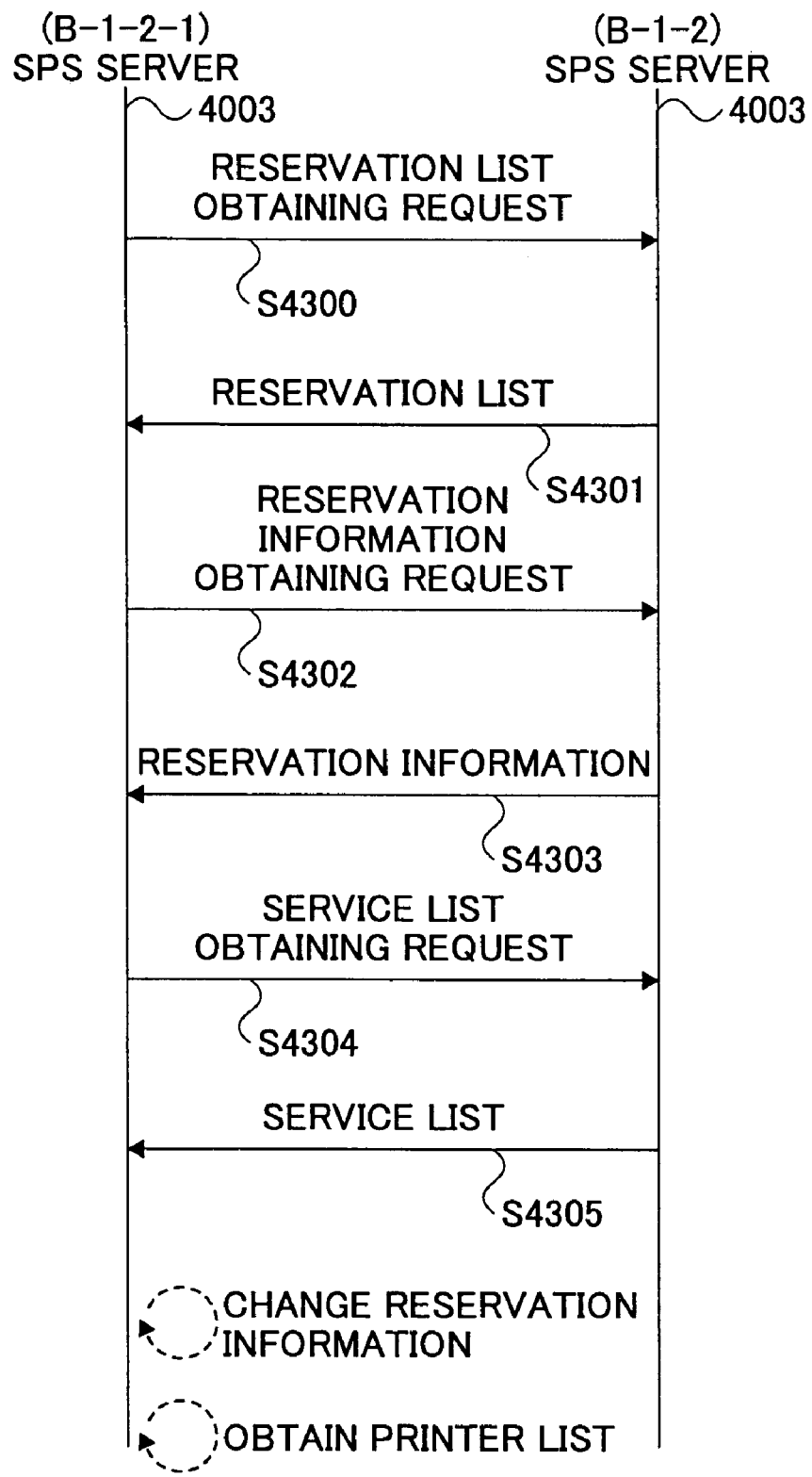
FIG. 100 is a sequence diagram for illustrating the second printing location changing operation according to the sixth embodiment of the present invention.

FIGS. 99A through 99B are diagrams and FIG. 100 is a sequence diagram for illustrating a second printing location changing operation.

In FIGS. 99A through 99B and 100, a description is given of a case of the user changing the printing location from B-1-2 to B-1-2-1 using the SPS server 4003 (B-1-2-1). Further, in the case of FIGS. 99A through 99B and 100, a recording medium on which channel information is recorded is inserted into the slot of the SPS server 4003 (B-1-2-1) by the user so that the channel information is provided to the SPS server 4003 (B-1-2-1).

For instance, it is assumed that the user has selected the printing environment sharing service 4013 (B-1-2) as a printing location and has made a printing reservation. In this case, when the reservation list obtaining part 4055 of the printing environment sharing service 4013 (B-1-2-1) is informed by the screen control part 4059 of the printing environment sharing service 4013 (B-1-2-1) that the user has entered her/his user ID and password and performed a predetermined operation such as the tapping of a printing reservation selection screen display button, operating the touch panel of the SPS server 4003 (B-1-2-1), the reservation list obtaining part 4055 searches the reservation information stored in the HDD 4039 of the SPS server 4003 (B-1-2-1) for reservation information corresponding to the user ID.

For instance, when the screen control part 4059 of the printing environment sharing service 4013 (B-1-2-1) is informed by the reservation list obtaining part 4055 of the printing environment sharing service 4013 (B-1-2-1) that no corresponding reservation information is stored, the screen control part 4059 creates a printing reservation selection screen as shown in FIG. 99A, and presents the printing reservation selection screen to the user, displaying the screen on the touch panel.

When the reservation list obtaining part 4055 of the printing environment sharing service 4013 (B-1-2-1) is informed by the screen control part 4059 of the printing environment sharing service 4013 (B-1-2-1) that the user has selected NO RESERVATION and tapped on a RESERVATION INFORMATION SEARCH button 4270a on the printing reservation selection screen of FIG. 99A, in step S4300 of FIG. 100, the reservation list obtaining part 4055 refers to the service list 4071 of the printing environment sharing service 4013 (B-1-2-1), and transmits a request to obtain a reservation list to the printing environment sharing service 4013 (B-1-2) superordinate to the printing environment sharing service 4013 (B-1-2-1). The reservation list obtaining request includes the user ID.

When the printing environment sharing service 4013 (B-1-2) receives the request, in step S4301, the reservation list obtaining part 4055 of the printing environment sharing service 4013 (B-1-2) obtains the reservation names and reservation numbers of corresponding reservation information among the reservation information stored in the SPS server 4003 (B-1-2) based on the user ID included in the request, and transmits the reservation names and numbers as a reservation list to the printing environment sharing service 4013 (B-1-2-1).

The reservation list obtaining part 4055 of the printing environment sharing service 4013 (B-1-2-1) provides the received reservation list to the screen control part 4059 of the printing environment sharing service 4013 (B-1-2-1). Then, the screen control part 4059 of the printing environment sharing service 4013 (B-1-2-1) creates a printing reservation selection screen displaying the reservation list as shown in FIG. 99B, and presents the printing reservation selection screen to the user, displaying the screen on the touch panel.

For instance, when the reservation information obtaining part 4053 of the printing environment sharing service 4013 (B-1-2-1) is informed by the screen control part 4059 of the printing environment sharing service 4013 (B-1-2-1) that the user has selected RESERVATION 1 and tapped on a RESERVATION CONTENTS button 4271a on the printing reservation selection screen of FIG. 99B, in step S4302, the reservation information obtaining part 4053 transmits a request to obtain reservation information corresponding to RESERVATION 1 to the printing environment sharing service 4013 (B-1-2).

When the printing environment sharing service 4013 (B-1-2) receives the request, in step S4303, the reservation information obtaining part 4053 of the printing environment sharing service 4013 (B-1-2) obtains the corresponding reservation information from the reservation information stored in the SPS server 4003 (B-1-2) based on the reservation number included in the request, and transmits the obtained reservation information to the printing environment sharing service 4013 (B-1-2-1).

The reservation information obtaining part 4053 of the printing environment sharing service 4013 (B-1-2-1) provides the received reservation information to the screen control part 4059 of the printing environment sharing service 4013 (B-1-2-1). Then, the screen control part 4059 of the printing environment sharing service 4013 (B-1-2-1) creates a printing reservation contents display screen displaying the reservation information as shown in FIG. 99C, and presents the printing reservation contents display screen to the user, displaying the screen on the touch panel.

For instance, when the user taps on a CHANGE RESERVATION button 4272a on the printing reservation contents display screen of FIG. 99C, the screen control part 4059 of the printing environment sharing service 4013 (B-1-2-1) creates a reservation change screen as shown in FIG. 99D, and presents the reservation change screen to the user, displaying the screen on the touch panel.

For instance, when the service list obtaining part 4041 of the printing environment sharing service 4013 (B-1-2-1) is informed by the screen control part 4059 of the printing environment sharing service 4013 (B-1-2-1) that the user has selected CHANGE PRINTING LOCATION and tapped on a NEXT button 4273a on the reservation change screen of FIG. 99D, in step S4304, the service list obtaining part 4041 transmits a request to obtain the service list 4071 of the printing environment sharing service 4013 (B-1-2) to the printing environment sharing service 4013 (B-1-2).

When the printing environment sharing service 4013 (B-1-2) receives the request, in step S4305, the service list obtaining part 4041 of the printing environment sharing service 4013 (B-1-2) obtains the service list 4071 stored in the HDD 4039 of the SPS server 4003 (B-1-2), and transmits the service list 4071 to the printing environment sharing service 4013 (B-1-2-1).

When the printing environment sharing service 4013 (B-1-2-1) receives the service list 4071 of the printing environment sharing service 4013 (B-1-2), the service list obtaining part 4041 of the printing environment sharing service 4013 (B-1-2-1) provides the service list 4071 of the printing environment sharing service 4013 (B-1-2) to the screen control part 4059 of the printing environment sharing service 4013 (B-1-2-1). Then, the screen control part 4059 of the printing environment sharing service 4013 (B-1-2-1) creates a printing location change screen as shown in FIG. 99E based on the service list 4071 of the printing environment sharing service 4013 (B-1-2), and presents the printing location change screen to the user, displaying the screen on the touch panel.

For instance, when the user selects "B-1-2-1" and taps on an OK button 4274a on the printing location change screen of FIG. 99E, the screen control part 4059 of the printing environment sharing service 4013 (B-1-2-1) creates a printing location change confirmation screen as shown in FIG. 99F, and presents the printing location change confirmation screen to the user, displaying the screen on the touch panel.

For instance, when the reservation information changing part 4056 of the printing environment sharing service 4013 (B-1-2-1) is informed by the screen control part 4059 of the printing environment sharing service 4013 (B-1-2-1) that the user has tapped on a CHANGE PRINTING LOCATION button 4275a on the printing location change confirmation screen of FIG. 99F, the reservation information changing part 4056 replaces identification information identifying the printing location (B-1-2) included in the previous reservation information obtained by the reservation information obtaining part 4053 in step S4303 with identification information identifying the new printing location (B-1-2-1).

Further, when the printing environment sharing service 4013 (B-1-2-1) is informed by the screen control part 4059 of the printing environment sharing service 4013 (B-1-2-1) that the user has tapped on the CHANGE PRINTING LOCATION button 4275a on the printing location change confirmation screen of FIG. 99F, the printing environment sharing service 4013 (B-1-2-1) adds "B-1-2-1" to the channel information from A-1-1 to B-1-2.

Further, when the printing reservation control part 4051 of the printing environment sharing service 4013 (B-1-2-1) is informed of the changing (updating) of the reservation information by the reservation information changing part 4056 of the printing environment sharing service 4013 (B-1-2-1), the printing reservation control part 4051 provides the storage part 4047 of the printing environment sharing service 4013 (B-1-2-1) with a request to store the updated reservation information. Receiving the request, the storage part 4047 of the printing environment sharing service 4013 (B-1-2-1) stores the reservation information updated by the reservation information changing part 4056 of the printing environment sharing service 4013 (B-1-2-1) in the HDD 4039. The same applies in the following.

Further, the reservation information changing part 4056 of the printing environment sharing service 4013 (B-1-2-1) may transfer the updated reservation information to the SPS server 4003 (A-1-1) of the printing reservation location using the channel information in the system configuration of FIG. 73, for instance, so that the reservation information stored in the printing reservation location may be replaced with the updated reservation information. The same applies in the following.

By the printing environment sharing services 4013 performing the above-described operation, the user can directly operate the SPS server 4003 and change a printing location.

Further, for instance, when the printer list obtaining part 4042 of the printing environment sharing service 4013 (B-1-2-1) is informed by the screen control part 4059 of the printing environment sharing service 4013 (B-1-2-1) that the user has tapped on a SELECT PRINTER button 4275b on the printing location change confirmation screen of FIG. 99F, the printer list obtaining part 4042 obtains the printer list 4072 stored in the HDD 4039 of the SPS server 4003 (B-1-2-1), and provides the printer list 4072 to the screen control part 4059 of the printing environment sharing service 4013 (B-1-2-1). Then, the screen control part 4059 of the printing environment sharing service 4013 (B-1-2-1) creates a printer selection screen as shown in FIG. 99G based on the printer list 4072 of the printing environment sharing service 4013 (B-1-2-1), and presents the printer selection screen to the user, displaying the screen on the touch panel.

Using the printer selection screen of FIG. 99G, the user can select a printer 4006 available at the new printing location.

Next, a description is given below, with reference to FIGS. 101A through 103, of cases of the user changing the printing location from B-1-2 to B-1-1 using the SPS server 4003 (B-1-1). In the case of FIGS. 101A through 103, it is assumed that no channel information is provided to the SPS server 4003 (B-1-1).

Figure 102:
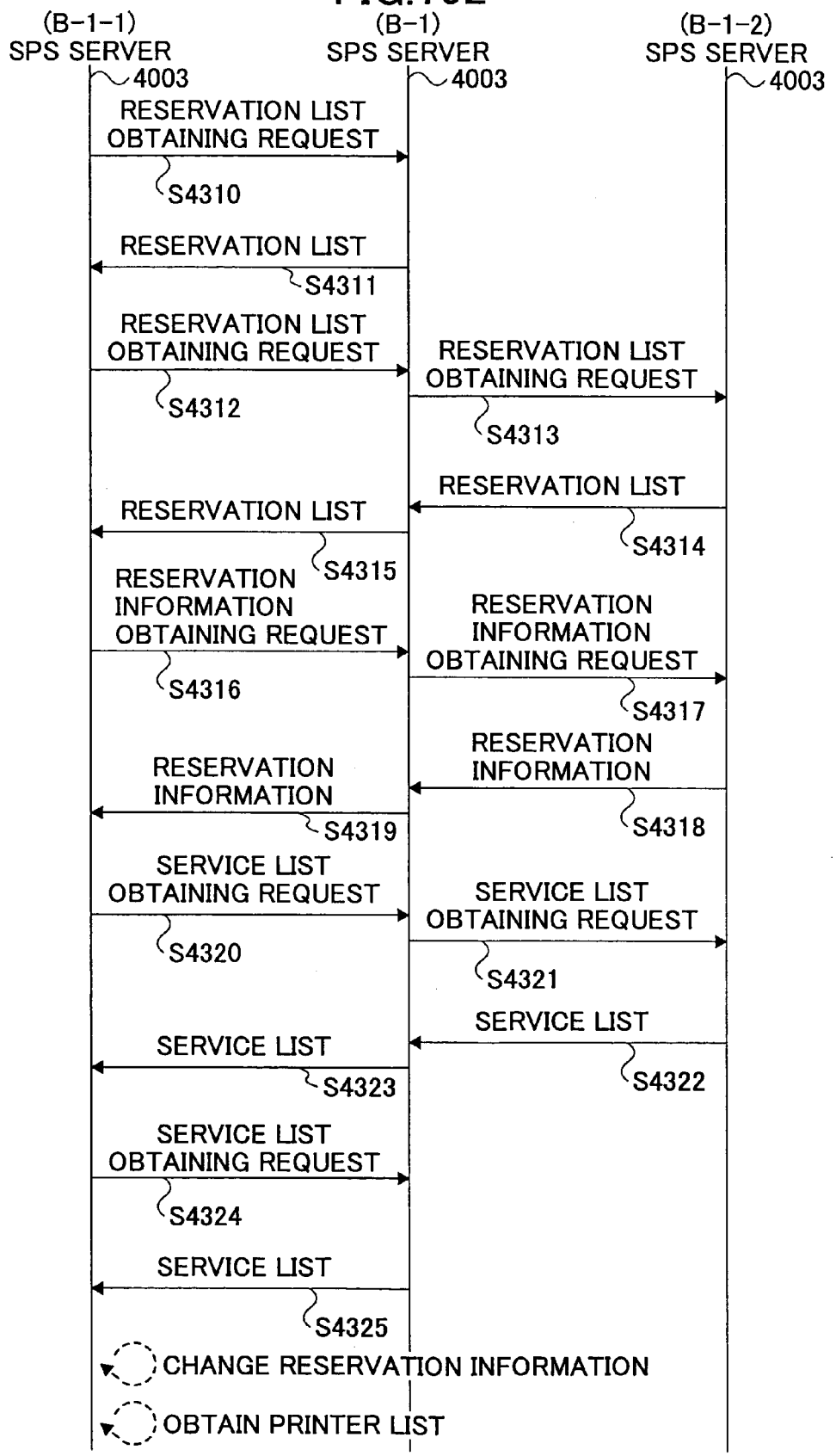
FIG. 102 is a sequence diagram for illustrating the third printing location changing operation according to the sixth embodiment of the present invention.
Figure 103:
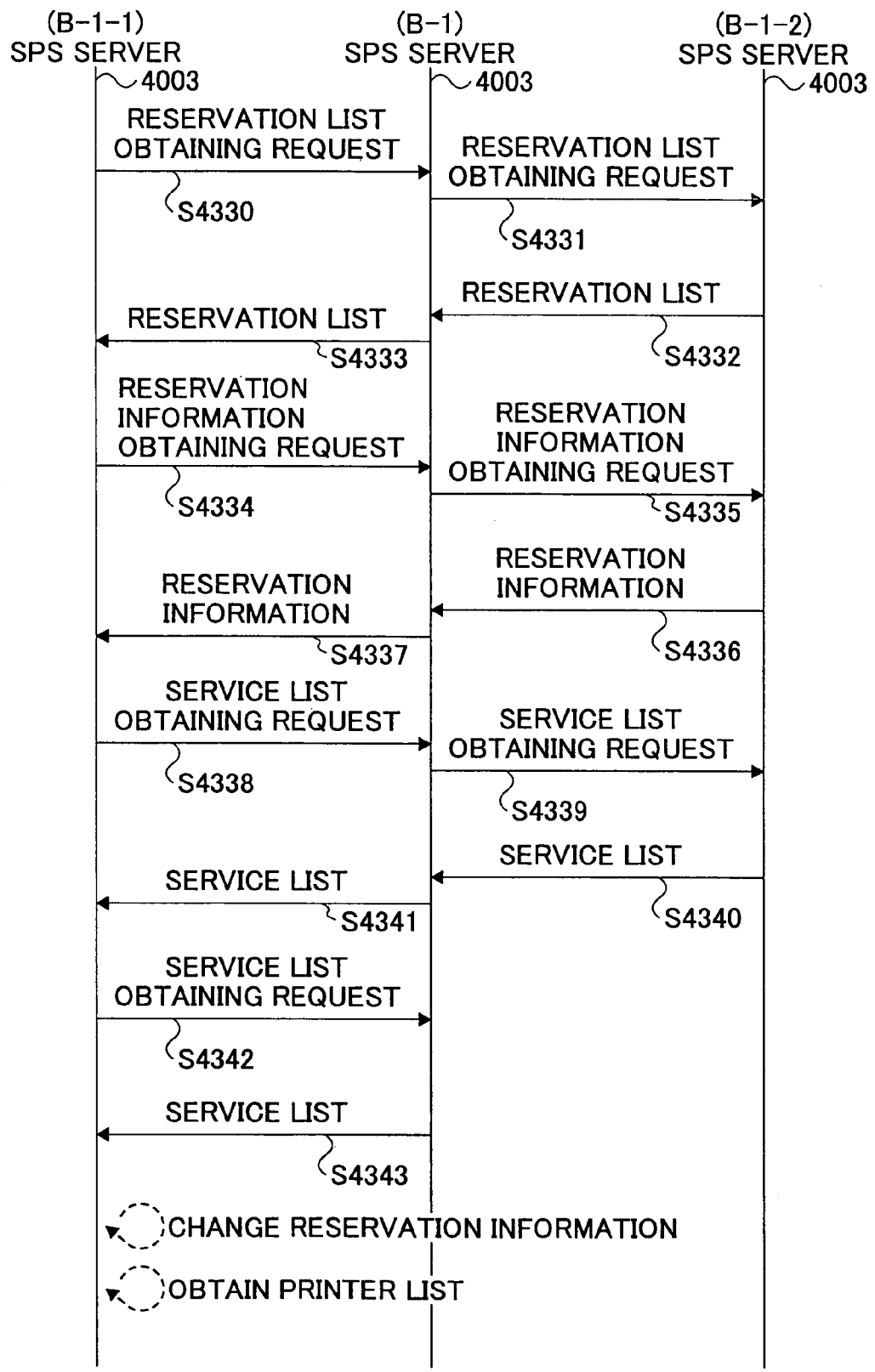
FIG. 103 is a sequence diagram for illustrating the fourth printing location changing operation according to the sixth embodiment of the present invention.

FIGS. 101A through 101H are diagrams for illustrating the changing of a printing location. FIGS. 102 and 103 are sequence diagrams for illustrating printing location changing operations.

For instance, it is assumed that the user has selected the printing environment sharing service 4013 (B-1-2) as a printing location and has made a printing reservation. In this case, when the reservation list obtaining part 4055 of the printing environment sharing service 4013 (B-1-1) is informed by the screen control part 4059 of the printing environment sharing service 4013 (B-1-1) that the user has entered her/his user ID and password and performed a predetermined operation such as the tapping of a printing reservation selection screen display button, operating the touch panel of the SPS server 4003 (B-1-1), the reservation list obtaining part 4055 searches the reservation information stored in the HDD 4039 of the SPS server 4003 (B-1-1) for reservation information corresponding to the user ID.

For instance, when the screen control part 4059 of the printing environment sharing service 4013 (B-1-1) is informed by the reservation list obtaining part 4055 of the printing environment sharing service 4013 (B-1-1) that no corresponding reservation information is stored, the screen control part 4059 creates a printing reservation selection screen as shown in FIG. 101A, and presents the printing reservation selection screen to the user, displaying the screen on the touch panel.

When the reservation list obtaining part 4055 of the printing environment sharing service 4013 (B-1-1) is informed by the screen control part 4059 of the printing environment sharing service 4013 (B-1-1) that the user has selected NO RESERVATION and tapped on a RESERVATION INFORMATION SEARCH button 4280a on the printing reservation selection screen of FIG. 101A, in step S4310 of FIG. 102, the reservation list obtaining part 4055 refers to the service list 4071 of the printing environment sharing service 4013 (B-1-1), creates channel information for information searching (B-1-1→B-1), and transmits a reservation list obtaining request including the user ID to the printing environment sharing service 4013 (B-1) superordinate to the printing environment sharing service 4013 (B-1-1).

When the printing environment sharing service 4013 (B-1) receives the request, in step S4311, the reservation list obtaining part 4055 of the printing environment sharing service 4013 (B-1) obtains the reservation names and reservation numbers of corresponding reservation information among the reservation information stored in the SPS server 4003 (B-1) based on the user ID included in the request. However, when no corresponding reservation information is stored, the reservation list obtaining part 4055 of the printing environment sharing service 4013 (B-1) transmits a response to the effect that no corresponding reservation information is stored to the printing environment sharing service 4013 (B-1-1) based on the channel information for information searching (B-1-1→B-1).

When the printing environment sharing service 4013 (B-1-1) receives the response to the effect that no corresponding reservation information is stored, in step S4312, the reservation list obtaining part 4055 of the printing environment sharing service 4013 (B-1-1) transmits to the printing environment sharing service 4013 (B-1) superordinate thereto, based on the channel information for information searching (B-1-1→B-1), a reservation list obtaining request including the user ID to a printing environment sharing service 4013 subordinate to the printing environment sharing service 4013 (B-1).

When the printing environment sharing service 4013 (B-1) receives the request, in step S4313, the reservation list obtaining part 4055 of the printing environment sharing service 4013 (B-1) refers to the service list 4071 of the printing environment sharing service 4013 (B-1), adds channel information from B-1 to B-1-2 to the channel information for information searching (B-1-1→B-1), and transmits the reservation list obtaining request including the user ID to the printing environment sharing service 4013 (B-1-2), which is subordinate to the printing environment sharing service 4013 (B-1), based on the channel information for information searching (B-1-1→B-1→B-1-2).

When the printing environment sharing service 4013 (B-1-2) receives the request, in step S4314, the reservation list obtaining part 4055 of the printing environment sharing service 4013 (B-1-2) obtains the reservation names and reservation numbers of corresponding reservation information among the reservation information stored in the SPS server 4003 (B-1-2) based on the user ID included in the request, and transmits the reservation names and numbers as a reservation list to the printing environment sharing service 4013 (B-1) based on channel information for information searching B-1-1→B-1→B-1-2.

When the printing environment sharing service 4013 (B-1) receives the reservation list, in step S4315, the reservation list obtaining part 4055 of the printing environment sharing service 4013 (B-1) transmits the reservation list to the printing environment sharing service 4013 (B-1-1), which has requested the reservation list, based on the channel information for information searching B-1-1→B-1→B-1-2.

The reservation list obtaining part 4055 of the printing environment sharing service 4013 (B-1-1) provides the received reservation list to the screen control part 4059 of the printing environment sharing service 4013 (B-1-1). Then, the screen control part 4059 of the printing environment sharing service 4013 (B-1-1) creates a printing reservation selection screen displaying the reservation list as shown in FIG. 101B, and presents the printing reservation selection screen to the user, displaying the screen on the touch panel.

For instance, when the reservation information obtaining part 4053 of the printing environment sharing service 4013 (B-1-1) is informed by the screen control part 4059 of the printing environment sharing service 4013 (B-1-1) that the user has selected RESERVATION 1 and tapped on a RESER- VATION CONTENTS button 4281*a* on the printing reservation selection screen of FIG. 101B, in step S4316, the reservation information obtaining part 4053 transmits a request to obtain reservation information corresponding to RESERVATION 1 stored in the SPS server 4003 (B-1-2) to the printing environment sharing service 4013 (B-1) based on the channel information for information searching B-1-1→B-1→B-1-2.

When the printing environment sharing service 4013 (B-1) receives the request, in step S4317, the reservation information obtaining part 4053 of the printing environment sharing service 4013 (B-1) transmits the request to the printing environment sharing service 4013 (B-1-2) based on the channel information for information searching B-1-1→B-1→B-1-2.

When the printing environment sharing service 4013 (B-1-2) receives the request, in step S4318, the reservation information obtaining part 4053 of the printing environment sharing service 4013 (B-1-2) obtains the corresponding reservation information from the reservation information stored in the SPS server 4003 (B-1-2) based on the reservation number included in the request, and transmits the obtained reservation information to the printing environment sharing service 4013 (B-1) based on the channel information for information searching B-1-1→B-1→B-1-2.

When the printing environment sharing service 4013 (B-1) receives the reservation information, in step S4319, the reservation information obtaining part 4053 of the printing environment sharing service 4013 (B-1) transmits the reservation information to the printing environment sharing service 4013 (B-1-1) based on the channel information for information searching B-1-1→B-1→B-1-2.

The reservation information obtaining part 4053 of the printing environment sharing service 4013 (B-1-1) provides the received reservation information to the screen control part 4059 of the printing environment sharing service 4013 (B-1-1). Then, the screen control part 4059 of the printing environment sharing service 4013 (B-1-1) creates a printing reservation contents display screen displaying the reservation information as shown in FIG. 101C, and presents the printing reservation contents display screen to the user, displaying the screen on the touch panel.

For instance, when the user taps on a CHANGE RESERVATION button 4282*a* on the printing reservation contents display screen of FIG. 101C, the screen control part 4059 of the printing environment sharing service 4013 (B-1-1) creates a reservation change screen as shown in FIG. 101D, and presents the reservation change screen to the user, displaying the screen on the touch panel.

For instance, when the service list obtaining part 4041 of the printing environment sharing service 4013 (B-1-1) is informed by the screen control part 4059 of the printing environment sharing service 4013 (B-1-1) that the user has selected CHANGE PRINTING LOCATION and tapped on a NEXT button 4283*a* on the reservation change screen of FIG. 101D, in step S4320, the service list obtaining part 4041 transmits a request to obtain the service list 4071 of the printing environment sharing service 4013 (B-1-2) to the printing environment sharing service 4013 (B-1) based on the channel information for information searching B-1-1→B-1→B-1-2.

When the printing environment sharing service 4013 (B-1) receives the request, in step S4321, the service list obtaining part 4041 of the printing environment sharing service 4013 (B-1) transmits the request to the printing environment sharing service 4013 (B-1-2) based on the channel information for information searching B-1-1→B-1→B-1-2.

When the printing environment sharing service 4013 (B-1-2) receives the request, in step S4322, the service list obtaining part 4041 of the printing environment sharing service 4013 (B-1-2) obtains the service list 4071 stored in the HDD 4039 of the SPS server 4003 (B-1-2), and transmits the service list 4071 to the printing environment sharing service 4013 (B-1) based on the channel information for information searching B-1-1→B-1→B-1-2.

When the printing environment sharing service 4013 (B-1) receives the service list 4071 of the printing environment sharing service 4013 (B-1-2) in step S4323, the service list obtaining part 4041 of the printing environment sharing service 4013 (B-1) transmits the service list 4071 of the printing environment sharing service 4013 (B-1-2) to the printing environment sharing service 4013 (B-1-1) based on the channel information for information searching B-1-1→B-1→B-1-2.

When the printing environment sharing service 4013 (B-1-1) receives the service list 4071 of the printing environment sharing service 4013 (B-1-2), the service list obtaining part 4041 of the printing environment sharing service 4013 (B-1-1) provides the service list 4071 of the printing environment sharing service 4013 (B-1-2) to the screen control part 4059 of the printing environment sharing service 4013 (B-1-1). Then, the screen control part 4059 of the printing environment sharing service 4013 (B-1-1) creates a printing location change screen as shown in FIG. 101E based on the service list 4071 of the printing environment sharing service 4013 (B-1-2), and presents the printing location change screen to the user, displaying the screen on the touch panel.

For instance, when the printing environment sharing service 4013 (B-1-1) is informed by the screen control part 4059 of the printing environment sharing service 4013 (B-1-1) that the user has selected "B-1" and tapped on a NEXT button 4284*a* on the printing location change screen of FIG. 101E, the printing environment sharing service 4013 (B-1-1) deletes the channel from B-1 to B-1-2 from the channel information A-1-1→A-1→R-0→B-1→B-1-2. Further, when the service list obtaining part 4041 of the printing environment sharing service 4013 (B-1-1) is informed by the screen control part 4059 of the printing environment sharing service 4013 (B-1-1) that the user has selected "B-1" and tapped on the NEXT button 4284*a* on the printing location change screen of FIG. 101E, in step S4324 of FIG. 102, the service list obtaining part 4041 transmits a request to obtain the service list 4071 of the printing environment sharing service 4013 (B-1) to the printing environment sharing service 4013 (B-1).

When the printing environment sharing service 4013 (B-1) receives the request, in step S4325, the service list obtaining part 4041 of the printing environment sharing service 4013 (B-1) obtains the service list 4071 stored in the HDD 4039 of the SPS server 4003 (B-1), and transmits the service list 4071 to the printing environment sharing service 4013 (B-1-1).

When the printing environment sharing service 4013 (B-1-1) receives the service list 4071 of the printing environment sharing service 4013 (B-1), the service list obtaining part 4041 of the printing environment sharing service 4013 (B-1-1) provides the service list 4071 of the printing environment sharing service 4013 (B-1) to the screen control part 4059 of the printing environment sharing service 4013 (B-1-1). Then, the screen control part 4059 of the printing environment sharing service 4013 (B-1-1) creates a printing location change screen as shown in FIG. 101F based on the service list 4071 of the printing environment sharing service 4013 (B-1), and presents the printing location change screen to the user, displaying the screen on the touch panel.

For instance, when the user selects "B-1-1" and taps on an OK button 4285*a* on the printing location change screen of FIG. 101F, the screen control part 4059 of the printing environment sharing service 4013 (B-1-1) creates a printing location change confirmation screen as shown in FIG. 101G, and presents the printing location change confirmation screen to the user, displaying the screen on the touch panel.

For instance, when the printing environment sharing service 4013 (B-1-1) is informed by the screen control part 4059 of the printing environment sharing service 4013 (B-1-1) that the user has tapped on a CHANGE PRINTING LOCATION button 4286a on the printing location change confirmation screen of FIG. 101G, the printing environment sharing service 4013 (B-1-1) adds a channel from B-1 to B-1-1 to the channel information from A-1-1→A-1→R-0→B-1. Further, when the reservation information changing part 4056 of the printing environment sharing service 4013 (B-1-1) is informed by the screen control part 4059 of the printing environment sharing service 4013 (B-1-1) that the user has tapped on the CHANGE PRINTING LOCATION button 4286a on the printing location change confirmation screen of FIG. 101G, the reservation information changing part 4056 replaces identification information identifying the printing location (B-1-2) included in the previous reservation information obtained by the reservation information obtaining part 4053 in step S4303 with identification information identifying the new printing location (B-1-1).

By the printing environment sharing services 4013 performing the above-described operation, the user can directly operate the SPS server 4003 and change a printing location without providing channel information.

Further, for instance, when the printer list obtaining part 4042 of the printing environment sharing service 4013 (B-1-1) is informed by the screen control part 4059 of the printing environment sharing service 4013 (B-1-1) that the user has tapped on a SELECT PRINTER button 4286b on the printing location change confirmation screen of FIG. 101G, the printer list obtaining part 4042 obtains the printer list 4072 stored in the HDD 4039 of the SPS server 4003 (B-1-1), and provides the printer list 4072 to the screen control part 4059 of the printing environment sharing service 4013 (B-1-1). Then, the screen control part 4059 of the printing environment sharing service 4013 (B-1-1) creates a printer selection screen as shown in FIG. 101H based on the printer list 4072 of the printing environment sharing service 4013 (B-1-1), and presents the printer selection screen to the user, displaying the screen on the touch panel.

Using the printer selection screen of FIG. 101H, the user can select a printer 4006 available at the new printing location.

Next, a description is given, with reference to FIG. 103, of another case of changing reservation information without channel information (a fourth printing location changing operation).

FIG. 103 is a sequence diagram for illustrating the fourth printing location changing operation.

For instance, it is assumed that the user has selected the printing environment sharing service 4013 (B-1-2) as a printing location and has made a printing reservation. In this case, when the reservation list obtaining part 4055 of the printing environment sharing service 4013 (B-1-1) is informed by the screen control part 4059 of the printing environment sharing service 4013 (B-1-1) that the user has entered her/his user ID and password and performed a predetermined operation such as the tapping of a printing reservation selection screen display button, operating the touch panel of the SPS server 4003 (B-1-1), the reservation list obtaining part 4055 searches the reservation information stored in the HDD 4039 of the SPS server 4003 (B-1-1) for reservation information corresponding to the user ID.

For instance, when the screen control part 4059 of the printing environment sharing service 4013 (B-1-1) is informed by the reservation list obtaining part 4055 of the printing environment sharing service 4013 (B-1-1) that no corresponding reservation information is stored, the screen control part 4059 creates a printing reservation selection screen as shown in FIG. 101A, and presents the printing reservation selection screen to the user, displaying the screen on the touch panel.

When the reservation list obtaining part 4055 of the printing environment sharing service 4013 (B-1-1) is informed by the screen control part 4059 of the printing environment sharing service 4013 (B-1-1) that the user has selected NO RESERVATION and tapped on the RESERVATION INFORMATION SEARCH button 4280a on the printing reservation selection screen of FIG. 101A, in step S4330 of FIG. 103, the reservation list obtaining part 4055 refers to the service list 4071 of the printing environment sharing service 4013 (B-1-1), creates channel information for information searching (B-1-1→B-1), and transmits a reservation list obtaining request including the user ID to the printing environment sharing service 4013 (B-1) superordinate to the printing environment sharing service 4013 (B-1-1).

When the printing environment sharing service 4013 (B-1) receives the request, in step S4331, the reservation list obtaining part 4055 of the printing environment sharing service 4013 (B-1) obtains the reservation names and reservation numbers of corresponding reservation information among the reservation information stored in the SPS server 4003 (B-1) based on the user ID included in the request. However, when no corresponding reservation information is stored, the reservation list obtaining part 4055 of the printing environment sharing service 4013 (B-1) refers to the service list 4071 of the printing environment sharing service 4013 (B-1), adds channel information from B-1 to B-1-2 to the channel information for information searching (B-1-1→B-1), and transmits a reservation list obtaining request including the user ID to the printing environment sharing service 4013 (B-1-2) subordinate to the printing environment sharing service 4013 (B-1-1) based on the channel information for information searching (B-1-1→B-1→B-1-2).

When the printing environment sharing service 4013 (B-1-2) receives the request, in step S4332, the reservation list obtaining part 4055 of the printing environment sharing service 4013 (B-1-2) obtains the reservation names and reservation numbers of corresponding reservation information among the reservation information stored in the SPS server 4003 (B-1-2) based on the user ID included in the request, and transmits the reservation names and numbers as a reservation list to the printing environment sharing service 4013 (B-1) based on channel information for information searching B-1-1→B-1→B-1-2.

When the printing environment sharing service 4013 (B-1) receives the reservation list, in step S4333, the reservation list obtaining part 4055 of the printing environment sharing service 4013 (B-1) transmits the reservation list to the printing environment sharing service 4013 (B-1-1), which has requested the reservation list, based on the channel information for information searching B-1-1→B-1→B-1-2.

The reservation list obtaining part 4055 of the printing environment sharing service 4013 (B-1-1) provides the received reservation list to the screen control part 4059 of the printing environment sharing service 4013 (B-1-1). Then, the screen control part 4059 of the printing environment sharing service 4013 (B-1-1) creates a printing reservation selection screen displaying the reservation list as shown in FIG. 101B, and presents the printing reservation selection screen to the user, displaying the screen on the touch panel.

The operation of steps S4334 through S4343 of FIG. 103 is equal to the operation of steps S4316 through S4325 of FIG. 102. Further, the reservation information changing operation and the printer list obtaining operation of FIG. 103 are equal to the reservation information changing operation and the printer list obtaining operation of FIG. 102, respectively.

In contrast to the operation shown in FIG. 102, in the operation of FIG. 103, when the reservation list obtaining part 4055 of the printing environment sharing service 4013 (B-1) searches the reservation information stored in the HDD 4039 of the SPS server 4003 (B-1) for the corresponding reservation information in response to a reservation list obtaining request to find that no corresponding reservation information is stored, the reservation list obtaining part 4055 spontaneously refers to the service list 4071 of the printing environment sharing service 4013 (B-1), and transmits a reservation list obtaining request including the user ID to the subordinate printing environment sharing service 4013 (B-1-2), thereby obtaining a corresponding reservation list.

By the printing environment sharing services 4013 performing the operation shown in FIG. 103, the user can directly operate the SPS server 4003 and change a printing location without providing channel information.

In the operation of FIG. 103, if no corresponding reservation information is stored in any printing environment sharing services 4013 subordinate to the printing environment sharing services 4013 (B-1) either, the reservation list obtaining part 4055 of the printing environment sharing services 4013 (B-1) refers to the service list 4071 of the printing environment sharing services 4013 (B-1), and transmits a reservation list obtaining request including the user ID to the printing environment sharing services 4013 (R-0) superordinate to the printing environment sharing services 4013 (B-1), thereby requesting the printing environment sharing services 4013 (R-0) to obtain a reservation list.

Figure 105:
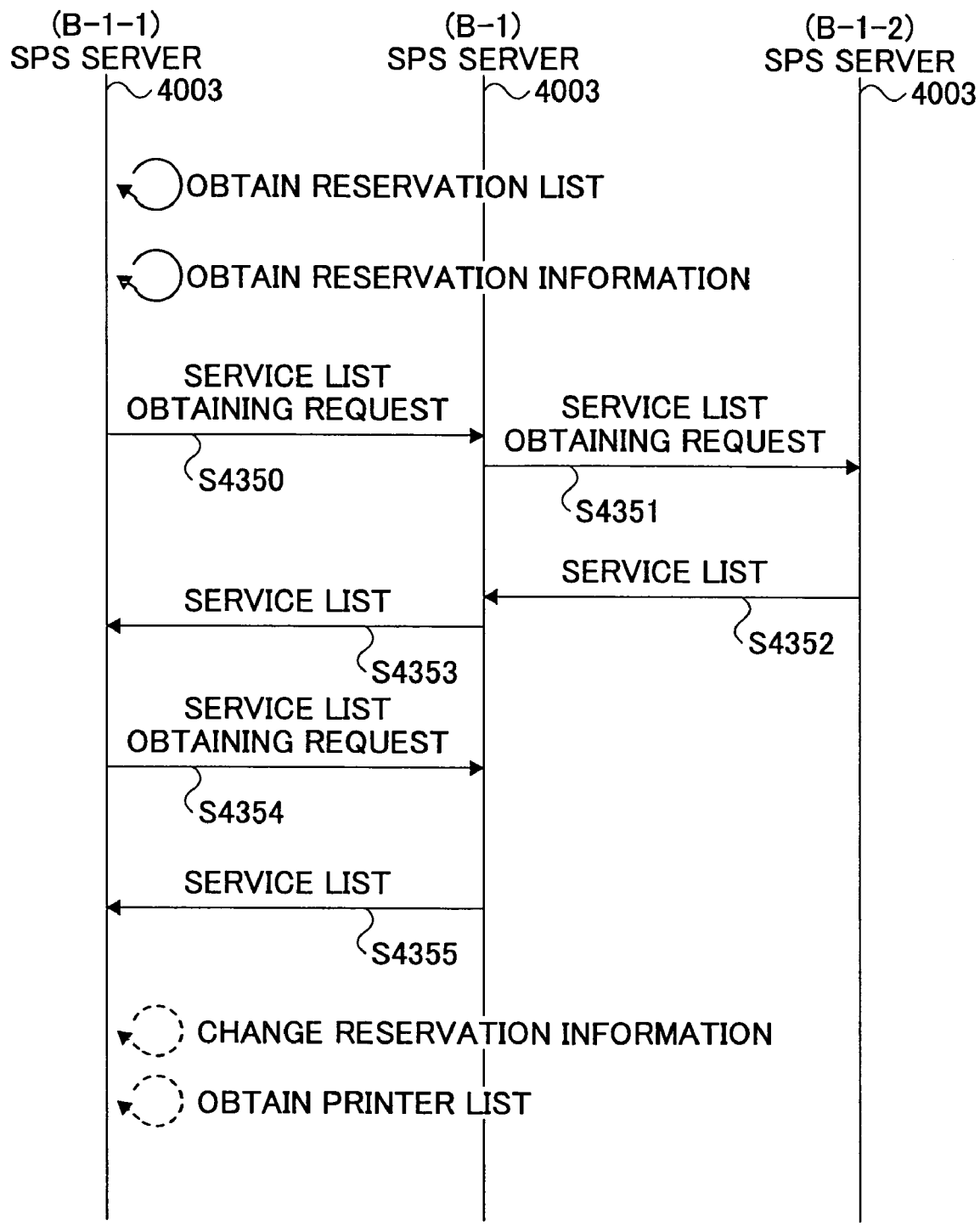
FIG. 105 is a sequence diagram for illustrating the fifth printing location changing operation according to the sixth embodiment of the present invention.
Figure 106:
FIGS. 106A through 106E are diagrams for illustrating a second printer changing operation according to the sixth embodiment of the present invention.

Next, a description is given, with reference to FIGS. 104A through 105, of another case of the user changing the printing location from B-1-2 to B-1-1 using the SPS server 4003 (B-1-1) (a fifth printing location changing operation). In the case of FIGS. 104A through 105, a recording medium on which reservation information as well as channel information is recorded is inserted into the slot of the SPS server 4003 (B-1-1) by the user so that the reservation information as well as the channel information is provided to the SPS server 4003 (B-1-1).

FIGS. 104A through 104G are diagrams and FIG. 105 is a sequence diagram for illustrating the fifth printing location changing operation.

For instance, it is assumed that the user has selected the printing environment sharing service 4013 (B-1-2) as a printing location and has made a printing reservation. In this case, when the reservation list obtaining part 4055 of the printing environment sharing service 4013 (B-1-1) is informed by the screen control part 4059 of the printing environment sharing service 4013 (B-1-1) that the user has entered her/his user ID and password and performed a predetermined operation such as the tapping of a printing reservation selection screen display button, operating the touch panel of the SPS server 4003 (B-1-1), the reservation list obtaining part 4055 obtains the reservation names and reservation numbers of reservation information corresponding to the user ID among the reservation information read out from the inserted recording medium, and provides the reservation names and numbers as a reservation list to the screen control part 4059 of the printing environment sharing service 4013 (B-1-1).

Receiving the reservation list, the screen control part 4059 of the printing environment sharing service 4013 (B-1-1) creates a printing reservation selection screen as shown in FIG. 104A, and presents the printing reservation selection screen to the user, displaying the screen on the touch panel.

For instance, when the reservation information obtaining part 4053 of the printing environment sharing service 4013 (B-1-1) is informed by the screen control part 4059 of the printing environment sharing service 4013 (B-1-1) that the user has selected RESERVATION 1 and tapped on a RESERVATION CONTENTS button 4290a on the printing reservation selection screen of FIG. 104A, the reservation information obtaining part 4053 obtains the reservation information of the corresponding reservation number from the reservation information read out from the inserted recording medium, and provides the obtained reservation information to the screen control part 4059 of the printing environment sharing service 4013 (B-1-1).

Receiving the reservation information, the screen control part 4059 of the printing environment sharing service 4013 (B-1-1) creates a printing reservation contents display screen displaying the reservation information as shown in FIG. 104B, and presents the printing reservation contents display screen to the user, displaying the screen on the touch panel.

For instance, when the user taps on a CHANGE RESERVATION button 4291a on the printing reservation contents display screen of FIG. 104B, the screen control part 4059 of the printing environment sharing service 4013 (B-1-1) creates a reservation change screen as shown in FIG. 104C, and presents the reservation change screen to the user, displaying the screen on the touch panel.

For instance, when the service list obtaining part 4041 of the printing environment sharing service 4013 (B-1-1) is informed by the screen control part 4059 of the printing environment sharing service 4013 (B-1-1) that the user has selected CHANGE PRINTING LOCATION and tapped on a NEXT button 4292a on the reservation change screen of FIG. 104C, in step S4350 of FIG. 105, the service list obtaining part 4041 compares the channel information read out from the recording medium (A-1-1→A-1→R-0→B-1→B-1-2) and the service list 4071 stored in, for instance, the HDD 4039 of the SPS server 4003 (B-1-1). When the service list obtaining part 4041 of the printing environment sharing service 4013 (B-1-1) determines that an identifier identifying the printing environment sharing service 4013 (B-1-1) is not included in the channel information read out from the recording medium, the service list obtaining part 4041 creates channel information for information searching (B-1-1→B-1), and transmits a request to obtain the service list 4071 of the printing environment sharing service 4013 (B-1-2) to the superordinate printing environment sharing service 4013 (B-1) based on the channel information for information searching (B-1-1→B-1). The request includes the channel information read out from the recording medium.

When the printing environment sharing service 4013 (B-1) receives the request, in step S4351, the service list obtaining part 4041 of the printing environment sharing service 4013 (B-1) compares the channel information (A-1-1→A-1→R-0→B-1→B-1-2) included in the received request and the service list 4071 stored in, for instance, the HDD 4039 of the SPS server 4003 (B-1). When the service list obtaining part 4041 of the printing environment sharing service 4013 (B-1) determines that an identifier identifying the printing environment sharing service 4013 (B-1) is included in the channel information, the service list obtaining part 4041 transmits the request to obtain the service list 4071 of the printing environment sharing service 4013 (B-1-2) to the printing environment sharing service 4013 (B-1-2) based on channel information for information searching B-1-1→B-1→B-1-2.

When the printing environment sharing service 4013 (B-1-2) receives the request, in step S4352, the service list obtaining part 4041 of the printing environment sharing service 4013 (B-1-2) obtains the service list 4071 stored in the HDD 4039 of the SPS server 4003 (B-1-2), and transmits the service list 4071 to the printing environment sharing service 4013 (B-1) based on the channel information for information searching B-1-1→B-1→B-1-2.

When the printing environment sharing service 4013 (B-1) receives the service list 4071 of the printing environment sharing service 4013 (B-1-2), in step S4353, the service list obtaining part 4041 of the printing environment sharing service 4013 (B-1) transmits the service list 4071 of the printing environment sharing service 4013 (B-1-2) to the printing environment sharing service 4013 (B-1-1) based on the channel information for information searching B-1-1→B-1→B-1-2.

When the printing environment sharing service 4013 (B-1-1) receives the service list 4071 of the printing environment sharing service 4013 (B-1-2), the service list obtaining part 4041 of the printing environment sharing service 4013 (B-1-1) provides the service list 4071 of the printing environment sharing service 4013 (B-1-2) to the screen control part 4059 of the printing environment sharing service 4013 (B-1-1). Then, the screen control part 4059 of the printing environment sharing service 4013 (B-1-1) creates a printing location change screen as shown in FIG. 104D based on the service list 4071 of the printing environment sharing service 4013 (B-1-2), and presents the printing location change screen to the user, displaying the screen on the touch panel.

For instance, when the printing environment sharing service 4013 (B-1-1) is informed by the screen control part 4059 of the printing environment sharing service 4013 (B-1-1) that the user has selected "B-1" and tapped on a NEXT button 4293a on the printing location change screen of FIG. 104D, the printing environment sharing service 4013 (B-1-1) deletes the channel from B-1 to B-1-2 from the channel information A-1-1→A-1→R-0→B-1→B-1-2. Further, when the service list obtaining part 4041 of the printing environment sharing service 4013 (B-1-1) is informed by the screen control part 4059 of the printing environment sharing service 4013 (B-1-1) that the user has selected "B-1" and tapped on the NEXT button 4293a on the printing location change screen of FIG. 104D, in step S4354 of FIG. 105, the service list obtaining part 4041 transmits a request to obtain the service list 4071 of the printing environment sharing service 4013 (B-1) to the printing environment sharing service 4013 (B-1) based on the channel information for information searching B-1-1→B-1→B-1-2.

When the printing environment sharing service 4013 (B-1) receives the request, in step S4355, the service list obtaining part 4041 of the printing environment sharing service 4013 (B-1) obtains the service list 4071 stored in the HDD 4039 of the SPS server 4003 (B-1), and transmits the service list 4071 to the printing environment sharing service 4013 (B-1-1).

When the printing environment sharing service 4013 (B-1-1) receives the service list 4071 of the printing environment sharing service 4013 (B-1), the service list obtaining part 4041 of the printing environment sharing service 4013 (B-1-1) provides the service list 4071 of the printing environment sharing service 4013 (B-1) to the screen control part 4059 of the printing environment sharing service 4013 (B-1-1). Then, the screen control part 4059 of the printing environment sharing service 4013 (B-1-1) creates a printing location change screen as shown in FIG. 104E based on the service list 4071 of the printing environment sharing service 4013 (B-1), and presents the printing location change screen to the user, displaying the screen on the touch panel.

For instance, when the user selects "B-1-1" and taps on an OK button 4294a on the printing location change screen of FIG. 104E, the screen control part 4059 of the printing environment sharing service 4013 (B-1-1) creates a printing location change confirmation screen as shown in FIG. 104F, and presents the printing location change confirmation screen to the user, displaying the screen on the touch panel.

For instance, when the printing environment sharing service 4013 (B-1-1) is informed by the screen control part 4059 of the printing environment sharing service 4013 (B-1-1) that the user has tapped on a CHANGE PRINTING LOCATION button 4295a on the printing location change confirmation screen of FIG. 104F, the printing environment sharing service 4013 (B-1-1) adds a channel from B-1 to B-1-1 to the channel information from A-1-1→A-1→R-0→B-1. Further, when the reservation information changing part 4056 of the printing environment sharing service 4013 (B-1-1) is informed by the screen control part 4059 of the printing environment sharing service 4013 (B-1-1) that the user has tapped on the CHANGE PRINTING LOCATION button 4295a on the printing location change confirmation screen of FIG. 104F, the reservation information changing part 4056 replaces identification information identifying the printing location (B-1-2) included in the previous reservation information obtained by the reservation information obtaining part 4053 with identification information identifying the new printing location (B-1-1).

By the printing environment sharing services 4013 performing the above-described operation, the user can directly operate the SPS server 4003 and change a printing location, providing the SPS server 4003 with channel information and reservation information.

Further, for instance, when the printer list obtaining part 4042 of the printing environment sharing service 4013 (B-1-1) is informed by the screen control part 4059 of the printing environment sharing service 4013 (B-1-1) that the user has tapped on a SELECT PRINTER button 4295b on the printing location change confirmation screen of FIG. 104F, the printer list obtaining part 4042 obtains the printer list 4072 stored in the HDD 4039 of the SPS server 4003 (B-1-1), and provides the printer list 4072 to the screen control part 4059 of the printing environment sharing service 4013 (B-1-1). Then, the screen control part 4059 of the printing environment sharing service 4013 (B-1-1) creates a printer selection screen as shown in FIG. 104G based on the printer list 4072 of the printing environment sharing service 4013 (B-1-1), and presents the printer selection screen to the user, displaying the screen on the touch panel.

Using the printer selection screen of FIG. 104G, the user can select a printer 4006 available at the new printing location.

By the printing environment sharing services 4013 performing the operations described above with reference to FIGS. 99A through 105, even when a meeting location is suddenly changed, the user can change a printing location reserved in reservation information and print a document at a new printing location by operating an SPS server 4003 near the current location of the user.

Next, a description is given, with reference to FIG. 106A through 113, of the operations of changing the printer 4006.

Figure 107:
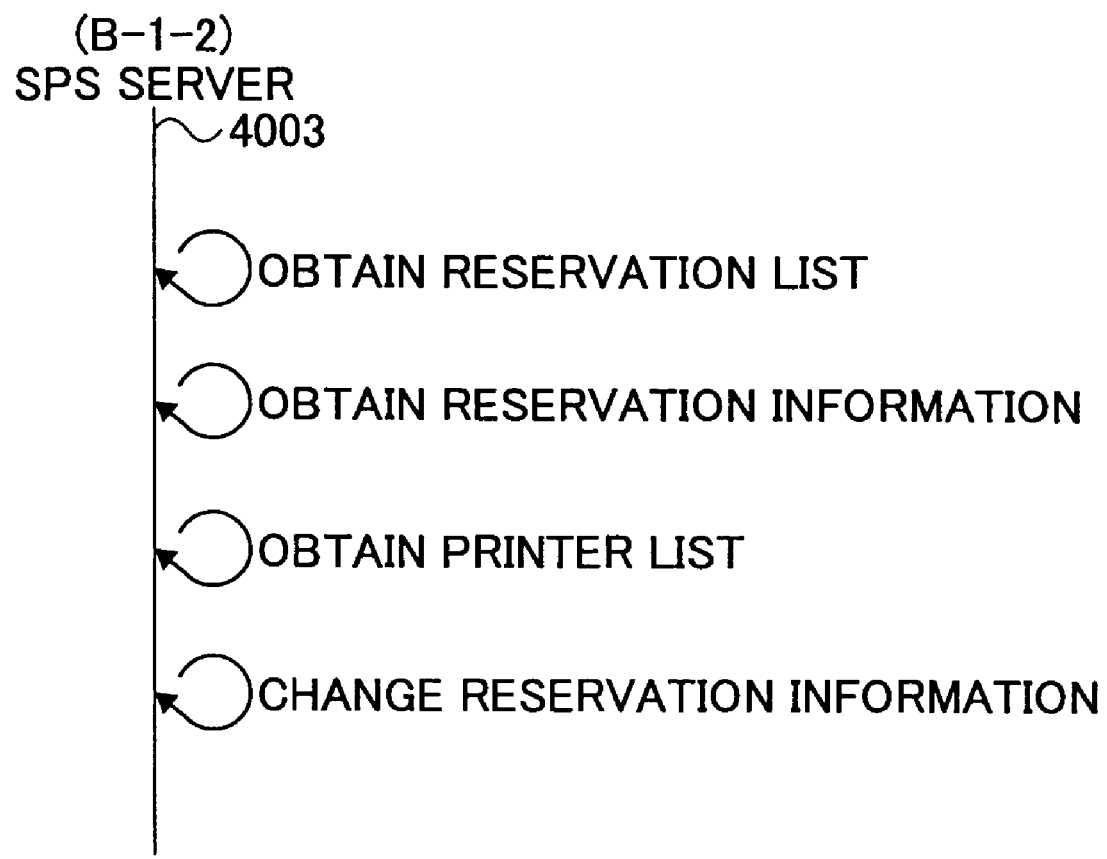
FIG. 107 is a sequence diagram for illustrating the second printer changing operation according to the sixth embodiment of the present invention.

FIGS. 106A through 106E are diagrams and FIG. 107 is a sequence diagram for illustrating a case of changing the printer 4006 (a first printer changing operation).

In the case of FIGS. 106A through 106E and 107, the user changes the printer 4006 from P-2-2 to P-2-1 using the SPS server 4003 (B-1-2).

For instance, it is assumed that the user has selected the printing environment sharing service 4013 (B-1-2) as a printing location and has made a printing reservation. In this case, when the reservation list obtaining part 4055 of the printing environment sharing service 4013 (B-1-2) is informed by the screen control part 4059 of the printing environment sharing service 4013 (B-1-2) that the user has entered her/his user ID and password and performed a predetermined operation such as the tapping of a printing reservation selection screen display button, operating the touch panel of the SPS server 4003 (B-1-2), as shown in FIG. 107, the reservation list obtaining part 4055 obtains the reservation names and reservation numbers of reservation information corresponding to the user ID among the reservation information stored in the HDD 4039 of the SPS server 4003 (B-1-2), and provides the reservation names and numbers as a reservation list to the screen control part 4059 of the printing environment sharing service 4013 (B-1-2).

Receiving the reservation list, the screen control part 4059 of the printing environment sharing service 4013 (B-1-2) creates a printing reservation selection screen as shown in FIG. 106A, and presents the printing reservation selection screen to the user, displaying the screen on the touch panel.

For instance, when the reservation information obtaining part 4053 of the printing environment sharing service 4013 (B-1-2) is informed by the screen control part 4059 of the printing environment sharing service 4013 (B-1-2) that the user has selected RESERVATION 1 and tapped on a RESERVATION CONTENTS button 4300a on the printing reservation selection screen of FIG. 106A, as shown in FIG. 107, the reservation information obtaining part 4053 obtains the reservation information of the corresponding reservation number from the reservation information stored in the HDD 4039 of the SPS server 4003 (B-1-2), and provides the obtained reservation information to the screen control part 4059 of the printing environment sharing service 4013 (B-1-2).

Receiving the reservation information, the screen control part 4059 of the printing environment sharing service 4013 (B-1-2) creates a printing reservation contents display screen as shown in FIG. 106B displaying the reservation information, and presents the printing reservation contents display screen to the user, displaying the screen on the touch panel.

For instance, when the user taps on a CHANGE RESERVATION button 4301a on the printing reservation contents display screen of FIG. 106B, the screen control part 4059 of the printing environment sharing service 4013 (B-1-2) creates a reservation change screen as shown in FIG. 106C, and presents the reservation change screen to the user, displaying the screen on the touch panel.

For instance, when the printer list obtaining part 4042 of the printing environment sharing service 4013 (B-1-2) is informed by the screen control part 4059 of the printing environment sharing service 4013 (B-1-2) that the user has selected CHANGE PRINTER and tapped on a NEXT button 4302a on the reservation change screen of FIG. 106C, as shown in FIG. 107, the printer list obtaining part 4042 obtains the printer list 4072 stored in the HDD 4039 of the SPS server 4003 (B-1-2), and provides the printer list 4072 to the screen control part 4059 of the printing environment sharing service 4013 (B-1-2). Then, the screen control part 4059 of the printing environment sharing service 4013 (B-1-2) creates a printer change screen as shown in FIG. 106D based on the printer list 4072 of the printing environment sharing service 4013 (B-1-2), and presents the printer change screen to the user, displaying the screen on the touch panel.

The user can change the printer using the printer change screen of FIG. 106D.

For instance, when the user selects "P-2-1" and taps on an OK button 4303a on the printer change screen of FIG. 106D, the screen control part 4059 of the printing environment sharing service 4013 (B-1-2) creates a printer change confirmation screen as shown in FIG. 106E, and presents the printer change confirmation screen to the user, displaying the screen on the touch panel.

For instance, when the reservation information changing part 4056 of the printing environment sharing service 4013 (B-1-2) is informed by the screen control part 4059 of the printing environment sharing service 4013 (B-1-2) that the user has tapped on a CHANGE PRINTER button 4304a on the printer change confirmation screen of FIG. 106E, the reservation information changing part 4056 replaces identification information identifying the printer 4006 (P-2-2) included in the previous reservation information obtained by the reservation information obtaining part 4053 with identification information identifying the new printer 4006 (P-2-1).

Figure 109:
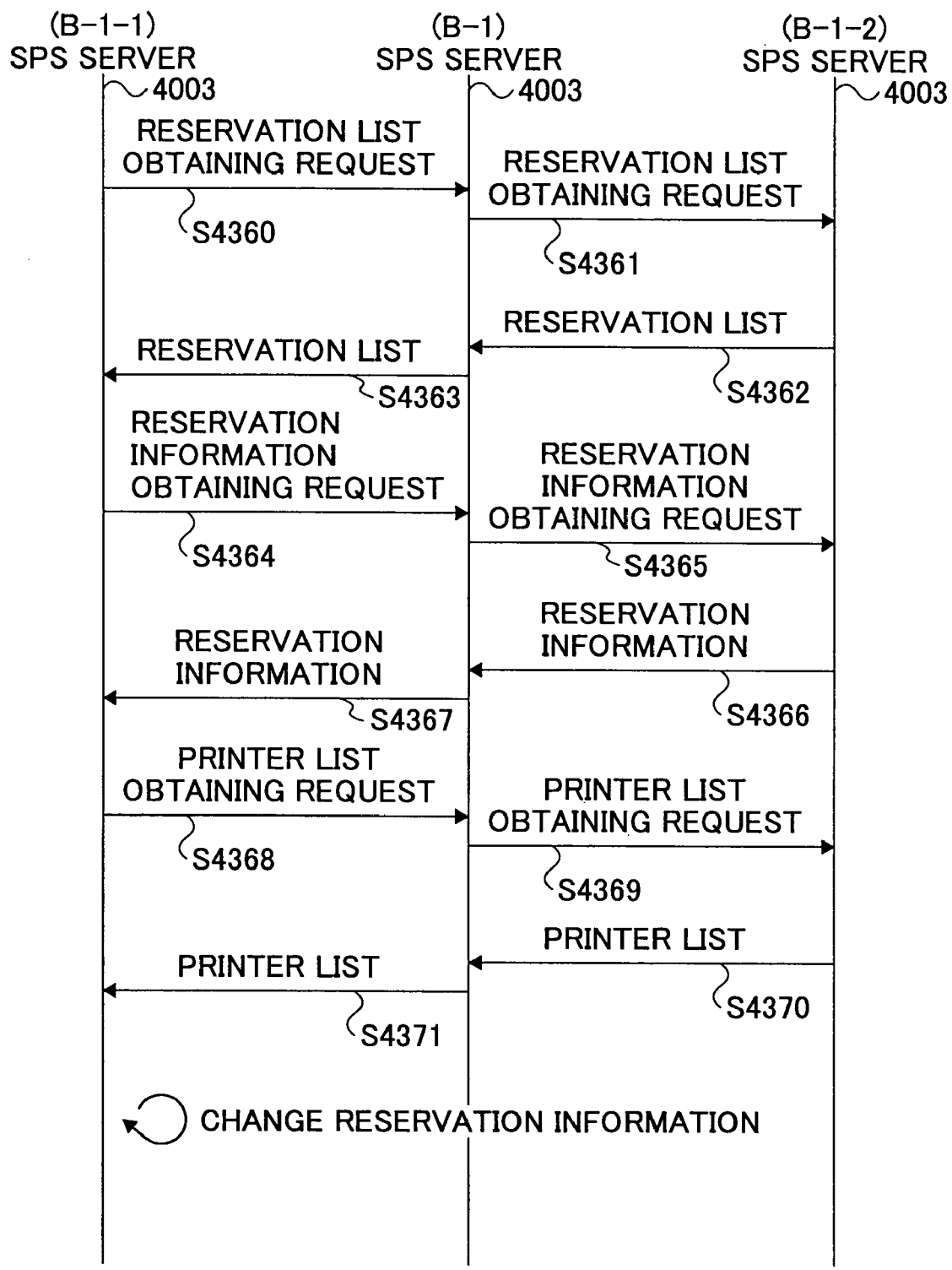
FIG. 109 is a sequence diagram for illustrating the third printer changing operation according to the sixth embodiment of the present invention.

Next, a description is given, with reference to FIGS. 108A through 109, of a case of the user changing the printer 4006 from P-2-2 to P-2-1 using the SPS server 4003 (B-1-1) (a third printer changing operation). In the case of FIG. 109, a recording medium on which channel information is recorded is inserted into the slot of the SPS server 4003 (B-1-1) by the user so that the channel information is provided to the SPS server 4003 (B-1-1).

FIGS. 108A through 108F are diagrams for illustrating the third printer changing operation as well as below-described fourth and fifth printer changing operations. FIG. 109 is a sequence diagram for illustrating the third printer changing operation.

For instance, it is assumed that the user has selected the printer 4006 (P-2-2) and has made a printing reservation. In this case, when the reservation list obtaining part 4055 of the printing environment sharing service 4013 (B-1-1) is informed by the screen control part 4059 of the printing environment sharing service 4013 (B-1-1) that the user has entered her/his user ID and password and performed a predetermined operation such as the tapping of a printing reservation selection screen display button, operating the touch panel of the SPS server 4003 (B-1-1), the reservation list obtaining part 4055 searches the reservation information stored in the HDD 4039 of the SPS server 4003 (B-1-1) for reservation information corresponding to the user ID.

For instance, when the screen control part 4059 of the printing environment sharing service 4013 (B-1-1) is informed by the reservation list obtaining part 4055 of the printing environment sharing service 4013 (B-1-1) that no corresponding reservation information is stored, the screen control part 4059 creates a printing reservation selection screen as shown in FIG. 108A, and presents the printing reservation selection screen to the user, displaying the screen on the touch panel.

When the reservation list obtaining part 4055 of the printing environment sharing service 4013 (B-1-1) is informed by the screen control part 4059 of the printing environment sharing service 4013 (B-1-1) that the user has selected NO RESERVATION and tapped on a RESERVATION INFORMATION SEARCH button 4310a on the printing reservation selection screen of FIG. 108A, in step S4360 of FIG. 109, the reservation list obtaining part 4055 compares the channel information read out from the recording medium (A-1-1→A-1→R-0→B-1→B-1-2) and the service list 4071 stored in, for instance, the HDD 4039 of the SPS server 4003 (B-1-1). When the reservation list obtaining part 4055 of the printing environment sharing service 4013 (B-1-1) determines that an identifier identifying the printing environment sharing service 4013 (B-1-1) is not included in the channel information read out from the recording medium, the reservation list obtaining part 4055 creates channel information for information searching (B-1-1→B-1), and transmits a service list obtaining request including the channel information read out from the recording medium and the user ID to the superordinate printing environment sharing service 4013 (B-1) based on the channel information for information searching (B-1-1→B-1).

When the printing environment sharing service 4013 (B-1) receives the request, in step S4361, the reservation list obtaining part 4055 of the printing environment sharing service 4013 (B-1) compares the channel information (A-1-1→A-1→R-0→B-1→B-1-2) included in the received request and the service list 4071 stored in, for instance, the HDD 4039 of the SPS server 4003 (B-1). When the reservation list obtaining part 4055 of the printing environment sharing service 4013 (B-1) determines that an identifier identifying the printing environment sharing service 4013 (B-1) is included in the channel information, the reservation list obtaining part 4055 adds channel information from B-1 to B-1-2 to the channel information for information searching (B-1-1→B-1), and transmits a reservation list obtaining request including the user ID to the printing environment sharing service 4013 (B-1-2) based on the channel information for information searching (B-1-1→B-1→B-1-2).

When the printing environment sharing service 4013 (B-1-2) receives the request, in step S4362, the reservation list obtaining part 4055 of the printing environment sharing service 4013 (B-1-2) obtains the reservation names and reservation numbers of corresponding reservation information among the reservation information stored in the SPS server 4003 (B-1-2) based on the user ID included in the request, and transmits the reservation names and numbers as a reservation list to the printing environment sharing service 4013 (B-1) based on channel information for information searching B-1-1→B-1→B-1-2.

When the printing environment sharing service 4013 (B-1) receives the reservation list, in step S4363, the reservation list obtaining part 4055 of the printing environment sharing service 4013 (B-1) transmits the reservation list to the printing environment sharing service 4013 (B-1-1) based on the channel information for information searching B-1-1→B-1→B-1-2.

The reservation list obtaining part 4055 of the printing environment sharing service 4013 (B-1-1) provides the received reservation list to the screen control part 4059 of the printing environment sharing service 4013 (B-1-1). Then, the screen control part 4059 of the printing environment sharing service 4013 (B-1-1) creates a printing reservation selection screen displaying the reservation list as shown in FIG. 108B, and presents the printing reservation selection screen to the user, displaying the screen on the touch panel.

For instance, when the reservation information obtaining part 4053 of the printing environment sharing service 4013 (B-1-1) is informed by the screen control part 4059 of the printing environment sharing service 4013 (B-1-1) that the user has selected RESERVATION 1 and tapped on a RESERVATION CONTENTS button 4311a on the printing reservation selection screen of FIG. 108B, in step S4364, the reservation information obtaining part 4053 transmits a request to obtain reservation information corresponding to RESERVATION 1 stored in the SPS server 4003 (B-1-2) to the printing environment sharing service 4013 (B-1) based on the channel information for information searching B-1-1→B-1→B-1-2.

When the printing environment sharing service 4013 (B-1) receives the request, in step S4365, the reservation information obtaining part 4053 of the printing environment sharing service 4013 (B-1) transmits the request to the printing environment sharing service 4013 (B-1-2) based on the channel information for information searching B-1-1→B-1→B-1-2.

When the printing environment sharing service 4013 (B-1-2) receives the request, in step S4366, the reservation information obtaining part 4053 of the printing environment sharing service 4013 (B-1-2) obtains the corresponding reservation information from the reservation information stored in the SPS server 4003 (B-1-2) based on the reservation number included in the request, and transmits the obtained reservation information to the printing environment sharing service 4013 (B-1) based on the channel information for information searching B-1-1→B-1→B-1-2.

When the printing environment sharing service 4013 (B-1) receives the reservation information, in step S4367, the reservation information obtaining part 4053 of the printing environment sharing service 4013 (B-1) transmits the reservation information to the printing environment sharing service 4013 (B-1-1) based on the channel information for information searching B-1-1→B-1→B-1-2.

The reservation information obtaining part 4053 of the printing environment sharing service 4013 (B-1-1) provides the received reservation information to the screen control part 4059 of the printing environment sharing service 4013 (B-1-1). Then, the screen control part 4059 of the printing environment sharing service 4013 (B-1-1) creates a printing reservation contents display screen displaying the reservation information as shown in FIG. 108C, and presents the printing reservation contents display screen to the user, displaying the screen on the touch panel.

For instance, when the user taps on a CHANGE RESERVATION button 4312a on the printing reservation contents display screen of FIG. 108C, the screen control part 4059 of the printing environment sharing service 4013 (B-1-1) creates a reservation change screen as shown in FIG. 108D, and presents the reservation change screen to the user, displaying the screen on the touch panel.

For instance, when the printer list obtaining part 4042 of the printing environment sharing service 4013 (B-1-1) is informed by the screen control part 4059 of the printing environment sharing service 4013 (B-1-1) that the user has selected CHANGE PRINTER and tapped on a NEXT button 4313a on the reservation change screen of FIG. 108D, in step S4368, the printer list obtaining part 4042 transmits a request to obtain the printer list 4072 of the printing environment sharing service 4013 (B-1-2) to the printing environment sharing service 4013 (B-1) based on the channel information for information searching B-1-1→B-1→B-1-2.

When the printing environment sharing service 4013 (B-1) receives the request, in step S4369, the printer list obtaining part 4042 of the printing environment sharing service 4013 (B-1) transmits the request to the printing environment sharing service 4013 (B-1-2) based on the channel information for information searching B-1-1→B-1→B-1-2.

When the printing environment sharing service 4013 (B-1-2) receives the request, in step S4370, the printer list obtaining part 4042 of the printing environment sharing service 4013 (B-1-2) obtains the printer list 4072 stored in the SPS server 4003 (B-1-2), and transmits the printer list 4072 to the printing environment sharing service 4013 (B-1) based on the channel information for information searching B-1-1→B-1→B-1-2.

When the printing environment sharing service 4013 (B-1) receives the printer list 4072 of the printing environment sharing service 4013 (B-1-2) in step S4371, the printer list obtaining part 4042 of the printing environment sharing service 4013 (B-1) transmits the printer list 4072 of the printing environment sharing service 4013 (B-1-2) to the printing environment sharing service 4013 (B-1-1) based on the channel information for information searching B-1-1→B-1→B-1-2.

When the printing environment sharing service 4013 (B-1-1) receives the printer list 4072 of the printing environment sharing service 4013 (B-1-2), the printer list obtaining part 4042 of the printing environment sharing service 4013 (B-1-1) provides the printer list 4072 of the printing environment sharing service 4013 (B-1-2) to the screen control part 4059 of the printing environment sharing service 4013 (B-1-1). Then, the screen control part 4059 of the printing environment sharing service 4013 (B-1-1) creates a printer change screen as shown in FIG. 108E based on the printer list 4072 of the printing environment sharing service 4013 (B-1-2), and presents the printer change screen to the user, displaying the screen on the touch panel.

The user can change the printer using the printer change screen of FIG. 108E.

For instance, when the user selects "P-2-1" and taps on an OK button 4314a on the printer change screen of FIG. 108E, the screen control part 4059 of the printing environment sharing service 4013 (B-1-1) creates a printer change confirmation screen as shown in FIG. 108F, and presents the printer change confirmation screen to the user, displaying the screen on the touch panel.

For instance, when the reservation information changing part 4056 of the printing environment sharing service 4013 (B-1-1) is informed by the screen control part 4059 of the printing environment sharing service 4013 (B-1-1) that the user has tapped on a CHANGE PRINTER button 4315a on the printer change confirmation screen of FIG. 108F, the reservation information changing part 4056 replaces identification information identifying the printer 4006 (P-2-2) included in the previous reservation information obtained by the reservation information obtaining part 4053 in step S4367 with identification information identifying the new printer 4006 (P-2-1).

By the printing environment sharing services 4013 performing the operations shown in FIGS. 108A through 109, the user can directly operate the SPS server 4003 and change a printer.

Figure 110:
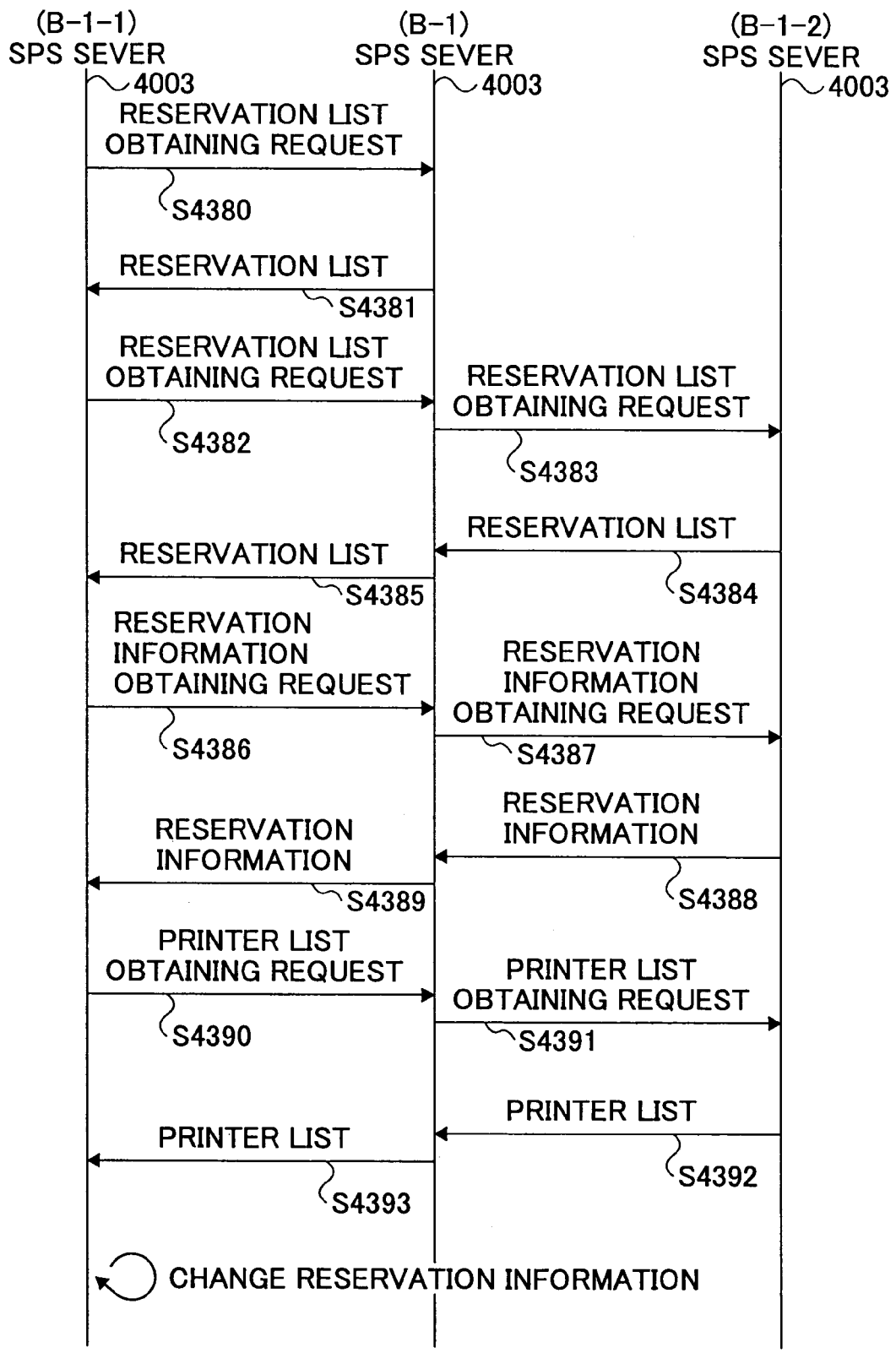
FIG. 110 is a sequence diagram for illustrating the fourth printer changing operation according to the sixth embodiment of the present invention.
Figure 111:
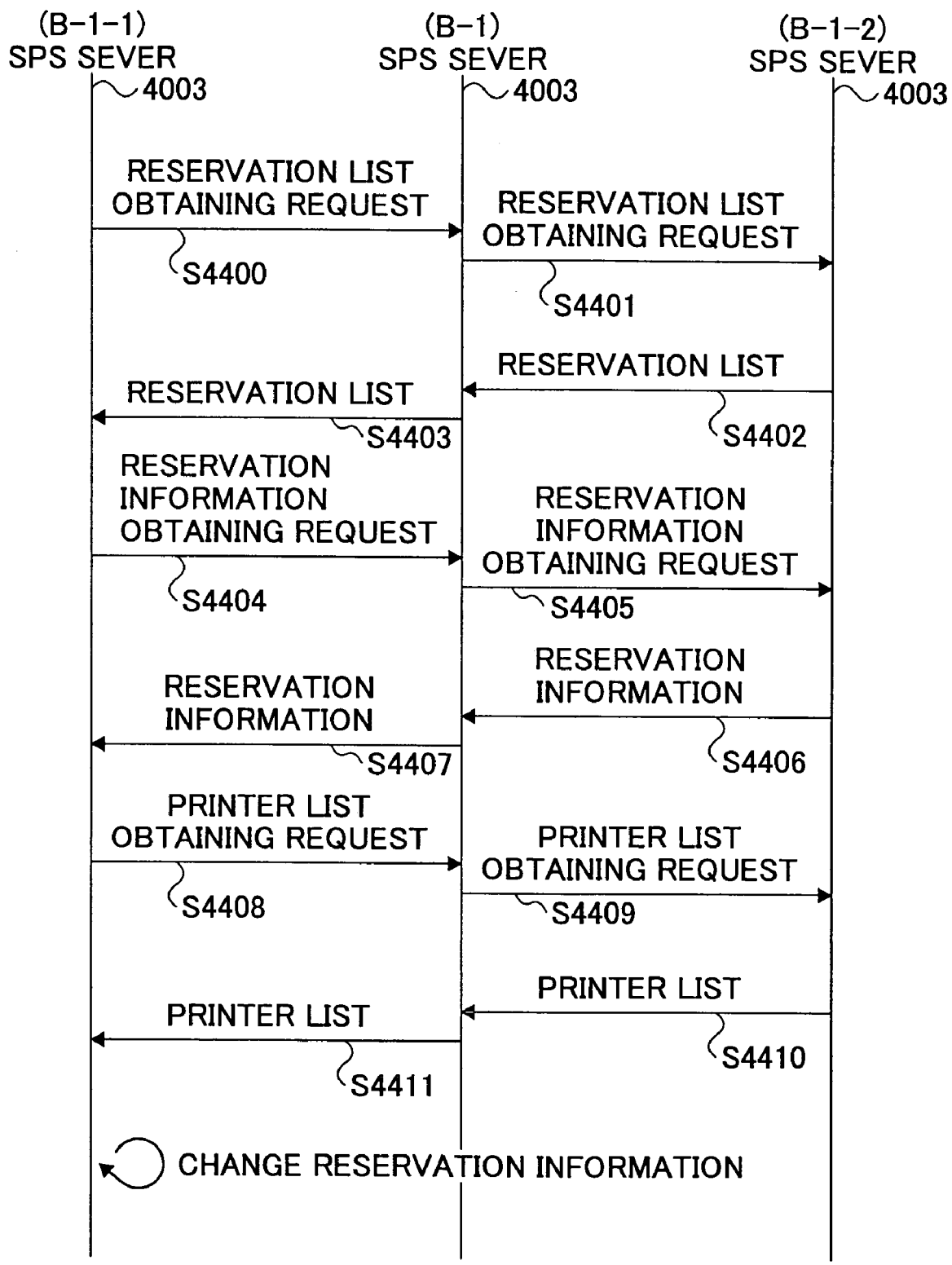
FIG. 111 is a sequence diagram for illustrating the fifth printer changing operation according to the sixth embodiment of the present invention.

Next, a description is given, with reference to FIGS. 108A through 108F, 110, and 111, of other cases of the user changing the printer 4006 from P-2-2 to P-2-1 using the SPS server 4003 (B-1-1). In the cases of FIGS. 110 and 111, no channel information is provided to the SPS server 4003 (B-1-1).

FIG. 110 is a sequence diagram for illustrating the fourth printer changing operation.

For instance, it is assumed that the user has selected the printer 4006 (P-2-2) and has made a printing reservation. In this case, when the reservation list obtaining part 4055 of the printing environment sharing service 4013 (B-1-1) is informed by the screen control part 4059 of the printing environment sharing service 4013 (B-1-1) that the user has entered her/his user ID and password and performed a predetermined operation such as the tapping of a printing reservation selection screen display button, operating the touch panel of the SPS server 4003 (B-1-1), the reservation list obtaining part 4055 searches the reservation information stored in the HDD 4039 of the SPS server 4003 (B-1-1) for reservation information corresponding to the user ID.

For instance, when the screen control part 4059 of the printing environment sharing service 4013 (B-1-1) is informed by the reservation list obtaining part 4055 of the printing environment sharing service 4013 (B-1-1) that no corresponding reservation information is stored, the screen control part 4059 creates a printing reservation selection screen as shown in FIG. 108A, and presents the printing reservation selection screen to the user, displaying the screen on the touch panel.

When the reservation list obtaining part 4055 of the printing environment sharing service 4013 (B-1-1) is informed by the screen control part 4059 of the printing environment sharing service 4013 (B-1-1) that the user has selected NO RESERVATION and tapped on the RESERVATION INFORMATION SEARCH button 4310a on the printing reservation selection screen of FIG. 108A, in step S4380 of FIG. 110, the reservation list obtaining part 4055 refers to the service list 4071 of the printing environment sharing service 4013 (B-1-1), creates channel information for information searching (B-1-1→B-1), and transmits a reservation list obtaining request including the user ID to the printing environment sharing service 4013 (B-1) superordinate to the printing environment sharing service 4013 (B-1-1).

When the printing environment sharing service 4013 (B-1) receives the request, in step S4381, the reservation list obtaining part 4055 of the printing environment sharing service 4013 (B-1) retrieves corresponding reservation information from the reservation information stored in the SPS server 4003 (B-1) based on the user ID included in the request, and obtains the reservation names and reservation numbers of the corresponding reservation information. However, when no corresponding reservation information is stored, the reservation list obtaining part 4055 of the printing environment sharing service 4013 (B-1) transmits a response to the effect that no corresponding reservation information is stored to the printing environment sharing service 4013 (B-1-1) based on the channel information for information searching (B-1-1→B-1).

When the printing environment sharing service 4013 (B-1-1) receives the response to the effect that no corresponding reservation information is stored, in step S4382, the reservation list obtaining part 4055 of the printing environment sharing service 4013 (B-1-1) transmits to the printing environment sharing service 4013 (B-1) superordinate thereto, based on the channel information for information searching (B-1-1→B-1), a reservation list obtaining request including the user ID to a printing environment sharing service 4013 subordinate to the printing environment sharing service 4013 (B-1).

When the printing environment sharing service 4013 (B-1) receives the request, in step S4383, the reservation list obtaining part 4055 of the printing environment sharing service 4013 (B-1) refers to the service list 4071 of the printing environment sharing service 4013 (B-1), adds channel information from B-1 to B-1-2 to the channel information for information searching (B-1-1→B-1), and transmits the reservation list obtaining request including the user ID to the printing environment sharing service 4013 (B-1-2), which is subordinate to the printing environment sharing service 4013 (B-1), based on the channel information for information searching (B-1-1→B-1→B-1-2).

When the printing environment sharing service 4013 (B-1-2) receives the request, in step S4384, the reservation list obtaining part 4055 of the printing environment sharing service 4013 (B-1-2) obtains the reservation names and reservation numbers of corresponding reservation information among the reservation information stored in the SPS server 4003 (B-1-2) based on the user ID included in the request, and transmits the reservation names and numbers as a reservation list to the printing environment sharing service 4013 (B-1) based on channel information for information searching B-1-1→B-1→B-1-2.

When the printing environment sharing service 4013 (B-1) receives the reservation list, in step S4385, the reservation list obtaining part 4055 of the printing environment sharing service 4013 (B-1) transmits the reservation list to the printing environment sharing service 4013 (B-1-1) based on the channel information for information searching B-1-1→B-1→B-1-2.

The reservation list obtaining part 4055 of the printing environment sharing service 4013 (B-1-1) provides the received reservation list to the screen control part 4059 of the printing environment sharing service 4013 (B-1-1). Then, the screen control part 4059 of the printing environment sharing service 4013 (B-1-1) creates a printing reservation selection screen displaying the reservation list as shown in FIG. 108B, and presents the printing reservation selection screen to the user, displaying the screen on the touch panel.

The operation of steps S4386 through S4393 of FIG. 110 is equal to the operation of steps S4364 through S4371 of FIG. 109. The reservation information changing operation of FIG. 110 is equal to that of FIG. 109.

By the printing environment sharing services 4013 performing the operation shown in FIG. 110, the user can directly operate the SPS server 4003 and change a printer without providing channel information.

Next, a description is given, with reference to FIGS. 108A through 108F and 111 of another case of changing the printer 4006 without channel information.

FIG. 111 is a sequence diagram for illustrating the fifth printer changing operation.

For instance, it is assumed that the user has selected the printer 4006 (P-2-2) and has made a printing reservation. In this case, when the reservation list obtaining part 4055 of the printing environment sharing service 4013 (B-1-1) is informed by the screen control part 4059 of the printing environment sharing service 4013 (B-1-1) that the user has entered her/his user ID and password and performed a predetermined operation such as the tapping of a printing reservation selection screen display button, operating the touch panel of the SPS server 4003 (B-1-1), the reservation list obtaining part 4055 searches the reservation information stored in the HDD 4039 of the SPS server 4003 (B-1-1) for reservation information corresponding to the user ID.

For instance, when the screen control part 4059 of the printing environment sharing service 4013 (B-1-1) is informed by the reservation list obtaining part 4055 of the printing environment sharing service 4013 (B-1-1) that no corresponding reservation information is stored, the screen control part 4059 creates a printing reservation selection screen as shown in FIG. 108A, and presents the printing reservation selection screen to the user, displaying the screen on the touch panel.

When the reservation list obtaining part 4055 of the printing environment sharing service 4013 (B-1-1) is informed by the screen control part 4059 of the printing environment sharing service 4013 (B-1-1) that the user has selected NO RESERVATION and tapped on the RESERVATION INFORMATION SEARCH button 4280a on the printing reservation selection screen of FIG. 108A, in step S4400 of FIG. 111, the reservation list obtaining part 4055 refers to the service list 4071 of the printing environment sharing service 4013 (B-1-1), creates channel information for information searching (B-1-1→B-1), and transmits a reservation list obtaining request including the user ID to the printing environment sharing service 4013 (B-1) superordinate to the printing environment sharing service 4013 (B-1-1).

When the printing environment sharing service 4013 (B-1) receives the request, in step S4401, the reservation list obtaining part 4055 of the printing environment sharing service 4013 (B-1) retrieves corresponding reservation information from the reservation information stored in the SPS server 4003 (B-1) based on the user ID included in the request, and obtains the reservation names and reservation numbers of the corresponding reservation information. However, when no corresponding reservation information is stored, the reservation list obtaining part 4055 of the printing environment sharing service 4013 (B-1) refers to the service list 4071 of the printing environment sharing service 4013 (B-1), adds channel information from B-1 to B-1-2 to the channel information for information searching (B-1-1→B-1), and transmits a reservation list obtaining request including the user ID to the printing environment sharing service 4013 (B-1-2) subordinate to the printing environment sharing service 4013 (B-1-1) based on the channel information for information searching (B-1-1→B-1→B-1-2).

When the printing environment sharing service 4013 (B-1-2) receives the request, in step S4402, the reservation list obtaining part 4055 of the printing environment sharing service 4013 (B-1-2) obtains the reservation names and reservation numbers of corresponding reservation information among the reservation information stored in the SPS server 4003 (B-1-2) based on the user ID included in the request, and transmits the reservation names and numbers as a reservation list to the printing environment sharing service 4013 (B-1) based on channel information for information searching B-1-1→B-1→B-1-2.

When the printing environment sharing service 4013 (B-1) receives the reservation list, in step S4403, the reservation list obtaining part 4055 of the printing environment sharing service 4013 (B-1) transmits the reservation list to the printing environment sharing service 4013 (B-1-1), which has requested the reservation list, based on the channel information for information searching B-1-1→B-1→B-1-2.

The reservation list obtaining part 4055 of the printing environment sharing service 4013 (B-1-1) provides the received reservation list to the screen control part 4059 of the printing environment sharing service 4013 (B-1-1). Then, the screen control part 4059 of the printing environment sharing service 4013 (B-1-1) creates a printing reservation selection screen displaying the reservation list as shown in FIG. 108B, and presents the printing reservation selection screen to the user, displaying the screen on the touch panel.

The operation of steps S4404 through S4411 of FIG. 111 is equal to the operation of steps S4386 through S4393 of FIG. 110. Further, the reservation information changing operation of FIG. 111 is equal to that of FIG. 110.

In contrast to the operation shown in FIG. 110, in the operation of FIG. 111, when the reservation list obtaining part 4055 of the printing environment sharing service 4013 (B-1) searches the reservation information stored in the HDD 4039 of the SPS server 4003 (B-1) for the corresponding reservation information in response to a reservation list obtaining request to find that no corresponding reservation information is stored, the reservation list obtaining part 4055 spontaneously refers to the service list 4071 of the printing environment sharing service 4013 (B-1), and transmits a reservation list obtaining request including the user ID to the subordinate printing environment sharing service 4013 (B-1-2), thereby obtaining a corresponding reservation list.

By the printing environment sharing services 4013 performing the operation shown in FIG. 111, the user can directly operate the SPS server 4003 and change a printer without providing channel information.

In the operation of FIG. 111, if no corresponding reservation information is stored in any printing environment sharing services 4013 subordinate to the printing environment sharing services 4013 (B-1) either, the reservation list obtaining part 4055 of the printing environment sharing services 4013 (B-1) refers to the service list 4071 of the printing environment sharing services 4013 (B-1), and transmits a reservation list obtaining request including the user ID to the printing environment sharing services 4013 (R-0) superordinate to the printing environment sharing services 4013 (B-1), thereby requesting the printing environment sharing services 4013 (R-0) to obtain a reservation list.

Figure 113:
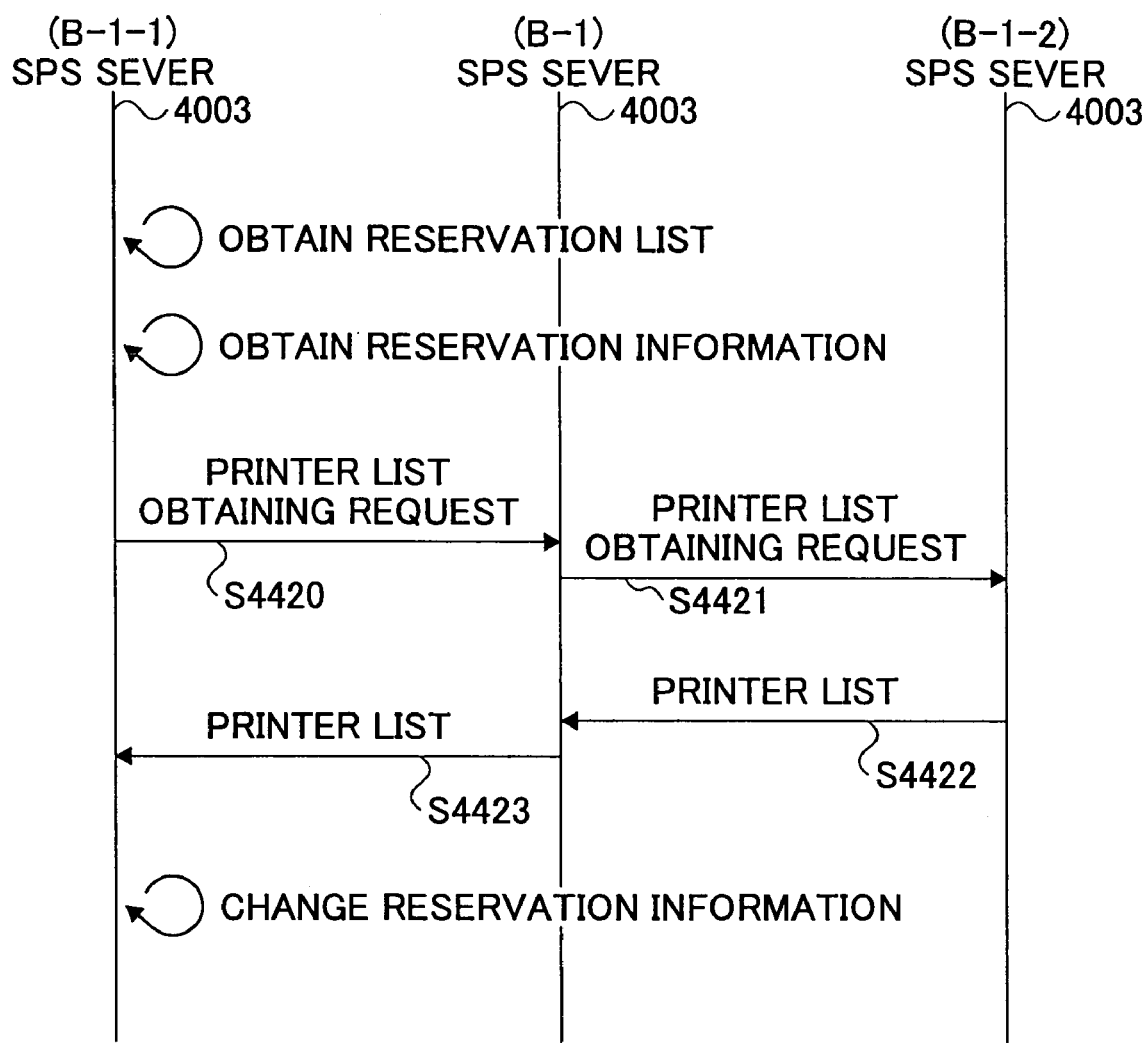
FIG. 113 is a sequence diagram for illustrating the sixth printer changing operation according to the sixth embodiment of the present invention.

Next, a description is given, with reference to FIGS. 112A through 113, of another case of the user changing the printer 4006 from P-2-2 to P-2-1 using the SPS server 4003 (B-1-1) (a sixth printer changing operation). In the case of FIGS. 112A through 113, a recording medium on which reservation information as well as channel information is recorded is inserted into the slot of the SPS server 4003 (B-1-1) by the user so that the reservation information as well as the channel information is provided to the SPS server 4003 (B-1-1).

FIGS. 112A through 112E are diagrams and FIG. 113 is a sequence diagram for illustrating the sixth printer changing operation.

For instance, it is assumed that the user has selected the printer 4006 (P-2-2) and has made a printing reservation. In this case, when the reservation list obtaining part 4055 of the printing environment sharing service 4013 (B-1-1) is informed by the screen control part 4059 of the printing environment sharing service 4013 (B-1-1) that the user has entered her/his user ID and password and performed a predetermined operation such as the tapping of a printing reservation selection screen display button, operating the touch panel of the SPS server 4003 (B-1-1), as shown in FIG. 113, the reservation list obtaining part 4055 obtains the reservation names and reservation numbers of reservation information corresponding to the user ID among the reservation information read out from the inserted recording medium, and provides the reservation names and numbers as a reservation list to the screen control part 4059 of the printing environment sharing service 4013 (B-1-1).

Receiving the reservation list, the screen control part 4059 of the printing environment sharing service 4013 (B-1-1) creates a printing reservation selection screen as shown in FIG. 112A, and presents the printing reservation selection screen to the user, displaying the screen on the touch panel.

For instance, when the reservation information obtaining part 4053 of the printing environment sharing service 4013 (B-1-1) is informed by the screen control part 4059 of the printing environment sharing service 4013 (B-1-1) that the user has selected RESERVATION 1 and tapped on a RESERVATION CONTENTS button 4320a on the printing reservation selection screen of FIG. 112A, as shown in FIG. 113, the reservation information obtaining part 4053 obtains the reservation information of the corresponding reservation number from the reservation information read out from the inserted recording medium, and provides the obtained reservation information to the screen control part 4059 of the printing environment sharing service 4013 (B-1-1).

Receiving the reservation information, the screen control part 4059 of the printing environment sharing service 4013 (B-1-1) creates a printing reservation contents display screen displaying the reservation information as shown in FIG. 112B, and presents the printing reservation contents display screen to the user, displaying the screen on the touch panel.

For instance, when the user taps on a CHANGE RESERVATION button 4321a on the printing reservation contents display screen of FIG. 112B, the screen control part 4059 of the printing environment sharing service 4013 (B-1-1) creates a reservation change screen as shown in FIG. 112C, and presents the reservation change screen to the user, displaying the screen on the touch panel.

For instance, when the printer list obtaining part 4042 of the printing environment sharing service 4013 (B-1-1) is informed by the screen control part 4059 of the printing environment sharing service 4013 (B-1-1) that the user has selected CHANGE PRINTER and tapped on a NEXT button 4322a on the reservation change screen of FIG. 112C, in step S4420 of FIG. 113, the printer list obtaining part 4042 compares the channel information read out from the recording medium (A-1-1→A-1→R-0→B-1→B-1-2) and the service list 4071 stored in, for instance, the HDD 4039 of the SPS server 4003 (B-1-1) When the printer list obtaining part 4042 of the printing environment sharing service 4013 (B-1-1) determines that an identifier identifying the printing environment sharing service 4013 (B-1-1) is not included in the channel information read out from the recording medium, the printer list obtaining part 4042 creates channel information for information searching (B-1-1→B-1), and transmits a request to obtain the printer list 4072 of the printing environment sharing service 4013 (B-1-2) to the superordinate printing environment sharing service 4013 (B-1) based on the channel information for information searching (B-1-1→B-1). The request includes the channel information read out from the recording medium.

When the printing environment sharing service 4013 (B-1) receives the request, in step S4421, the printer list obtaining part 4042 of the printing environment sharing service 4013 (B-1) compares the channel information (A-1-1→A-1→R-0→B-1→B-1-2) included in the received request and the service list 4071 stored in, for instance, the HDD 4039 of the SPS server 4003 (B-1). When the printer list obtaining part 4042 of the printing environment sharing service 4013 (B-1) determines that an identifier identifying the printing environment sharing service 4013 (B-1) is included in the channel information, the printer list obtaining part 4042 adds channel information from B-1 to B-1-2 to the channel information for information searching (B-1-1→B-1), and transmits the request to obtain the printer list 4072 of the printing environment sharing service 4013 (B-1-2) to the printing environment sharing service 4013 (B-1-2) based on the channel information for information searching B-1-1→B-1→B-1-2.

When the printing environment sharing service 4013 (B-1-2) receives the request, in step S4422, the printer list obtaining part 4042 of the printing environment sharing service 4013 (B-1-2) obtains the printer list 4072 stored in the HDD 4039 of the SPS server 4003 (B-1-2), and transmits the printer list 4072 to the printing environment sharing service 4013 (B-1) based on the channel information for information searching B-1-1→B-1→B-1-2.

When the printing environment sharing service 4013 (B-1) receives the printer list 4072 of the printing environment sharing service 4013 (B-1-2), in step S4423, the printer list obtaining part 4042 of the printing environment sharing service 4013 (B-1) transmits the printer list 4072 of the printing environment sharing service 4013 (B-1-2) to the printing environment sharing service 4013 (B-1-1) based on the channel information for information searching B-1-1→B-1→B-1-2.

When the printing environment sharing service 4013 (B-1-1) receives the printer list 4072 of the printing environment sharing service 4013 (B-1-2), the printer list obtaining part 4042 of the printing environment sharing service 4013 (B-1-1) provides the printer list 4072 of the printing environment sharing service 4013 (B-1-2) to the screen control part 4059 of the printing environment sharing service 4013 (B-1-1). Then, the screen control part 4059 of the printing environment sharing service 4013 (B-1-1) creates a printer change screen as shown in FIG. 112D based on the printer list 4072 of the printing environment sharing service 4013 (B-1-2), and presents the printer change screen to the user, displaying the screen on the touch panel.

The user can change the printer using the printer change screen of FIG. 112D.

For instance, when the user selects "P-2-1" and taps on an OK button 4323a on the printer change screen of FIG. 112D, the screen control part 4059 of the printing environment sharing service 4013 (B-1-1) creates a printer change confirmation screen as shown in FIG. 112E, and presents the printer change confirmation screen to the user, displaying the screen on the touch panel.

For instance, when the reservation information changing part 4056 of the printing environment sharing service 4013 (B-1-1) is informed by the screen control part 4059 of the printing environment sharing service 4013 (B-1-1) that the user has tapped on a CHANGE PRINTER button 4324a on the printer change confirmation screen of FIG. 112E, the reservation information changing part 4056 replaces identification information identifying the printer 4006 (P-2-2) included in the previous reservation information obtained by the reservation information obtaining part 4053 with identification information identifying the new printer 4006 (P-2-1).

By the printing environment sharing services 4013 performing the operation shown in FIGS. 112A through 113, the user can directly operate the SPS server 4003 and change a printer, providing the SPS server 4003 with channel information and reservation information.

By the printing environment sharing services 4013 performing the operations described with reference to FIGS. 106A through 113, the use can change a printer 4006 reserved in reservation information and print a document, operating the SPS server 4003, even if, for instance, the printer 4006 is substantially occupied by another user.

Next, a description is given, with reference to FIGS. 114A through 121, of printing condition changing operations.

Figure 115:
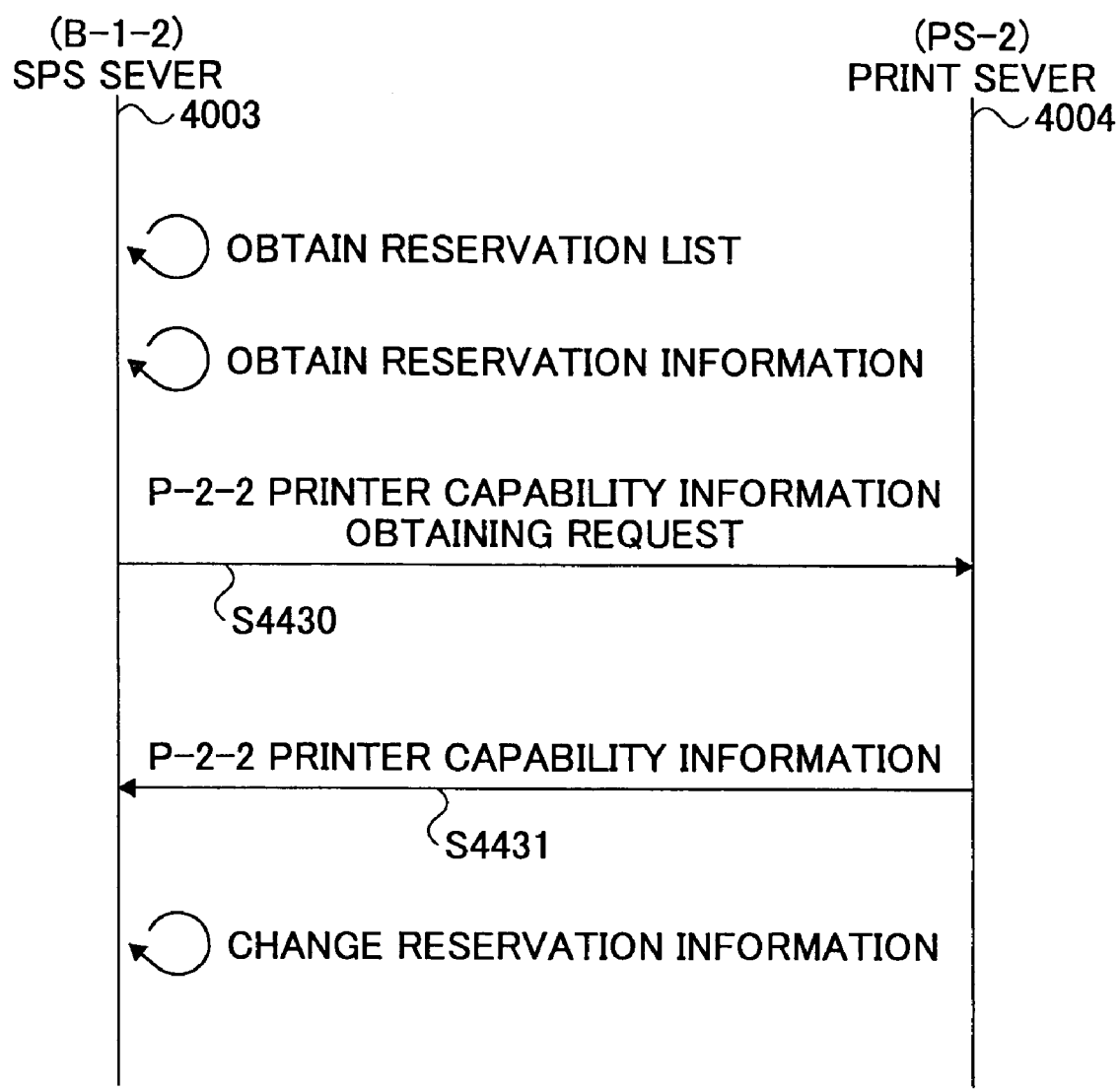
FIG. 115 is a sequence diagram for illustrating the second printing condition changing operation according to the sixth embodiment of the present invention.

FIGS. 114A through 114D are diagrams and FIG. 115 is a sequence diagram for illustrating a second printing condition changing operation.

In the case of FIGS. 114A through 114D and FIG. 115, the user changes printing conditions in printing on the printer 4006 (P-2-2) using the SPS server 4003 (B-1-2).

For instance, it is assumed that the user has selected the printer 4006 (P-2-2), set printing conditions, and made a printing reservation. In this case, when the reservation list obtaining part 4055 of the printing environment sharing service 4013 (B-1-2) is informed by the screen control part 4059 of the printing environment sharing service 4013 (B-1-2) that the user has entered her/his user ID and password and performed a predetermined operation such as the tapping of a printing reservation selection screen display button, operating the touch panel of the SPS server 4003 (B-1-2), as shown in FIG. 115, the reservation list obtaining part 4055 obtains the reservation names and reservation numbers of reservation information corresponding to the user ID among the reservation information stored in the HDD 4039 of the SPS server 4003 (B-1-2), and provides the reservation names and numbers as a reservation list to the screen control part 4059 of the printing environment sharing service 4013 (B-1-2).

Receiving the reservation list, the screen control part 4059 of the printing environment sharing service 4013 (B-1-2) creates a printing reservation selection screen as shown in FIG. 114A, and presents the printing reservation selection screen to the user, displaying the screen on the touch panel.

For instance, when the reservation information obtaining part 4053 of the printing environment sharing service 4013 (B-1-2) is informed by the screen control part 4059 of the printing environment sharing service 4013 (B-1-2) that the user has selected RESERVATION 1 and tapped on a RESERVATION CONTENTS button 4330a on the printing reservation selection screen of FIG. 114A, as shown in FIG. 115, the reservation information obtaining part 4053 obtains the reservation information of the corresponding reservation number from the reservation information stored in the HDD 4039 of the SPS server 4003 (B-1-2), and provides the obtained reservation information to the screen control part 4059 of the printing environment sharing service 4013 (B-1-2).

Receiving the reservation information, the screen control part 4059 of the printing environment sharing service 4013 (B-1-2) creates a printing reservation contents display screen as shown in FIG. 114B displaying the reservation information, and presents the printing reservation contents display screen to the user, displaying the screen on the touch panel.

For instance, when the user taps on a CHANGE RESERVATION button 4331a on the printing reservation contents display screen of FIG. 114B, the screen control part 4059 of the printing environment sharing service 4013 (B-1-2) creates a reservation change screen as shown in FIG. 114C, and presents the reservation change screen to the user, displaying the screen on the touch panel.

For instance, when the printer capability information obtaining part 4045 of the printing environment sharing service 4013 (B-1-2) is informed by the screen control part 4059 of the printing environment sharing service 4013 (B-1-2) that the user has selected CHANGE PRINTING CONDITIONS and tapped on a NEXT button 4332a on the reservation change screen of FIG. 114C, in step S4430 of FIG. 115, the printer capability information obtaining part 4045 transmits a request to obtain the capability information of the printer 4006 (P-2-2) to the document print service 4014 (PS-2).

Receiving the request, in step S4431, the document print service 4014 (PS-2) obtains the capability information of the printer 4006 (P-2-2) stored in, for instance, the print server 4004 (PS-2), and transmits the obtained capability information to the printing environment sharing service 4013 (B-1-2).

When the printing environment sharing service 4013 (B-1-2) receives the capability information of the printer 4006 (P-2-2), the printer capability information obtaining part 4045 of the printing environment sharing service 4013 (B-1-2) provides the capability information of the printer 4006 (P-2-2) to the screen control part 4059 of the printing environment sharing service 4013 (B-1-2). Then, the screen control part 4059 of the printing environment sharing service 4013 (B-1-2) creates a printing condition change screen as shown in FIG. 114D based on the capability information of the printer 4006 (P-2-2), and presents the printing condition change screen to the user, displaying the screen on the touch panel.

For instance, when the user changes the printing conditions and taps on a CHANGE PRINTING CONDITIONS button 4333a on the printing condition change screen of FIG. 114D, the screen control part 4059 of the printing environment sharing service 4013 (B-1-2) informs the reservation information changing part 4056 of the printing environment sharing service 4013 (B-1-2) that the CHANGE PRINTING CONDITIONS button 4333a has been tapped on, and provides the reservation information changing part 4056 with new (updated) reservation information. The reservation information changing part 4056 of the printing environment sharing service 4013 (B-1-2) replaces the previous reservation information obtained by the reservation information obtaining part 4053 with the new reservation information (reservation information updated by the user).

The user can change the printing conditions using the printing condition change screen of FIG. 114D.

Figure 117:
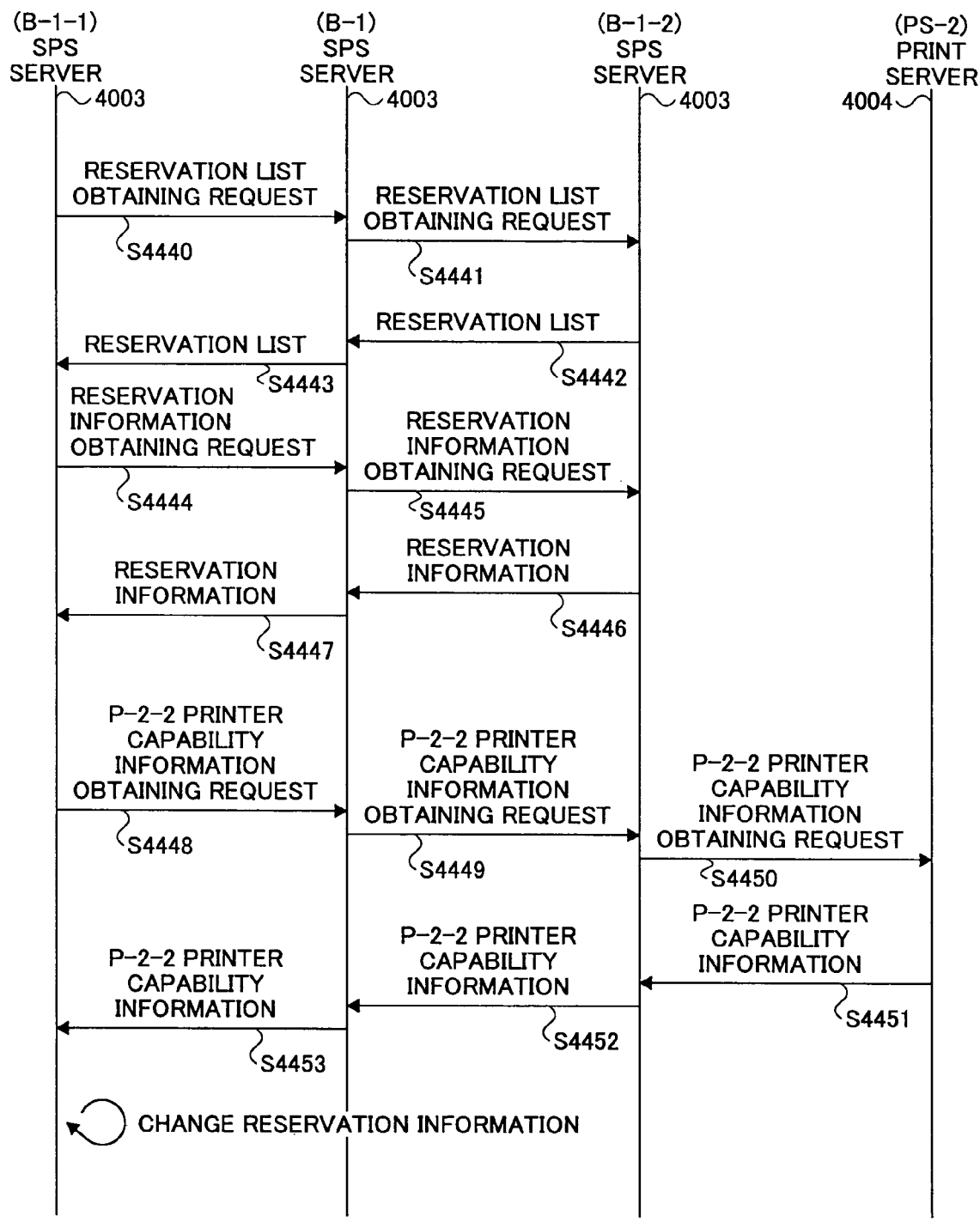
FIG. 117 is a sequence diagram for illustrating the third printing condition changing operation according to the sixth embodiment of the present invention.

Next, a description is given, with reference to FIGS. 116A through 117, of a case of the user changing the printing conditions of the printer 6 (P-2-2) using the SPS server 4003 (B-1-1) (a third printing condition changing operation). In the case of FIG. 117, a recording medium on which channel information is recorded is inserted into the slot of the SPS server 4003 (B-1-1) by the user so that the channel information is provided to the SPS server 4003 (B-1-1).

FIGS. 116A through 116E are diagrams for illustrating the third printing condition changing operation as well as below-described fourth and fifth printing condition changing operations. FIG. 117 is a sequence diagram for illustrating the third printing condition changing operation.

For instance, it is assumed that the user has selected the printer 4006 (P-2-2), set printing conditions, and made a printing reservation. In this case, when the reservation list obtaining part 4055 of the printing environment sharing service 4013 (B-1-1) is informed by the screen control part 4059 of the printing environment sharing service 4013 (B-1-1) that the user has entered her/his user ID and password and performed a predetermined operation such as the tapping of a printing reservation selection screen display button, operating the touch panel of the SPS server 4003 (B-1-1), the reservation list obtaining part 4055 searches the reservation information stored in the HDD 4039 of the SPS server 4003 (B-1-1) for reservation information corresponding to the user ID.

For instance, when the screen control part 4059 of the printing environment sharing service 4013 (B-1-1) is informed by the reservation list obtaining part 4055 of the printing environment sharing service 4013 (B-1-1) that no corresponding reservation information is stored, the screen control part 4059 creates a printing reservation selection screen as shown in FIG. 116A, and presents the printing reservation selection screen to the user, displaying the screen on the touch panel.

When the reservation list obtaining part 4055 of the printing environment sharing service 4013 (B-1-1) is informed by the screen control part 4059 of the printing environment sharing service 4013 (B-1-1) that the user has selected NO RESERVATION and tapped on a RESERVATION INFORMATION SEARCH button 4340a on the printing reservation selection screen of FIG. 116A, in step S4440 of FIG. 117, the reservation list obtaining part 4055 compares the channel information read out from the recording medium (A-1-1→A-1→R-0→B-1→B-1-2) and the service list 4071 stored in, for instance, the HDD 4039 of the SPS server 4003 (B-1-1). When the reservation list obtaining part 4055 of the printing environment sharing service 4013 (B-1-1) determines that an identifier identifying the printing environment sharing service 4013 (B-1-1) is not included in the channel information read out from the recording medium, the reservation list obtaining part 4055 creates channel information for information searching (B-1-1→B-1), and transmits a service list obtaining request including the channel information read out from the recording medium to the superordinate printing environment sharing service 4013 (B-1) based on the channel information for information searching (B-1-1→B-1).

When the printing environment sharing service 4013 (B-1) receives the request, in step S4441, the reservation list obtaining part 4055 of the printing environment sharing service 4013 (B-1) compares the channel information (A-1-1→A-1→R-0→B-1→B-1-2) included in the received request and the service list 4071 stored in, for instance, the HDD 4039 of the SPS server 4003 (B-1). When the reservation list obtaining part 4055 of the printing environment sharing service 4013 (B-1) determines that an identifier identifying the printing environment sharing service 4013 (B-1) is included in the channel information, the reservation list obtaining part 4055 adds channel information from B-1 to B-1-2 to the channel information for information searching (B-1-1→B-1), and transmits a reservation list obtaining request to the printing environment sharing service 4013 (B-1-2) based on the channel information for information searching (B-1-1→B-1→B-1-2).

When the printing environment sharing service 4013 (B-1-2) receives the request, in step S4442, the reservation list obtaining part 4055 of the printing environment sharing service 4013 (B-1-2) obtains the reservation names and reservation numbers of corresponding reservation information among the reservation information stored in the SPS server 4003 (B-1-2) based on the user ID included in the request, and transmits the reservation names and numbers as a reservation list to the printing environment sharing service 4013 (B-1) based on channel information for information searching B-1-1→B-1→B-1-2.

When the printing environment sharing service 4013 (B-1) receives the reservation list, in step S4443, the reservation list obtaining part 4055 of the printing environment sharing service 4013 (B-1) transmits the reservation list to the printing environment sharing service 4013 (B-1-1) based on the channel information for information searching B-1-1→B-1→B-1-2.

The reservation list obtaining part 4055 of the printing environment sharing service 4013 (B-1-1) provides the received reservation list to the screen control part 4059 of the printing environment sharing service 4013 (B-1-1). Then, the screen control part 4059 of the printing environment sharing service 4013 (B-1-1) creates a printing reservation selection screen displaying the reservation list as shown in FIG. 116B, and presents the printing reservation selection screen to the user, displaying the screen on the touch panel.

For instance, when the reservation information obtaining part 4053 of the printing environment sharing service 4013 (B-1-1) is informed by the screen control part 4059 of the printing environment sharing service 4013 (B-1-1) that the user has selected RESERVATION 1 and tapped on a RESERVATION CONTENTS button 4341a on the printing reservation selection screen of FIG. 116B, in step S4444, the reservation information obtaining part 4053 transmits a request to obtain reservation information corresponding to RESERVATION 1 stored in the SPS server 4003 (B-1-2) to the printing environment sharing service 4013 (B-1) based on the channel information for information searching B-1-1→B-1→B-1-2.

When the printing environment sharing service 4013 (B-1) receives the request, in step S4445, the reservation information obtaining part 4053 of the printing environment sharing service 4013 (B-1) transmits the request to the printing environment sharing service 4013 (B-1-2) based on the channel information for information searching B-1-1→B-1→B-1-2.

When the printing environment sharing service 4013 (B-1-2) receives the request, in step S4446, the reservation information obtaining part 4053 of the printing environment sharing service 4013 (B-1-2) obtains the corresponding reservation information from the reservation information stored in the SPS server 4003 (B-1-2) based on the reservation number included in the request, and transmits the obtained reservation information to the printing environment sharing service 4013 (B-1) based on the channel information for information searching B-1-1→B-1→B-1-2.

When the printing environment sharing service 4013 (B-1) receives the reservation information, in step S4447, the reservation information obtaining part 4053 of the printing environment sharing service 4013 (B-1) transmits the reservation information to the printing environment sharing service 4013 (B-1-1) based on the channel information for information searching B-1-1→B-1→B-1-2.

The reservation information obtaining part 4053 of the printing environment sharing service 4013 (B-1-1) provides the received reservation information to the screen control part 4059 of the printing environment sharing service 4013 (B-1-1). Then, the screen control part 4059 of the printing environment sharing service 4013 (B-1-1) creates a printing reservation contents display screen displaying the reservation information as shown in FIG. 116C, and presents the printing reservation contents display screen to the user, displaying the screen on the touch panel.

For instance, when the user taps on a CHANGE RESERVATION button 4342*a* on the printing reservation contents display screen of FIG. 116C, the screen control part 4059 of the printing environment sharing service 4013 (B-1-1) creates a reservation change screen as shown in FIG. 116D, and presents the reservation change screen to the user, displaying the screen on the touch panel.

For instance, when the printer capability information obtaining part 4045 of the printing environment sharing service 4013 (B-1-1) is informed by the screen control part 4059 of the printing environment sharing service 4013 (B-1-1) that the user has selected CHANGE PRINTING CONDITIONS and tapped on a NEXT button 4343*a* on the reservation change screen of FIG. 116D, in step S4448, the printer capability information obtaining part 4045 transmits a request to obtain the printer capability information of the printer 4006 (P-2-2) to the printing environment sharing service 4013 (B-1) based on the channel information for information searching B-1-1→B-1→B-1-2.

When the printing environment sharing service 4013 (B-1) receives the request, in step S4449, the printer capability information obtaining part 4045 of the printing environment sharing service 4013 (B-1) transmits the request to the printing environment sharing service 4013 (B-1-2) based on the channel information for information searching B-1-1→B-1→B-1-2.

When the printing environment sharing service 4013 (B-1-2) receives the request, in step S4450, the printer capability information obtaining part 4045 of the printing environment sharing service 4013 (B-1-2) transmits the request to the document print service 4014 (PS-2).

Receiving the request, in step S4451, the document print service 4014 (PS-2) obtains the capability information of the printer 4006 (P-2-2) stored in, for instance, the print server 4004 (PS-2) and transmits the obtained capability information to the printing environment sharing service 4013 (B-1-2).

When the printing environment sharing service 4013 (B-1-2) receives the capability information of the printer 4006 (P-2-2), in step S4452, the printer capability information obtaining part 4045 of the printing environment sharing service 4013 (B-1-2) transmits the capability information of the printer 4006 (P-2-2) to the printing environment sharing service 4013 (B-1) based on the channel information for information searching B-1-1→B-1→B-1-2.

When the printing environment sharing service 4013 (B-1) receives the capability information of the printer 4006 (P-2-2), in step S4453, the printer capability information obtaining part 4045 of the printing environment sharing service 4013 (B-1) transmits the capability information of the printer 4006 (P-2-2) to the printing environment sharing service 4013 (B-1-1) based on the channel information for information searching B-1-1→B-1→B-1-2.

When the printing environment sharing service 4013 (B-1-1) receives the capability information of the printer 4006 (P-2-2), the printer capability information obtaining part 4045 of the printing environment sharing service 4013 (B-1-1) provides the capability information of the printer 4006 (P-2-2) to the screen control part 4059 of the printing environment sharing service 4013 (B-1-1). Then, the screen control part 4059 of the printing environment sharing service 4013 (B-1-1) creates a printing condition change screen as shown in FIG. 116E based on the capability information of the printer 4006 (P-2-2), and presents the printing condition change screen to the user, displaying the screen on the touch panel.

For instance, when the user changes the printing conditions and taps on a CHANGE PRINTING CONDITIONS button 4344*a* on the printing condition change screen of FIG. 116E, the screen control part 4059 of the printing environment sharing service 4013 (B-1-1) informs the reservation information changing part 4056 of the printing environment sharing service 4013 (B-1-1) that the CHANGE PRINTING CONDITIONS button 4344*a* has been tapped on, and provides the reservation information changing part 4056 with new (updated) reservation information. The reservation information changing part 4056 of the printing environment sharing service 4013 (B-1-1) replaces the previous reservation information obtained by the reservation information obtaining part 4053 with the new reservation information (reservation information updated by the user).

The user can change the printing conditions using the printing condition change screen of FIG. 116E.

By the printing environment sharing services 4013 performing the operation shown in FIGS. 116A through 117, the user can directly operate the SPS server 4003 and change printing conditions, providing the SPS server 4003 with channel information.

Figure 118:
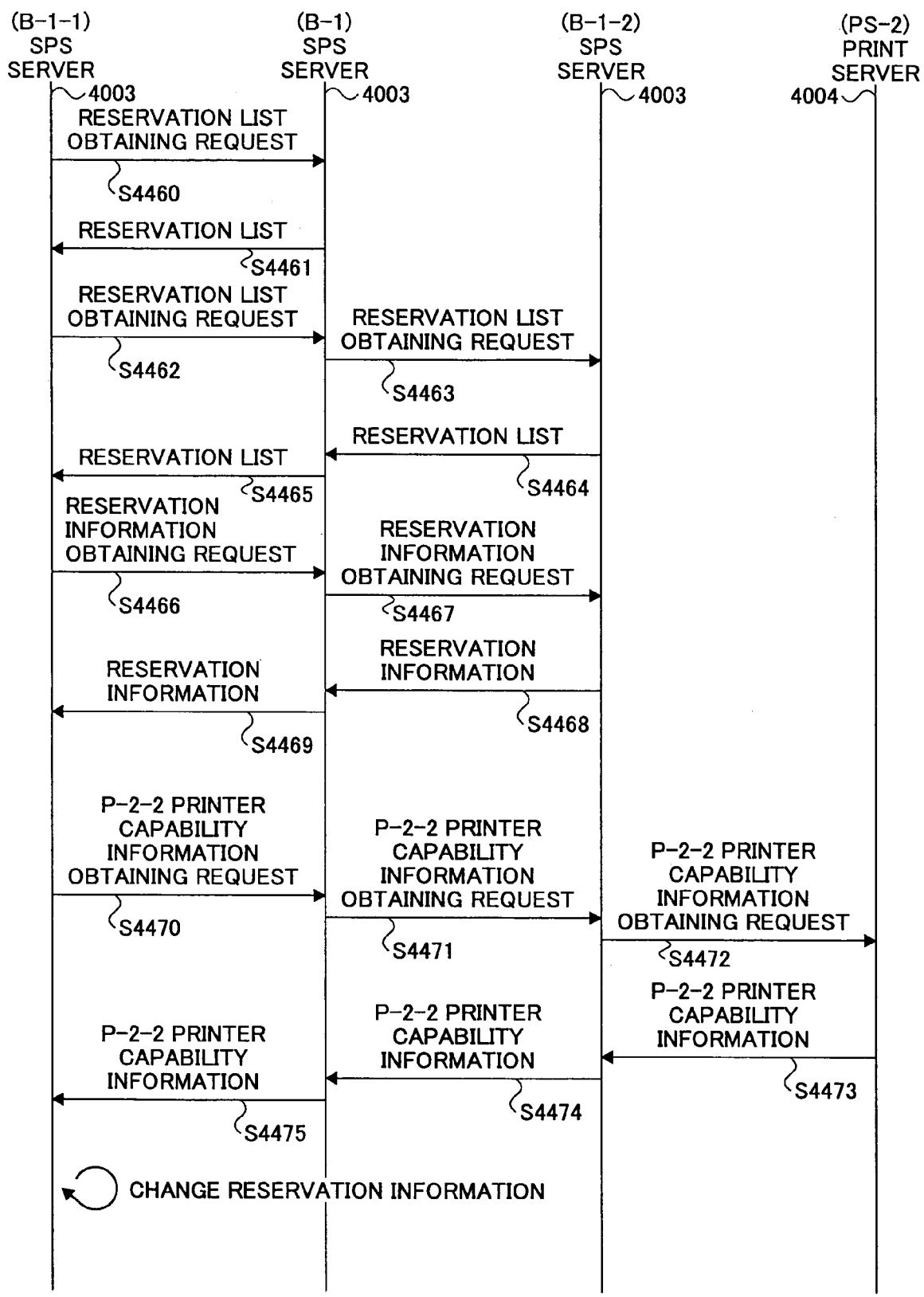
FIG. 118 is a sequence diagram for illustrating the fourth printing condition changing operation according to the sixth embodiment of the present invention.
Figure 119:
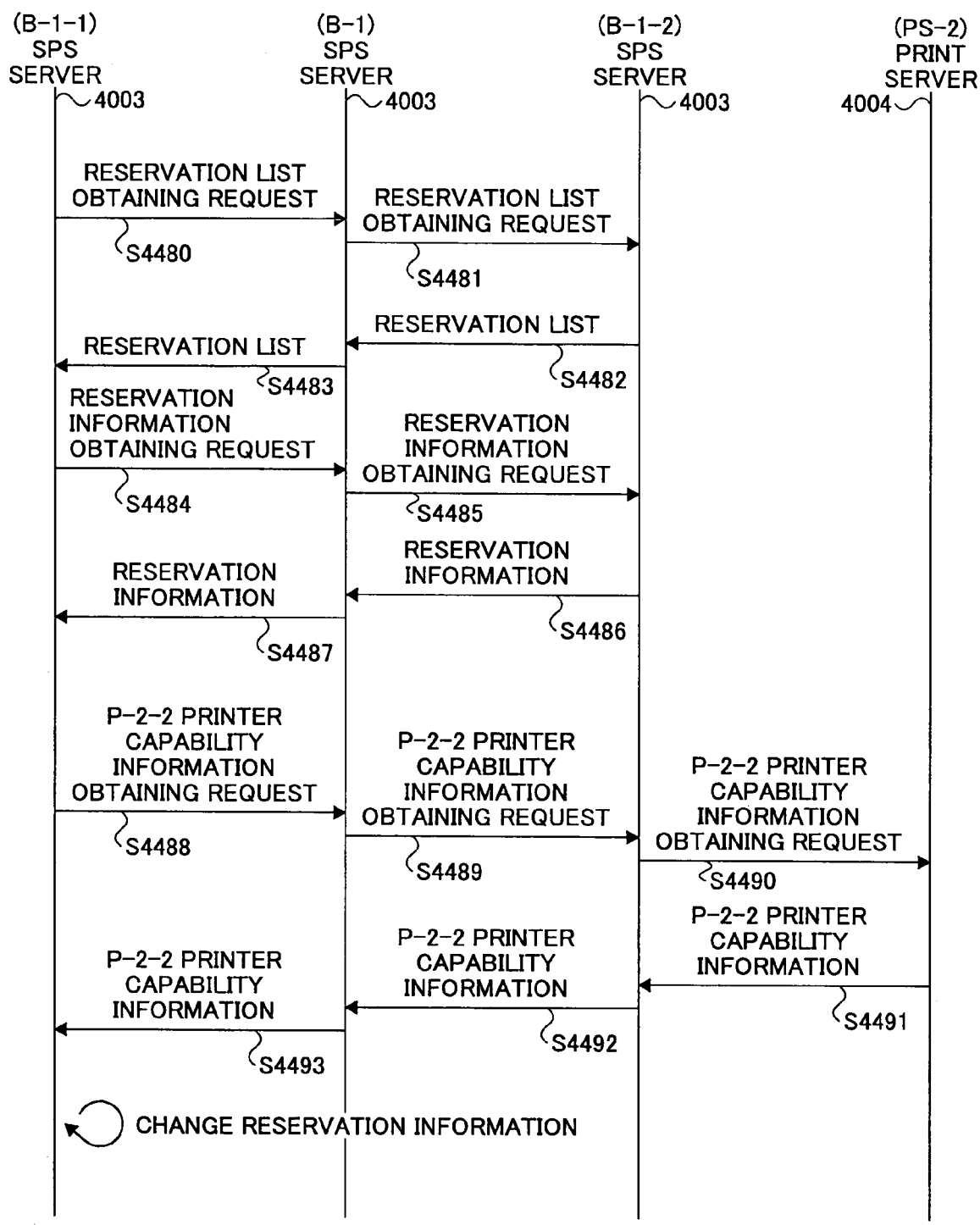

Next, a description is given, with reference to FIGS. 116A through 116E, 118, and 119, of other cases of the user changing the printing conditions of the printer 4006 (P-2-2) using the SPS server 4003 (B-1-1). In the cases of FIGS. 118 and 119, no channel information is provided to the SPS server 4003 (B-1-1).

FIG. 118 is a sequence diagram for illustrating the fourth printing condition changing operation.

For instance, it is assumed that the user has selected the printer 4006 (P-2-2), set printing conditions, and made a printing reservation. In this case, when the reservation list obtaining part 4055 of the printing environment sharing service 4013 (B-1-1) is informed by the screen control part 4059 of the printing environment sharing service 4013 (B-1-1) that the user has entered her/his user ID and password and performed a predetermined operation such as the tapping of a printing reservation selection screen display button, operating the touch panel of the SPS server 4003 (B-1-1), the reservation list obtaining part 4055 searches the reservation information stored in the HDD 4039 of the SPS server 4003 (B-1-1) for reservation information corresponding to the user ID.

For instance, when the screen control part 4059 of the printing environment sharing service 4013 (B-1-1) is informed by the reservation list obtaining part 4055 of the printing environment sharing service 4013 (B-1-1) that no corresponding reservation information is stored, the screen control part 4059 creates a printing reservation selection screen as shown in FIG. 116A, and presents the printing reservation selection screen to the user, displaying the screen on the touch panel.

When the reservation list obtaining part 4055 of the printing environment sharing service 4013 (B-1-1) is informed by the screen control part 4059 of the printing environment sharing service 4013 (B-1-1) that the user has selected NO RESERVATION and tapped on the RESERVATION INFORMATION SEARCH button 4340a on the printing reservation selection screen of FIG. 116A, in step S4460 of FIG. 118, the reservation list obtaining part 4055 refers to the service list 4071 of the printing environment sharing service 4013 (B-1-1), creates channel information for information searching (B-1-1→B-1), and transmits a reservation list obtaining request including the user ID to the printing environment sharing service 4013 (B-1) superordinate to the printing environment sharing service 4013 (B-1-1).

When the printing environment sharing service 4013 (B-1) receives the request, in step S4461, the reservation list obtaining part 4055 of the printing environment sharing service 4013 (B-1) retrieves corresponding reservation information from the reservation information stored in the SPS server 4003 (B-1) based on the user ID included in the request, and obtains the reservation names and reservation numbers of the corresponding reservation information. However, when no corresponding reservation information is stored, the reservation list obtaining part 4055 of the printing environment sharing service 4013 (B-1) transmits a response to the effect that no corresponding reservation information is stored to the printing environment sharing service 4013 (B-1-1) based on the channel information for information searching (B-1-1→B-1).

When the printing environment sharing service 4013 (B-1-1) receives the response to the effect that no corresponding reservation information is stored, in step S4462, the reservation list obtaining part 4055 of the printing environment sharing service 4013 (B-1-1) transmits to the printing environment sharing service 4013 (B-1) superordinate thereto, based on the channel information for information searching (B-1-1→B-1), a reservation list obtaining request including the user ID to a printing environment sharing service 4013 subordinate to the printing environment sharing service 4013 (B-1).

When the printing environment sharing service 4013 (B-1) receives the request, in step S4463, the reservation list obtaining part 4055 of the printing environment sharing service 4013 (B-1) refers to the service list 4071 of the printing environment sharing service 4013 (B-1), adds channel information from B-1 to B-1-2 to the channel information for information searching (B-1-1→B-1), and transmits the reservation list obtaining request including the user ID to the printing environment sharing service 4013 (B-1-2), which is subordinate to the printing environment sharing service 4013 (B-1), based on the channel information for information searching (B-1-1→B-1→B-1-2).

When the printing environment sharing service 4013 (B-1-2) receives the request, in step S4464, the reservation list obtaining part 4055 of the printing environment sharing service 4013 (B-1-2) obtains the reservation names and reservation numbers of corresponding reservation information among the reservation information stored in the SPS server 4003 (B-1-2) based on the user ID included in the request, and transmits the reservation names and numbers as a reservation list to the printing environment sharing service 4013 (B-1) based on channel information for information searching B-1-1→B-1→B-1-2.

When the printing environment sharing service 4013 (B-1) receives the reservation list, in step S4465, the reservation list obtaining part 4055 of the printing environment sharing service 4013 (B-1) transmits the reservation list to the printing environment sharing service 4013 (B-1-1), which has requested the reservation list, based on the channel information for information searching B-1-1→B-1→B-1-2.

The reservation list obtaining part 4055 of the printing environment sharing service 4013 (B-1-1) provides the received reservation list to the screen control part 4059 of the printing environment sharing service 4013 (B-1-1). Then, the screen control part 4059 of the printing environment sharing service 4013 (B-1-1) creates a printing reservation selection screen displaying the reservation list as shown in FIG. 116B, and presents the printing reservation selection screen to the user, displaying the screen on the touch panel.

The operation of steps S4466 through S4475 of FIG. 118 is equal to the operation of steps S4444 through S4453 of FIG. 117. The reservation information changing operation of FIG. 118 is equal to that of FIG. 117.

By the printing environment sharing services 4013 performing the operation shown in FIG. 118, the user can directly operate the SPS server 4003 and change printing conditions without providing channel information.

Next, a description is given, with reference to FIGS. 116A through 116E and 119 of another case of changing printing conditions without channel information.

FIG. 119 is a sequence diagram for illustrating the fifth printing condition changing operation.

For instance, it is assumed that the user has selected the printer 4006 (P-2-2), set printing conditions, and made a printing reservation. In this case, when the reservation list obtaining part 4055 of the printing environment sharing service 4013 (B-1-1) is informed by the screen control part 4059 of the printing environment sharing service 4013 (B-1-1) that the user has entered her/his user ID and password and performed a predetermined operation such as the tapping of a printing reservation selection screen display button, operating the touch panel of the SPS server 4003 (B-1-1), the reservation list obtaining part 4055 searches the reservation information stored in the HDD 4039 of the SPS server 4003 (B-1-1) for reservation information corresponding to the user ID.

For instance, when the screen control part 4059 of the printing environment sharing service 4013 (B-1-1) is informed by the reservation list obtaining part 4055 of the printing environment sharing service 4013 (B-1-1) that no corresponding reservation information is stored, the screen control part 4059 creates a printing reservation selection screen as shown in FIG. 116A, and presents the printing reservation selection screen to the user, displaying the screen on the touch panel.

When the reservation list obtaining part 4055 of the printing environment sharing service 4013 (B-1-1) is informed by the screen control part 4059 of the printing environment sharing service 4013 (B-1-1) that the user has selected NO RESERVATION and tapped on the RESERVATION INFORMATION SEARCH button 4340a on the printing reservation selection screen of FIG. 116A, in step S4480 of FIG. 119, the reservation list obtaining part 4055 refers to the service list 4071 of the printing environment sharing service 4013 (B-1-1), creates channel information for information searching (B-1-1→B-1), and transmits a reservation list obtaining request including the user ID to the printing environment sharing service 4013 (B-1) superordinate to the printing environment sharing service 4013 (B-1-1).

When the printing environment sharing service 4013 (B-1) receives the request, in step S4481, the reservation list obtaining part 4055 of the printing environment sharing service 4013 (B-1) retrieves corresponding reservation information from the reservation information stored in the SPS server 4003 (B-1) based on the user ID included in the request, and obtains the reservation names and reservation numbers of the corresponding reservation information. However, when no corresponding reservation information is stored, the reservation list obtaining part 4055 of the printing environment sharing service 4013 (B-1) refers to the service list 4071 of the printing environment sharing service 4013 (B-1), adds channel information from B-1 to B-1-2 to the channel information for information searching (B-1-1→B-1), and transmits a reservation list obtaining request including the user ID to the printing environment sharing service 4013 (B-1-2) subordinate to the printing environment sharing service 4013 (B-1-1) based on the channel information for information searching (B-1-1→B-1).

When the printing environment sharing service 4013 (B-1-2) receives the request, in step S4482, the reservation list obtaining part 4055 of the printing environment sharing service 4013 (B-1-2) obtains the reservation names and reservation numbers of corresponding reservation information among the reservation information stored in the SPS server 4003 (B-1-2) based on the user ID included in the request, and transmits the reservation names and numbers as a reservation list to the printing environment sharing service 4013 (B-1) based on channel information for information searching B-1-1→B-1→B-1-2.

When the printing environment sharing service 4013 (B-1) receives the reservation list, in step S4483, the reservation list obtaining part 4055 of the printing environment sharing service 4013 (B-1) transmits the reservation list to the printing environment sharing service 4013 (B-1-1), which has requested the reservation list, based on the channel information for information searching B-1-1→B-1→B-1-2.

The reservation list obtaining part 4055 of the printing environment sharing service 4013 (B-1-1) provides the received reservation list to the screen control part 4059 of the printing environment sharing service 4013 (B-1-1). Then, the screen control part 4059 of the printing environment sharing service 4013 (B-1-1) creates a printing reservation selection screen displaying the reservation list as shown in FIG. 116B, and presents the printing reservation selection screen to the user, displaying the screen on the touch panel.

The operation of steps S4484 through S4493 of FIG. 119 is equal to the operation of steps S4466 through S4475 of FIG. 118. Further, the reservation information changing operation of FIG. 119 is equal to that of FIG. 118.

In contrast to the operation shown in FIG. 118, in the operation of FIG. 119, when the reservation list obtaining part 4055 of the printing environment sharing service 4013 (B-1) searches the reservation information stored in the HDD 4039 of the SPS server 4003 (B-1) for the corresponding reservation information in response to a reservation list obtaining request to find that no corresponding reservation information is stored, the reservation list obtaining part 4055 spontaneously refers to the service list 4071 of the printing environment sharing service 4013 (B-1), and transmits a reservation list obtaining request including the user ID to the subordinate printing environment sharing service 4013 (B-1-2), thereby obtaining a corresponding reservation list.

By the printing environment sharing services 4013 performing the operation shown in FIG. 119, the user can directly operate the SPS server 4003 and change printing conditions without providing channel information.

In the operation of FIG. 119, if no corresponding reservation information is stored in any printing environment sharing services 4013 subordinate to the printing environment sharing services 4013 (B-1) either, the reservation list obtaining part 4055 of the printing environment sharing services 4013 (B-1) refers to the service list 4071 of the printing environment sharing services 4013 (B-1), and transmits a reservation list obtaining request including the user ID to the printing environment sharing services 4013 (R-0) superordinate to the printing environment sharing services 4013 (B-1), thereby requesting the printing environment sharing services 4013 (R-0) to obtain a reservation list.

Figure 121:
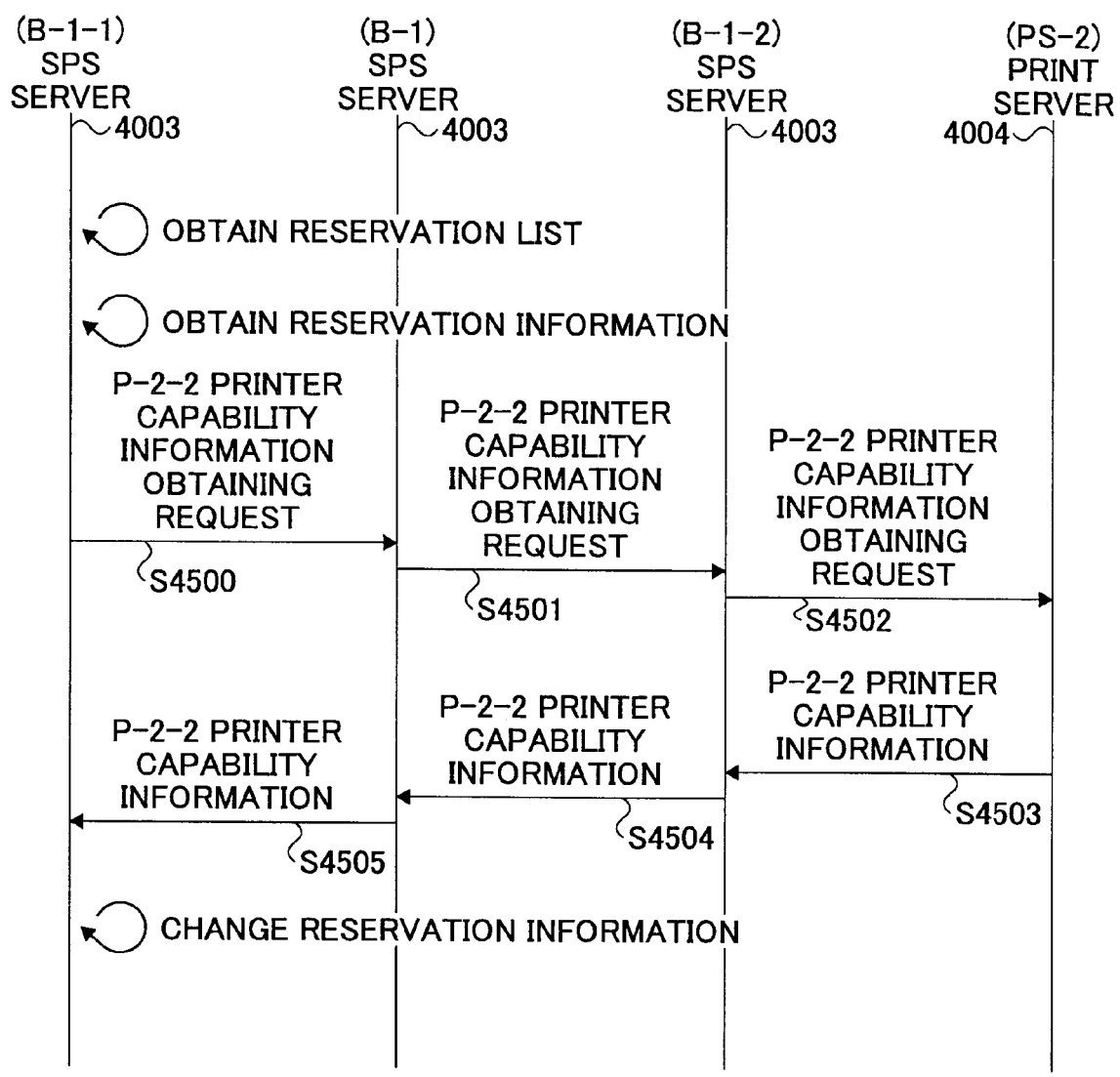

Next, a description is given, with reference to FIGS. 120A through 121, of another case of the user changing the printing conditions of the printer 4006 (P-2-2) using the SPS server 4003 (B-1-1) (a sixth printing condition changing operation). In the case of FIGS. 120A through 121, a recording medium on which reservation information as well as channel information is recorded is inserted into the slot of the SPS server 4003 (B-1-1) by the user so that the reservation information as well as the channel information is provided to the SPS server 4003 (B-1-1).

FIGS. 120A through 120D are diagrams and FIG. 121 is a sequence diagram for illustrating the sixth printing condition changing operation.

For instance, it is assumed that the user has selected the printer 4006 (P-2-2), set printing conditions, and made a printing reservation. In this case, when the reservation list obtaining part 4055 of the printing environment sharing service 4013 (B-1-1) is informed by the screen control part 4059 of the printing environment sharing service 4013 (B-1-1) that the user has entered her/his user ID and password and performed a predetermined operation such as the tapping of a printing reservation selection screen display button, operating the touch panel of the SPS server 4003 (B-1-1), as shown in FIG. 121, the reservation list obtaining part 4055 obtains the reservation names and reservation numbers of reservation information corresponding to the user ID among the reservation information read out from the inserted recording medium, and provides the reservation names and numbers as a reservation list to the screen control part 4059 of the printing environment sharing service 4013 (B-1-1).

Receiving the reservation list, the screen control part 4059 of the printing environment sharing service 4013 (B-1-1) creates a printing reservation selection screen as shown in FIG. 120A, and presents the printing reservation selection screen to the user, displaying the screen on the touch panel.

For instance, when the reservation information obtaining part 4053 of the printing environment sharing service 4013 (B-1-1) is informed by the screen control part 4059 of the printing environment sharing service 4013 (B-1-1) that the user has selected RESERVATION 1 and tapped on a RESERVATION CONTENTS button 4350*a* on the printing reservation selection screen of FIG. 120A, as shown in FIG. 121, the reservation information obtaining part 4053 obtains the reservation information of the corresponding reservation number from the reservation information read out from the inserted recording medium, and provides the obtained reservation information to the screen control part 4059 of the printing environment sharing service 4013 (B-1-1).

Receiving the reservation information, the screen control part 4059 of the printing environment sharing service 4013 (B-1-1) creates a printing reservation contents display screen displaying the reservation information as shown in FIG. 120B, and presents the printing reservation contents display screen to the user, displaying the screen on the touch panel.

For instance, when the user taps on a CHANGE RESERVATION button 4351a on the printing reservation contents display screen of FIG. 120B, the screen control part 4059 of the printing environment sharing service 4013 (B-1-1) creates a reservation change screen as shown in FIG. 120C, and presents the reservation change screen to the user, displaying the screen on the touch panel.

For instance, when the printer capability information obtaining part 4045 of the printing environment sharing service 4013 (B-1-1) is informed by the screen control part 4059 of the printing environment sharing service 4013 (B-1-1) that the user has selected CHANGE PRINTING CONDITIONS and tapped on a NEXT button 4352a on the reservation change screen of FIG. 120C, in step S4500 of FIG. 121, the printer capability information obtaining part 4045 compares the channel information read out from the recording medium (A-1-1→A-1→R-0→B-1→B-1-2) and the service list 4071 stored in, for instance, the HDD 4039 of the SPS server 4003 (B-1-1) When the printer capability information obtaining part 4045 of the printing environment sharing service 4013 (B-1-1) determines that an identifier identifying the printing environment sharing service 4013 (B-1-1) is not included in the channel information read out from the recording medium, the printer capability information obtaining part 4045 creates channel information for information searching (B-1-1→B-1), and transmits a request to obtain the printer capability information of the printer 4006 (P-2-2) to the superordinate printing environment sharing service 4013 (B-1). The request includes the channel information read out from the recording medium.

When the printing environment sharing service 4013 (B-1) receives the request, in step S4501, the printer capability information obtaining part 4045 of the printing environment sharing service 4013 (B-1) compares the channel information (A-1-1→A-1→R-0→B-1→B-1-2) included in the received request and the service list 4071 stored in, for instance, the HDD 4039 of the SPS server 4003 (B-1). When the printer capability information obtaining part 4045 of the printing environment sharing service 4013 (B-1) determines that an identifier identifying the printing environment sharing service 4013 (B-1) is included in the channel information, the printer capability information obtaining part 4045 adds channel information from B-1 to B-1-2 to the channel information for information searching (B-1-1→B-1), and transmits the request to obtain the printer capability information of the printer 4006 (P-2-2) to the printing environment sharing service 4013 (B-1-2) based on the channel information for information searching B-1-1→B-1→B-1-2.

When the printing environment sharing service 4013 (B-1-2) receives the request, in step S4502, the printer capability information obtaining part 4045 of the printing environment sharing service 4013 (B-1-2) transmits the request to the document print service 4014 (PS-2).

Receiving the request, in step S4503, the document print service 4014 (PS-2) obtains the capability information of the printer 4006 (P-2-2) stored in, for instance, the print server 4004 (PS-2) and transmits the obtained capability information to the printing environment sharing service 4013 (B-1-2).

When the printing environment sharing service 4013 (B-1-2) receives the capability information of the printer 4006 (P-2-2), in step S4504, the printer capability information obtaining part 4045 of the printing environment sharing service 4013 (B-1-2) transmits the capability information of the printer 4006 (P-2-2) to the printing environment sharing service 4013 (B-1) based on the channel information for information searching B-1-1→B-1→B-1-2.

When the printing environment sharing service 4013 (B-1) receives the capability information of the printer 4006 (P-2-2), in step S4505, the printer capability information obtaining part 4045 of the printing environment sharing service 4013 (B-1) transmits the capability information of the printer 4006 (P-2-2) to the printing environment sharing service 4013 (B-1-1) based on the channel information for information searching B-1-1→B-1→B-1-2.

When the printing environment sharing service 4013 (B-1-1) receives the capability information of the printer 4006 (P-2-2), the printer capability information obtaining part 4045 of the printing environment sharing service 4013 (B-1-1) provides the capability information of the printer 4006 (P-2-2) to the screen control part 4059 of the printing environment sharing service 4013 (B-1-1). Then, the screen control part 4059 of the printing environment sharing service 4013 (B-1-1) creates a printing condition change screen as shown in FIG. 120D based on the capability information of the printer 4006 (P-2-2), and presents the printing condition change screen to the user, displaying the screen on the touch panel.

For instance, when the user changes the printing conditions and taps on a CHANGE PRINTING CONDITIONS button 4353a on the printing condition change screen of FIG. 120D, the screen control part 4059 of the printing environment sharing service 4013 (B-1-1) informs the reservation information changing part 4056 of the printing environment sharing service 4013 (B-1-1) that the CHANGE PRINTING CONDITIONS button 4353a has been tapped on, and provides the reservation information changing part 4056 with new (updated) reservation information. The reservation information changing part 4056 of the printing environment sharing service 4013 (B-1-1) replaces the previous reservation information obtained by the reservation information obtaining part 4053 with the new reservation information (reservation information updated by the user).

The user can change the printing conditions using the printing condition change screen of FIG. 120D.

By the printing environment sharing services 4013 performing the operation shown in FIGS. 120A through 121, the user can directly operate the SPS server 4003 and change printing conditions, providing the SPS server 4003 with channel information and reservation information.

By the printing environment sharing services 4013 performing the operations described with reference to FIGS. 114A through 121, the use can change printing conditions (for instance, the number of copies to be printed) reserved in reservation information and print a document, operating the SPS server 4003, even if, for instance, the number of participants in a meeting is suddenly changed.

Seventh Embodiment

Next, a description is given, with reference to FIGS. 122 and 123, of an image-forming apparatus (hereinafter referred to as a multi-function apparatus) 5200 that forms images as another apparatus in which the printing environment sharing service 4013 is provided according to a seventh embodiment of the present invention.

Figure 122:
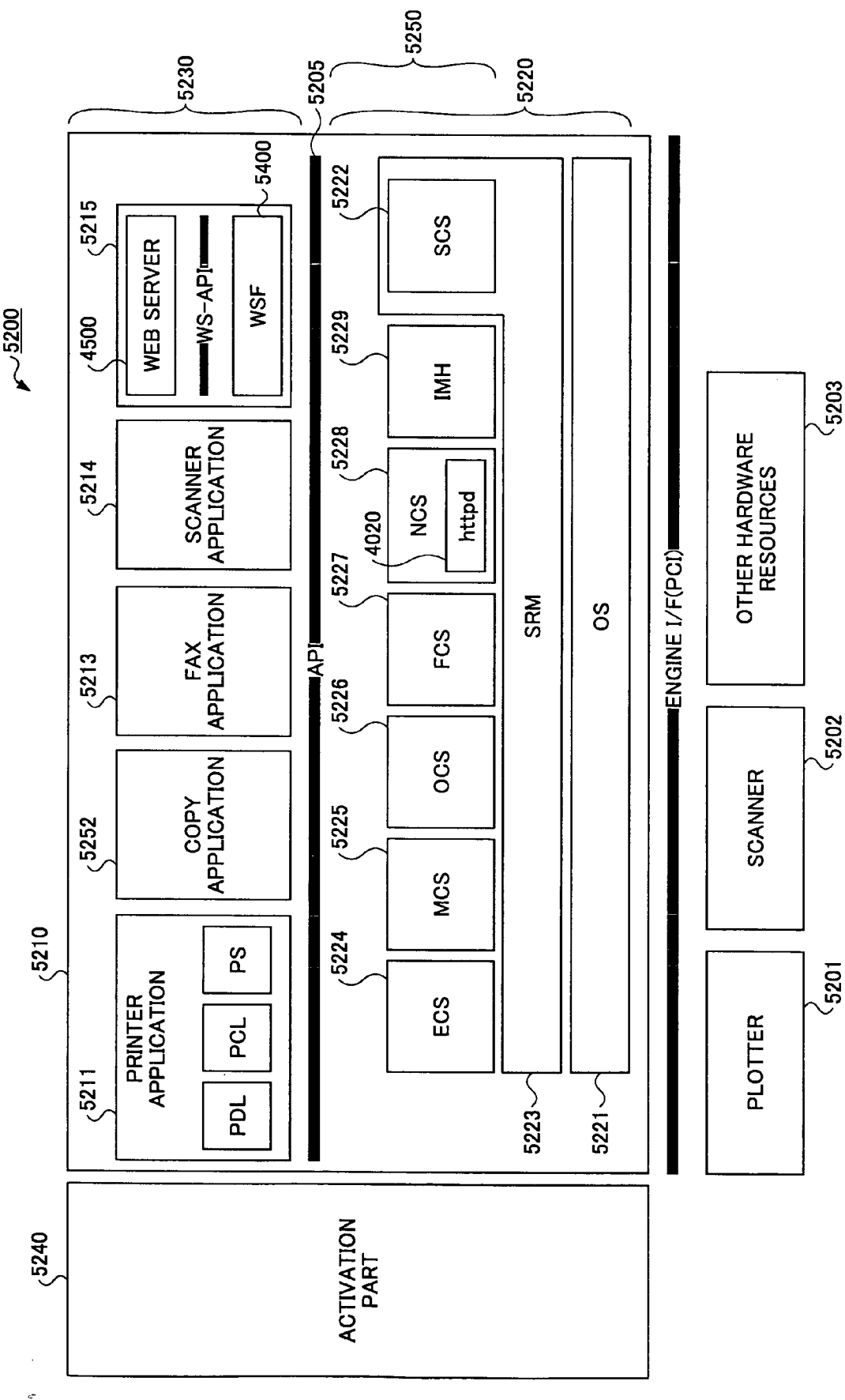

FIG. 122 is a block diagram showing a functional configuration of the multi-function apparatus 5200.

Referring to FIG. 122, the multi-function apparatus 5200 includes a plotter 5201, a scanner 5202, hardware resources 5203 including a facsimile machine, a software group 5210 including a platform 5220 and applications 5230, and a multi-function apparatus activation part 5240.

When the multi-function apparatus 5200 is turned on, the activation part 5240 is first started to activate the platform 5220 and the applications 5230. The platform 5220 includes a control service 5250, a system resource manager (SRM) 5223, and an OS 5221. The control service 5250 interprets processing requests from the applications 5230 and generates requests to obtain a hardware resource (hardware resource obtaining requests). The SRM 5223 manages one or more hardware resources and arbitrates between the hardware resource obtaining requests from the control service 5250.

The control service 5250 includes multiple service modules, which are a system control service (SCS) 5222, an engine control service (ECS) 5224, a memory control service (MCS) 5225, an operations panel control service (OCS) 5226, a facsimile control service (FCS) 5227, a network control service (NCS) 5228, and an imaging memory handler (IMH) 5229. The platform 5220 includes an application program interface (API) 5205 that makes the processing requests from the applications 5230 receivable using a predefined function.

The OS 5221, which is an operating system such as UNIX®, executes the software programs of the platform 5220 and the applications 5230 in parallel as processes. Use of UNIX®, which is open source software, makes it possible to secure program security, support networking, and obtain a source code easily. Further, no OS and TCP/IP royalties are required, and outsourcing is easy.

The SRM 5223 perform system control and resource management in cooperation with the SCS 5222. The SRM 5223 performs arbitration and execution control according to a request from a higher layer for the use of hardware resources such as an engine part such as the scanner 5202 or the plotter 5202, a memory, an HDD file, and a host I/O (a Centronics I/F, a network I/F, an IEEE 1394 I/F, or an RS-232-C I/F, for instance).

Specifically, the SRM 5223 determines whether the requested hardware resources are available, that is, whether the requested hardware resources are being used by another request. If the requested hardware resources are available, the SRM 5223 notifies the higher layer that the requested hardware resources are available. Further, in response to the request from the higher layer, the SRM 5223 performs scheduling for using the hardware resources, and directly carries out the requested contents such as paper feeding and image formation by a printer engine, memory reservation, and file creation.

The SCS 5222 perform multiple functions such as application management (Function 1), operation part control (Function 2), system screen display (for instance, display of a job list screen and a counter display screen) (Function 3), LED display (Function 4), resource management (Function 5), and interrupting application control (Function 6). Specifically, in the application management (Function 1), the registration of an application is performed, and the other applications are notified of information on the registration. In the operation part control (Function 2), exclusive control is performed on the rights of use of an operation part of the applications. In the system screen display (Function 3), a warning screen corresponding to the state of the engine part is displayed in accordance with the contents of a request from an application having the right of use of the operation part. In the LED display (Function 4), display control of a warning LED and the system LEDs of application keys is performed. In the resource management (Function 5), services for exclusive control of engine resources (for instance, the scanner 5202 and a staple) to be excluded when the application (ECS 5224) executes a job are provided. In the interrupting application control (Function 6), control and services for giving priority to the operation of a specific application are provided.

The ECS 5224 controls the engine part including the plotter 5201, the scanner 5202, and the other hardware resources 5203. For instance, the ECS 5224 reads images, performs printing, makes state notifications, and makes jam recoveries.

The MCS 5225 performs memory control. Specifically, the MCS 5225 obtains and releases image memory, uses an HDD, and compresses and decompresses image data, for instance.

The OCS 5226 controls an operations panel that serves as an information transmission part between an operator and a main body control.

For instance, the OCS 5226 notifies the main body control of the key operation events of the operator, provides a library function for each application to construct a GUI, manages the constructed GUI information application by application, and performs display reflection onto the operations panel.

The FCS 5227 provides the API 5205 for facsimile transmission to and reception from each application layer of a system controller using a PSTN or ISDN network, registration and citation of a variety of facsimile data managed in a backup SRAM (BKM), reading of facsimile communications, printing of received facsimile communications, and multi-function-related transmission and reception.

The NCS 5228 is a module group for providing services that can be used in common to applications requiring network I/O. The NCS 5228 mediates in distributing the data received from the network in accordance with each protocol among the applications and transmitting data from the applications to the network.

For instance, the NCS 5228 may control data communications with network devices connected through the Internet by HTTP (HyperText Transfer Protocol) among multiple protocols using an HTTPd (HyperText Transfer Protocol Daemon) 4020. The NCS 5228 may activate a processing part corresponding to a Web service specified by an HTTP request header with a function call, and notify the requesting network device of the results of processing by the Web service by an HTTP response. The Web service is provided in accordance with a message written in, for instance, XML.

The IMH 5229 maps image data in a virtual memory region (a user virtual space) into a physical memory. The IMH 5229 makes a system call in response to the activation of a process. Then, the IMH 5229 maps a virtual memory region for the process, and releases the virtual memory region when the process is completed.

The applications 5230 includes a printer application 5211 for a printer including a page-description language (PDL), a printer control language (PCL), and PS, a copy application 5212 for a copier, a fax application 5213 for a facsimile machine, a scanner application 5214 for a scanner, and a Web service processing application 5215 that is a Web service application. Each of the applications 5211 through 5215 can operate using each process on the platform 5220, and therefore, is composed mainly of a screen display control program that performs screen control, key operation control, and job generation. A new application may be installed via a network connected through the NCS 5228. Application addition and deletion may be performed application by application.

The Web service processing application 5215 includes a Web server 4500 and a Web service function (WSF) 5400. The Web server 4500 provides a Web service by receiving an HTTP request for the Web service and transmitting an HTTP response. The Web service function (WSF) 5400 performs predetermined processing using the control service 5250 via the API 5205, and provides the processing results as a Web service via a Web service application program interface (WS-API).

According to this embodiment, the printing environment sharing service 4013 or the repository service 4012 is provided in the Web service function 5400.

The service list 4071, the printer list 4072, and reservation information and document data transferred from another multi-function apparatus 5200 are stored in a below-described HDD 5303 (FIG. 32).

The multi-function apparatus 5200 processes all the operations required in common among the applications solely on the platform 5220.

Figure 123:
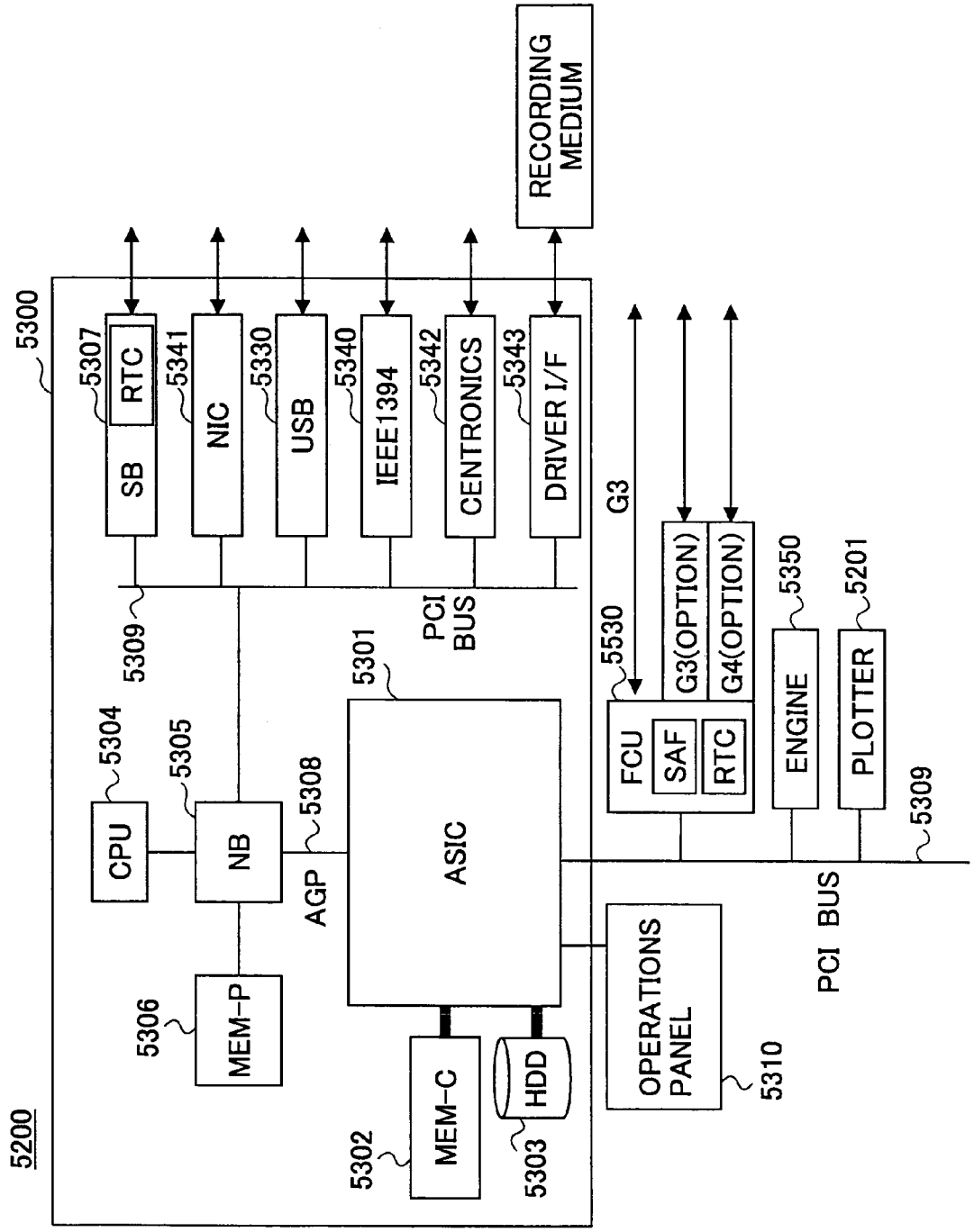

FIG. 123 is a block diagram showing a hardware configuration of the multi-function apparatus 5200.

Referring to FIG. 123, the multi-function apparatus 5200 has a configuration where an operations panel 5310, a facsimile control unit (FCU) 1530, an engine part 5350 (to which, for instance, the scanner 5202 is connected), and the plotter 5201 are connected to an application specific integrated circuit (ASIC) 5301 of a controller 5300 via a peripheral component interconnect (PCI) bus 5309 and the like.

In the controller 5300, a local memory (MEM-C) 5302 and the HDD 5303 are connected to the ASIC 5301, and the ASIC 5301 and a CPU 5304 are connected via a Northbridge (NB) 5305 of a CPU chipset. The ASIC 5301 and the CPU 5304 are thus connected via the NB 5305 because the interface of the CPU 5304 is not open to the public.

The ASIC 5301 and the NB 5305 are connected not by a mere PCI but by an accelerated graphics port (AGP) 5308. This is because connecting the ASIC 5301 and the NB 5305 by a low-speed PCI results in lower performance since the multi-function apparatus 5200 executes and controls the multiple processes forming the platform 5220 and the applications 5230 shown in FIG. 122.

The CPU 5304 performs overall control of the multi-function apparatus 5200. Specifically, the CPU 5304 causes the SCS 5222, the SRM 1223, the ECS 5224, the MCS 5225, the OCS 5226, the FCS 5227, the NCS 5228, and the IMH 5229 forming the platform 5220 to be activated and executed as processes on the OS 5221. Further, the CPU 5304 causes the printer application 5211, the copy application 5212, the fax application 5213, the scanner application 5214, and the Web service processing application 5215 to be activated and executed.

The NB 5305 is a bridge for connecting the CPU 5304 to a system memory (MEM-P) 5306, a Southbridge (SB) 5307, a network interface card (NIC) 5341, a universal serial bus (USB) 5330, an IEEE 1394 device 5340, a Centronics device 5342, a driver I/F 5343, and the ASIC 5301.

The system memory (MEM-P) 5306 is used as the memory for image drawing of the multi-function apparatus 5200. The SB 5307 is a bridge for connecting the NB 5305 with a PCI bus, a ROM, and peripheral devices. The local memory (MEM-C) 5302 is used as an image buffer for copying and a code buffer. The ASIC 5301 is an IC for image processing including a hardware element for image processing.

The driver I/F 5343 is an interface used to read a program or an application from an inserted recording medium storing the program or the application and install the read program or application in the multi-function apparatus 5200. The recording medium may be, for instance, an SD memory card, a smart medium, a multimedia card, or a CompactFlash®.

The HDD 5303 stores image data, programs, font data, forms, and documents. The HDD 5303 also stores the service list 71, the printer list 72, and information such as reservation information and document data according to the present invention. The operations panel 5310 is an operation part that receives inputs from the operator and displays information to the operator. For instance, the operations panel 5310 may be the same as the touch panel described in the sixth embodiment.

The ASIC 5301 includes a RAM interface for connecting the local memory (MEM-C) 5302 and a hard disk interface for connecting the HDD 5303. When image data is input to or output from these memory parts, the target or source of the image data is switched to the RAM interface or the hard disk interface.

The AGP 5308 is a bus interface for a graphics accelerator card, which has been proposed to accelerate graphics processing. The AGP 5308 directly accesses the system memory (MEM-P) 5306 at high throughput so that the graphics accelerator card operates at high speed.

By providing the printing environment sharing service 4013 in the multi-function apparatus 5200 as shown in FIGS. 122 and 123, for instance, reservation information and document data can be transferred between the multi-function apparatuses 5200, the reservation information and the document data can be stored in the multi-function apparatus 5200 of a specified printing location, and the multi-function apparatus 5200 of the specified printing location can perform printing when a printing start request is received as described in the first embodiment.

Further, as shown in the sixth embodiment, for instance, by operating the multi-function apparatus 5200 using screens displayed on the operations panel 5310, a reservation may be changed by changing reservation information stored in the multi-function apparatus 5200, and printing can be started directly on the spot.

In the description of the above-described fifth through seventh embodiments, the printing start control part 4052 of a printing environment sharing service 4013 transmits a printing start request including reservation information and document data to another printing environment sharing service 4013 based on channel information to a printing location. Alternatively, the printing start control part 4052 of a printing environment sharing service 4013 may request the data transfer part 4044 thereof to transfer a printing start request including reservation information and document data, and the data transfer part 4044 may transmit the printing start request including reservation information and document data to another printing environment sharing service 4013 based on channel information to a printing location.

The present invention is not limited to the specifically disclosed embodiments, and variations and modifications may be made without departing from the scope of the present invention.

The present application is based on Japanese Priority Patent Applications No. 2003-176873, filed on Jun. 20, 2003, No. 2003-299156, filed on Aug. 22, 2003, No. 2003-299155, filed on Aug. 22, 2003, No. 2004-174085, filed on Jun. 11, 2004, No. 2004-174086, filed on Jun. 11, 2004, and No. 2004-174087, filed on Jun. 11, 2004, the entire contents of which are hereby incorporated by reference.

What is claimed is:

1. A method of providing a service for sharing a printing environment using a plurality of service providing apparatuses connected via a network, the method comprising:

receiving, by a first service providing apparatus of a first printing environment, a printing reservation request for printing data, the printing reservation request including the printing data and specifying a location for printing in a second printing environment different from the first printing environment, the first printing environment and the second printing environment each including a print server and at least one printer;

obtaining, by the first service providing apparatus, channel information on a communication channel to the location for the printing by obtaining information on a hierarchical relationship of the service providing apparatuses between the first service providing apparatus and the location for printing; and transferring, by the first service providing apparatus, the printing reservation request to a second service providing apparatus in the communication channel based on the channel information.

2. A method of providing a service for sharing a printing environment using a plurality of service providing apparatuses connected via a network, the method comprising:

obtaining, by a first service providing apparatus of a first printing environment, information on an application for a document in a second printing environment different from the first printing environment based on a channel information on a communication channel to a location for printing in the second printing environment in response to a first request from a second service providing apparatus, the first printing environment and the second printing environment each including a print server and at least one printer; and transferring, by the first service providing apparatus, a printing reservation request for printing data, the printing reservation request including the printing data and specifying the location for printing in the second printing environment, to a third service providing apparatus in response to a second request from the second service providing apparatus.

3. The method as claimed in claim 2, wherein in the obtaining step, the first service providing apparatus transmits the first request from the second service providing apparatus to the third service providing apparatus, and obtains the information on the application from the third service providing apparatus.

4. The method as claimed in claim 2, wherein in the obtaining step, the first service providing apparatus transmits the first request from the second service providing apparatus to a printing service providing apparatus providing a service for printing, and obtains the information on the application from the printing service providing apparatus.

5. The method as claimed in claim 2, further comprising transmitting, by the first service providing apparatus, a third request to convert data on the document into printing data to a printing service providing apparatus providing a service for printing, the printing service providing apparatus being configured to use the application for the document, the third request including the data on the document.

6. The method as claimed in claim 5, further comprising receiving, by the first service providing apparatus, the printing data corresponding to the third request from the printing service providing apparatus.

7. The method as claimed in claim 2, further comprising searching for the printing location based on the information on the application obtained in the obtaining step.

8. The method as claimed in claim 2, further comprising obtaining, by the first service providing apparatus, service data from the third service providing apparatus in response to a third request from the second service providing apparatus, the service data including data on a hierarchical relationship between the third service providing apparatus and service providing apparatuses connected thereto.

9. The method as claimed in claim 8, wherein each of the service providing apparatuses connected to the third service providing apparatus is set as superordinate to, coordinate with, or subordinate to the third service providing apparatus in the service data.

10. The method as claimed in claim 2, further comprising:

managing, by the first service providing apparatus, service data including data on a hierarchical relationship between the first service providing apparatus and the second and third service providing apparatuses.

11. The method as claimed in claim 10, wherein each of the second and third service providing apparatuses is set as superordinate to, coordinate with, or subordinate to the first service providing apparatus in the service data.

12. A method of providing a service for sharing a printing environment using a plurality of service providing apparatuses connected via a network, the method comprising:

obtaining, by a first service providing apparatus of a first printing environment, printing capability information of a printing apparatus in a second printing environment different from the first printing environment based on a channel information on a communication channel to a location for printing in the second printing environment in response to a first request from a second service providing apparatus, the first printing environment and the second printing environment each including a print server and at least one printer; and transferring, by the first service providing apparatus, a printing reservation request for printing data, the printing reservation request including the print data and specifying the location for printing in the second printing environment, to a third service providing apparatus in response to a second request from the second service providing apparatus.

13. The method as claimed in claim 12, wherein in the obtaining step, the first service providing apparatus transmits the first request from the second service providing apparatus to the third service providing apparatus, and obtains the printing capability information from the third service providing apparatus.

14. The method as claimed in claim 12, wherein in the obtaining step, the first service providing apparatus transmits the first request from the second service providing apparatus to a printing service providing apparatus providing a service for printing, and obtains the printing capability information from the printing service providing apparatus.

15. The method as claimed in claim 12, further comprising searching for the printing location based on the printing capability information obtained in the obtaining step.

16. The method as claimed in claim 12, further comprising obtaining, by the first service providing apparatus, service data from the third service providing apparatus in response to a third request from the second service providing apparatus, the service data including data on a hierarchical relationship between the third service providing apparatus and service providing apparatuses connected thereto.

17. The method as claimed in claim 16, wherein each of the service providing apparatuses connected to the third service providing apparatus is set as superordinate to, coordinate with, or subordinate to the third service providing apparatus in the service data.

18. The method as claimed in claim 12, further comprising managing, by the first service providing apparatus, service data including data on a hierarchical relationship between the first service providing apparatus and the second and third service providing apparatuses.

19. The method as claimed in claim 18, wherein each of the second and third service providing apparatuses is set as superordinate to, coordinate with, or subordinate to the first service providing apparatus in the service data.

20. A computer-readable recording medium storing a program for causing a computer to execute a method of providing a service for sharing a printing environment using a plurality of service providing apparatuses connected via a network, the method comprising:
obtaining, by a first service providing apparatus of a first printing environment, information on an application for a document in a second printing environment different from the first printing environment based on a channel information on a communication channel to a location for printing in the second printing environment in response to a first request from a second service providing apparatus, the first printing environment and the second printing environment each including a print server and at least one printer; and
transferring, by the first service providing apparatus, a printing reservation request for printing data, the printing reservation request including the printing data and specifying the location for printing in the second printing environment, to a third service providing apparatus in response to a second request from the second service providing apparatus.

21. A computer-readable recording medium storing a program for causing a computer to execute a method of providing a service for sharing a printing environment using a plurality of service providing apparatuses connected via a network, the method comprising:
obtaining, by a first service providing apparatus of a first printing environment, printing capability information of a printing apparatus in a second printing environment different from the first printing environment based on a channel information on a communication channel to a location for printing in the second printing environment in response to a request from a second service providing apparatus, the first printing environment and the second printing environment each including a print server and at least one printer; and
transferring, by the first service providing apparatus, a printing reservation request for printing data, the printing reservation request including the printing data and specifying the location for printing in the second printing environment, to a third service providing apparatus in response to a second request from the second service providing apparatus.

22. An apparatus, of a first printing environment, for providing a service for sharing a printing environment, comprising:
a service providing part configured to provide the service, the service providing part including:
an application information obtaining part configured to obtain information on an application for a document in a second printing environment different from the first printing environment based on a channel information on a communication channel to a location for printing in the second printing environment in response to a first request from a service providing part of a first one of other apparatuses for providing the service for sharing the printing environment, the first printing environment and the second printing environment each including a print server and at least one printer; and
a transfer part configured to transfer a printing reservation request for printing data, the printing reservation request including the printing data and specifying the location for printing in the second printing environment, to a service providing part of a second one of the other apparatuses in response to a second request from the service providing part of the first one of the other apparatuses.

23. The apparatus as claimed in claim 22, wherein the application information obtaining part is configured to transmit the first request to the service providing part of the second one of the other apparatuses, and to obtain the information on the application from the service providing part of the second one of the other apparatuses.

24. The apparatus as claimed in claim 22, wherein the application information obtaining part is configured to transmit the first request to a printing service providing apparatus providing a service for printing, and to obtain the information on the application from the printing service providing apparatus.

25. The apparatus as claimed in claim 22, wherein the service providing part further includes a transmission part configured to transmit a third request to convert data on the document into printing data to a printing service providing apparatus providing a service for printing, the printing service providing apparatus being configured to use the application for the document, the third request including the data on the document.

26. The apparatus as claimed in claim 25, wherein the service providing part further includes a reception part configured to receive the printing data corresponding to the third request from the printing service providing apparatus.

27. The apparatus as claimed in claim 22, wherein the service providing part is configured to search for the printing location based on the information on the application obtained by the application information obtaining part.

28. The apparatus as claimed in claim 22, wherein the service providing part further includes a service data obtaining part configured to obtain service data from the second one of the other apparatuses in response to a third request from the first one of the other apparatuses, the service data including data on a hierarchical relationship between the service providing part of the second one of the other apparatuses and service providing parts of those of the other apparatuses connected to the second one.

29. The apparatus as claimed in claim 28, wherein each of the service providing parts of those of the other apparatuses connected to the second one is set as superordinate to, coordinate with, or subordinate to the service providing part of the second one of the other apparatuses in the service data.

30. The apparatus as claimed in claim 22, wherein the service providing part further includes a service data managing part configured to manage service data including data on a hierarchical relationship between the service providing part of the apparatus and the service providing parts of the first one and the second one of the other apparatuses.

31. The apparatus as claimed in claim 30, wherein each of the service providing parts of the first one and the second one of the other apparatuses is set as superordinate to, coordinate with, or subordinate to the service providing part of the apparatus in the service data.

32. The apparatus as claimed in claim 22, further comprising:
a document management service providing part configured to provide a service for document management.

33. The apparatus as claimed in claim 22, further comprising:
a document data storing part configured to store document data.

34. The apparatus as claimed in claim 22, further comprising:

a printing service providing part configured to provide a service for printing.

35. The apparatus as claimed in claim 22, further comprising:
a printing part configured to perform printing.

36. An apparatus, of a first printing environment, for providing a service for sharing a printing environment, comprising:
a service providing part configured to provide the service, the service providing part including:
an information obtaining part configured to obtain printing capability information of a printing apparatus in a second printing environment different from the first printing environment based on a channel information on a communication channel to a location for printing in the second printing environment in response to a first request from a service providing part of a first one of other apparatuses for providing the service for sharing the printing environment, the first printing environment and the second printing environment each including a print server and at least one printer; and
a transfer part configured to transfer a printing reservation request for printing data, the printing reservation request including the printing data and specifying the location for printing in the second printing environment, to a service providing part of a second one of the other apparatuses in response to a second request from the service providing part of the first one of the other apparatuses.

37. The apparatus as claimed in claim 36, wherein the information obtaining part is configured to transmit the first request to the service providing part of the second one of the other apparatuses, and to obtain the printing capability information from the service providing part of the second one of the other apparatuses.

38. The apparatus as claimed in claim 36, wherein the information obtaining part is configured to transmit the first request to a printing service providing apparatus providing a service for printing, and to obtain the printing capability information from the printing service providing apparatus.

39. The apparatus as claimed in claim 36, wherein the service providing part is configured to search for the printing location based on the printing capability information obtained by the information obtaining part.

40. The apparatus as claimed in claim 36, wherein the service providing part further includes a service data obtaining part configured to obtain service data from the second one of the other apparatuses in response to a third request from the first one of the other apparatuses, the service data including data on a hierarchical relationship between the service providing part of the second one of the other apparatuses and service providing parts of those of the other apparatuses connected to the second one.

41. The apparatus as claimed in claim 40, wherein each of the service providing parts of those of the other apparatuses connected to the second one is set as superordinate to, coordinate with, or subordinate to the service providing part of the second one of the other apparatuses in the service data.

42. The apparatus as claimed in claim 36, wherein the service providing part further includes a service data managing part configured to manage service data including data on a hierarchical relationship between the service providing part of the apparatus and the service providing parts of the first one and the second one of the other apparatuses.

43. The apparatus as claimed in claim 42, wherein each of the service providing parts of the first one and the second one of the other apparatuses is set as superordinate to, coordinate with, or subordinate to the service providing part of the apparatus in the service data.

44. The apparatus as claimed in claim 36, further comprising:
a document management service providing part configured to provide a service for document management.

45. The apparatus as claimed in claim 36, further comprising:
a document data storing part configured to store document data.

46. The apparatus as claimed in claim 36, further comprising:
a printing service providing part configured to provide a service for printing.

47. The apparatus as claimed in claim 36, further comprising:
a printing part configured to perform printing.

48. A method of providing a service for sharing a printing environment using a plurality of service providing apparatuses connected via a network, the method comprising:
transferring, by a first service providing apparatus of a first printing environment, at least one of reservation information pertaining to a printing reservation and document data to a second service providing apparatus of a second printing environment different from the first printing environment based on a channel information on a communication channel to a location for printing in the second printing environment in response to a request, the first printing environment and the second printing environment each including a print server and at least one printer;
storing, by the first service providing apparatus, the at least one of reservation information and document data based on storage location information included in the reservation information; and
obtaining, by the first service providing apparatus, printer data pertaining to a printer from the second service providing apparatus in response to a request, the second service providing apparatus being adapted to provide a printing environment sharing service or a service pertaining to printing.

49. The method as claimed in claim 48, further comprising:
deleting, by the first service providing apparatus, the at least one of reservation information and document data stored in the storing step.

50. The method as claimed in claim 48, further comprising:
starting, by the first service providing apparatus, a printing operation,
wherein, when at least one of printing location information, printer information, and printing conditions information is missing in the reservation information stored in the storing step, the first service providing apparatus supplements the missing information to the reservation information.

51. A method of providing a service for sharing a printing environment using a plurality of service providing apparatuses connected via a network, the method comprising:
transferring, by a first service providing apparatus of a first printing environment, at least one of reservation information pertaining to a printing reservation and document data to a second service providing apparatus of a second printing environment different from the first printing environment based on a channel information on a communication channel to a location for printing in the second printing environment in response to a request, the first printing environment and the second printing environment each including a print server and at least one printer;

storing, by the first service providing apparatus, the at least one of reservation information and document data based on storage location information included in the reservation information; and obtaining, by the first service providing apparatus, printer capability information from the second service providing apparatus in response to a request, the second service providing apparatus being adapted to provide a printing environment sharing service or a service pertaining to printing.

52. A method of providing a service for sharing a printing environment using a plurality of service providing apparatuses connected via a network, the method comprising:

transferring, by a first service providing apparatus of a first printing environment, at least one of reservation information pertaining to a printing reservation and document data to a second service providing apparatus of a second printing environment different from the first printing environment based on a channel information on a communication channel to a location for printing in the second printing environment in response to a request, the first printing environment and the second printing environment each including a print server and at least one printer;

storing, by the first service providing apparatus, the at least one of reservation information and document data based on storage location information included in the reservation information; and obtaining, by the first service providing apparatus, application information for a document from the second service providing apparatus in response to a request, the second service providing apparatus being adapted to provide a printing environment sharing service or a service pertaining to printing.

53. The method as claimed in claim 48, further comprising:
obtaining, by the first service providing apparatus, service data including data on a hierarchical relationship between the service providing apparatuses from the second service providing apparatus in response to a request.

54. The method as claimed in claim 53, wherein the service data includes connection information pertaining to connection of the service providing apparatuses in relation to each other, the connection information being indicated as at least one of superordinate, coordinate, and subordinate.

55. The method as claimed in claim 48, further comprising:
managing, by the first service providing apparatus, service data including data on a hierarchical relationship between the service providing apparatuses.

56. The method as claimed in claim 55, wherein the service data includes connection information pertaining to connection of the service providing apparatuses in relation to each other, the connection information being indicated as at least one of superordinate, coordinate, and subordinate.

57. A computer-readable recording medium storing a program for causing a computer to execute a method of providing a service for sharing a printing environment using a plurality of service providing apparatuses connected via a network, the method comprising:

transferring, by a first service providing apparatus of a first printing environment, at least one of reservation information pertaining to a printing reservation and document data to a second service providing apparatus of a second printing environment different from the first printing environment based on a channel information on a communication channel to a location for printing in the second printing environment in response to a request, the first printing environment and the second printing environment each including a print server and at least one printer;

storing, by the first service providing apparatus, the at least one of reservation information and document data based on storage location information included in the reservation information; and obtaining, by the first service providing apparatus, printer data pertaining to a printer from the second service providing apparatus in response to a request, the second service providing apparatus being adapted to provide a printing environment sharing service or a service pertaining to printing.

58. An apparatus, of a first printing environment, for providing a service for sharing a printing environment, comprising:

a service providing part configured to provide the service, the service providing part including:
a transfer part configured to transfer at least one of reservation information pertaining to a printing reservation and document data to a counterpart service providing part of a counterpart service providing apparatus of a second printing environment different from the first printing environment based on a channel information on a communication channel to a location for printing in the second printing environment in response to a request, the first printing environment and the second printing environment each including a print server and at least one printer;
a storage part configured to store the at least one of reservation information and document data based on storage location information included in the reservation information, and
a printer data obtaining part configured to obtain printer data pertaining to a printer from the counterpart service providing part in response to a request, the counterpart service providing part being adapted to provide a printing environment sharing service or a service pertaining to printing.

59. The apparatus as claimed in claim 58, wherein, the service providing part further includes a deletion part configured to delete the at least one of reservation information and document data stored by the storage part.

60. The apparatus as claimed in claim 58, wherein:
the service providing part further includes a printing start part configured to start a printing operation corresponding to the reservation information; and
when at least one of printing location information, printer information, and printing conditions information is missing in the reservation information stored by the storage part, the service providing apparatus supplements the missing information to the reservation information.

61. An apparatus, of a first printing environment, for providing a service for sharing a printing environment, comprising:

a service providing part configured to provide the service, the service providing part including:
a transfer part configured to transfer at least one of reservation information pertaining to a printing reservation and document data to a counterpart service providing part of a counterpart service providing apparatus of a second printing environment different from the first printing environment based on a channel information on a communication channel to a location for printing in the second printing environment in response to a request, the first printing environment and the second printing environment each including a print server and at least one printer;
a storage part configured to store the at least one of reservation information and document data based on storage location information included in the reservation information; and
a printer capability information obtaining part configured to obtain printer capability information from the counterpart service providing part in response to a request, the counterpart service providing part being adapted to provide a printing environment sharing service or a service pertaining to printing.

62. An apparatus, of a first printing environment, for providing a service for sharing a printing environment, comprising:
a service providing part configured to provide the service, the service providing part including:
a transfer part configured to transfer at least one of reservation information pertaining to a printing reservation and document data to a counterpart service providing part of a counterpart service providing apparatus of a second printing environment different from the first printing environment based on a channel information on a communication channel to a location for printing in the second printing environment in response to a request, the first printing environment and the second printing environment each including a print server and at least one printer;
a storage part configured to store the at least one of reservation information and document data based on storage location information included in the reservation information; and
an application information obtaining part configured to obtain application information for a document from the counterpart service providing part in response to a request, the counterpart service providing part being adapted to provide a printing environment sharing service or a service pertaining to printing.

63. The apparatus as claimed in claim 58, wherein the service providing part further includes:
a service data obtaining part configured to obtain service data including data on a hierarchical relationship between the service providing apparatuses from the counterpart service providing part in response to a request.

64. The apparatus as claimed in claim 63, wherein the service data includes connection information pertaining to connection of the service providing apparatuses in relation to each other, the connection information being indicated as at least one of superordinate, coordinate, and subordinate.

65. The apparatus as claimed in claim 58, wherein the service providing part further includes:
a service data managing part configured to manage service data including data on a hierarchical relationship between the service providing apparatuses.

66. The method as claimed in claim 65, wherein the service data includes connection information of the service providing apparatuses in relation to each other, the connection information being indicated as at least one of superordinate, coordinate, and subordinate.

67. The apparatus as claimed in claim 58, further comprising a document managing service providing part configured to provide service pertaining to management of a document.

68. The apparatus as claimed in claim 58, further comprising a document storage part configured to store one or more documents.

69. The apparatus as claimed in claim 58, further comprising a printing service providing part configured to provide service pertaining to printing.

70. The apparatus as claimed in claim 58, further comprising a printing part configured to execute printing.

71. A method of providing a service for sharing a printing environment using a plurality of service providing apparatuses connected via a network, the method comprising:
transferring, by a first service providing apparatus of a first printing environment, at least one of reservation information concerning printing reservation and document data to a second service providing apparatus of a second printing environment different from the first printing environment based on a channel information on a communication channel to a location for printing in the second printing environment in response to a request from a third service providing apparatus, the first printing environment and the second printing environment each including a print server and at least one printer;
obtaining, by the first service providing apparatus, the reservation information;
changing, by the first service providing apparatus, contents of the reservation information; and
obtaining, by the first service providing apparatus, printer data from one of the second service providing apparatus and a printing service providing apparatus providing a service for printing in response to a request from the third service providing apparatus, the printer data including data on a printer.

72. The method as claimed in claim 71, wherein the first service providing apparatus obtains the reservation information from the second service providing apparatus based on the channel information to the printing location in said obtaining step.

73. The method as claimed in claim 71, wherein the first service providing apparatus changes information on the printing location included in the reservation information in said changing step.

74. The method as claimed in claim 71, wherein the first service providing apparatus changes information on a printer included in the reservation information in said changing step.

75. The method as claimed in claim 71, wherein the first service providing apparatus changes information on a printing condition included in the reservation information in said changing step.

76. The method as claimed in claim 71, further comprising obtaining, by the first service providing apparatus, service data from the second service providing apparatus in response to a request from the third service providing apparatus, the service data including data on a hierarchical relationship between the second service providing apparatus and service providing apparatuses connected thereto.

77. A method of providing a service for sharing a printing environment using a plurality of service providing apparatuses connected via a network, the method comprising:
transferring, by a first service providing apparatus of a first printing environment, at least one of reservation information concerning printing reservation and document data to a second service providing apparatus of a second printing environment different from the first printing environment based on a channel information on a communication channel to a location for printing in the second printing environment in response to a request from a third service providing apparatus, the first printing environment and the second printing environment each including a print server and at least one printer;

obtaining, by the first service providing apparatus, the reservation information;

changing, by the first service providing apparatus, contents of the reservation information; and obtaining, by the first service providing apparatus, printer capability information from one of the second service providing apparatus and a printing service providing apparatus providing a service for printing in response to a request from the third service providing apparatus.

78. The method as claimed in claim 77, wherein, in said obtaining the printer capability information step, the first service providing apparatus obtains capability information of a first printer and capability information of a second printer, the first printer being changed to the second printer in said changing step.

79. The method as claimed in claim 71, further comprising obtaining, by the first service providing apparatus, a list of the reservation information from the second service providing apparatus in response to a request from the third service providing apparatus.

80. The method as claimed in claim 71, further comprising storing, by the first service providing apparatus, the at least one of the reservation information and the document data.

81. The method as claimed in claim 71, further comprising managing, by the first service providing apparatus, service data including data on a hierarchical relationship between the first service providing apparatus and the second and third service providing apparatuses.

82. The method as claimed in claim 81, wherein each of the second and third service providing apparatuses is set as superordinate to, coordinate with, or subordinate to the first service providing apparatus in the service data.

83. The method as claimed in claim 71, further comprising searching, by the first service providing apparatus, for a channel to a location in which the reservation information is stored.

84. A computer-readable recording medium storing a program for causing a computer to execute a method of providing a service for sharing a printing environment using a plurality of service providing apparatuses connected via a network, the method comprising:

transferring, by a first service providing apparatus of a first printing environment, at least one of reservation information concerning printing reservation and document data to a second service providing apparatus of a second printing environment different from the first printing environment based on a channel information on a communication channel to a location for printing in the second printing environment in response to a request from a third service providing apparatus, the first printing environment and the second printing environment each including a print server and at least one printer;

obtaining, by the first service providing apparatus, the reservation information;

changing, by the first service providing apparatus, contents of the reservation information; and obtaining, by the first service providing apparatus, printer data from one of the second service providing apparatus and a printing service providing apparatus providing a service for printing in response to a request from the third service providing apparatus, the printer data including data on a printer.

85. An apparatus, of a first printing environment, for providing a service for sharing a printing environment, comprising:

a service providing part configured to provide the service, the service providing part including:

a transfer part configured to transfer at least one of reservation information concerning printing reservation and document data to a service providing part of a first one of other apparatuses, of a second printing environment different from the first printing environment based on a channel information on a communication channel to a location for printing in the second printing environment, for providing the service for sharing the printing environment in response to a request from a service providing part of a second one of the other apparatuses, the first printing environment and the second printing environment each including a print server and at least one printer;

a reservation information obtaining part configured to obtain the reservation information; and a changing part configured to change contents of the reservation information; and a printer data obtaining part configured to obtain data on a printer from one of the service providing part of the first one of the other apparatuses and a printing service providing part of a printing service providing apparatus providing a service for printing in response to a request from the service providing part of the second one of the other apparatuses.

86. The apparatus as claimed in claim 85, wherein the reservation information obtaining part is configured to obtain the reservation information from the service providing part of the first one of the other apparatuses based on channel information to the printing location.

87. The apparatus as claimed in claim 85, wherein the changing part is configured to change information on the printing location included in the reservation information.

88. The apparatus as claimed in claim 85, wherein the changing part is configured to change information on a printer included in the reservation information.

89. The apparatus as claimed in claim 85, wherein the changing part is configured to change information on a printing condition included in the reservation information.

90. The apparatus as claimed in claim 85, further comprising a service data obtaining part configured to obtain service data from the service providing part of the first one of the other apparatuses in response to a request from the service providing part of the second one of the other apparatuses, the service data including data on a hierarchical relationship between the service providing part of the first one of the other apparatuses and service providing parts of those of the other apparatuses connected to the first one.

91. An apparatus, of a first printing environment, for providing a service for sharing a printing environment, comprising:

a service providing part configured to provide the service, the service providing part including:

a transfer part configured to transfer at least one of reservation information concerning printing reservation and document data to a service providing part of a first one of other apparatuses, of a second printing environment different from the first printing environment based on a channel information on a communication channel to a location for printing in the second printing environment, for providing the service for sharing the printing environment in response to a request from a service providing part of a second one of the other apparatuses, the first printing environment and the second printing environment each including a print server and at least one printer;

a reservation information obtaining part configured to obtain the reservation information; and a changing part configured to change contents of the reservation information; and a printer capability information obtaining part configured to obtain printer capability information from one of the service providing part of the first one of the other apparatuses and a printing service providing part of a printing service providing apparatus providing a service for printing in response to a request from the service providing part of the second one of the other apparatuses.

92. The apparatus as claimed in claim 91, wherein the printer capability information obtaining part is configured to obtain capability information of a first printer and capability information of a second printer, the first printer being changed to the second printer by the changing part.

93. The apparatus as claimed in claim 85, further comprising a reservation list obtaining part configured to obtain a list of the reservation information from the service providing part of the first one of the other apparatuses in response to a request from the service providing part of the second one of the other apparatuses.

94. The apparatus as claimed in claim 85, further comprising a storage part configured to store the at least one of the reservation information and the document data.

95. The apparatus as claimed in claim 85, further comprising a service data management part configured to manage service data including data on a hierarchical relationship between the service providing part of the apparatus and the service providing parts of the first one and the second one of the other apparatuses.

96. The apparatus as claimed in claim 95, wherein each of the service providing parts of the first one and the second one of the other apparatuses is set as superordinate to, coordinate with, or subordinate to the service providing part of the apparatus in the service data.

97. The apparatus as claimed in claim 85, further comprising a document management service providing part configured to provide a service for document management.

98. The apparatus as claimed in claim 85, further comprising a document storage part configured to store a document.

99. The apparatus as claimed in claim 85, further comprising a printing service providing part configured to provide a service for printing.

100. The apparatus as claimed in claim 85, further comprising a printing part configured to perform printing.

101. A computer-readable recording medium storing a program for causing a computer to execute a method of providing a service for sharing a printing environment using a plurality of service providing apparatuses connected via a network, the method comprising:

transferring, by a first service providing apparatus of a first printing environment, at least one of reservation information pertaining to a printing reservation and document data to a second service providing apparatus of a second printing environment different from the first printing environment based on a channel information on a communication channel to a location for printing in the second printing environment in response to a request, the first printing environment and the second printing environment each including a print server and at least one printer;

storing, by the first service providing apparatus, the at least one of reservation information and document data based on storage location information included in the reservation information; and obtaining, by the first service providing apparatus, printer capability information from the second service providing apparatus in response to a request, the second service providing apparatus being adapted to provide a printing environment sharing service or a service pertaining to printing.

102. A computer-readable recording medium storing a program for causing a computer to execute a method of providing a service for sharing a printing environment using a plurality of service providing apparatuses connected via a network, the method comprising:

transferring, by a first service providing apparatus of a first printing environment, at least one of reservation information pertaining to a printing reservation and document data to a second service providing apparatus of a second printing environment different from the first printing environment based on a channel information on a communication channel to a location for printing in the second printing environment in response to a request, the first printing environment and the second printing environment each including a print server and at least one printer;

storing, by the first service providing apparatus, the at least one of reservation information and document data based on storage location information included in the reservation information; and obtaining, by the first service providing apparatus, application information for a document from the second service providing apparatus in response to a request, the second service providing apparatus being adapted to provide a printing environment sharing service or a service pertaining to printing.

103. A computer-readable recording medium storing a program for causing a computer to execute a method of providing a service for sharing a printing environment using a plurality of service providing apparatuses connected via a network, the method comprising:

transferring, by a first service providing apparatus of a first printing environment, at least one of reservation information concerning printing reservation and document data to a second service providing apparatus of a second printing environment different from the first printing environment based on a channel information on a communication channel to a location for printing in the second printing environment in response to a request from a third service providing apparatus, the first printing environment and the second printing environment each including a print server and at least one printer;

obtaining, by the first service providing apparatus, the reservation information;

changing, by the first service providing apparatus, contents of the reservation information; and obtaining, by the first service providing apparatus, printer capability information from one of the second service providing apparatus and a printing service providing apparatus providing a service for printing in response to a request from the third service providing apparatus.

* * * * *